US012350211B2

(12) United States Patent
Zerhusen et al.

(10) Patent No.: US 12,350,211 B2
(45) Date of Patent: Jul. 8, 2025

(54) PATIENT SUPPORT APPARATUS

(71) Applicant: HILL-ROM SERVICES, INC., Batesville, IN (US)

(72) Inventors: Robert M. Zerhusen, Batesville, IN (US); Richard H. Heimbrock, Batesville, IN (US); Arpit Shah, Batesville, IN (US); Aziz A. Bhai, Batesville, IN (US); Bradley T. Smith, Batesville, IN (US); Catherine M. Wagner, Batesville, IN (US); Charles A. Lachenbruch, Batesville, IN (US); Clay G. Owsley, Batesville, IN (US); Dan R. Tallent, Batesville, IN (US); Daniel Nachtigal, Batesville, IN (US); David L. Bedel, Batesville, IN (US); David J. Brzenchek, Batesville, IN (US); David J. Hitchcock, Batesville, IN (US); David P. Lubbers, Batesville, IN (US); Douglas A. Seim, Batesville, IN (US); Douglas E. Borgman, Batesville, IN (US); Eric D. Benz, Batesville, IN (US); Florin Iucha, Batesville, IN (US); Frank E. Sauser, Batesville, IN (US); Gavin M. Monson, Batesville, IN (US); James W. Pascoe, Batesville, IN (US); James L. Walke, Batesville, IN (US); Jared Rude, Batesville, IN (US); John G. Byers, Batesville, IN (US); John D. Christie, Batesville, IN (US); Jonathan D. Turner, Batesville, IN (US); Joshua A. Williams, Batesville, IN (US); Karen Lanning, Batesville, IN (US); Kathryn R. Smith, Batesville, IN (US); Kirsten M. Emmons, Batesville, IN (US); Mary Kay Brinkman, Batesville, IN (US); Michael Buccieri, Batesville, IN (US); Nathaniel W. Hixon, Batesville, IN (US); Neal Wiggermann, Batesville, IN (US); Richard J. Schuman, Sr., Batesville, IN (US); Scott M. Corbin, Batesville, IN (US); Sravan Mamidi, Batesville, IN (US); Todd P. O'Neal, Batesville, IN (US); Todd S. Ventrola, Batesville, IN (US); Travis Pelo, Batesville, IN (US); Unnati Ojha, Batesville, IN (US); John Goewert, Batesville, IN (US)

(73) Assignee: Hill-Rom Services, Inc., Batesville, IN (US)

(*) Notice: Subject to any disclaimer, the term of this patent is extended or adjusted under 35 U.S.C. 154(b) by 77 days.

(21) Appl. No.: 17/492,870

(22) Filed: Oct. 4, 2021

(65) Prior Publication Data

US 2022/0023122 A1 Jan. 27, 2022

Related U.S. Application Data

(63) Continuation of application No. 16/727,136, filed on Dec. 26, 2019, now Pat. No. 11,135,110, which is a
(Continued)

(51) Int. Cl.
*A61G 7/05* (2006.01)
*A47C 27/08* (2006.01)
(Continued)

(52) U.S. Cl.
CPC .......... *A61G 7/0524* (2016.11); *A47C 27/082* (2013.01); *A47C 27/083* (2013.01);
(Continued)

(58) Field of Classification Search
CPC ............ A61G 7/05776; A61G 7/05769; A61G 7/001; A61G 7/057; A61G 7/0524;
(Continued)

(56) References Cited

U.S. PATENT DOCUMENTS 4,195,287 A 3/1980 Mathis et al.
4,680,790 A 7/1987 Packard et al.
(Continued)

FOREIGN PATENT DOCUMENTS

CN 102389353 B 5/2015
EP 1275896 A1 1/2003
(Continued)

OTHER PUBLICATIONS

"Control Access to Information on the Ipad Lock Screen." Apple Support, https://support.apple.com/guide/ipad/control-access-information-lock-screen-ipad8032acec/16.0/ipados/16.0. (Year: 2023).*
(Continued)

*Primary Examiner* — David R Hare
*Assistant Examiner* — Deborah Talitha Gedeon
(74) *Attorney, Agent, or Firm* — Barnes & Thornburg LLP

(57) ABSTRACT

A patient support apparatus includes a base frame, lift mechanism supporting an upper frame relative to the base frame, a load frame, and a plurality of deck sections, a patient support surface, and a number of barriers positioned about the patient supporting surface. The patient support apparatus includes a notification system for visually notifying a caregiver of a condition or status of a component of the patient support apparatus.

29 Claims, 317 Drawing Sheets

Related U.S. Application Data continuation of application No. 15/577,581, filed as application No. PCT/US2016/034908 on May 29, 2016, now Pat. No. 10,517,784.

(60) Provisional application No. 62/300,340, filed on Feb. 26, 2016, provisional application No. 62/256,233, filed on Nov. 17, 2015, provisional application No. 62/256,408, filed on Nov. 17, 2015, provisional application No. 62/256,406, filed on Nov. 17, 2015, provisional application No. 62/210,098, filed on Aug. 26, 2015, provisional application No. 62/197,294, filed on Jul. 27, 2015, provisional application No. 62/169,270, filed on Jun. 1, 2015, provisional application No. 62/168,596, filed on May 29, 2015.

(51) Int. Cl.
*A47C 27/10* (2006.01)
*A61G 7/00* (2006.01)
*A61G 7/018* (2006.01)
*A61G 7/053* (2006.01)
*A61G 7/057* (2006.01)

(52) U.S. Cl.
CPC ................ *A47C 27/10* (2013.01); *A61G 7/05* (2013.01); *A61G 7/0536* (2013.01); *A61G 7/05769* (2013.01); *A61G 7/05776* (2013.01); *A61G 7/001* (2013.01); *A61G 7/018* (2013.01); *A61G 2205/50* (2013.01)

(58) Field of Classification Search
CPC ........ A61G 7/0507; A61G 7/05; A61G 7/008; A61G 7/015; A61G 7/005; A61G 7/05715; A61G 7/018; A61G 7/0536; A61G 2205/50; A47C 27/082; A47C 27/083; A47C 27/10; A47C 27/081
See application file for complete search history.

(56) References Cited

U.S. PATENT DOCUMENTS 4,803,744 A 2/1989 Peck et al.
4,982,466 A 1/1991 Higgins et al.
5,307,051 A 4/1994 Sedlmayr
5,450,639 A 9/1995 Weismiller et al.
5,542,138 A 8/1996 Williams et al.
5,647,079 A 7/1997 Hakamiun et al.
5,654,694 A 8/1997 Newham
5,664,270 A 9/1997 Bell et al.
5,699,038 A 12/1997 Ulrich et al.
5,808,552 A 9/1998 Wiley et al.
5,913,774 A 6/1999 Feddema
6,021,533 A 2/2000 Ellis et al.
6,078,261 A 6/2000 Davsko
6,119,291 A * 9/2000 Osborne ................ A61G 7/018 601/149
6,234,642 B1 5/2001 Bokmper
6,544,200 B1 4/2003 Smith et al.
6,591,437 B1 7/2003 Phillips
6,771,172 B1 8/2004 Robinson et al.
6,781,517 B2 8/2004 Moster et al.
6,791,460 B2 9/2004 Dixon et al.
6,822,571 B2 11/2004 Conway
6,823,549 B1 11/2004 Hampton et al.
7,038,588 B2 5/2006 Boone et al.
7,145,467 B2 12/2006 Abel et al.
7,154,397 B2 12/2006 Zerhusen et al.
7,253,366 B2 8/2007 Bhai
7,506,390 B2 3/2009 Dixon et al.
7,557,718 B2 7/2009 Petrosenko et al.
7,805,785 B2 10/2010 Rawls-Meehan
8,056,165 B2 11/2011 Kummer et al.
8,104,117 B2 1/2012 Heimbrock et al.
8,536,990 B2 * 9/2013 Collins, Jr. .......... A61G 7/0516 340/286.07
8,544,126 B2 10/2013 Elliott et al.
8,671,487 B2 3/2014 Dewell
8,717,181 B2 * 5/2014 Tallent ................. G08B 25/008 5/940
8,878,679 B2 11/2014 Arndt et al.
9,271,579 B2 3/2016 Riley et al.
9,635,953 B2 5/2017 Nunn et al.
10,517,784 B2 12/2019 Zerhusen et al.
11,135,110 B2 10/2021 Zerhusen et al.
2002/0010679 A1 * 1/2002 Felsher ............... G06F 21/6245 705/51
2002/0044059 A1 4/2002 Reeder et al.
2002/0151990 A1 10/2002 Ulrich et al.
2003/0052787 A1 * 3/2003 Zerhusen ............. A61G 12/001 340/286.07
2003/0197614 A1 10/2003 Smith et al.
2006/0010601 A1 1/2006 Riley et al.
2006/0049936 A1 3/2006 Collins et al.
2006/0072996 A1 * 4/2006 Gallant .................... A61G 7/08 414/495
2006/0097879 A1 5/2006 Lippincott
2006/0101581 A1 5/2006 Blanchard et al.
2006/0271207 A1 11/2006 Shaw
2007/0156031 A1 7/2007 Sullivan et al.
2007/0157385 A1 7/2007 Lemire et al.
2007/0163045 A1 * 7/2007 Becker ................. A61G 7/0514 5/616

(56) References Cited

U.S. PATENT DOCUMENTS

| | | | | |
|---|---|---|---|---|
| 2007/0268480 | A1 | 11/2007 | Kaye | |
| 2008/0005838 | A1 | 1/2008 | Wan Fong et al. | |
| 2008/0063003 | A1* | 3/2008 | O'Neal | H04L 45/16 370/408 |
| 2008/0169931 | A1 | 7/2008 | Gentry et al. | |
| 2008/0235872 | A1* | 10/2008 | Newkirk | A61G 7/0524 5/658 |
| 2009/0302782 | A1 | 12/2009 | Smith | |
| 2010/0073168 | A1 | 3/2010 | Tallent et al. | |
| 2010/0146709 | A1* | 6/2010 | Lafleche | A61G 7/05784 5/713 |
| 2011/0068928 | A1 | 3/2011 | Riley et al. | |
| 2011/0133935 | A1 | 6/2011 | Beltmann et al. | |
| 2011/0163885 | A1 | 7/2011 | Poulos et al. | |
| 2012/0023670 | A1 | 2/2012 | Zerhusen et al. | |
| 2012/0089419 | A1* | 4/2012 | Huster | A61G 7/015 705/3 |
| 2012/0110735 | A1 | 5/2012 | Andrienko et al. | |
| 2012/0312196 | A1 | 12/2012 | Newkirk | |
| 2013/0219622 | A1 | 8/2013 | Hornbach et al. | |
| 2013/0227787 | A1* | 9/2013 | Herbst | A61G 7/1067 5/618 |
| 2013/0340169 | A1* | 12/2013 | Zerhusen | A61G 7/053 177/144 |
| 2014/0062342 | A1 | 3/2014 | Murphy | |
| 2014/0257571 | A1 | 9/2014 | Chen et al. | |
| 2014/0259410 | A1 | 9/2014 | Zerhusen et al. | |
| 2014/0265181 | A1 | 9/2014 | Lambarth et al. | |
| 2014/0292529 | A1 | 10/2014 | Zerhusen | |
| 2014/0313700 | A1 | 10/2014 | Connell et al. | |
| 2014/0323816 | A1 | 10/2014 | Soderberg et al. | |
| 2014/0375451 | A1 | 12/2014 | Douglas et al. | |
| 2015/0137833 | A1 | 5/2015 | Chacon et al. | |

FOREIGN PATENT DOCUMENTS

| | | | |
|---|---|---|---|
| JP | 10315874 | A | 12/1998 |
| JP | 2002044214 | A | 2/2002 |
| JP | 2003524483 | A | 8/2003 |
| JP | 2011172913 | A | 9/2011 |
| JP | 2013013738 | A | 1/2013 |
| JP | 2013039300 | A | 2/2013 |
| WO | 2012139577 | A1 | 10/2012 |

OTHER PUBLICATIONS

"Connect to Wi-Fi on Your Iphone, IPad, or IPod Touch." Apple Support, Feb. 9, 2022, https://support.apple.com/en-US/HT202639#:~:text=1%20Go%20to%20Settings%20%3E%20Wi-Fi%2C%20and%20make,the%20password%20you%27ve%20entered%20is%20incorrect.%20See%20More. (Year: 2022).*

"Pair a Third-Party Bluetooth Accessory with Your Iphone or IPad." Apple Support, Oct. 31, 2022, https://support.apple.com/en-us/HT204091#:~:text=How%20to%20Pair%20a%20Bluetooth%20Accessory%20with%20iPhone,accessory%27s%20name%20when%20it%20appears%20onscreen.%20See%20More. (Year: 2023).*

"If Your IPad Won't Charge." Apple Support, Sep. 23, 2021, https://support.apple.com/en-us/HT211203#:~:text=If%20your%20iPad%20charges%20slowly%20or%20won%E2%80%99t%20charge.,%29.%205%20Force%20restart%20your%20iPad%3A%20See%20More. (Year: 2021).*

"If You See a Liquid-Detection Alert on Your Iphone." Apple Support, May 4, 2022, https://support.apple.com/en-us/HT210424. (Year: 2022).*

First Office Action, Related Chinese Patent Application No. 201680044452.7 based on PCT/US2016/034908, dated May 7, 2019, 15 pages.

PCT Search Report and Written Opinion for PCT/US2016/034908, completed Jul. 29, 2016.

Translation of First Office Action, Related Chinese Patent Application No. 201680044452.7 based on PCT/US2016/034908, dated May 7, 2019, 22 pages.

Office Action, Related Japanese Patent Application No. 2017-248916, based on PCT/US2016/034908, dated Dec. 25, 2018, (6 pages).

Office Action, Related Japanese Patent Application No. 2017-248916, based on PCT/US2016/034908, dated Oct. 15, 2019, (4 pages).

Translation of Office Action, Related Japanese Patent Application No. 2017-248916, based on PCT/US2016/034908, dated Dec. 25, 2018, (7 pages).

Translation of Office Action, Related Japanese Patent Application No. 2017-248916, based on PCT/US2016/034908, dated Oct. 15, 2019, (5 pages).

Extended EP Search Report, Related European Application No. 16804188.7, dated Jan. 31, 2019, 8 pages.

Communication pursuant to Article 94(3) EPC in the counterpart EP application No. 16 804 188.7-1113, 4 pages.

Notice of Refusal in Related Chinese Application 201680044452.7 dated Mar. 4, 2021, 7 pages.

English translation of Notice of Refusal in Related Chinese Application 201680044452.7 dated Mar. 4, 2021, 14 pages.

Office Action, Related Japanese Divisional Patent Application No. 2020-114736, based on PCT/US2016/034908, dated Oct. 22, 2021, (3 pages).

Translation—Related Japanese Divisional Patent Application No. 2020-114736, based on PCT/US2016/034908, dated Oct. 22, 2021, (4 pages).

Notification of Re-examination in related Chinese Application No. 201680044452.7, Oct. 18, 2022.

Notice of Re-examination issued in China for related Chinese Patent Application No. 201680044452.7, based on PCT/US2016/034908, dated Feb. 27, 2023 (11 pages).

* cited by examiner

FIG. 304
Service Connection
For Full Service Diagnostics,
plug phone or tablet into service port.
Back

FIG. 368
FIG. 369
Set up
Advanced therapy
Selected
Stop Therapy
Bluetooth
Set up
Connect wraps
Therapy begins
Automatically.
Stop Therapy
Bluetooth

FIG. 372
FIG. 373
Re initialization
Paused therapy
Press pause again
to continue therapy
Pause
Stop Therapy
Bluetooth
Re initialization
Therapy resumed
Stop Therapy
Bluetooth

FIG. 374
FIG. 375
Re initialization
Paused therapy
Press pause again
to continue therapy
Pause
Stop Therapy
Bluetooth
Re initialization
Therapy resumed
Stop Therapy
Bluetooth

PATIENT SUPPORT APPARATUS

CROSS-REFERENCE TO RELATED APPLICATIONS

This application is a continuation of U.S. application Ser. No. 16/727,136, filed Dec. 26, 2019, which was a continuation of U.S. application Ser. No. 15/577,581, filed on Nov. 28, 2017, now issued as U.S. Pat. No. 10,517,784, which was a U.S. national phase of PCT/US2016/034908, filed on May 29, 2016, which claims priority under 35 U.S.C. § 119 (e) to U.S. Provisional Application Ser. No. 62/168,596, filed May 29, 2015, U.S. Provisional Application Ser. No. 62/169,270, filed Jun. 1, 2015, U.S. Provisional Application Ser. No. 62/197,294, filed Jul. 27, 2015, U.S. Provisional Application Ser. No. 62/210,098, filed Aug. 26, 2015, U.S. Provisional Application Ser. No. 62/256,233, filed Nov. 17, 2015, U.S. Provisional Application Ser. No. 62/256,406, filed Nov. 17, 2015, U.S. Provisional Application Ser. No. 62/256,408, filed Nov. 17, 2015, and U.S. Provisional Application Ser. No. 62/300,340, filed Feb. 26, 2016 all of which are incorporated herein by reference in their entirety.

BACKGROUND

The present disclosure relates to patient support apparatuses. More specifically, the present disclosure relates to patient support apparatuses with improved functionality and usability.

There is an ongoing need to reduce the labor required for caregivers to deliver quality patient care. In addition, there is an ongoing need for the cost of healthcare to be reduced. Finally, the comfort of a person in an in-patient environment is directly related to their perception of the quality of their care and their recovery. A patient support apparatus that provides patient comfort, reduced cost, and improved caregiver efficiency addresses these needs.

SUMMARY

The present application discloses one or more of the features recited in the appended claims and/or the following features which, alone or in any combination, may comprise patentable subject matter:

According to a first aspect of the present disclosure, a patient support apparatus comprises a controller, a plurality of sensors coupled to the controller, and a notification system. The plurality of sensors coupled to the controller are each operable to provide a signal to the controller indicative of the status of a component of the patient support apparatus. The notification system is coupled to the controller and operable to process signals from the controller which provide an indication of the statuses of the components compared to established acceptable operating conditions, and, if the status of a particular component deviates from the established acceptable operating condition for that component, provides a visual indication of the deviation by illuminating a first iconic representation of the component in a first manner, if the status of the particular component does not deviate from the established acceptable operating condition for that component, illuminating the first iconic representation in a second manner.

In some embodiments, the notification system is operable to project the first iconic representation to a surface spaced apart from the patient support apparatus.

In some embodiments, the first iconic representation is simultaneously illuminated on a surface of the patient support apparatus and projected onto the surface spaced apart from the patient support apparatus.

In some embodiments, the first iconic representation is projected to the surface spaced apart from the patient support apparatus by a projector located on the patient support apparatus.

In some embodiments, illuminating the first iconic representation in a first manner comprises illuminating the first iconic representation in a first color and illuminating the first iconic representation in a second manner comprises illuminating the first iconic representation in a second color.

In some embodiments, providing the visual indication of the deviation includes simultaneously illuminating a first iconic representation of the component on a surface of the patient support apparatus in a first color and projecting the first iconic representation of the component on the surface spaced apart from the patient support apparatus in the first color.

In some embodiments, providing the visual indication of the lack of a deviation includes simultaneously illuminating a first iconic representation of the component on a surface of the patient support apparatus in a second color and projecting the first iconic representation of the component on the surface spaced apart from the patient support apparatus in the second color.

In some embodiments, providing the visual indication of the deviation includes simultaneously illuminating a first iconic representation of the component on a surface of the patient support apparatus in a first color and projecting the first iconic representation of the component on the surface spaced apart from the patient support apparatus in the first color.

In some embodiments, providing the visual indication of the lack of a deviation includes simultaneously illuminating a first iconic representation of the component on a surface of the patient support apparatus in a second color and projecting the first iconic representation of the component on the surface spaced apart from the patient support apparatus in the second color.

In some embodiments, the surface spaced apart from the patient support apparatus is the surface of a floor, the first iconic representation being projected to a position that is not directly below any portion of the patient support apparatus.

In another aspect of the present disclosure, an improved patient pendant for a patient support apparatus is ergonomically positioned. In some embodiments, the patient pendant may be positioned on a structure of a foot rail configured to orient the patient pendant to be seen and accessed while the patient is positioned on the patient support apparatus in a supine position. In other embodiments, the patient pendant may be positioned on a head siderail so as to be easily accessed by the patient supported on the patient support apparatus and a supine position. The patient pendant may include a spring-loaded grip which permits the patient pendant to be easily attached to a corresponding supporting structure on the patient support apparatus. In some embodiments, the patient pendant may be released by overcoming the spring force of the spring-loaded grip. In some embodiments, the patient pendant may be removed by sliding the patient pendant off of the supporting structure.

In another aspect of the present disclosure, a siderail of a patient support apparatus is configured to provide a storage space for personal items of a patient.

In still another aspect of the present disclosure, a patient support apparatus includes a patient-visible head angle indicator positioned on an interior surface of a head siderail of the patient support apparatus.

In yet another aspect of the present disclosure, a head siderail of a patient support apparatus includes an angled handle formed in a portion of the head siderail nearest the head end of the patient support apparatus, the angled handle configured to permit a patient to grip the angled handle to assist with repositioning the patient in the patient support apparatus.

In still yet another aspect of the present disclosure, a patient support apparatus includes an overhead arm with a reading light, a docking station for a smart phone or other personal digital assistant, a structure for docking the aforementioned patient pendant, and a USB charging port.

In a further aspect of the present disclosure, the patient support apparatus is configured to integrate with an electronic medical record system to permit hospital bed 10 side charting through a user interface on the patient support apparatus.

In another aspect of the present disclosure, a siderail of a patient support apparatus is configured to support a Pleur-evac device on the siderail to keep the Pleur-evac device from contacting the floor when the siderail is lowered and an upper frame of the patient support apparatus is in its lowest position.

In still another aspect of the present disclosure, a patient support apparatus includes an integrated sequential compression device module that is configured to operate disposable garments used for the treatment of deep vein thrombosis. In some embodiments, the integrated sequential compression device module is controlled by the control system of the patient support apparatus with the graphical user interface of the patient support apparatus being used to operate the sequential compression device module.

In a further aspect of the present disclosure, a siderail of the patient support apparatus includes a permanent structure configured to support and retain a hand urinal device for easy accessibility by a patient supported on the patient support apparatus. In some embodiments, the permanent structure is configured to prevent movement of the hand urinal device along the siderail when the hand urinal device is in a stowed position.

In a still further aspect of the present disclosure, the patient support apparatus includes a patient position monitoring system which is operable to predict patient exit. In some embodiments, the patient position monitoring system includes an audible alarm system which provides voice prompts. In some embodiments, the voice prompt may encourage the patient to stay in the patient support apparatus until assistance is received. In some embodiments, the voice prompt is "Please stay in hospital bed 10."

In yet another further aspect of the present disclosure, a patient support apparatus includes a one-button egress function which is operable, when activated by a caregiver, to place the patient support apparatus in an idealized configuration for permitting egress of a patient from the patient support apparatus. In some embodiments, deck sections of the patient support apparatus are placed in a predefined position when the one-button egress function is activated. In some embodiments, an upper frame of the patient support apparatus is placed in a predefined position when the one-button egress function is activated. In some embodiments, a portion of an inflatable patient support surface is placed in a predefined state when the one-button egress function is activated. In some embodiments, the seat section of an inflatable patient support surface is deflated when the one-button egress function is activated. In other embodiments, the seat section of an inflatable patient support surface is inflated to a maximum inflation state when the one-button egress function is activated.

In a still further aspect of the present disclosure, a patient support apparatus includes an illuminated patient egress handle. In some embodiments, when a patient position monitoring system is active but not alarming, the outside of a siderail egress handle will illuminate green. In some embodiments, when a patient position monitoring system is active and alarming, the outside of the siderail egress handle will illuminate and flash and amber color until the alarm condition is silenced by a caregiver. In some embodiments, a patient support apparatus may detect that a patient has left the patient support apparatus and illuminate the outside of a siderail egress handle a blue color, providing a nightlight for the patient, until the patient support apparatus detects that the patient has returned to the patient support apparatus.

In another aspect of the present disclosure, the patient support apparatus includes a Foley bag holder positioned on a articulating foot deck section of the patient support apparatus, the Foley bag holder being angled relative to the foot deck section such that when the foot deck section is in a declined orientation, the Foley bag holder supports a Foley bag in a vertical orientation, compensating for the angle of the foot deck section relative to horizontal.

In still yet another aspect of the present disclosure, the patient position monitoring system of the patient support apparatus cooperates wirelessly with a detector configured to be positioned on a chair in the patient room, the chair detector operable to automatically arm and utilize the patient position monitoring system of the patient support apparatus to alarm if the patient exits the chair.

In still yet a further aspect of the present disclosure, a patient support apparatus includes an incontinence detection system which cooperates with the patient position monitoring system to predict a patient exit condition. In some embodiments, the incontinence detection system will provide an alert that is transmitted to a caregiver or a caregiver workstation informing the caregiver of the likely exiting of the patient due to an incontinent event or the patients need to void.

In a still further aspect of the present disclosure, sensors of the patient support apparatus are used to detect vital signs of the patient supported on the patient support apparatus.

In another further aspect of the present disclosure, a patient support apparatus includes internal diagnostics and service prediction functionality which communicates remotely to inform a service system that service is required on the patient support apparatus.

In another aspect of the present disclosure, a patient support apparatus includes a built-in RFID reader.

In yet another aspect of the present disclosure, the patient support apparatus includes in panels with integrated slots that facilitate the storage of power cords and excess lengths of lines, such as those used by a sequential compression device or IV systems.

In another aspect of the present disclosure, a barrier of a patient support apparatus includes integrated features to facilitate the routing of clinical lines, such as IV lines, oxygen lines, gastric tube lines, or the like.

According to yet another aspect of the present disclosure, a patient support apparatus includes a frame, an air box, and a patient support structure. The patient support structure is supported by the frame which includes a head section, a foot section, and a seat section between the head section and foot section. The patient support structure further includes a cushion layer, an outer ticking layer, and a microclimate structure. The outer ticking layer includes an upper surface portion positioned to support a patient. The microclimate structure is positioned within the outer ticking layer and between the cushion layer and the upper surface portion. The microclimate structure includes an upper layer, a middle layer, and a lower layer. A material of at least a portion of the upper layer is vapor and liquid permeable, a material of the middle layer is air permeable, and a material of the lower layer is liquid impermeable.

In some embodiments, the microclimate structure extends from an upper end of the head section to a lower end of the seat section of the patient support structure, excluding the foot section of the patient support structure.

In some embodiments, the microclimate structure extends from an upper end of the head section to a lower end of the foot section of the patient support structure.

In some embodiments, the air box is further coupled to a conduit to conduct pressurized air through the microclimate structure.

In some embodiments, the vapor and liquid permeable portion of the upper layer of the microclimate structure defines a therapeutic region.

In some embodiments, the therapeutic region of the upper layer of the microclimate structure comprises a perforated material.

In some embodiments, the therapeutic region of the upper layer of the microclimate structure comprises a highly breathable, vapor and liquid permeable material.

In some embodiments, a non-therapeutic region of the upper layer of the microclimate structure comprises a vapor permeable but liquid impermeable material.

In some embodiments, the therapeutic region corresponds approximately to pelvic and torso regions of a supine patient substantially laterally centered on the seat section of the patient support structure.

In some embodiments, the middle layer of the microclimate structure comprises a three-dimensional material configured to conduct air between the upper layer and the lower layer of the microclimate structure.

In some embodiments, the middle layer of the microclimate structure comprises more than one section of the three dimensional material, in which at least one section of the three dimensional material conducts and delivers air along a therapeutic region.

In some embodiments, at least one of the sections of the middle layer of the microclimate structure is positioned at a foot section of the patient support structure and does not conduct air.

In some embodiments, the conduit is coupled to the bottom layer of the microclimate structure.

In some embodiments, the conduit is positioned at a lower end of the seat section of the patient support structure near a therapeutic region.

In some embodiments, the middle layer of the microclimate structure conduct air from the conduit to the therapeutic region of the microclimate structure, wherein the air generally flows predominantly laterally and longitudinally toward the head section of the patient support structure.

In some embodiments, the foot section of the microclimate structure comprises foam padding.

In some embodiments, the cushion layer includes a first inflatable support bladder and a second inflatable support bladder, and an air distribution sleeve extends between the first inflatable support bladder and the second inflatable support bladder.

In some embodiments, the cushion layer includes foam paddings.

In some embodiments, the outer ticking layer comprises a vapor permeable and liquid impermeable material.

In some embodiments, the outer ticking layer encases the microclimate structure.

In some embodiments, the outer ticking layer encases the microclimate structure and the cushion layer.

According to still another aspect of the present disclosure, a patient support structure includes a cushion layer and a microclimate structure. The microclimate structure is integrated atop the cushion layer. The microclimate structure further includes an upper layer, an air permeable middle layer, and a liquid impermeable lower layer. The upper layer includes a vapor and liquid permeable therapeutic region. The therapeutic region is arranged to underlie pelvic and torso regions of a patient lying supine on the patient support structure.

In some embodiments, the therapeutic region of the microclimate structure comprises a perforated material.

In some embodiments, the therapeutic region of the microclimate structure comprises a highly breathable, vapor and liquid permeable material.

In some embodiments, the middle layer of the microclimate structure comprises a three-dimensional material configured to conduct air between the upper layer and the lower layer of the microclimate structure.

In some embodiments, the middle layer of the microclimate structure comprises more than one section of the three dimensional material, in which at least one section of the three dimensional material conducts and delivers air along a therapeutic region.

In another aspect of the present disclosure, a patient support structure includes a microclimate structure including an upper layer, an air permeable middle layer, and a liquid impermeable lower layer. The upper layer has having a vapor and liquid permeable therapeutic region. The therapeutic region is shaped to underlie pelvic and torso regions of a patient lying supine on the patient support structure. The microclimate structure further receives air from a conduit coupled to the microclimate structure near the therapeutic region of the microclimate structure.

In still another aspect of the present disclosure a patient-support apparatus comprises a deck, a mattress, and a turning assembly interposed between the deck and the mattress. The turning assembly includes a plate structure having a lower plate, an intermediate plate pivotable relative to the lower plate about a first axis generally parallel to the longitudinal axis of the mattress, and an upper plate pivotable relative to the intermediate plate about a second axis generally parallel to the longitudinal axis of the mattress. The second axis is spaced apart from the first axis. The turning assembly further includes a first pair of bladders positioned between the lower plate and the intermediate plate and inflatable to cause rotation of the intermediate plate relative to the lower plate. The turning assembly also includes a second pair of bladders positioned between the intermediate plate and the upper plate and inflatable to cause rotation of the upper plate relative the intermediate plate.

In some embodiments, the lower plate and intermediate plate are coupled through a hinge.

In some embodiments, the intermediate plate and the upper plate are coupled through a hinge.

In some embodiments, each of the bladders is secured to a respective plate such that the bladder is fixed relative to the respective plate.

In some embodiments, each of the bladders of each of the first and second bladder pairs is fixed to a separate plate.

In some embodiments, neither a first bladder nor a second bladder of each bladder pair are coupled to the other of the first and second bladder such that there is freedom of movement between the first and second bladders as either of the first and/or second bladders are inflated.

In some embodiments, the intermediate plate does not engage either of the upper plate or lower plate.

In some embodiments, rotation of the intermediate plate relative to the lower plate causes rotation of the upper plate relative to the lower plate.

In some embodiments, rotation of the upper plate relative to the intermediate plate does not cause rotation of the intermediate plate relative to the lower plate.

In some embodiments, wherein each of the bladder is independently inflatable.

In some embodiments, the pressure in at least one of the bladders is monitored.

In some embodiments, the patient-support apparatus includes a user interface which allows a user to control the inflation of at least one of the bladders.

In some embodiments, the patient-support apparatus includes a user interface which allows a user to control the deflation of at least one of the bladders.

In some embodiments, at least one of the bladders is secured to at least one of the plates by a strap.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 111 is a side view of the pendant when the input surface of the pendant is facing up;

FIG. 112 is top view of the pendant;

FIG. 113 is a bottom view of the pendant;

FIG. 114 is perspective view of another embodiment of the mount positioned on a patient interface to hold the pendant at an alternative position;

FIG. 115 is a perspective view of an another embodiment of a pendant which includes a spring actuated clamping mechanism operable to secure the pendant to a mount;

FIG. 116 is a perspective view similar to FIG. 115 with portions removed;

FIG. 117 is a perspective view of a portion of another embodiment of a right siderail including a mount that is suitable for use with the pendant shown in FIG. 114;

FIG. 118 is an enlarged view of yet another mount positioned on an interior surface of a left head siderail of a patient support apparatus;

FIG. 119 is a perspective view from a foot end on the patient's right of a patient support apparatus including an air box and a patient support structure supported on a frame;

FIG. 120 is a top plan view of the patient support apparatus of FIG. 1 including a first embodiment of the microclimate structure of the patient support structure of FIG. 119 where a targeted therapeutic region extends from a head section through a seat section of the patient support structure, covering an entire upper surface of the microclimate structure;

FIG. 121 is a top plan view of the patient support apparatus of FIG. 119 including a second embodiment of the microclimate structure of the patient support structure of FIG. 119 with a targeted therapeutic region positioned in the seat section of the patient support structure;

FIG. 122 is a top plan view of the patient support apparatus of FIG. 119 including a third embodiment of the microclimate structure of the patient support structure of FIG. 119 with a targeted therapeutic region shaped to correspond to a patient's pelvic and torso regions;

Figure 1:
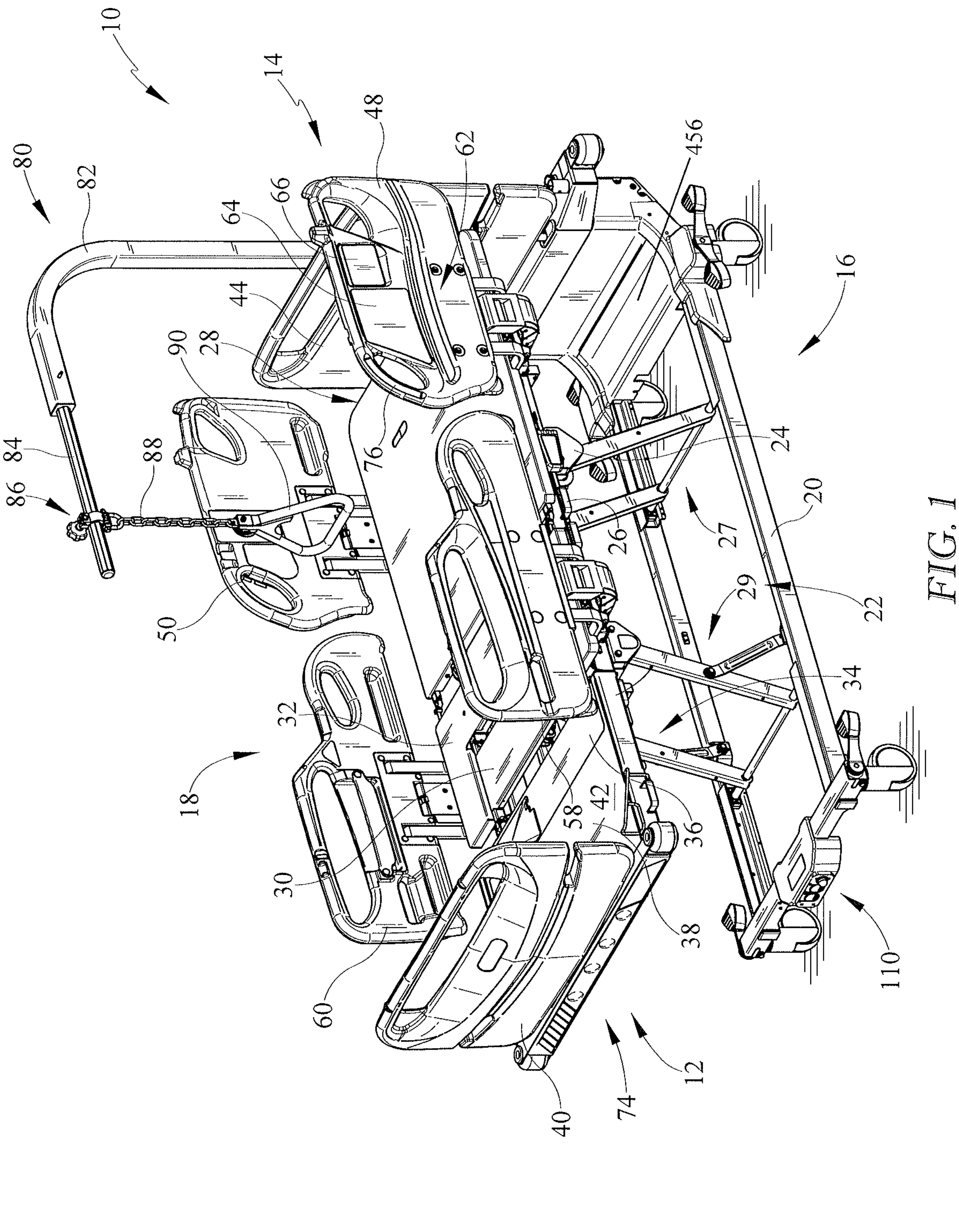
FIG. 1 is a perspective view from a patient's left side of a patient support apparatus illustratively embodied as a hospital bed 10.
Figure 8:
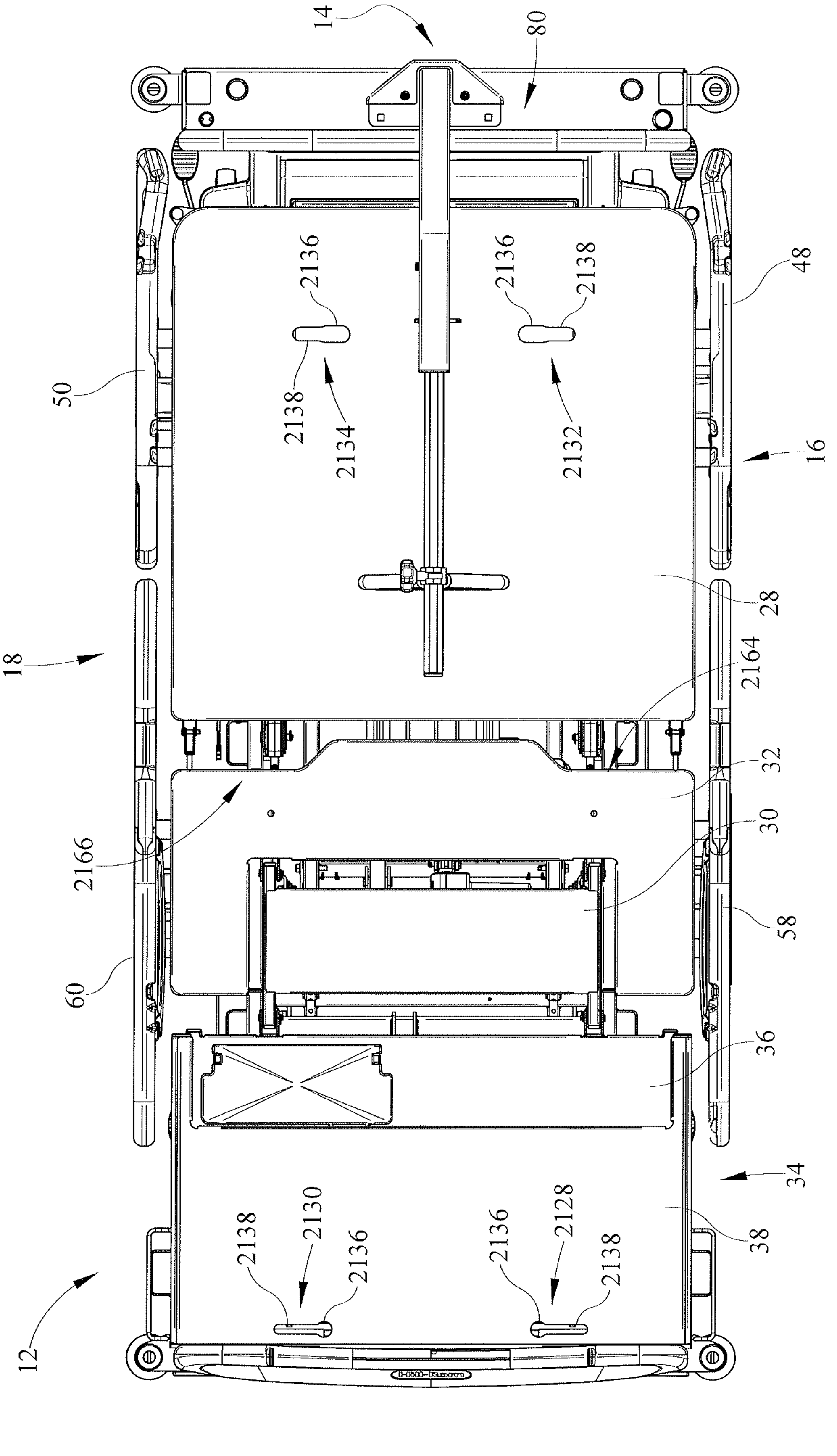
FIG. 8 is a plan view of the patient support apparatus of FIG. 1 as viewed from above.
Figure 67:
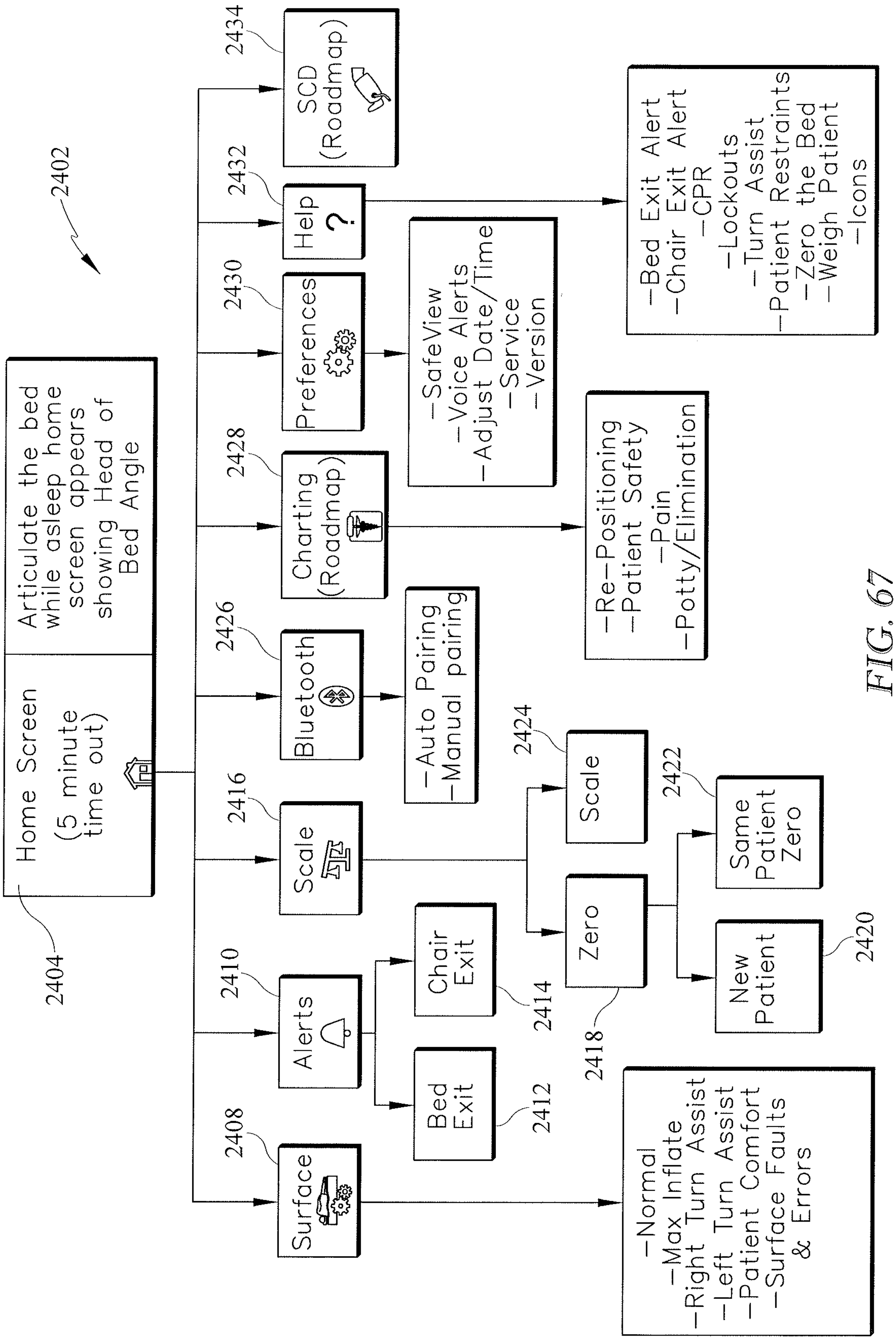
FIG. 67 is a diagrammatic representation of the menu structure is presented on a graphical user interface.
Figure 102:
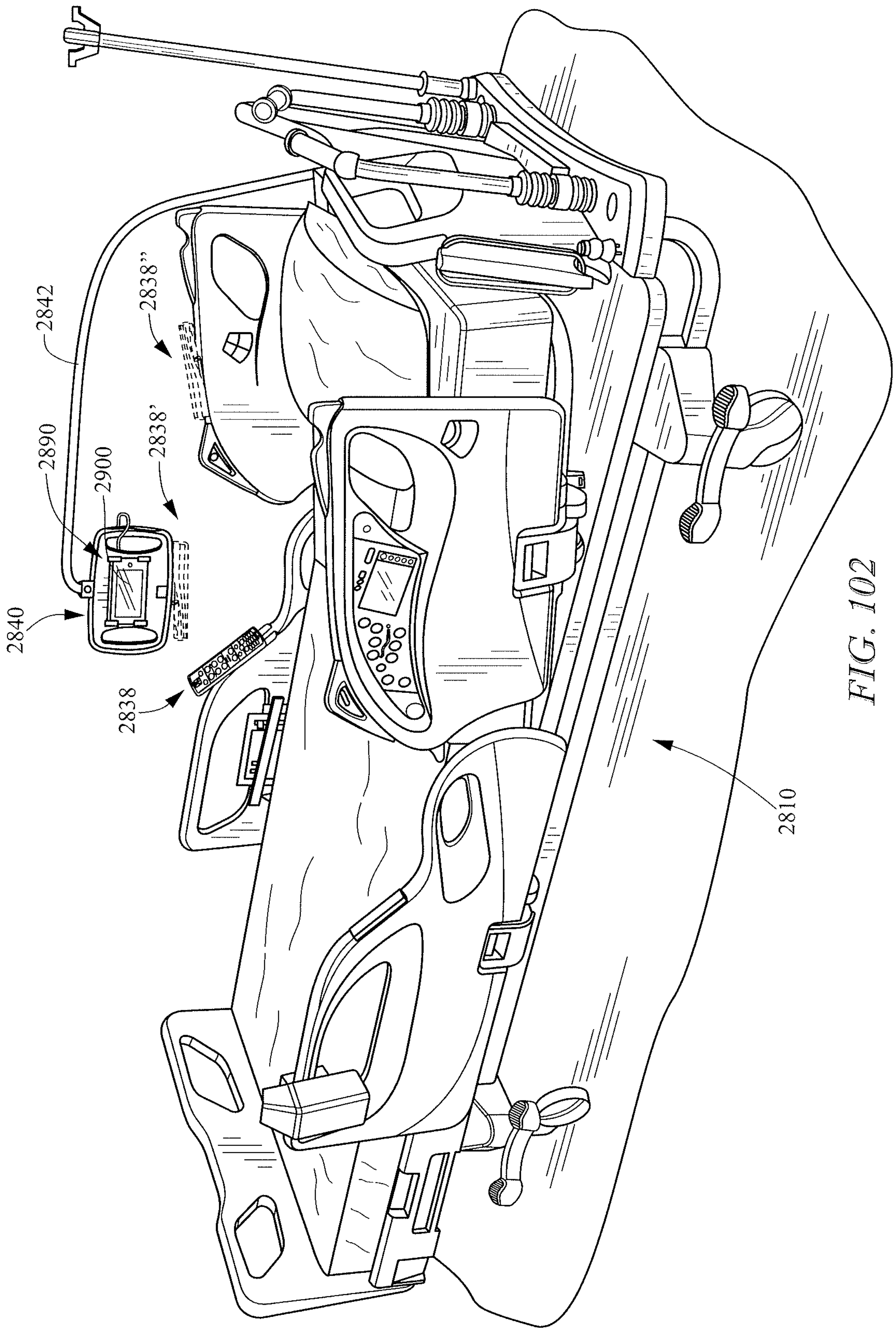
FIG. 102 is a perspective view from a head end on the patient's left of a patient support apparatus.
Figure 122:
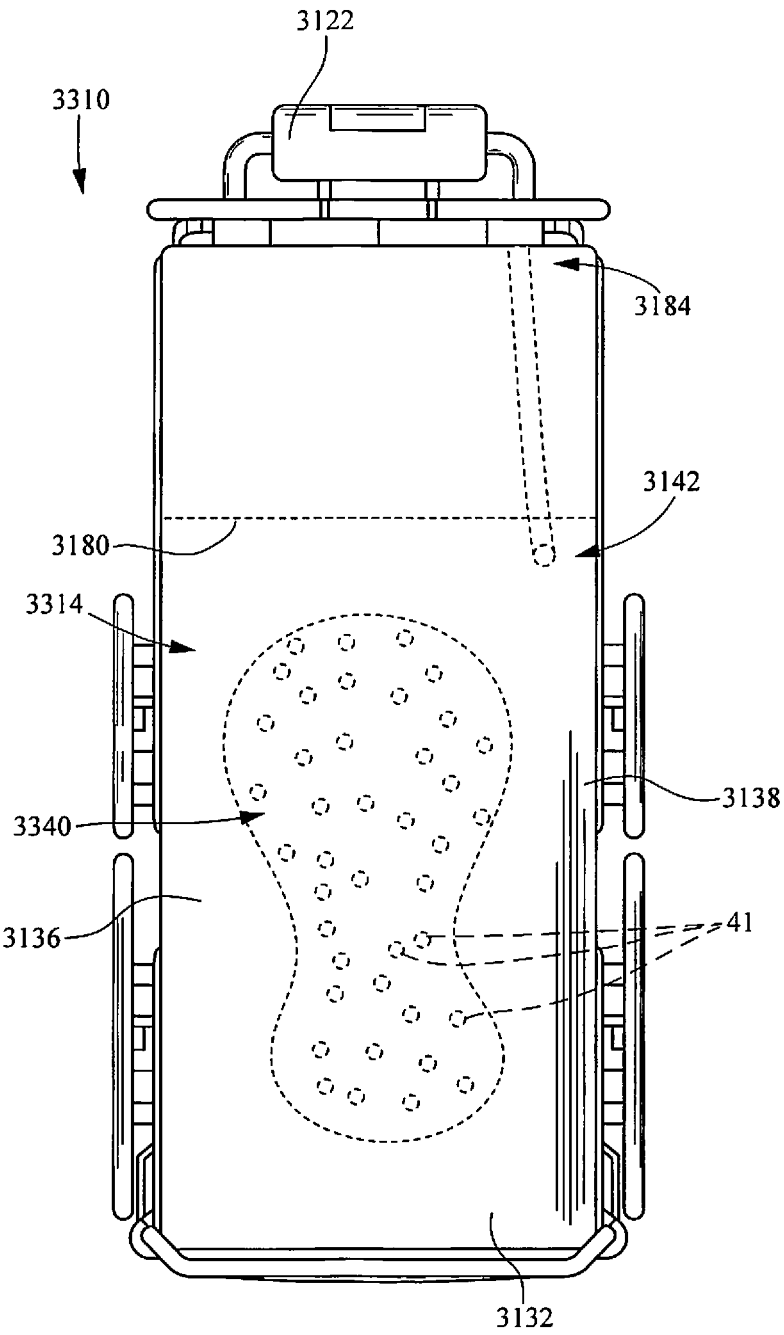
Figure 123:
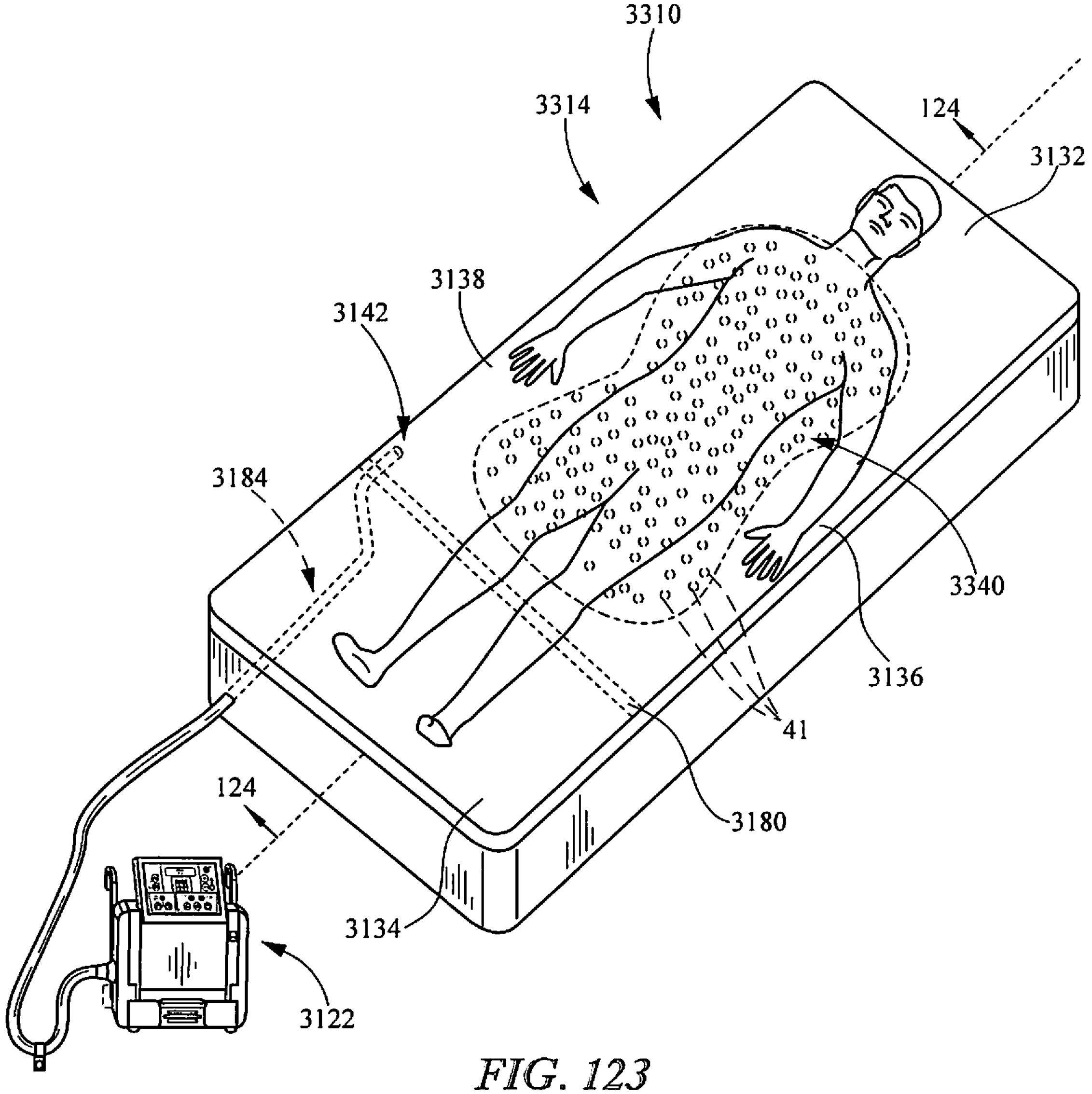
Figure 124:
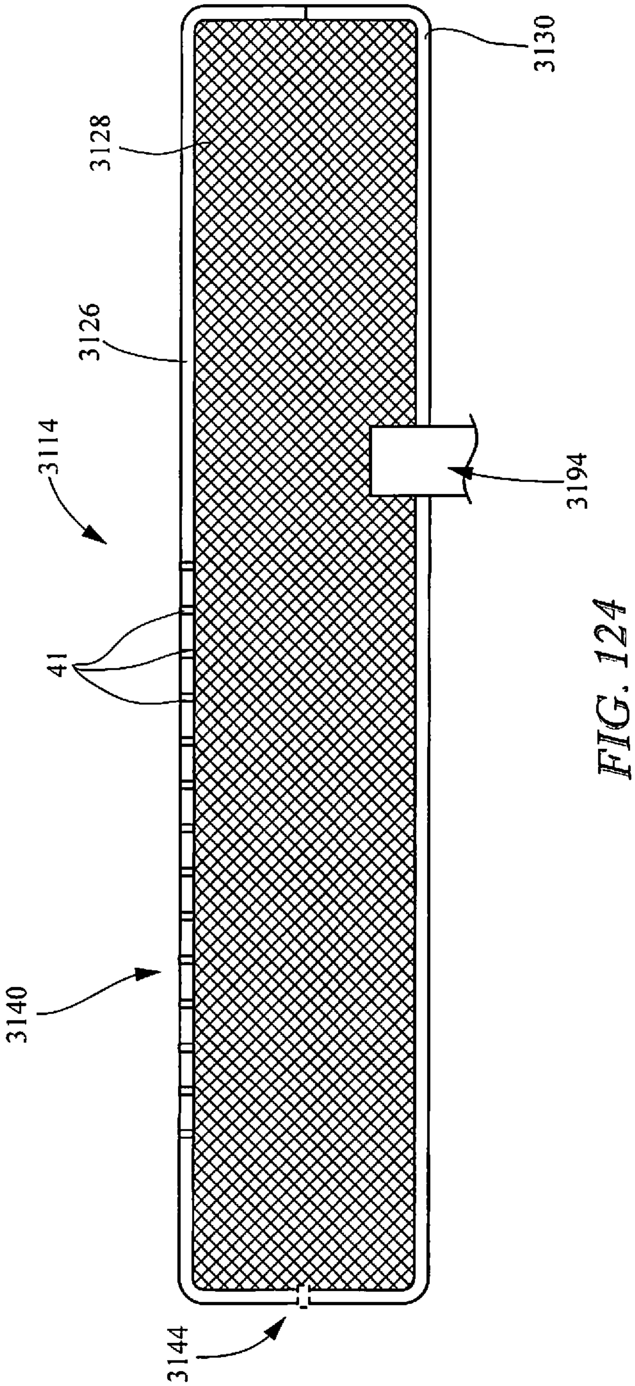
Figure 125:
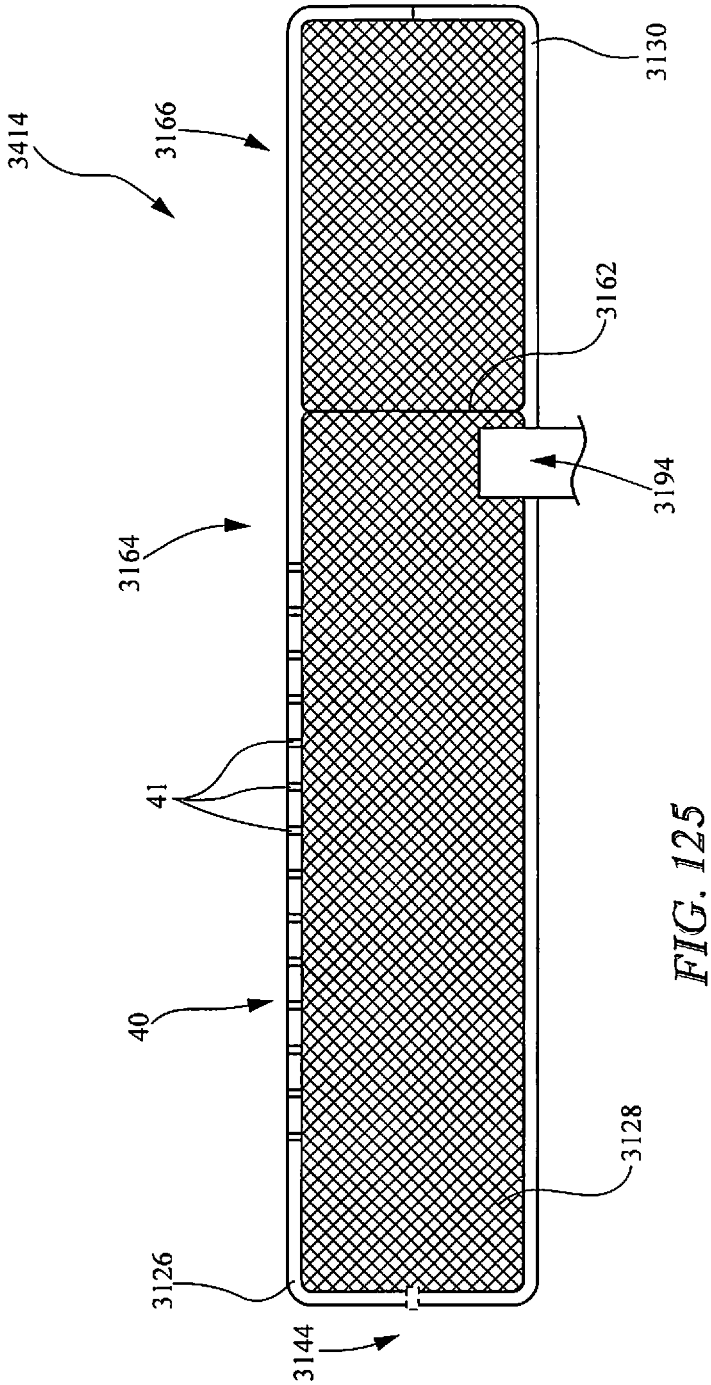
Figure 126:
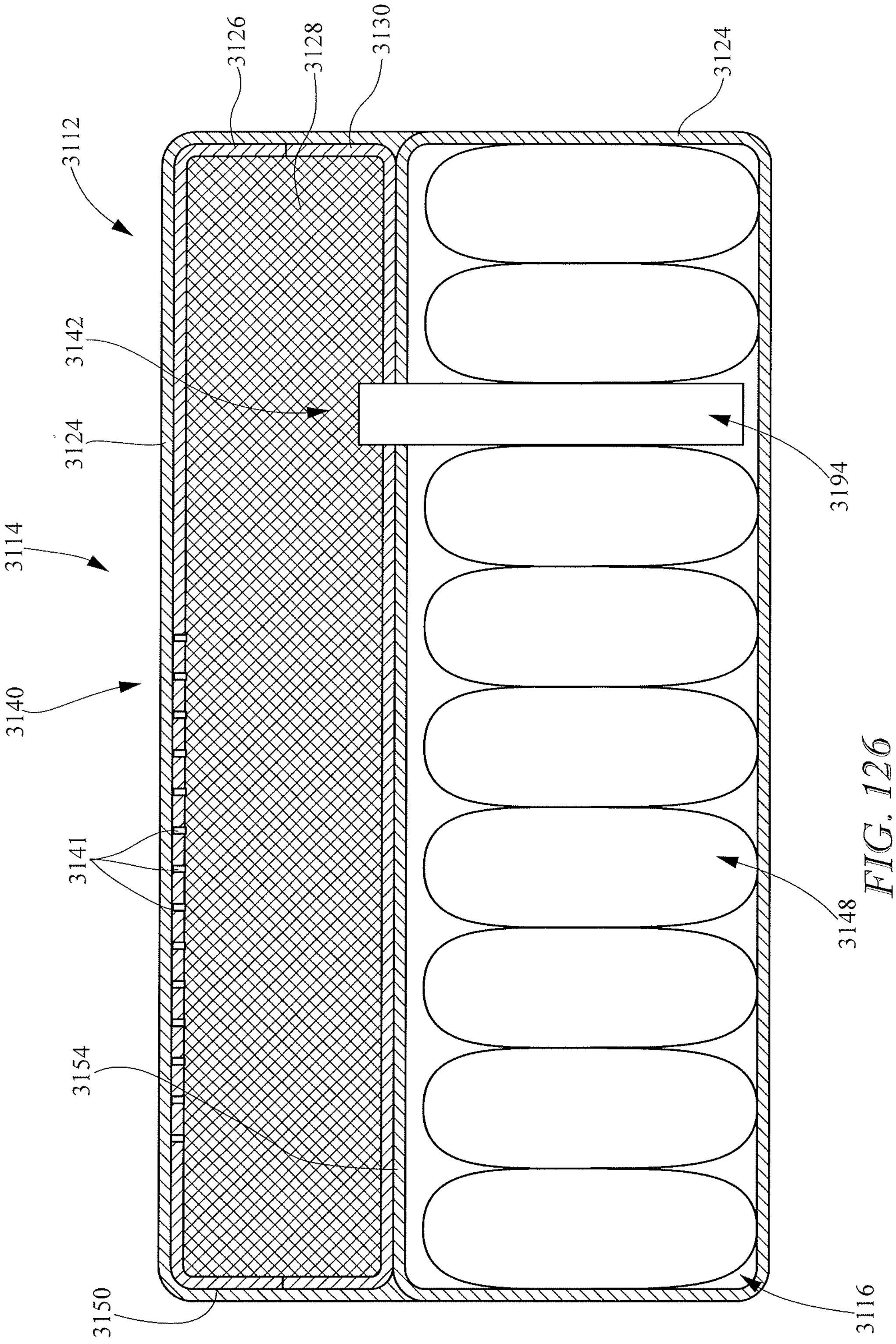
Figure 127:
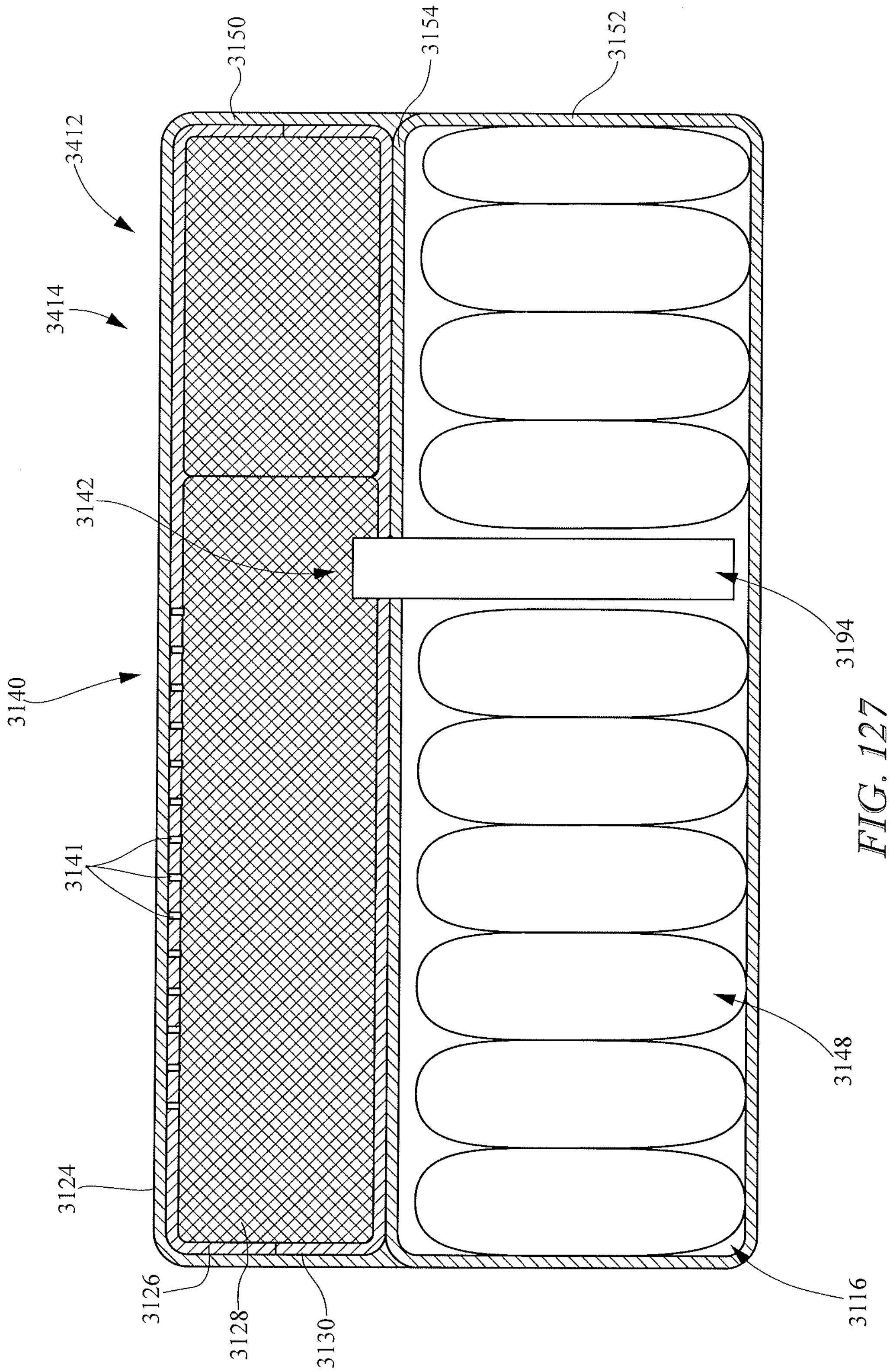
Figure 128:
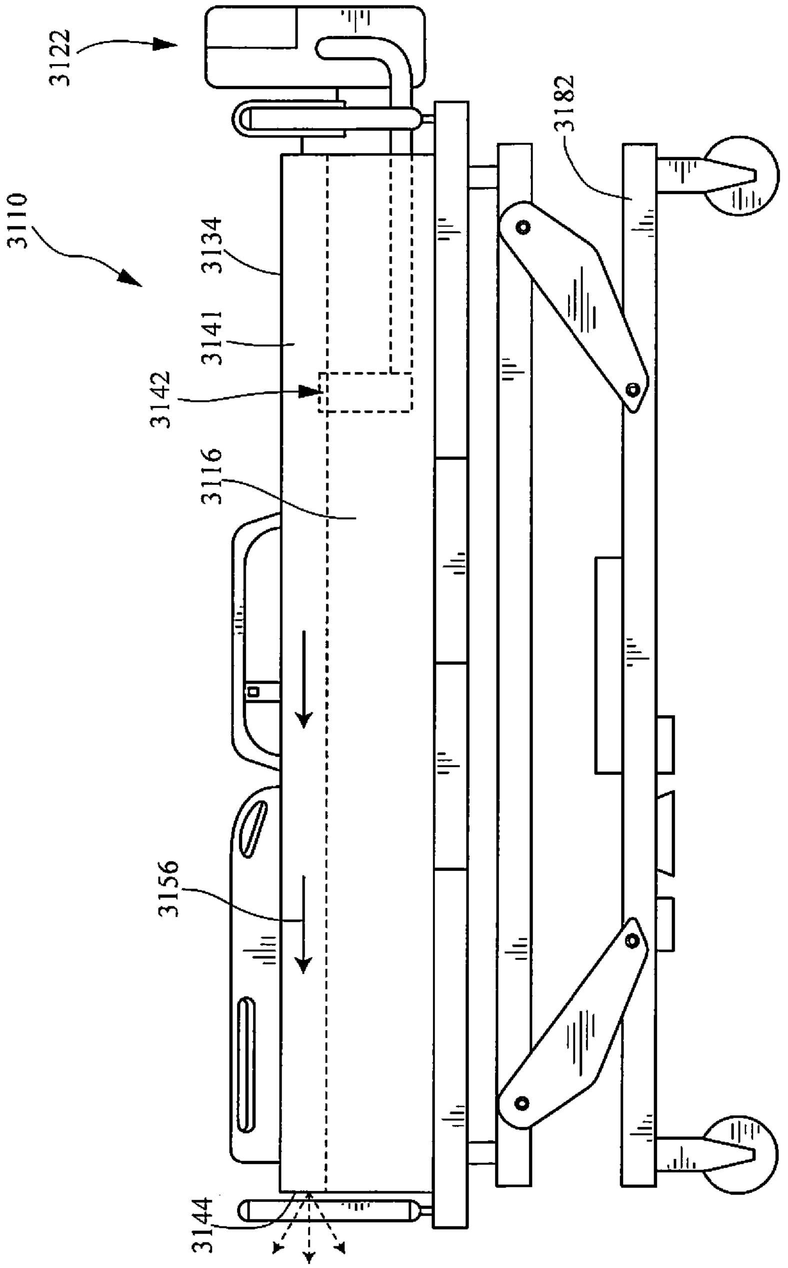
Figure 129:
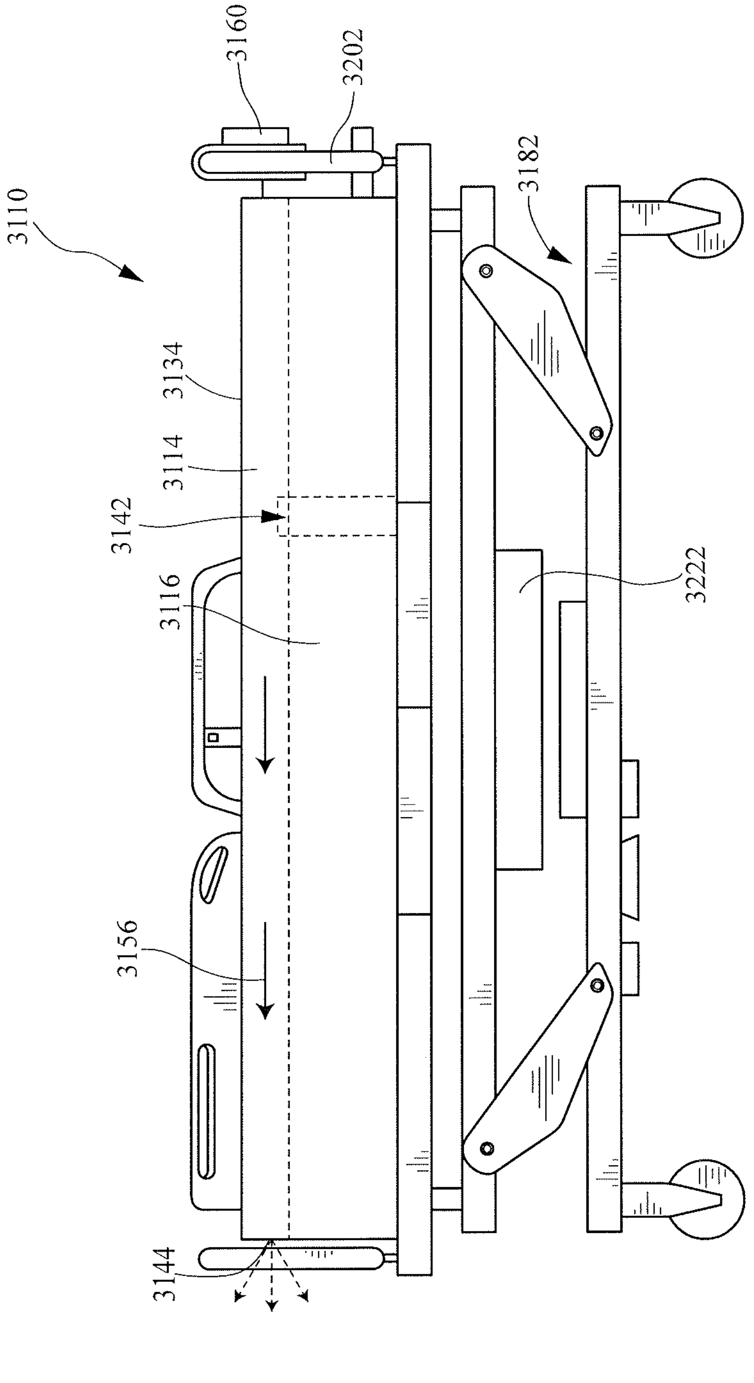
Figure 130:
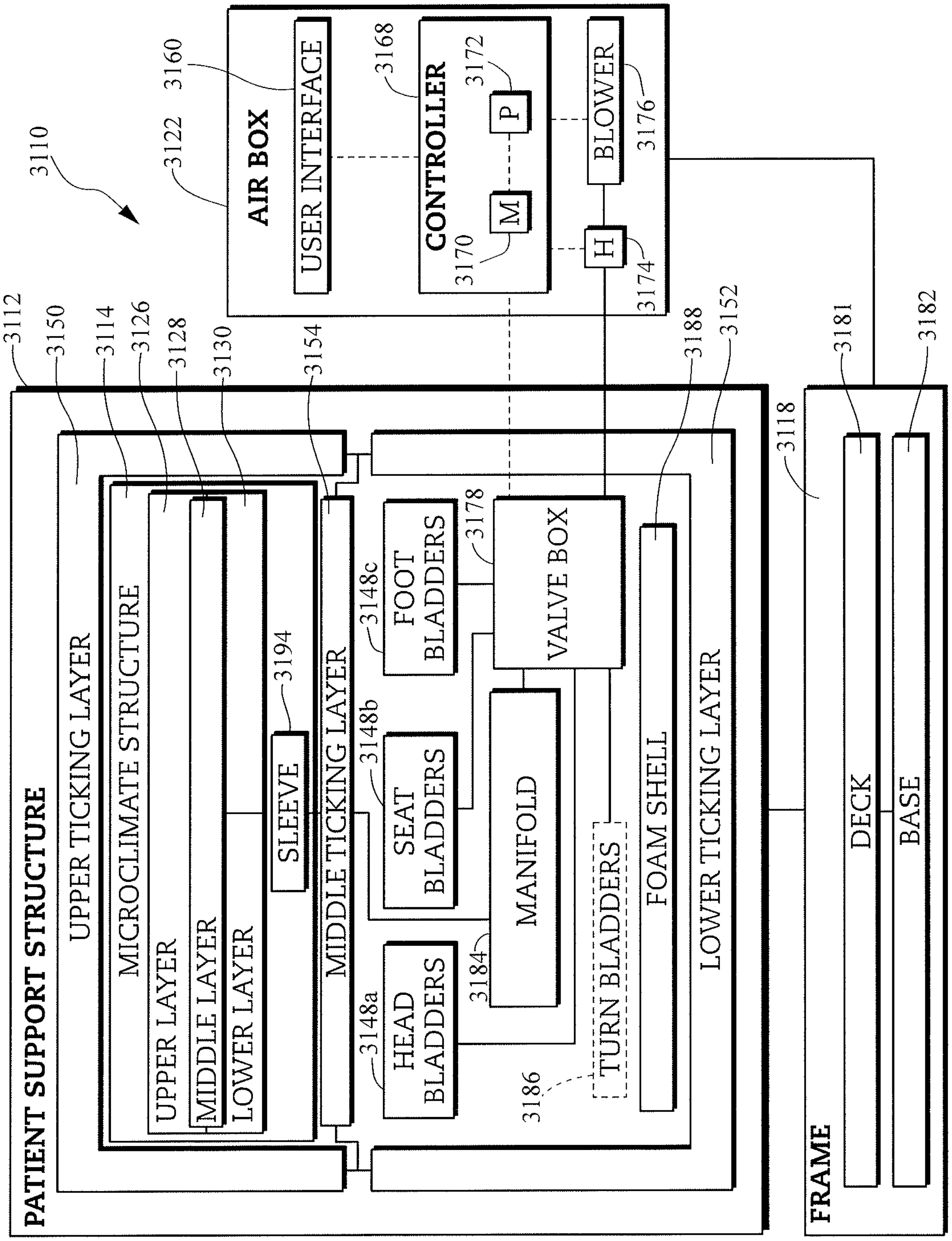
Figure 131:
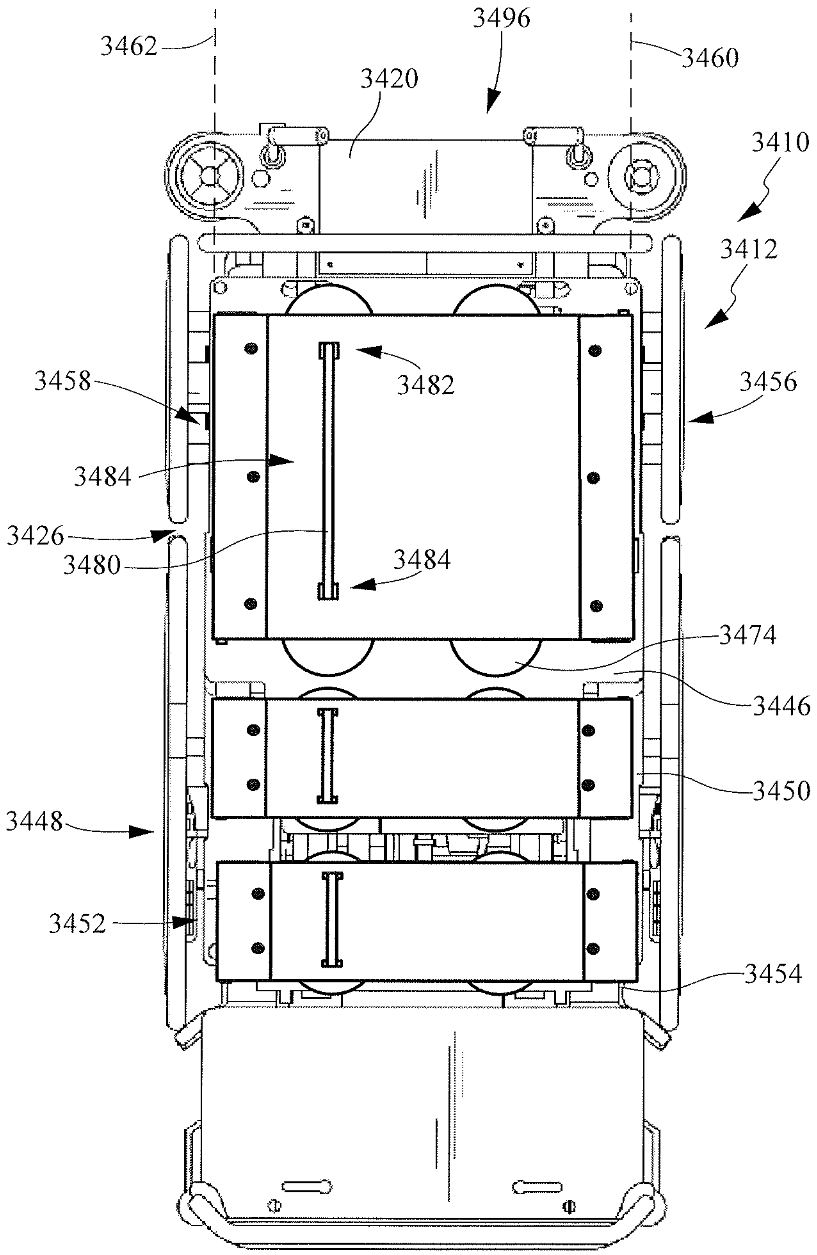
Figure 132:
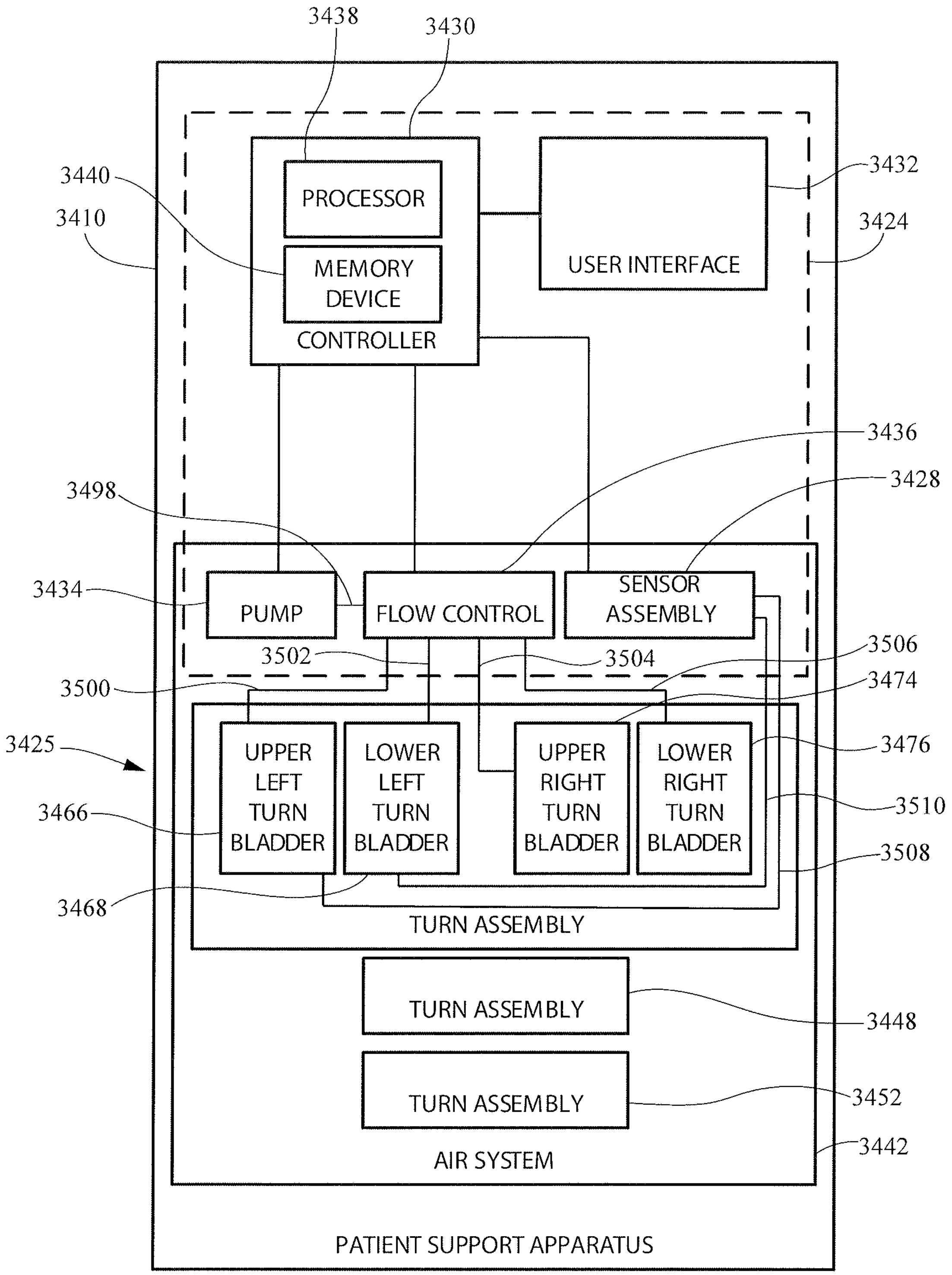
Figure 133:
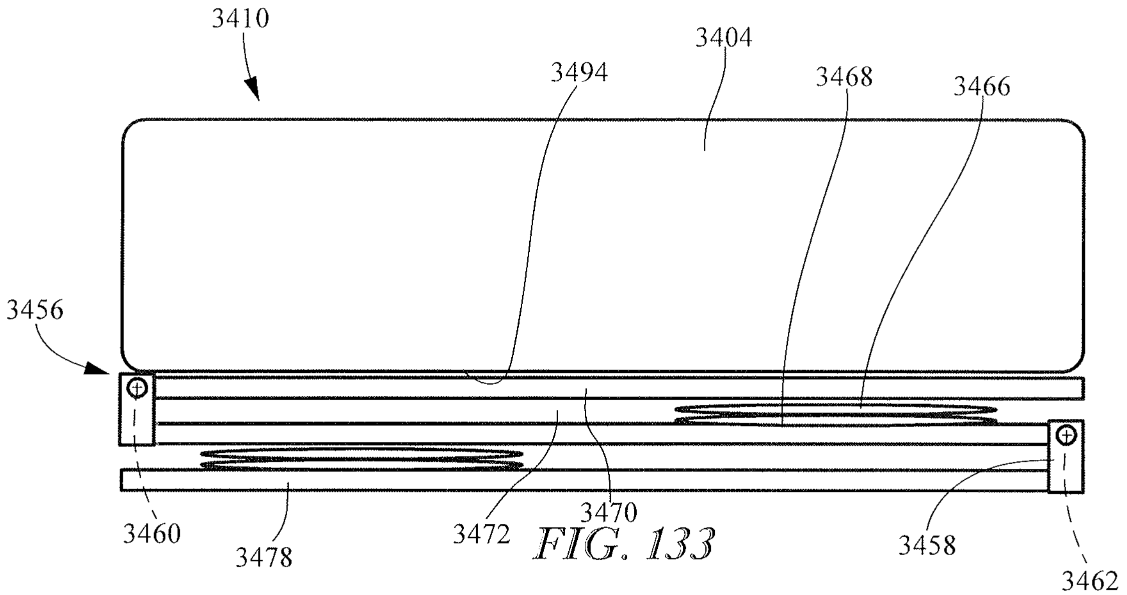
Figure 134:
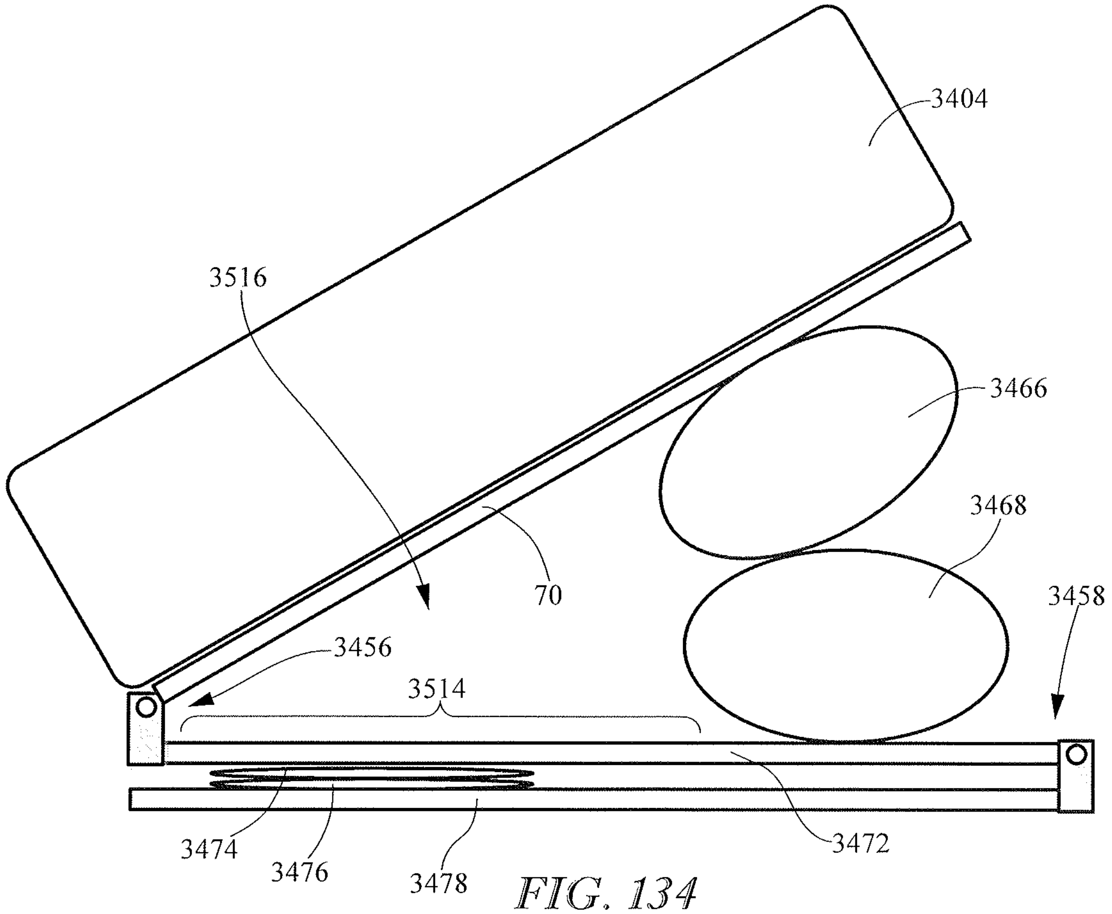
Figure 135:
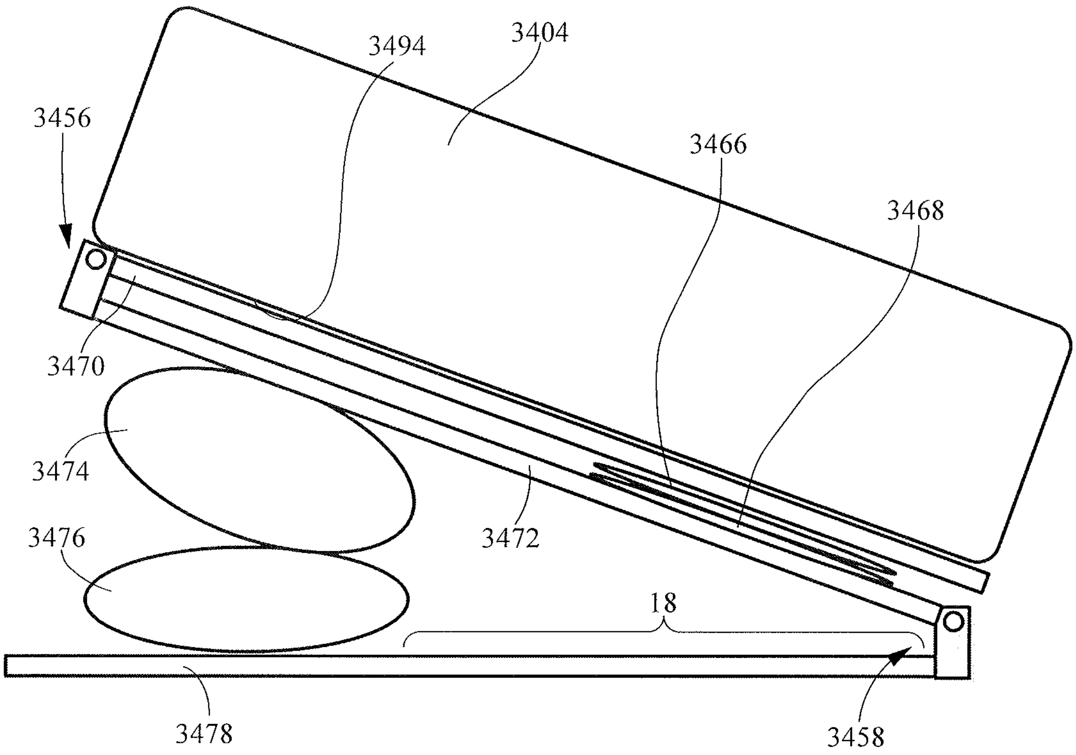
Figure 136:
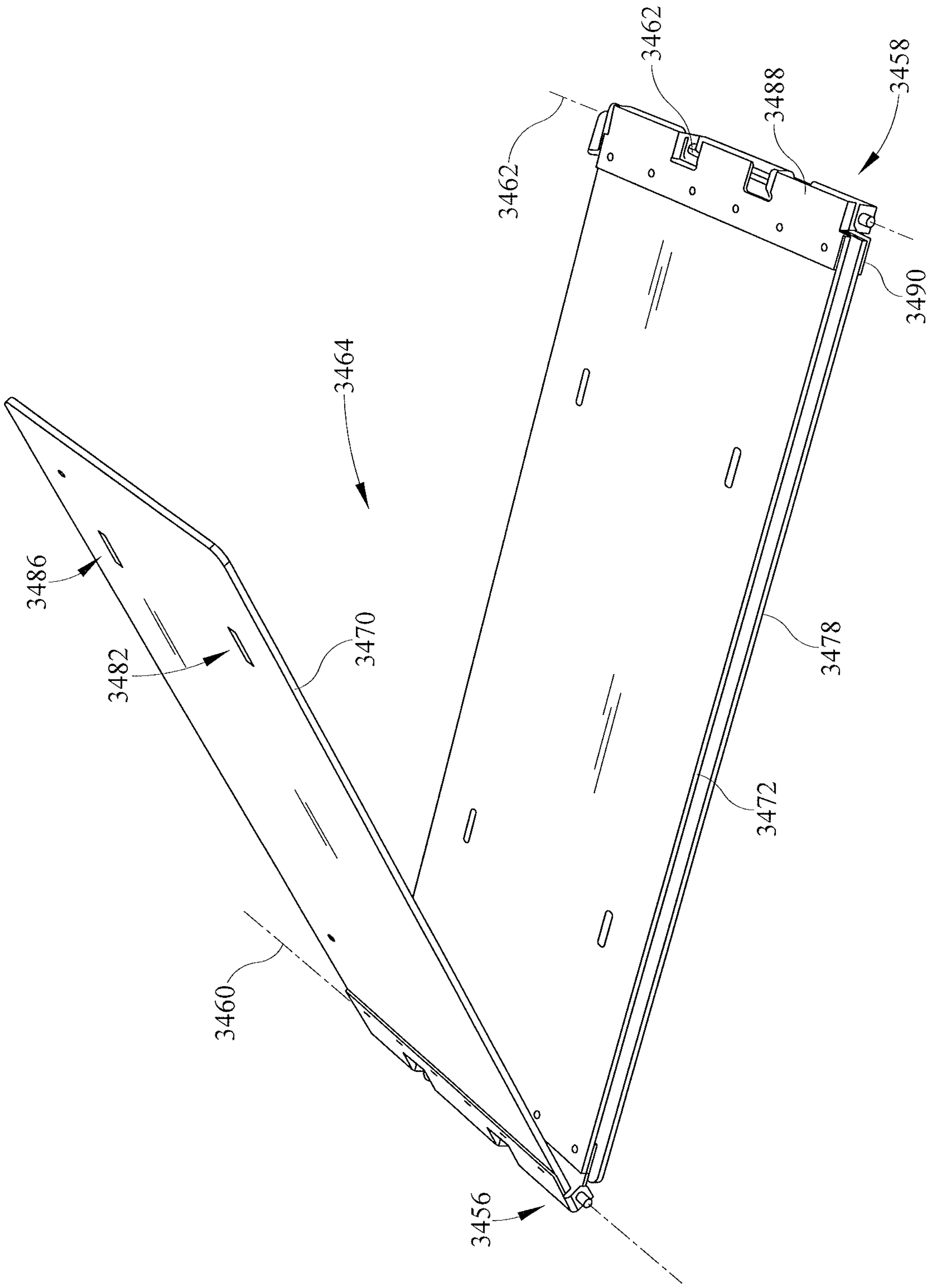
Figure 137:
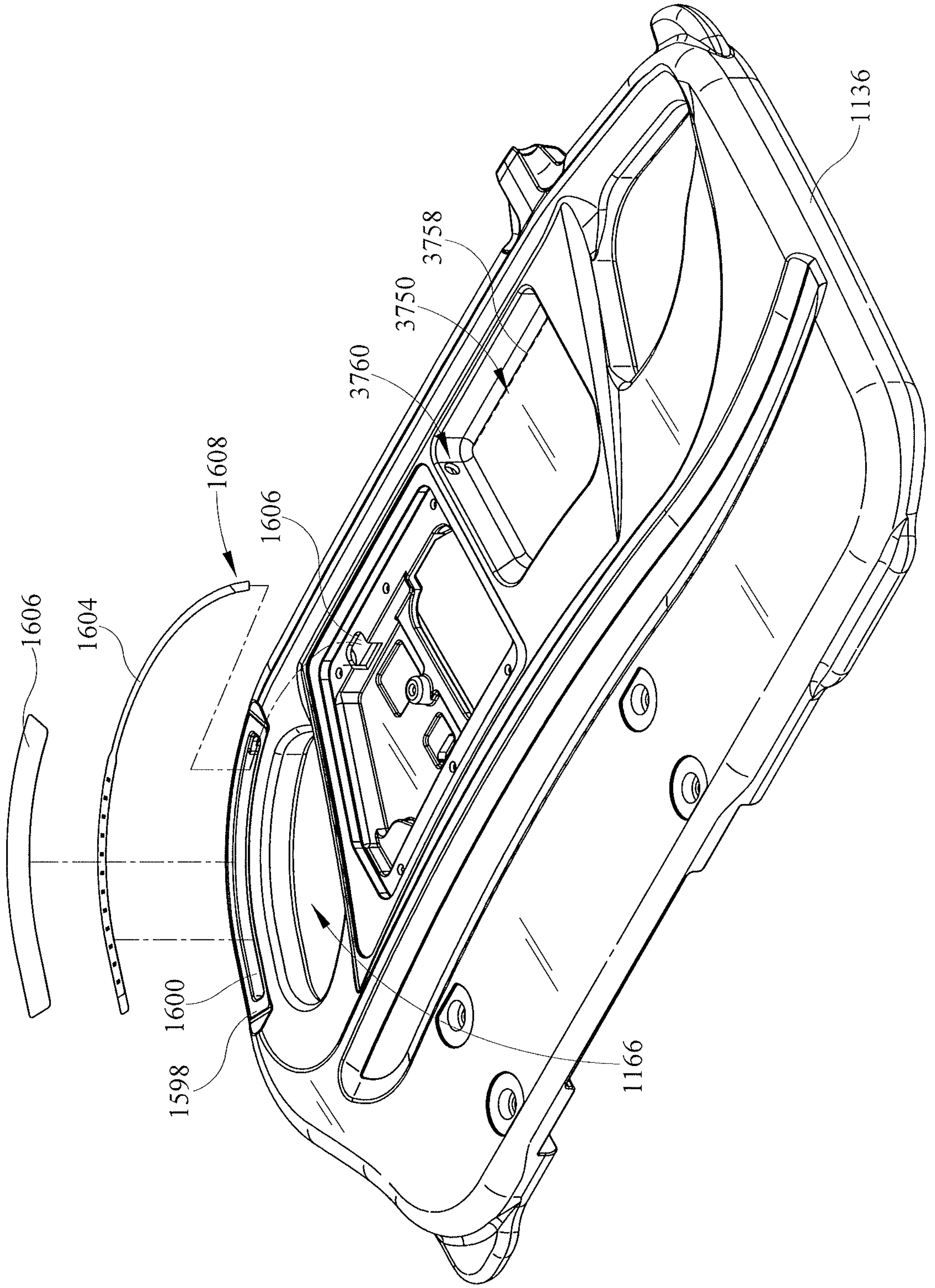
Figure 139:
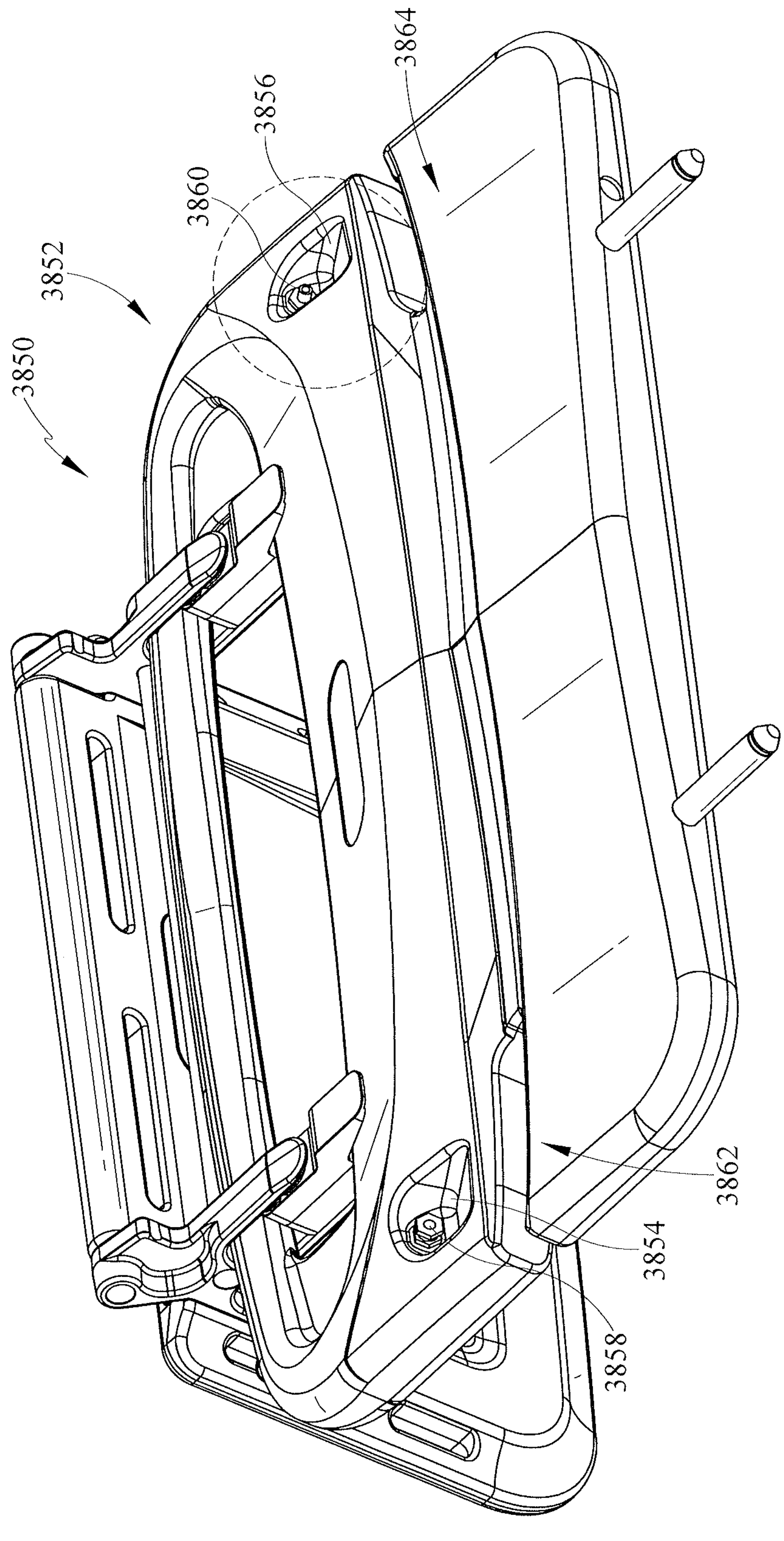
Figure 140:
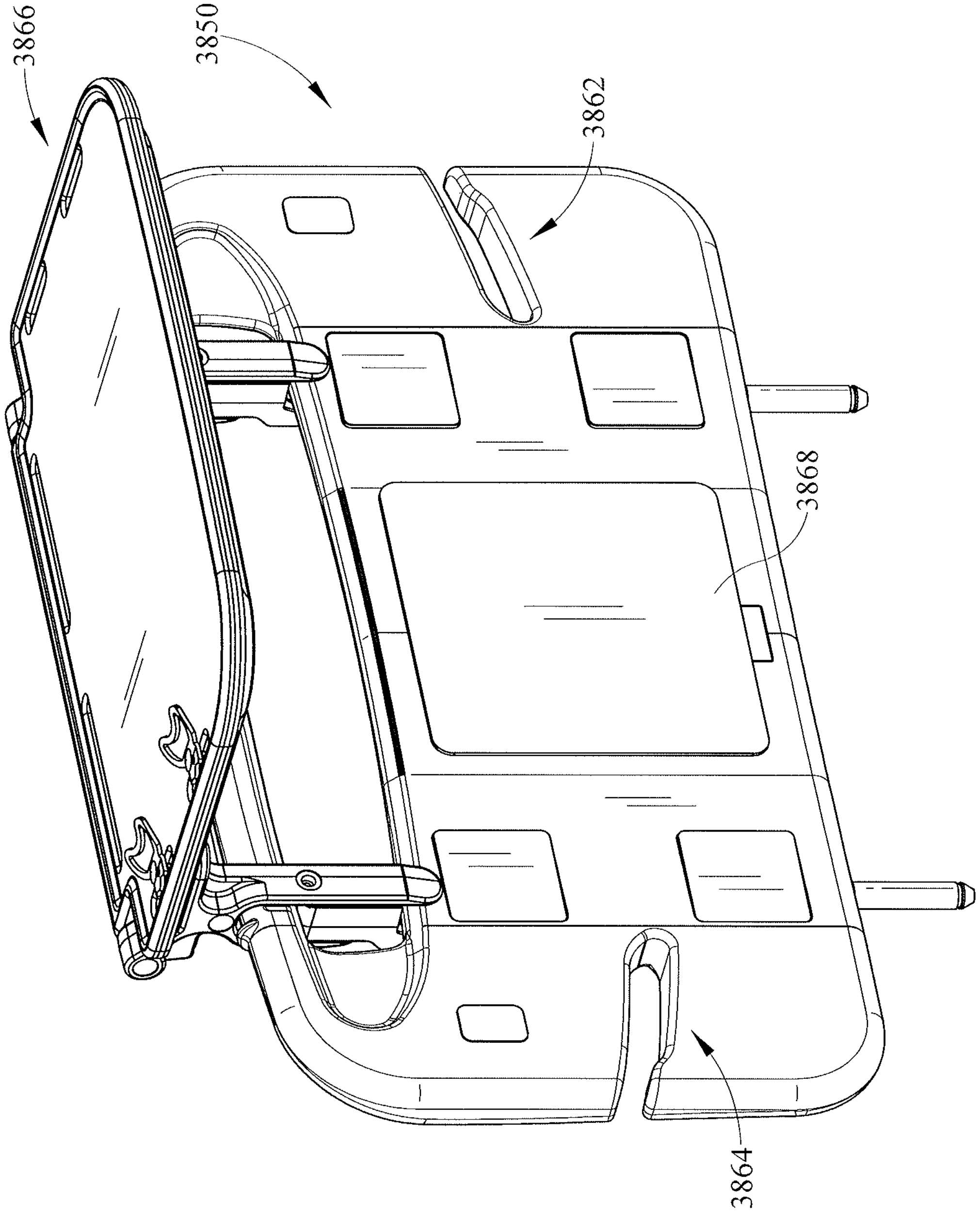
Figure 141:
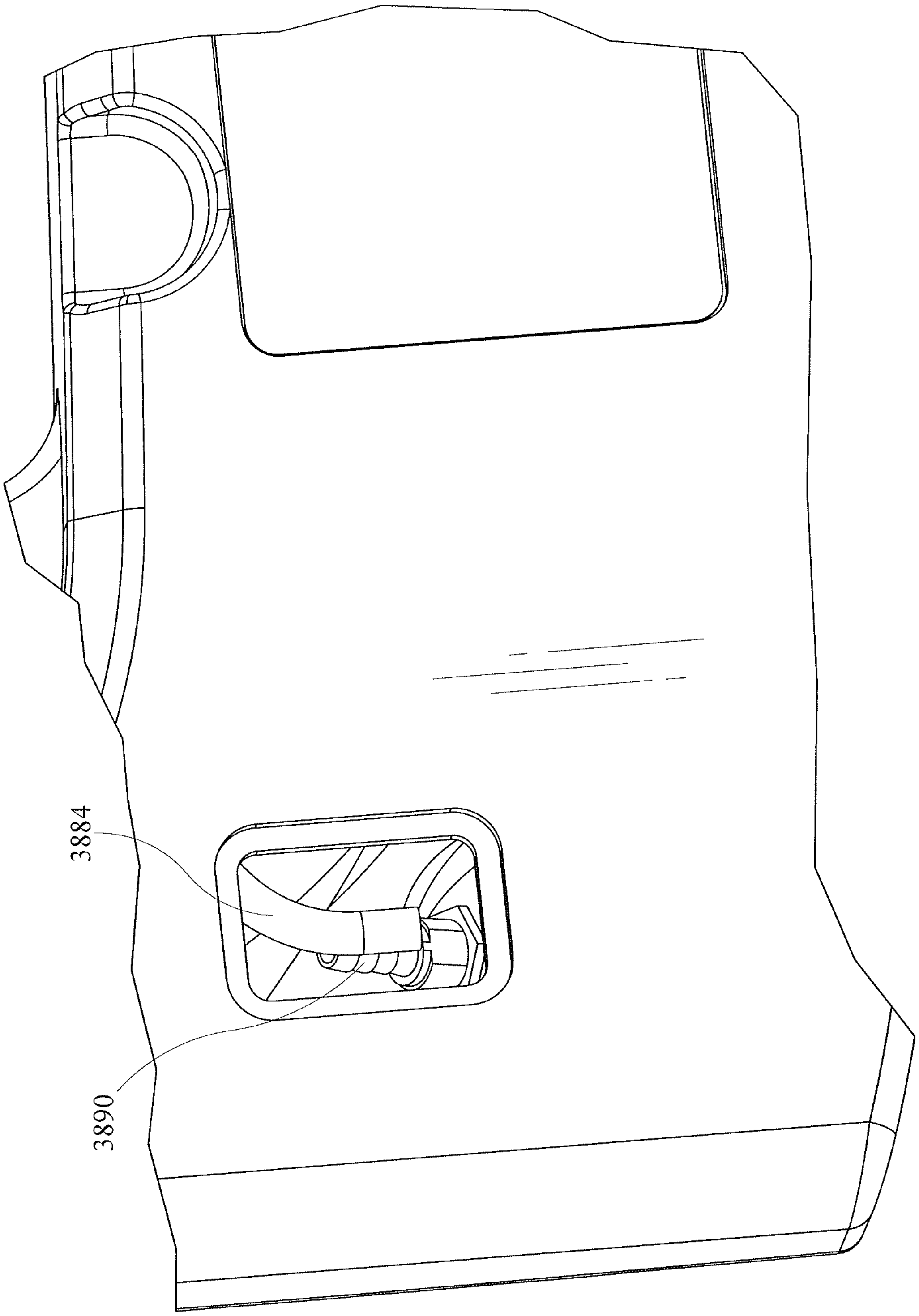
Figure 142:
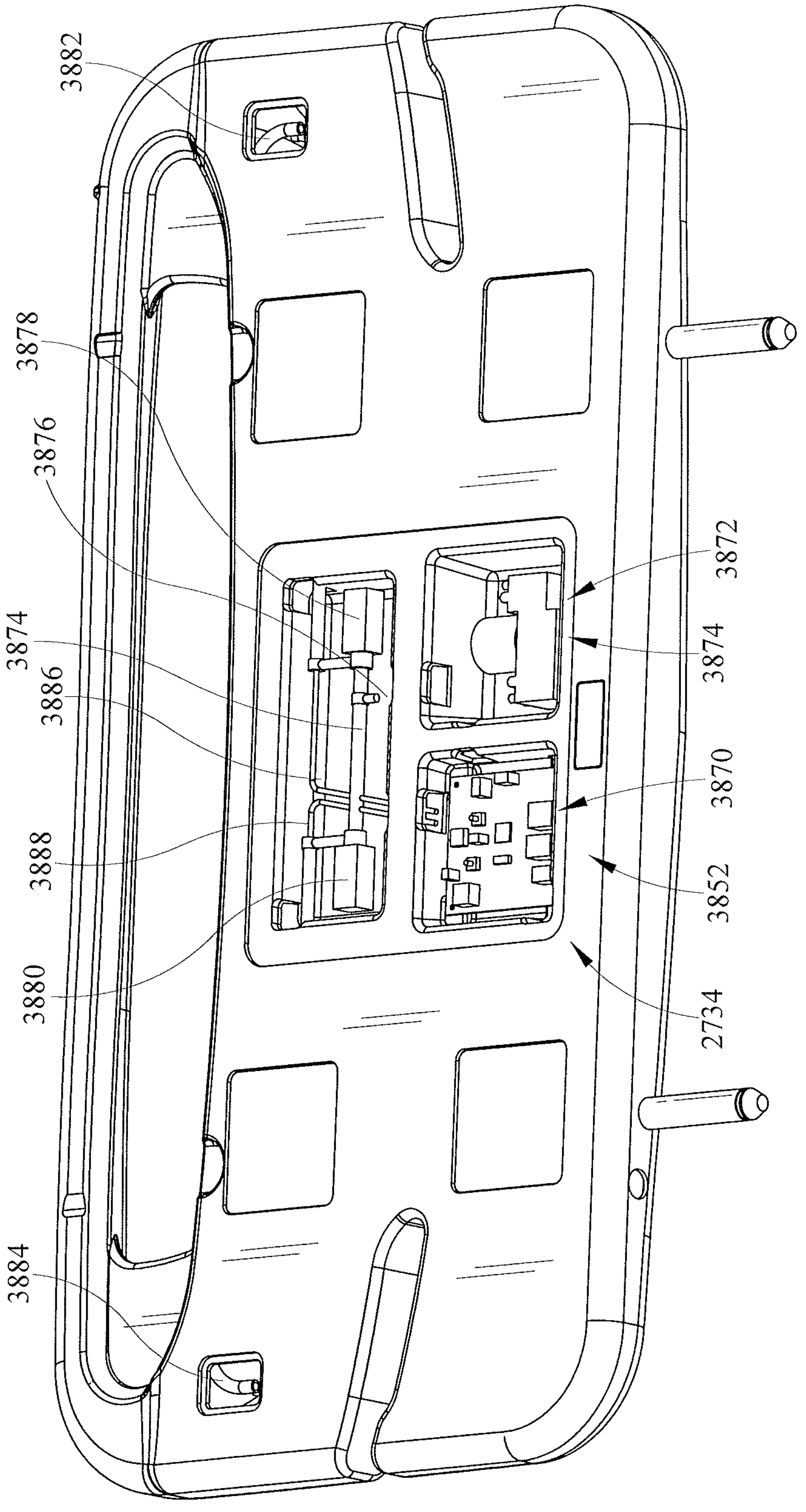
Figure 143:
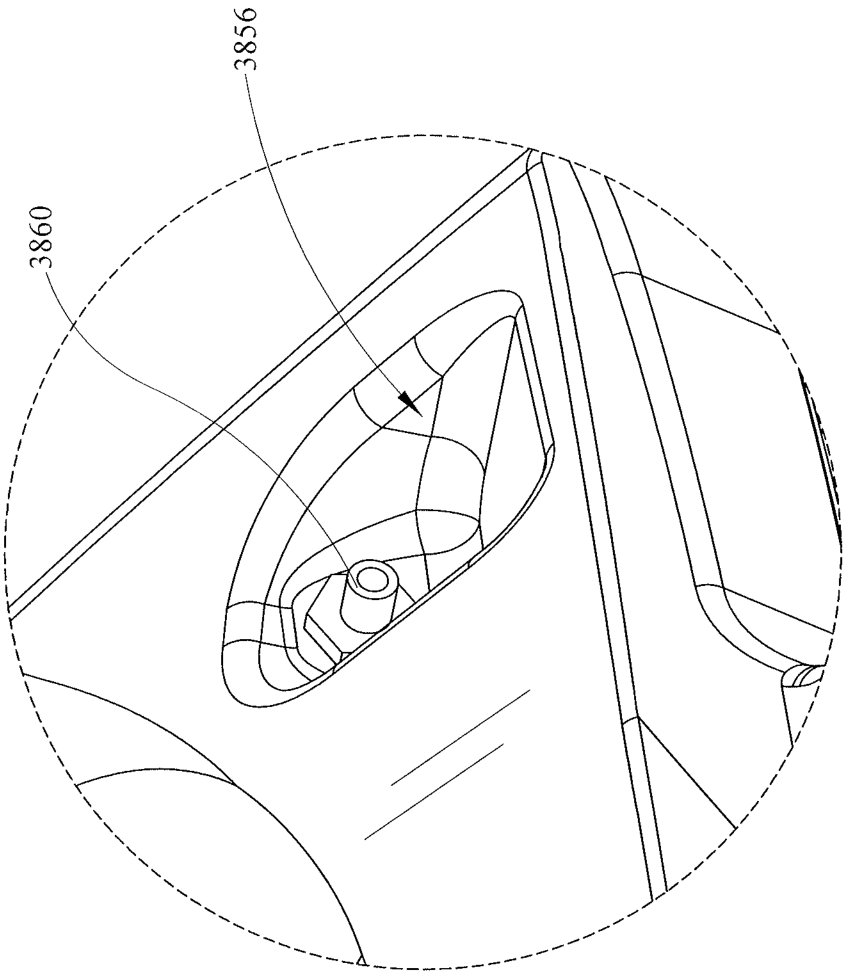
Figure 144:
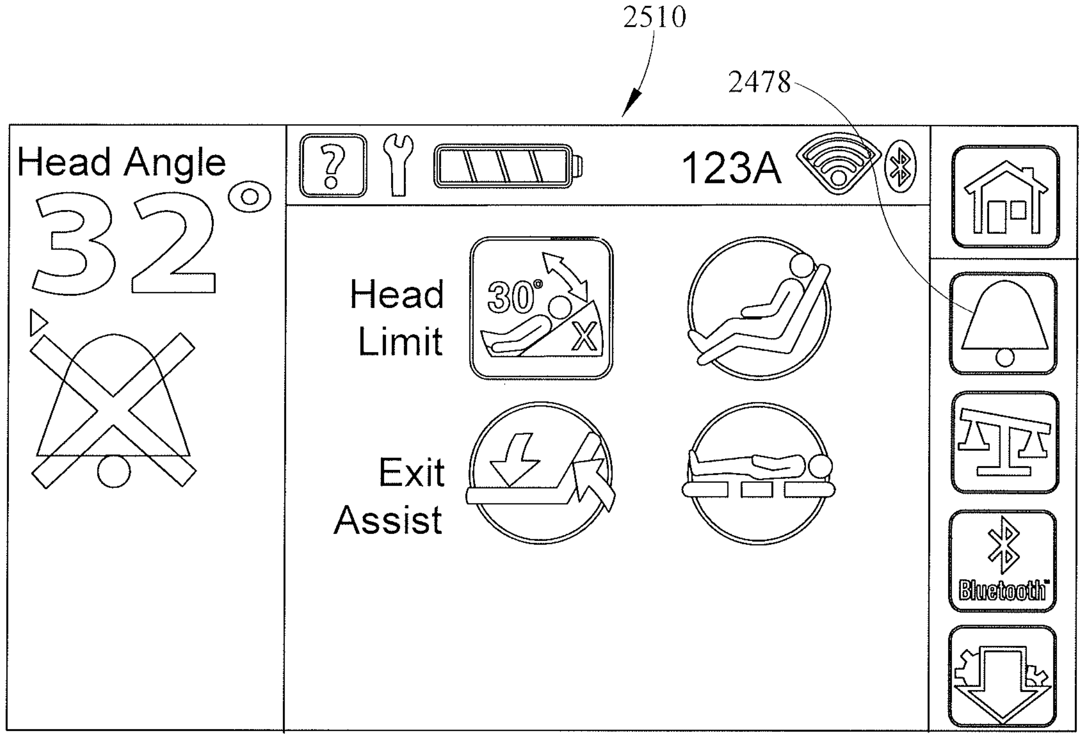
Figure 286:
Figure 287:
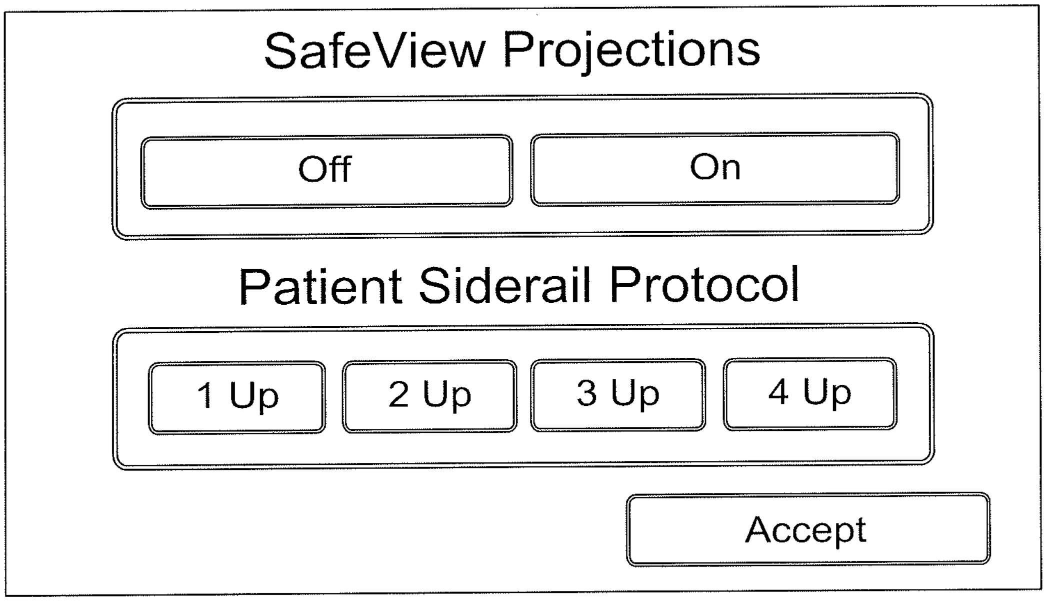
Figure 288:
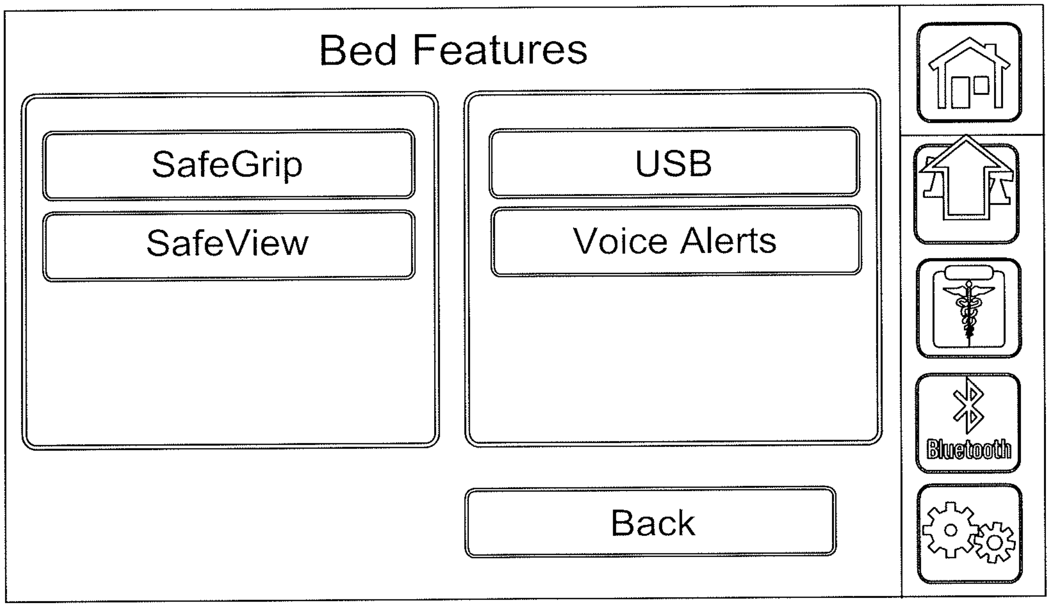
Figure 289:
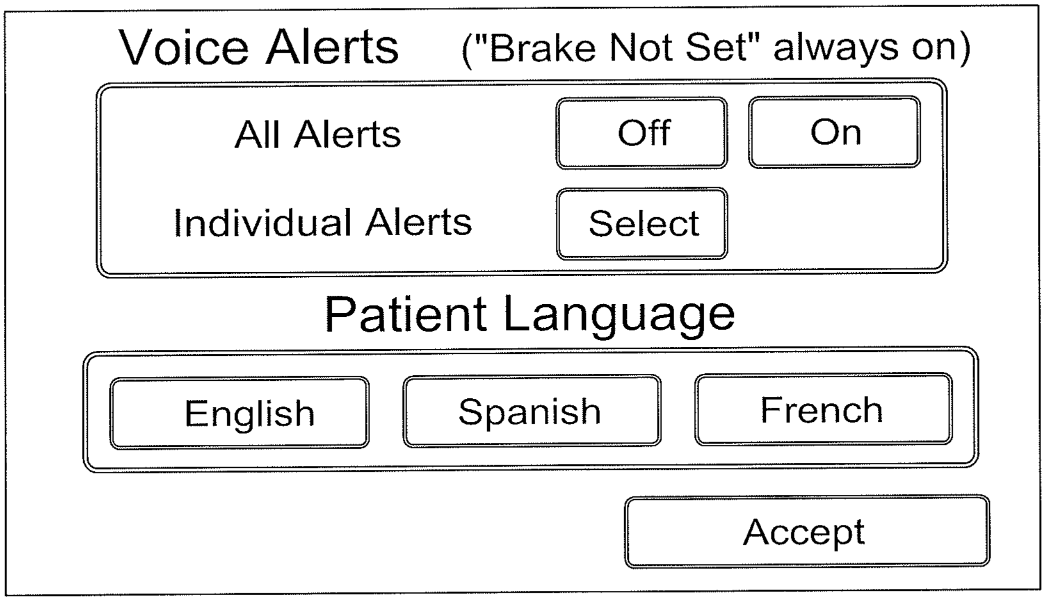
Figure 290:
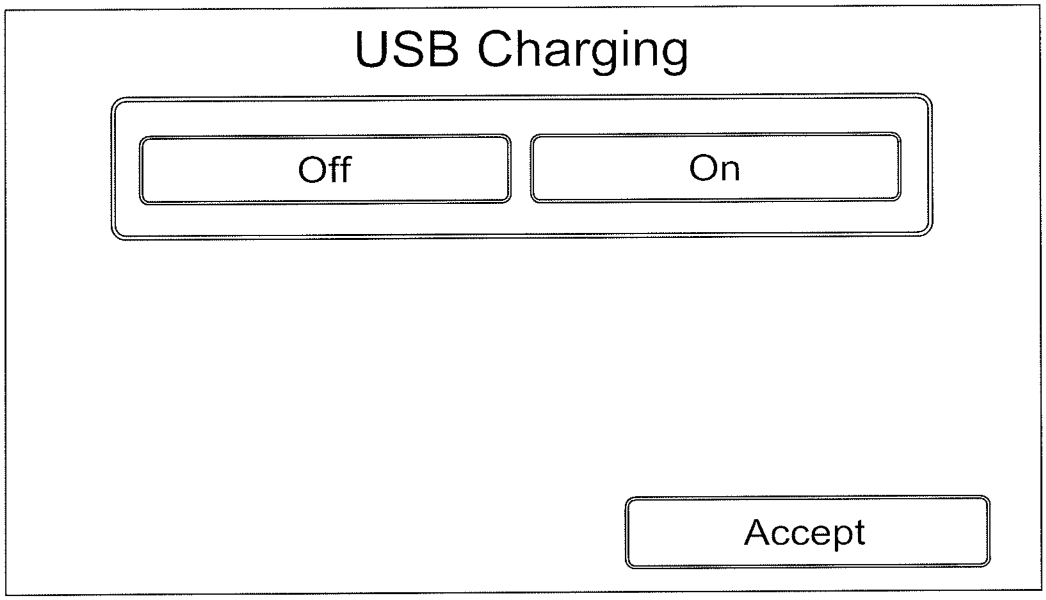
Figure 291:
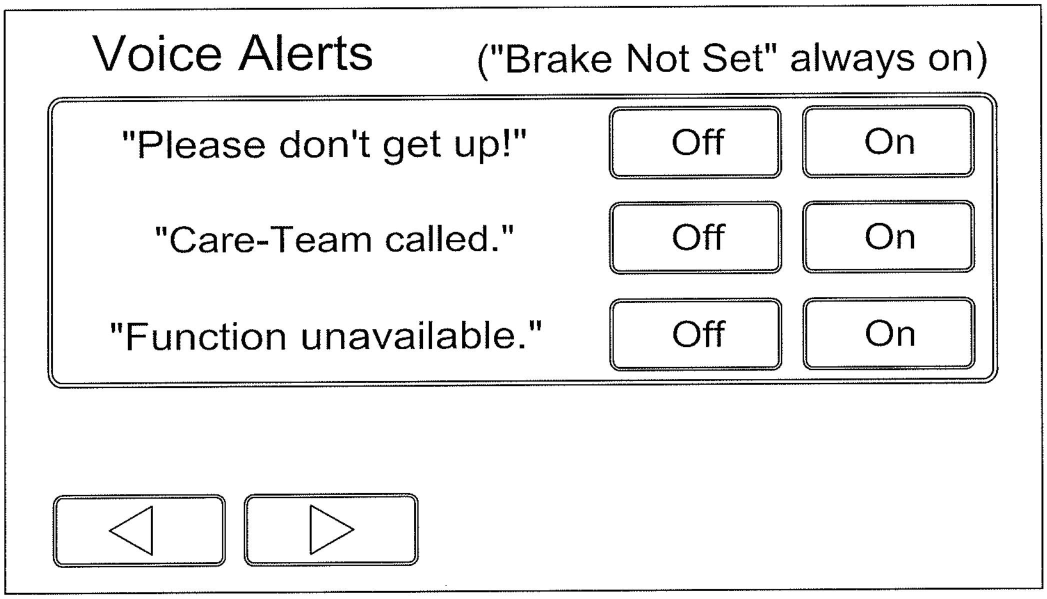
Figure 292:
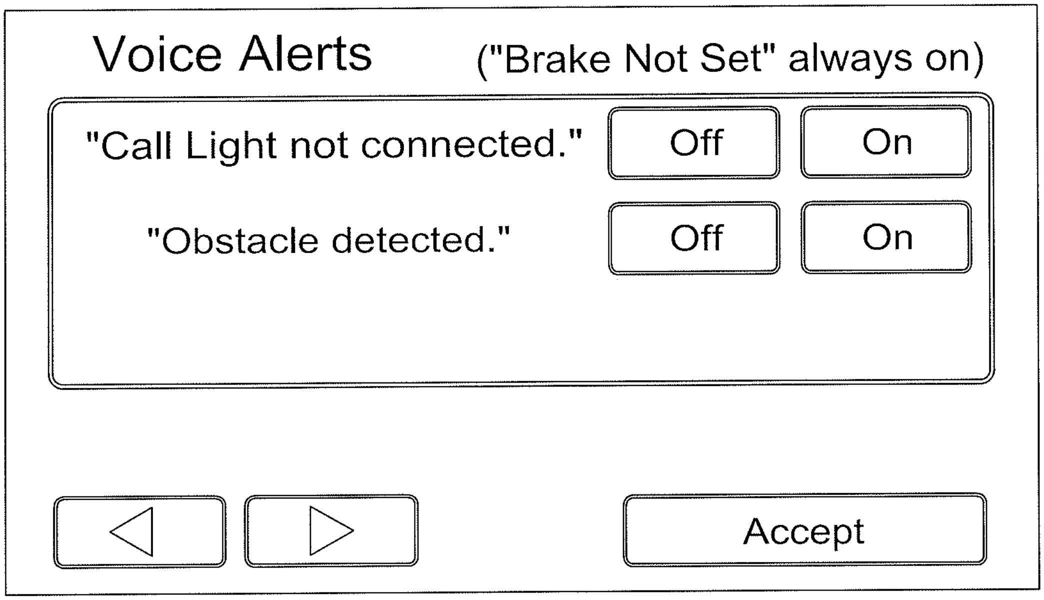
Figure 293:
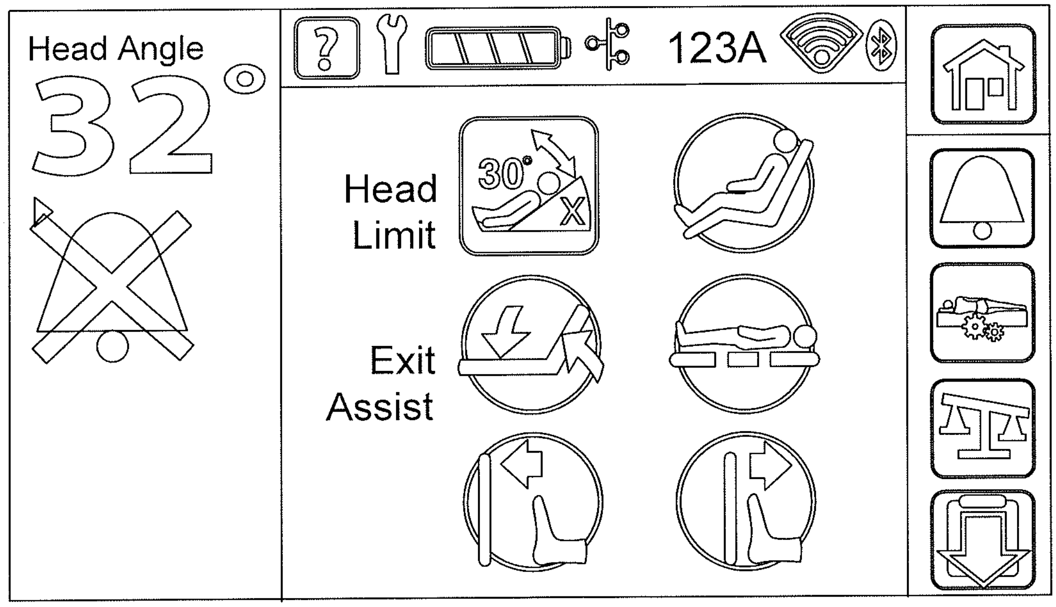
Figure 294:
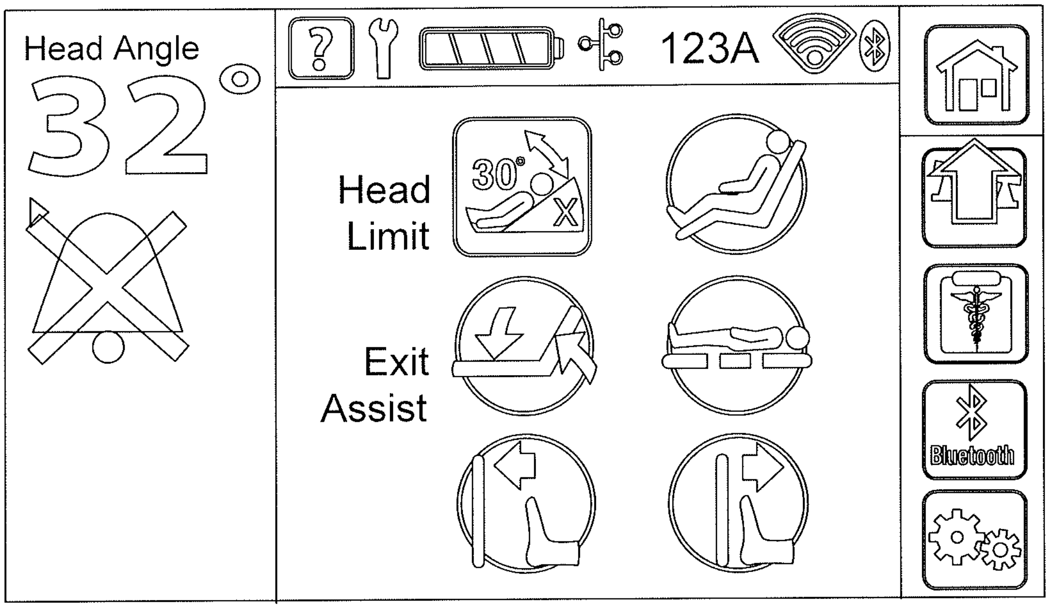
Figure 295:
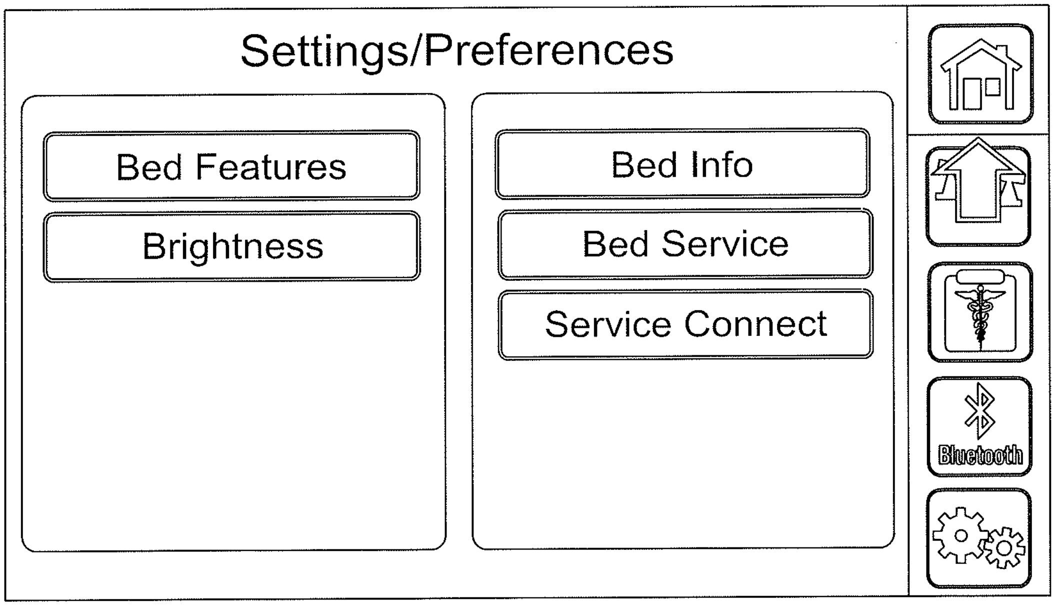
Figure 296:
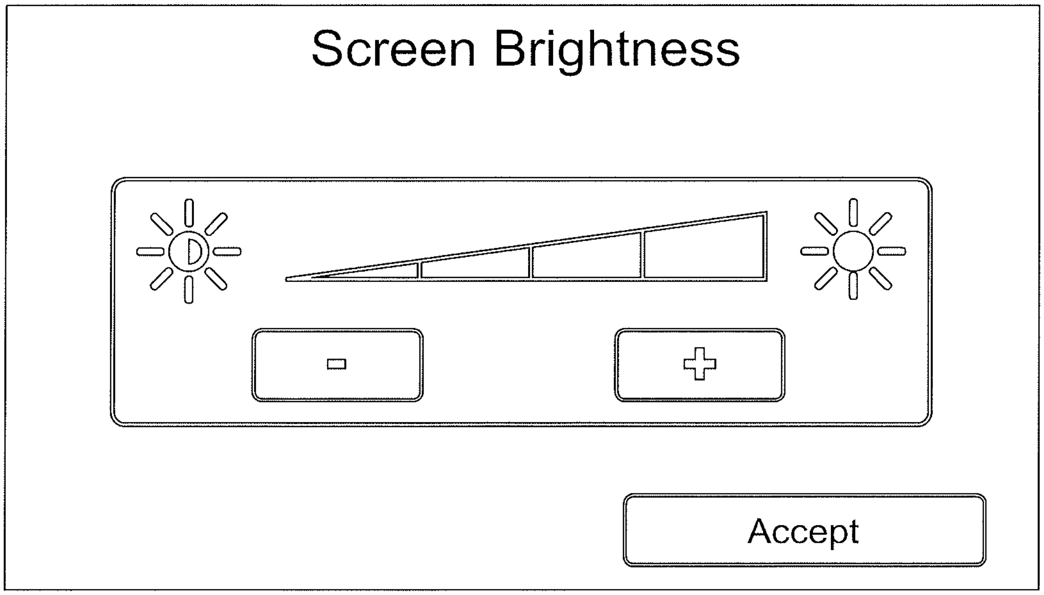
Figure 297:
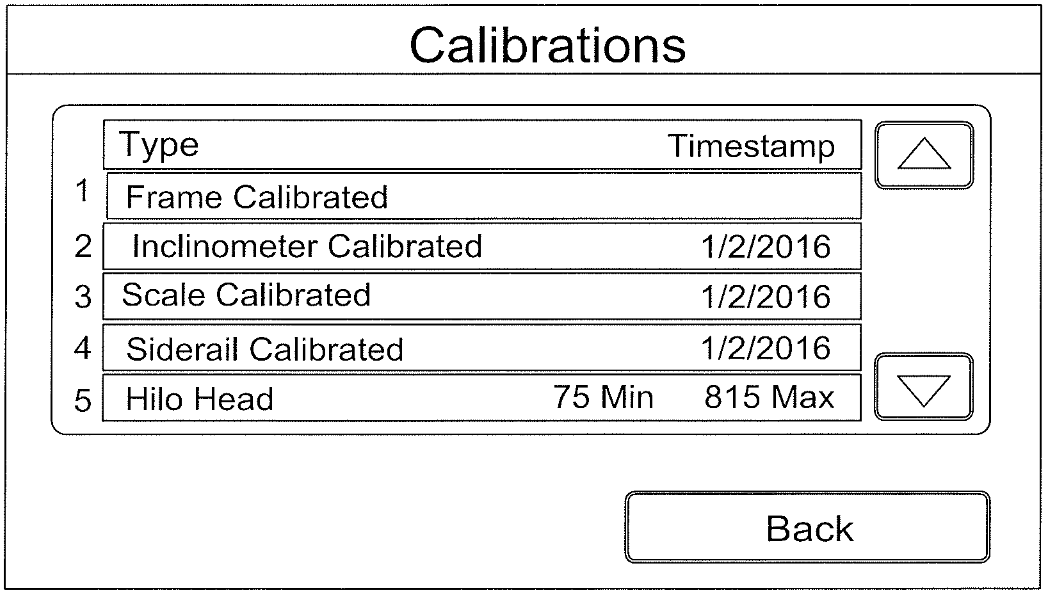
Figure 298:
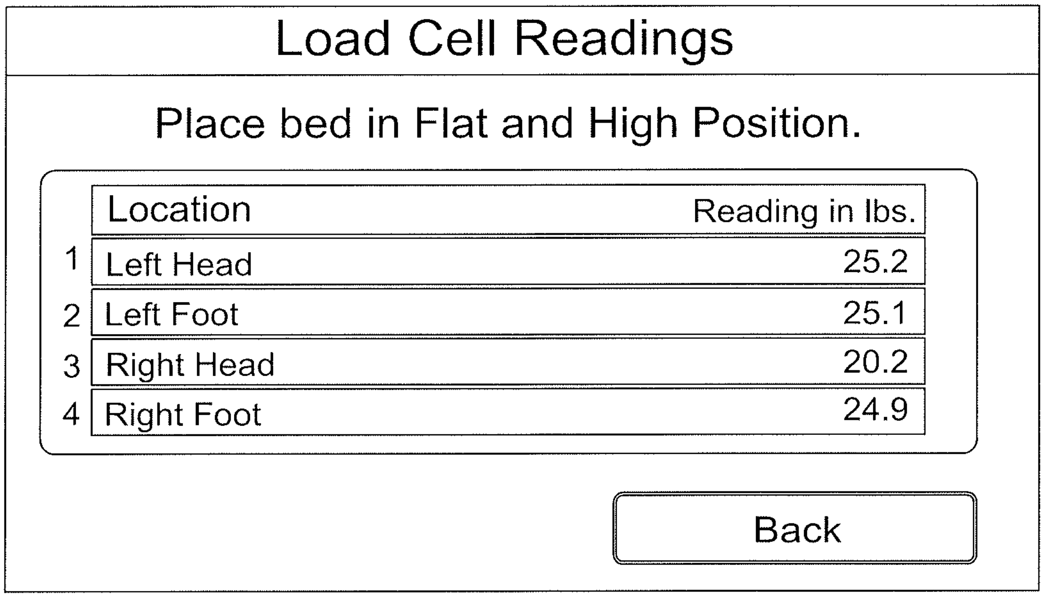
Figure 299:
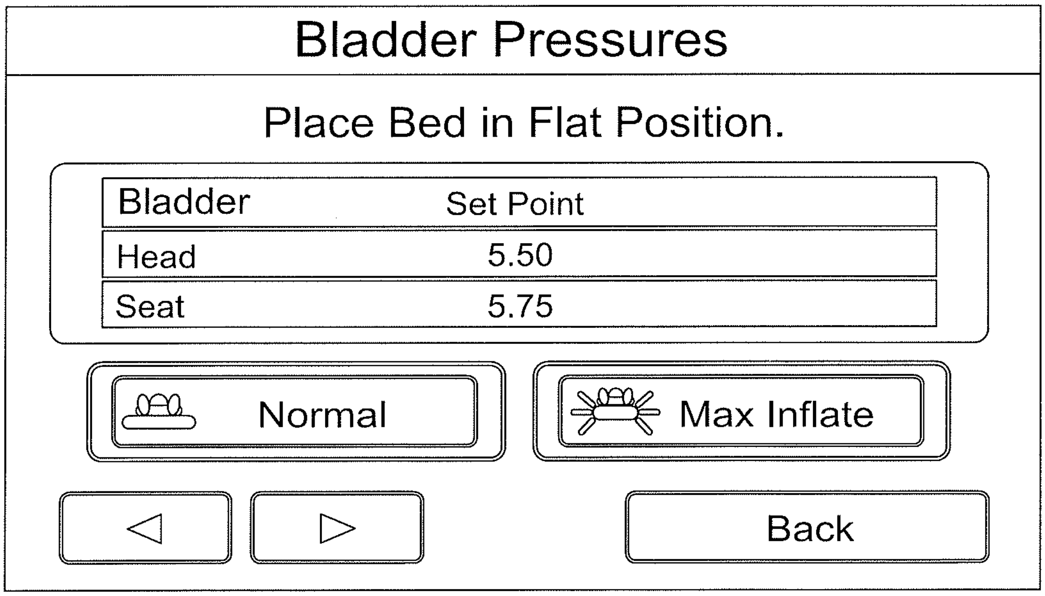
Figure 300:
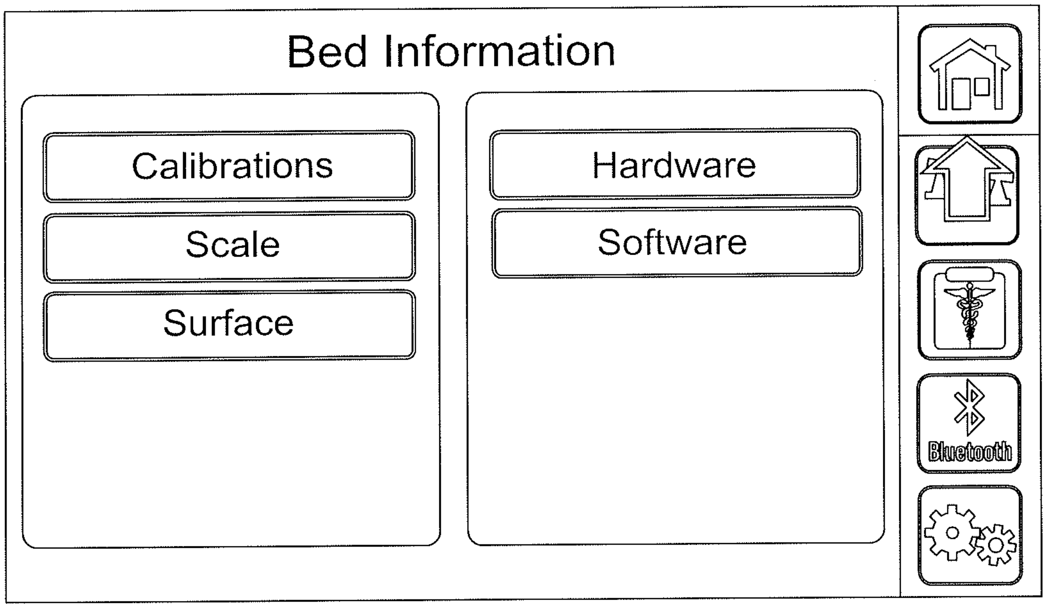
Figure 301:
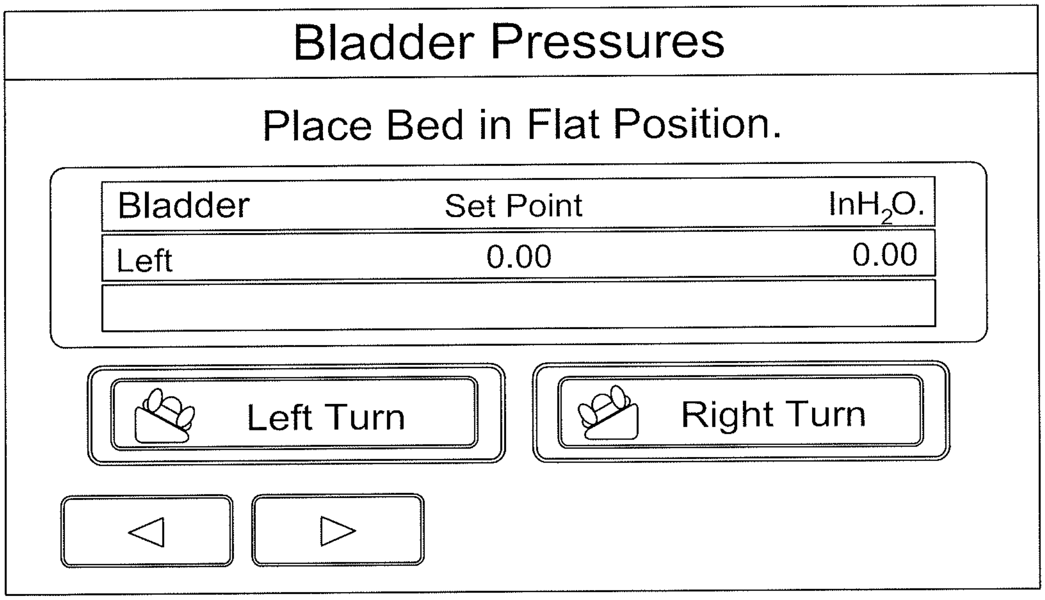
Figure 302:
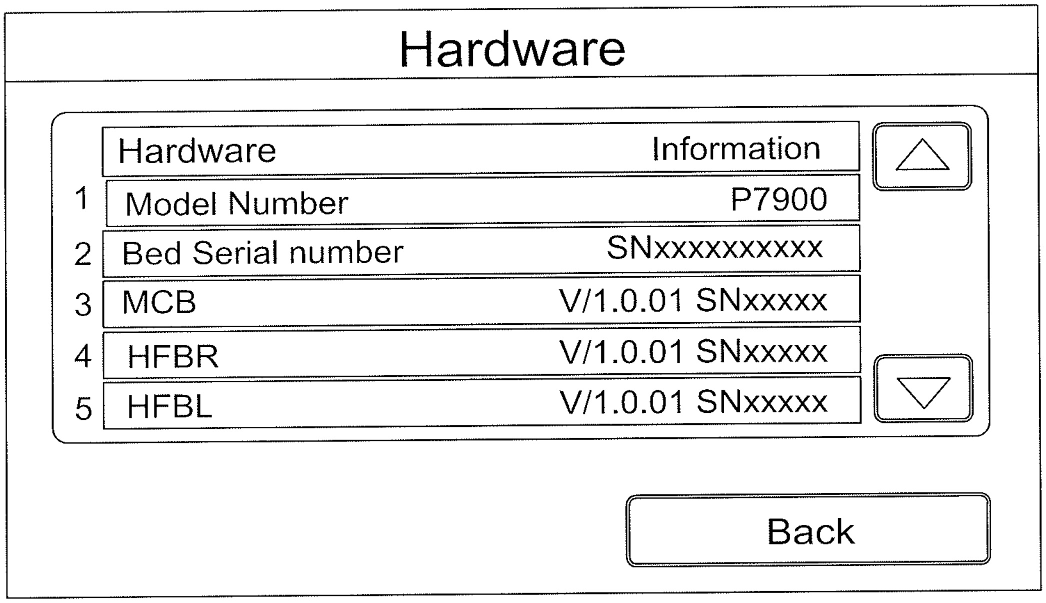
Figure 303:
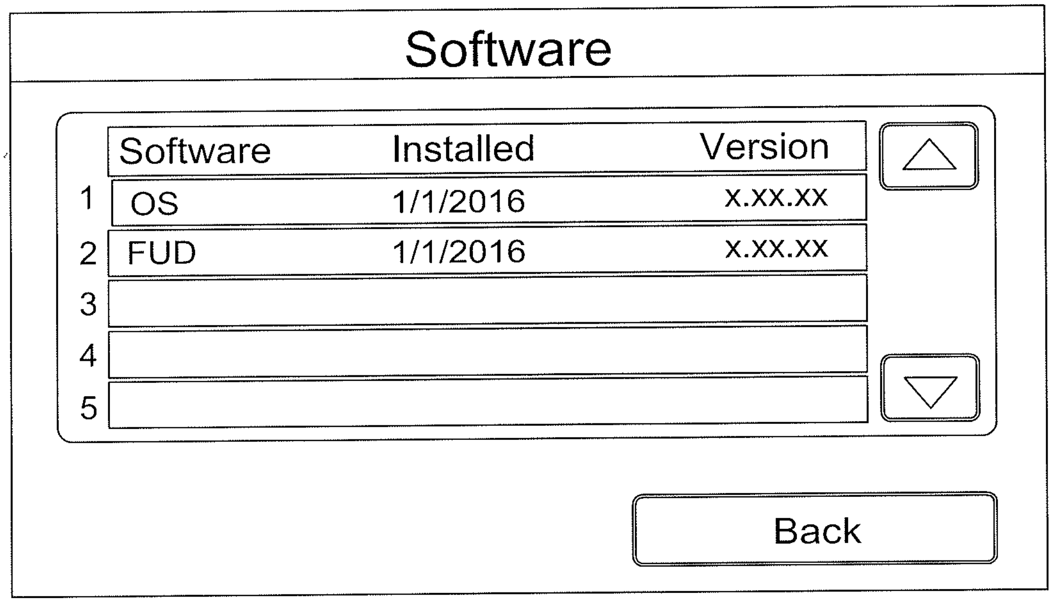
Figure 304:
Figure 305:
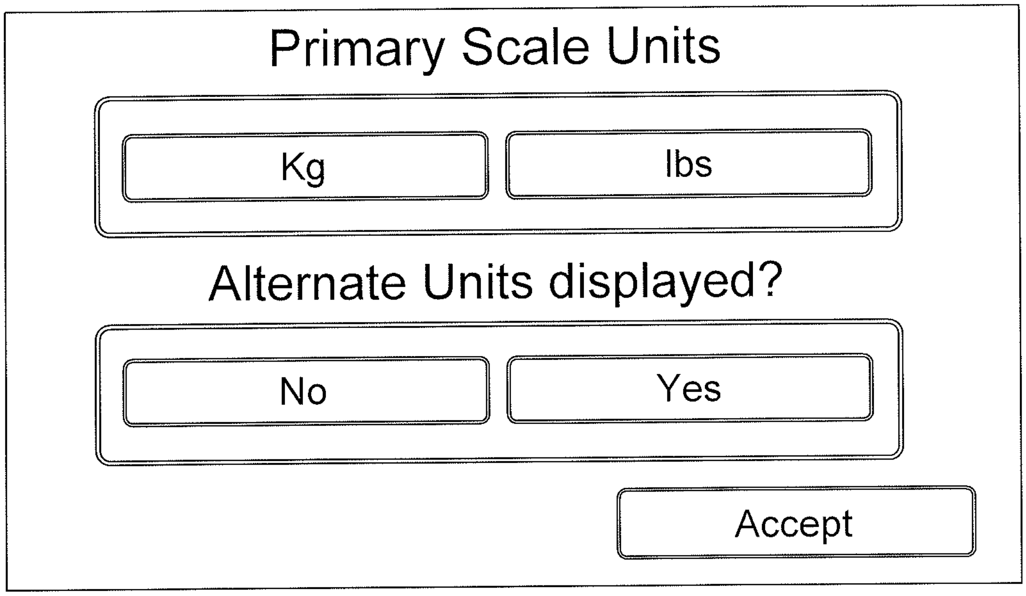
Figure 306:
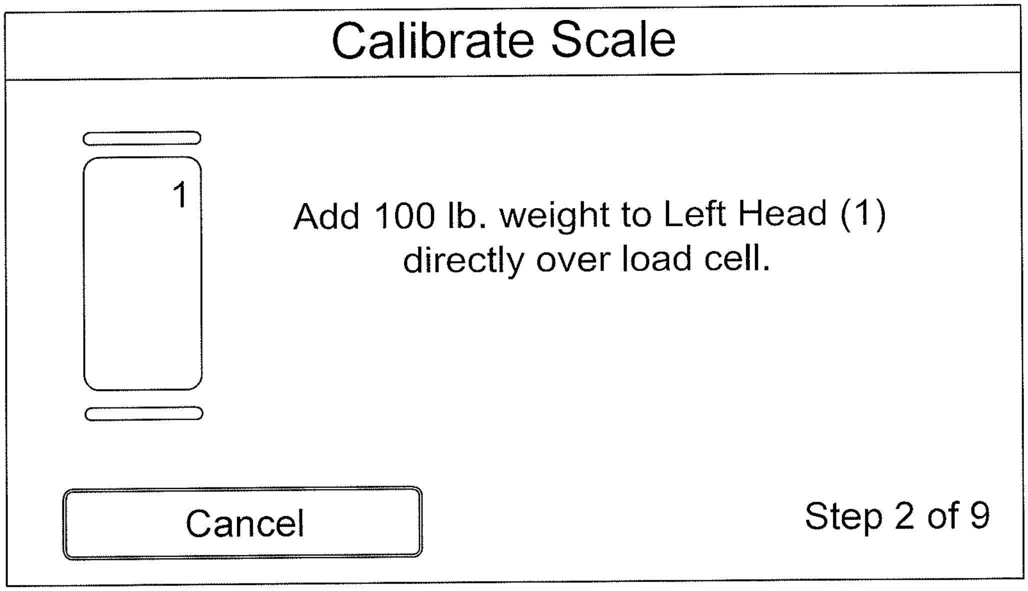
Figure 307:
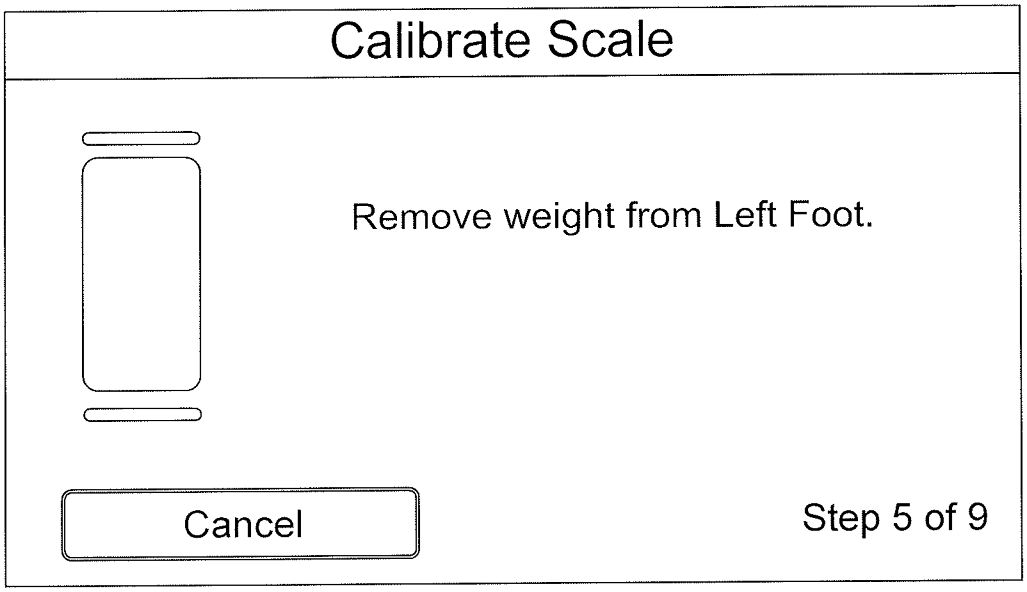
Figure 308:
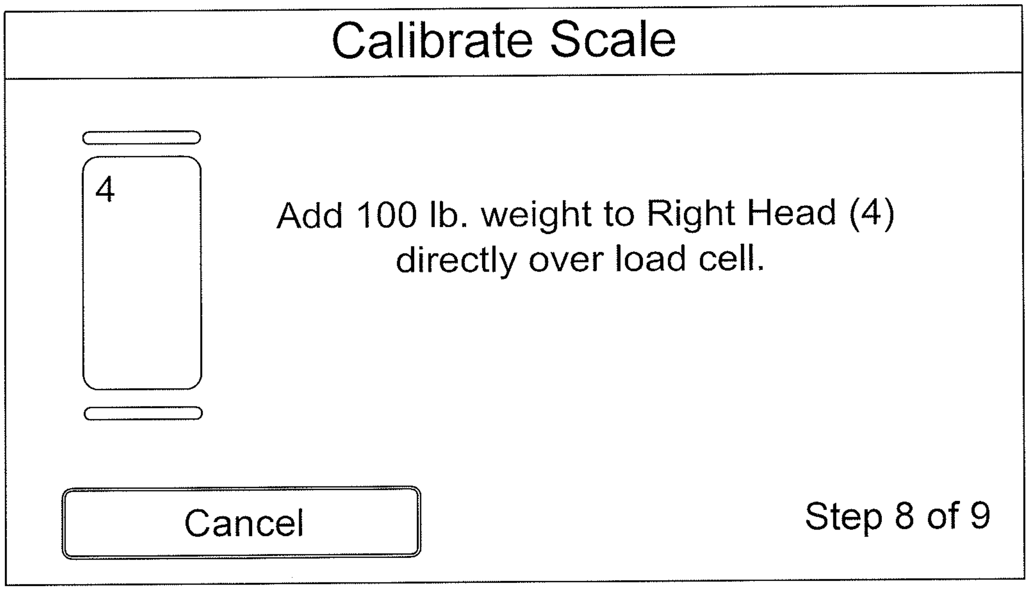
Figure 309:
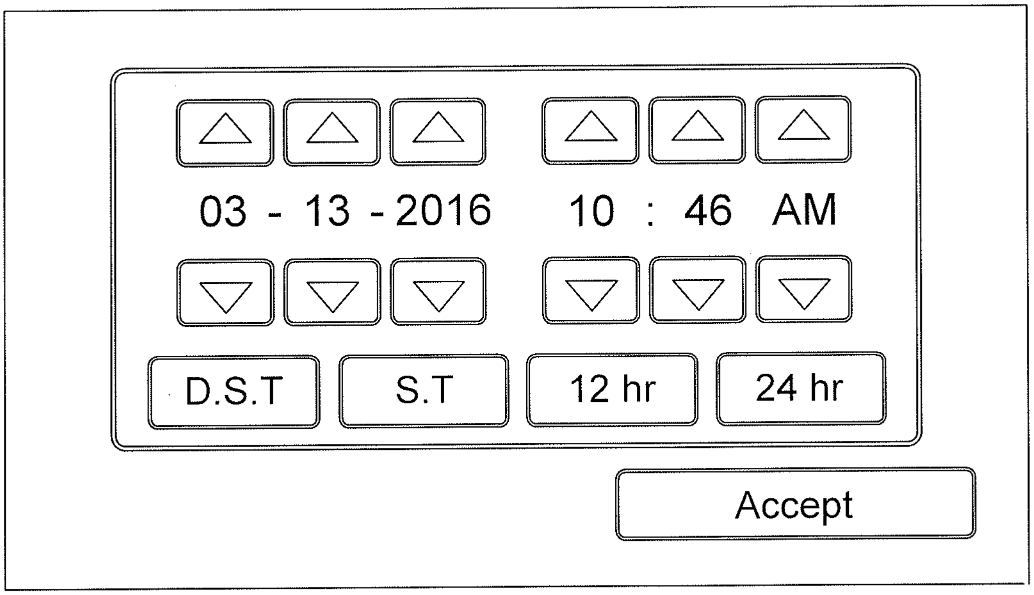
Figure 310:
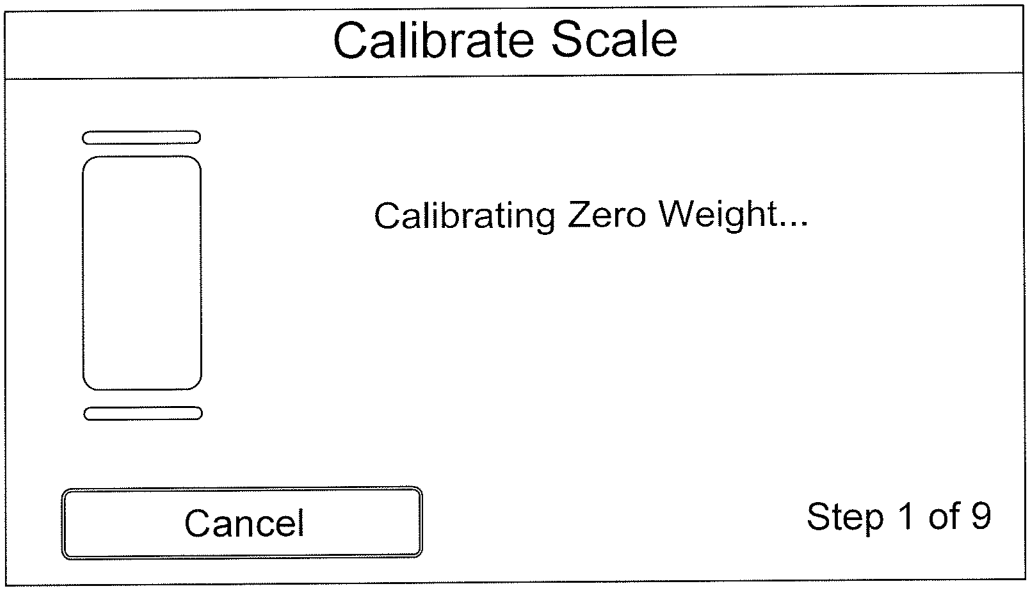
Figure 311:
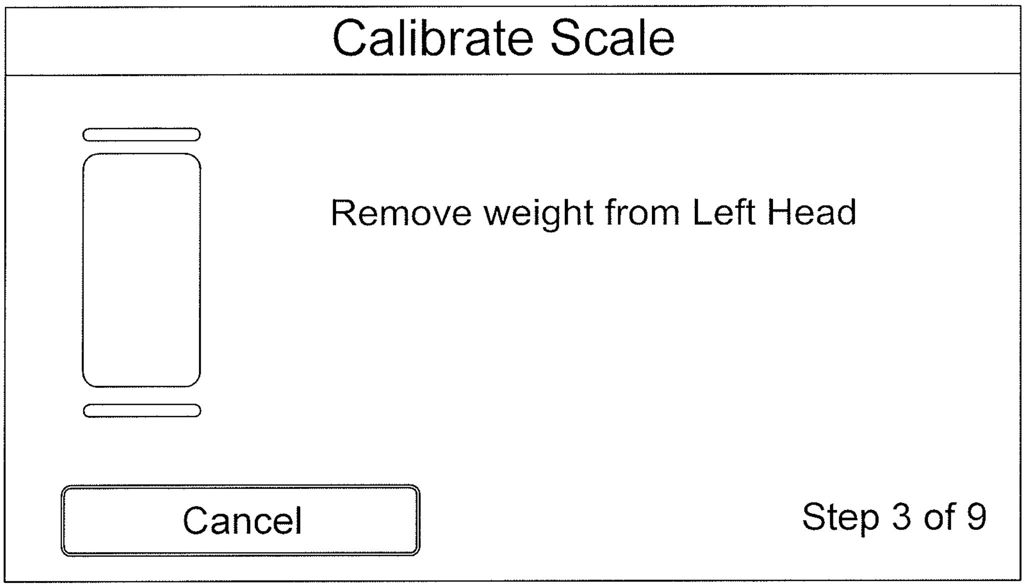
Figure 312:
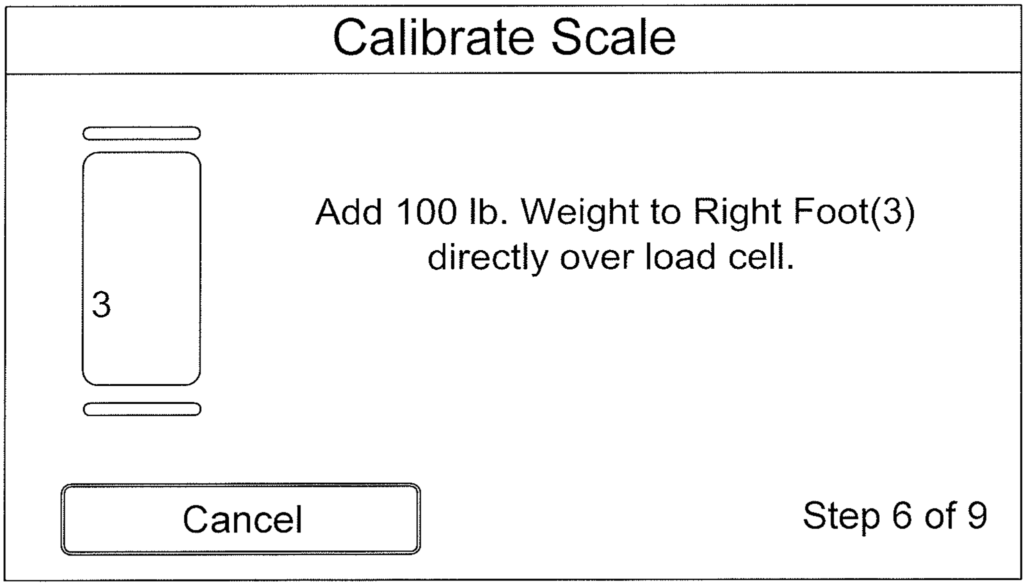
Figure 313:
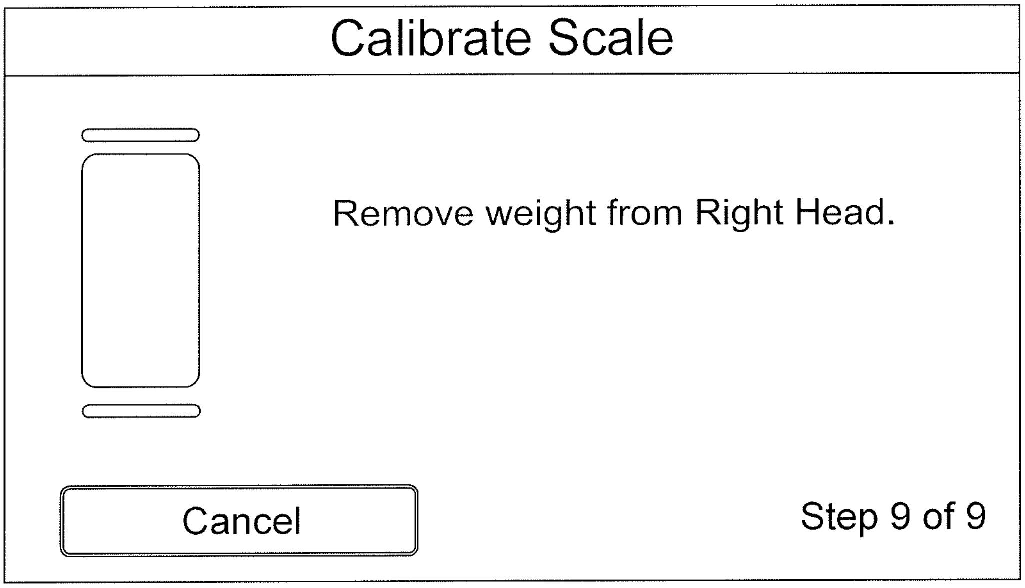
Figure 314:
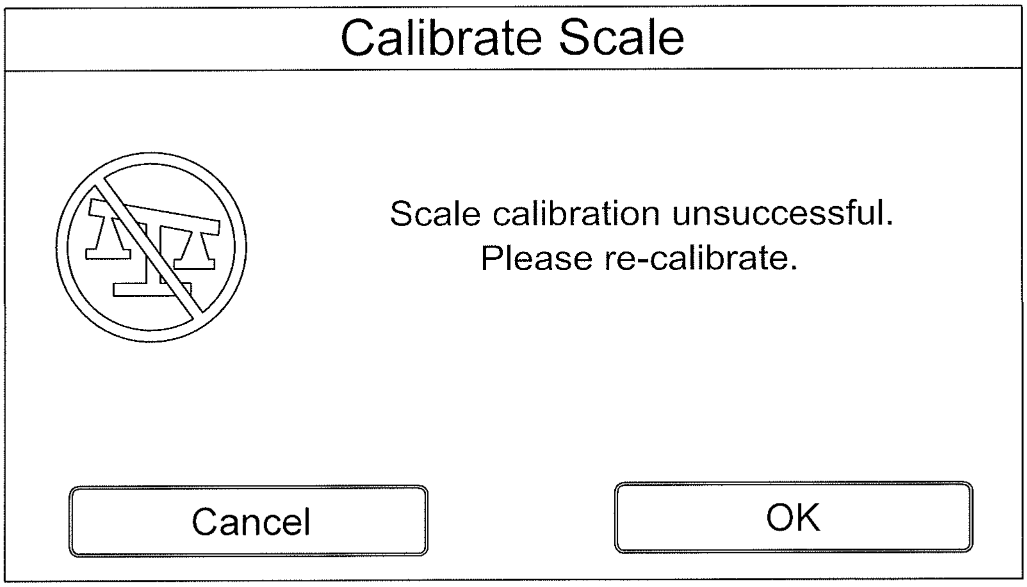
Figure 315:
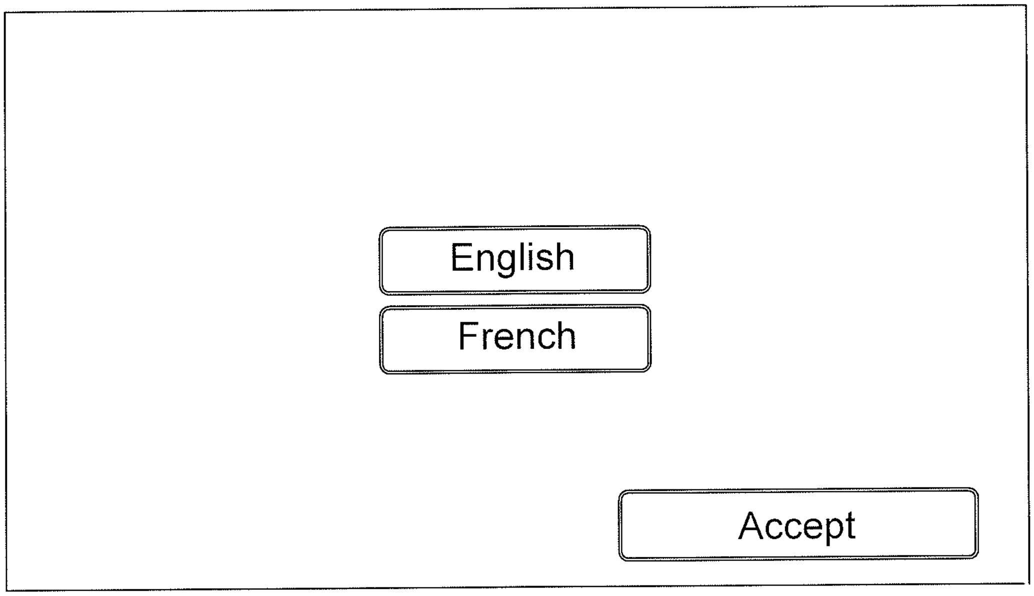
Figure 316:
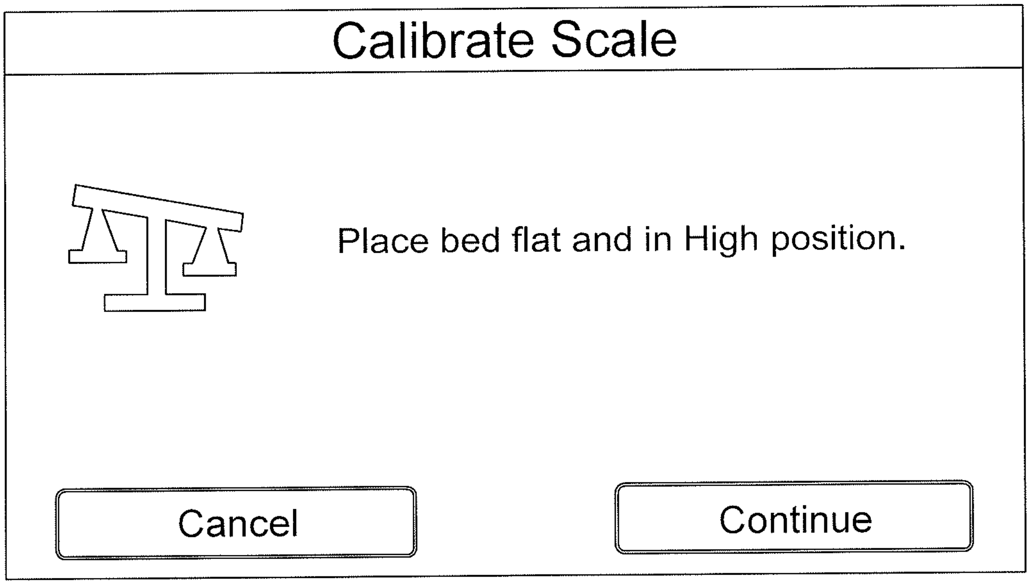
Figure 317:
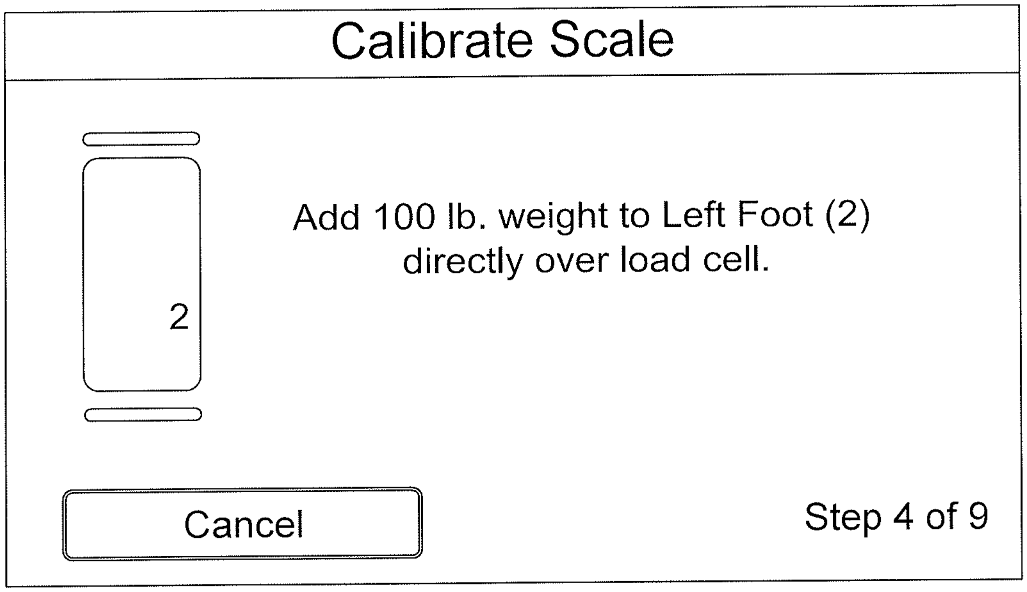
Figure 318:
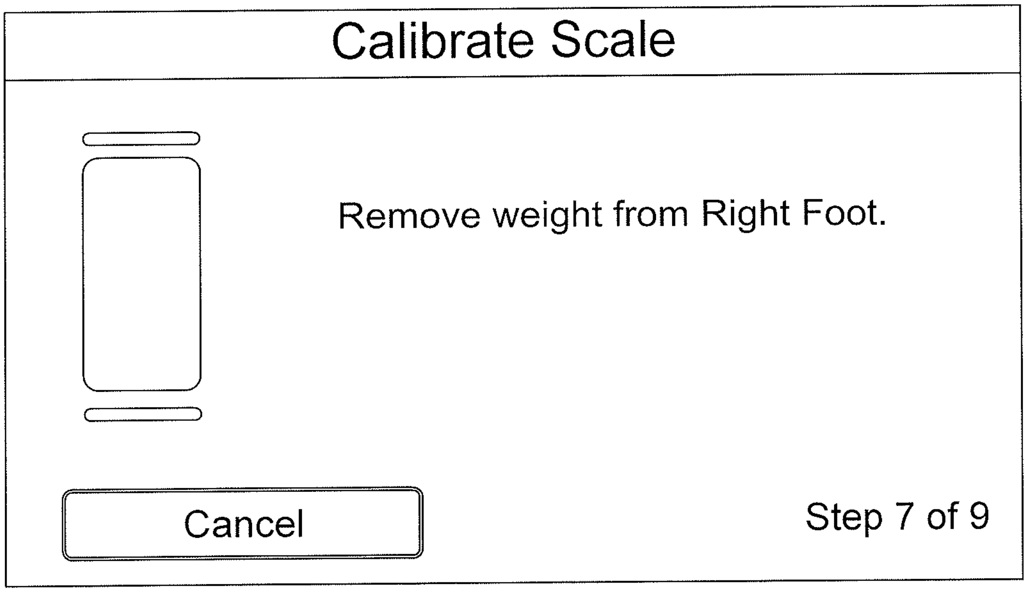
Figure 319:
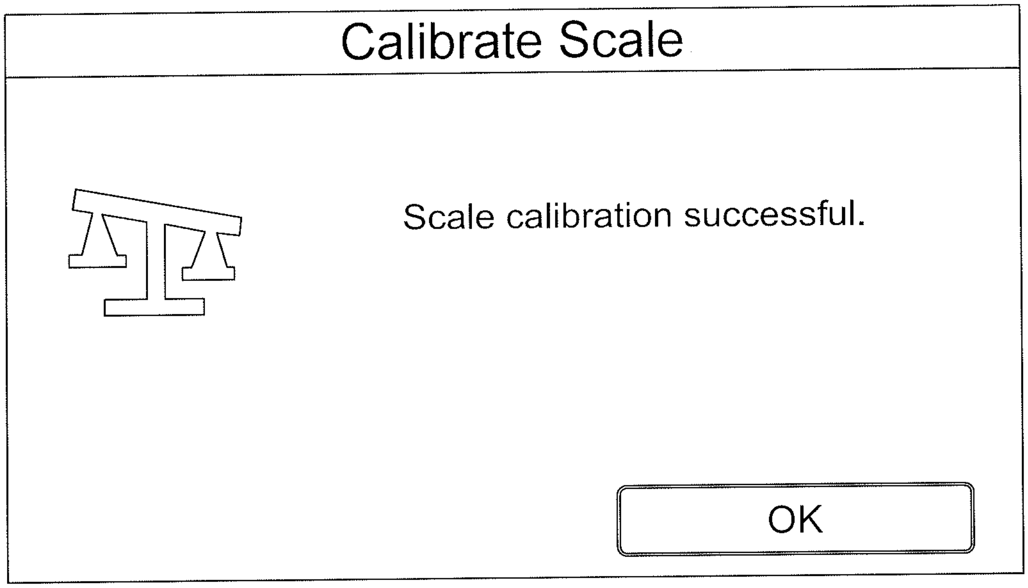
Figure 320:
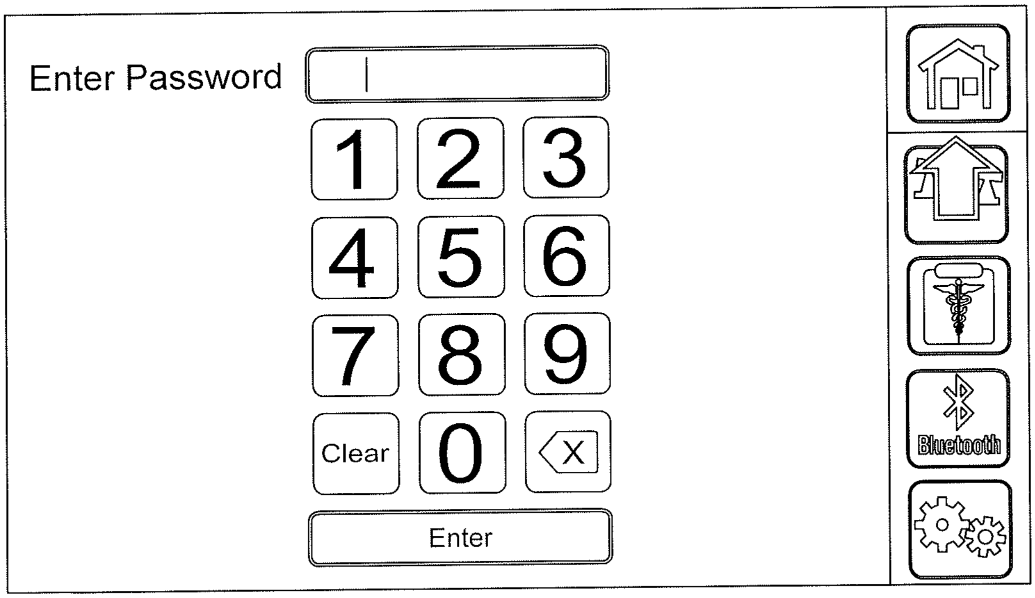
Figure 321:
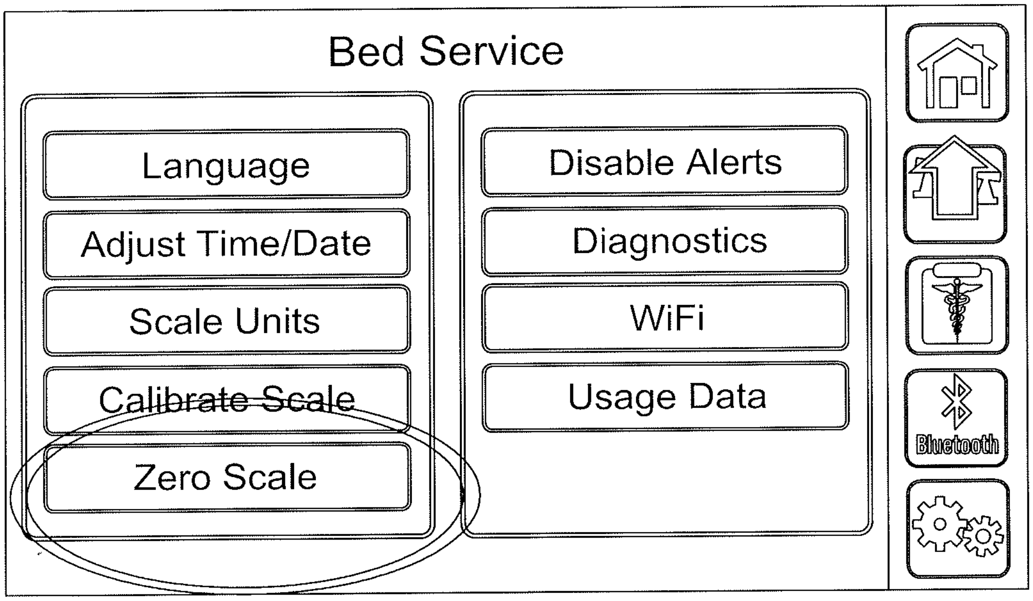
Figure 322:
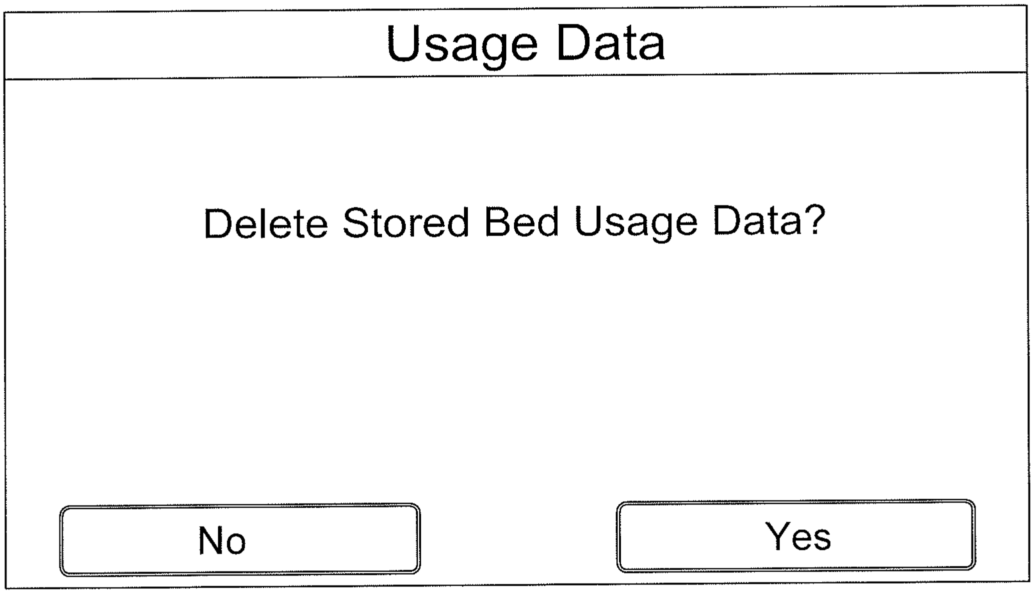
Figure 323:
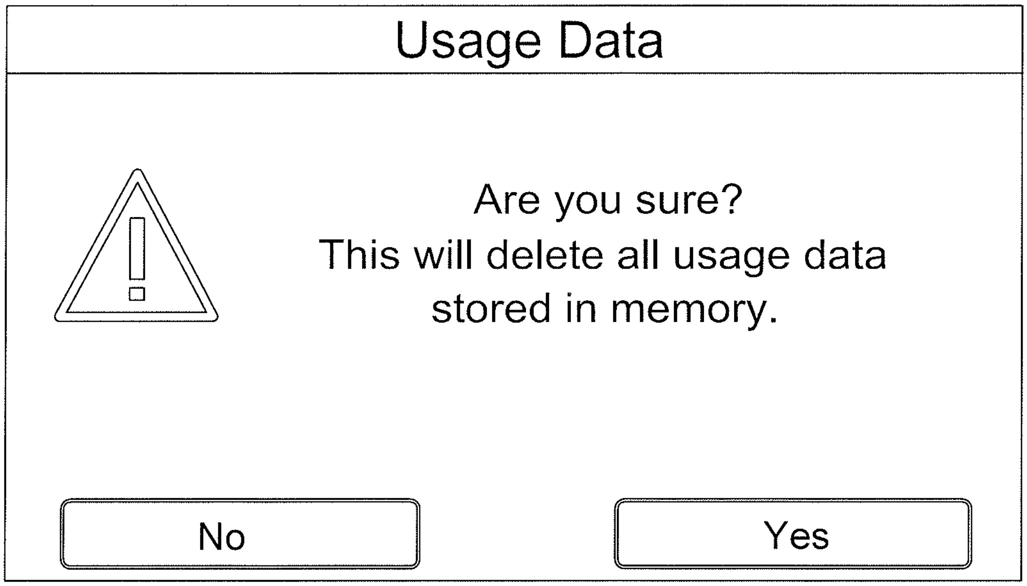
Figure 324:
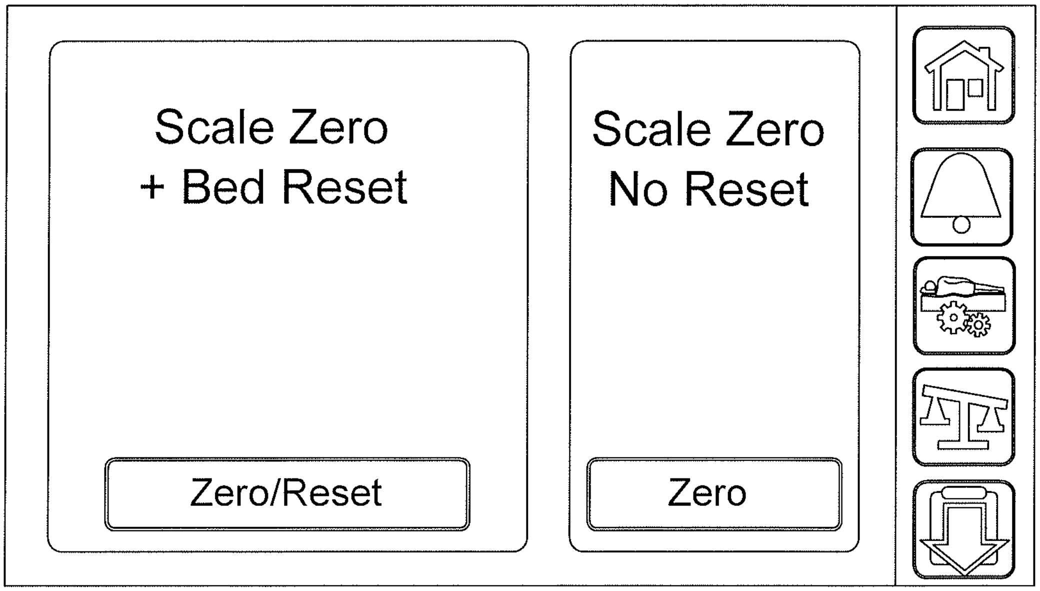
Figure 325:
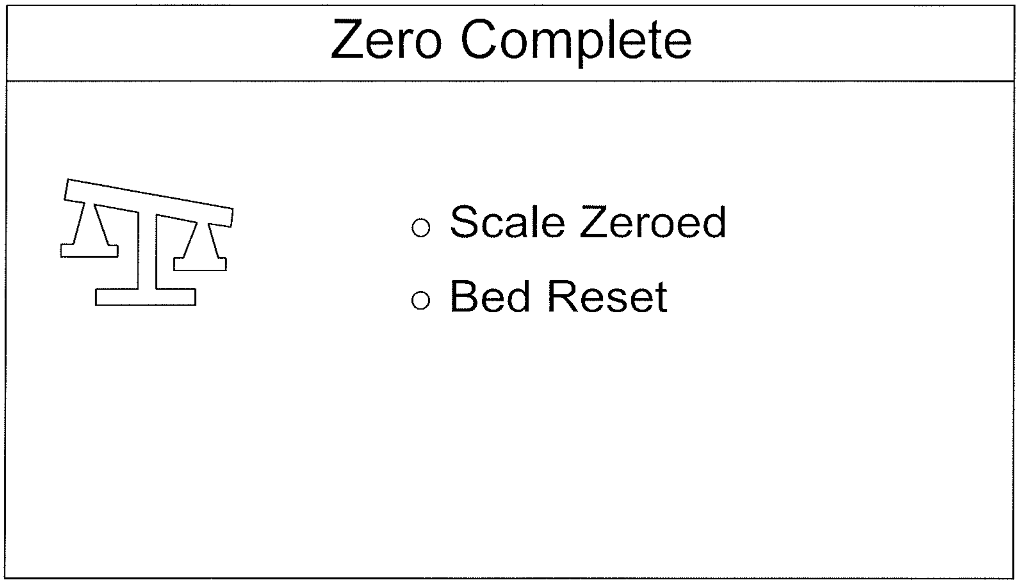
Figure 326:
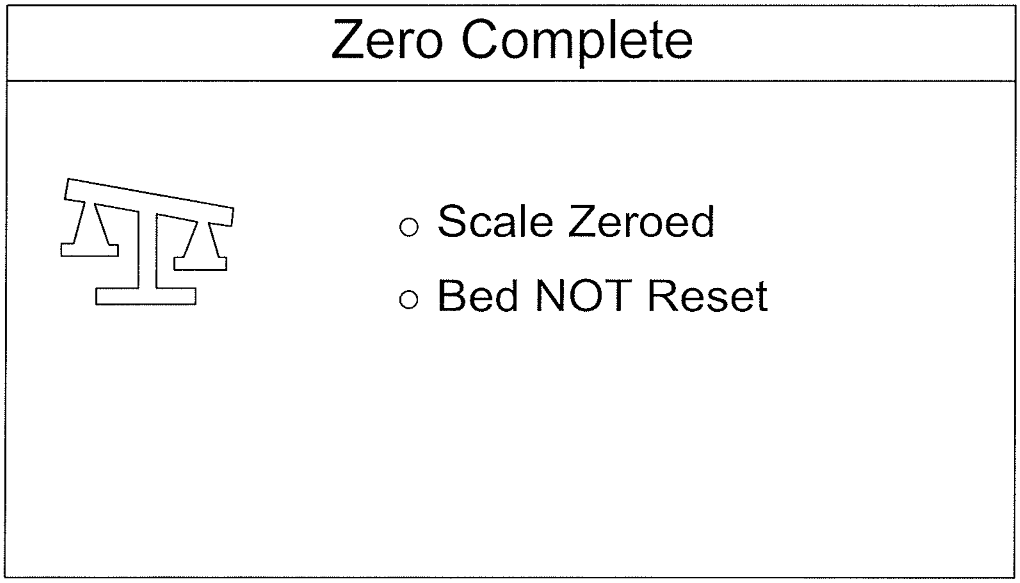
Figure 327:
Figure 328:
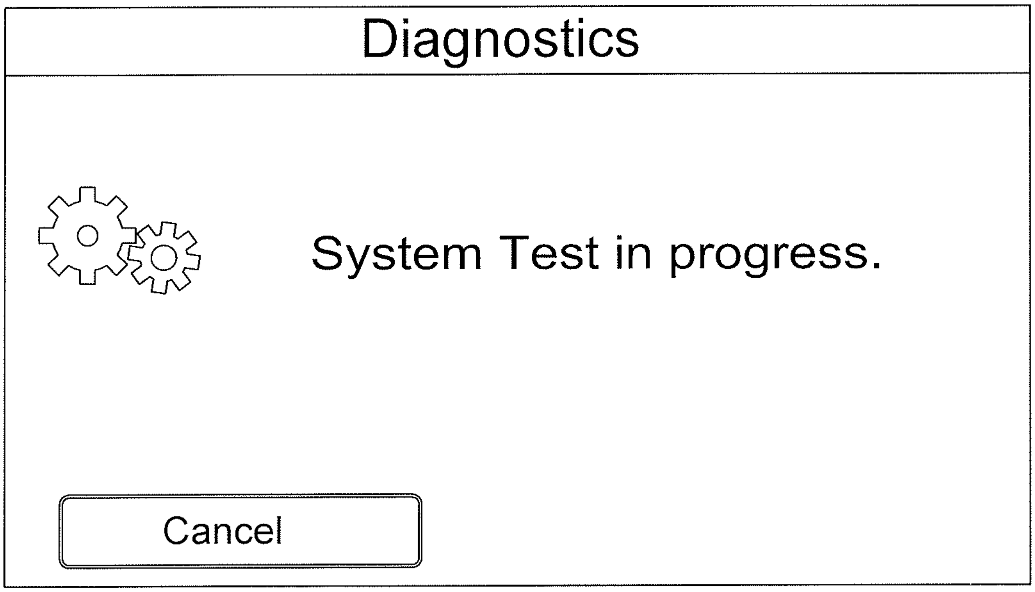
Figure 329:
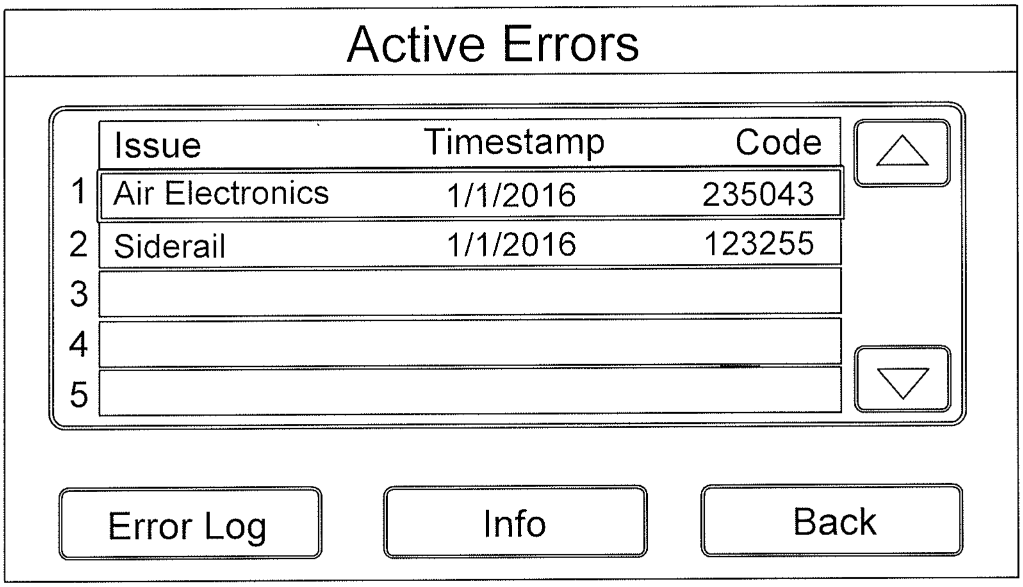
Figure 330:
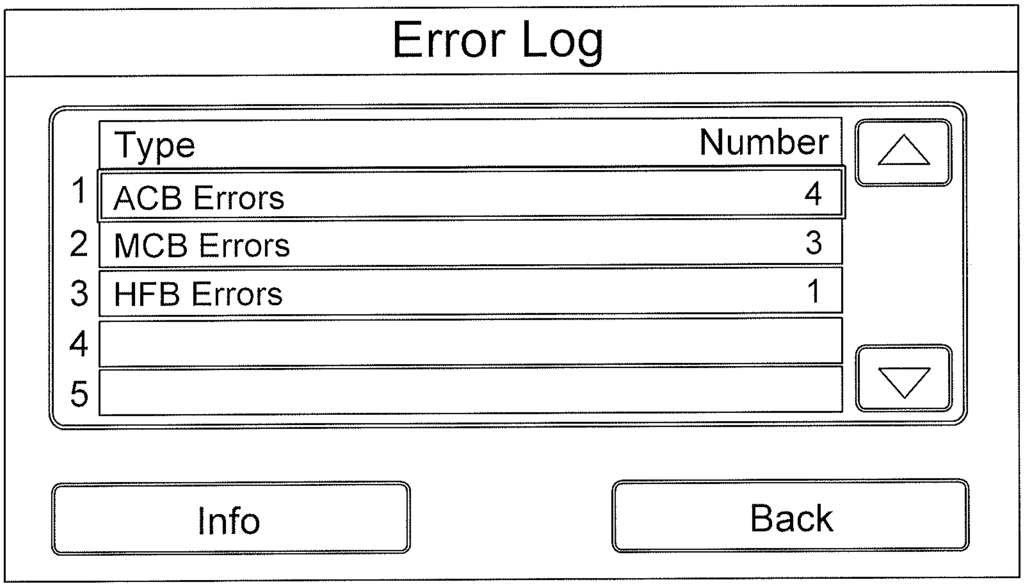
Figure 331:
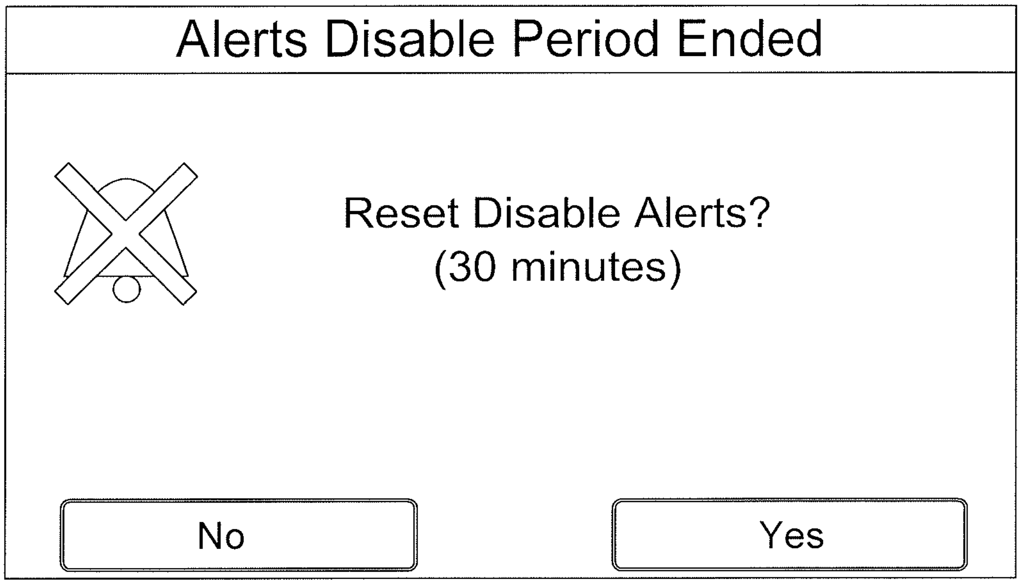
Figure 332:
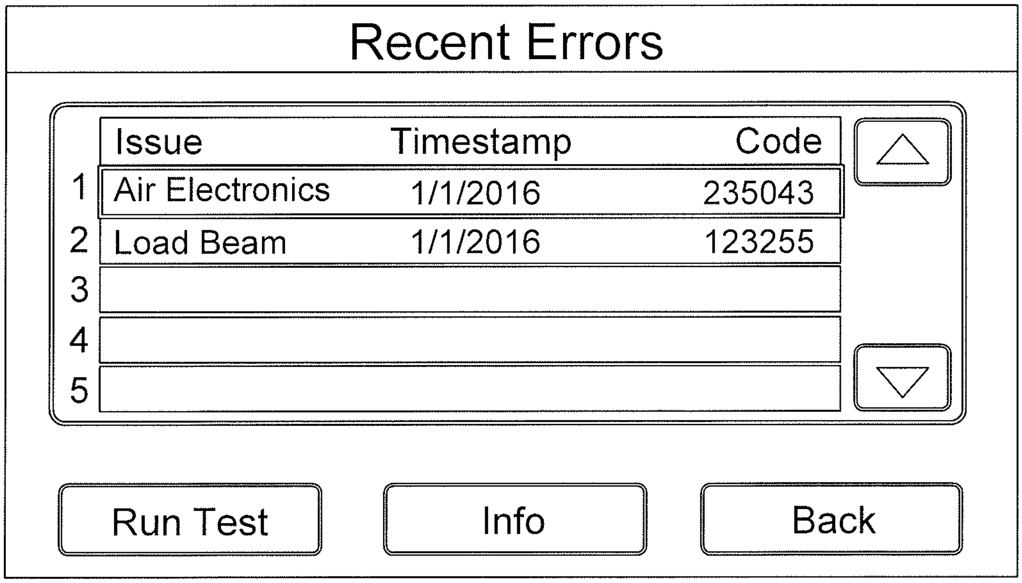
Figure 333:
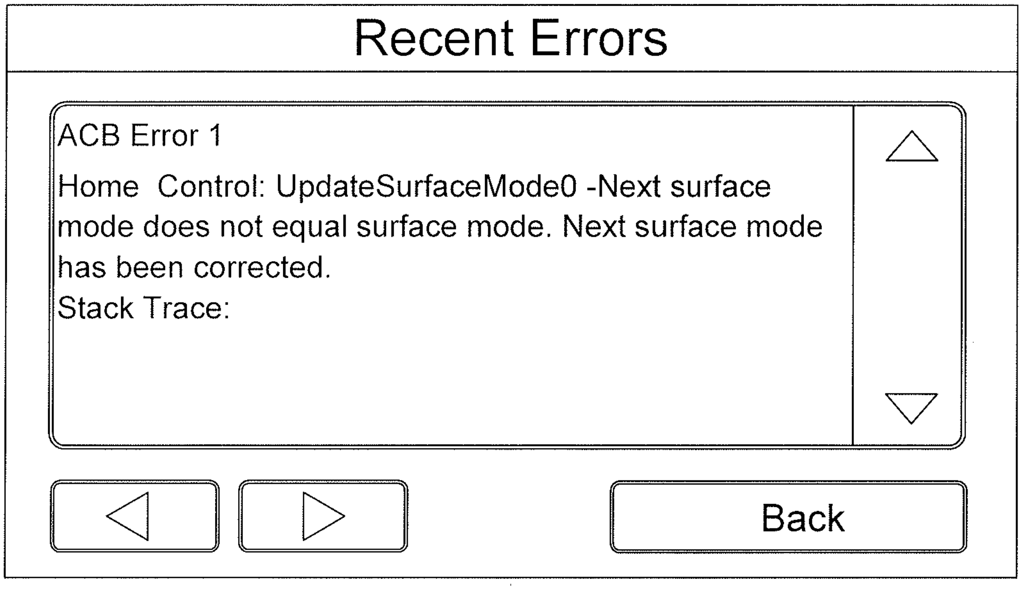
Figure 334:
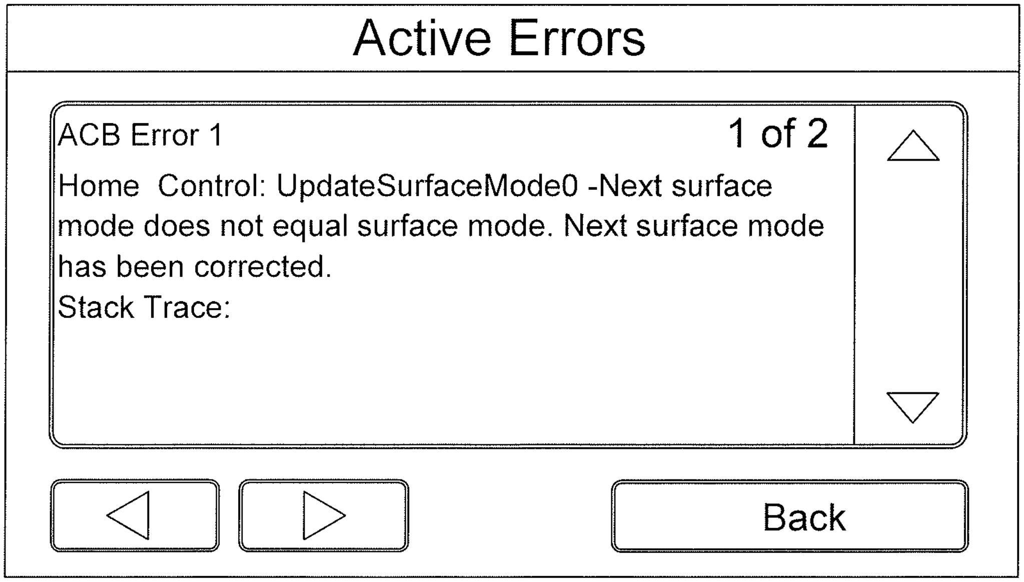
Figure 335:
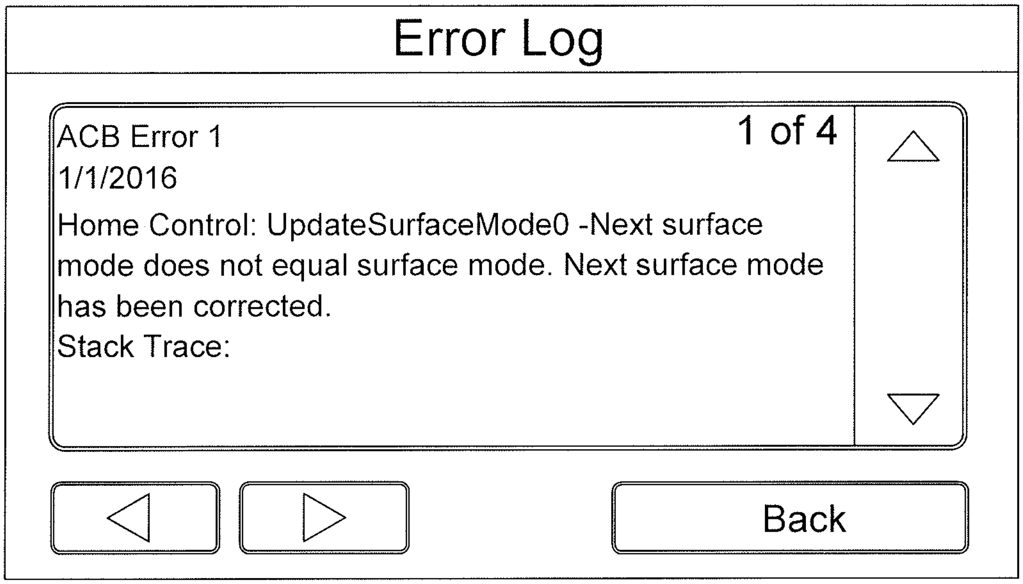
Figure 336:
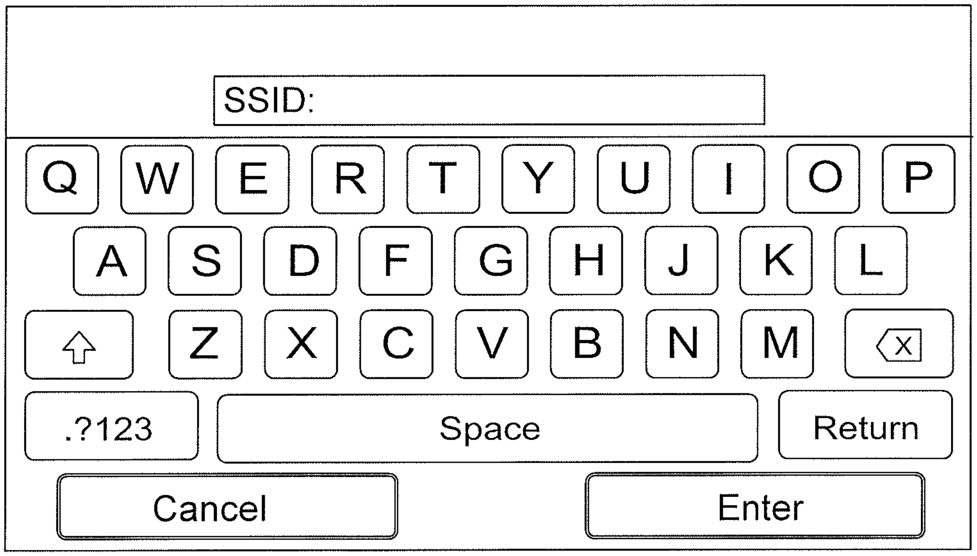
Figure 337:
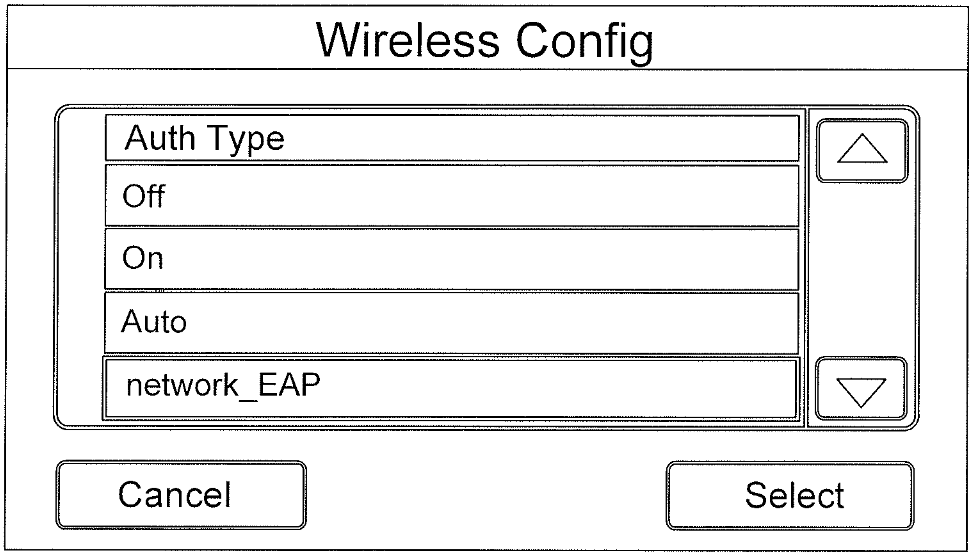
Figure 338:
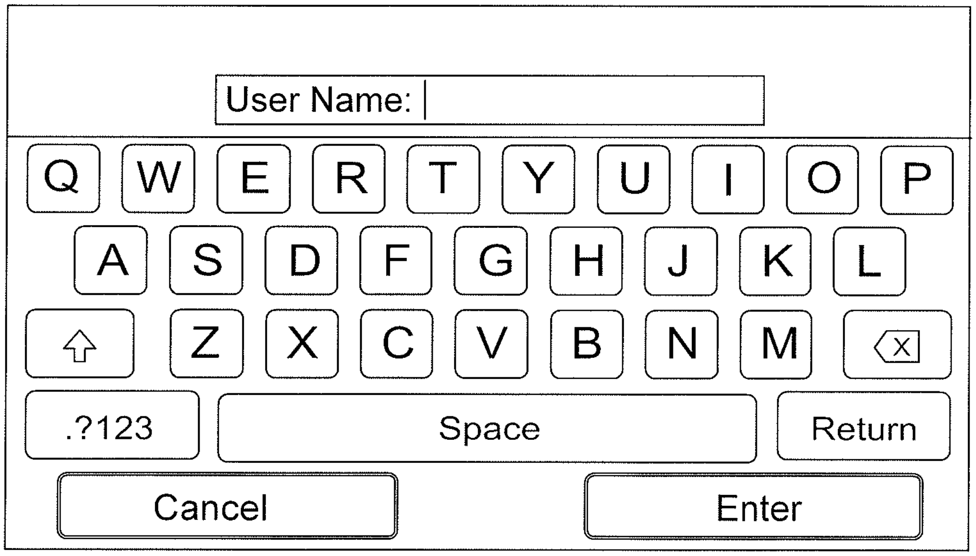
Figure 339:
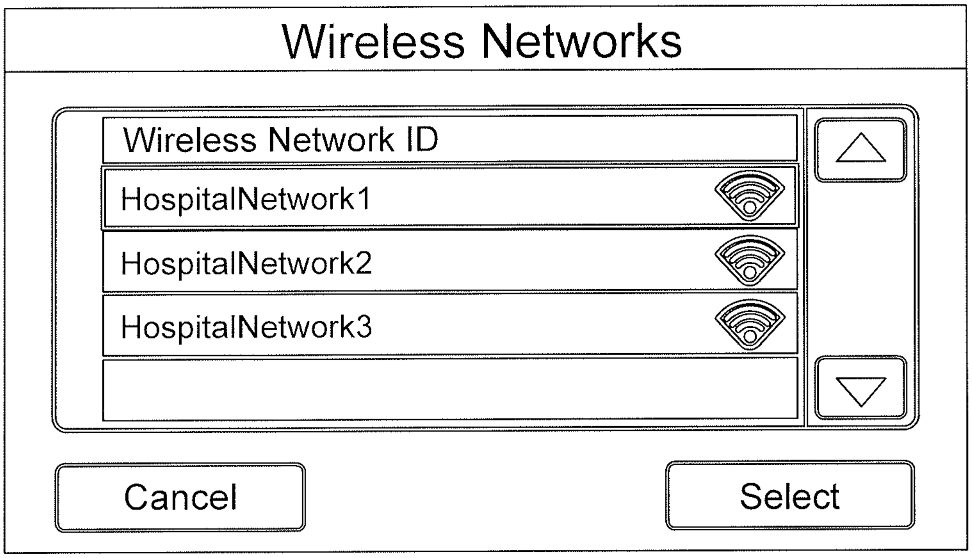
Figure 340:
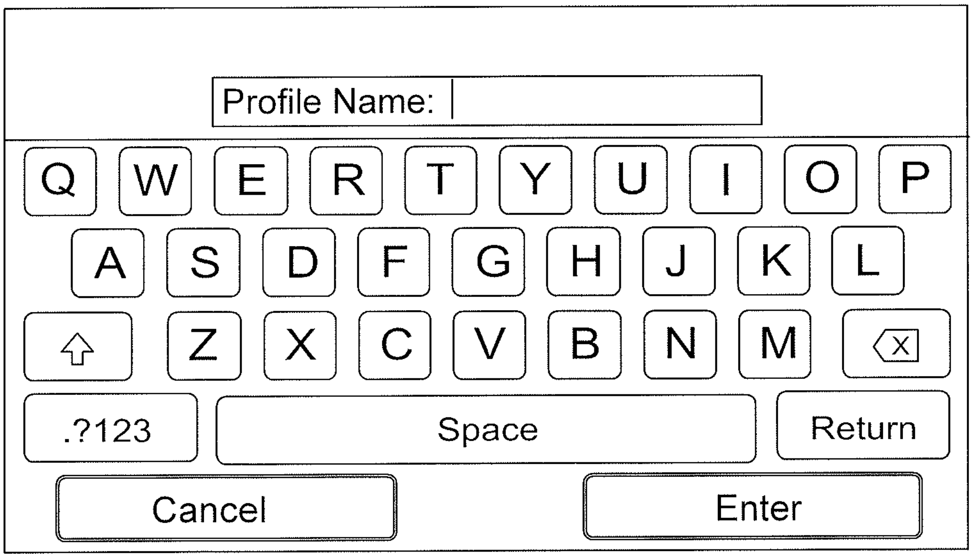
Figure 341:
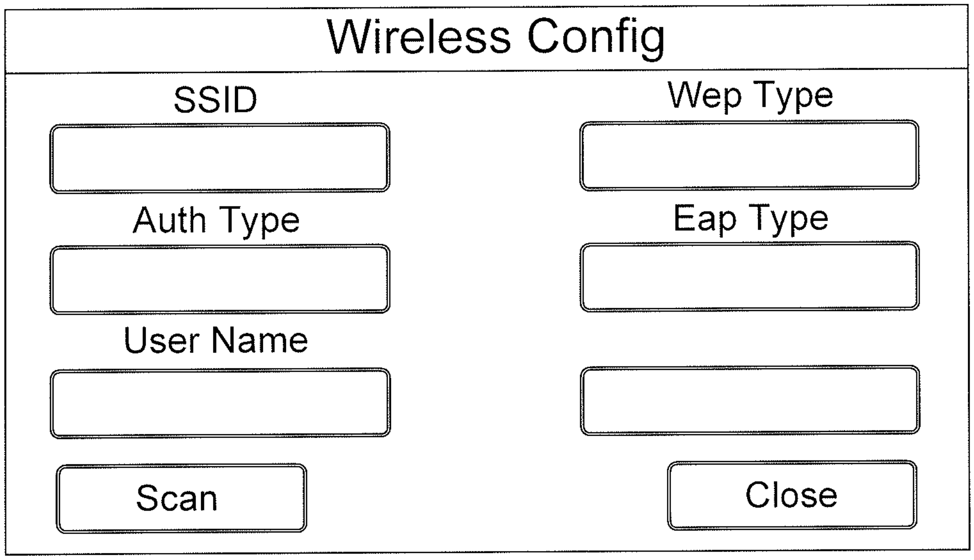
Figure 342:
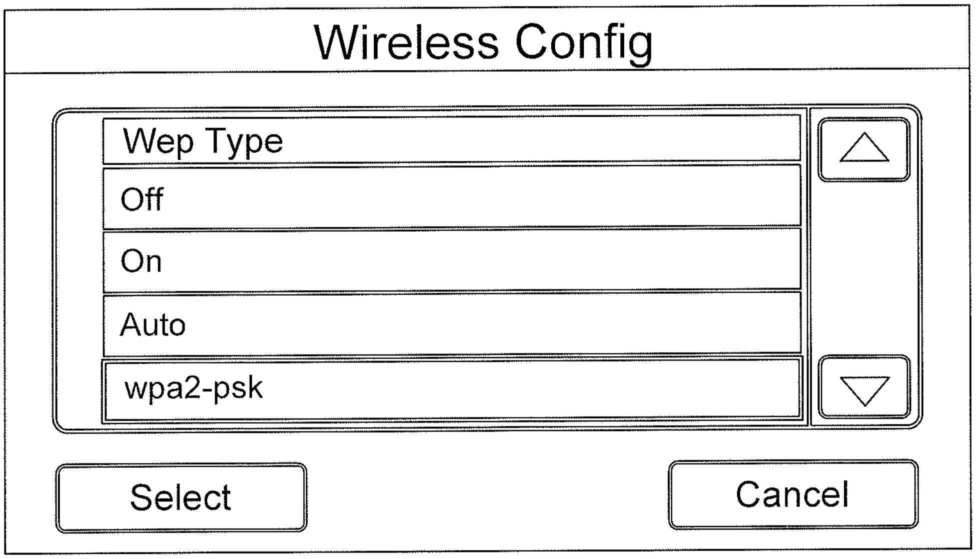
Figure 343:
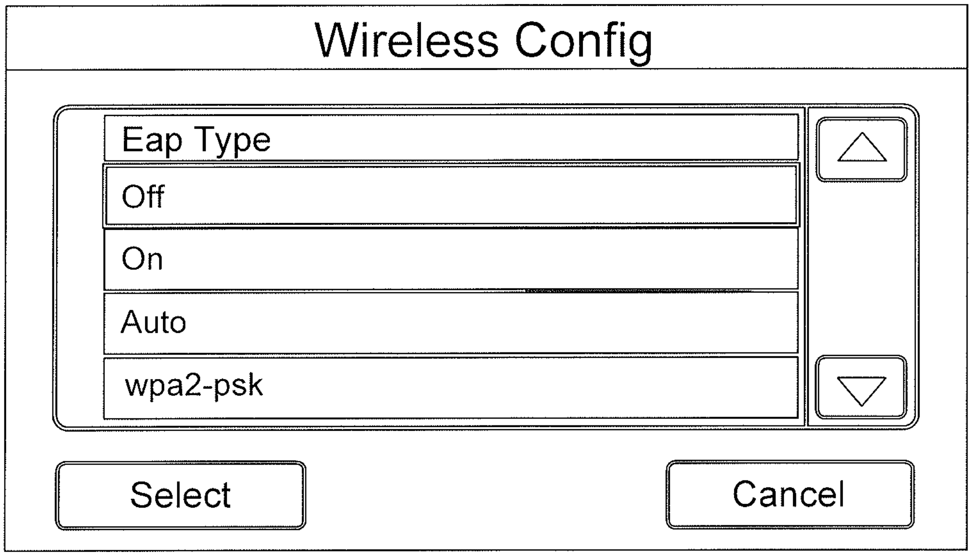
Figure 344:
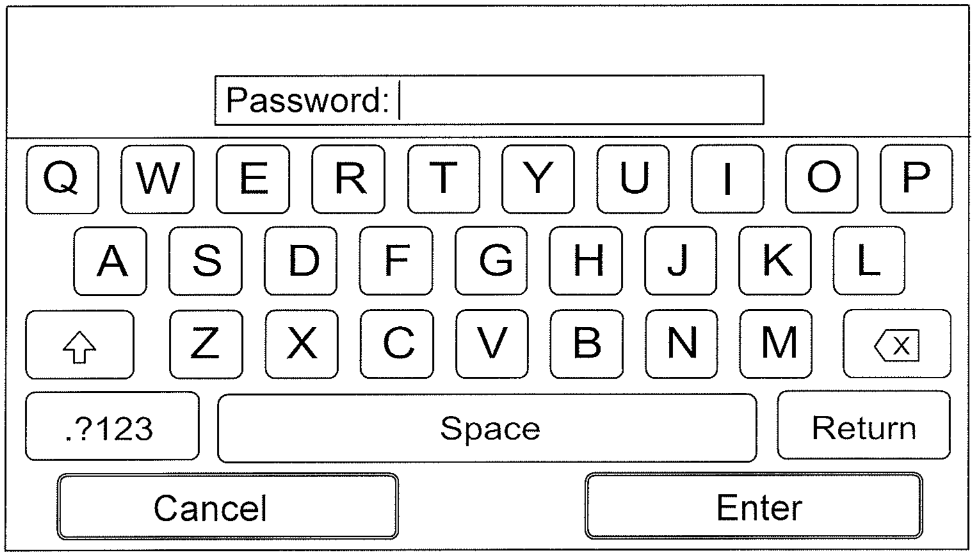
Figure 345:
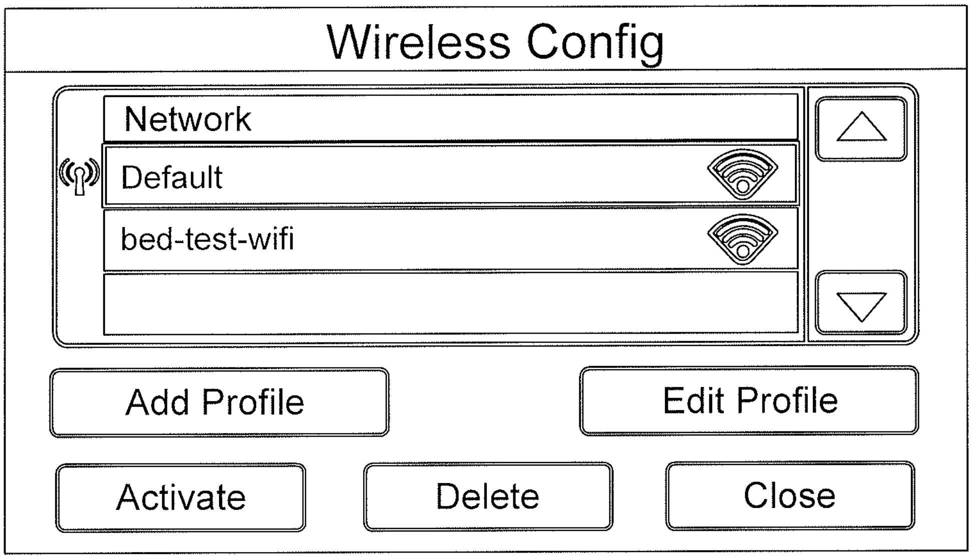
Figure 346:
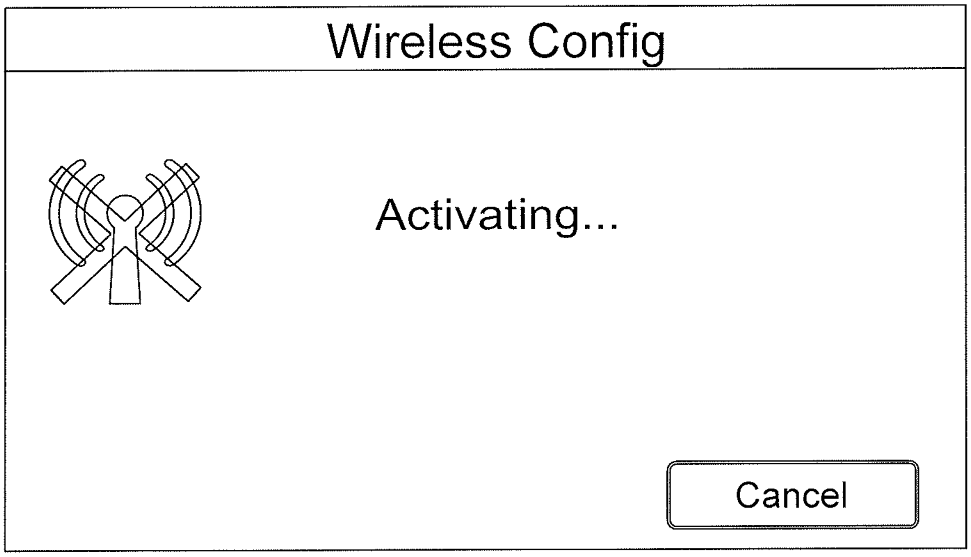
Figure 347:
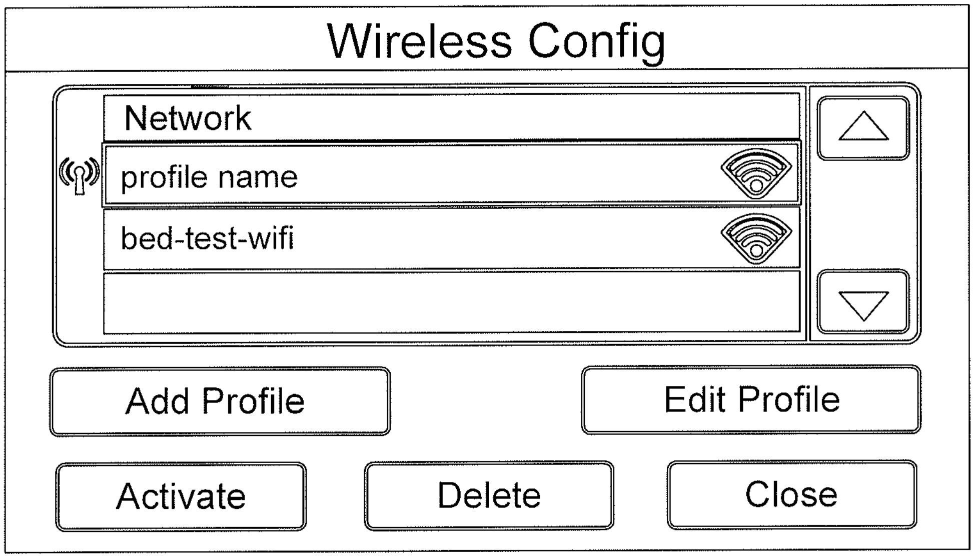
Figure 348:
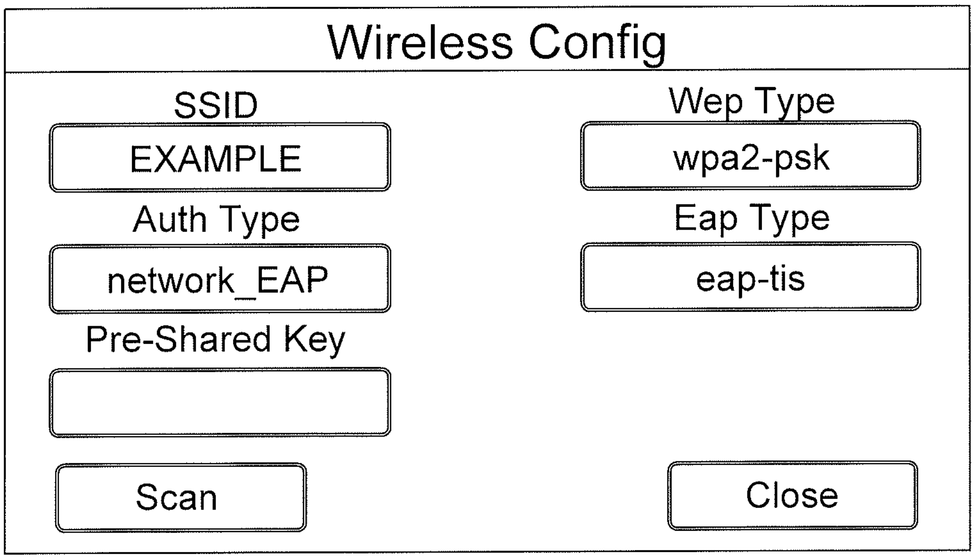
Figure 349:
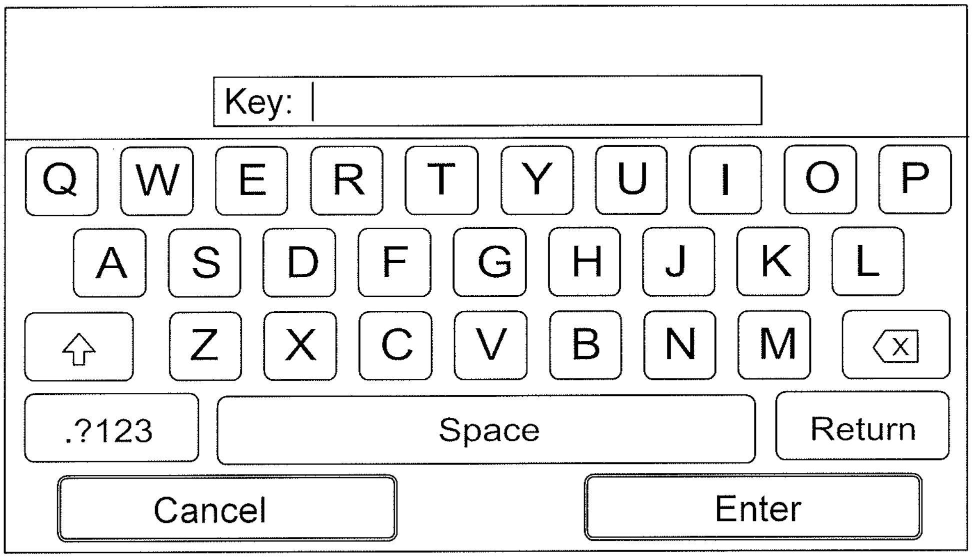
Figure 350:
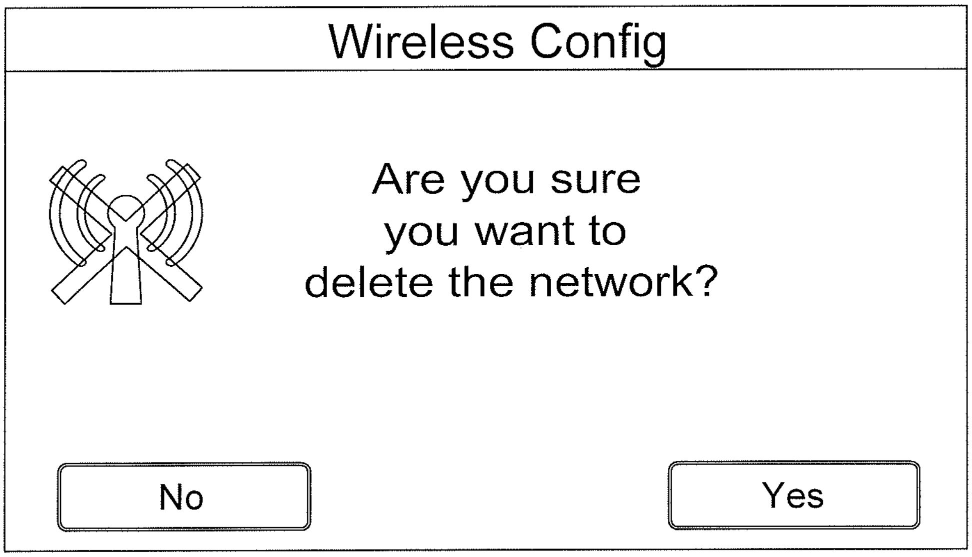
Figure 351:
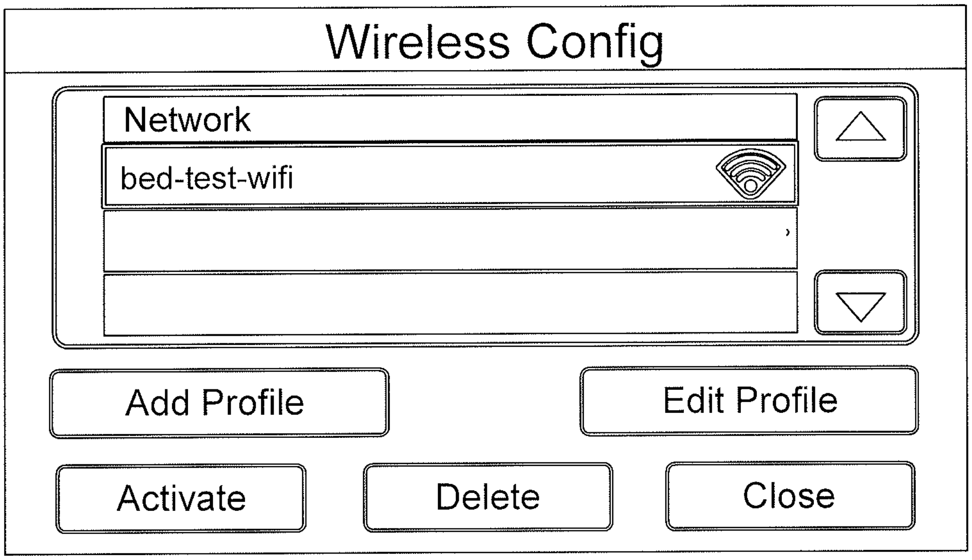
Figure 352:
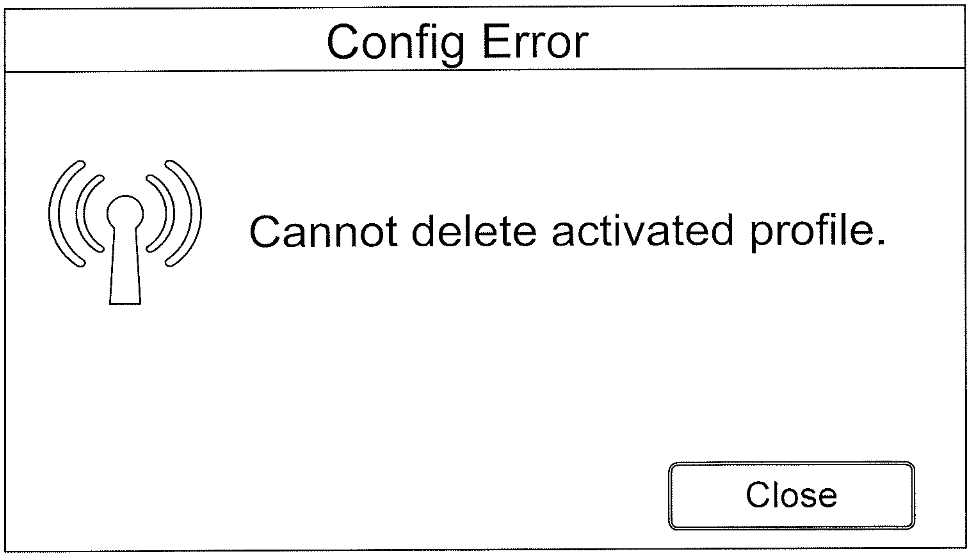
Figure 353:
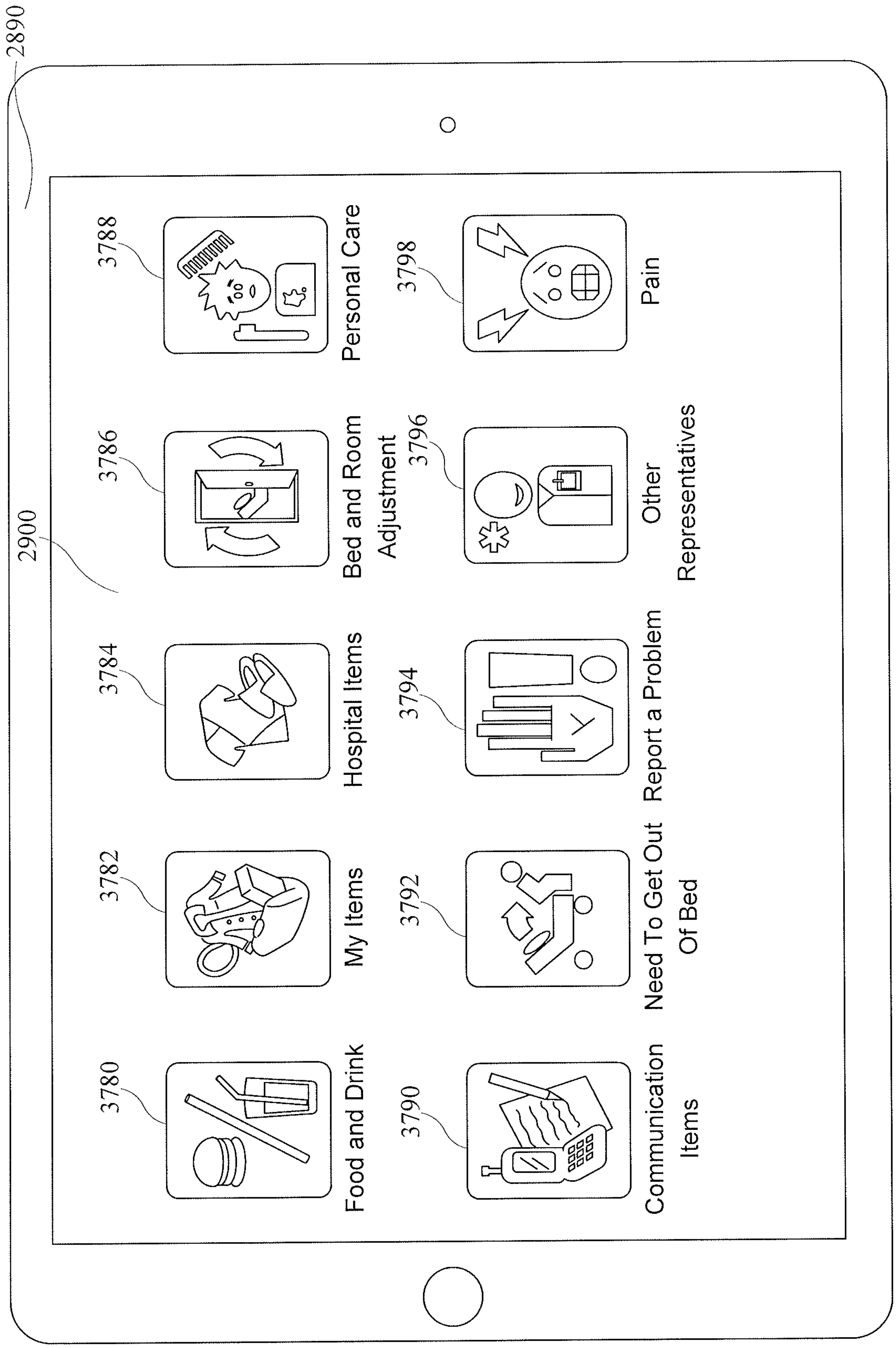
Figure 354:
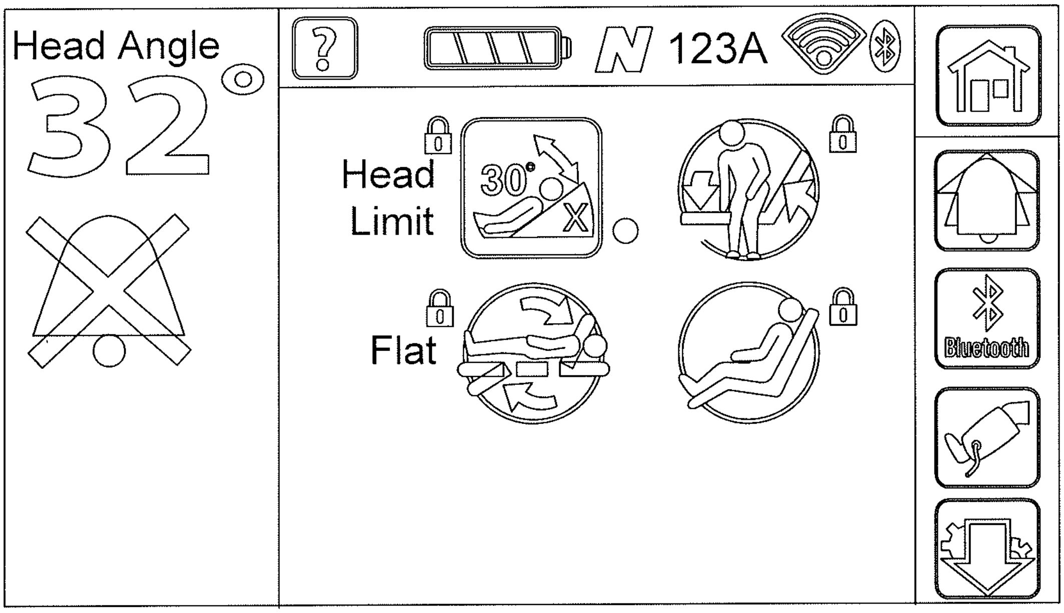
Figure 355:
Figure 356:
Figure 357:
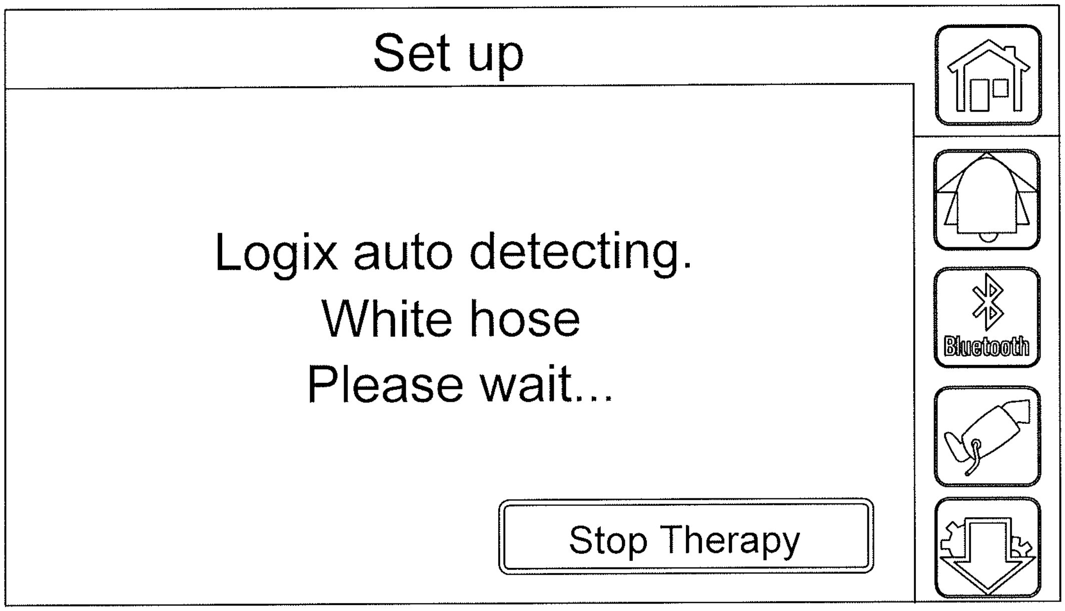
Figure 358:
Figure 359:
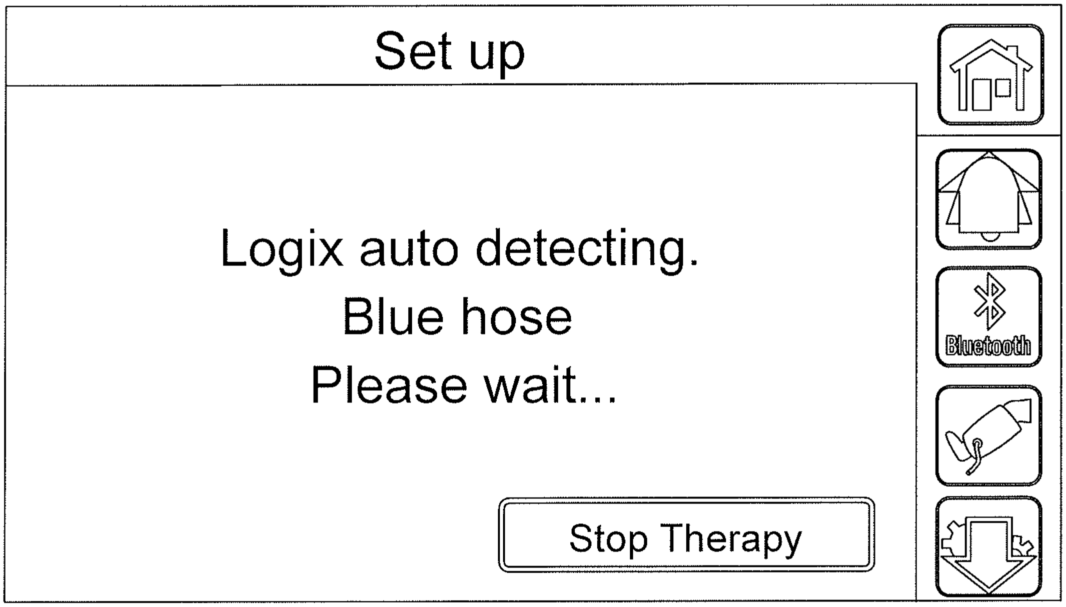
Figure 360:
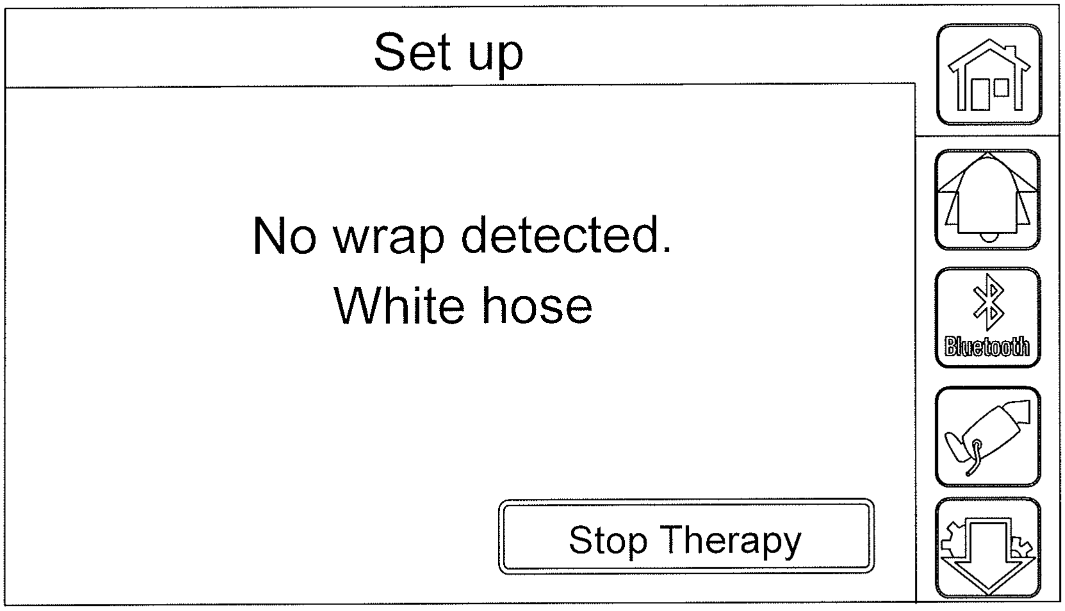
Figure 361:
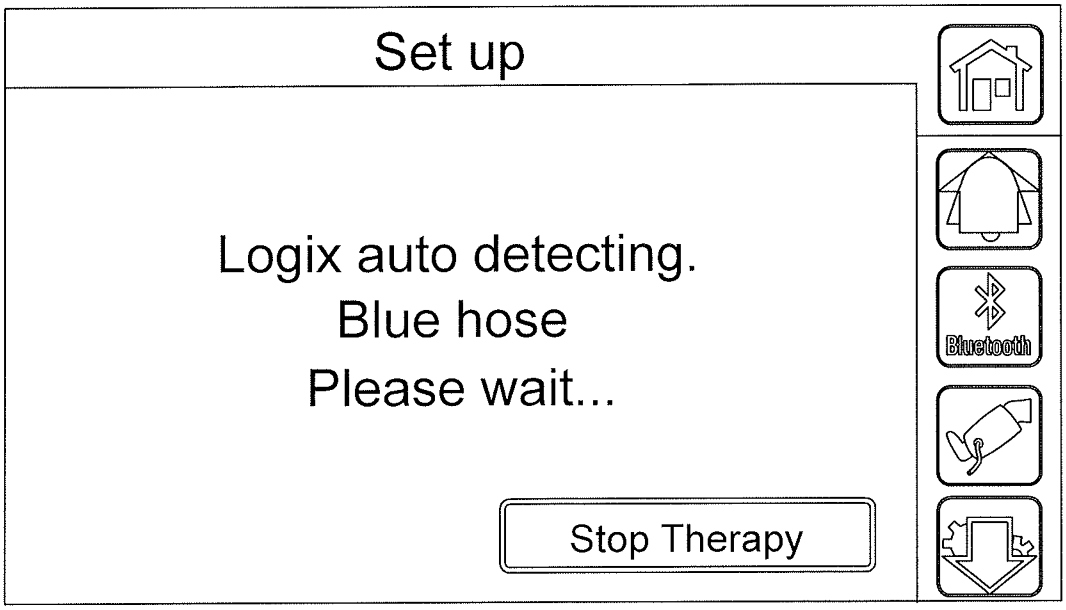
Figure 362:
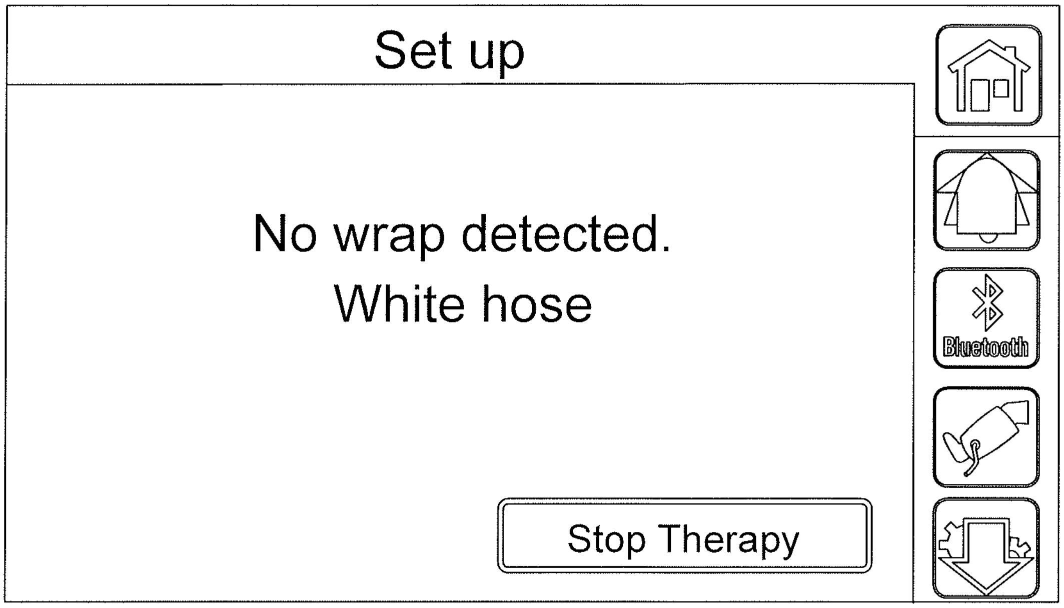
Figure 363:
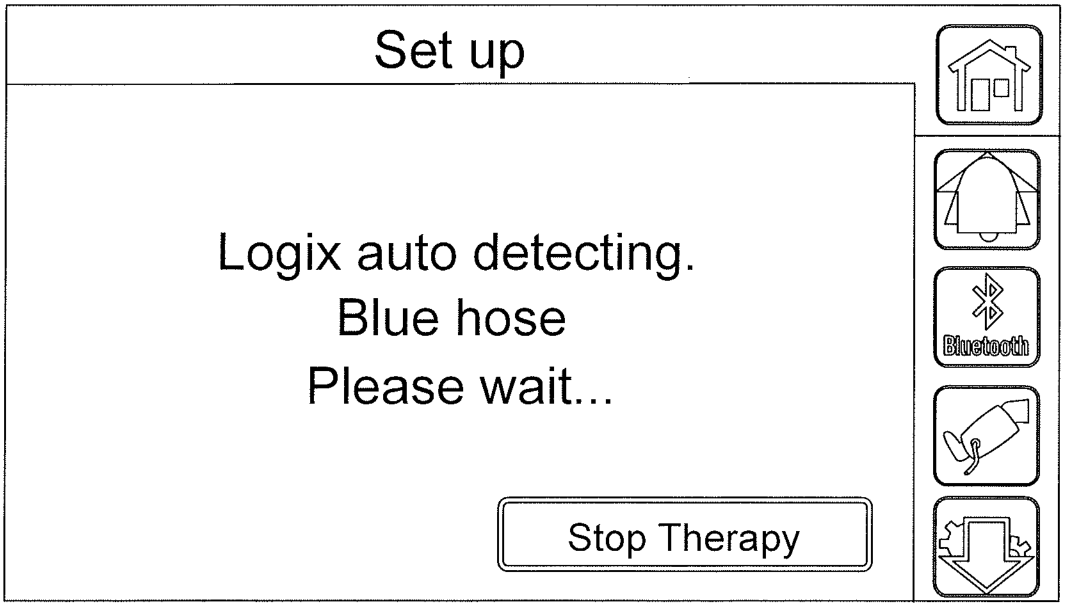
Figure 364:
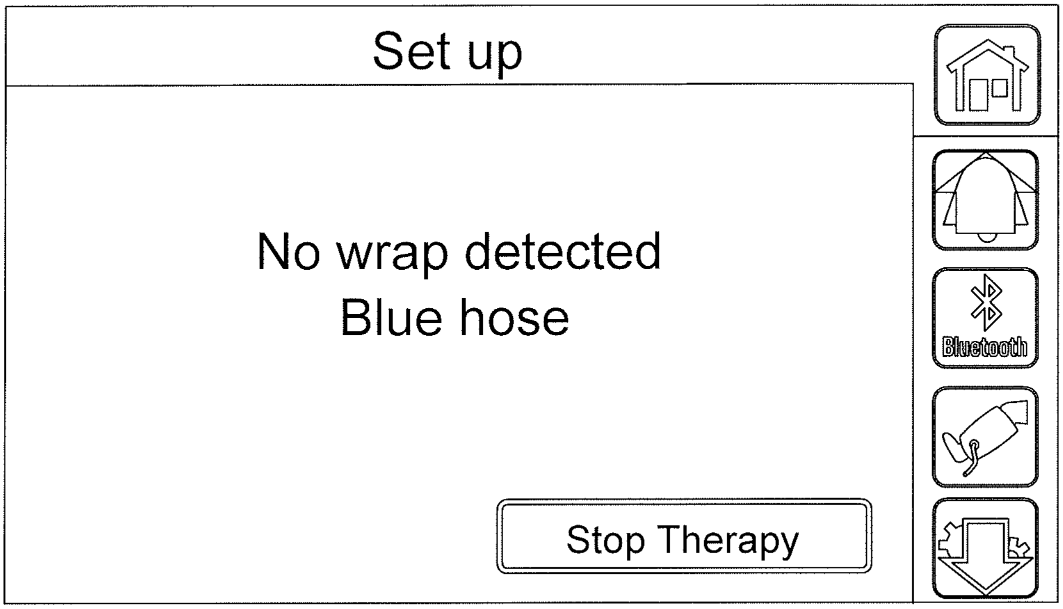
Figure 365:
Figure 366:
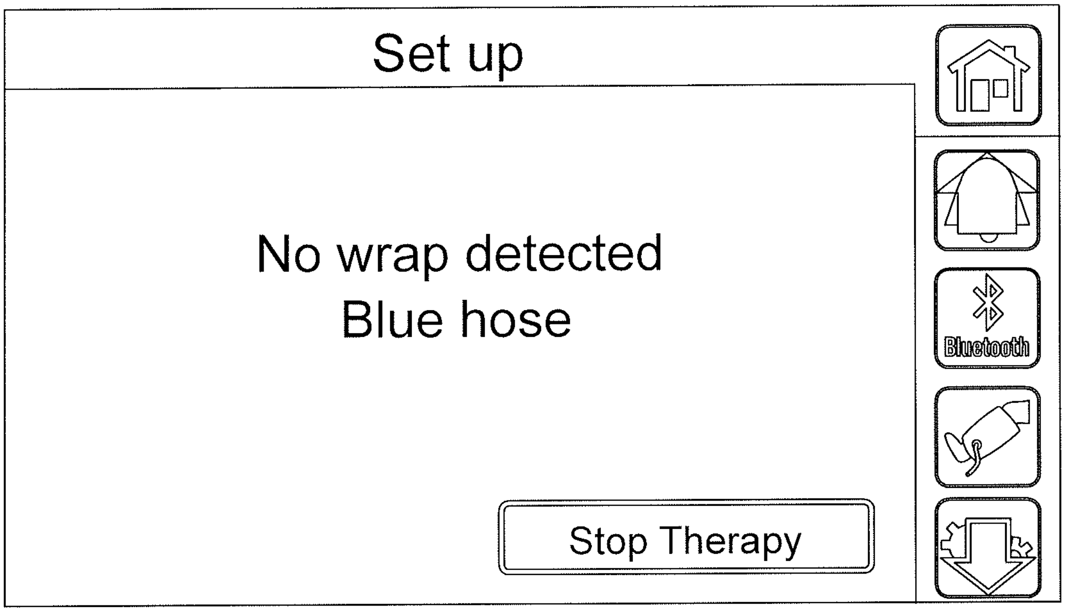
Figure 367:
Figure 368:
Figure 369:
Figure 370:
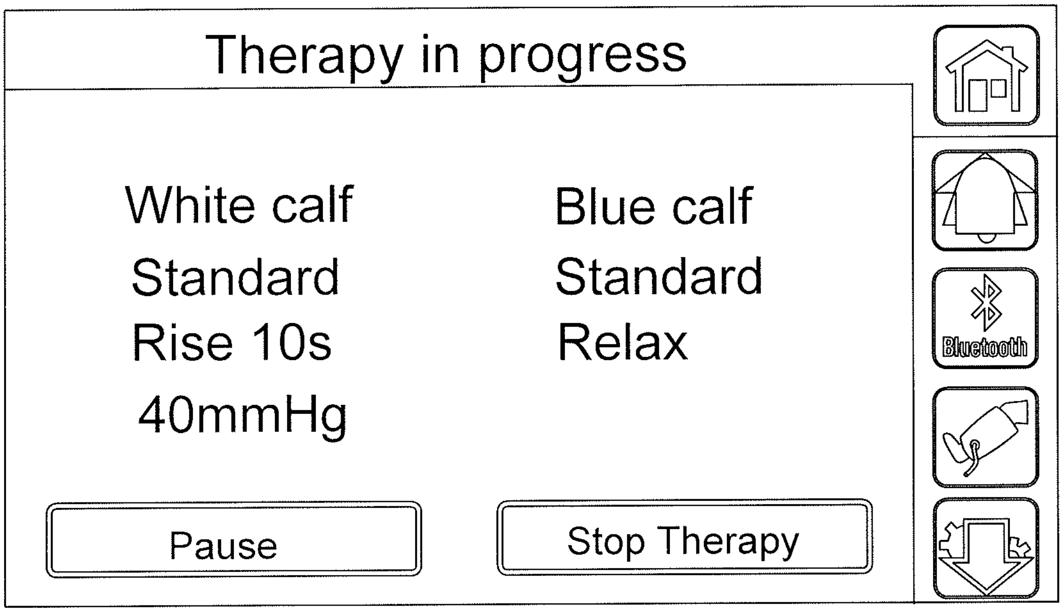
Figure 371:
Figure 372:
Figure 373:
Figure 374:
Figure 375:
Figure 376:
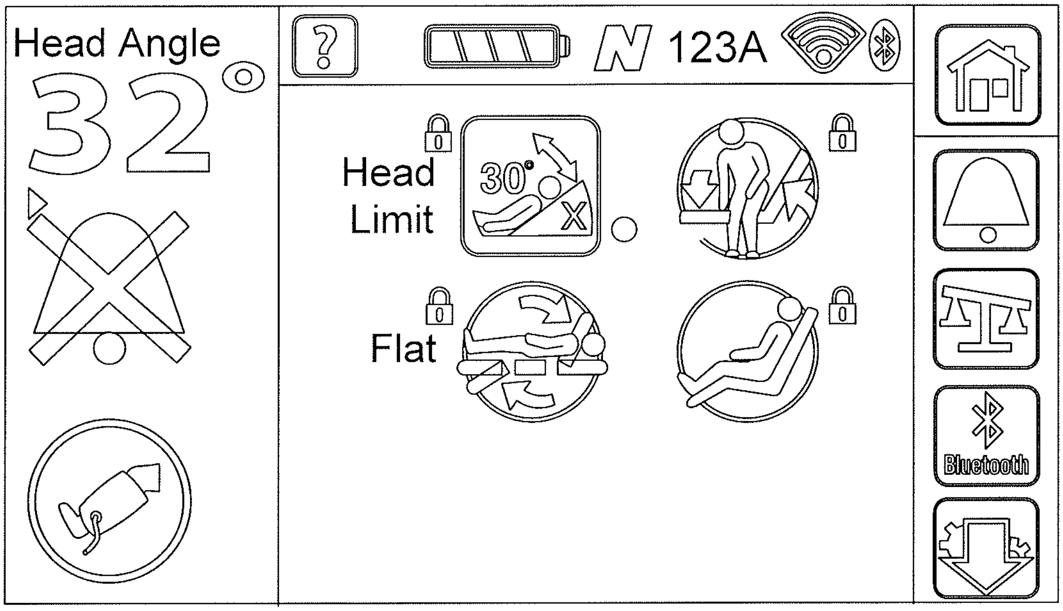
Figure 377A:
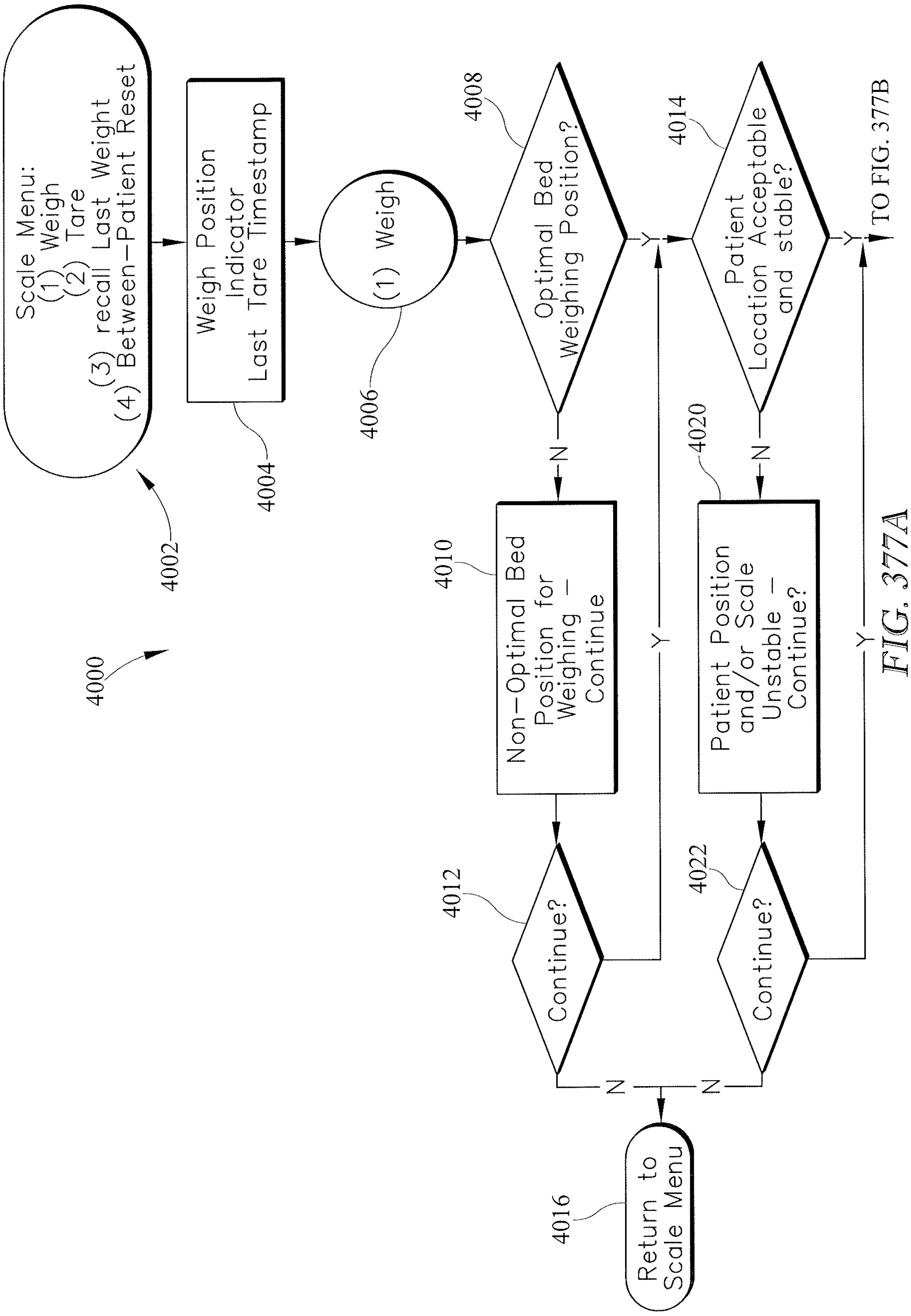
Figure 377B:
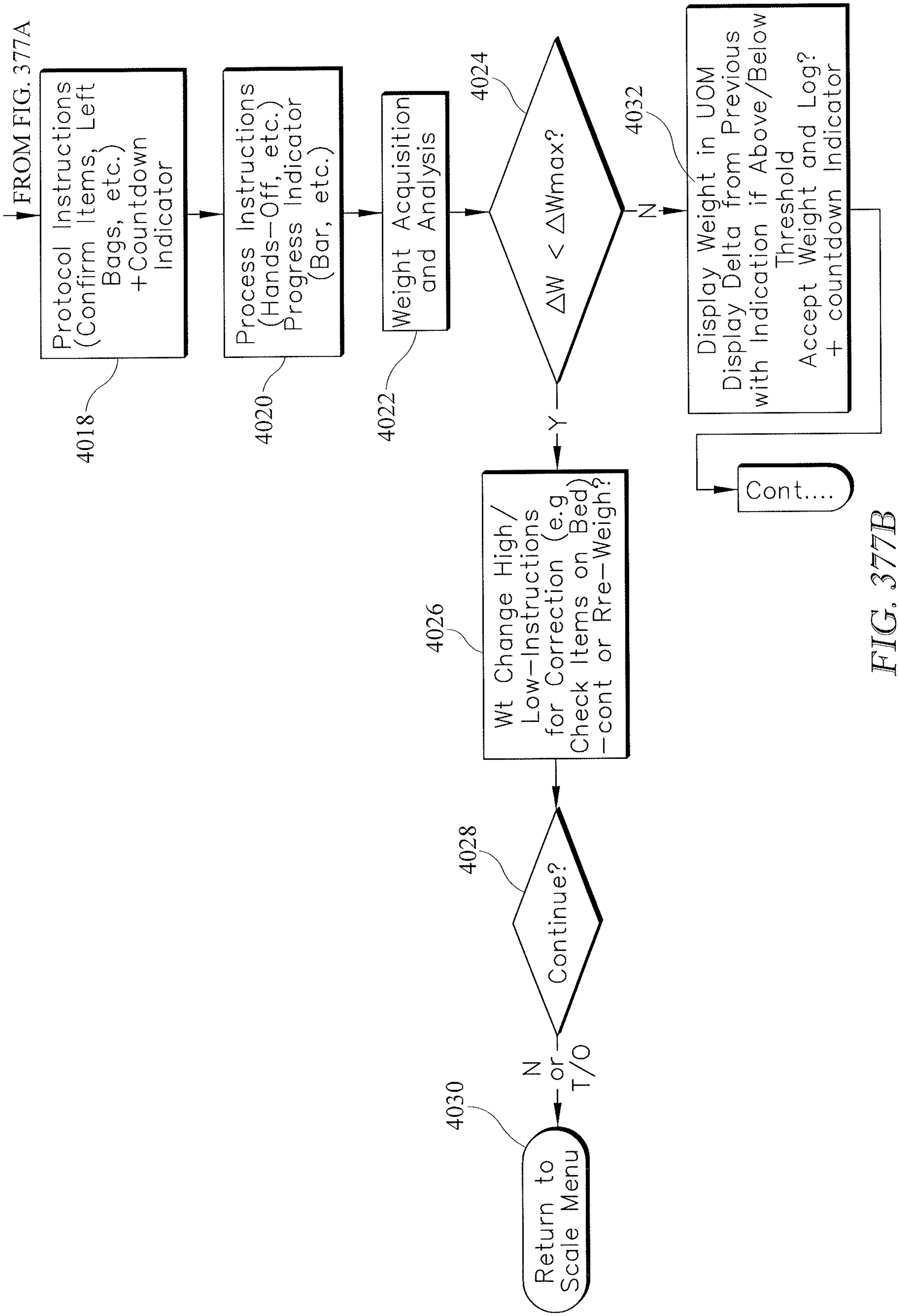
Figure 377C:
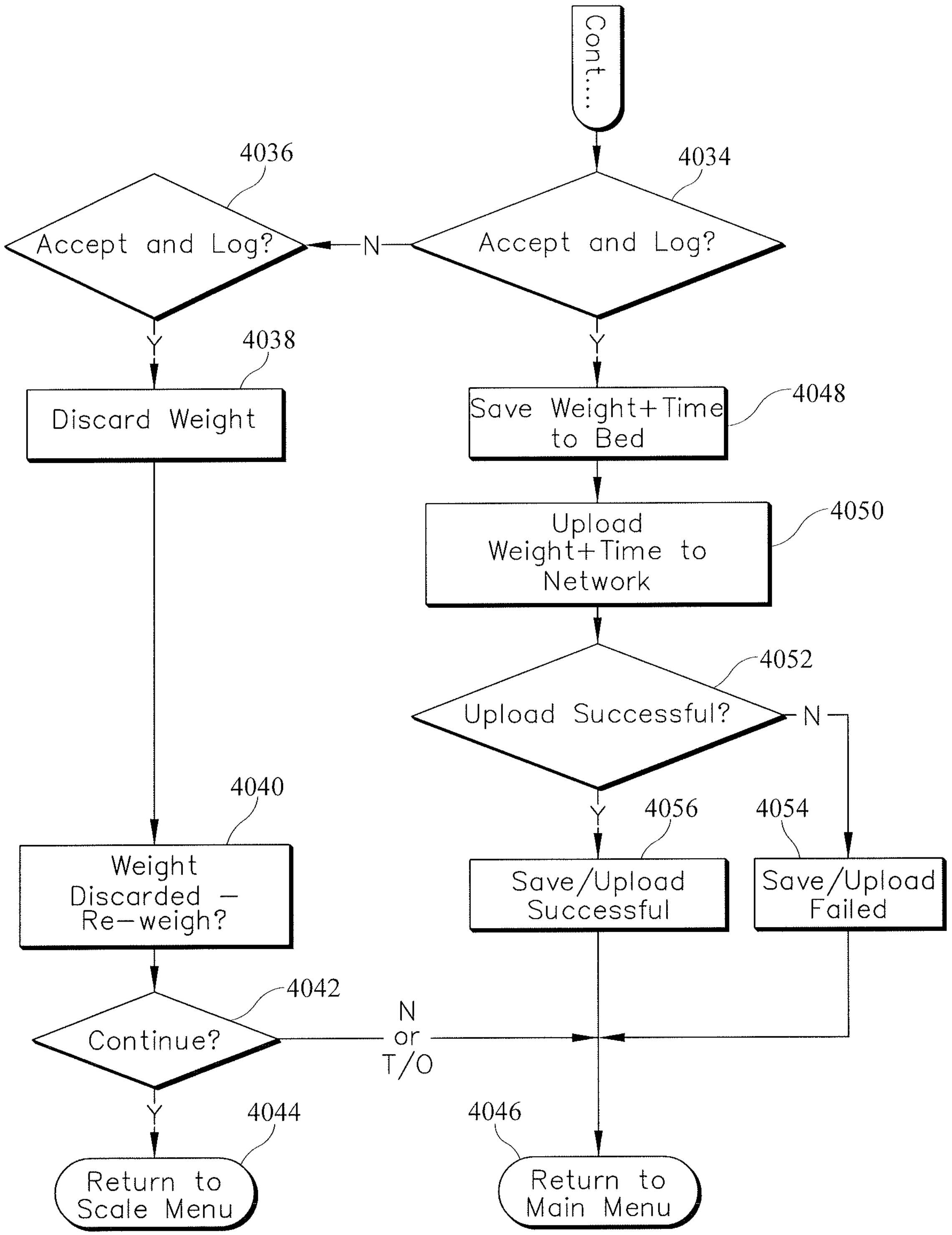
Figure 378A:
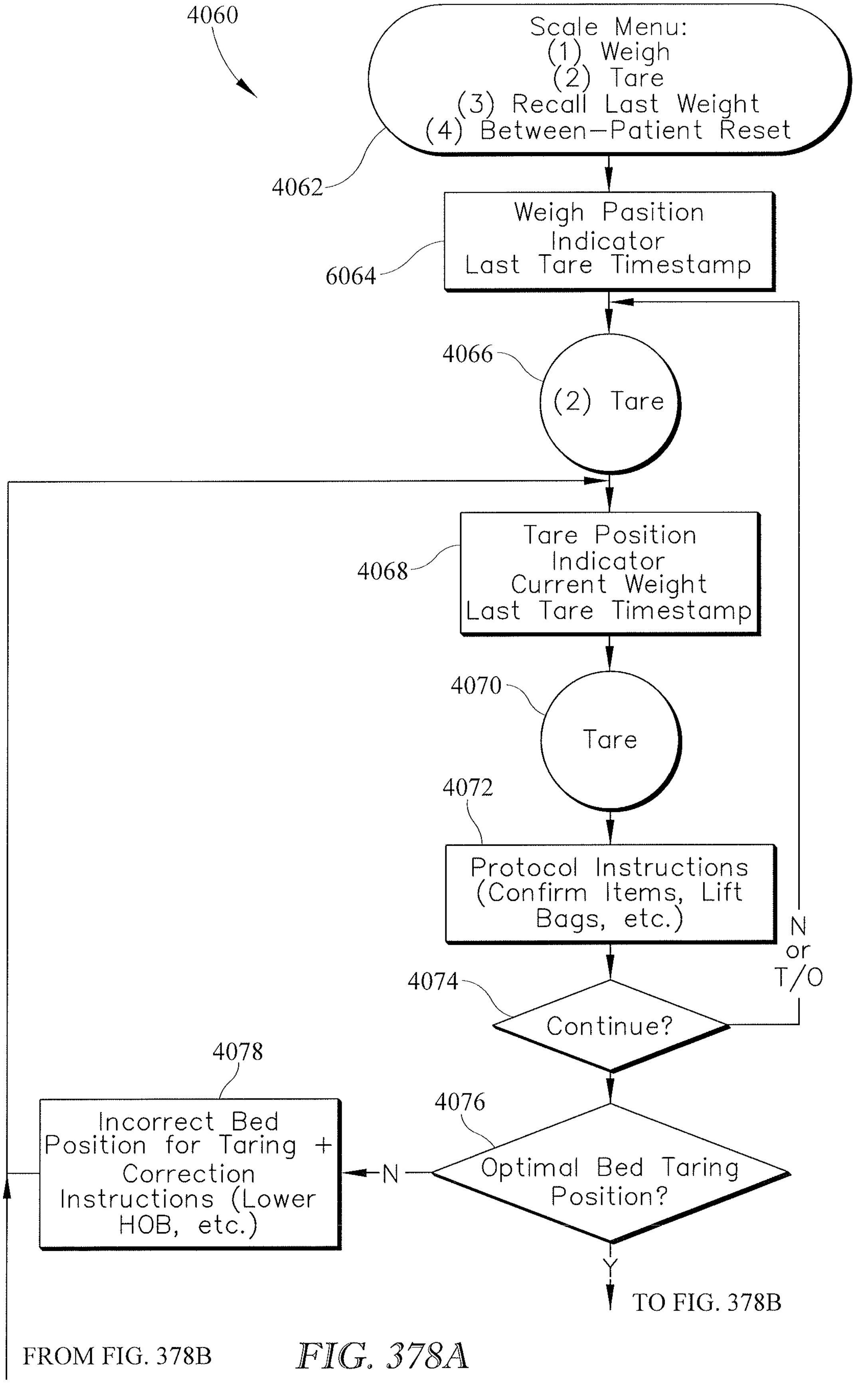
Figure 378B:
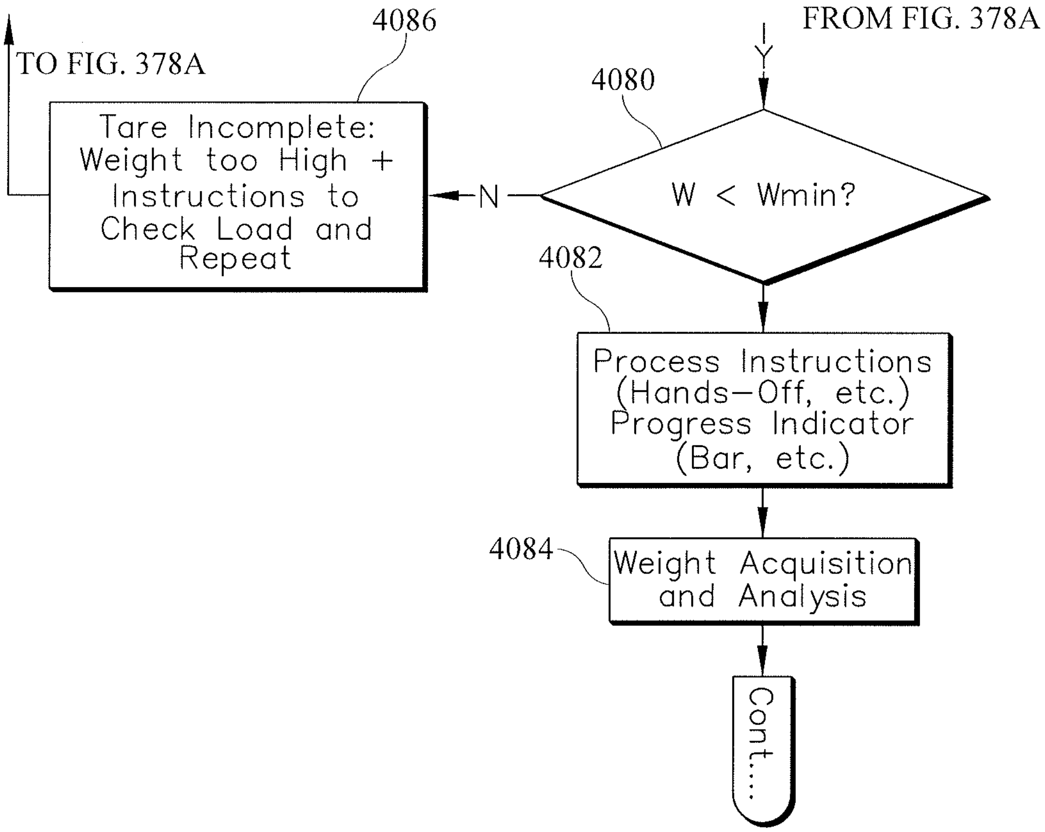
Figure 378C:
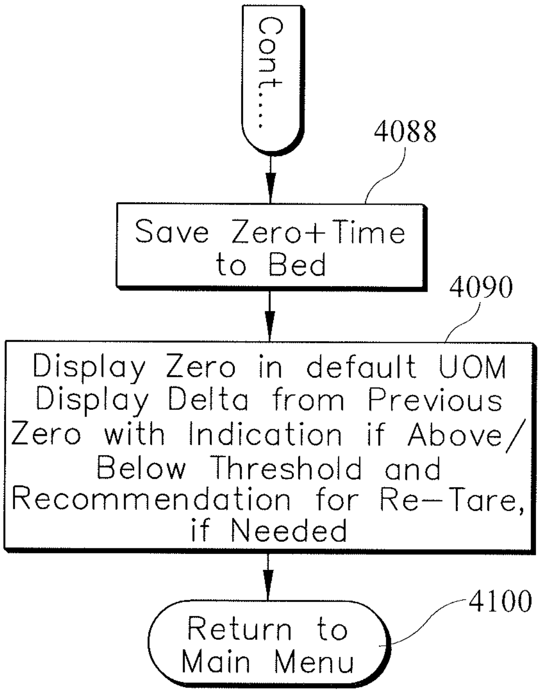
Figure 379:
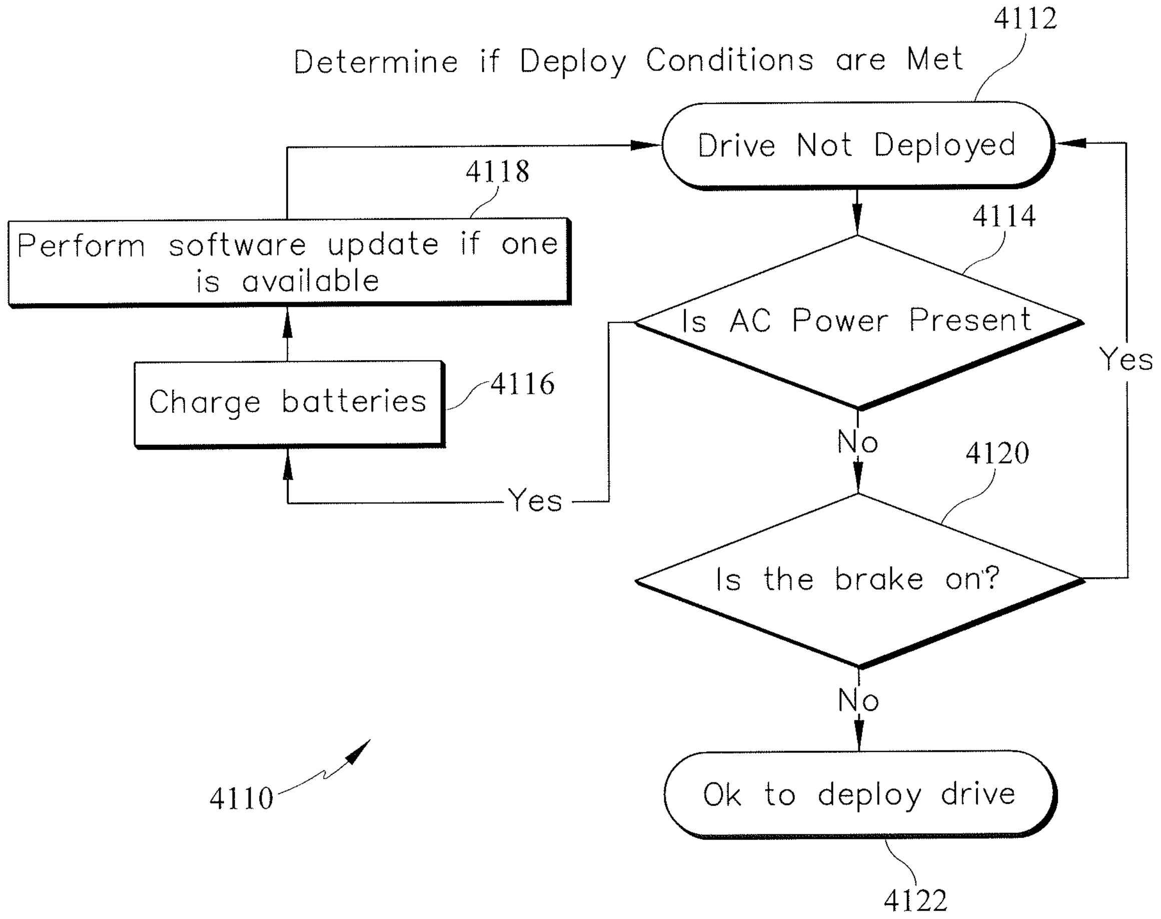
Figure 380:
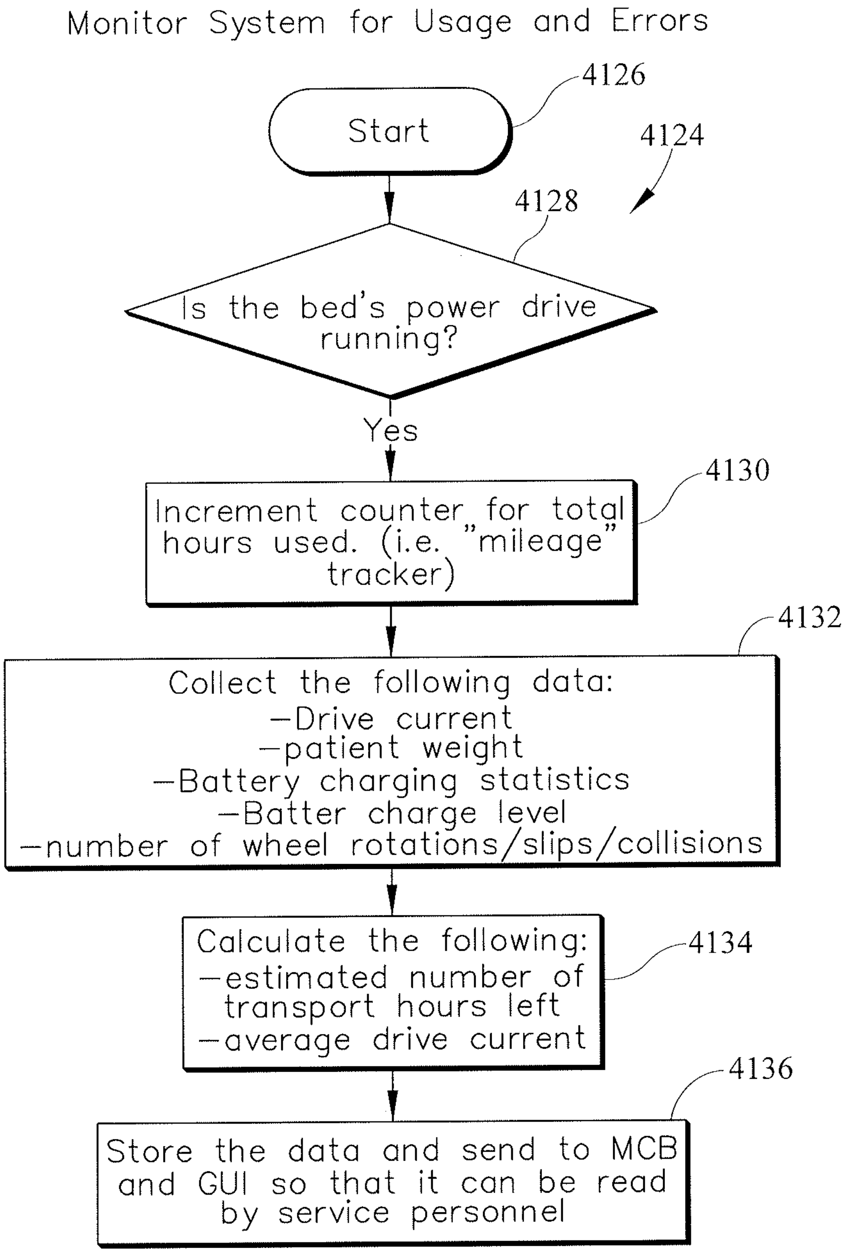
Figure 381A:
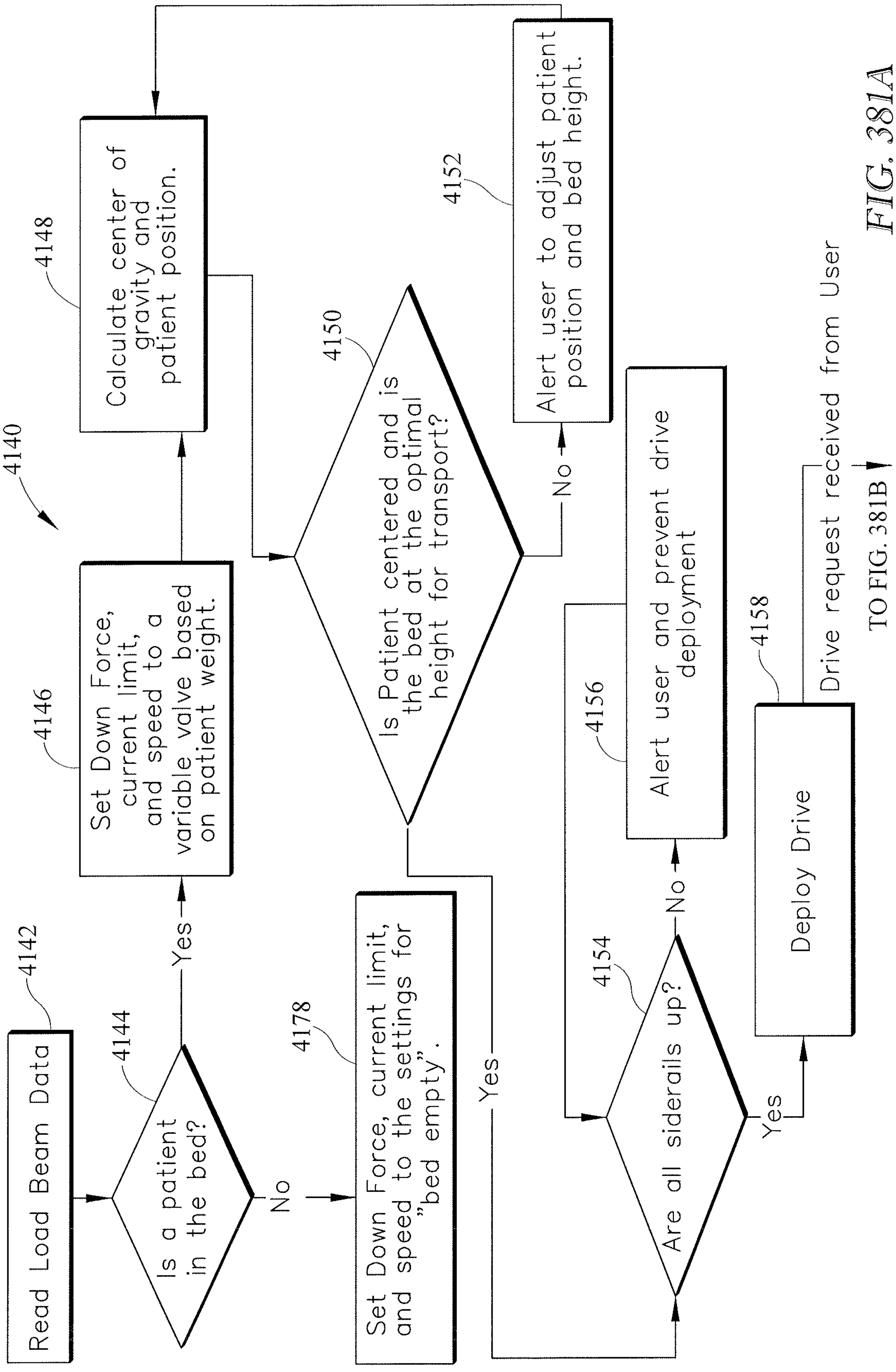
Figure 381B:
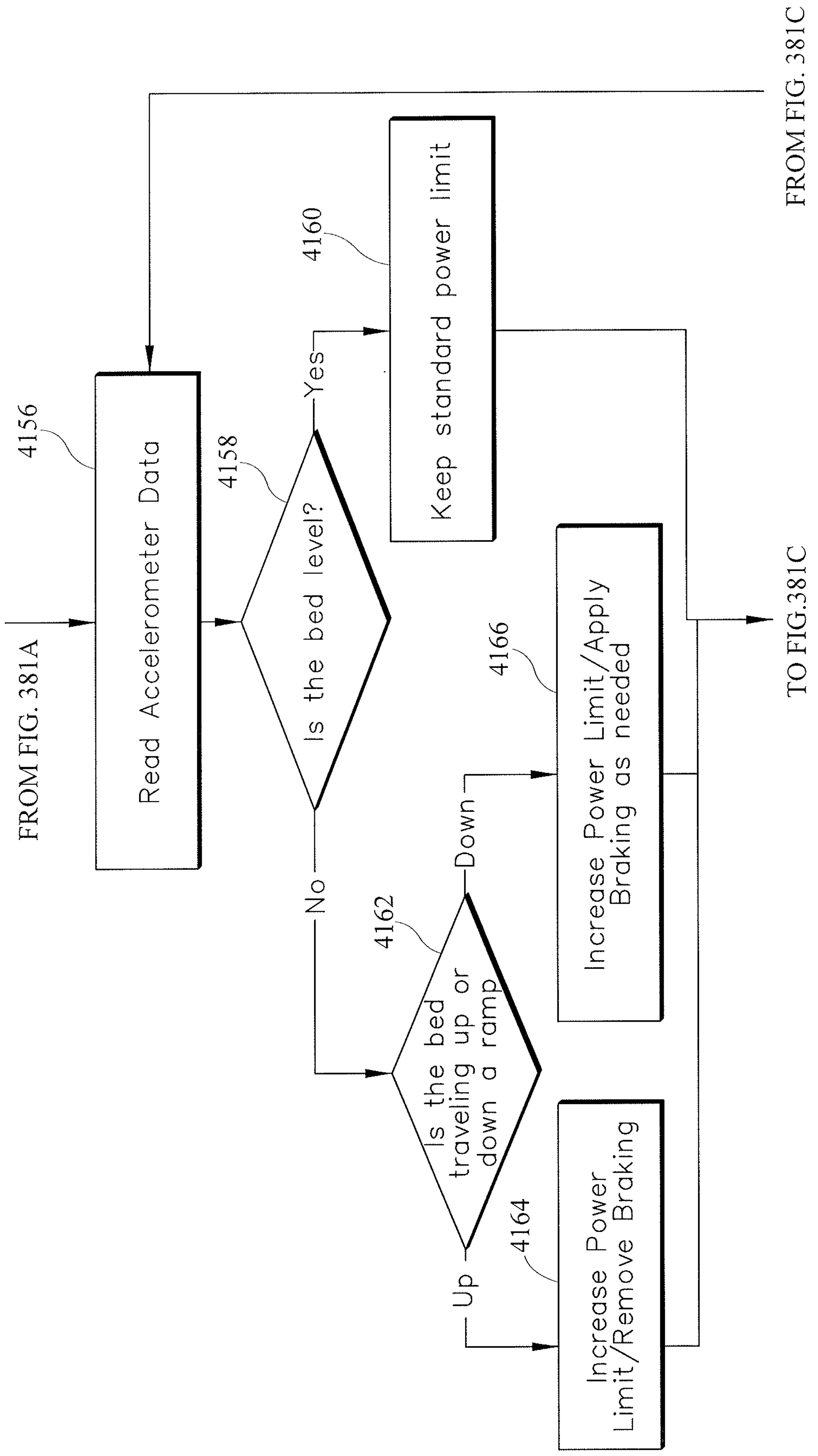
Figure 381C:
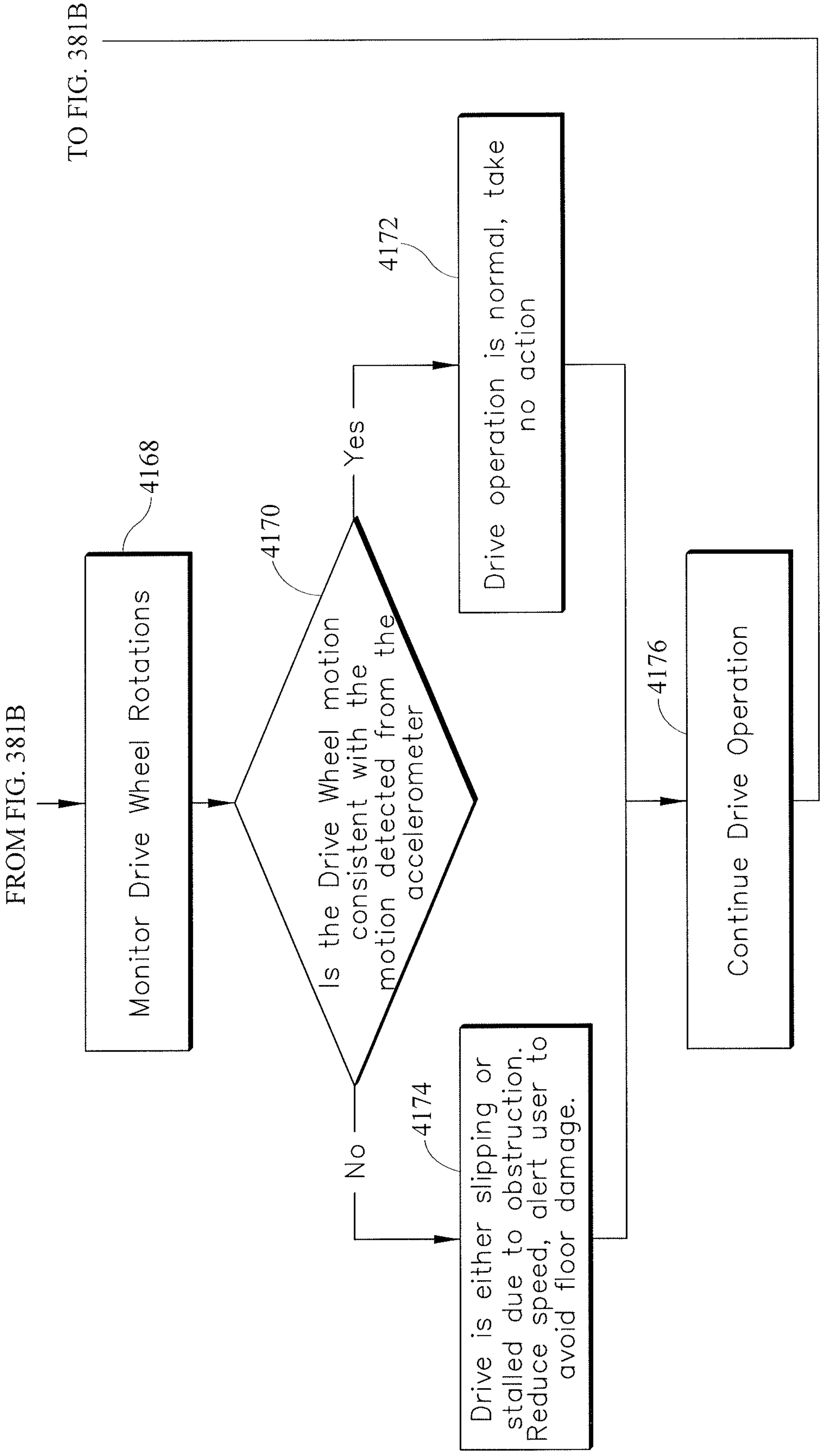
Figure 382:
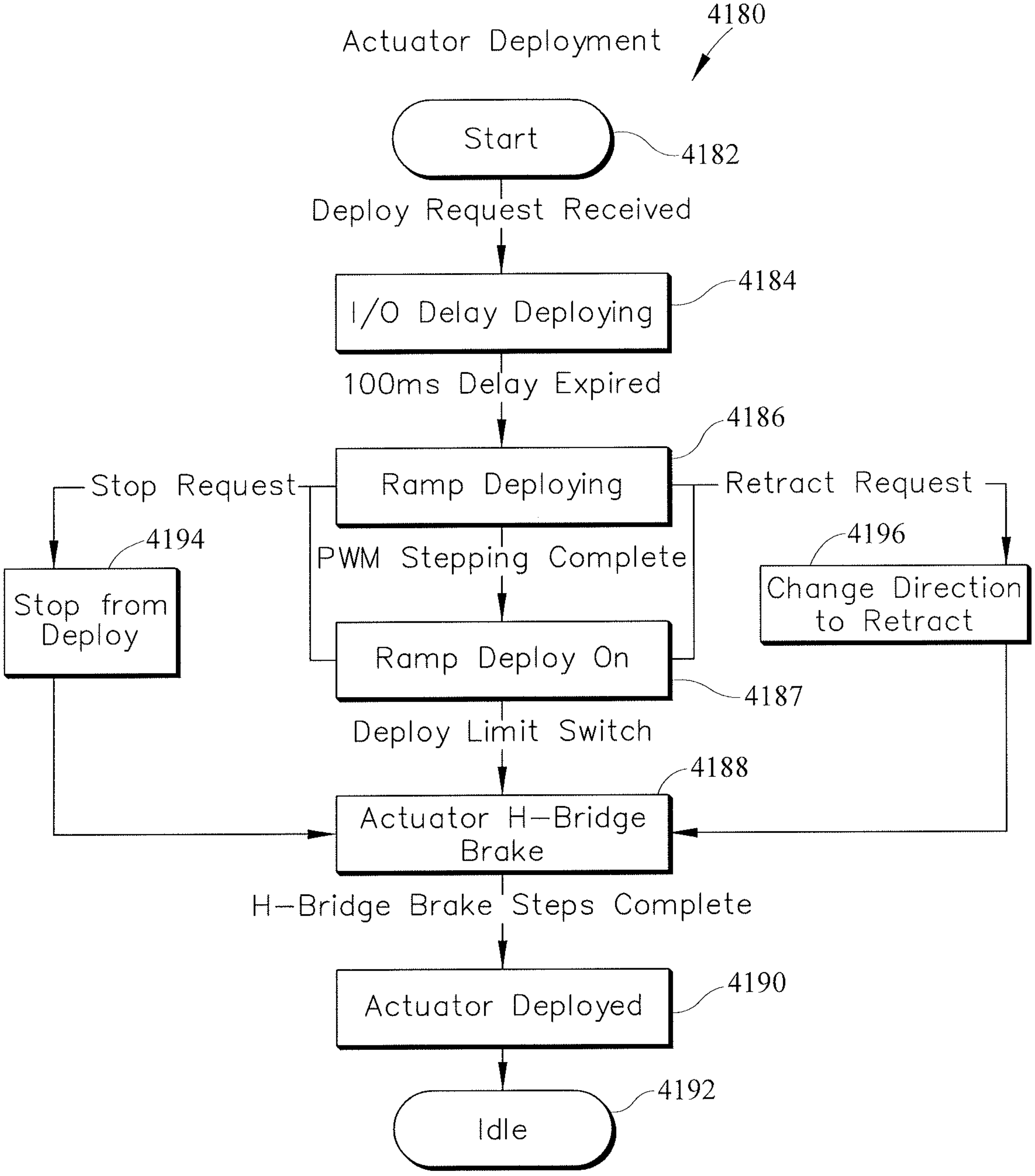
Figure 383:
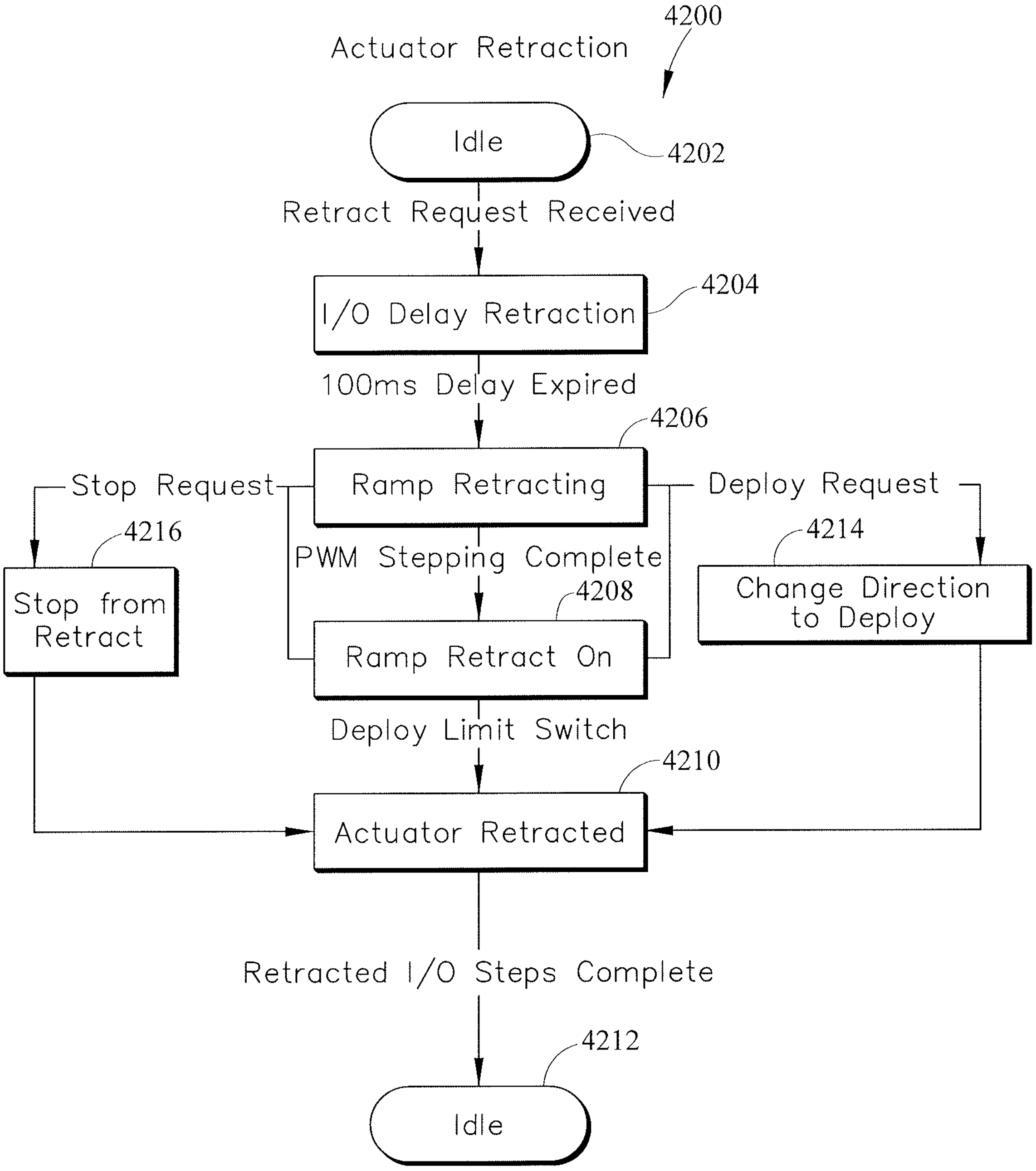
Figure 384:
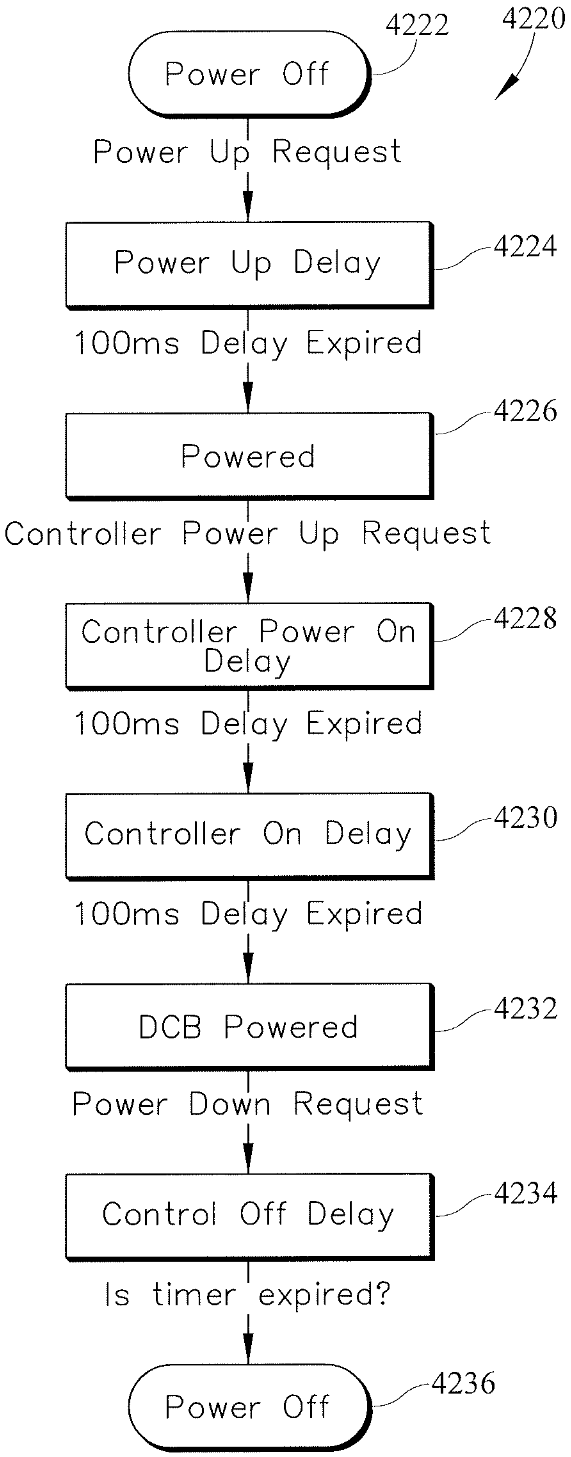
Figure 385:
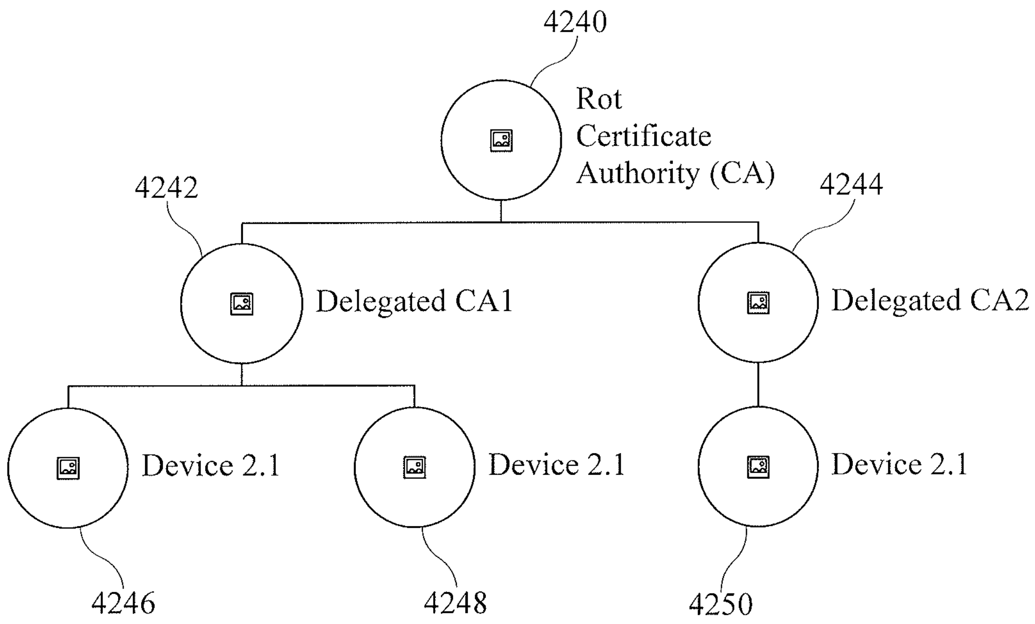
Figure 386A:
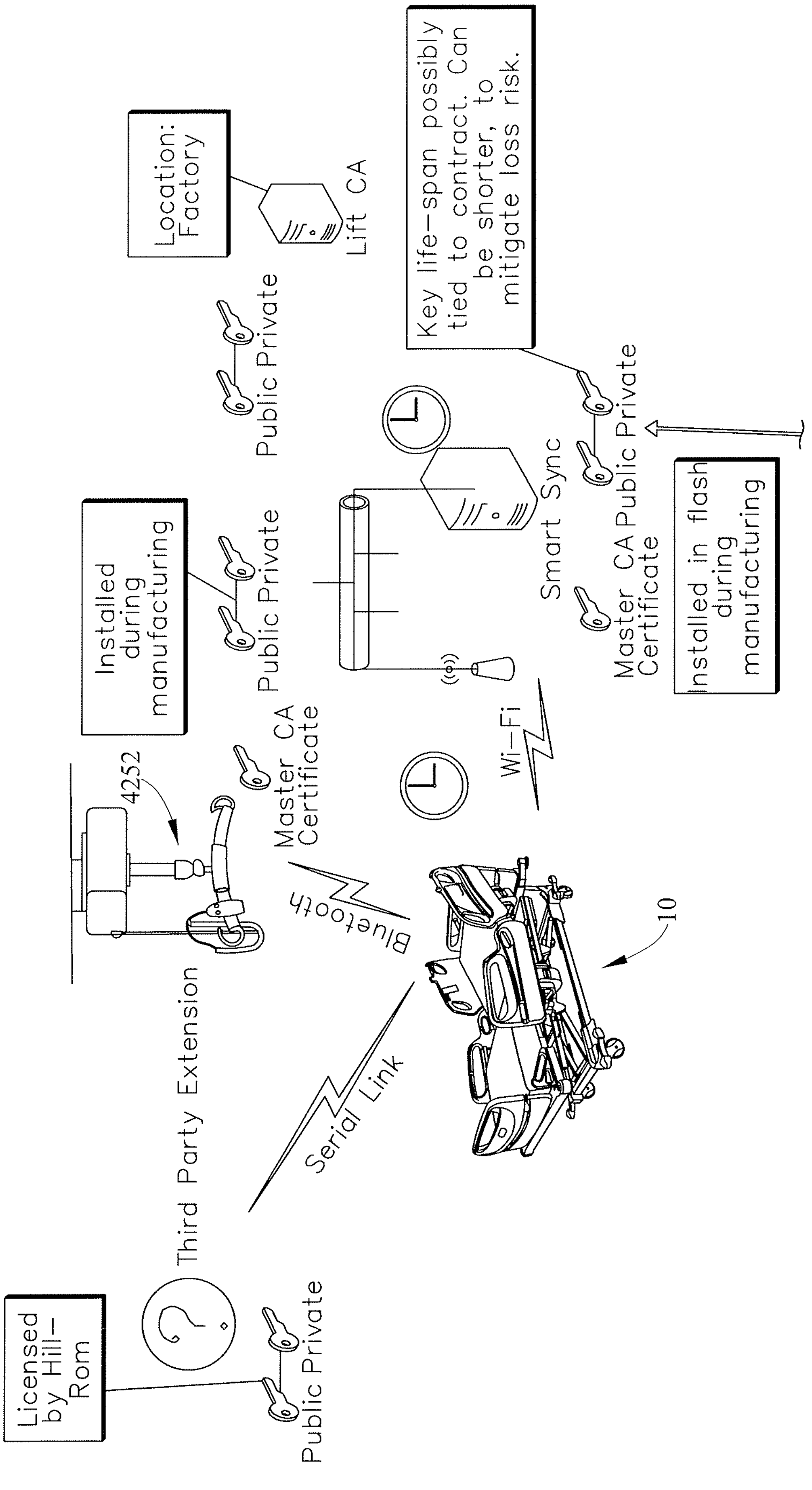
Figure 386B:
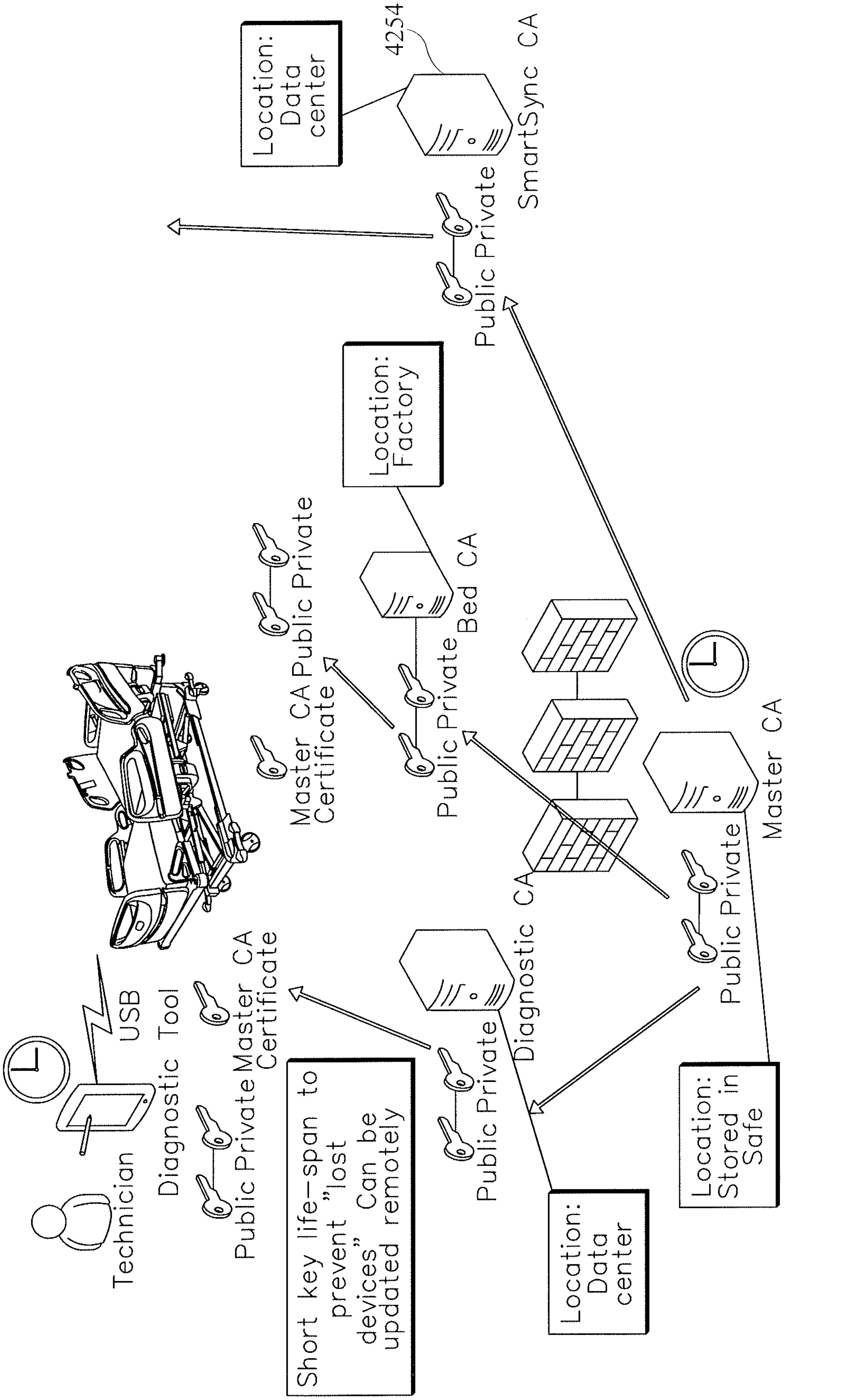
Figure 387A:
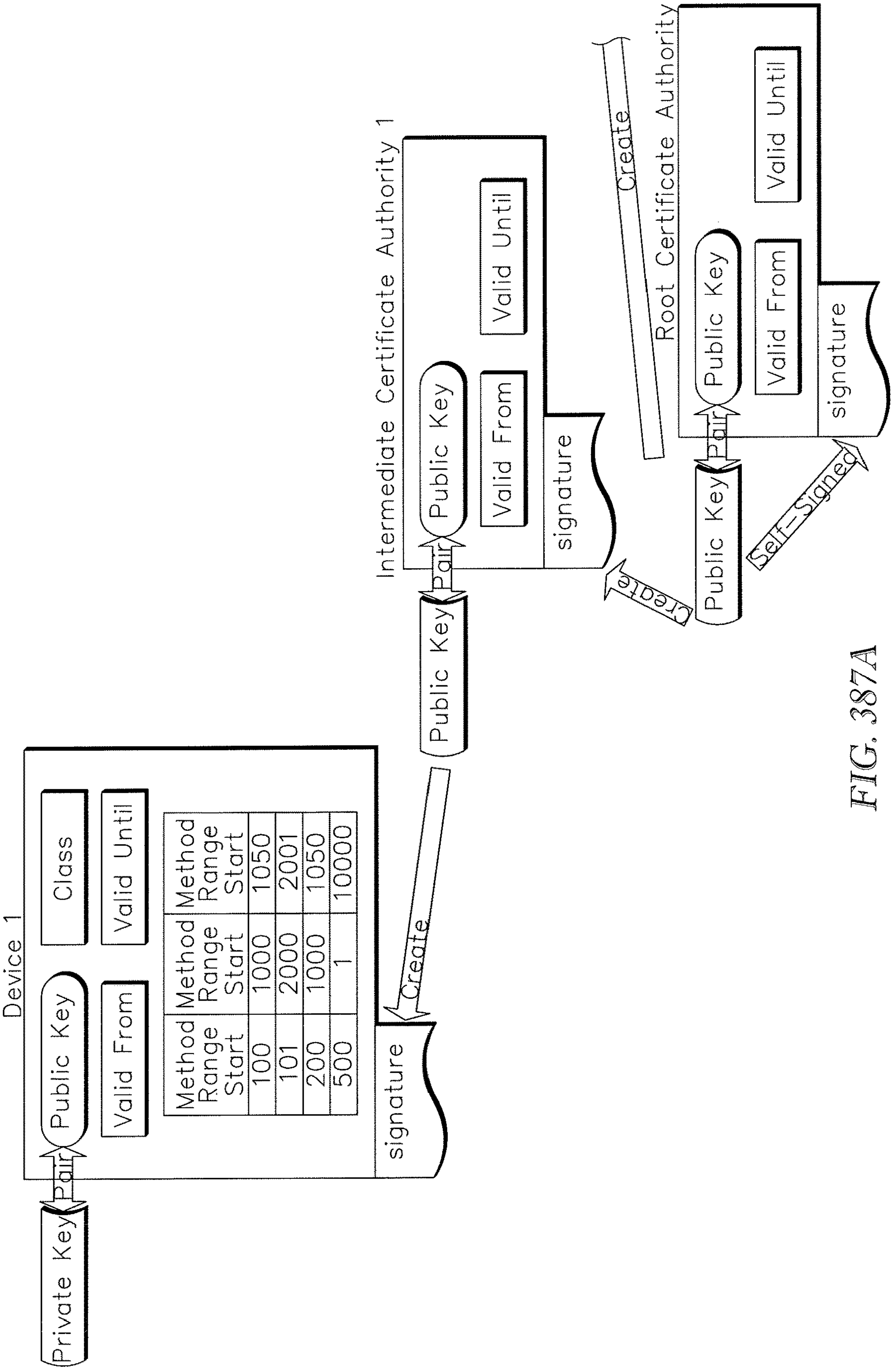
Figure 387B:
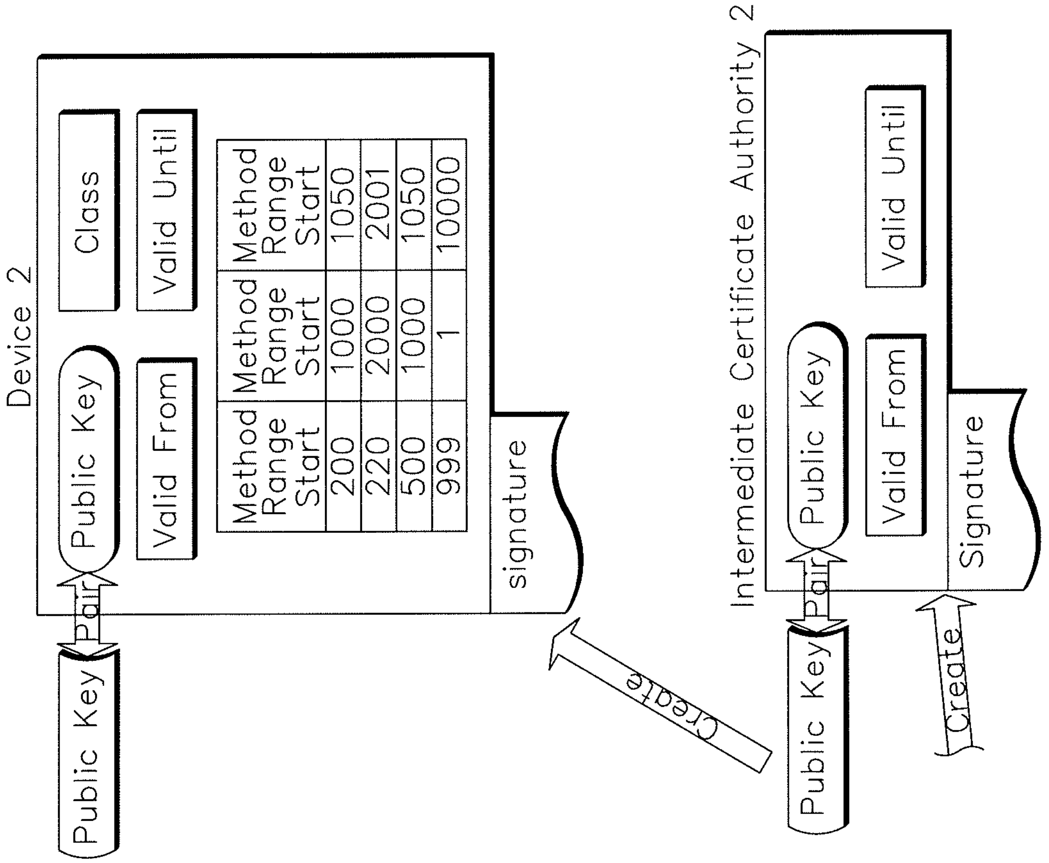
Figure 388:
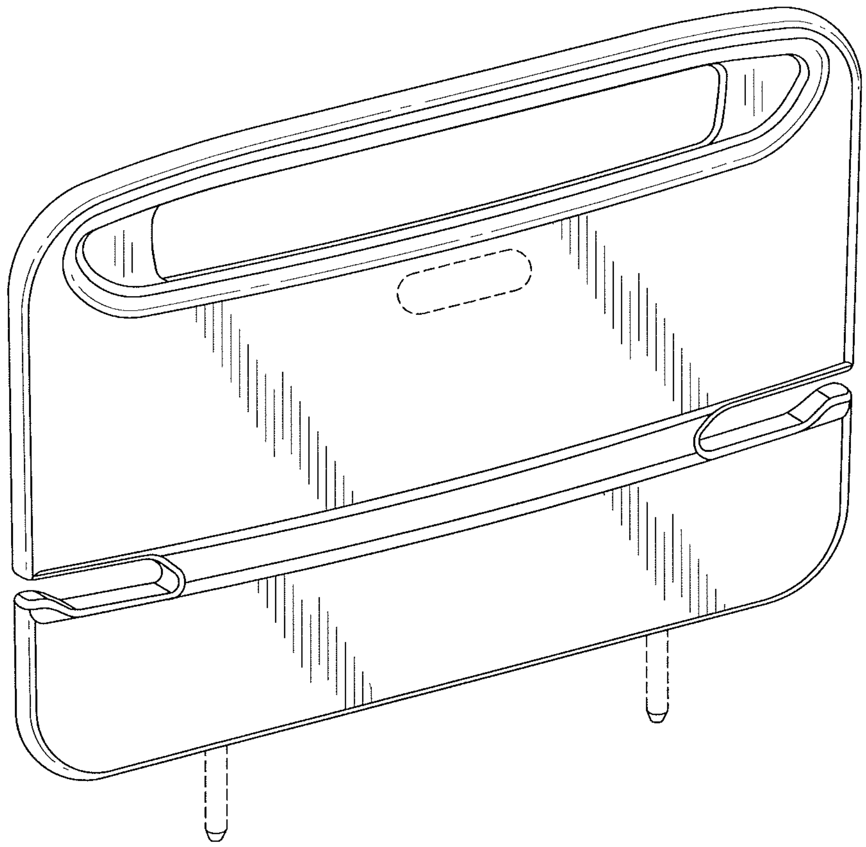
Figure 389:
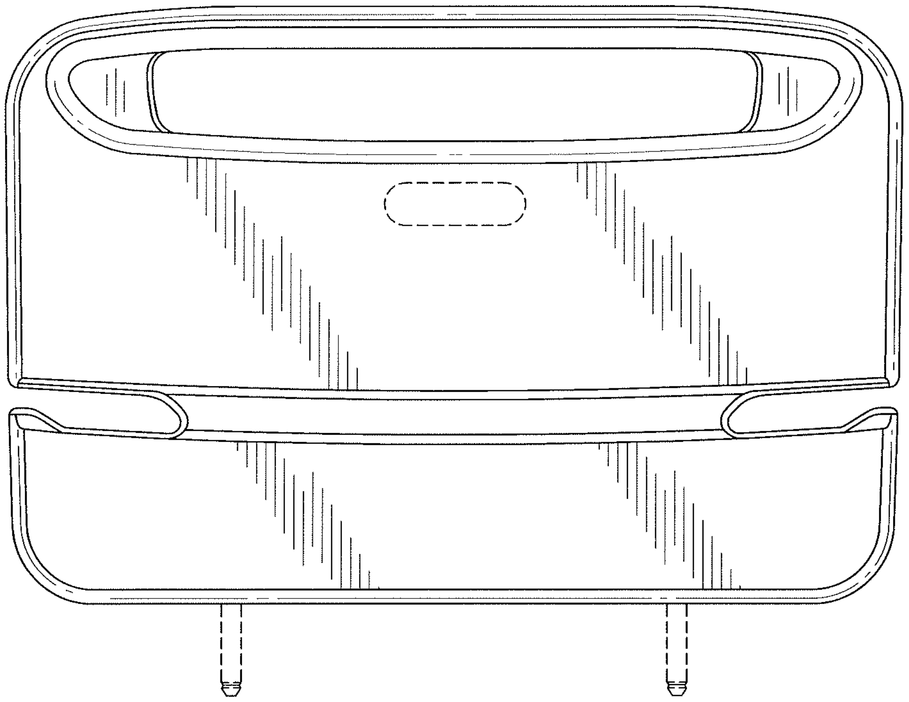
Figure 390:
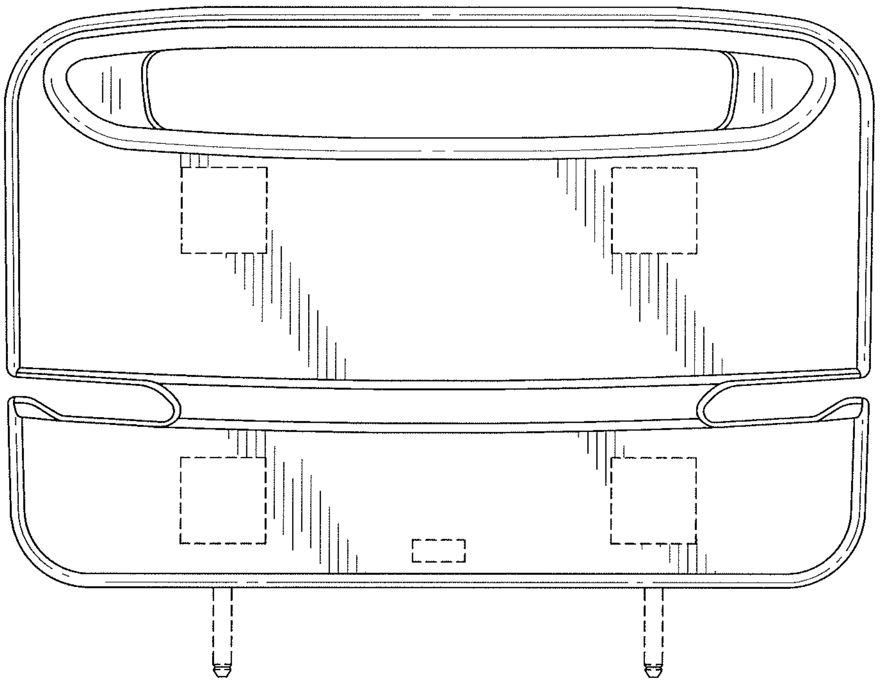
Figure 391:
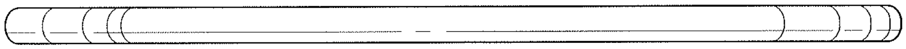
Figure 392:
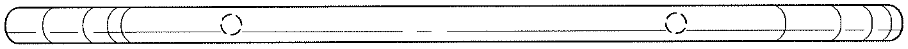
Figure 393:
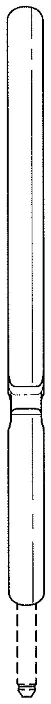
Figure 394:
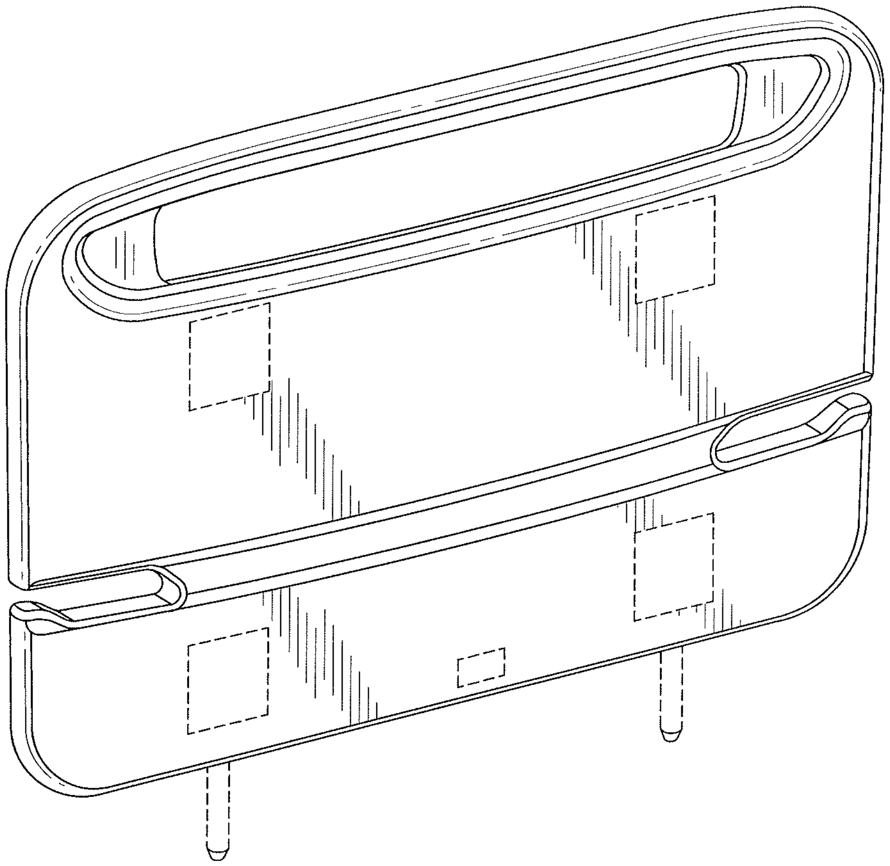
Figure 395:
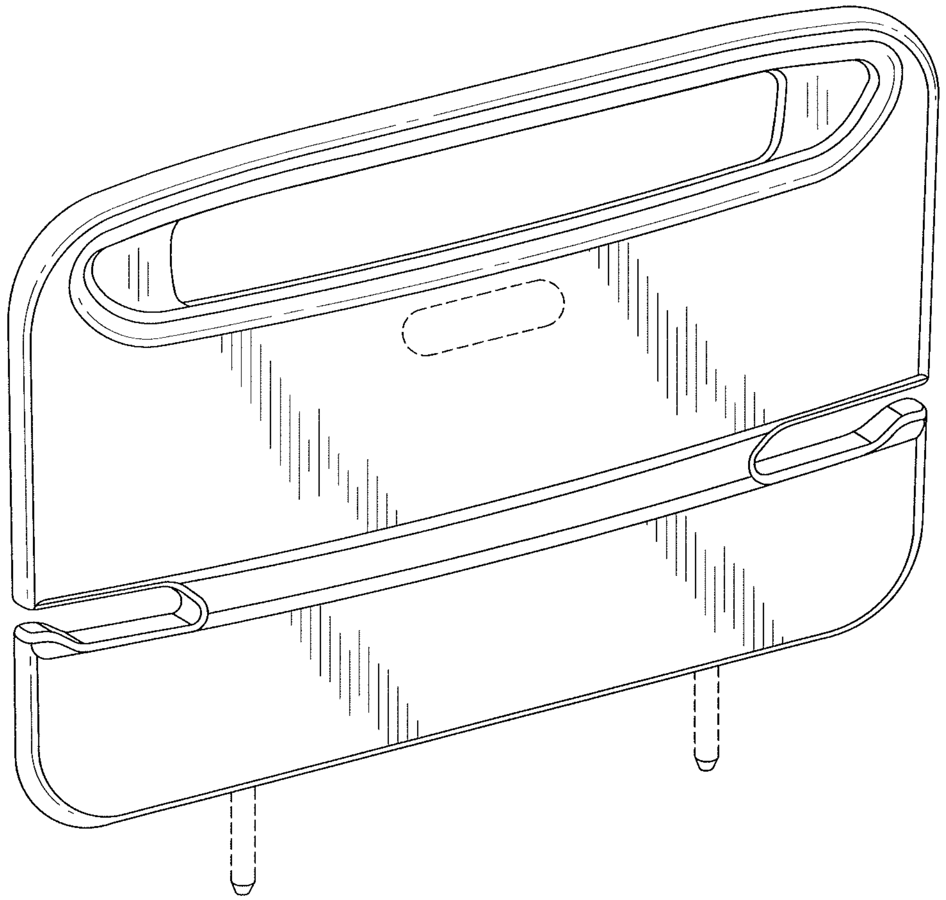
Figure 396:
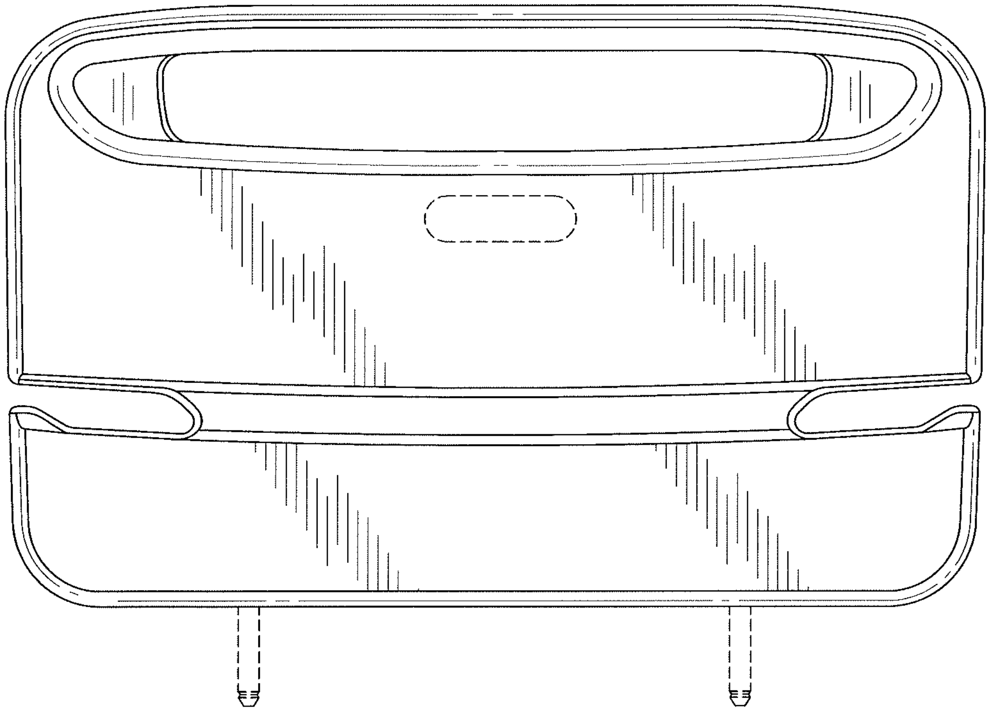
Figure 397:
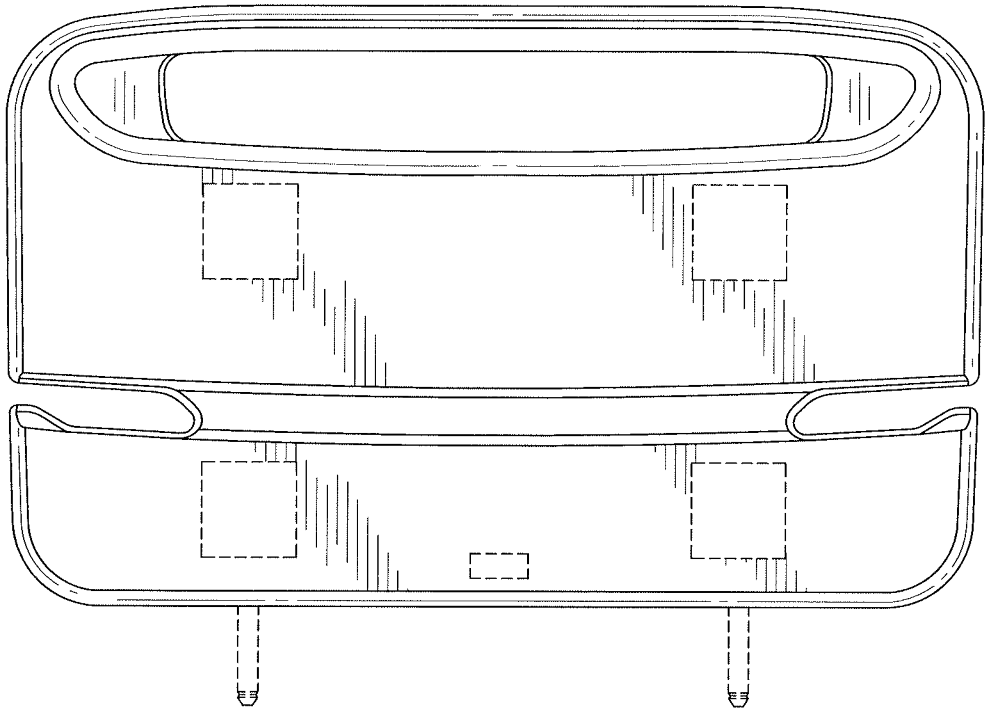
Figure 398:
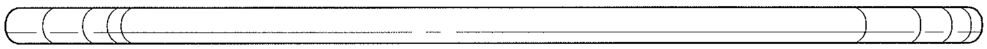
Figure 399:
Figure 400:
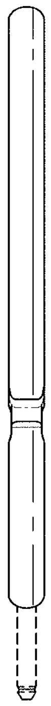
Figure 401:
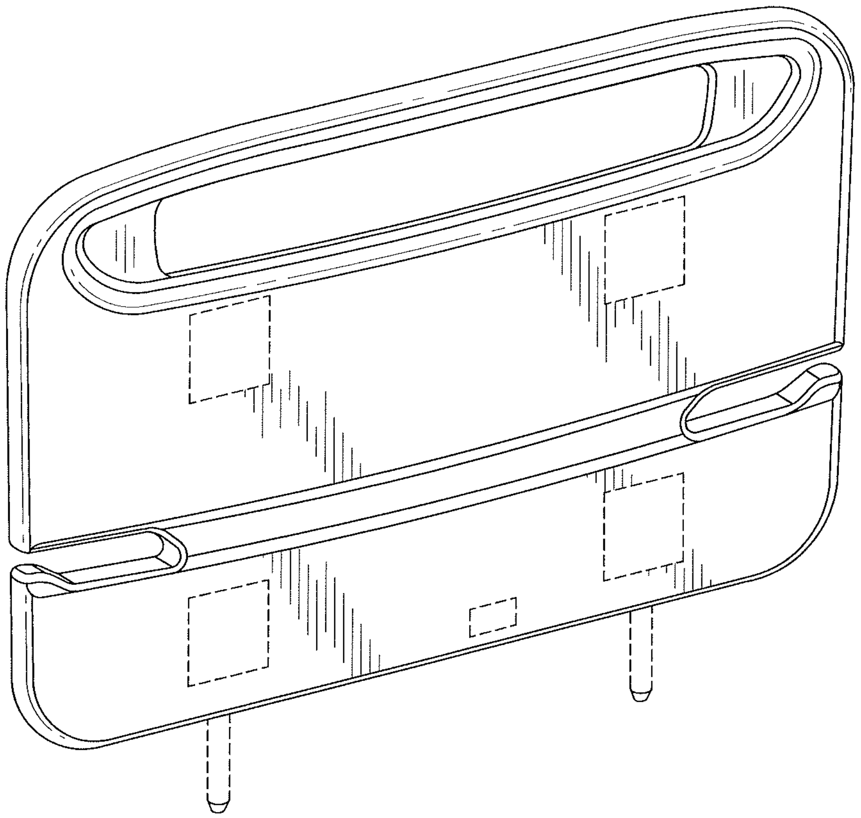
Figure 402:
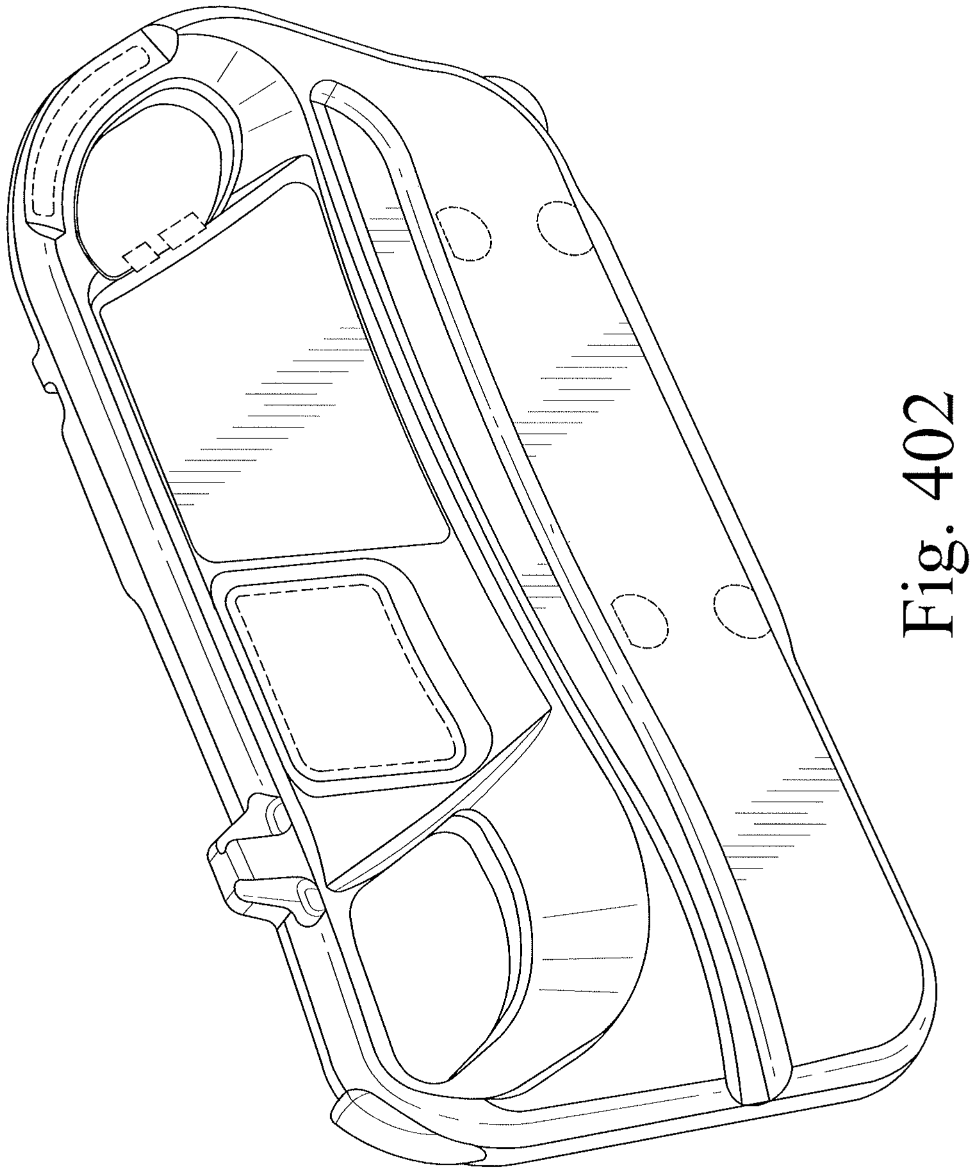
Figure 403:
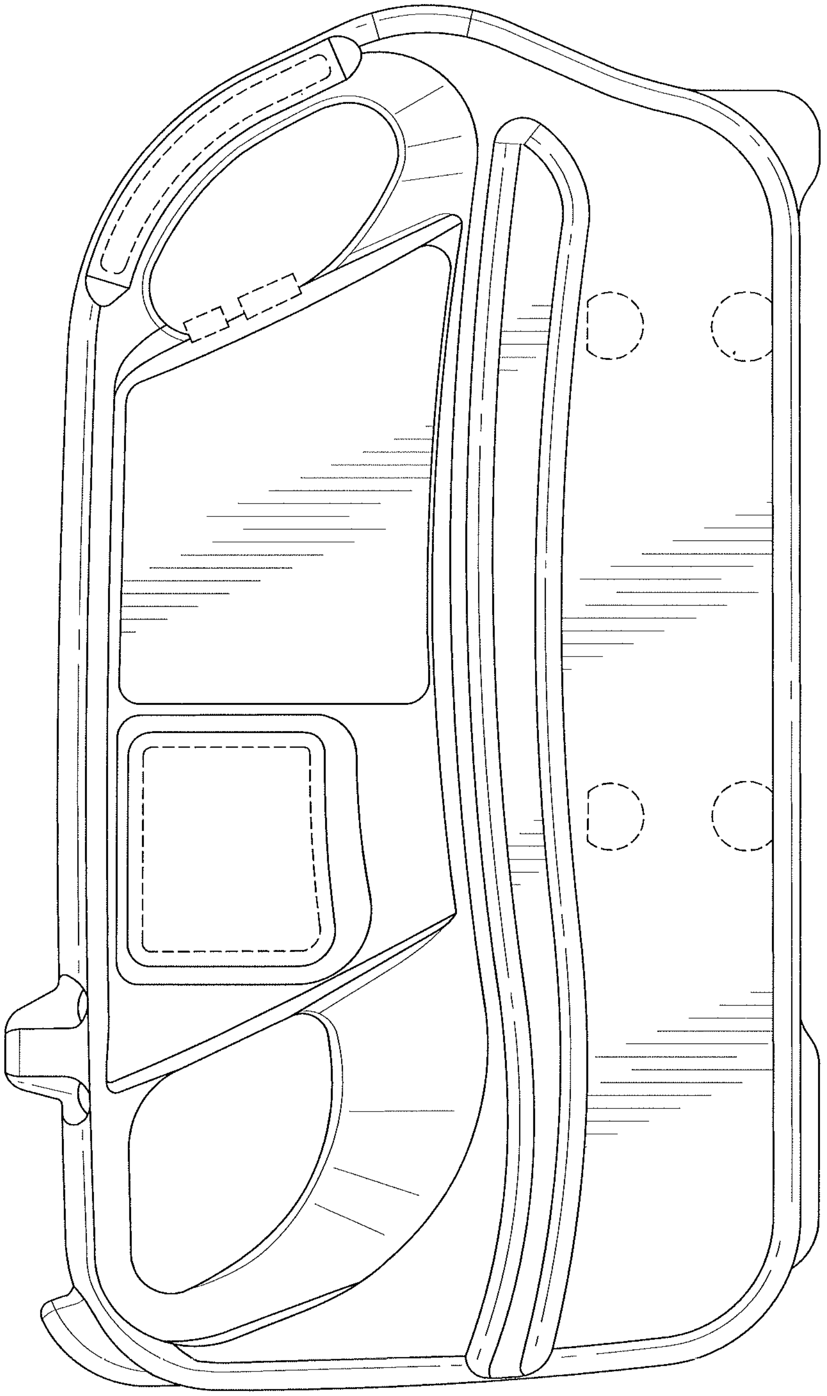
Figure 404:
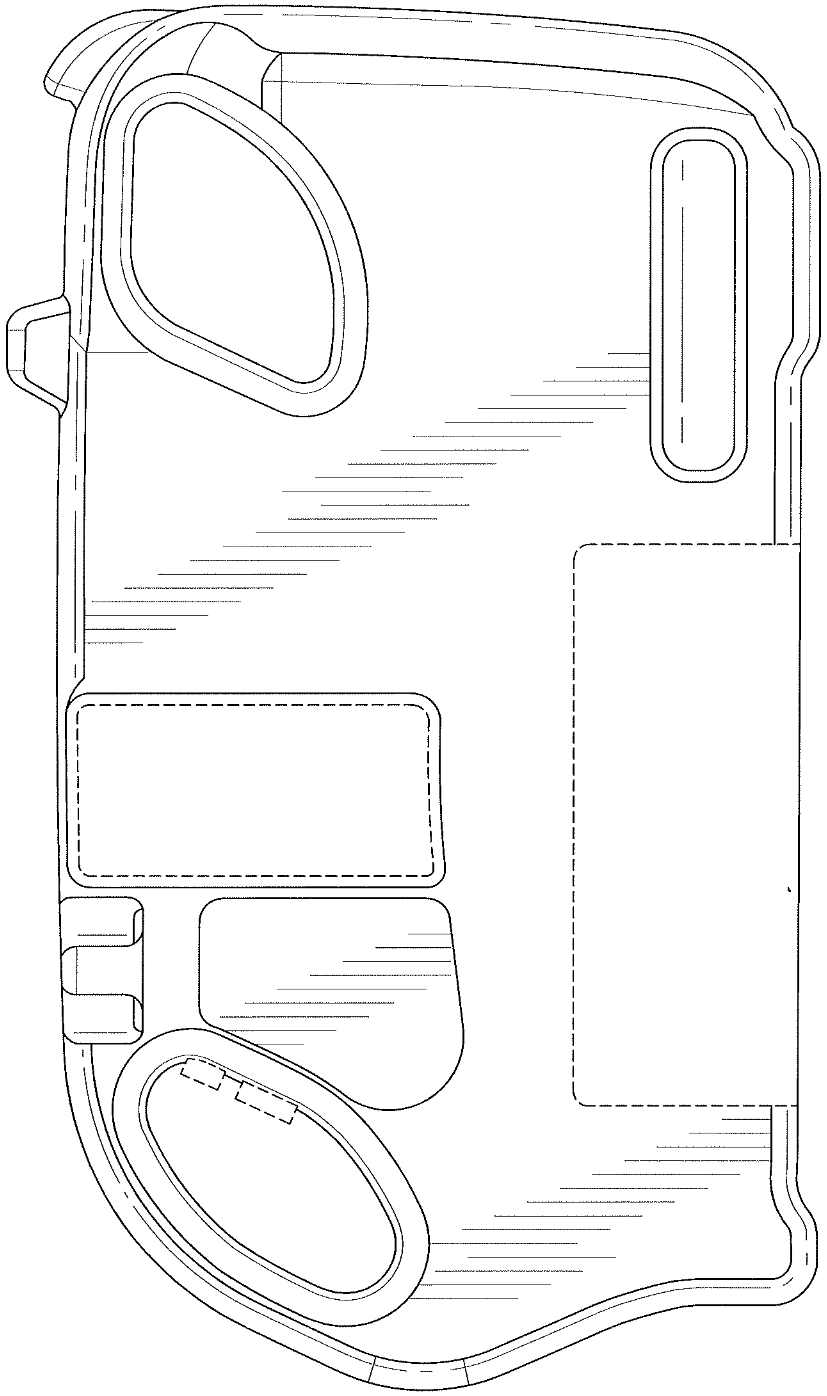
Figure 405:
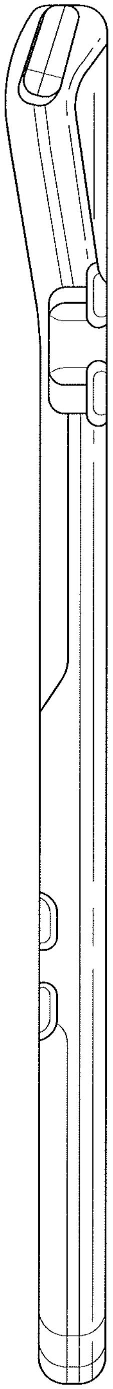
Figure 406:
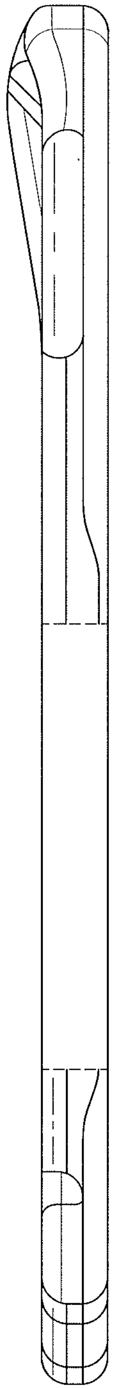
Figure 408:
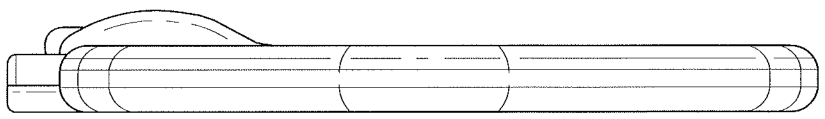
Figure 407:
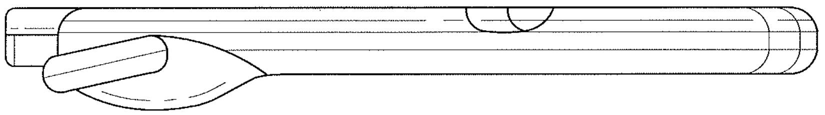
Figure 409:
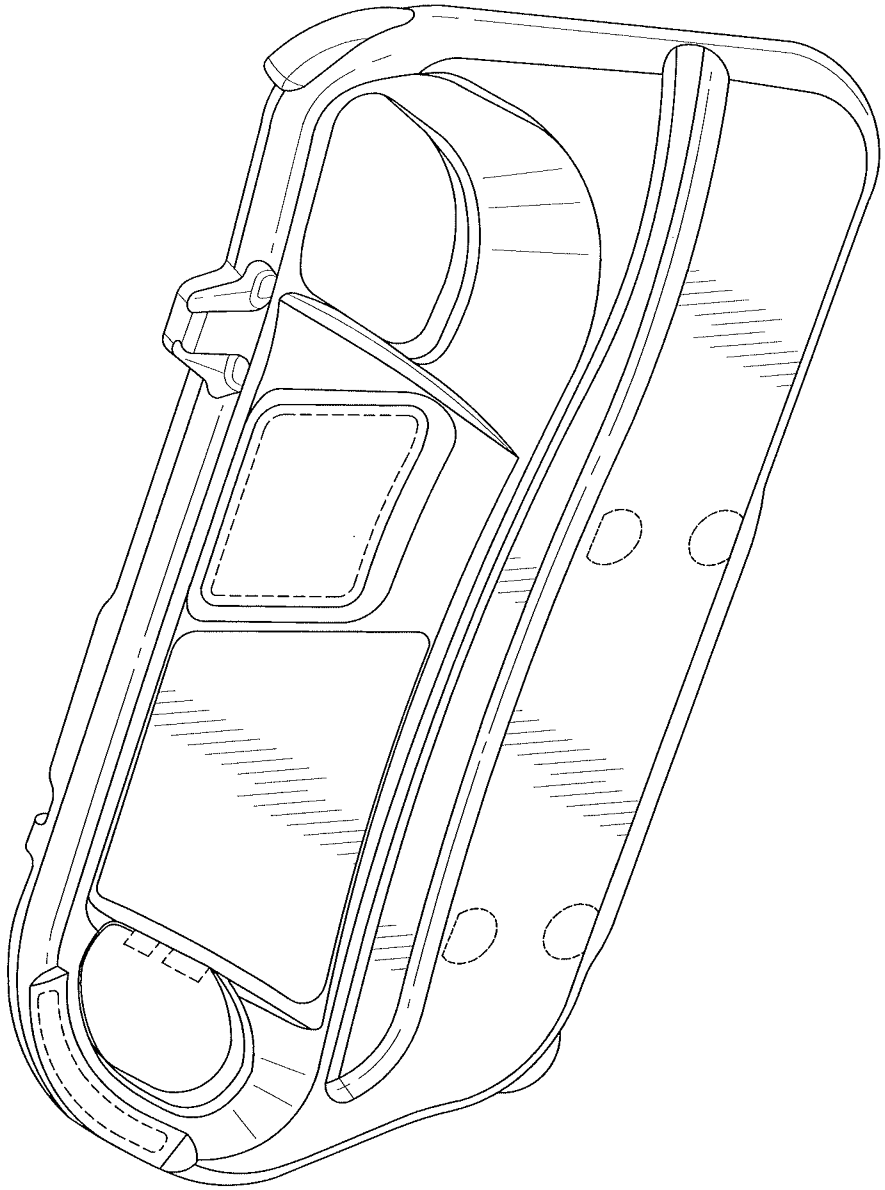
Figure 410:
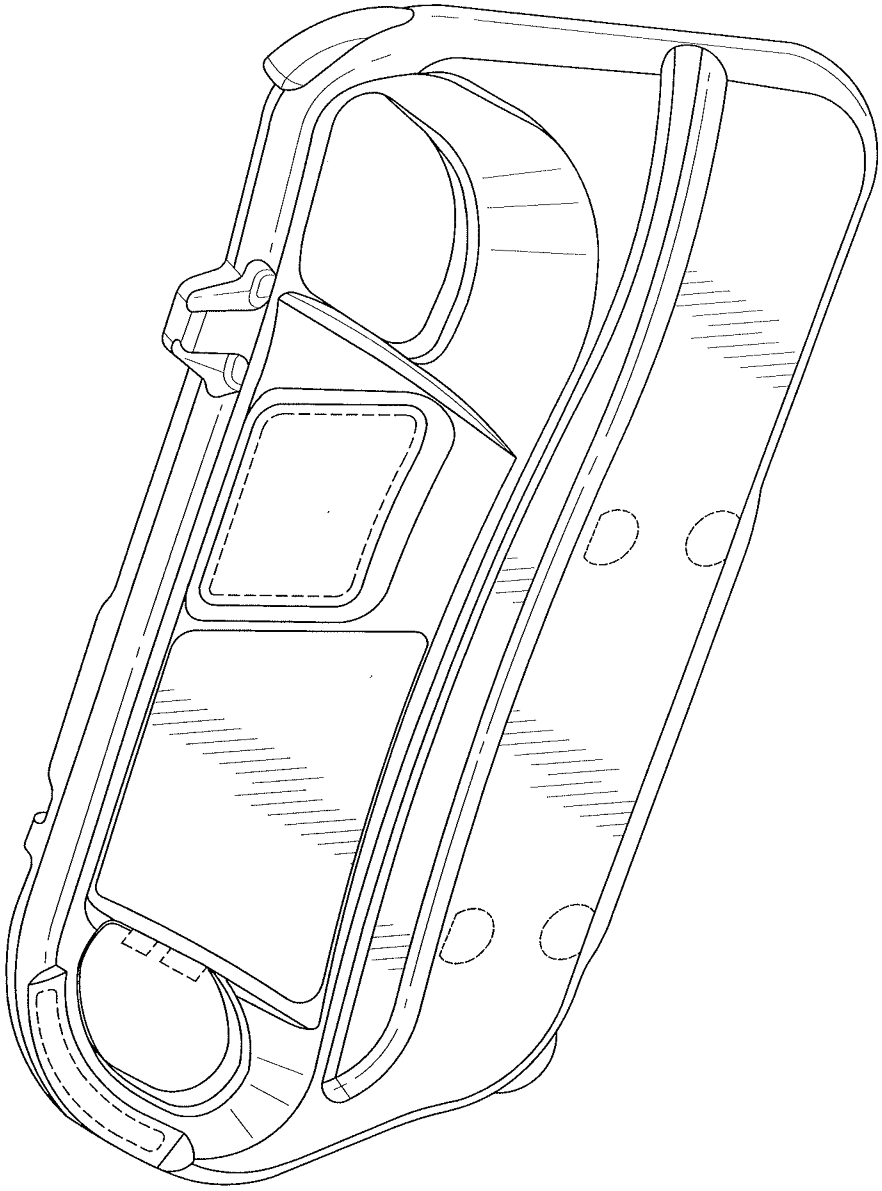
Figure 411:
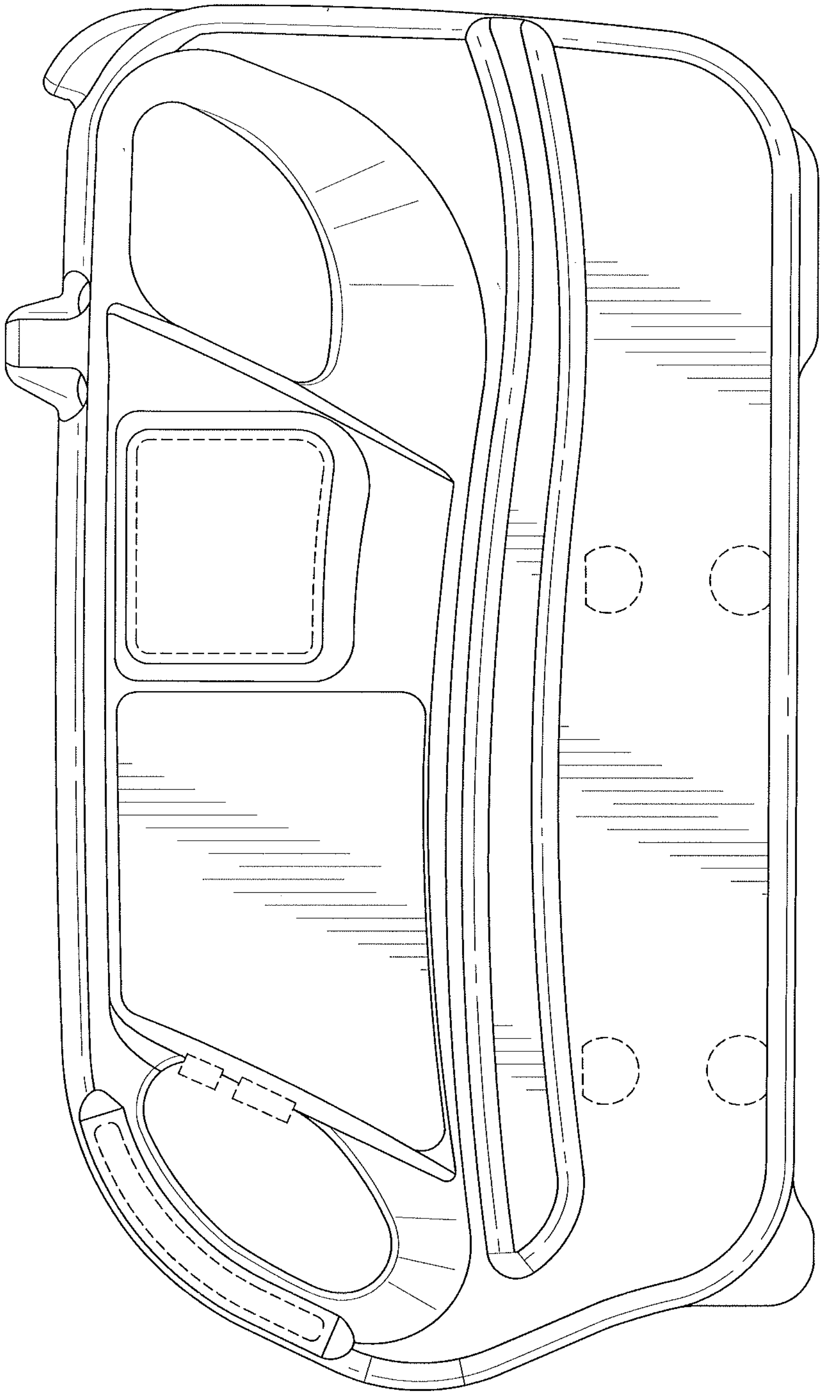
Figure 412:
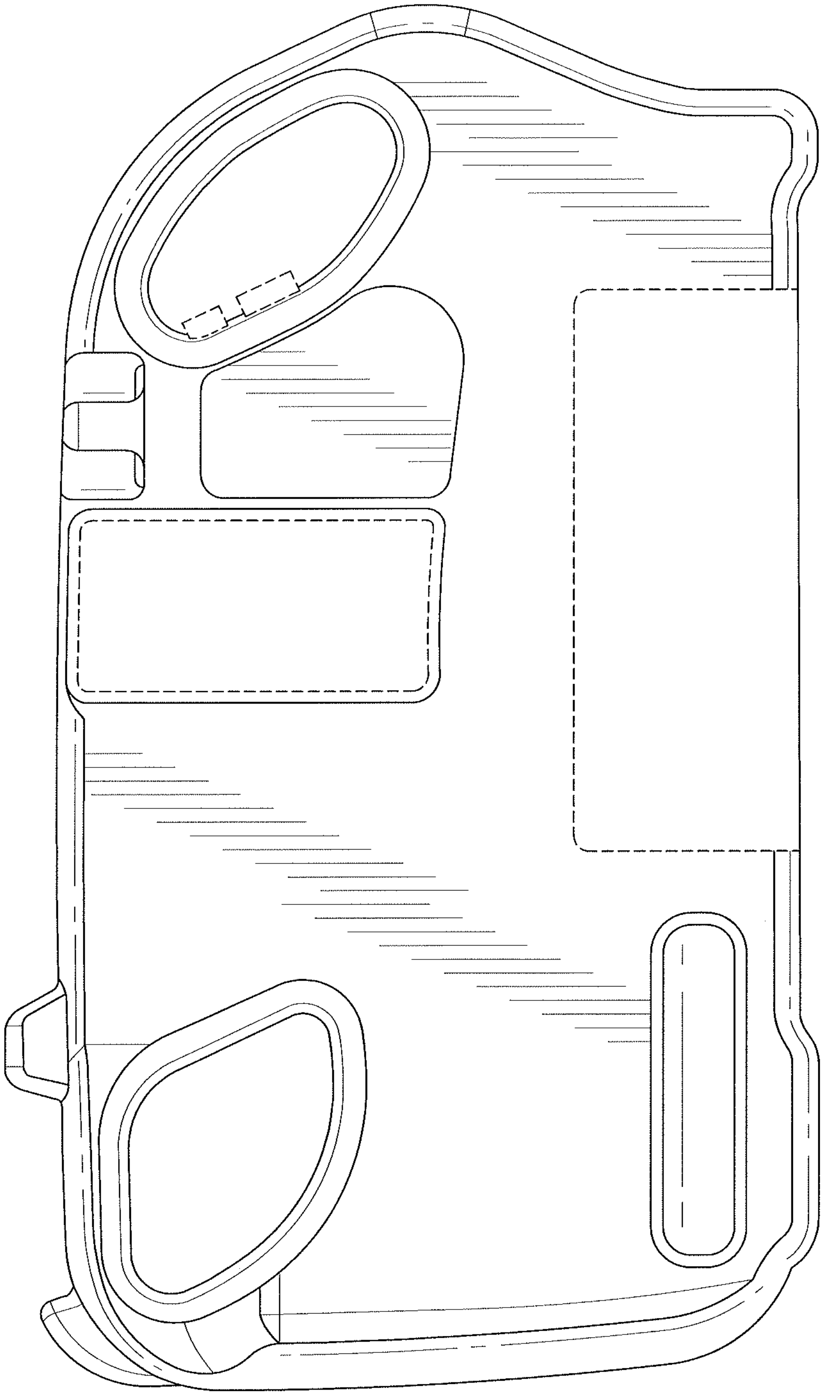
Figure 413:
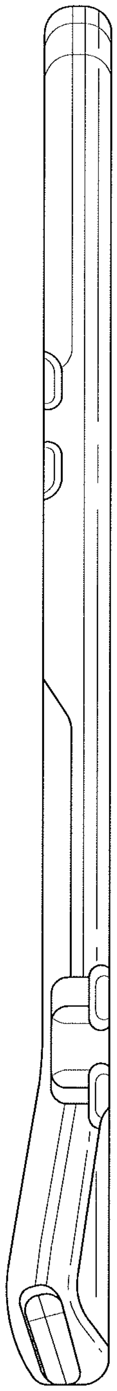
Figure 414:
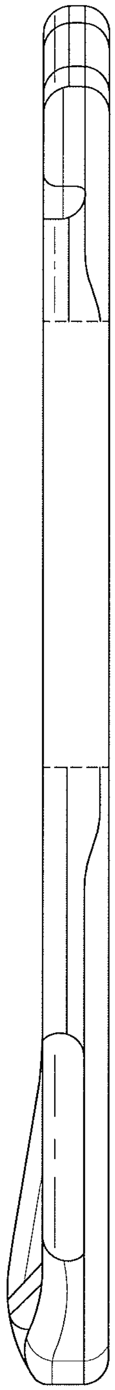
Figure 416:
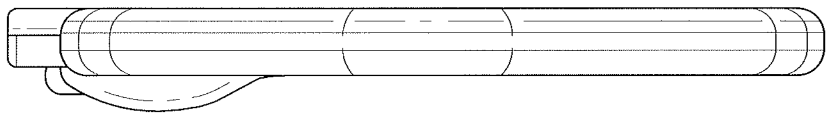
Figure 415:
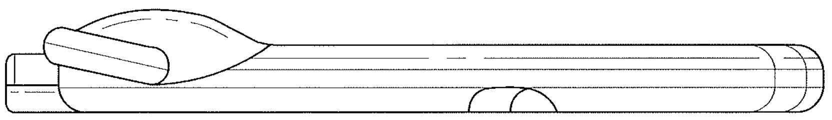
Figure 417:
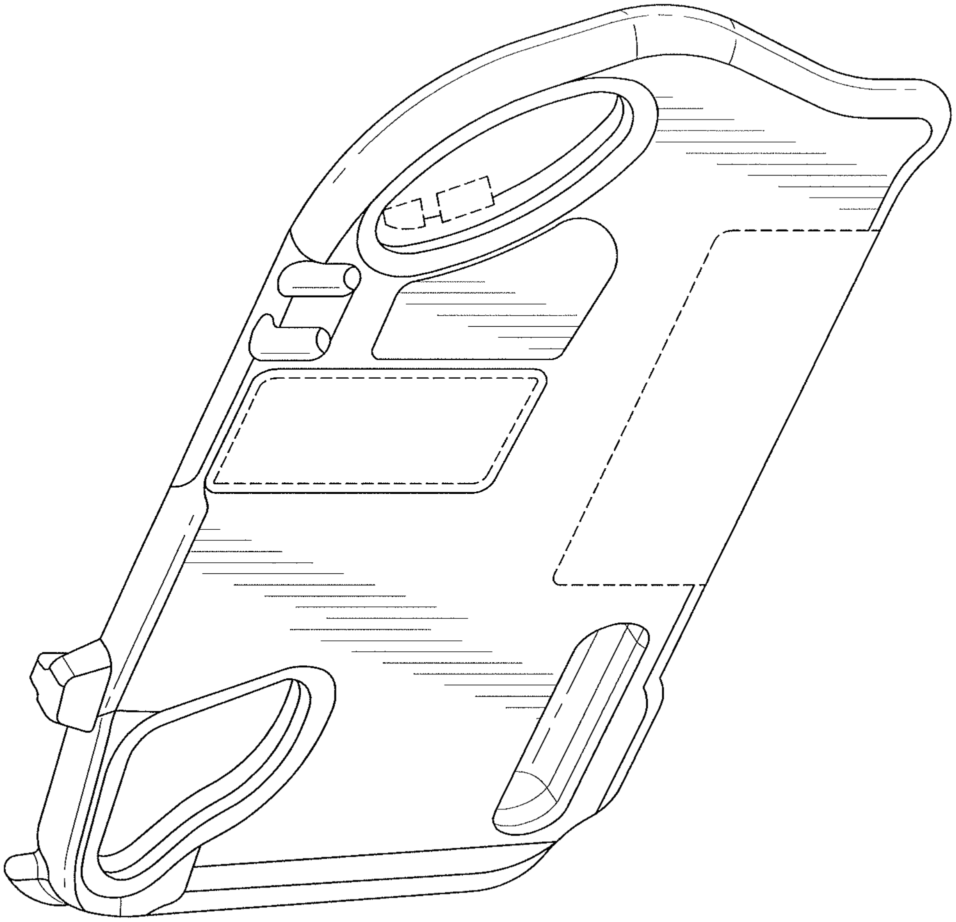
Figure 418:
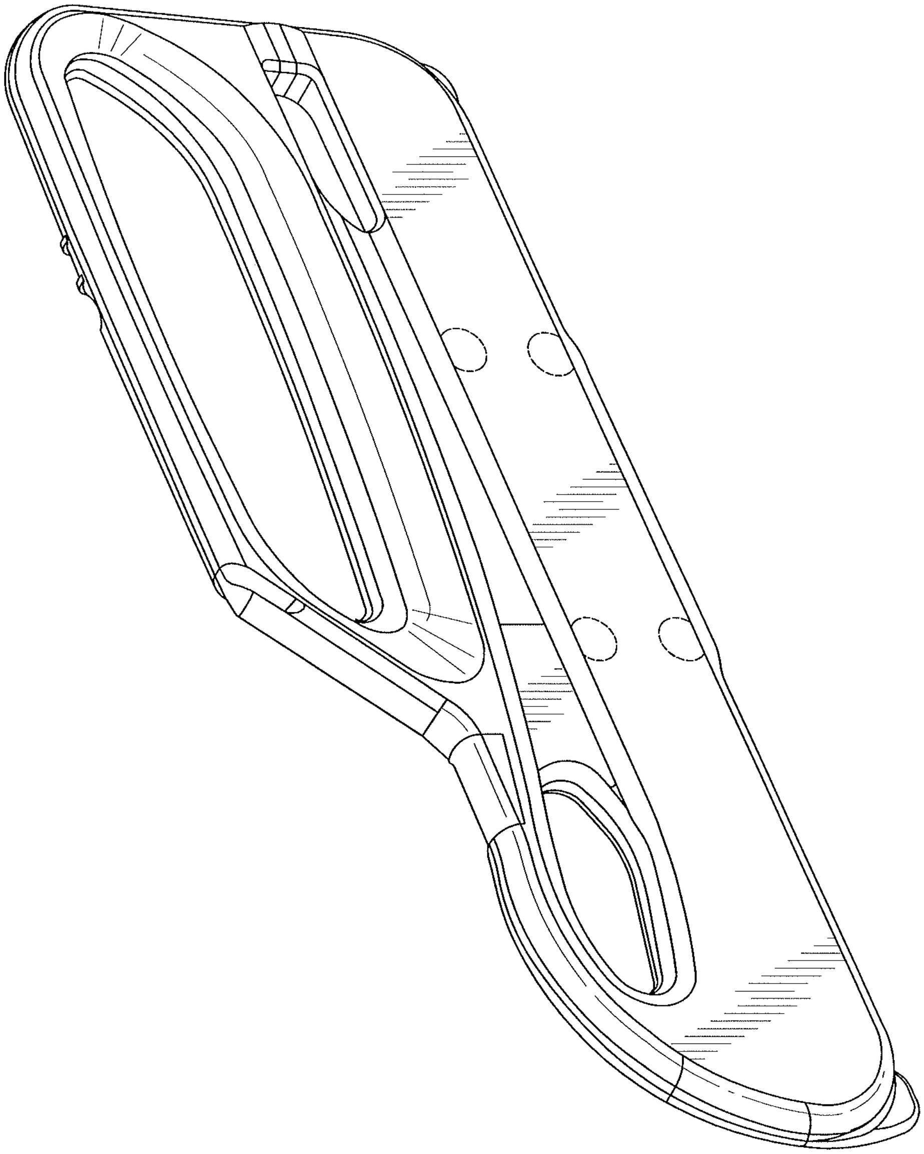
Figure 419:
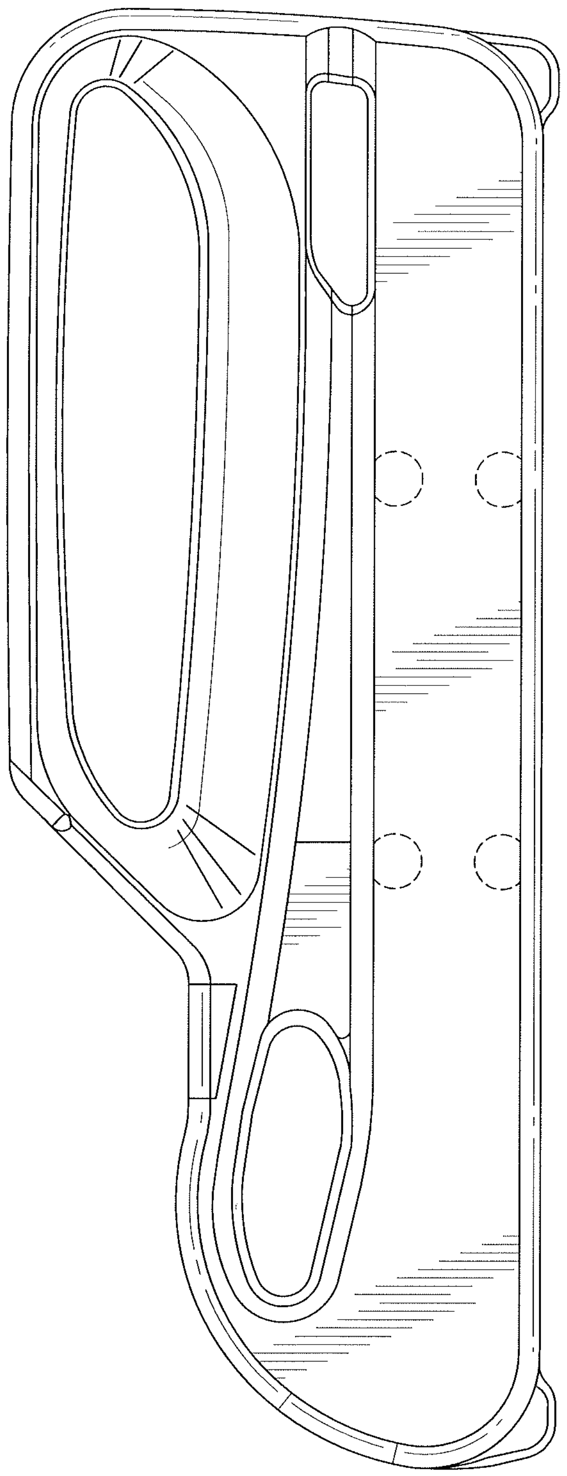
Figure 420:
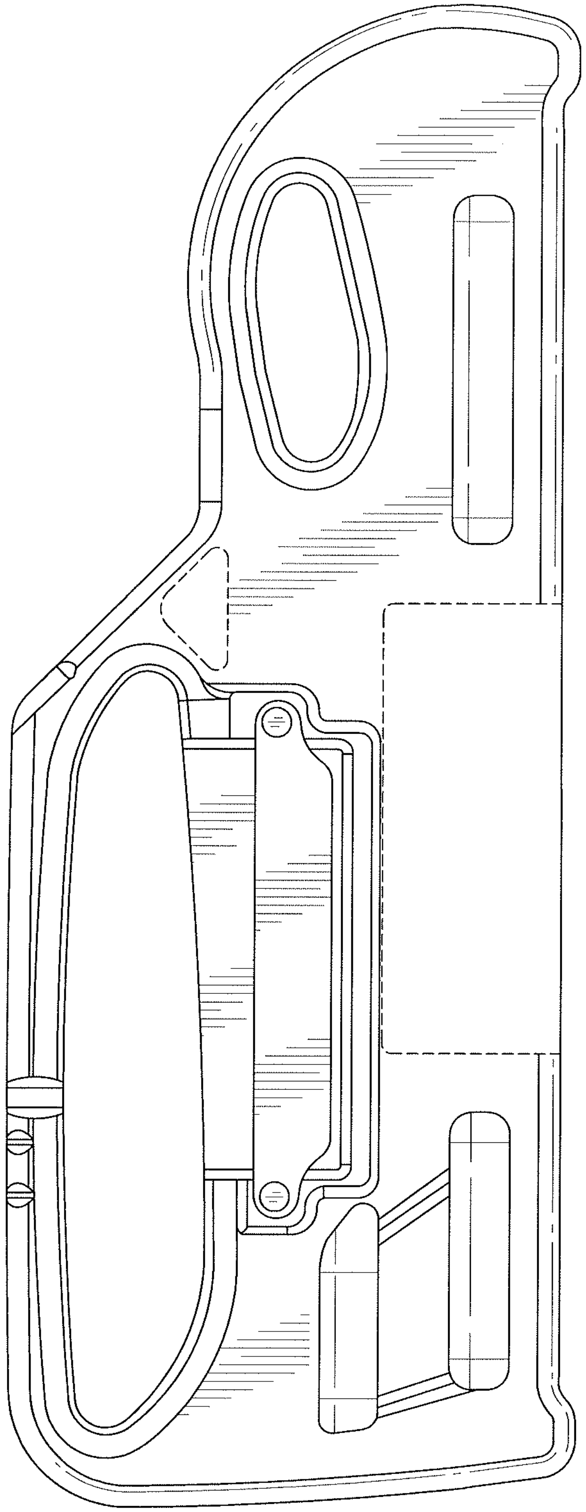
Figure 421:
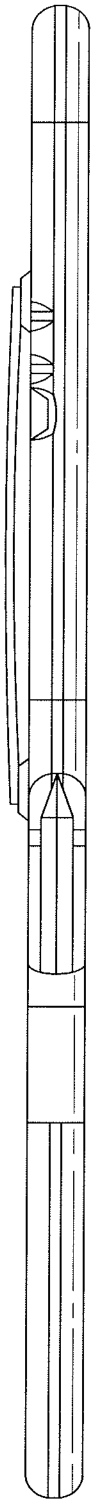
Figure 422:
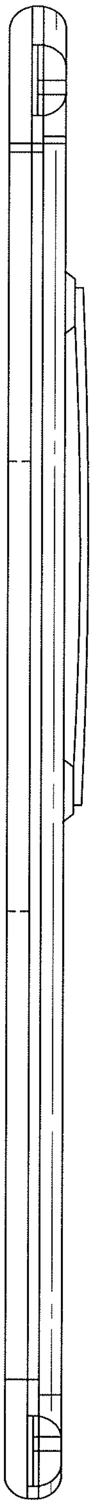
Figure 424:
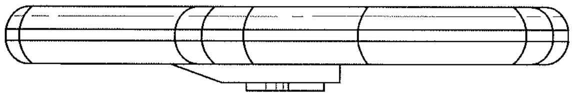
Figure 423:
Figure 425:
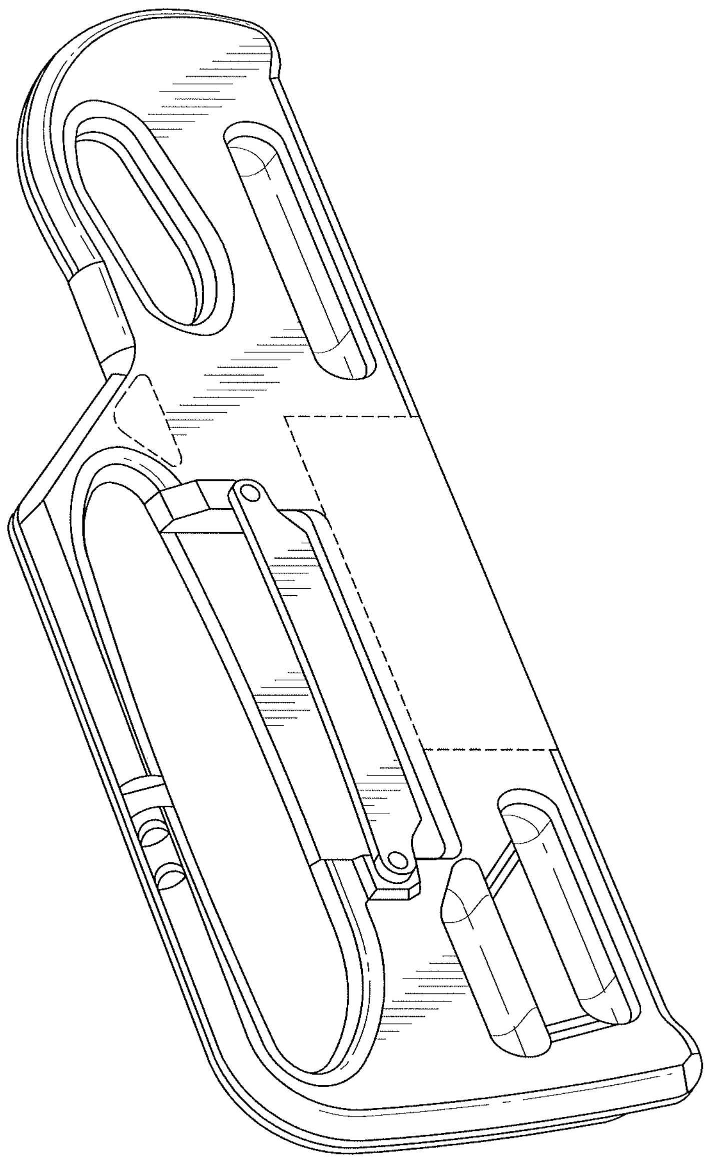
Figure 426:
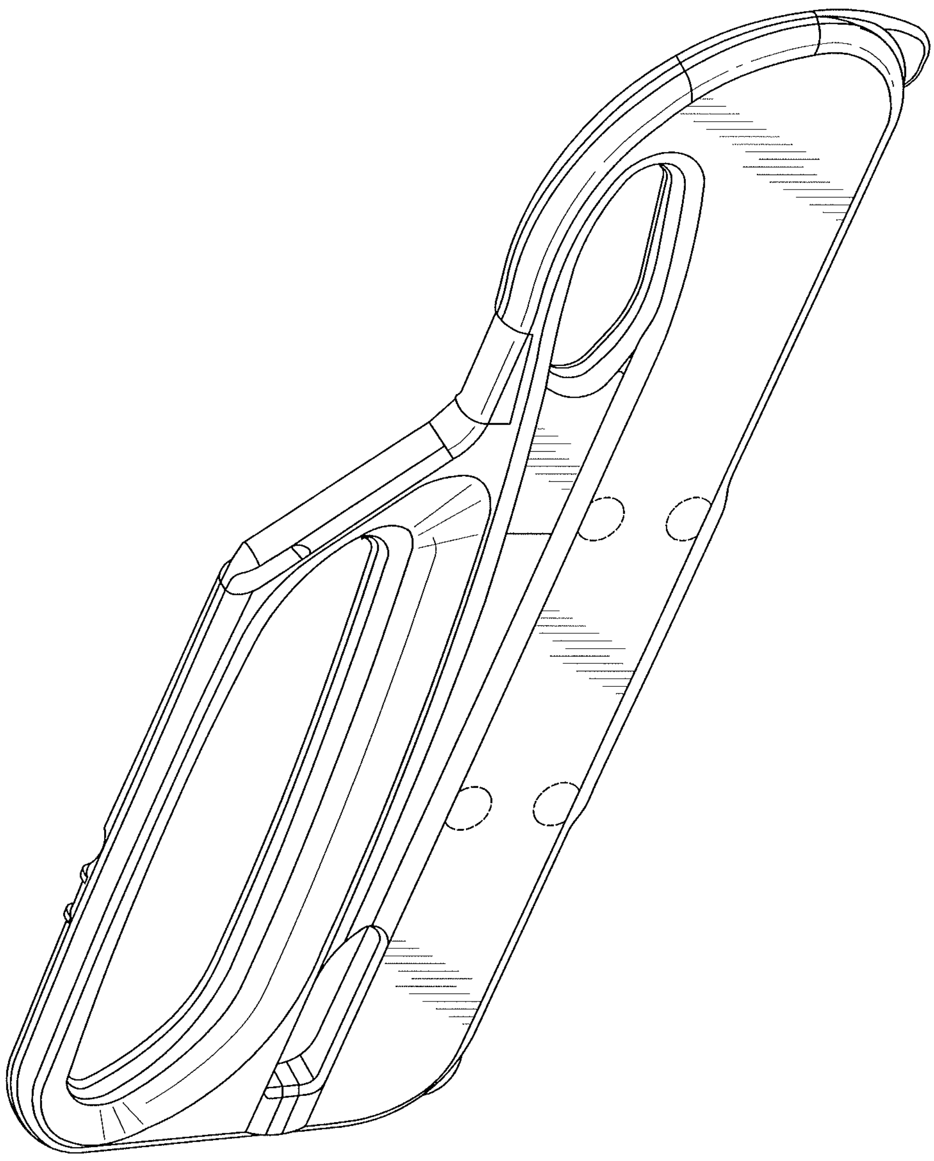
Figure 427:
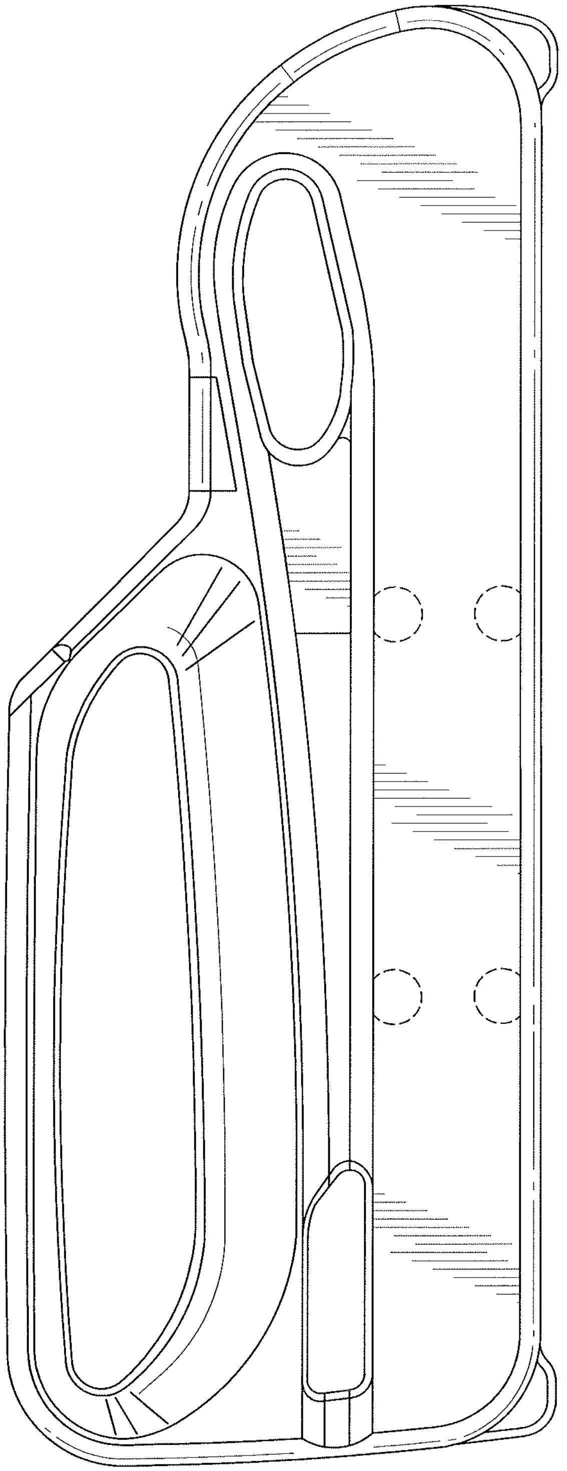
Figure 428:
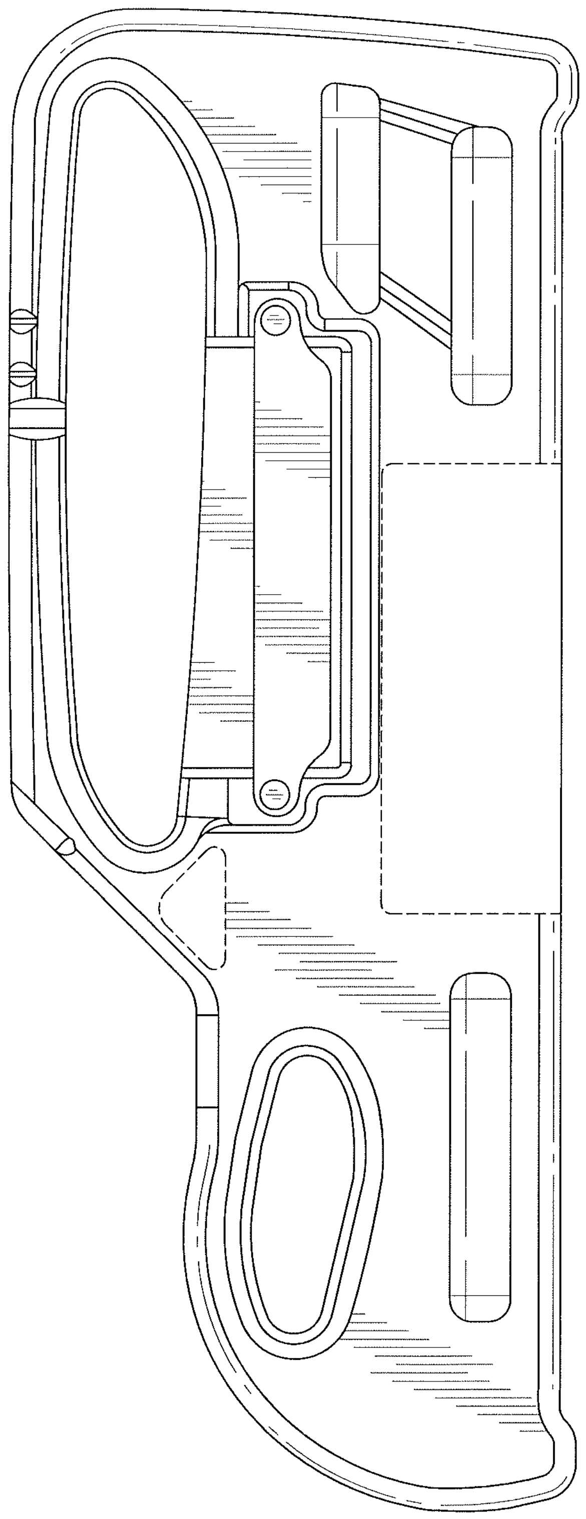
Figure 429:
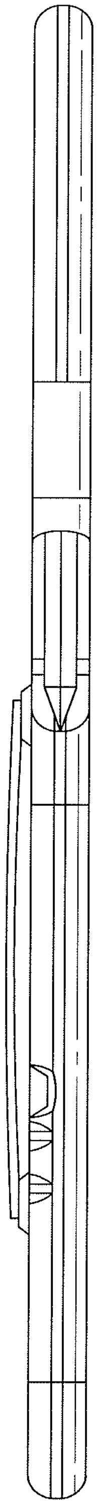
Figure 430:
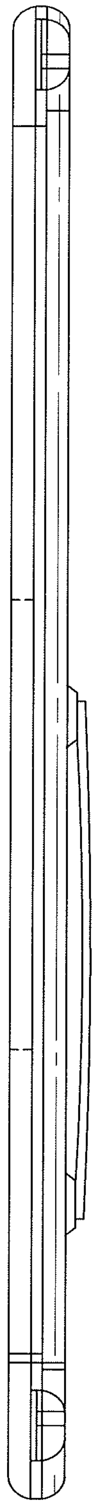
Figure 432:
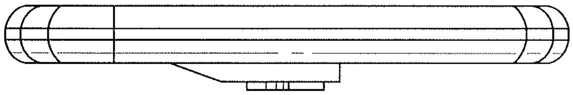
Figure 431:
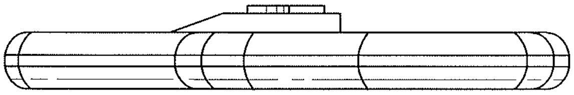
Figure 433:
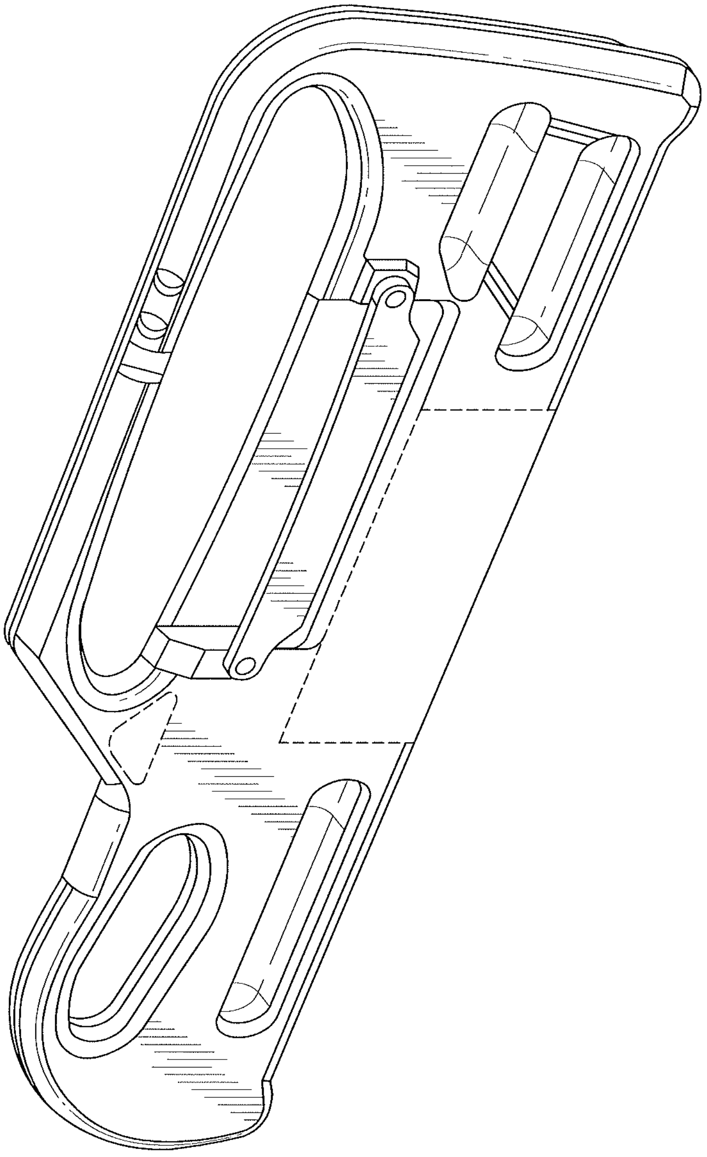
Figure 434:
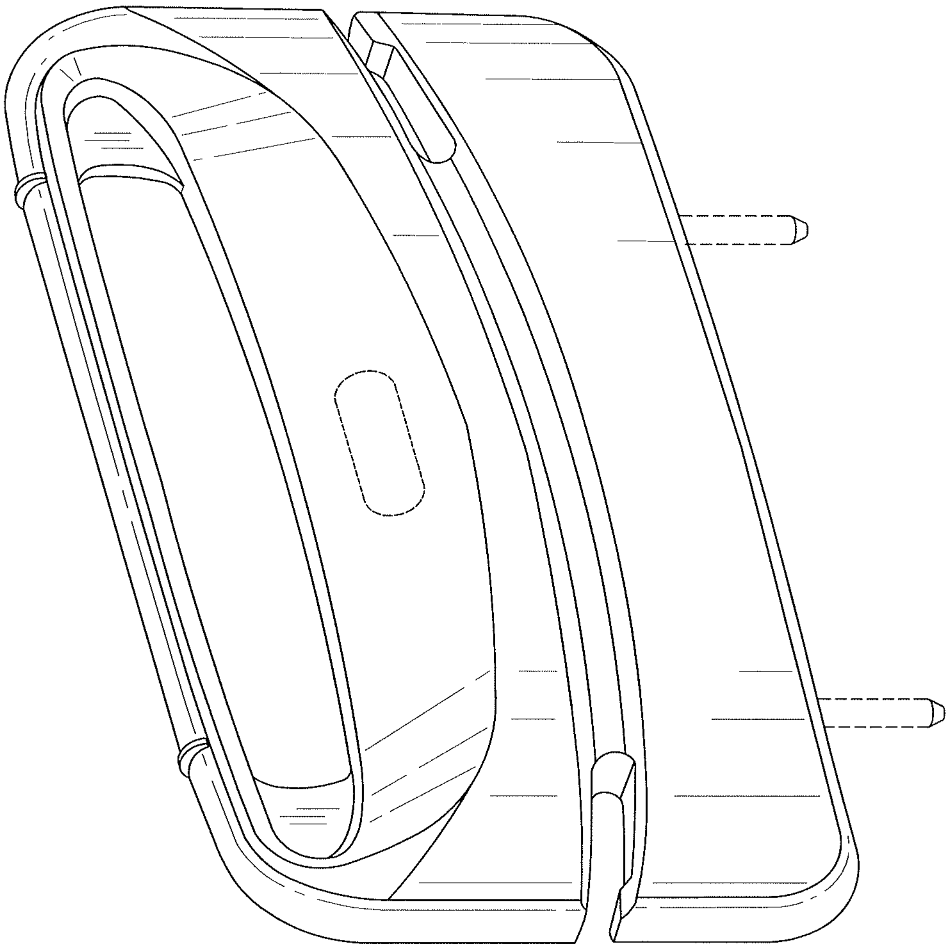
Figure 435:
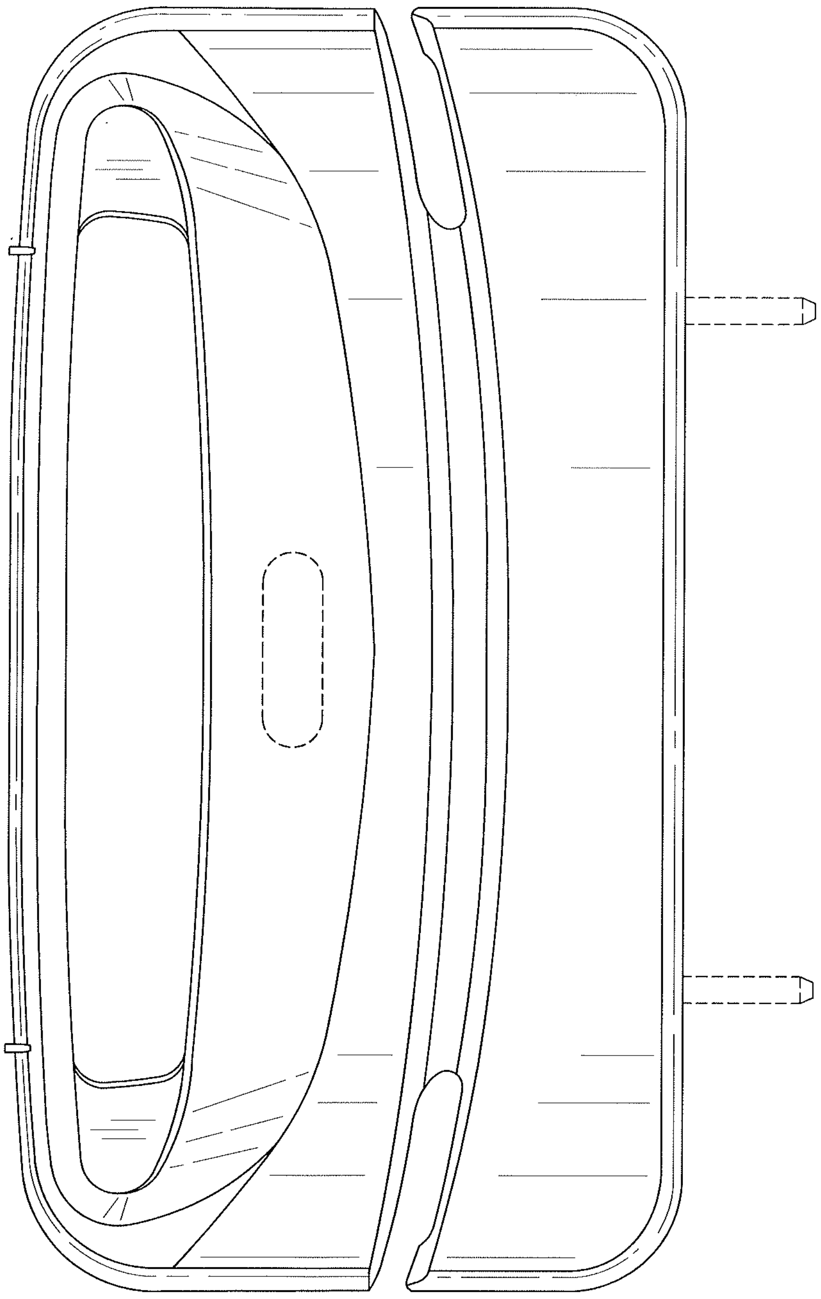
Figure 436:
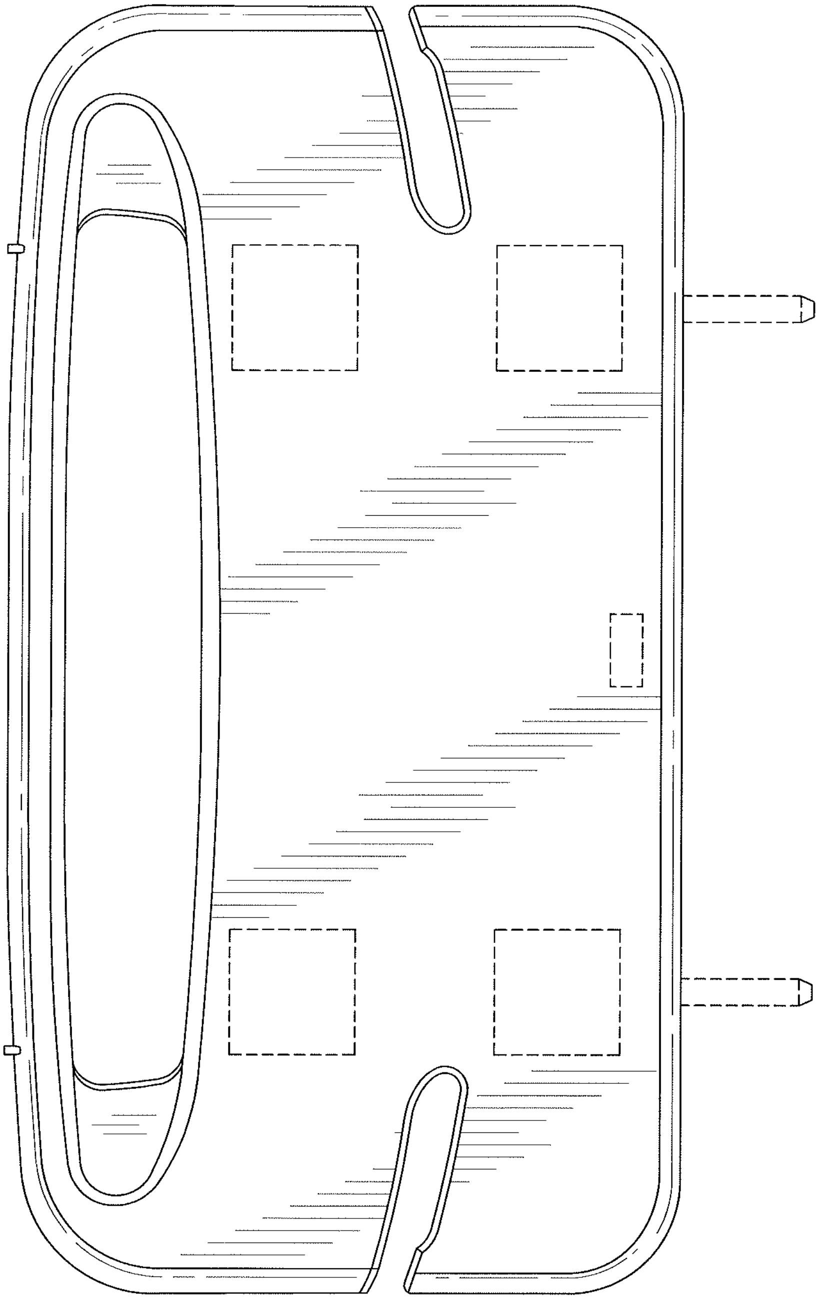
Figure 437:
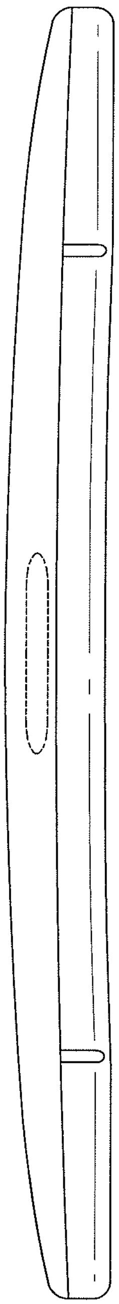
Figure 438:
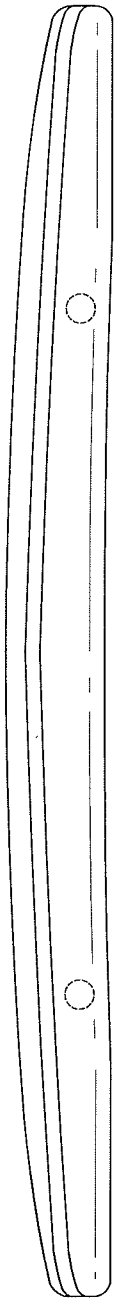
Figure 439:
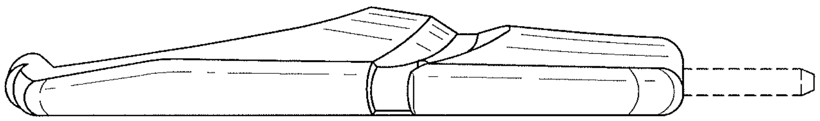
Figure 440:
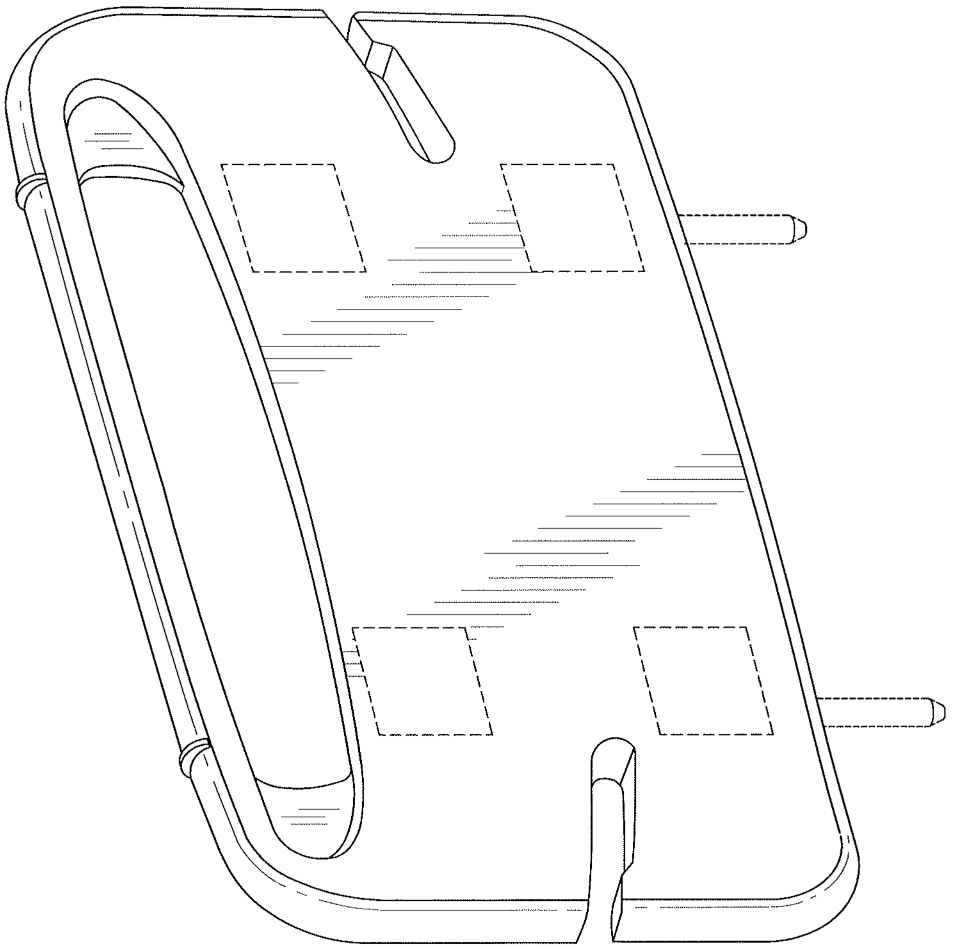

FIG. 123 is a perspective view of a portion of the patient support structure of the embodiment of FIG. 122 showing a patient lying supine on the patient support structure;

FIG. 124 is a cross section taken along section lines 124-124 of FIG. 123 showing a first embodiment of the patients support structure including a microclimate structure where the middle layer of the microclimate structure includes a unitary three-dimensional material extending from the head end to a foot end of the patient support structure;

FIG. 125 is a cross section similar to FIG. 124 showing a second embodiment of the microclimate structure where the middle layer of the microclimate structure includes a middle layer comprising two sections of three-dimensional material;

FIG. 126 is a cross section similar to FIG. 124 taken along section lines showing an embodiment of the patient support structure encased by an outer ticking layer where an upper ticking covers the microclimate structure and a lower ticking encases a cushion layer;

FIG. 127 is a cross section similar to FIG. 8 showing a second embodiment of the patient support structure encased by the outer ticking layer where the upper ticking covers the microclimate structure having two three-dimensional material sections and the lower ticking encases the cushion layer;

FIG. 128 is a side view of the patient support apparatus with air being provided to the middle layer of the microclimate structure from the air box mounted to the foot end of the patient support apparatus and exhausts at the head end of the microclimate structure;

FIG. 129 is a side view of the patient support apparatus with air being provided to the middle layer of the microclimate structure from the air box integrated into the frame of the patient support apparatus;

FIG. 130 is a diagrammatic view of the patient support of FIG. 1 showing that the frame includes a base and a deck, that a patient support structure include ticking, a foam shell, a plurality of inflatable support bladders, a valve box, a manifold, and the microclimate structure for conducting air along an interface of a patient with the patient support structure, and that the air box includes a controller, a blower, a heater, and an user interface;

FIG. 131 is a top view of the patient-support apparatus of FIG. 1 with the mattress removed;

FIG. 132 is a block diagram of certain components of the patient-support apparatus of FIG. 1;

FIG. 133 is a diagrammatic end view of a turn assembly including a hinged support plate assembly, the turn assembly supporting the mattress of the patient-support apparatus of FIG. 1;

FIG. 134 is diagrammatic end view similar to the view shown in FIG. 133, FIG. 134 showing the turn assembly engaged to cause the mattress to be fully rotated to a first side;

FIG. 135 is diagrammatic end view similar to the view shown in FIG. 133, FIG. 135 showing the turn assembly engaged to cause the mattress to be partially rotated to a second side;

FIG. 136 is a perspective view of a hinged support plate assembly with one of the hinged support plates rotated about a rotation axis;

FIG. 137 is a partial exploded assembly view of a side rail for the patient support apparatus of FIG. 1, the side rail having a cavity for receiving a light strip that is operable to illuminate the grip of the side rail;

FIGS. 138A-138E are detailed views of the light strip of FIG. 137;

FIG. 139 is a perspective view of the front of a foot panel which houses a system for operating a sequential compression device;

FIG. 140 is a perspective view of the back of the foot panel of FIG. 139;

FIG. 141 is an enlarged perspective view of the foot panel of FIG. 140 with portions removed;

FIG. 142 is a perspective view of the foot panel of FIG. 140 with portions removed;

FIG. 143 is an enlarged view of a portion of the foot panel of FIG. 139;

FIGS. 144-180 are a series of screenshots of screens for a graphical user interface of the patient support apparatus of FIG. 1, the screenshots associated with the alerts portion of the menu structure of FIG. 67;

FIGS. 181-199 are a series of screenshots for a graphical user interface of the patient support apparatus of FIG. 1, the screenshots associated with a scale zeroing function of the menu structure of FIG. 67;

FIGS. 200-228 are a series of screenshots for a graphical user interface of the patient support apparatus of FIG. 1, the screenshots associated with a scale weighing function of the menu structure of FIG. 67;

FIGS. 229-247 are series of screenshots for a graphical user interface of the patient support apparatus of FIG. 1, the screenshots associated with the surface function of the menu structure of FIG. 67;

FIGS. 248-267 are series of screenshots for a graphical user interface of the patient support apparatus of FIG. 1, the screenshots associated with the charting function of the menu structure of FIG. 67;

FIGS. 268-285 are a series of screenshots for a graphical user interface of the patient support apparatus of FIG. 1, the screenshots associated with the Bluetooth® function of the menu structure of FIG. 67;

FIGS. 286-352 are a series of screenshots for graphical user interface of the patient support apparatus of FIG. 1, the screenshots associated with the preferences function of the menu structure of FIG. 67;

FIG. 353 is an example of a patient user interface for use with the overhead arm of FIG. 102;

FIG. 354-376 are series of screenshots for a graphical user interface of the patient support apparatus of FIG. 1, the screenshots associated with the SCD function of the menu structure of FIG. 67;

FIG. 377A-377C is a flowchart directed to the operation of a weighing function of a scale system of the patient support apparatus of FIG. 1;

FIG. 378A-378C is a flowchart directed to the operation of a tare function of a scale system of the patient support apparatus of FIG. 1;

FIG. 379 is a state diagram for the a powered wheel assembly for the patient support apparatus of FIG. 1;

FIG. 380 is a flowchart of the data-gathering function of a controller of the powered wheel assembly;

FIG. 381A-381C is a flowchart of the operation of the controller for the powered wheel assembly utilizing inputs from other systems of the patient support apparatus of Fig. One to control operation of the powered wheel assembly;

FIG. 382 is a state diagram for the operation of the controller of the powered wheels assembly in response to an actuator deployment request;

FIG. 383 is a state diagram for the operation of the controller of the powered wheel assembly in response to an actuator retraction request;

FIG. 384 is a state diagram for the operation of the controller of the power wheel assembly in response to a power up request;

FIG. 385 is a relationship diagram identifying the relationships between parties partaking in an encryption protocol;

FIG. 386A-386B is a diagrammatic representation of the relationship between various entities taking part in an encryption protocol;

FIG. 387A-387B is a diagrammatic representation of the relationship between entities who are transferring certificate authority under an encryption protocol;

FIG. 388 is a front perspective view of a headboard;

FIG. 389 is a front elevation view of the headboard of FIG. 388;

FIG. 390 is a rear elevation view of the headboard of FIG. 388;

FIG. 391 is a top plan view of the headboard of FIG. 388;

FIG. 392 is a bottom plan view of the headboard of FIG. 388;

FIG. 393 is a first side elevation view of the headboard of FIG. 388, with the opposite, second side elevation view being a mirror image of the first side elevation view;

FIG. 394 is a rear perspective view of the headboard of FIG. 388;

FIG. 395 is a front perspective view of another embodiment of a headboard;

FIG. 396 is a front elevation view of the headboard of FIG. 395;

FIG. 397 is a rear elevation view of the headboard of FIG. 395;

FIG. 398 is a top plan view of the headboard of FIG. 395;

FIG. 399 is a bottom plan view of the headboard of FIG. 395;

FIG. 400 is a first side elevation view of the headboard of FIG. 395, with the opposite, second side elevation view being a mirror image of the first side elevation view;

FIG. 401 is a rear perspective view of the headboard of FIG. 395;

FIG. 402 is a first side perspective view of one embodiment of a headrail;

FIG. 403 is a first side elevation view of the headrail of FIG. 402;

FIG. 404 is a second side elevation view of the headrail of FIG. 402;

FIG. 405 is a top plan view of the headrail of FIG. 402;

FIG. 406 is a bottom plan view of the headrail of FIG. 402;

FIG. 407 is a rear elevation view of the headrail of FIG. 402;

FIG. 408 is a front elevation view of the headrail of FIG. 402;

FIG. 409 is a second side perspective view of the headrail of FIG. 402;

FIG. 410 is a first side perspective view of another embodiment of the headrail;

FIG. 411 is a first side elevation view of the headrail of FIG. 410;

FIG. 412 is a second side elevation view of the headrail of FIG. 410;

FIG. 413 is a top plan view of the headrail of FIG. 410;

FIG. 414 is a bottom plan view of the headrail of FIG. 410;

FIG. 415 is a rear elevation view of the headrail of FIG. 410;

FIG. 416 is a front elevation view of the headrail of FIG. 410;

FIG. 417 is a second side perspective view of the headrail of FIG. 410;

FIG. 418 is a first side perspective view of one embodiment of a footrail;

FIG. 419 is a first side elevation view of the footrail of FIG. 418;

FIG. 420 is a second side elevation view of the footrail of FIG. 418;

FIG. 421 is a top plan view of the footrail of FIG. 418;

FIG. 422 is a bottom plan view of the footrail of FIG. 418;

FIG. 423 is a front elevation view of the footrail of FIG. 418;

FIG. 424 is a rear elevation view of the footrail of FIG. 418;

FIG. 425 is a second side perspective view of the footrail of FIG. 418;

FIG. 426 is a first side perspective view of another embodiment of the footrail;

FIG. 427 is a first side elevation view of the footrail of FIG. 426;

FIG. 428 is a second side elevation view of the footrail of FIG. 426;

FIG. 429 is a top plan view of the footrail of FIG. 426;

FIG. 430 is a bottom plan view of the footrail of FIG. 426;

FIG. 431 is a front elevation view of the footrail of FIG. 426;

FIG. 432 is a rear elevation view of the footrail of FIG. 426;

FIG. 433 is a second side perspective view of the footrail of FIG. 426;

FIG. 434 is a front perspective view of a footboard;

FIG. 435 is a front elevation view of the footboard of FIG. 434;

FIG. 436 is a rear elevation view of the footboard of FIG. 434;

FIG. 437 is a top plan view of the footboard of FIG. 434;

FIG. 438 is a bottom plan view of the footboard of FIG. 434;

FIG. 439 is a first side elevation view of the footboard of FIG. 434, with the opposite, second side elevation view being a mirror image of the first side elevation view; and FIG. 440 is a rear perspective view of the footboard of FIG. 434.

DETAILED DESCRIPTION OF THE DRAWINGS

Figure 2:
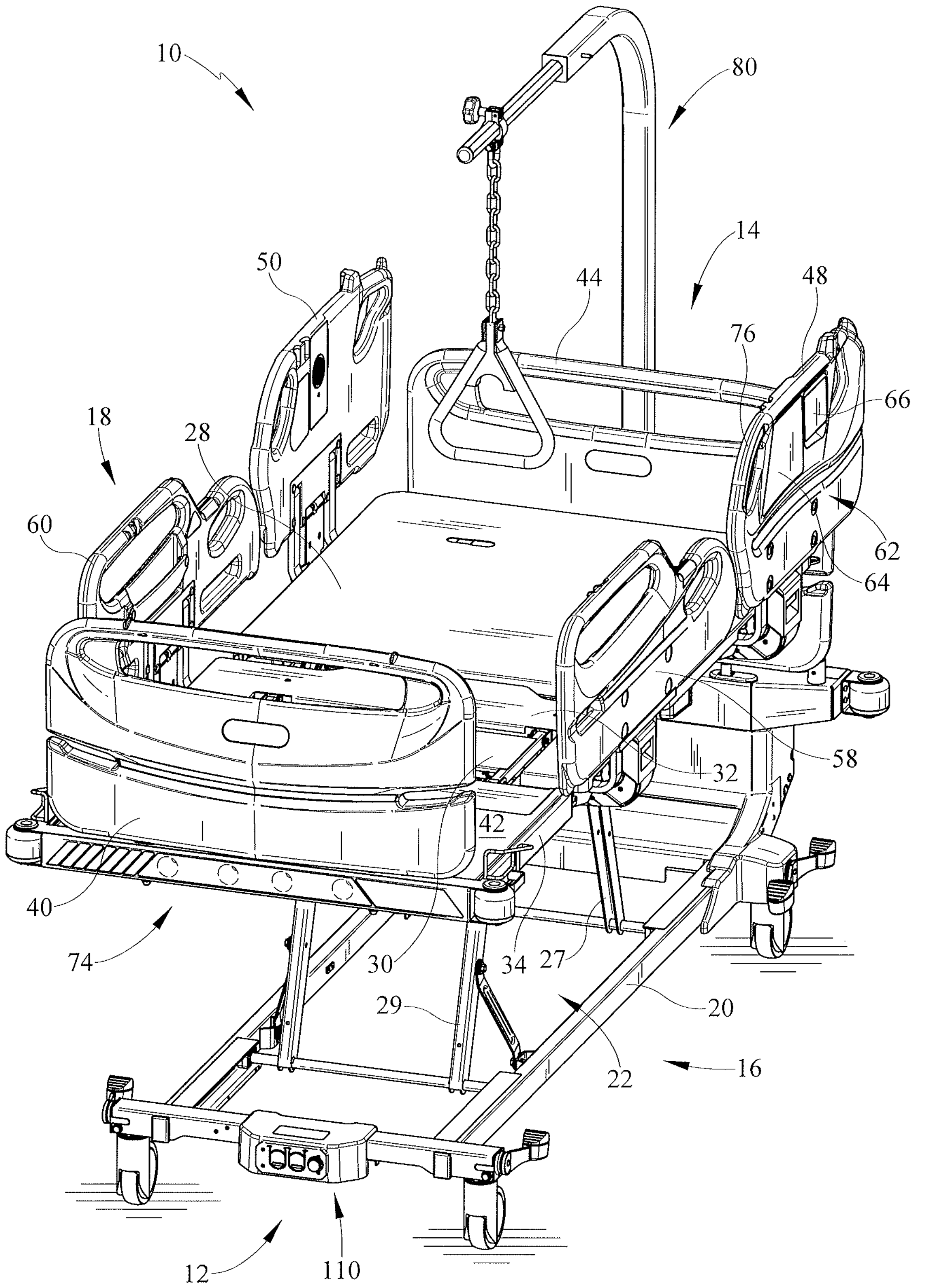
FIG. 2 is another perspective view of the patient support apparatus of FIG. 1.
Figure 3:
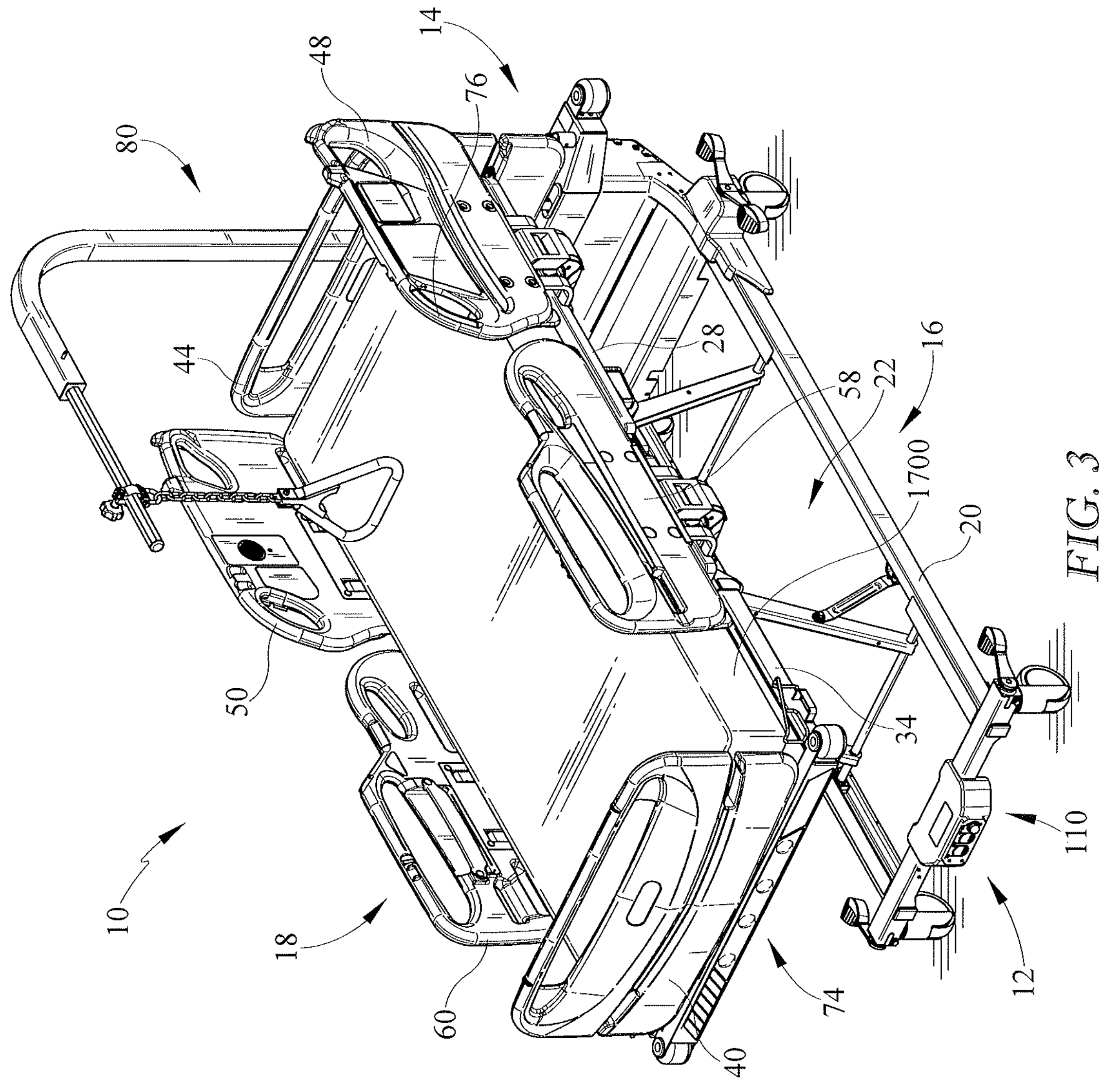
FIG. 3 is a perspective view of the patient support apparatus of FIG. 1, the patient support apparatus including a patient support surface illustratively embodied as a mattress positioned on the hospital bed 10.
Figure 4:
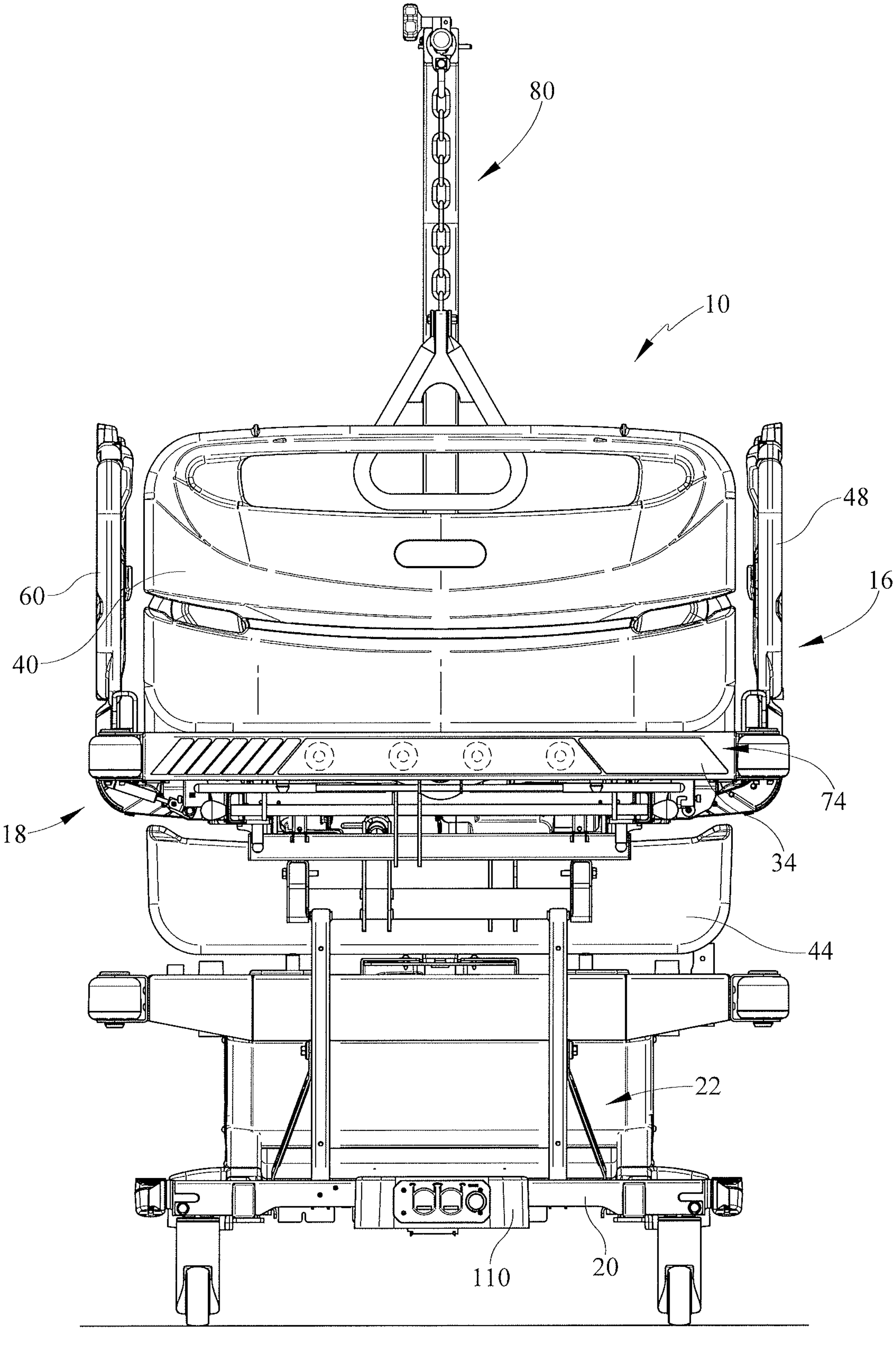
FIG. 4 is a plan view of the patient support apparatus of FIG. 1 as viewed from the foot end of the patient support apparatus.

Referring to FIGS. 1-9, a patient support apparatus 10 is illustratively embodied as a hospital bed 10. The views shown in FIGS. 1-3 are generally taken from a position that is oriented at the left side, foot end of the hospital bed 10. For purposes of orientation, the discussion of the hospital bed 10 will be based on the orientation of a patient supported on the hospital bed 10 in a supine position. Thus, the foot end 12 of the hospital bed 10 refers to the end nearest the patient's feet when the patient is supported on the hospital bed 10 in the supine position. The hospital bed 10 has a head end 14 opposite the foot end 12. A left side 16 refers to the patient's left when the patient is lying in the hospital bed 10 in a supine position. The right side 18 refers to the patient's right. When reference is made to the longitudinal length of the hospital bed 10, it refers a direction that is represented by the lines that generally extend between the head end 14 and foot end 12 of the hospital bed 10. Similarly, lateral width of the hospital bed 10 refers to a direction that is represented by the lines that generally extend between the left side 16 and right side 18.

The hospital bed 10 includes a base frame 20 which supports a lift system 22. The lift system 22 engages the base and an upper frame 24 such that the lift system 22 moves the upper frame 24 vertically relative to the base frame 20. The lift system 22 includes a head end linkage 27 and a foot end linkage 29. Each of the linkages 27 and 29 are independently operable and may be operated to cause the hospital bed 10 to move into a tilt position which is when the head end 14 of the upper frame 24 is positioned lower than the foot end 12 of the upper frame 24. The hospital bed 10 may also be moved to a reverse tilt position with the foot end 12 of the upper frame 24 is positioned lower than the head end 14 of the upper frame 24.

The upper frame 24 supports a load frame 26. The load frame 26 supports a head deck 28 which is movable relative to the load frame 26. The load frame 26 also supports an articulated seat deck 30, also movable relative to the load frame 26 and a fixed seat deck 32. Also supported from the load frame 26 is a foot deck 34 that is articulated and moveable relative to the load frame 26. The foot deck 34 in the illustrative embodiment of FIGS. 1-9, provides for powered pivoting of the foot deck 34 and manual extension and retraction of the foot deck 34 to vary the length of the foot deck 34. In other embodiments, powered pivoting of the foot deck 34 may be omitted and the related movement may be caused manually, or follow movement of the articulated seat deck 30. In addition, in some embodiments, extension and retraction of the foot deck 34 may be powered by an actuator.

The foot deck 34 includes a first portion 36 and a second portion 38, which moves relative to the first portion 36 to vary the size of the foot deck 34. The second portion 38 moves generally longitudinally relative to the first portion 36 to vary the longitudinal length of the foot deck 34 and, thereby, the longitudinal length of the hospital bed 10.

A foot panel 40 is supported from the second portion 38 and extends vertically from an upper surface 42 of the second portion 38 to form a barrier at the foot end 12 of the hospital bed 10. A head panel 44 is positioned on an upright structure 46 of the base frame 20 and extends vertically to form a barrier at the head end 14 of the hospital bed 10. A left head siderail 48 is supported from the head deck 28 and is moveable between a raised position shown in FIG. 1 and a lowered position shown in FIG. 7. A right head siderail 50 is also moveable between the raised position of FIG. 1 and lowered position similar to that of the left head siderail 48 in FIG. 7. As shown in FIG. 1, in the raised position, the siderails 48 and 50 extend above an upper surface 52 of the respective decks of the hospital bed 10 when the siderails 48 and 50 are in a raised position. In a lowered position, such as the position of left head siderail 48 in FIG. 7, which positions an upper edge 56 of the left head siderail 48 below the upper surface 52.

The hospital bed 10 also includes a left foot siderail 58 and a right foot siderail 60, each of which is supported directly from the load frame 26. Each of the siderails 48, 50, 58, and 60 are operable to be lowered to a position below the upper surface 52. It should be noted that when the head deck 28 is moved, the head siderails 48 and 50 move with the head deck 28 so that they maintain their relative position to the patient. This is because both of the head siderails 48 and 50 are supported by the head deck 28.

Referring to the left head siderail 48, a user interface 62 includes a hard panel 64 and a graphical user interface 66. The user interface 62 will be discussed in further detail below, but it should be understood that the hard panel 64 provides indications to a user regarding the status of certain functions of the hospital bed 10 as well as providing a standard set of fixed input devices. The graphical user interface 66 includes a touchscreen display that provides information to a user as well as allowing for flexible, menu driven, operation of certain functions of the hospital bed 10. The right head siderail 50 also includes a user interface 68 which includes a hard panel 70. In other embodiments, the right head siderail 50 may include a second graphical user interface duplicative of the graphical user interface 66.

Figure 46A:
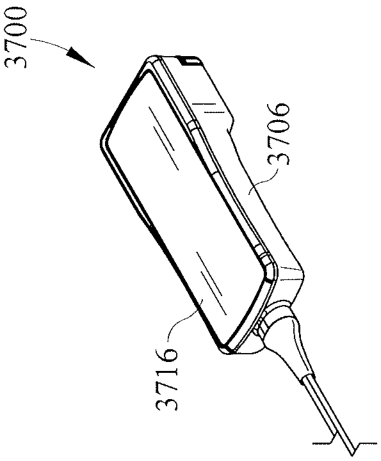
FIG. 46A is a perspective view of a portion of a patient pendant as viewed from the patient facing surface of the pendant.
Figure 46B:
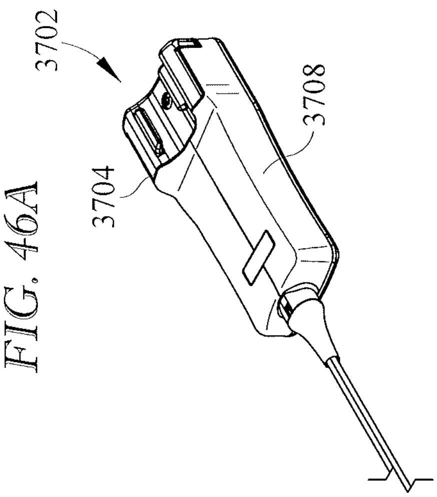
FIG. 46B is a perspective view of the pendant of FIG. 46A as viewed from the side opposite the patient facing surface.
Figure 46C:
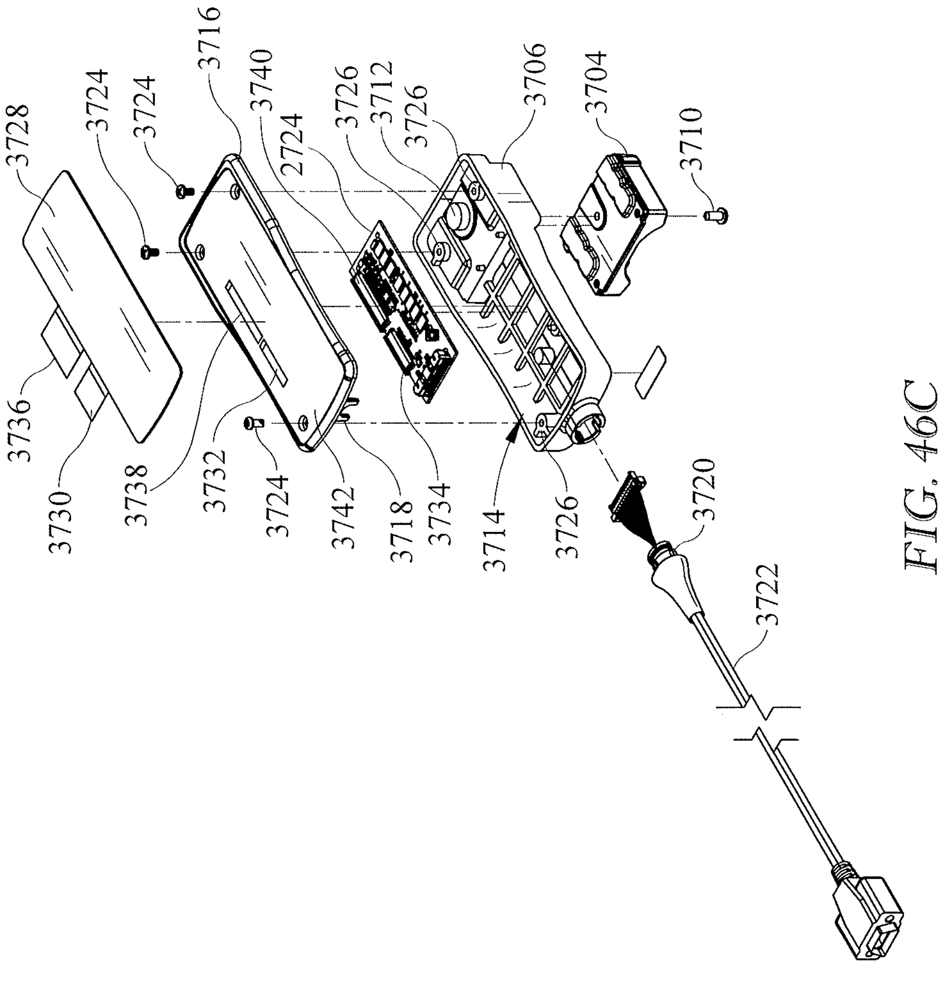
FIG. 46C is an exploded assembly view of the pendant of FIG. 46A.

The hospital bed 10 may further include an optional patient pendant 72, shown in FIGS. 46A-46C, which may be used by a patient to control certain functions of the hospital bed 10. Additional information is provided to a caregiver through an optional indicator panel 74 which displays the status of various conditions of the hospital bed 10 graphically to a caregiver at the foot end 12 of the hospital bed 10. The location of the indicator panel 74 makes the statuses of the conditions easily discernable from a distance, such that a caregiver may quickly ascertain the statuses from the hallway or the door of a patient's room. As will be discussed below, additional indication of the statuses may be projected on the floor under the foot end 12 of the hospital bed 10, providing larger images on the floor, making the images more easily discerned by a caregiver. Similarly, an illuminated grip 76 is positioned on the left head siderail 48, the illuminated grip 76 being selectively illuminated in different colors to provide an indication of the status of one or more functions of the hospital bed 10 to a caregiver. Similarly, the right head siderail 50 also includes an illuminated grip 78, which is duplicative of the illuminated grip 76.

Figure 5:
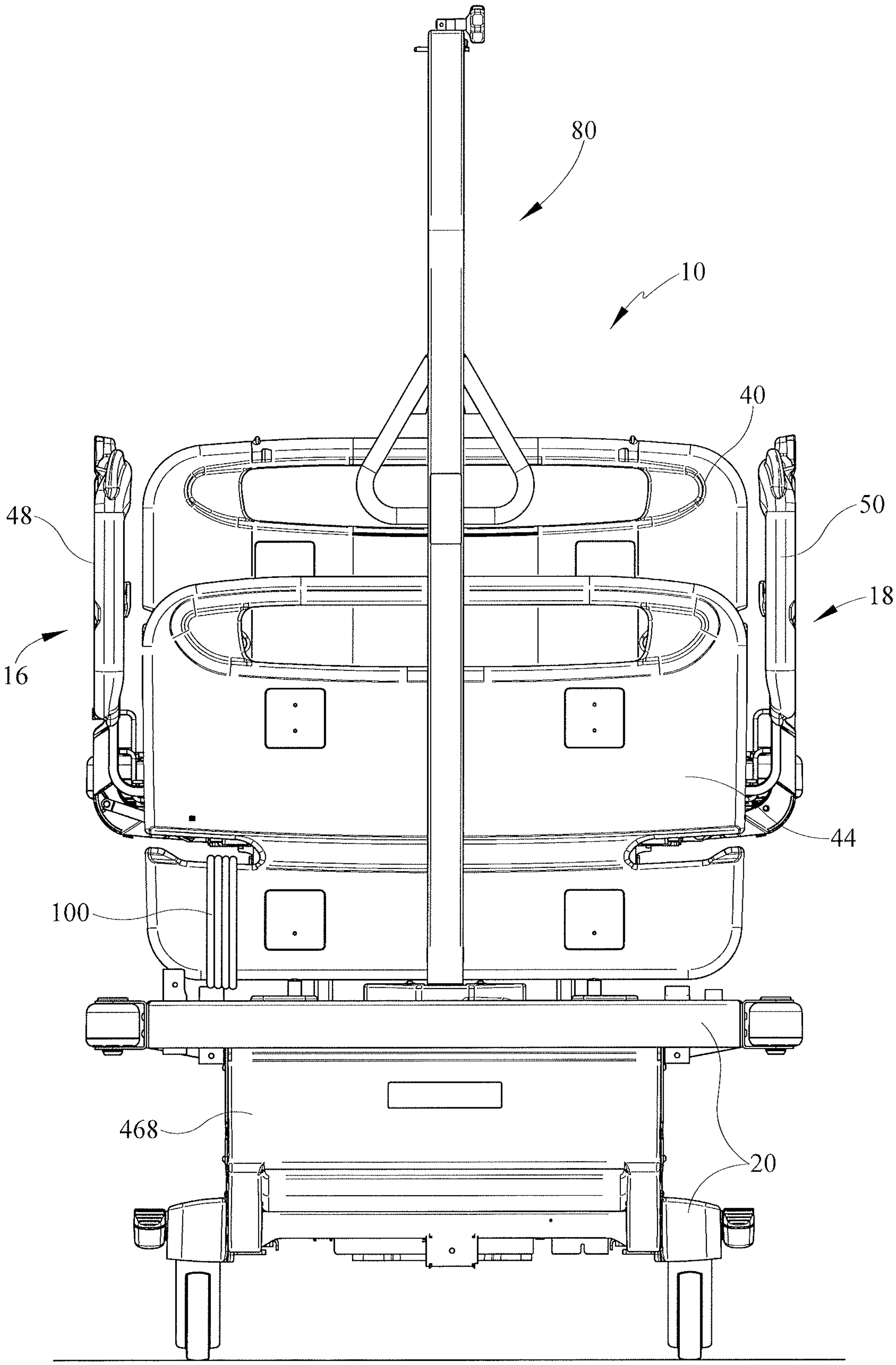
FIG. 5 is a plan view of the patient support apparatus of FIG. 1 as viewed from the head end of the patient support apparatus.
Figure 6:
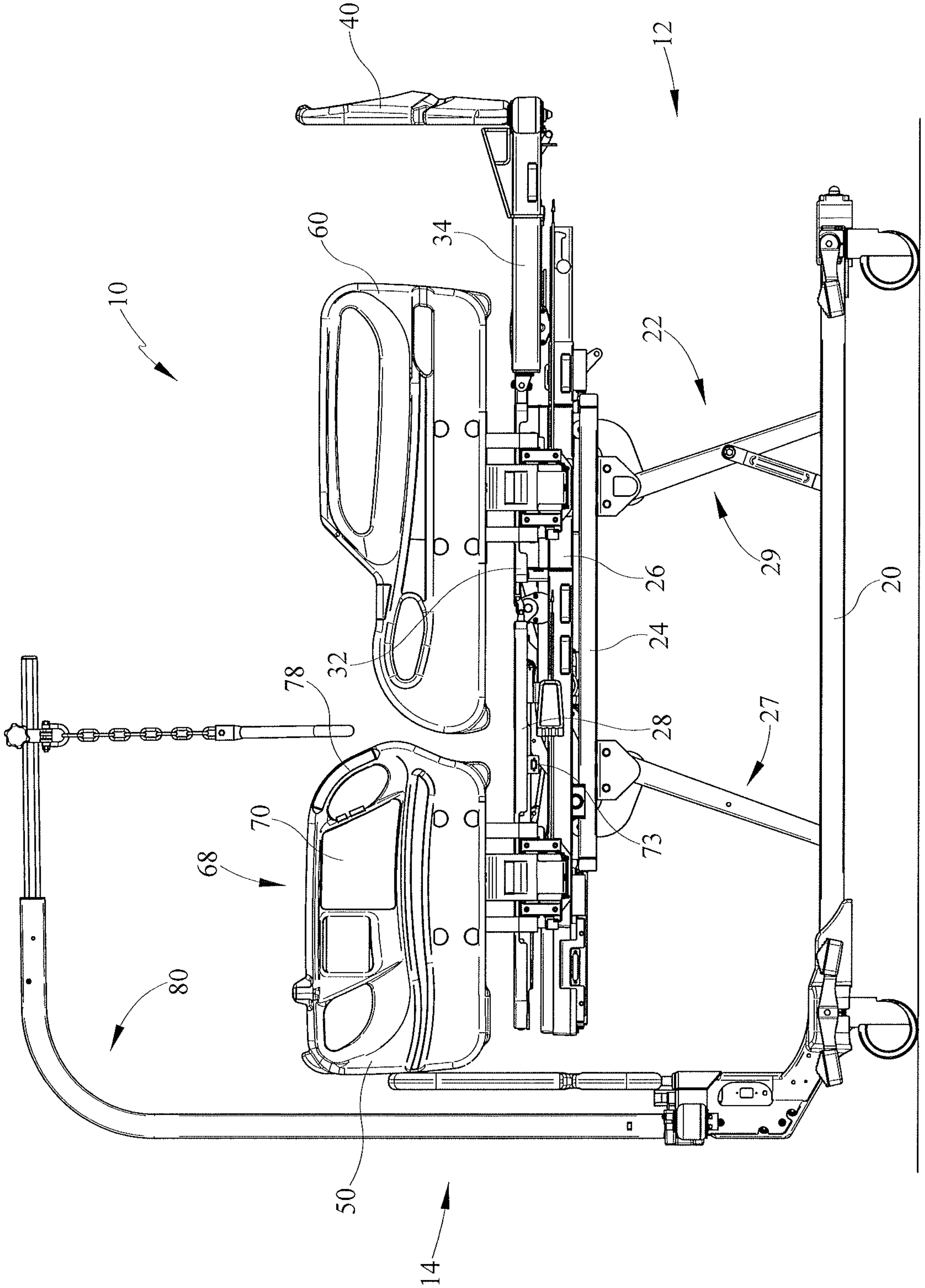
FIG. 6 is a plan view of the patient support apparatus of FIG. 1 as viewed from the patient's right side of the patient support apparatus.
Figure 7:
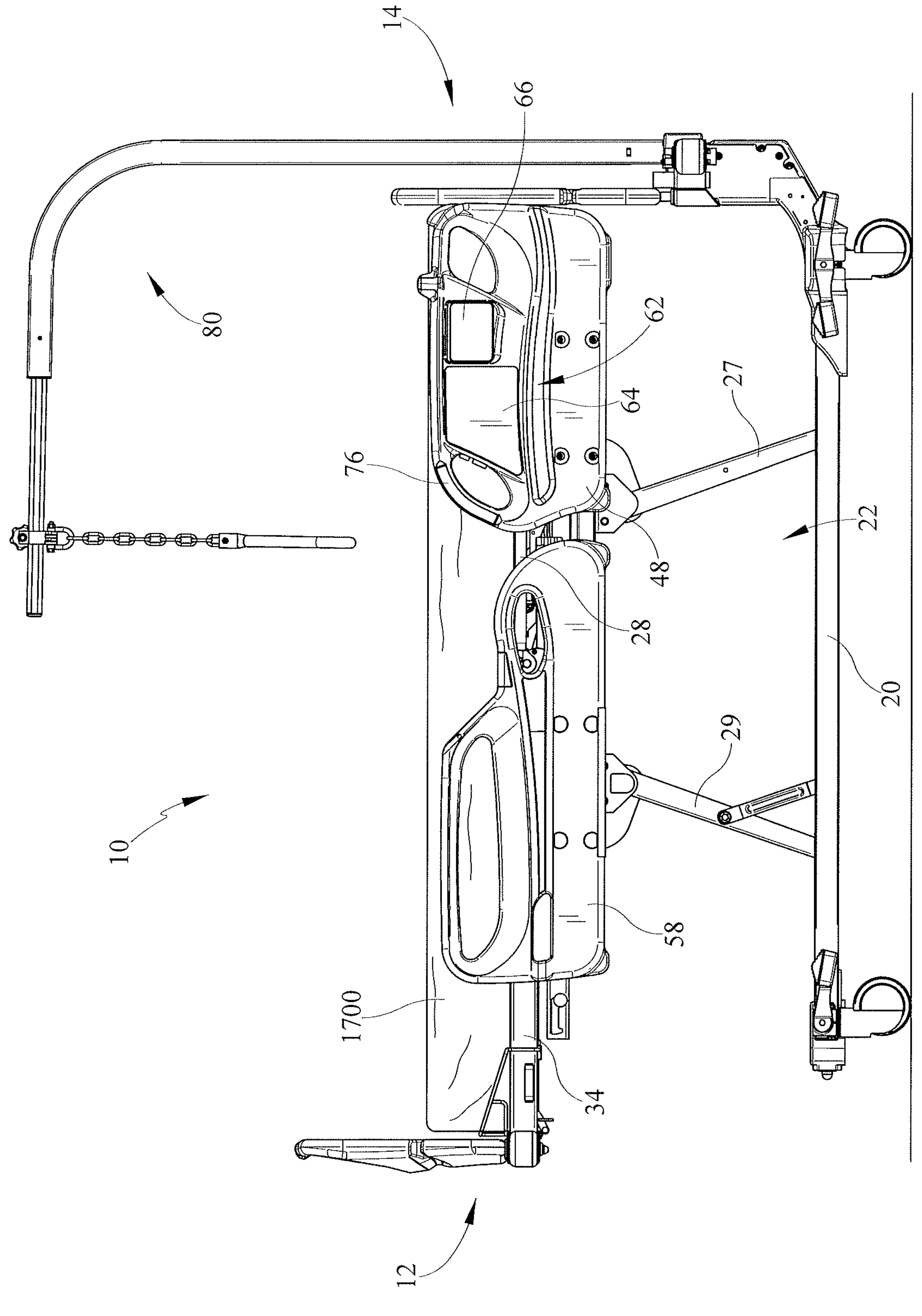
FIG. 7 is a plan view of the patient support apparatus of FIG. 3 as viewed from the patient's left side of the patient support apparatus with the siderails of the hospital bed 10 in a lowered position.

As shown in FIGS. 1-9, the hospital bed 10 includes a patient helper 80, which is supported from the base frame 20 (see FIGS. 5-7). The patient helper 80 includes a curved arm 82 that is fixed to the base frame 20 with a support arm 84 extending from the curved arm 82. The support arm 84 is formed to include a hexagonal cross-section which provides a resistance to rotation of a clamp 86 when the clamp 86 is secured to the support arm 84. The clamp 86 supports a chain 88 which depends vertically from the clamp 86. The chain 88 supports a grip 90 which is graspable by a patient positioned in a supine position on the hospital bed 10 so that the patient may use the patient helper 80 to reposition themselves in the hospital bed 10.

The hospital bed 10 also includes an auxiliary outlet 110 positioned at a foot end 12 of the base frame 20. The auxiliary outlet 110 provides a separate circuit, independent of the electrical system of the hospital bed 10, which may be used to power accessory equipment positioned at the foot end 12 of the hospital bed 10.

In some embodiments, the hospital bed 10 also includes a powered drive wheel assembly 92 (shown in FIG. 12) that is positioned on the base frame 20 near the central longitudinal and lateral axes of the base frame 20. The powered drive wheel assembly 92 includes a motor assembly 330 that powers a drive wheel 214 (see FIG. 12). The drive wheel 214 is operable, under the control of a user, such as a caregiver, for example, to provide assistance to the user in transporting the hospital bed 10 over a floor. The powered drive wheel assembly 92 is operated by user through a user interface 382 positioned at the head end 14 of the hospital bed 10. The user interface 382 includes two handles 394, 396 which are engaged by a user and which include inputs that allow the user operate the powered drive wheel assembly 92.

Figure 37:
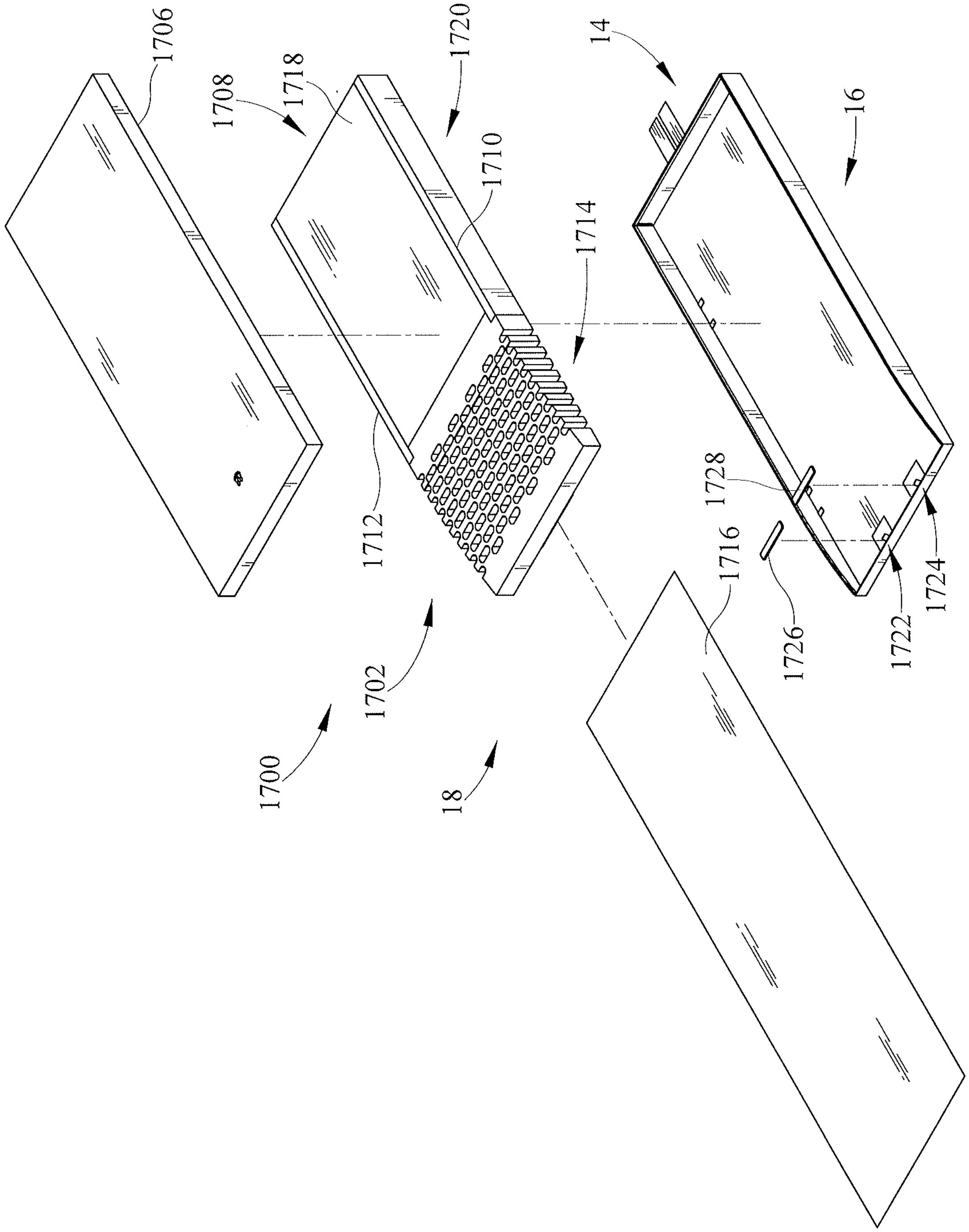
FIG. 37 is an exploded assembly view of the patient support surface of FIG. 3.

The hospital bed 10 is configured to support a patient support surface 1700 (see FIG. 3). The patient support surface of the illustrative embodiment of FIG. 3 is a non-powered mattress comprising a core of foam components as shown in FIG. 37. The hospital bed 10 may also be used in conjunction with a patient support surface 1800 shown in FIG. 39 which includes a number of air cells that employ self-adjusting technology to distribute a patient's weight or with a pneumatic patient support surface 1900 which utilizes a pressurized air to operate the patient support surface 1900 to support the patient. Each of the patient support surfaces 1700, 1800, and 1900 are discussed in further detail below.

The control system 400 of the hospital bed 10 is configured to interact with several sub-systems and auxiliary devices, permitting the user of the hospital bed 10 to control or interact with the subsystems through the graphical user interface 66. For example, the graphical user interface 66 allows a user to control operation of the pneumatic patient support surface 1900. A user may also interact with the indicator panel 74 and illuminated grips 76 and 78 to define the conditions that cause each of those devices to provide indications to a user. The hospital bed 10 also includes a scale system with the graphical user interface 66 providing the interface for the user to the operation of the scale system and associated operations and alerts. Still further, the hospital bed 10 may include a patient position monitoring function that is operated from the graphical user interface 66. Other subsystems and accessories that may be interfaced with the graphical user interface 66 include a chair exit monitoring system, a sequential compression device, a radio frequency based authentication system for identifying appropriate caregivers, a charting function that allows a user to chart certain information to the patient's electronic medical record from the graphical user interface 66. In addition, the hospital bed 10 may optionally be configured with an incontinence detection system which provides an alert if the patient has an incontinent event. Each of these functions and accessories may employ the graphical user interface 66 to configure and monitor the various subsystems and accessories. Utilization of the graphical user interface 66 permits optional functions and accessories to be added without the need for reconfiguring any hard keys on the hospital bed 10.

Figure 60:
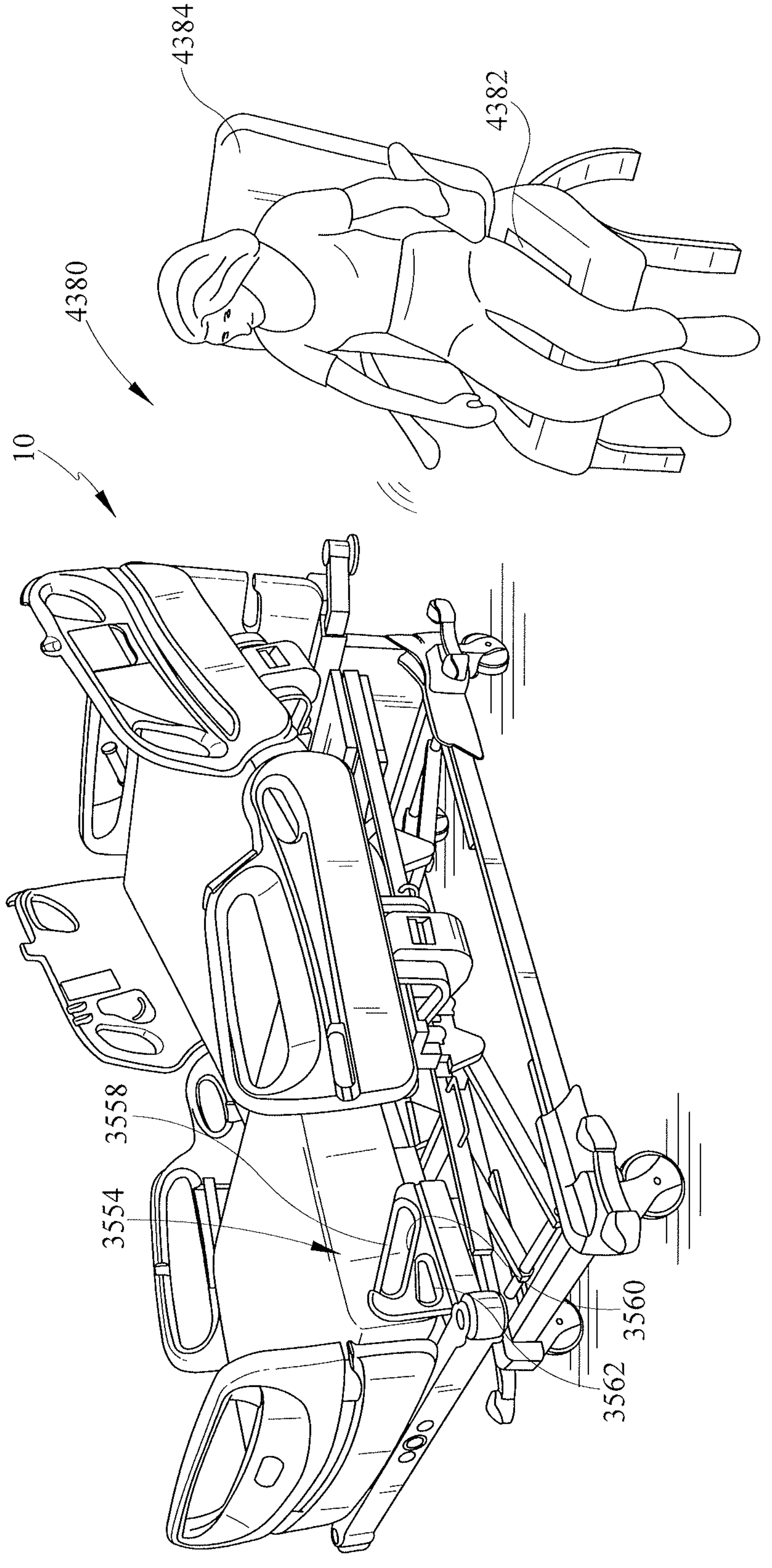
FIG. 60 is a perspective view of a patient support apparatus including a hospital bed 10 and an adjacent chair, the chair having an exit sensor that communicates with the hospital bed 10.
Figure 157:
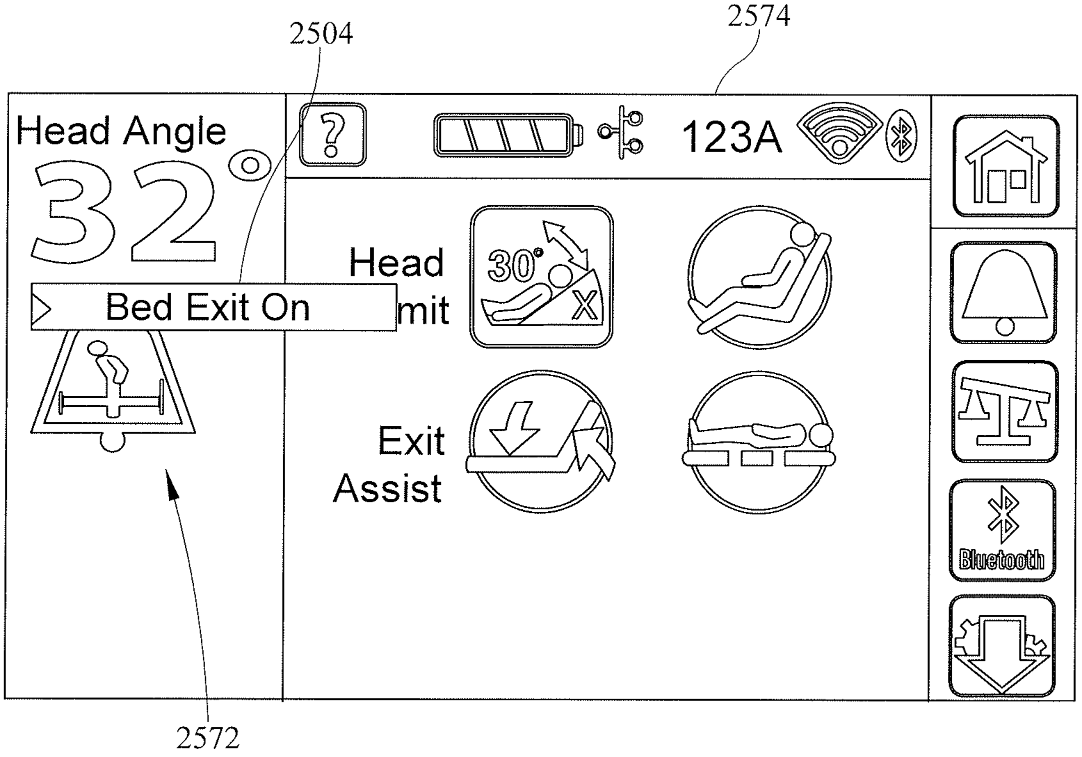
Figure 158:
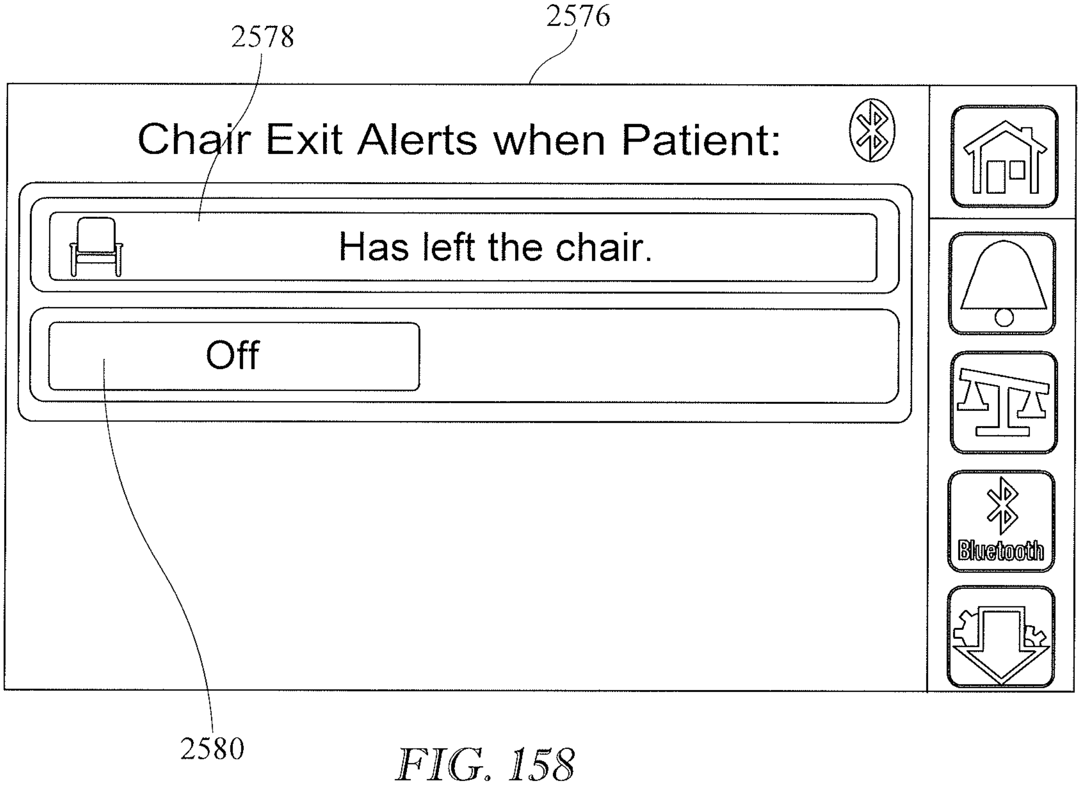

For example, referring now to FIG. 60, the patient support apparatus 10 may be configured to be part of a system which includes the patient support apparatus 10 and a detector 4382 configured to be positioned on a chair 4384 to be used by a patient. The detector 4382 is operable to communicate wirelessly with the patient support apparatus 10 such that the detector 4382 is integrated with the patient position monitoring system of the patient support apparatus 10. In some embodiments, when the patient sits on the detector 4382, the system automatically arms to monitor for an egress from the chair 4384 by the patient. If an egress condition is detected, the detector 4382 indicates that condition to the patient support apparatus 10 which then alerts a caregiver via the patient position monitoring system of the patient support apparatus 10. For example, as shown in FIG. 158, a caregiver may use the graphical user interface to set the patient position monitoring system between one of three detection settings: detecting when a patient changes position; detecting when the patient moves toward the edge of the patient support apparatus 10; or detecting when the patient has left the patient support apparatus. The patient position monitoring system may be programmed with a voice prompt or other auditory alarm or alert encouraging the patient to stay in the patient support apparatus 10 until assistance arrives. In some embodiments, the voice prompt will in courage the patient to "please stay in hospital bed 10." Further details of the operation of the patient position monitoring system and chair exit alarms is shown in FIGS. 144-180.

Figure 11:
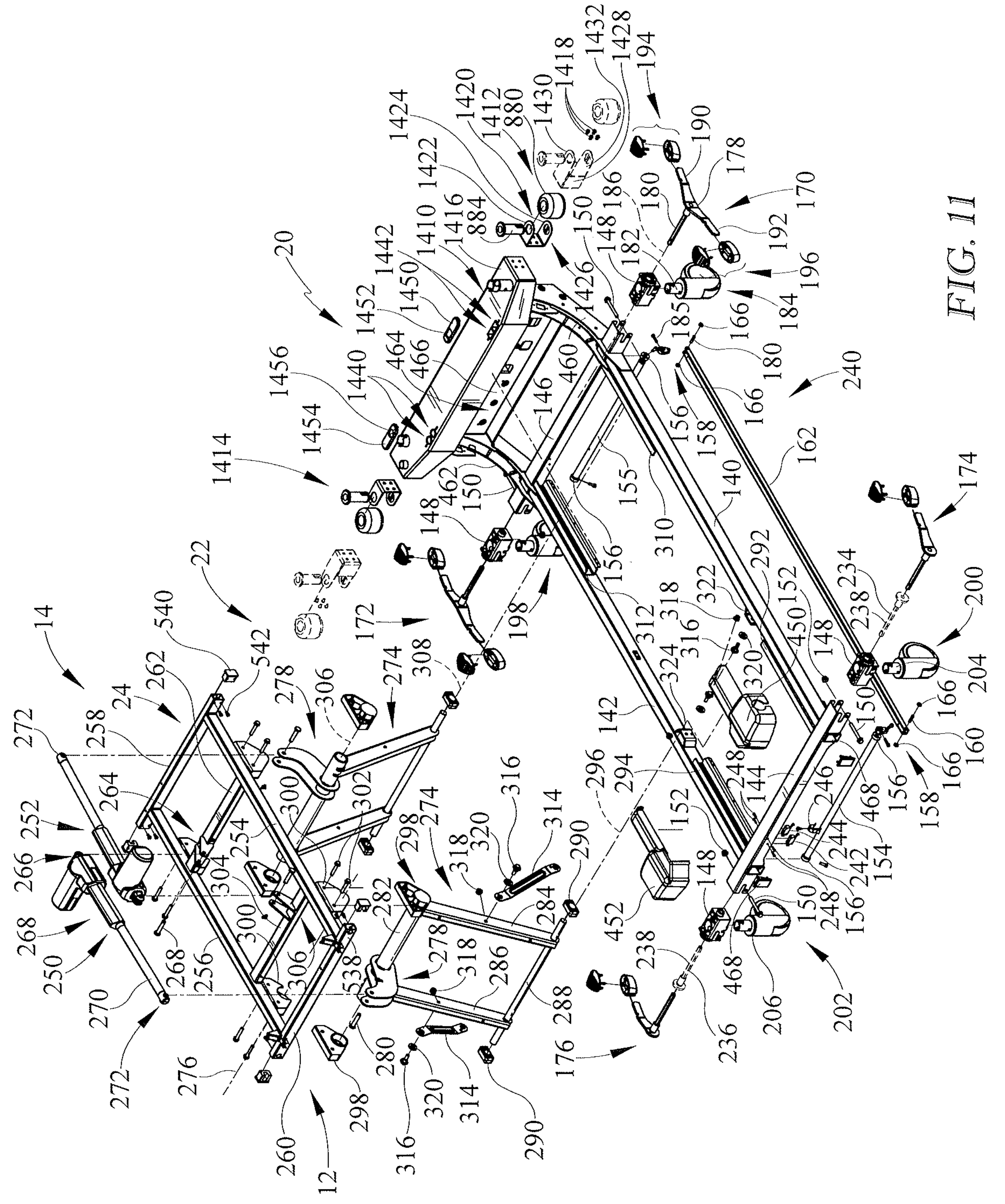
FIG. 11 is an exploded assembly view of a base frame and they lift system of the patient support apparatus of FIG. 1.

As shown in FIG. 11, the base frame 20 includes a pair of laterally spaced longitudinal rails 140 and 142 with the rail 140 being positioned on the left side 16 of the base frame 20 and the rail 142 being positioned on the right side 18 of the base frame 20. A lateral channel 144 is positioned at the foot end 12 of the base frame 20 and connects the two rails 140 and 142. A second lateral channel 146 is positioned at the head end 14 of the rails 140 and 142 connects to both the rails 140 and 142. Four caster mounts 148 are positioned in the channels 144 and 146 and secured by a bolt 150 and nut 152 as suggested in FIG. 11. Each channel 144 and 146 overlies a respective lateral brake shaft assembly 154 and 155 which spans the channels 144 and 146 to interconnect the respective caster mounts 148. The lateral brake shaft assemblies 154 and 155 each includes a pair of receivers 156 secured to each end of the respective lateral brake shaft assembly 154, 155 with the receivers 156 having a hexagonal shaped internal feature. In addition, at the end of each of the lateral brake shaft assemblies 154, 155 positioned at the left side 12 of the base frame 20, a floating hub 158 is positioned to be aligned with the hexagonal shaped internal feature of the receivers 156 positioned on that side. The floating hub 158 includes a through-hole positioned in an offset lobe of the floating hub 158, the through-hole configured to receive a pin 160. The base frame 20 further includes a longitudinal brake link 162. The longitudinal brake link 162 is formed to include a yoke 164 at each end, the yokes 164 receiving the offset lobe of the floating hub 158 so that the pin 160 engages both the longitudinal brake link 162 and the offset lobe of the floating hub 158. Each pin 160 is retained by a pair of caps 166 which are forced onto the respective ends of the pins 160 and are retained with an interference fit.

In operation, the rotation of either of the brake shaft assemblies 154 or 155 is transferred to the other by the motion of the floating hub 158 which transfers the motion to the longitudinal brake link 162, which acts on the other of the floating hubs 158 to rotate the other of the brake shaft assemblies 154 or 155. The brake shaft assemblies 154 and 155 are manually manipulated by the operation of one of four pedal assemblies 170, 172, 174, and 176. The pedal assembly 170 is positioned at the left head end of the base frame 20. The pedal assembly 170 includes an input arm 178 which is secured to a shaft 180 having a hex shaped cross-section. The shaft 180 is passed through a receiver 182 of a caster 184 and is received in the hexagonal shaped internal features of the receiver 156 of floating hub 158 and is secured in place by a clamp screw 185. Because the pedal assembly 170 is keyed to the brake shaft assembly 155 positioned at the head end 14 of the hospital bed 10, movement of the pedal assembly 170 is transferred to the brake shaft assembly 155 and, through the floating hub 158, to the longitudinal brake link 162.

Figure 32:
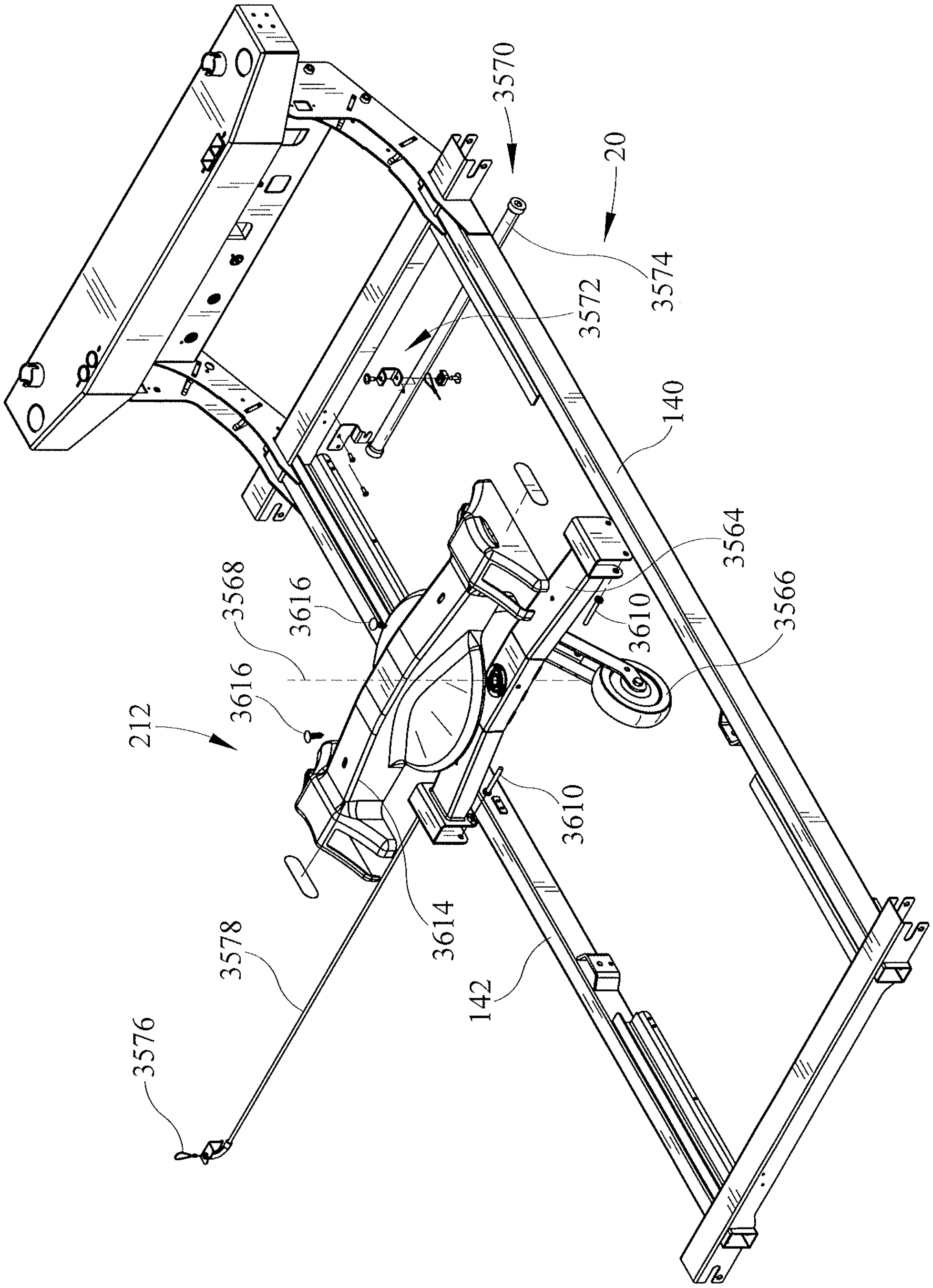
FIG. 32 is an exploded assembly view of a portion of the patient support apparatus including an unpowered auxiliary wheel which assist with steering the patient support apparatus as it's moved over the floor.

The input arm 178 is secured to the shaft 180 and is configured to rotate about an axis 186. The input arm 178 has a first leg 190 and a second leg 192. A pad assembly 194 is secured over the first leg 190 and secured with a snap-fit. Another pad assembly 196 is secured over the second leg 192 and secured with a snap-fit. The pad assemblies 194 and 196 are configured to be manually acted upon by a user, with the user's foot, for example, to cause rotation of the input arm 178 about the axis 186 to cause rotation of the shaft 180. In the embodiment of pedal assembly 170, the pad assembly 194 is illustratively an orange color and corresponds to the motion about shaft 180 that causes braking of the caster 184 and is transferred to the other three casters 198, 200, and 202 through the longitudinal brake link 162 and the brake shaft assemblies 154 and 155 to cause braking of all four of the casters 184, 198, 200, and 202. The pad assembly 196 is illustratively a green color and corresponds to the motion about shaft 180 that causes casters 200 and 202 to be placed in a steer mode. In the illustrative embodiment, the two foot end casters 200 and 202 are capable of being placed in steer mode which is a mode in which rotation of the casters 200 and 202 about their relative stems 204 and 206 is precluded and the casters 200 and 202 are placed in a trailing mode with the wheels 208 and 210 of the respective casters 200 and 202 trailing behind the stems 204 and 206 as shown in FIG. 11. In this trailing configuration, the hospital bed 10 tracks along a straight path which eases the movement of the hospital bed 10 by a user. In other embodiments, only one of the casters 200 and 202 may be placed in steer mode. In still other embodiments, none of the casters 184, 198, 200, or 202 may be placed in steer mode and the hospital bed 10 may include an auxiliary wheel assembly 212 positioned at the center of the base as shown in FIG. 32. As will be discussed in further detail below, the auxiliary wheel assembly 212 is continuously in contact with the ground and provides a mechanism for tracking the hospital bed 10 in a straight line. In still other embodiments, the hospital bed 10 may include a powered auxiliary wheel 214, shown in FIG. 12, which is deployed when the pad assembly 196 is activated and is selectively activated to provide a driving force to drive the hospital bed 10 over the floor as will be discussed in further detail below.

Suitable casters for this application include part number 2046UAP125R36-32S35 from Tente for the brake/steer functionality.

The pedal assembly 172 is similar to pedal assembly 170, with the principal difference being that the pad assembly 194 of pedal assembly 172 is positioned on the second leg 192 of the input arm 178 of pedal assembly 172 and the pad assembly 196 is positioned on the first leg 190 of the input arm 178. This difference is consistent with the movement of the pedal assembly 170 about the axis 186. The brake mode requires movement in a first direction about axis 186 and the steer mode requires movement in a second direction, opposite the first direction. Thus, both pad assemblies 194 are at the head end 14 of the hospital bed 10 and the pad assemblies 196 are inboard from the pad assemblies 194. The assembly of the pedal assembly 172 to the caster 198 is otherwise similar to the arrangement of pedal assembly 170 and caster 184.

The pedal assembly 174 has an input arm 216 with a single leg 218. A pad assembly 194 is positioned on the single leg 218 and the single leg 218 is positioned to effect rotation of a shaft 220 of the pedal assembly 174 about an axis 222 that corresponds to rotation about axis 186 when the brake function is activated. The shaft 220 is positioned in a receiver 224 of caster 200 and operates to activate the brake function in a manner similar to the action of pedal 170. The shaft 220 engages the floating hub 158 in a manner similar to that of shaft 180 described above.

The pedal assembly 176 has an input arm 226 with a single leg 228. A pad assembly 194 is positioned on the single leg 228 and the single leg 228 is positioned to effect rotation of a shaft 230 of the pedal assembly 176 about the axis 222. The shaft 230 is positioned in a receiver 232 of caster 202 and operates to activate the brake function in a manner similar to the action of pedal 174. In effect, pedal assemblies 174 and 176 lack the ability to place the hospital bed 10 into a steer mode.

In some embodiments, the pedal assemblies 174 and 176 are omitted and replaced with actuators 234 and 236, respectively, shown in phantom in FIG. 11. The actuators 234 and 236 are of similar construction and have a shaft 238 with a hexagonal cross section. The actuators 234 and 236 are secured to the floating hubs 158 as described above and operate to transfer motion from the longitudinal brake link 162 to the casters 200 and 202 when the pedal assemblies 170 or 172 are activated. This arrangement omits the pedal assemblies 174 and 176 to reduce cost and eliminate the potential for unintended actuation of the pedal assemblies 174 and 176, which are positioned near the foot end 12 of the hospital bed 10 and more accessible for actuation.

The pedal assemblies 170, 172, 174, and 176 cooperate with the longitudinal brake link 162 and the mechanisms of the casters 184, 198, 200, and 202 and the brake shaft assemblies 154, 155 to operate as a brake-steer mechanism 240. As will be described in further detail below, the hospital bed 10 includes a control system 400 which utilizes various inputs from sensors on the hospital bed 10 and from external sources to process the sensor information and control outputs on the hospital bed 10 as well as providing information external systems. There are two sensors 242 and 244 that are associated with the brake-steer mechanism 240 and provide information relative to the mode of the brake-steer mechanism 240 to the control system 400. The brake shaft assembly 154 includes an actuator 246 which moves with the brake shaft assembly 154 when it is rotated. When the brake-steer mechanism 240 is placed in brake mode, the actuator 246 engages the sensor 244 so that the sensor 244 is activated to provide an indication to the control system 400 that the brake-steer mechanism 240 is in the brake mode. Rotation about the axis in the opposite direction when the brake-steer mechanism 240 is placed in the steer mode causes the actuator 246 to engage the sensor 242 to provide an indication to the control system 400 that the brake-steer mechanism 240 is in steer mode. The sensors 242 and 244 are each a limit switch with an activation arm that is engaged by the actuator 246 to provide the signal to the control system 400. The sensors 242 and 244 are each secured to the lateral channel 144 by a pair of screws 248 and electrically connected to the control system 400 as will be described in further detail below.

The hospital bed 10 includes a pair of covers 450 and 452 which each include an opening 454 to allow the shaft of the pedal assemblies 174, 176 to pass through the opening 454. When the pedal assemblies 174, 176 are omitted, the covers 450, 452 are omitted and replaced with covers that do not include the openings 454. Referring to FIG. 1, a cover 456 is positioned at the head end of the base frame 20 and is a unitary structure which overlies the cross channel 146 and covers the top of the casters 184, 198 while also spanning the space between the longitudinal rails 140, 142. The cover 456 partially overlies another cover 458 which spans between two curved uprights 460 and 462. The cover 456 encloses a space 464 that's bounded by a panel 466 at the head end 14 of the base frame 20. Yet another cover 468 seen in FIG. 5 spans between the curved uprights 460, 462 to provide a shroud there between. Base frame 20 also includes a pair of snap fit covers 468, 468 that are inserted into the ends of the longitudinal rails 140, 142 as shown in FIG. 11.

The lift system 22 is supported on the base frame 20 and supports the upper frame 24. The lift system 22 includes an actuator 250 which extends and retracts to cause the foot end 12 of the upper frame 24 to be raised and lowered relative to the base frame 20. The lift system 22 includes another actuator 252 which extends and retracts to cause the head end 14 of the upper frame 24 to be raised and lowered relative to the base frame 20. The actuators 250 and 252 provide output to cause actuation of the upper frame 24 relative to the base frame 20 and are electrically connected to the control system 400 such that the control system 400 provides electrical signals to the actuators 250 and 252 to cause the movement of the upper frame 24 relative to the base frame 20. The actuators 250 and 250 to include internal Hall-effect sensors (not shown) which are electrically connected to the control system 400 and used by the control system 400 to determine the position of the actuators 250 and 252, and thereby, the position of the upper frame 24 relative to the base frame 20 as will be discussed in further detail below. One suitable actuator for this application is a Model TA24 actuator available from TiMOTION Technology of Taiwan City, Taiwan.

The upper frame 24 includes a longitudinal rail 254 positioned on the left side 16 of the upper frame 24 and a longitudinal rail 256 positioned on the right side 18 of the upper frame 24. A crossmember 258 is positioned at the head end 14 of the intermediate frame and secured to the longitudinal rails 254 and 256. A crossmember 260 is positioned at the foot end 12 of the upper frame 24 and secured to the longitudinal rails 254 and 256.

The upper frame 24 further includes a cross rail 262 which is a lateral member that spans a distance between the longitudinal rails 254 and 256. The cross rail 262 includes a yoke 264 with an end 266 of the actuator 250 being engaged with the yoke 264 and secured with a pin 269 such that the end 266 of the actuator 250 is secured to the upper frame 24. The actuator 250 includes a body 268 and a rod 270 that extends and retracts relative to the body 268. A rod end 272 is positioned at a distal end of the rod 270 such that the distance between the end 266 and the rod end 272 very as the rod 270 is extended and retracted relative to the body 268. The actuator 250 acts on a lift arm assembly 274 such that the lift arm assembly 274 rotates about an axis 276 and caused movement of the upper frame 24 relative to the base frame 20. The lift arm 274 includes a yoke 278 to which the rod 272 is secured by a pin 280. The pin 280 is offset from the axis 276 so that extension and retraction of the actuator 250 causes a moment about the axis 276. The yoke 278 is secured to a torque tube 282 of the lift arm 274 such that the moment created by the extension retraction of the actuator 250 induces rotation of the torque tube 282 about the axis 276. The lift arm assembly 274 includes a pair of arms 284 and 286 which are secured to the torque tube 282 so that rotation of the torque tube 282 causes movement of the arms 284, 286. The lift arm assembly 274 also includes a shaft 288 which is secured to the arms 284 and 286 with the shaft 288 being offset from the torque tube 282 by the arms 284 and 286 such that rotation of the torque tube 282 about the axis 276 causes orbiting of the shaft 288 about the axis 276. The lift system 22 is supported on the base frame 20 by engagement of a first slide block 290 being positioned in a channel 292 which is secured to and supported on the longitudinal rail 140 of the base frame 20. A second slide block 290 engages a channel 294 which is secured to the longitudinal rail 142 of the base frame 20. Each end of the shaft 288 of the lift arm 274 is received in one of the slide blocks 290 and is free to rotate about an axis 296 of the shaft 288.

Each end of the torque tube 282 is received in a respective bearing 298. The upper frame 24 includes a pair of bearing receivers 300 positioned on the underside of the rails 254 and 256, respectively. The bearing receivers 300 are supported on the bearings 298 with the bearings 298 being secured to each of the bearing receivers 300 by a pair of fasteners 302 to so that the upper frame 24 is supported on the torque tube 282 through the bearings 298 with the bearing receivers 300 securing the bearings 298 relative to the upper frame 24. Rotation of the torque tube 282 by the action of the actuator 250 induces movement of the shaft 288 and slide blocks 290, 290 in the respective channels 292 and 294 so that the lift arm 274 moves between a position where the arms 284 and 286 are generally parallel to the longitudinal rails 140 and 142 of the base frame 20 and a position where the arms 284 and 286 are in a generally vertical orientation like that shown in FIG. 11. In this way, extension and retraction of actuator 250 changes the elevation of the foot end 12 of the upper frame 24 relative to the base frame 20.

The structure used to raise and lower the head end 14 of the upper frame 24 relative to the base frame 20 is the same as that with regard to the foot end 12 of the upper frame 24. The upper frame 24 includes another cross rail 304 that includes a yoke 306 which receives and supports the end 266 of the actuator 252. The actuator 252 includes all of the structural components of actuator 250. The rod end 272 of the actuator 252 engages the yoke 278 of a second lift arm assembly 274. The torque tube 282 of the second lift arm assembly 274 rotates about an axis 306 to cause rotation of the shaft 288 of the second lift arm assembly 274 about an axis 308. The slide blocks 290 of the head end lift arm assembly 274 are received in channels 310 and 312 which are secured to the longitudinal rails 140 and 142, respectively, of the base frame 20. Extension and retraction of the actuator 252 causes rotation of the torque tube 282 about the axis 306 which, thereby, causes movement of the arms 286 and 284 of the lift arm assembly 274 to move between a horizontal position generally parallel to the longitudinal rails 140 and 142 and the generally vertical position shown in FIG. 11. Thus, the head end actuator 252 is operable to move the head end 14 of the upper frame 24 vertically relative to the base frame 20.

To prevent the lift system 22 from being moved longitudinally relative to the base frame 20, the lift arm 274 positioned at the foot end 12 is secured to the base frame 20 through a pair of ground links 314. The ground links 314 are secured at the midpoint of the arms 284 and 286 with fasteners 316 that are secured by nuts 318 with a washer 320 providing for rotation of the ground links 314 relative to the bolt 316. The longitudinal rails 140 and 142 of the base frame 20 have respective flanges 323 and 324 secured thereto. The ground links 314 are each secured to the flanges 232 and 324 by a bolt 316 and a nut 318 with a washer 320 permitting the ground links 314, 314 to rotate relative to the flanges 323 and 324. The ground links 314, 314 serve to ground of the foot end lift arm 274 to the base frame 20 to prevent the sliding of the slide blocks 290 relative to the base frame 20, without extension and retraction of the respective actuators 250 and 252.

Figure 12:
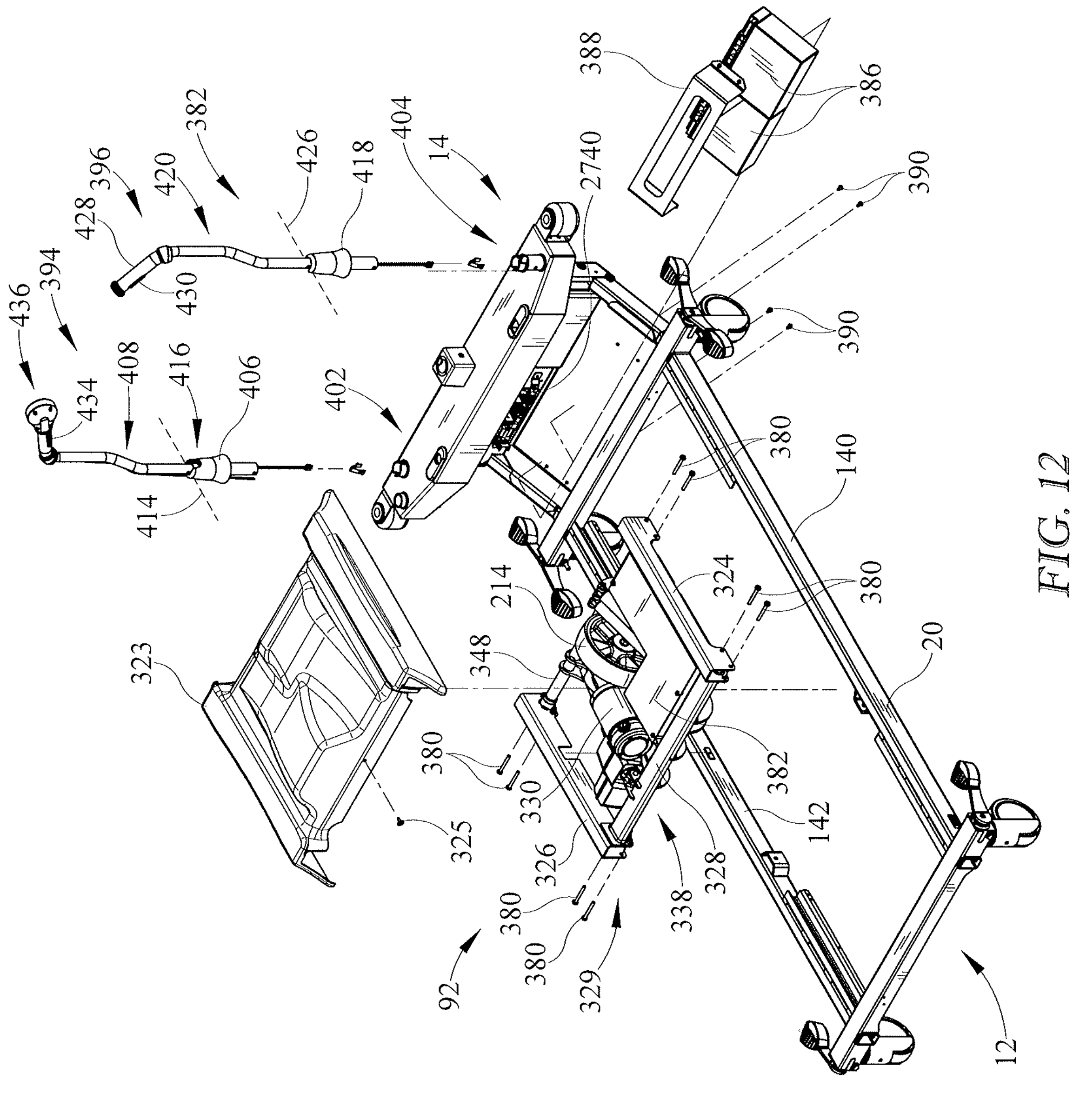
FIG. 12 is an exploded assembly view of a portion of a patient support apparatus including a powered auxiliary wheel assembly mounted to a base frame of the patient support apparatus.

As shown in FIG. 12, with further detail provided in FIGS. 34, 35, and 55-57 embodiments of the hospital bed 10 may include a powered drive wheel assembly 92 which supports and drives the powered auxiliary wheel 214. The powered drive wheel assembly 92 includes laterally spaced channels 325 and 326 which overlie the longitudinal rails 140 and 142 of the base frame 20, respectively. The channels 325 and 326 are interconnected by a crossbeam 328 to form a frame 329 of the powered drive wheel assembly 92. The powered auxiliary wheel 214 is driven by a motor assembly 330 which includes a transmission 332 that transmits the rotation of the motor assembly 330 to drive the wheel 214. An actuator 334 is operable to raise and lower the auxiliary wheel 214 relative to the frame 329 of the powered drive wheel assembly 92. A suitable motor is an Electro-Craft MP36-WL-018V24-400. A suitable actuator is a LA40 from Linak USA, Inc. The actuator 334 is secured to the cross-beam 328 with an end 341 of the actuator 334 being secured to a yoke 338 of the crossbeam 328 by a pin 336. The pin 336 permits rotation of the actuator 334 relative to the yoke 338. The actuator 334 includes a body 340 and a rod 342 with a rod end 344 of the actuator 334 secured to a yoke 346 that is secured to a torque tube 348 by a pin 350. The torque tube 348 is supported by the frame 329 on a pair of bushings 343, 343 and rotatable about an axis 352 with the rotation of the torque tube 398 being caused by the extension and retraction of the rod 342 relative to the body 340.

Rotation of the torque tube 348 is transferred to a shaft 354 which is positioned under the crossbeam 328 and rotatable relative to the frame 329 on a pair of bearings 343, 343. The torque tube 348 is secured to a yoke structure 356 that includes three flanges 358 which move with the torque tube 348 when it rotates about the axis 352. A pair of gas springs 360, 360 is secured to the yoke structure 356 by a pin 366. The gas springs 360 and 362 each include a body 368 and a rod 370 with a rod end 372 of each gas spring 360 and 362 secured to a respective flange 374 and 376 coupled to the shaft 354. The shaft 354 supports a platform 378 on which the motor assembly 330 is mounted. The platform 378 rotates about the shaft 354. Because the auxiliary wheel 214 is supported from the motor assembly 330, movement of the platform 378 and motor assembly 330 causes movement of the auxiliary wheel 214 from a retracted position shown in FIG. 12 to a deployed position, wherein the auxiliary wheel 214 engages the floor.

When the auxiliary wheel 214 is deployed to engage the floor, the gas springs 360 and 362 provide resilient down pressure to maintain the auxiliary wheel 214 in engagement with the floor. If the auxiliary wheel 214 encounters an obstacle in the floor, such as a threshold, the force of the engagement of the auxiliary wheel 214 with the obstruction is transferred through the platform 378 to the shaft 354 and the rods 370, 370 of the gas springs 360 and 362. The resilience of the gas springs 360 and 362 permit the rods 370, 370 to contract into the bodies 368, 368 of the respective gas springs 360 and 362. In this way, the gas springs 360 and 360 to operate as shock absorbers for the powered drive wheel assembly 92. The frame 329 of the powered drive wheel assembly 92 is secured to the base frame 20 by eight screws 380. A shroud 323 is positioned over the frame 329 and secured to the crossbeam 328 by a fastener 327.

The powered drive wheel assembly 92 includes a control box 382 which encloses a circuit board assembly 384 which provides control for the powered drive wheel assembly 92 by operating the actuator 334 and a motor speed controller 385. The circuit board assembly 384 and the motor controller 385 are housed in the control box 382 which includes a base 381 and a cover 383. A suitable motor controller is A Dynamic DS120. The components of the control box 382 are secured by a number of screws 387. The circuit board assembly 384 receives power from a pair of batteries 386 that are supported from the base frame 20 and secured by a bracket 388 and four fasteners 390.

A user interface 392 for the powered drive wheel assembly 92 is positioned at the head end 14 of the base frame 20 and includes a pair of push handles 394 and 396 as shown in FIGS. 12 and 55-57. The push handles 394 and 396 are supported from the base frame in respective mount tubes 402 and 404. The push handle 394 includes a base 406 and a curved upper arm 408 that may be folded down relative to the base 406 when the push handle 394 is not in use. The curved upper arm 408 includes a slot 410 is secured to the base 406 by a pin 412 defining an axis 414. The upper curved arm 408 is movable relative to the pin 412 with an end of the curved arm 408 being received in an inner diameter of the base 406 when it is in a use position shown in FIG. 12. To move the push handle 394 to a stowed position, the upper arm 408 is moved vertically upwardly relative to the base 406 and rotated about the axis 414 to rotate down to the stowed position with relief in the base 406 being provided by a slot 416 formed in the base 406.

The push handle 396 includes a base 418 and a curved upper arm 420. The curved upper arm 420 includes a slot 422 which engages a pin 424 secured to the base 418 with the pin 424 defining an axis 426. The push handle 396 operates in a manner similar to the push handle 394 and a stowed by lifting the curved upper arm 420 out of an internal diameter of the base 418 and pivoting the upper curved arm 420 about the axis 426 to a stowed position.

Figure 57:
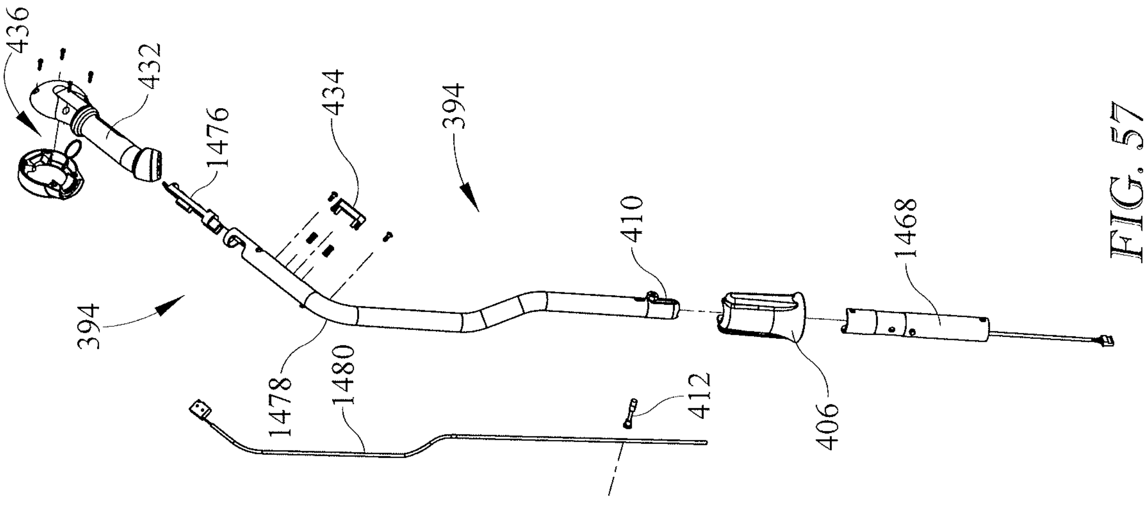
FIG. 57 is an exploded assembly view of another push handle for use with the powered auxiliary wheel of FIG. 12.
Figure 78:
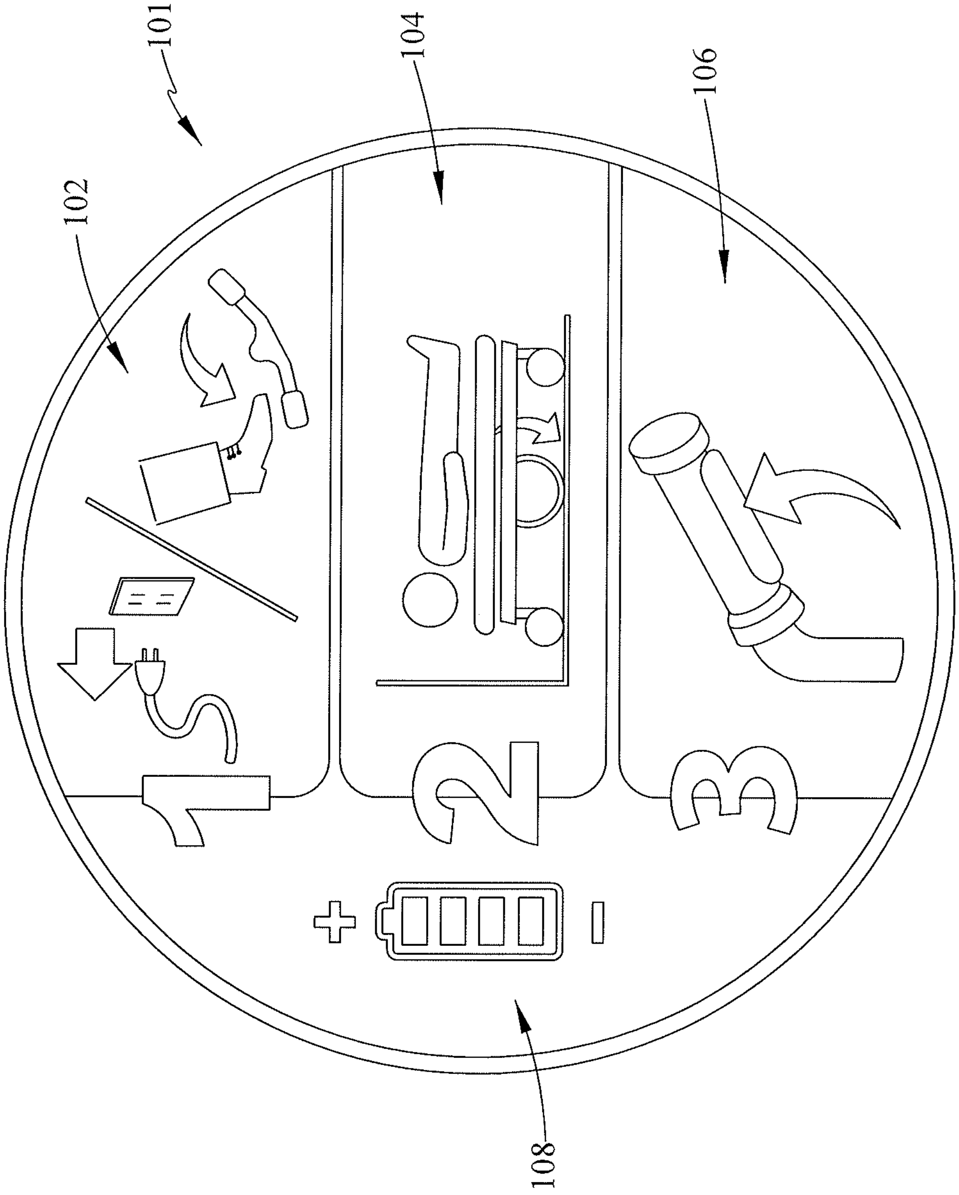
FIG. 78 is a panel for a handle for the powered wheel assembly of FIG. 12.

The push handle 396 includes a grip 428 and a switch 430 which is an electrical communication with the controller 384. The switch 430 is configured to be actuated by the hand of the user when they grip onto the grip 428 of the push handle 396. The push handle 394 includes a grip 432 and a switch 434 that is also configured to be actuated by the hand of a user when they grip onto the grip 432 of the push handle 394. The switch 430 is engaged with a switch assembly 1472 that is positioned in an upper portion 1474 of the curved arm 420 as suggested in FIG. 55. Similarly, the switch 434 is engaged with a switch assembly 1476 that is positioned in an upper portion 1478 of the curved arm 408 as shown in FIG. 57. In addition, the user interface panel 436 supported on the push handle 394 includes a display 101 as shown in FIG. 78. The display 101 includes instructions for a user to activate the powered drive wheel assembly 92. To operate the powered wheel assembly 92 a user must first unplug the hospital bed 10 from the wall and engage the steer function as indicated at 102. The user must then lower the hospital bed 10 to a transport height as indicated at 104. Finally, a user must engage both of the enable switches 430 and 434 as indicated at 106. Once these conditions are met, the powered wheel assembly 92 is operational. A status of the level of charge in the batteries 386 is provided by an indicator 108.

When the push handles 396 and 394 are in a use position such as that shown in FIG. 12, the curved upper arms 408 and 420 engage respective strain gauge assemblies 1468, 1470 positioned in the bases 418 and 406 such that when a user applies pressure to the push handles 394 and 396, the strain gauges 1468, 1470 provide a signal to the controller 384 indicative of the force being applied. Further discussion of the operation of the powered drive wheel assembly 92 and the controller 384 is provided below with reference to the control system 400 of the hospital bed 10.

Figure 56:
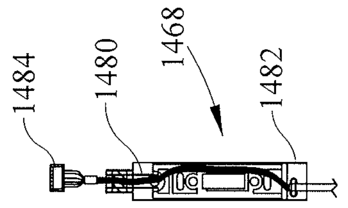
FIG. 56 is a cross-sectional view of strain gauge assembly of the push handle assembly of FIG. 55.
Figure 55:
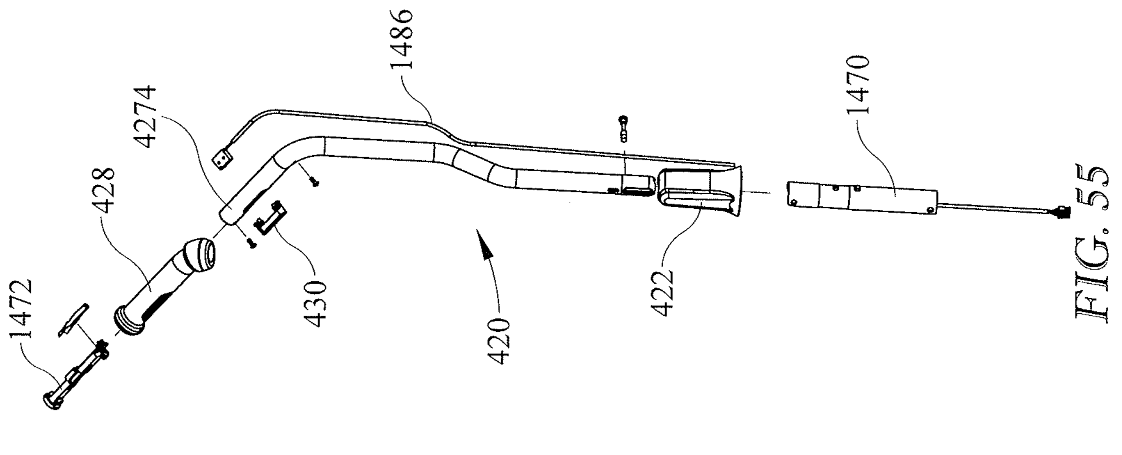
FIG. 55 is exploded assembly view of a push handle for use with the powered auxiliary wheel of FIG. 12.

The signals from the switch assembly 1476 and user interface panel 436 are transferred through a cable 1480 that is routed through the curved arm 408 and connected to a connector 1484 of a cable 1482 that is routed through the strain gauge assembly 1468 as shown in FIG. 56. A cable 1482 of push handle 396 is routed through the curved arm 420 and connects to the cable 1482 of the strain gauge assembly 1470 in a similar manner.

Figure 20:
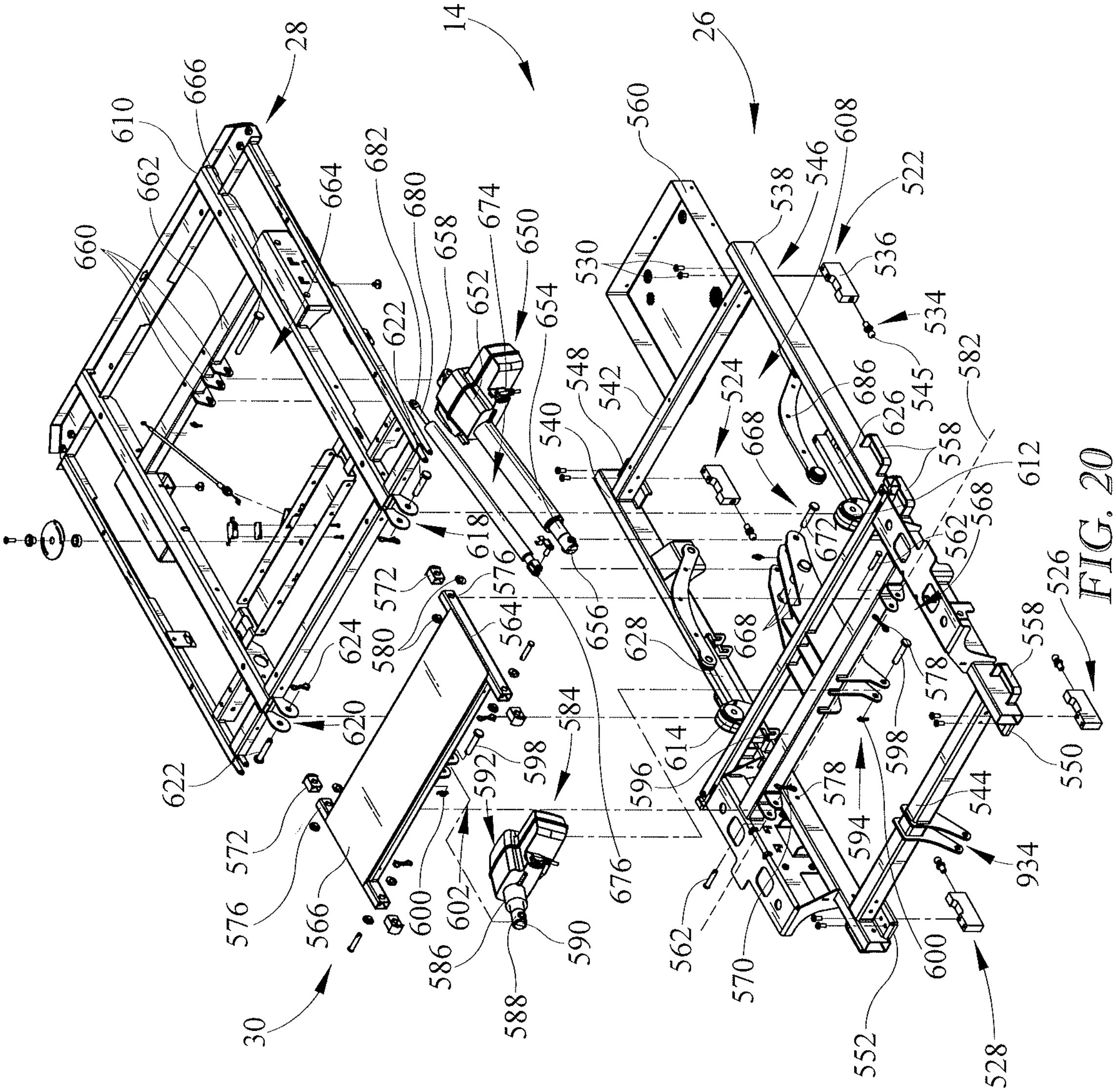
FIG. 20 is an exploded assembly view of a portion of the patient support apparatus of FIG. 1, including a load frame and portions of a deck supported on the load frame.

As shown in FIG. 20, the load frame 26 is supported from the upper frame 24 through four load cells 522, 524, 526, and 528 each of which is secured to the upper frame by a pair of fasteners 530, 530. Each load cell 522, 524, 526, 528 is formed to include a threaded receiver 532 into which a ball stud 534 is received so that the ball stud 534 is cantilevered from a body 536 of the respective load cells 522, 524, 526, and 528 as shown with respect to load cell 522. Referring now again to FIG. 11, the cross members 258 and 260 of the upper frame 24 are formed to include receivers 539 through which the ball studs 534 are positioned and supported on a load block 540 positioned in each end of each crossmember 258 and 260 and secured with fasteners 542. The ball ends 545 of each ball stud 534 are supported on the load blocks 543 point contact. All of the weight of the load frame 26 and components supported by the load frame 26 discussed below are supported on the ball studs 534 such that the load cells 522, 524, 526, and 528 since the load supported by the load frame 26 and are operable to provide a signal representative of that load to the control system 400 as will be discussed in further detail below.

The load frame 26 includes a pair of longitudinal rails 538 and 540 with the longitudinal rail 538 being positioned on the left side 16 of the load frame 26 and the longitudinal rail 540 being positioned on the right side 18. A cross beam 542 is positioned between the rails 538 and 540 and positioned generally at the head end 14 of the load frame 26. A second crossbeam 544 is secured to the rails 538 and 540 and positioned generally at the foot end 12 of the load frame 26. The load frame 26 includes a number of flanges 546, 548, 550, and 552. The cross beams 542 and 544 are welded to the rails 538 and 540. The flanges 546, 548, 550, and 552 are welded to both a respective crossbeam 542 or 544 and a respective rail 538 or 540. The load beams 522, 524, 526, and 528 are each secured to one of the respective flanges 546, 548, 550, or 552.

The load frame 26 supports a pan 560 to which a main circuit board (not shown in FIG. 20) is secured. In addition, the load frame 26 includes three drainage bag hooks 558 positioned on the outside of each rail 538 and 540. The location of the drainage bag hooks 558 on the load frame 26 provides a location to support various Foley bag or other structures which collect waste products from a patient on the load frame 26 provide an accurate scale reading until the waste products are removed so that a caregiver is capable of determining the weight removed from the load frame 26 at the time that the waste receptacle is removed or emptied. The load frame 26 includes additional structures for supporting other components of the hospital bed 10 for movement relative to the load frame 26.

The load frame 26 supports the head deck 28 for movement relative to the load frame 26.

The articulated seat deck 30 is pivotably coupled to the load frame 26 by a pair of pins 562, 562 which secure laterally spaced rails 564 and 566 of the articulated seat deck to respective flanges is 568 and 570 as suggested by FIG. 20. A bearing 572 is positioned in the head end of each rail 564 and 566 with thru-holes 574 and 576 formed in the rails 564 and 566 respectively. The pins 562 pass through the respective thru-holes 574 and 576 the bearings 572, 572 and are secured by retaining clips 578. A pair of washers 580 are used at each connection between the respective flanges of yokes 568 and 570 and the pins 562 and retaining clips 578. The pins 562 cooperate to define a pivot axis 582 about which the articulated seat deck 30 pivots.

Pivoting of the articulated seat deck 30 is caused by an actuator 584 which has a body 586, an extendable rod 588, a rod end 590, and an end 592. The end 592 is secured to a clevis 594 positioned on the crossmember 596. The end 592 is secured to the clevis 594 by a pin 598 secured with a retaining clip 600. The rod 588 of the actuator 584 extends from the body 586 to change the distance between the rod end 590 and the end 592 as the actuator 584 changes length. The rod end 590 is received in a clevis 602 which is secured to a crossmember 604 of the articulated seat deck 30. The rod end 590 is secured by a pin 598 and a retaining clip 600. When the actuator 584 is in a fully retracted position as shown in FIG. 20, the articulated seat deck 30 is a generally flat orientation such that an upper surface 606 of the articulated seat deck 30 is generally parallel to the longitudinal rails 538 and 540 of the load frame 26. Extension of the rod 588 relative to the body 586 of the actuator 584 causes the articulated seat deck to pivot about the axis 582 so that foot end of the articulated seat deck 30 is raised. As will be discussed in further detail below, the raising of the articulated seat deck 30 causes movement of the first portion 36 of the foot deck 34. One suitable actuator for this application is a Model TA23 actuator available from TiMOTION Technology of Taiwan City, Taiwan.

Figure 21:
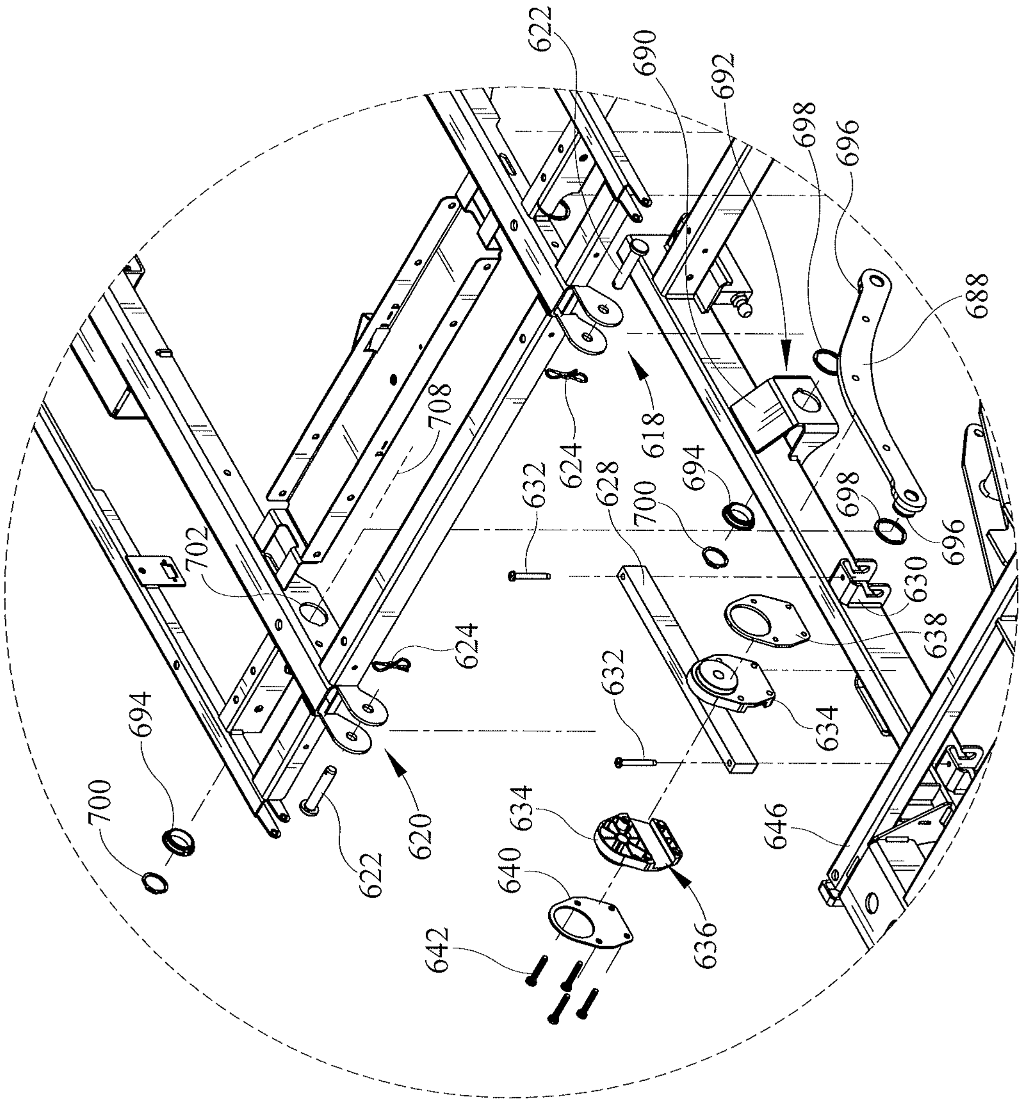
FIG. 21 is an exploded assembly view of a portion of the structure FIG. 20.

The head deck 28 includes a frame 610 which is supported on the load frame 26 and moves relative to the load frame 26 through an advanced articulation mechanism 608 that causes the head deck 28 to both translate and pivot relative to the load frame 26. The head deck 28 is supported on a pair of pivot supports 612 and 614 which define a pivot axis 616 about which the head deck 28 pivots. The frame 610 of the head deck 28 includes a pair of yokes 618 and 620 which engage with the pivot supports 612 and 614, respectively. The yokes 618 and 620 are secured to the pivot supports 612 and 614 by respective pins 622, 622 which are retained by respective retaining clips 624, 624. Each pivot support 612, 614 is supported on a respective slide rail 626 and 628. Referring to FIG. 21, the slide rails 626 and 628 are supported on the respective longitudinal rails 538 and 540 of the load frame 26.

Each longitudinal rail 538 and 540 supports a pair of mounts 630 secured to the respective rail 538 or 540 as suggested in FIG. 21. The discussion of the advanced articulation mechanism 608 will reference the structure positioned on the right side 18 of the load frame 26, but the structure on the left side 16 is a mirror of the structure on the right side 18. The slide rails 626 and 628 are attached to the mounts 630 by a pair of fasteners 632. The slide rails 626 and 628 are engaged by the pivot supports 612 and 614 such that the pivot supports 612 and 614 are permitted to translate or slide along the longitudinal length of the slide rails 626 and 628 which thereby provides for translation of the head deck 28 relative to the load frame 26. As shown in FIG. 21, the pivot support 614 includes a pair of pivot blocks 634 which each include a channel 636 which engages the slide rail 628 so that to the blocks 634 clamp over the slide rail 628 to capture the slide rail 628 in the respective channels 636, 636. The pivot blocks 634 are retained together by clamping of an inner plate 638 to an outer plate 640 by a number of fasteners 642 which pass through the pivot blocks 634 and are threaded into corresponding threaded holes 644 in the inner plate 638. The clamping action of the fasteners 642 and the plates 638 and 640 secure the pivot blocks 634 to the slide rail 628. The engagement of pivot support 612 to slide rail 626 is achieved in the same way as the engagement of pivot support 614 to slide rail 628.

Movement of the head deck 28 relative to the load frame 26 is controlled by an actuator 650. The actuator 650 includes a body 652 and a rod 654 which is extendable and retractable relative to the body 652. The actuator 650 includes a rod end 656 and an end 658, each of which facilitates pinning the actuator 650 to respective connecting points on the load frame 26 and head deck 28. The frame 610 of the head deck 28 includes three flanging 660 which are secured to a crossmember 662. Two of the flanges 660, 660 cooperate to define a yoke 664 to which the end 658 of the actuator 650 is connected for pivotable movement by a pin 666. One suitable actuator for this application is a Model TA15 actuator available from TiMOTION Technology of Taiwan City, Taiwan.

Similarly, the load frame 26 includes three flanges 668 which are supported from a crossmember 646. Two of the flanges 668 cooperate to define a yoke 670 to which the rod end 656 of the actuator 650 is pivotably coupled by a pin 672. The actuator 650 extends and retracts to change the distance between the end 658 and the rod end 656. This extension and retraction results in movement of the head deck 28 relative to the load frame 26. A gas spring 674 is also coupled to both the load frame 26 and the head deck 28. An end 676 of the spring 674 is secured to the third flange 668 for pivotable movement relative thereto by the pin 672 so that the gas spring 674 and rod end 656 of the actuator 650 are both pivotable about an axis 678 defined by the pin 672. The gas spring 674 includes a rod 680 and a rod end 682 with the rod end 682 being secured to the third flange 660 on the frame 610 of the head deck 28 by the pin 666 so that the rod end 682 and the end 658 of the actuator 650 each pivot about an axis 684 defined by the pin 666.

The actuator 650 includes an internal quick release mechanism which may be activated by a caregiver to quickly lower the head deck 28 to horizontal position in the event of an emergency, such as at a time when the caregiver may need to conduct cardiopulmonary resuscitation (CPR) on a patient supported on the hospital bed 10. The gas spring 674 provides resistance to the lowering of the head deck 28 relative to the load frame 26 when the quick release is activated thereby control the lowering of the head deck 28.

Because the head deck 28 is both pivotable and translatable relative to the load frame 26, it is necessary to have a control link to guide the movement of the head deck 28 relative to the load frame 26. This is accomplished by two ground links 686 and 688 which are pivotably coupled to both the load frame 26 and the head deck 28 to control movement of the head deck 28 relative to the load frame 26. As shown in FIG. 21, the ground link 688 is pivotably coupled to the load frame 26 at a mount 690 which is secured to the longitudinal rail 540 of the load frame 26. The mount 690 is formed to include a through-hole 692 through which a pivot sleeve 694 is positioned. The ground link 688 includes a pivot member 696 which is positioned through the hole 692 into the pivot sleeve 694. A pivot washer 698 is positioned over the pivot member 696 and between the ground link 688 and the mount 690 to facilitate movement of the ground link relative to the mount 690. The pivot sleeve 694 is retained on the pivot member 696 by a retaining ring 700 such that the ground link 688 is pivotable relative to the mount 690 by the interaction of the bearing 698 and pivot sleeve 694 supporting the pivot member 696 in the thru-hole 692.

The opposite end of the ground link 688 also includes a pivot member 696 which is positioned in a thru-hole 702 formed in a frame member 704 of the frame 610. The pivot member 696 is engaged with the frame member 704 utilizing a pivot washer 698, pivot sleeve 694, and retaining ring 700 similar to the engagement of the ground link 688 with the mount 690. The ground link 686 is engaged with the load frame 26 and head deck 28 in the same manner on the opposite side. Thus, the ground links 686 and 688 are pivotable relative to the load frame 26 about an axis 706 and the head deck 28 is pivotable relative to the ground links 686 and 688 about an axis 708.

In operation, extension of the actuator 650 causes compound movement of the head deck 28 relative to the load frame 26 as the axis 616 about which the head deck 28 pivots translates along the slide rails 626 and 628. The ground links 686 and 688 control movement of the head deck 28 relative to the load frame 26 by constraining longitudinal movement along the slide rails 626 and 628 and inducing rotation through the interaction of the ground links with the axis 708 relative to the axis 616 to cause the compound advanced articulation which results in movement of the head deck 28 away from the day articulated seat deck 30 toward the head end 14 of the hospital bed 10 while also causing pivoting of the head deck 28 about the axis 616.

Figure 22:
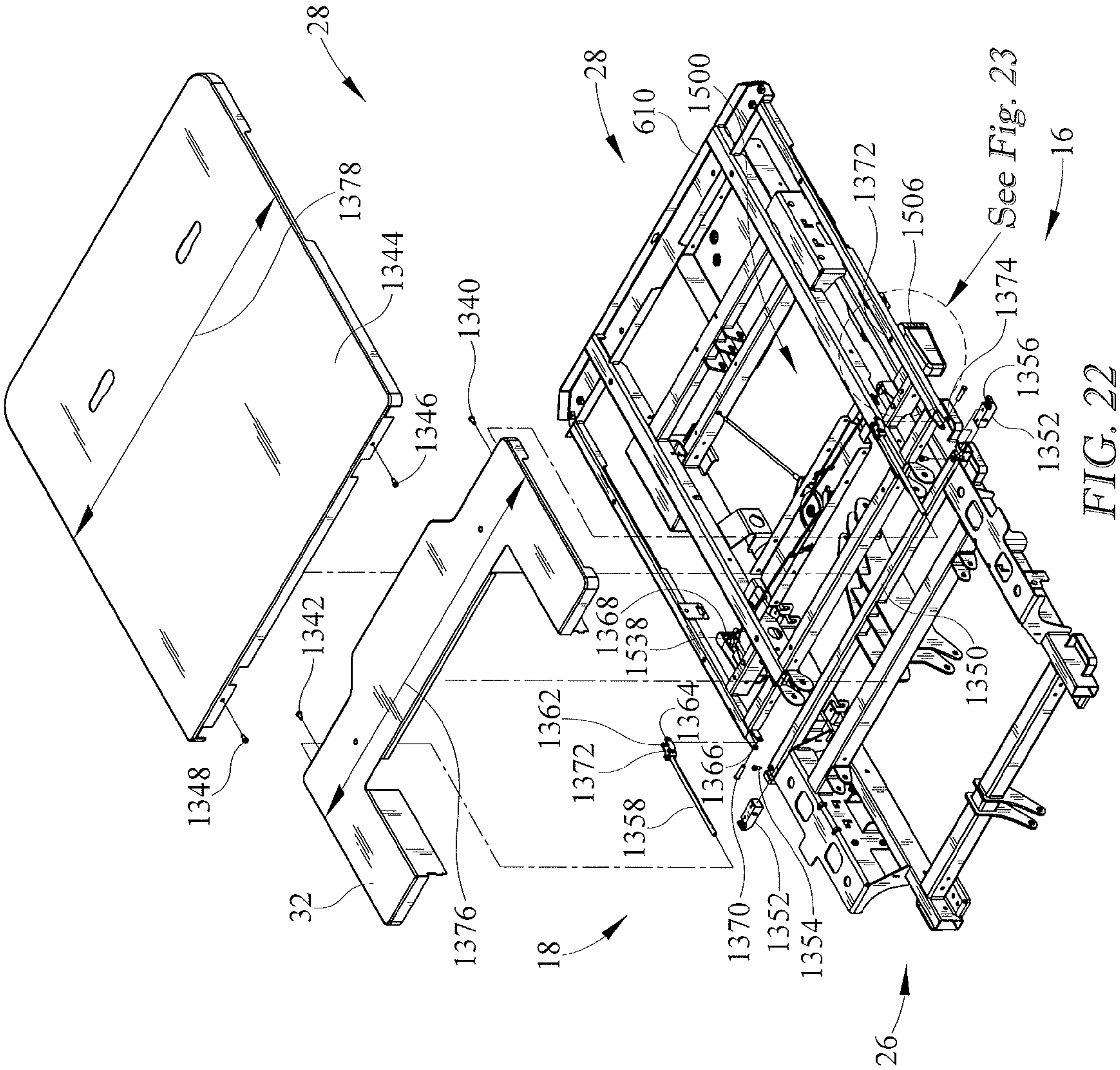
FIG. 22 is exploded assembly view of the structure of FIG. 20 with additional components shown in FIG. 22 for clarity.
Figure 23:
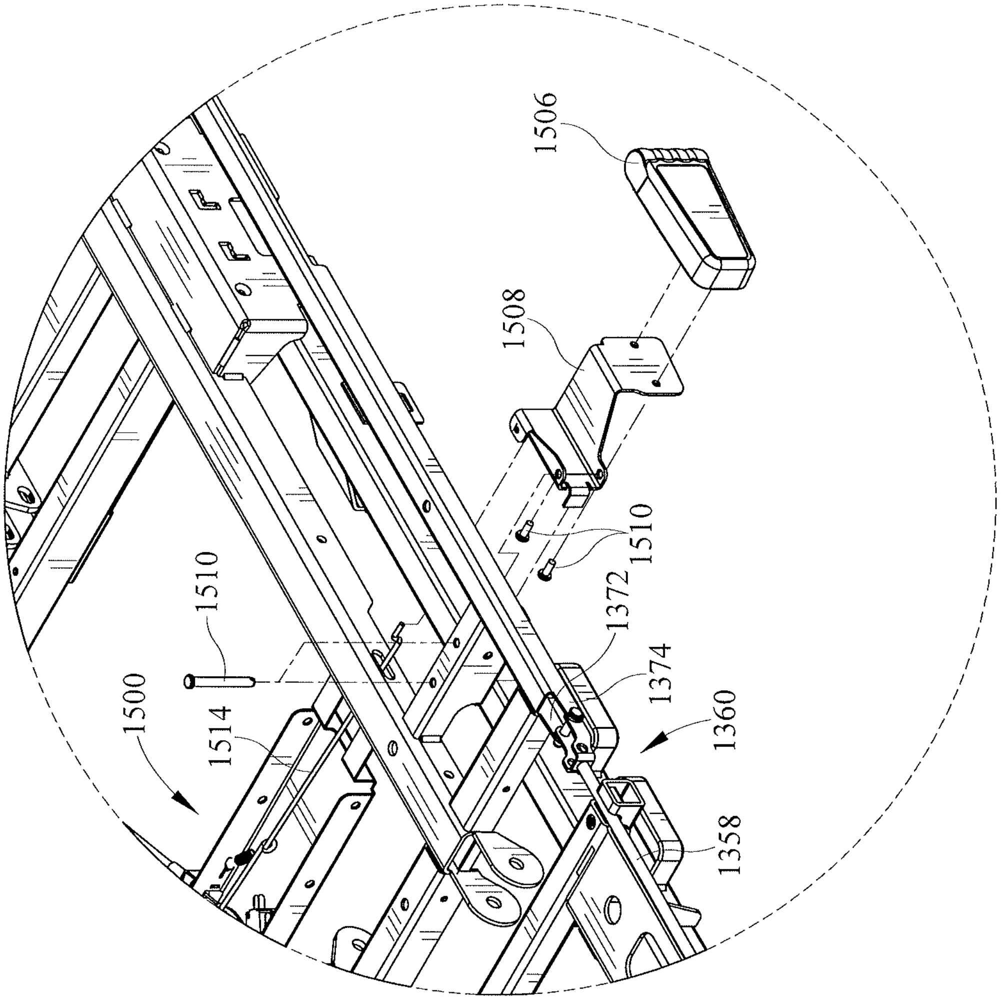
FIG. 23 is an exploded assembly view of an enlarged portion of the structure of FIG. 22.
Figure 101:
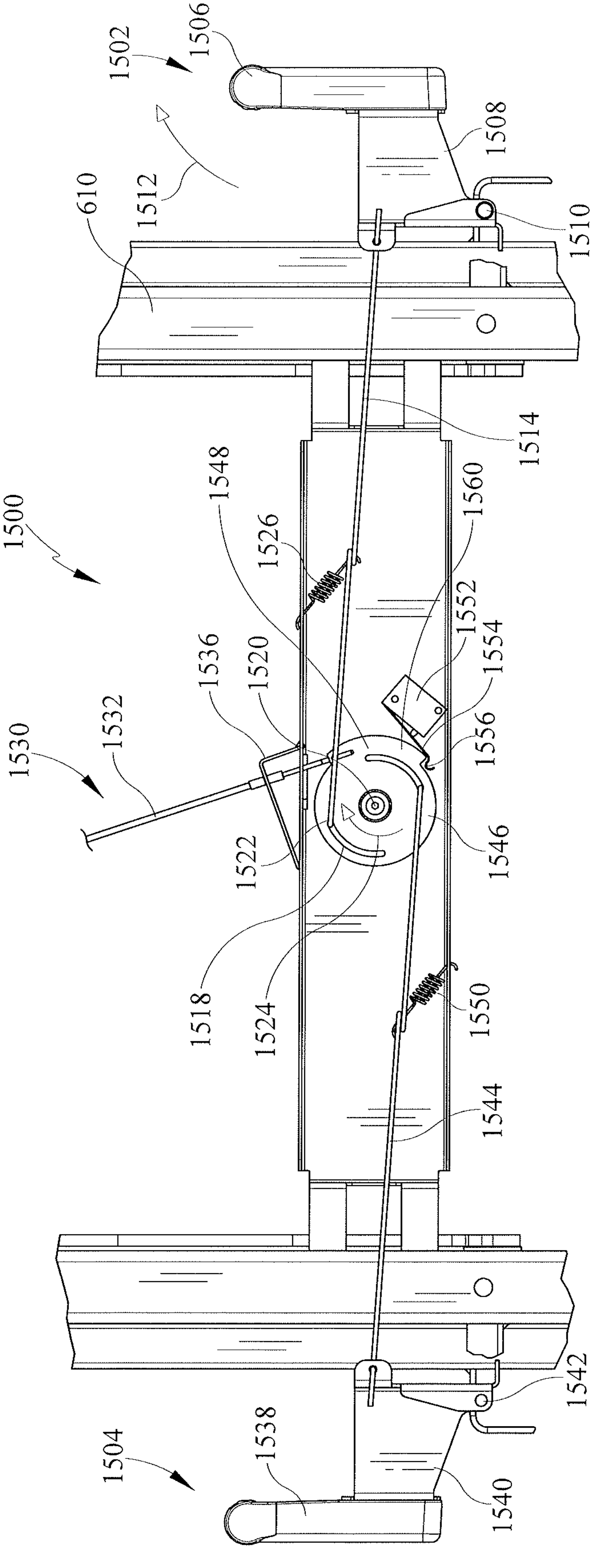
FIG. 101 is a top view of a release mechanism for activating the quick release mechanism of a head actuator of the patient support apparatus of FIG. 1.

The head deck 28 includes a CPR release mechanism 1500 that is supported on the frame 610 as suggested in FIGS. 22-23. The CPR release mechanism 1500 is actuated by one of two handles 1502, 1504 that are positioned below the deck 1344 on opposite sides of the head deck 28. Referring to the handle 1502, the grip 1506 is secured to an actuator 1508 by two screws 1510, 1510. The handle 1502 is pivotable relative to the frame 610 about a pin 1510 such that when the handle 1502 is pulled in the direction of an arrow 1512, the quick release mechanism of the actuator 650 is activated to lower the head deck 28. The actuator 1508 is engaged with a rod 1514 and the rod 1514 engages a plate 1516 resting in an arcuate slot 1518 formed in the plate 1516. The plate 1516 is pivotable about an axle 1520 such that when the rod 1514 reaches a terminal end 1522 of the slot 1518; the motion in the direction of arrow 1512 causes the plate 1516 to rotate in the direction of an arrow 1524. A spring 1526 is secured to a channel 1528 of the frame 610 and the rod 1514 to bias the rod to the home position shown in FIG. 101. A cable assembly 1530 includes a sheath 1532 and a wire 1534 that is movable within the sheath 1532. The sheath is grounded to a flange 1536 secured to the channel 1528. The wire 1534 is secured to the plate 1516 so that rotation of the plate 1524 on the axle 1520 moves the wire 1534 relative to the sheath 1532, transferring motion to the quick release mechanism of the actuator 650.

The handle 1504 operates in a similar fashion with the grip 1538 pin secured to an actuator 1540 which is pivotable on a pin 1542. Pivoting of the handle 1504 about the pin 1542 acts on a wire 1544 which is secured to the actuator 1540. When the wire 1544 reaches the terminal end 1546 of a slot 1548, the wire 1544 causes the plate 1516 to rotate in the direction of arrow 1524 on axle 1520. A spring 1550 urges the handle 1504 to the home position shown in FIG. 101. Each of the rods 1514 and 1544 is free to move in the slots 1518 and 1548 if the plate is acted upon by the other of the rods 1514 and 1544. The lost motion effect of the rods 1514, 1544 in slots 1518, 1548 prevent interference with the operation of the CPR release mechanism 1500 by the other of the handles 1502, 1504, but allow a single cable 1530 to be directed to the release mechanism of the actuator 650.

The release mechanism 1500 further includes a limit switch 1552 which is secured to the channel 1528. The limit switch 1552 includes an actuation arm 1554 having a rounded end 1556 which engages an outer edge 1558 of the plate 1516. The plate 1516 axes a cam relative to the limit switch 1552 so that when the plate 1524 is rotated, the end 1556 of the actuation arm 1554 engages a surface 1560 which causes the limit switch 1552 to be activated to indicate that the release mechanism 1500 has been activated. The switch 1552 provides a signal to the control system 400 of the hospital bed 10 indicating that the CPR has been activated.

Figure 13:
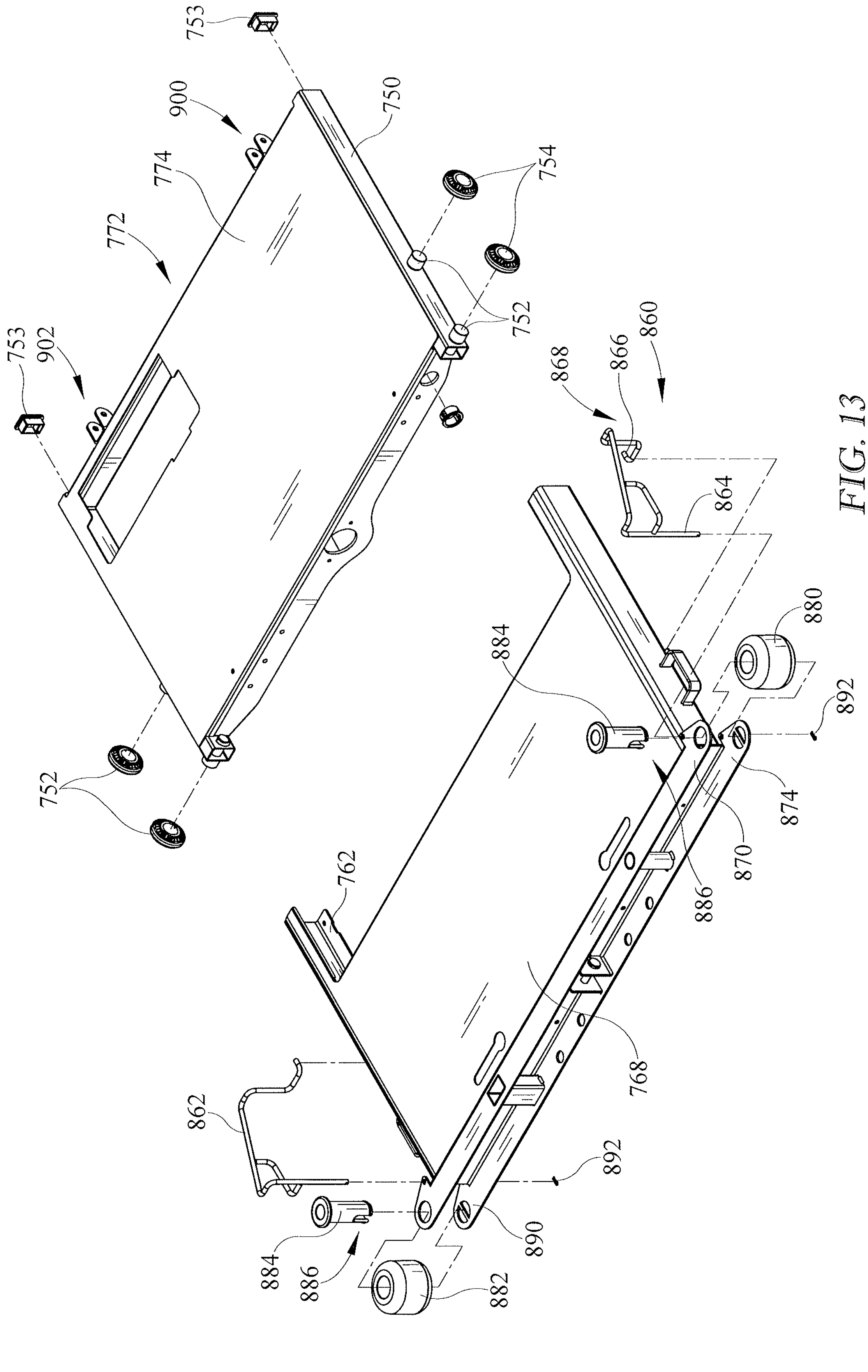
FIG. 13 is an exploded assembly view of a top portion of a foot deck section of a patient support apparatus.
Figure 14:
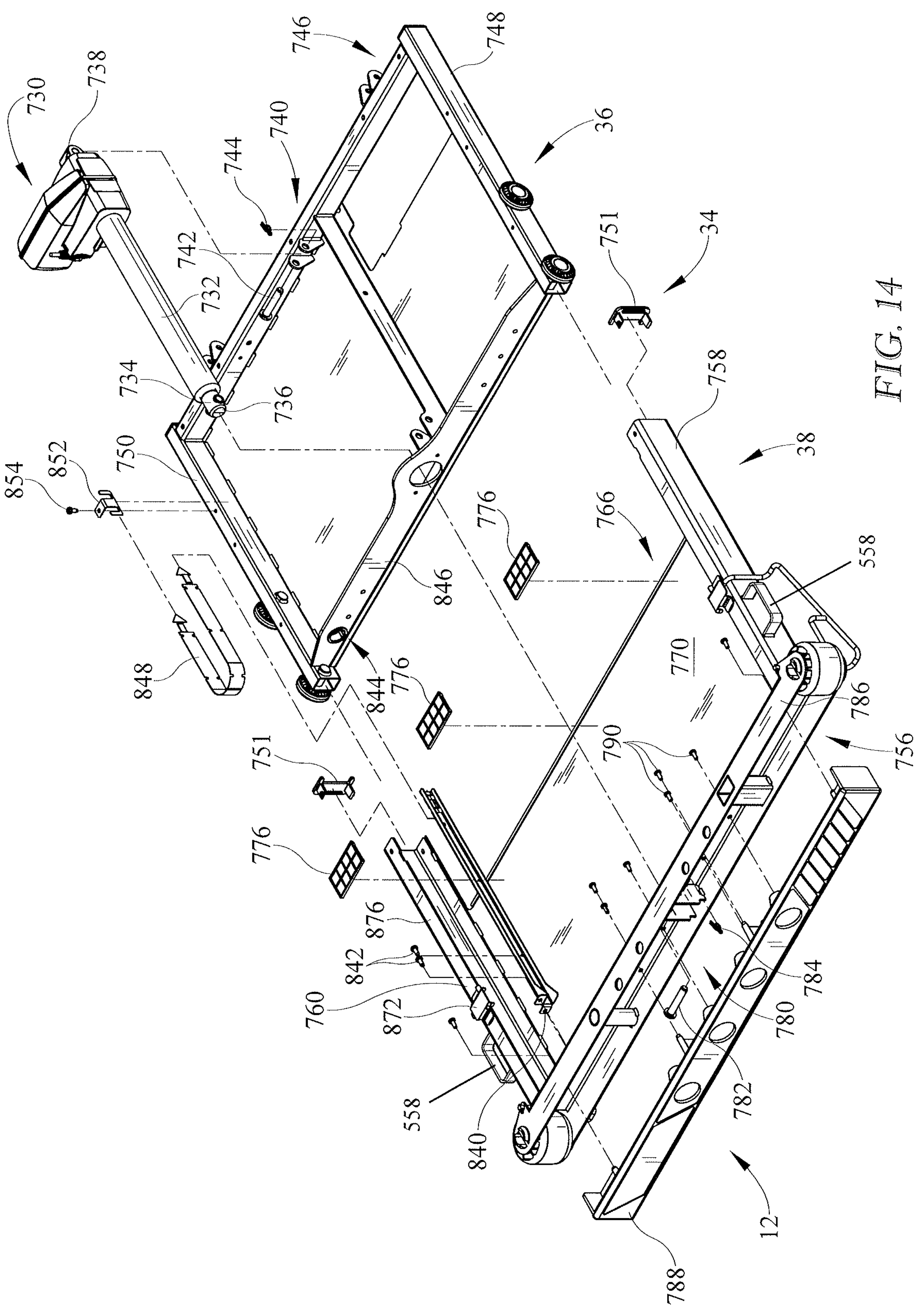
FIG. 14 is an exploded assembly view of a bottom portion of a foot deck section of a patient support apparatus, the foot deck section having an actuator two power extension retraction of the foot deck section.

As shown in FIGS. 13-14, the foot deck 34 shown to include the first portion 36 and the second portion 38 which moves relative to the first portion to extend and retract the length of the foot deck 34. Extension and retraction of the foot deck 34 is controlled by an actuator 730 which is fixed to the first portion 36. The actuator 730 includes a body 732, a rod 734, and a rod end 736. The rod end 736 is pinned to the second portion 38. The actuator 730 includes an end 738 which is pendant to a yoke 740 on the first portion 36 and secured by a pin 742 and retaining clip 744. When the actuator 730 is in a retracted position, such as that shown in FIG. 13, the foot deck 34 is fully retracted with its length minimized. Extension of the actuator 730 drives the second portion toward the foot end 12 of the foot deck 34 to extend the length of the foot deck 34 and, thereby, the length of the hospital bed 10. One suitable actuator for this application is a Model TA9 actuator available from TiMOTION Technology of Taiwan City, Taiwan.

The first portion 36 includes a frame 746 with laterally space rails 748 and 750. Each of the rails 748 and 750 have two axles 752 positioned on the outboard sides of the rails 748 and 750 which are capped with a pair of caps 753, 753. The second portion 38 includes a pair of guides 751 positioned in the end of channels 758 and 760 that engage the rails 748, 750 of first portion 36 to guide second portion 38 as it moves relative to first portion 36. The first portion includes a pair of rollers 754 on each side, each of the rollers 754 supported on an axle 752. The second portion 38 includes a frame 756 which has a pair of laterally spaced channel members 758 and 760. When the second portion 38 is engaged with the first portion 36, the rollers 754 are retained on the axles 752 by the engagement of the rollers 754 with the respective channels 762 and 764 of the channel members 758 and 760.

The second portion 38 is supported on the first portion 36 by the interaction of the rollers 754 with the channels 762 and 764 and the interaction of the rails 748, 750 of first portion 36 with the guides 751, 751. The second portion 38 includes a deck panel 766 which spans the distance between the channel members 758 and 762 define an upper support surface 768. The first portion 36 also includes a deck panel 772 which has an upper support surface 774. When the second portion 38 is engaged with the first portion 36, a portion of the deck panel 766 overlies a portion of the deck panel 772. Further support for the engagement between the first portion 36 and the second portion 38 is provided by three glide members 776 which are secured to a lower surface 778 of the deck panel 766. The glide members 776 are secured to the surface 778 by an adhesive and are positioned to engage the upper surface 774 of the deck panel 772 of the first portion 36. The glide members act as bearings between the deck panel 766 and deck panel 772 during extension and retraction of the foot deck 34.

The rod end 736 of the actuator 730 is connected to a yoke 780 formed on the second portion 38 by a pin 782 and a retaining clip 784. The yoke 780 is formed in a channel member 786 positioned at the foot end 12 of the second portion 38. The channel member 786 is open toward the foot end 12 to define a space in which electrical indicator components may be positioned. The electrical components are enclosed by a cover 788 which is secured to the base frame 20 by six fasteners 790. The electrical components are best seen FIG. 18 and include a pair of circuit boards 792 and 794 which are configured to generate indicators of the status of certain conditions of the hospital bed 10 as will be discussed in further detail below.

The circuit boards 792 and 794 are a part of an indicator system 796 that provides detailed information to a caregiver regarding the status of the hospital bed 10 and a patient supported on the hospital bed 10. The circuit boards 792 and 794 receive information over a cable 798 that is connected to the control system 400 of the hospital bed 10. Circuit board 792 is connected to the circuit board 794 by another cable 800. The circuit boards 792 and 794 include logic which processes the information provided over the cable 798 to cause the indicator system 796 to provide an indication of the status of components of the hospital bed 10. In the illustrative embodiment, the indicator system provides information regarding the status of a hospital bed 10 exit system of the hospital bed 10, an indication as to whether or not the hospital bed 10 is in its lowest position, and an indication as to whether not all of the side rails 48, 50, 58, and 60 are in their raised position.

Figure 19:
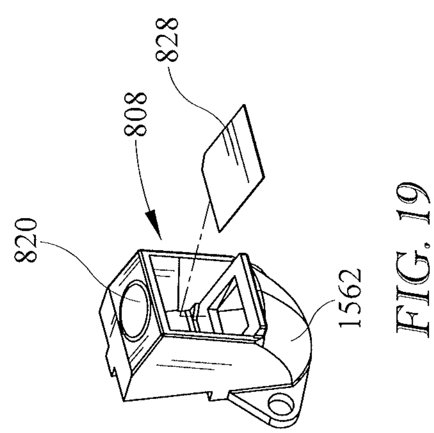
FIG. 19 is a perspective view of a projection structure of the notification system of FIG. 18, the projection structure including a slide that includes an iconic image that is projected by the projection structure to a surface spaced apart from the patient support apparatus.

Indication of the statuses may be projected onto the floor below the foot deck 34 by one of four projectors 802, 804, 806, or 808. For example, the projector 808 is associated with the indication as to whether or not all of the side rails 48, 50, 58, and 60 are in their raised position. When active, the projector 808 projects an image such as the image 1560 shown on the floor in FIG. 97. The image 1560 may be projected in either a green or amber color. To project the image 1560, the projector 808 is mounted over a pair of LEDs mounted on the circuit board 792, with one of the LEDs illuminating in an amber color and the other of the LEDs illuminating a green color. When one or the other of the two LEDs is illuminated, the light is conducted through the projector 808 and through the slide 828 positioned in the projector 808. The projector 808 is shown in further detail in FIG. 19 where the slide 828 is positioned in the projector 808, light is transmitted through a body 1562 of the projector 808 and a lens 820 which controls the focus of the image 1560 on the floor. If the control system 400 of the hospital bed 10 provides a signal to the logic of the indication system 796 that one or more of the siderails 48, 50, 58, and 60 are not in the raised position, the amber LED associated with projector 808 would be illuminated so that the image 1560 would be illuminated in an amber color.

Figure 18:
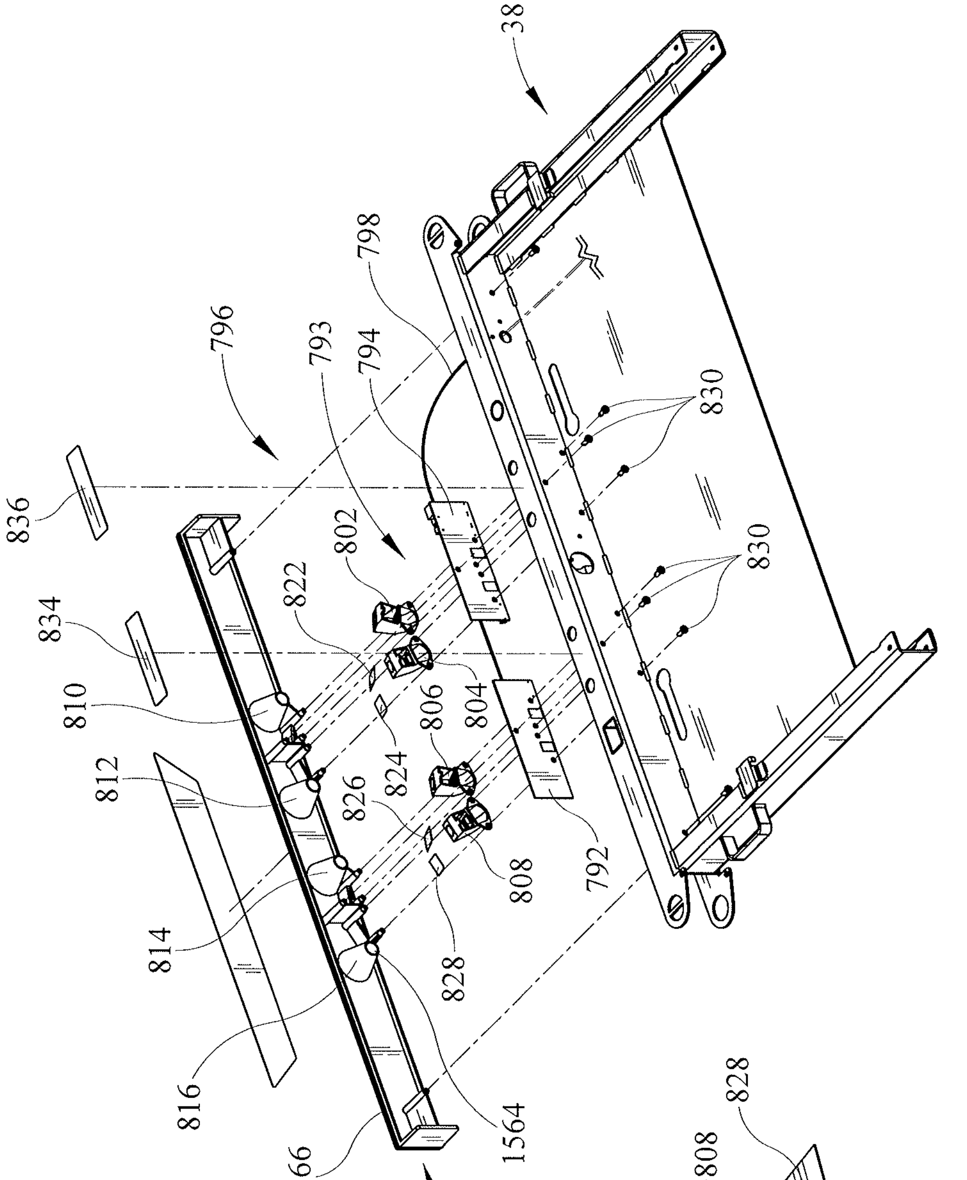
FIG. 18 is exploded assembly view of a portion of a notification system supported on the end of the foot deck section of a patient support apparatus, the notification system operable to provide a visual indication of the status of components of the patient support apparatus.
Figure 99:
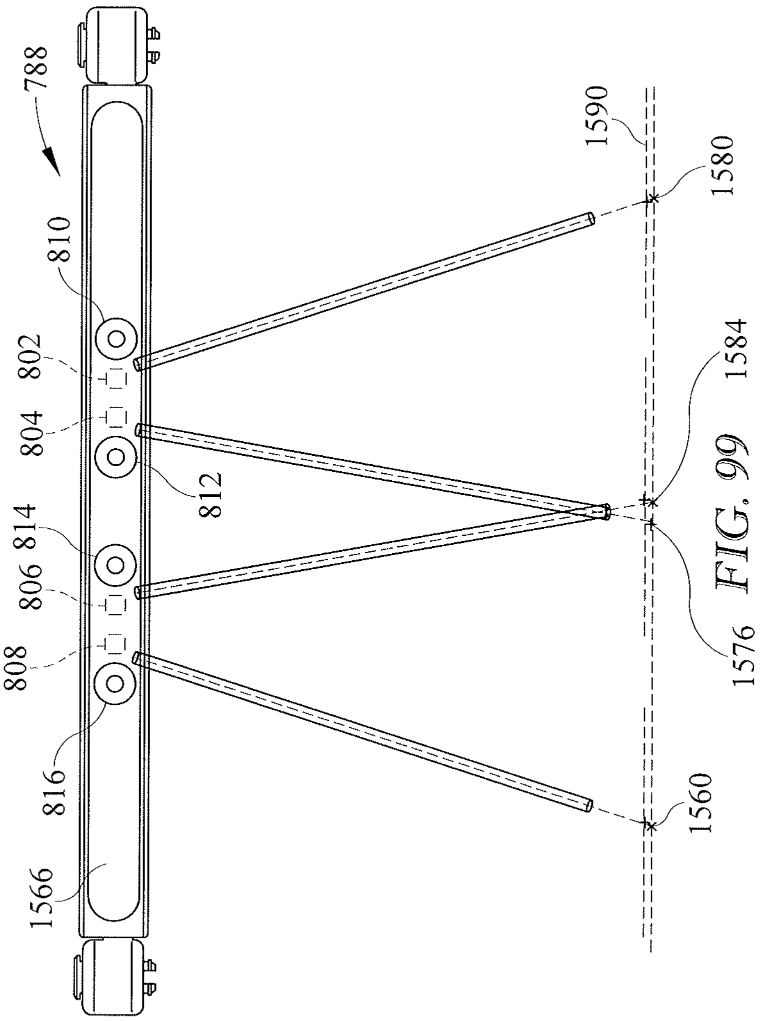
FIG. 99 is a diagrammatic representation of the illumination system used in the indication system of FIG. 97.

The indication system 796 also includes a lamp 816 which has a frusto-conical shape with an end 1564 that is configured to overlie another pair of LEDs on the circuit board 792. The lamp 816 is configured to direct light from the associate LEDs to an outer surface 1566 of the cover 788. The lamp 816 shown in FIG. 18 is associated with an indicator 1568 shown in FIG. 97. The indicator 1568 is part of an overlay 1570 positioned on the cover 788. The overlay 1570 is configured to position certain indicia over the openings of the various lamps, such as the opening 1572 for lamp 816 as shown in FIG. 99. Thus, when the lamp 816 is illuminated by the LEDs, the light from the LEDs is transmitted through the indicator 1568. The logic that determines whether or not one or more of the siderails 48, 50, 58, 60 are in their raised position also controls the operation of the LEDs associated with the indicator 1568 and lamp 816. The control system 400 of the hospital bed 10 is operable to operate the indication system 796 to illuminate the indicator 1568 and the image 1560 each provide the status of the siderails 48, 50, 58, 60 simultaneously. The control system 400 may also be configured to illuminate the indicator 1568 only without projecting the image 1560, or project only the image 1560 without illuminating the indicator 1568.

Figure 97:
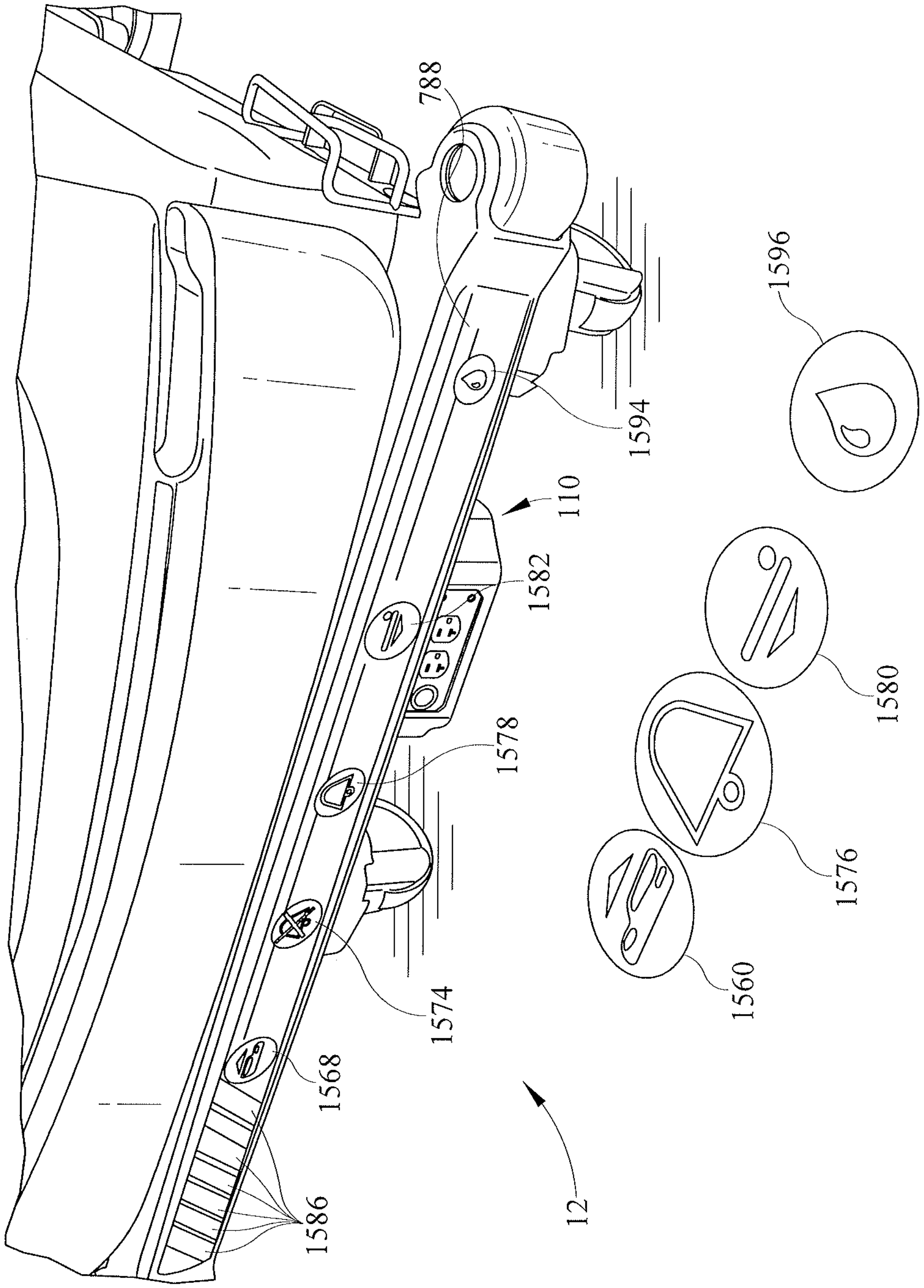
FIG. 97 is a perspective view of a portion of a patient support apparatus including an indicator system for illuminating images on a surface spaced apart from the patient support apparatus.

The projector 806 utilizes a slide 826 to illuminate an image 1584 on the floor that is similar to the icon shown as an indicator 1574 shown in FIG. 97. The indicator 1574 and an accompanying image 1584, which is not shown in detail, provide an indication that a patient position monitoring system of the hospital bed 10 is not armed. The indicator 1574 is illuminated by a lamp 814. Projector 806 and lamp 814 engage the circuit board 792 in a manner similar to that of projector 808 and lamp 816. When the image 1584 or indicator 1574 are illuminated green, it provides an indication that the patient position monitoring system is not armed and that patient position monitoring is not indicated for the patient associated with the hospital bed 10. This may rely on information entered into the hospital bed 10 controller by a caregiver, or may be gathered by the control system 400 from an electronic medical record system of the hospital. If the indicator 1574, or the associated image 1584, is illuminated amber, a caregiver will know that the patient position monitoring system is not armed but that the patient has indications that a support protocol that requires the use of the patient position monitoring system.

A projector 804 engages LEDs on the circuit board 794 and projects an image 1576 by way of a slide 824. The image 1576 is projected when the patient position monitoring system is armed. Similarly an indicator 1578 is illuminated by a lamp 812. When the image 1576 and/or the indicator 1578 are green, it provides an indication that the patient position monitoring system is armed and that no alarm condition has been detected. On the other hand, if the image 1576 and/or the indicator 1578 are presented in an amber color, it provides an indication that the patient position monitoring system is armed and an alarm condition exists.

A projector 802 projects light through a slide 822 to present an image 1580 that conveys the status of the hospital bed 10 position. Referring to FIG. 97, when the hospital bed 10 is in its lowest position, the image 1580 is projected in green while an amber color indicates that the hospital bed 10 is not in its lowest position. Similarly, a lamp 810 (seen in FIG. 18) conducts light to an indicator 1582 the same logic as applied to the image 1580 regarding the appropriate color.

Figure 98:
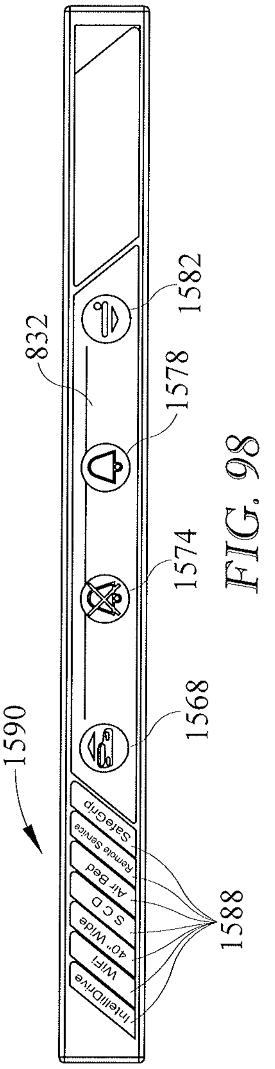
FIG. 98 is a plan view of an indicator system positioned on the foot end of a foot deck section of a patient support apparatus.

A standard overlay 832 is positionable on the surface 1566 as shown in FIG. 98. The cover 788 includes a number of channels 1586 positioned on the right side 18 of the foot deck 34. The channels are sized to receive one or more labels 1590 that include various indicia 1588 that provide information to a user as to the configuration of the hospital bed 10. The labels 1590 provide a quick reference for caregiver to identify the options present on the particular hospital bed 10.

Figure 100:
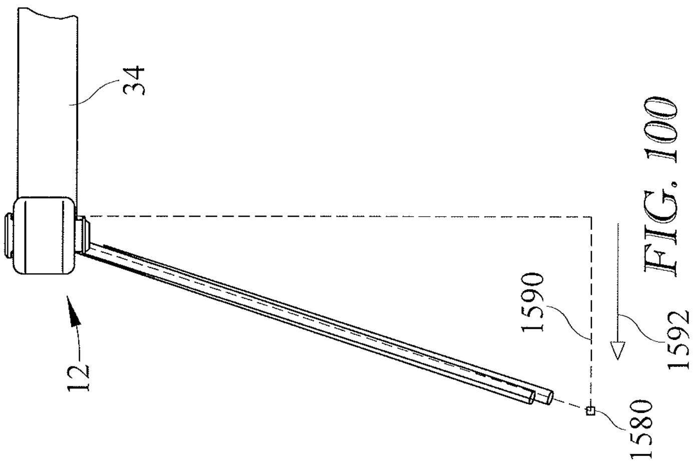
FIG. 100 is a diagrammatic representation taken from the side of a foot deck section of a patient support apparatus showing the projection of indicators by the system of FIG. 97

Referring now to FIG. 99, it is shown how the arrangement of the lamps 802, 804, 806, 808 are capable of projecting the various images 1580, 1584, 1576, 1560 onto a surface 1590 of the floor. Because the images 1576 and 1584 are mutually exclusive, the lamps 806 and 804 are arranged projector images at the same point. FIG. 100 shows how the images 1580, 1584, 1576, 1560 are projected at a position that is not directly vertically below the foot end 12 of the head deck 34, but are spaced horizontally a distance 1592. The deviation of the images 1580, 1584, 1576, 1560 outwardly from a position directly below the foot deck 34 assures that the images will be visible when the hospital bed 10 is in its lowest position and a caregiver's view of the images 1580, 1584, 1576, 1560 is not obstructed.

As shown in FIG. 97, the overlay 1570 is similar to the overlay 832 of FIG. 98, however the overlay 1570 includes an additional indicator 1594 and the notification system of the embodiment of FIG. 97 is capable of projecting an image 1596. In the embodiment of FIG. 97, the indicator 1594 and image 1596 provide notification to a caregiver of the status of an incontinence detection system. Following the approach used above, when the indicator 1594 or image 1596 is presented in a green color, it is indicative that an incontinence system is active and no alarm conditions exist. However if the indicator 1594 and/or image 1596 are presented in an amber color, it provides an indication to a caregiver that the incontinence detection system is active and an alarm condition exists.

It is contemplated that each of the monitored conditions would be independently configurable by a caregiver. For example, one or more of the indicators 1568, 1574, 1578, 1582, or 1594 may be deactivated so that the particular condition is not indicated and the indicator remains dormant and not illuminated. As explained above, the projector's 802, 804, 806, 808 may be deactivated such that the caregiver only relies upon the indicators 1568, 1574, 1578, 1582, or 1594 for an indication of the status by the notification system 796.

Figure 26:
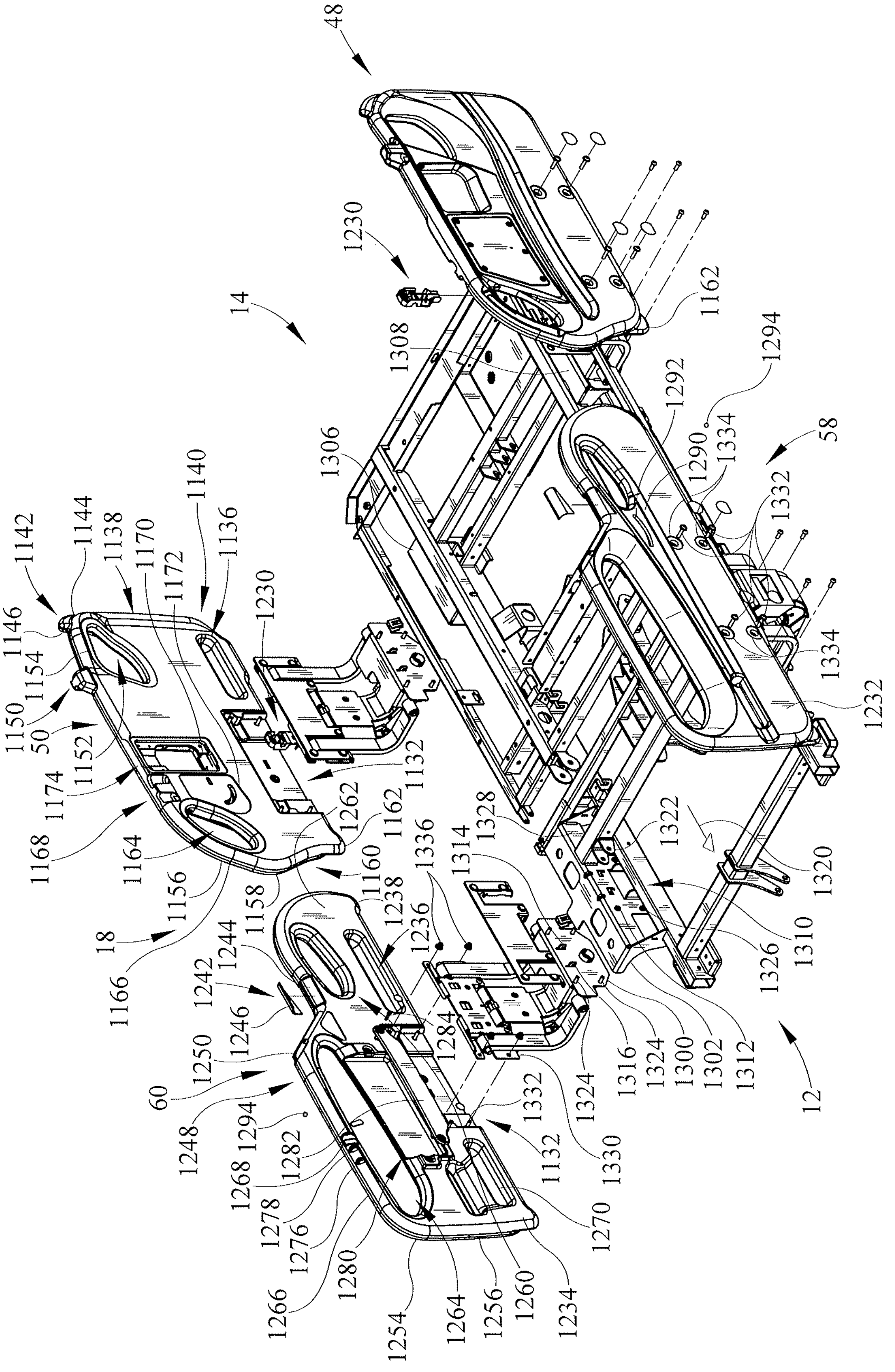
FIG. 26 is an exploded view of a portion of the patient support apparatus of FIG. 1 showing the assembly of intermediate side rails of the patient support apparatus as assembled to a linkage that is secured to a load frame of the patient support apparatus.
Figure 29:
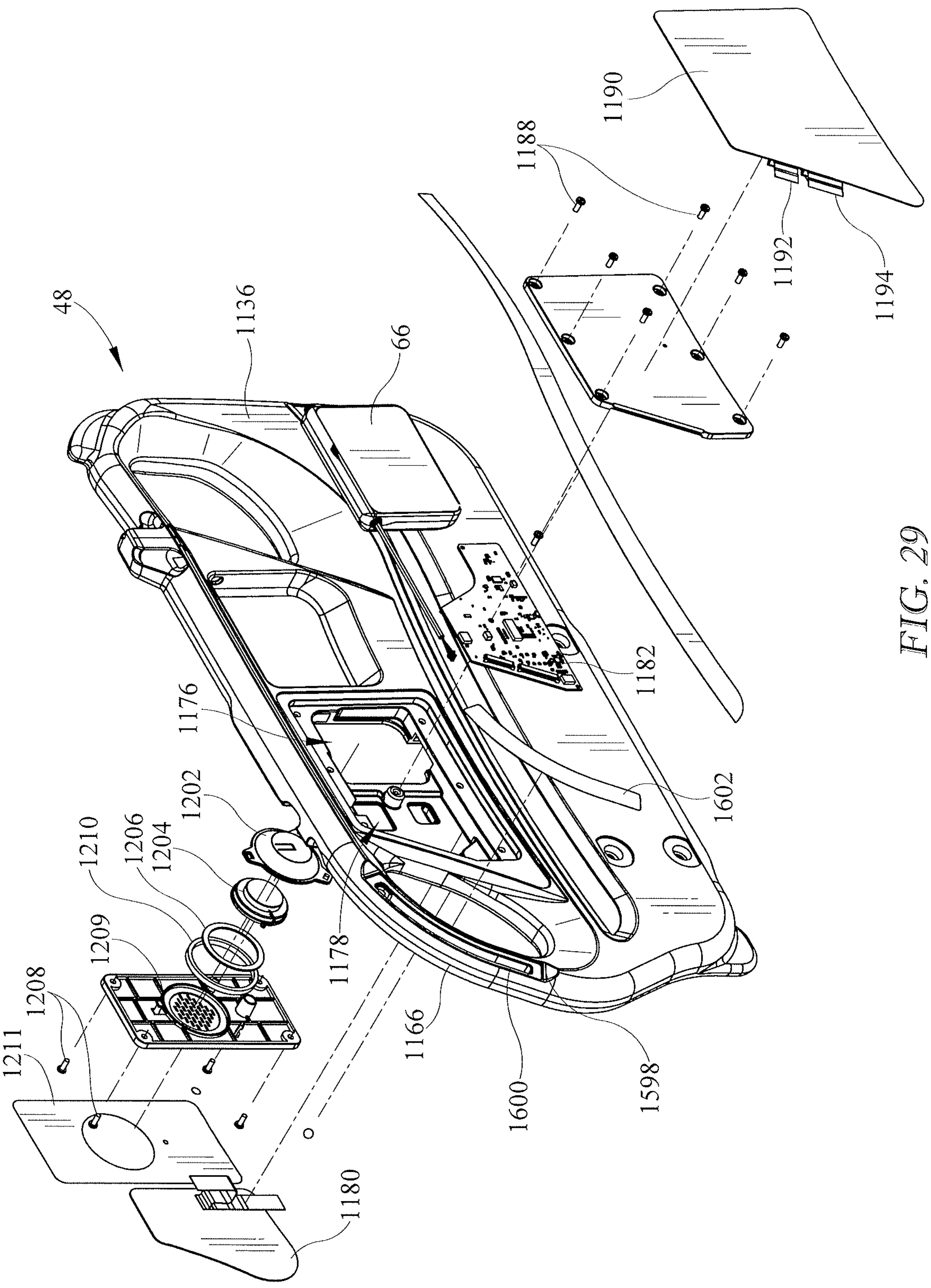
FIG. 29 is exploded assembly view of an embodiment of a left head side rail suitable for use with the patient support apparatus of FIG. 1.

The head end side rails 48 and 50 are configurable to provide additional indications of the status of components of the hospital bed 10 under the control of the notification system 796 by illuminating the grip 1166 of the head siderails 48, 50. In the embodiment of FIG. 29, the body 1136 of side rail 48 has a depression 1598 formed on the outboard side of the grip 1166 and a channel 1600 formed in the interior of the grip 1166. In the embodiment of FIG. 29, an insert 1602 is positioned in the depression 1598 to fill in the missing contour of the grip 1166 as shown in FIG. 26. In another embodiment shown in FIG. 137, a light strip 1604 is positioned in the channel 1600 and a translucent overlay 1606 is positioned over the light strip 1604. The cavity 1600 is in communication with an outlet 1606 through which an end 1608 is fed to connect to the circuit board 1182 of the side rail 48.

Figures 138A, 138B, 138C, 138D, 138E:
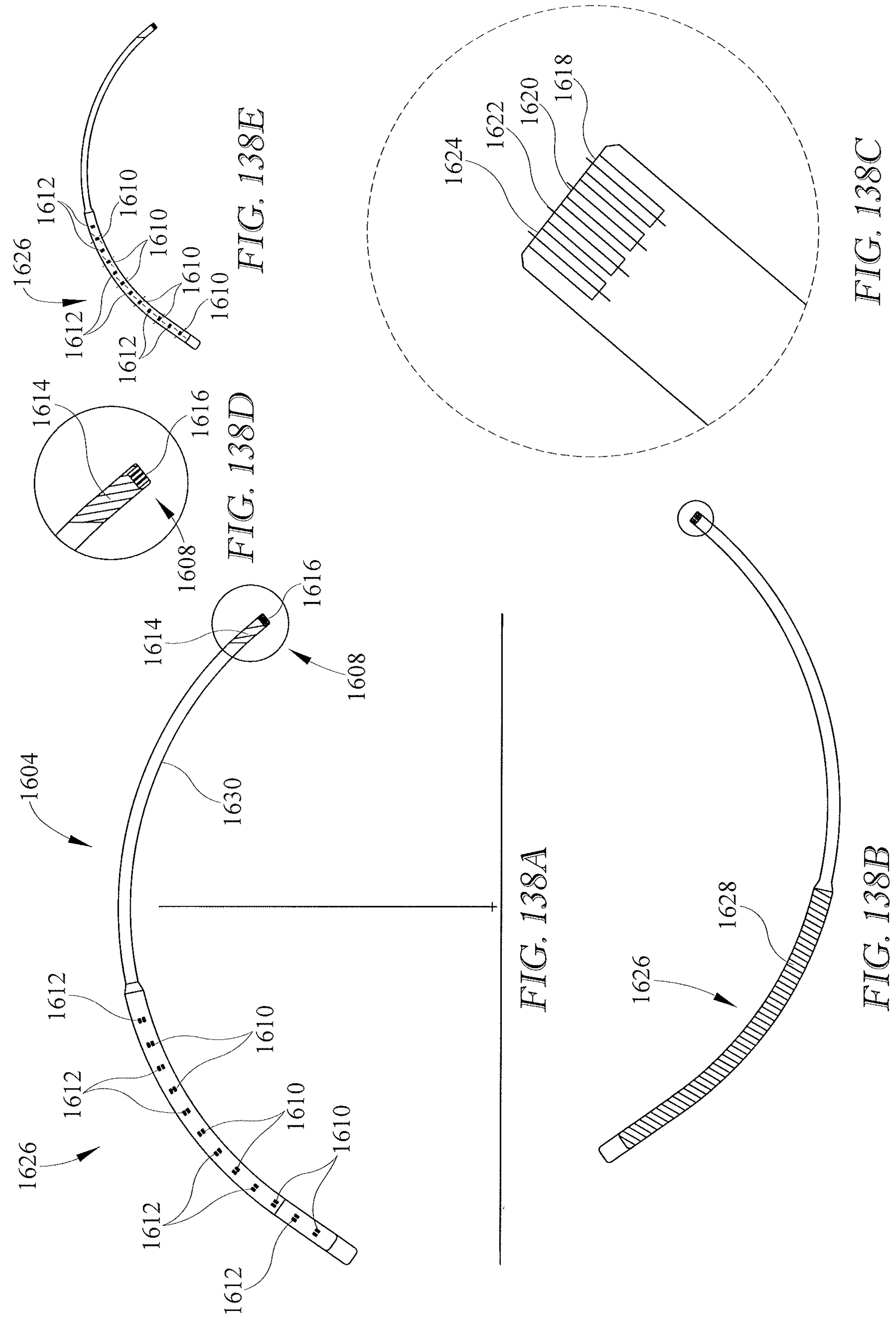

Referring to FIGS. 138A-138E, the light strip comprises an electrical substrate encapsulated in a transparent material. The light strip 1604 includes six blue LEDs 1610 positioned on the substrate which alternate with six amber LEDs 1612. The end 1608 includes a stiffener 1614 which is provided for support for a connector 1616. The connector has alternate leads 1618, 1620, 1622, and 1624 with the leads 1620, 1624 providing a common to the respective LEDs 1610, 1612. The lead 1618 provides a current to the LEDs 1610 from the circuit board 1182 when the LEDs 1610 are to be illuminated. Similarly, the lead 1620 provides current to the LEDs 1612 when the LEDs 1612 are to be illuminated. A body 1626 of the light strip 1604 has a larger thickness and is relatively stiff. An adhesive backing 1628 is used to secure the light strip in the channel 1600. A tail 1630 is secured to the body 1626 but has sufficient flexibility to be routed through the side rail body 1136. As indicated in FIG. 138E, a signal from the circuit board 1182 simultaneously illuminates all of the LEDs 1610.

In operation the light strip 1604 has three states, none of the LEDs 1610, 1612 being illuminated, the blue LEDs 1610 being illuminated, or the amber LEDs 1612 being illuminated. In the current embodiment, none of the LEDs 1610, 1612 are illuminated in one of two conditions: if the patient position monitoring system is disarmed and the patient is in hospital bed 10, or if the patient position monitoring system is armed and the patient is in the proper position. The blue LEDs 1610 are illuminated if the patient position monitoring system is disarmed the patient is out of the hospital bed 10. The blue LEDs 1610 tend to provide additional lighting for the patient if the ambient light is relatively low. The amber LEDs 1612 are illuminated if the patient position monitoring system is armed and the patient is not in the proper position.

This amber illumination provides an additional indication to a caregiver of the alarm condition of the patient position monitoring system.

The notification system 796 is configurable to allow or prevent the illumination capabilities of the grip 1166. A caregiver may choose to disable the illuminated grips as a part of the notification system 796 when the caregiver determines that the operation of the illuminated grip 1166 is unnecessary or would be problematic with a particular patient. Thus, the caregiver can configure the notification 769 to monitor one or more conditions and provide an indication to a caregiver by illuminating an indicator on the foot deck 34, projecting an image on the floor, and/or illuminating the grip 1166. In some embodiments, the illumination of the grip 1166 and the amber color may be configured to be based on a different condition, such as the expiration of a time between vital signs checks, or any other condition of which the caregiver might need to be reminded. In addition, the illuminated grip may be illuminated in the amber color if any of the alarm conditions of the hospital bed 10 are active, the amber color providing an indication to the caregiver then alarm condition, or a condition that does not meet a patient's care protocol exists.

Referring again now to FIG. 13, management of the cable 798 is accomplished with a rigid wire routing bracket 840 which is secured to the channel member 786 with a pair of fasteners 842 and extends from the channel member 786 through in opening 844 formed in a plate 846 of the frame 746 of the first portion 36. The cable 798 is secured to the rigid guide 840 by wire ties (not shown). As shown in FIG. 14, a flexible guide 848 is secured to an end 850 of the rigid guide 840 and secured to the first portion 36 by a bracket 852 which is secured to the first portion 36 with a fastener 854. The flexible guide 848 is constructed of a material that is flexible but has a sufficient cross-section to control the collapsing of the flexible guide 848 into a shape as shown in FIG. 14. The cable 798 is also secured with wire ties to the flexible guide 848 such that when the second portion 38 is retracted relative to the first portion 36, the flexible guide 848 controls gathering of the cable 798 within the footprint of the first portion 36. The combination of the rigid guide 840 and flexible guide 848 allows for controlled gathering of the cable 798 throughout the range of motion of the second portion 38 relative to the first portion 36 while preventing the cable 798 from drooping below the confines of the first portion 36.

Figure 10:
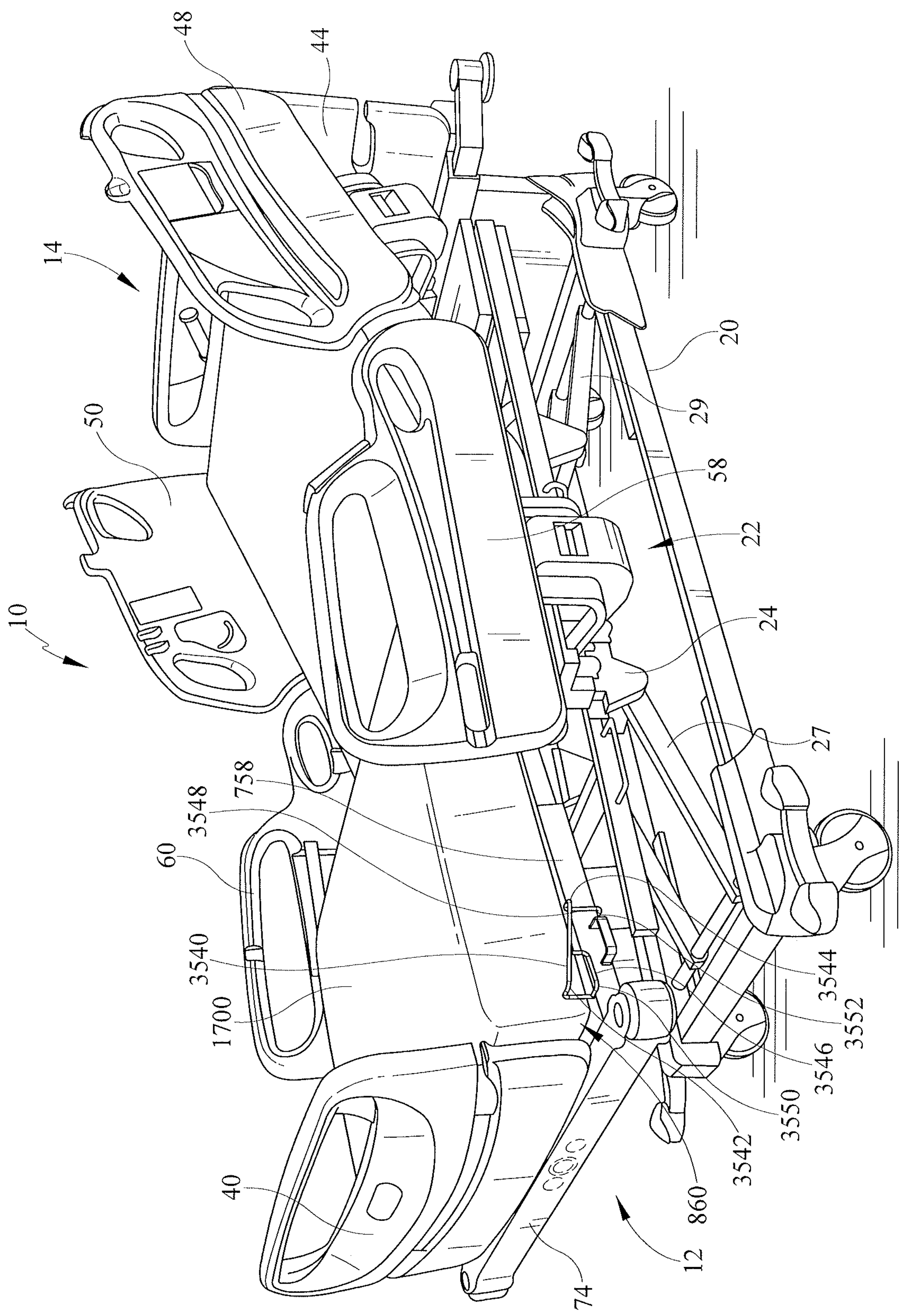
FIG. 10 is a perspective view of the patient support apparatus of FIG. 3 with a head section and a thigh section of a deck of the patient support apparatus being raised.

Referring again now to FIG. 14, the second portion 38 is formed to include a pair of drainage bag hooks 558, 558 on opposite sides of the second portion 38. The drainage bag hooks 558 have a similar used to those on the load frame 26. In addition, the foot deck 34 includes a pair of wire form bag supports 860 and 862 with the bag supports 860 and 862 being symmetrical mirror images of each other. With reference to the bag support 860 it can be seen that the bag support 860 includes a first leg 864 which is linear and a second leg 866 which terminates in a hook 868. The leg 864 is positioned at a hole 870 formed in the channel member 786 and the hook is received in a bracket 872 seen in FIG. 13. The bag support 860 is positioned on the second portion 38 by inserting the leg 864 into the hole 870 and into a second hole 874 positioned on a lower flanges of the channel member 786. Once secured, the second leg 866 is deflected to permit the hook 868 to be positioned between the bracket 872 and a surface 876 of the channel member 760. Once the deflection of the leg 866 is released, the hook 868 engages the bracket 872 to secure the bag support 860 in place on the foot deck 34. When the bag supports 860, 862 are mounted to the second portion 38 of the foot deck 34 and move with the foot deck 34 as it is moved to various orientations relative to horizontal. Referring to FIG. 10, bag support 860 includes an upper rail 3540 that is not parallel to the rail 758 of the second portion 38. A first end 3542 is spaced apart from the rail 758 than a second end 3544. The ends 3542 and 3544 form loops with respective legs 864 and 996 of the bag support 860. A second, smaller rail 998 is positioned below the upper rail 990.

The bag support 862 is positioned on the opposite side of the second portion 38 in a similar manner. The second portion 38 also supports a pair of bumpers 880 and 882 that are positioned at the corners of the foot deck 34 being received between flanges of the channel member 786. The bumpers 880 and 882 rotate on axles 884, 884 which are positioned on the channel member 786 with a slot 886 formed in each axle 884 engaging and anti-rotation feature 888 or 890 formed in the lower flange of the channel member 786. The axles 884, 884 are secured in place by retaining clips 892 to prevent rotation of the axles 884, 884 relative to the channel member 786. However, the bumpers 880, 882 are free to rotate about the axles 884 if they should come in contact with an outer surface, such as a wall, as the hospital bed 10 is moved.

The foot deck 34 is coupled to the articulated seat deck 30 such that movement of the articulated seat deck 30 about the axis 582 induces movement of the foot deck 34. The foot deck 34 includes two yokes 900, 902 which engage the rails 564 and 566 of the articulated seat deck 30 and are secured thereto by two pins 904, 906 (shown in FIG. 20). Pins 904, 906 pass through the respective thru-holes 908, 910 of two bearings 572, 572 and are secured by retaining clips 578, 578. A pair of washers 580 is used at each connection between the respective flanges of the yokes 900, 902 and the pins 904, 906 and retaining clips 578, 578. The pins 904, 906 cooperate to define a pivot axis 912 about which the foot deck 34 pivots.

Figure 17:
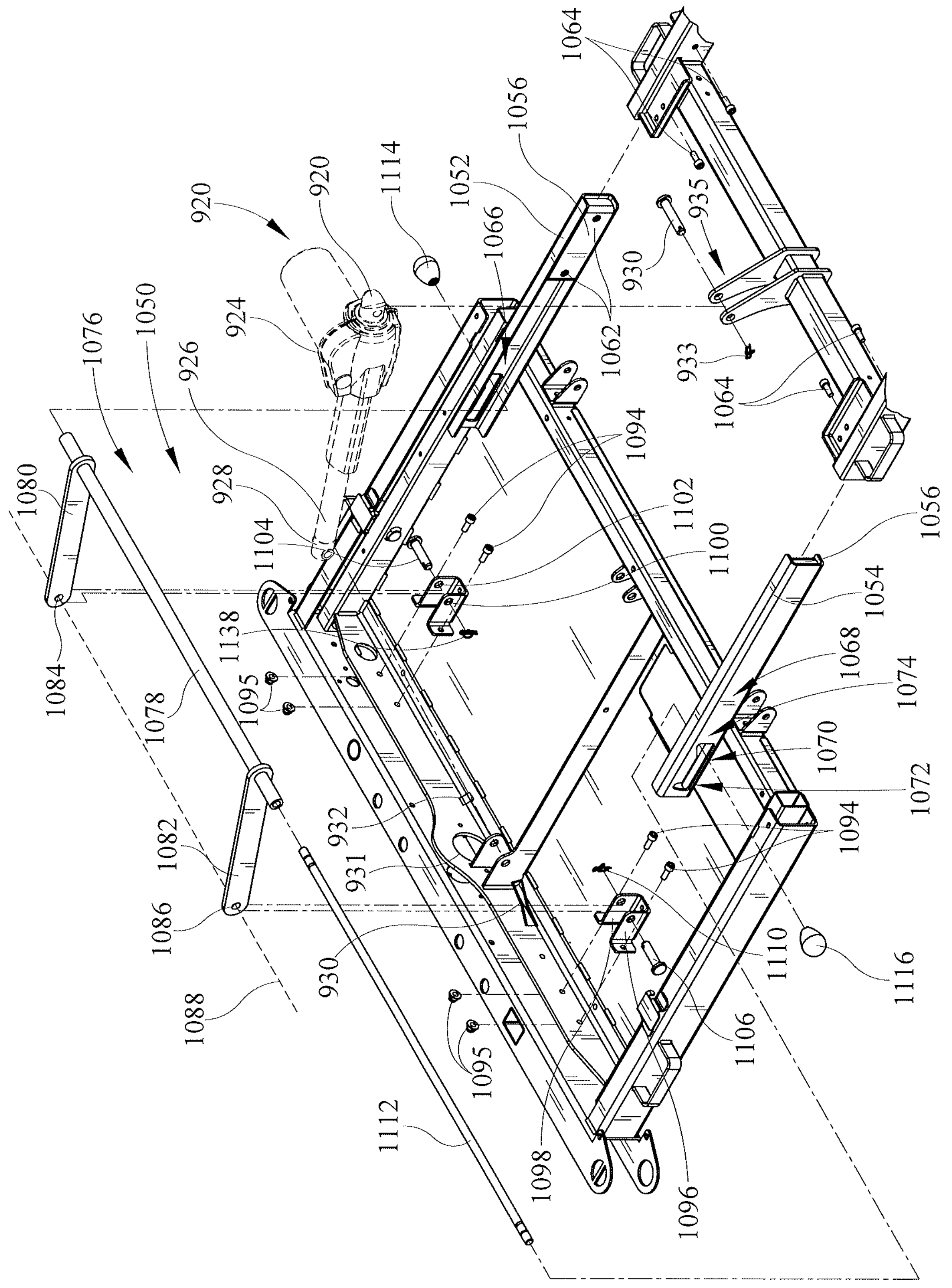
FIG. 17 is an exploded assembly view of the bottom of a foot deck section having a manually actuated gatching mechanism.

In some embodiments, the foot deck 34 is also connected to the load frame 26 through an actuator 920 shown in phantom FIG. 17. The actuator 920 is optional and is shown in phantom in FIG. 17. The actuator 920 may be replaced by a manual gatch mechanism 1050. When present, the actuator 920 includes an end 922, a body 924, a rod 926, and a rod end 928. The rod end 928 is secured to a yoke 931 formed on the first portion 36 of the foot deck 34 with a pin 930 and retaining clip 933. The end 922 of the actuator 920 is secured to a yoke 935 secured to the crossmember 544 of the frame 554 of the load frame 26 by a pin 936 and retaining clip 933. When the actuator 920 maintains a fixed length, the actuator 920 acts as a ground link which causes the pivoting of the actuator 920 about the pin 936 and the pivoting of the foot deck 34 about the pin 930. Thus, movement of the articulated seat deck 30 by extension and retraction of the actuator 584 causes movement of the foot deck 34 as constrained by the actuator 920. Additional movement of the foot deck 34 is caused by extension and retraction of the actuator 920 to change the relative position of the foot deck 34 relative to the articulated seat deck 30. One suitable actuator for this application is a Model TA23 actuator available from TiMOTION Technology of Taiwan City, Taiwan.

Figure 15:
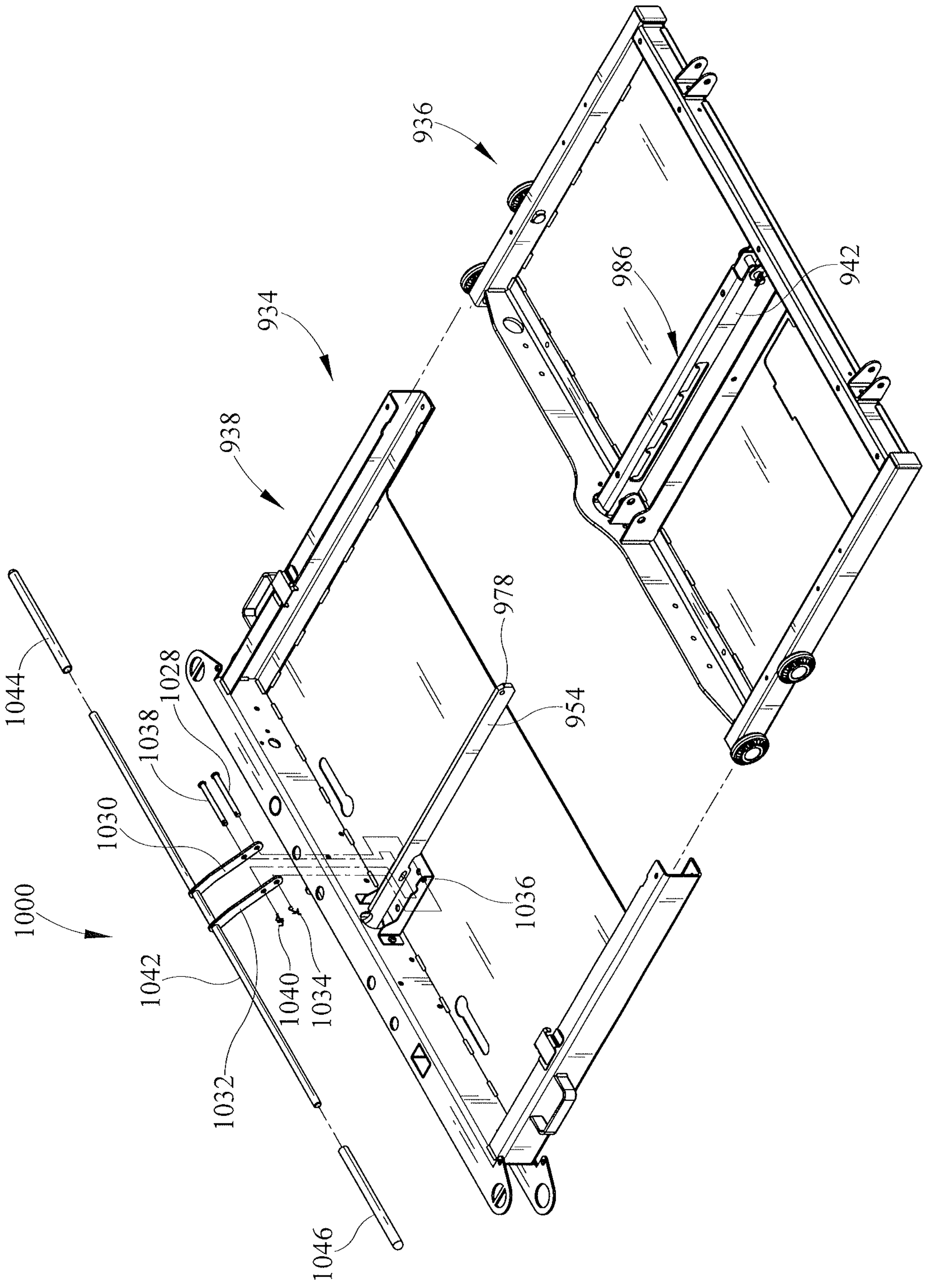
FIG. 15 is an exploded assembly view of the bottom of another embodiment of a foot deck section of a patient support apparatus, the foot deck section being manually releasable to extend and retract the foot deck section.
Figure 16:
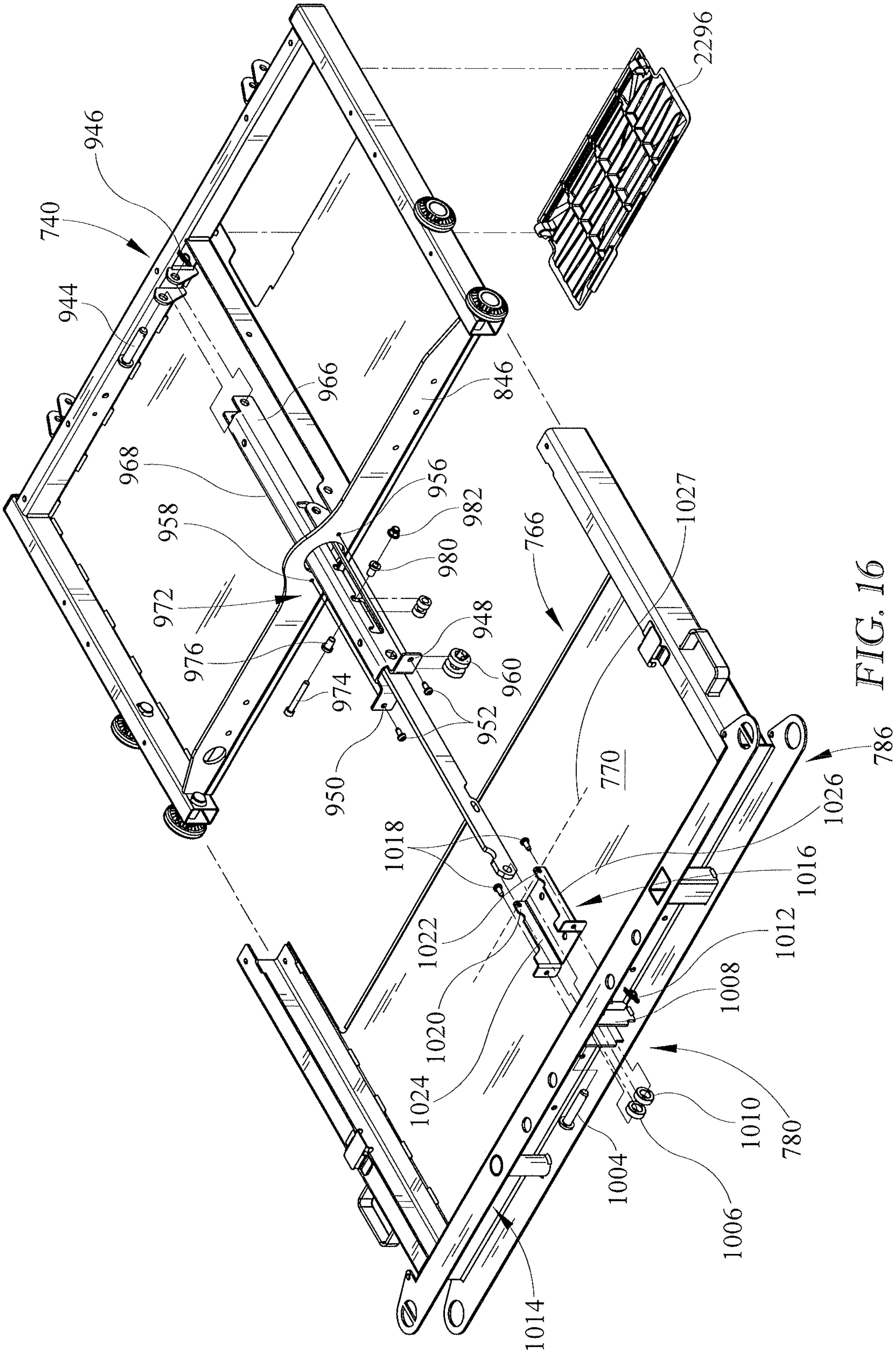
FIG. 16 is an exploded assembly view of the foot deck section of FIG. 15.

In a different embodiment, shown in FIGS. 15-16, the foot deck 34 is replaced by foot deck 934 that utilizes a manual release mechanism 940 to permit a user to move a second portion 938 relative to a first portion 936. The release mechanism 940 includes a channel 942 which is secured to the frame 746 of the first portion 936 by a bolt 944 and nut 946 which secures the channel 942 to the yoke 740. The channel is formed to include two flanges 948 and 950 which engage the plate 846 of the frame 746. A pair of fasteners 952, 952 secure the flanges 948, 950 to the plate 846 by threading into holes 956 and 958 formed in the plate 846. A catch bar 954 is received telescopically in the channel 942 when the second portion 938 is engaged with the first portion 936. The catch bar 954 moves telescopically relative to the channel 942. A pair of glides 960, 960 is positioned in a pair of holes formed in sidewalls 966 and 968 of the channel 942. Referring to FIG. 16, the glides 960, 960 each include prongs which are flexible and permit the glides 960, 960 to be positioned in the holes by a snap fit such that the glides 960, 960 limit lateral movement of the catch bar 954 when the manual release mechanism 940 is assembled as shown in FIG. 16.

The release mechanism 940 further includes a catch assembly 972 which is supported on the catch bar 954. As shown in FIG. 16, the catch assembly 972 includes a bolt 974 which passes through a first boss 976, a hole 978 formed in the catch bar 954, a second boss 980, and secured with a nut 982. The hole 978 is best seen in FIG. 15. The channel member 942 is formed to include a guide slot 984 in the sidewall 968 and a guide slot 986 in the sidewall 966. The guide slots 984, 986 are similar structures with each having a guide channel 988 and five stops 900, 992, 994, 996, and 998. The catch assembly 972 is positioned in the guide slots 984 and 986 with the bosses 976 and 980 being arranged to engage the outer surfaces of the sidewalls 966 and 968 such that they overlap the edges of the guide slots 984, 986 to prevent lateral movement of the catch assembly 972 relative to the channel 942. Based on a manual input which will be described in further detail below, the catch assembly 972 may be disengaged from any one of the stops 900, 992, 994, 996, 998 and moved along the guide channel 988 to be positioned in another of the stops 900, 992, 994, 996, 998. Positioning of the catch assembly 972 in one of the stops 900, 992, 994, 996, 998 restricts movement of the second portion 938 relative to the first portion 936 of the foot deck 934. Utilizing the manual release mechanism 940, a user may release the second portion 938 relative to the first portion 936 and adjust the position of the second portion 938 in one of the discrete positions defined by the stops 990, 992, 994, 996, and 998.

Referring again now to FIG. 16, the release mechanism 940 includes a release handle assembly 1000 which is fixed to the second portion 938 and pivotable relative thereto, and engages the catch bar 954 so that movement of the handle assembly 1000 induces movement of the catch bar 954 to disengage the catch assembly 972 from one of the stops 990, 992, 994, 996, 998 so that the second portion 938 may be move relative to the first portion 936. The catch bar 954 is pivotably coupled to the yoke 780 of the frame 756 of the second portion 938. The catch bar 954 is formed to include a hole 1002 through which a pin 1004 passes to secure the catch bar 954 to the yoke 780. Assembly of the catch bar 954 to the yoke 780 further includes a pair of bushings 1006, 1006 which are positioned between the catch bar and the respective flanges 1008 and 1010 of the yoke 780. The pin 1004 is secured in place by a retaining clip 1012. Pivoting of the catch bar about an axis 1014 causes the catch assembly to move in and out of engagement with the stops 990, 992, 994, 996, and 998.

The handle assembly 1000 permits a user to cause pivoting of the catch bar 954 about the axis 1014. A mounting bracket 1016 is positioned on the lower surface 770 of the deck panel 766 and secured to the channel member 786 by a pair of fasteners 1018, 1018. The mounting bracket 1016 includes a pair of holes 1020 and 1022 positioned on opposite flanges 1024 and 1026 of the mounting bracket 1016. The mounting holes 1020, 1022 cooperate to define an axis 1027 about which the handle assembly 1000 pivots when actuated by user. Referring to FIG. 15, the handle assembly 1000 is secured to the mounting bracket 1016 by a pin 1028 which passes through to pivot arms 1030, 1032 of the handle assembly 1000 as well as the holes 1020 and 1022 of the mounting bracket 1016. The pin 1028 is secured by a retaining clip 1034. The catch bar 954 is formed to include a slot 1036 which is engaged by another pin 1038 which passes through the arms 1030 and 1032 and is secured by retaining clip 1040. The pin 1038 is free to move in the slot 1036 and pivots about the axis 1027 when the handle assembly 1000 is actuated by user. The handle assembly 1000 includes a handle member 1042 which is secured to an end of the arms 1030, 1032 distally from the pin 1028. The handle assembly 1000 further includes a pair of grips 1044 and 1046 which are positioned on the handle member 1042.

As shown in FIG. 16, to adjust the position of the second portion 938 to the first portion 936 of the foot deck 934, a user actuates the handle assembly 1000 by applying upward pressure to the handle member 1042 which causes the pin 1038 to engage the slot 1036 of the catch bar 954 urging the catch bar 954 upwardly. The catch bar 954 is constrained by the pin 1004 and the action on the handle member 1042 causes the catch bar 954 to pivot about the axis 1014, which results in the disengagement of the catch assembly 972 from one of the stops 990, 992, 994, 996, 998. Once the catch assembly 972 is disengaged, a user applies pressure to the second portion 938 to cause it to move relative to the first portion 936 to extend or retract the foot deck 34. The user then releases the pressure on the handle member 1042, permitting the catch assembly 972 to be lowered such that it may engage one of the stops 990, 992, 994, 996, 998 to secure the position of the second portion 932 relative to the first portion 936.

The embodiment of the foot deck 934 may be moved relative to the articulated seat deck 30 is a manner similar to that with which foot deck 34 is moved relative to the articulated seat deck 30 by the actuator 920. However, in some embodiments, the actuator 920 may be omitted and a foot deck may be pivoted relative to the seat deck manually between first and second positions utilizing a manual gatch mechanism 1050 shown in FIG. 17. The actuator 920 and gatch mechanism 1050 are mutually exclusive and one must be omitted to use the other. When the manual gatch mechanism 1050 is utilized, a pair of gatch supports 1052 and 1054 is added to the load frame 26 and each extends below the foot deck. It should be understood that the manual gatch mechanism 1050 can be used with a foot deck that has power extension retraction like foot deck 34 or a foot deck with manual extension and retraction such as foot deck 934. The gatch supports 1052 and 1054 are inserted into the tubular structure of the longitudinal rails 538 and 540 of the frame 554 of the load frame 26. The gatch supports 1052 and 1054 each include a mount block 1056 welded to a respective channel member 1058 and 1060. The mount blocks include a pair of threaded holes 1062, 1062 into which a pair of fasteners 1064, 1064 are threaded through the longitudinal rails 538 and 540 to secure the respective gatch supports 1052 and 1054 to the longitudinal rails 538 and 540. Each gatch support 1052, 1054 is formed to include a respective guide slot 1066, 1068. Each guide slot 1066, 1068 includes a guide channel 1070 and a pair of stops 1072, 1074. As will be described in further detail below, the stops 1072, 1074 permit the foot deck 34 to be moved between first and second positions relative to the articulated seat deck 30.

The manual gatch mechanism 1050 further includes a gatch member 1076 which is pivotable relative to the first portion 36 of the foot deck 34 and engages the gatch supports 1052 and 1054 to support the foot deck 34 in a gatch position. The gatch member 1076 includes a gatch tube 1078 which is coupled to a pair of pivot arms 1080 and 1082. The pivot arms 1080 and 1082 each have a respective hole 1084 and 1086 which define an axis 1088 about which the gatch member 1076 pivots. The manual gatch mechanism 1050 further includes a pair of pivot brackets 1090 1092 which are each secured to the plate 846 by a pair of screws 1094, 1094 and nuts 1095, 1095. Each pivot bracket 1091, 1092 forms a yoke with flanges 1096 and 1098. The flanges 1096, 1098 each have a respective thru-hole 1100 and 1102 which are aligned along the axis 1088. The pivot arms 1080 and 1082 are secured to the respective pivot brackets 1090 and 1092 by respective pins 1104 and 1106 such that the gatch member 1076 pivots on the pins 1104 and 1106 about the axis 1088. The pins 1104 1106 are secured by respective retaining clips 1108 and 1110. The gatch member 1076 is positioned so that the tube 1078 is positioned in the guides 1066 and 1068. The manual gatch mechanism 1050 further includes a bar 1112 which is passed through the tube 1078 and has a length that extends beyond the tube 1078. The bar 1112 is capped by a pair of knobs 1114 and 1116 which are grip coupled by a user to disengage the tube 1078 with a respective stop 1070, 1072. The user is then able to move the foot deck relative to the articulated seat deck 30 to move the tube 1078 to the other of the stops 1068, 1068 or 1070, 1070 to change the orientation of the foot deck relative to the articulated seat deck 30.

When the tube 1078 is positioned in the stops 1070, 1070 of the gatch supports 1052 and 1054, the foot deck will be aligned with the articulated seat deck 30 when the seat deck is a lowered position. The gatch member 1076 services the ground link between the foot deck and the load frame 26 to control motion of the foot deck relative to the load frame 26 when the articulated seat deck 30 is moved. For example, when the actuator 584 is extended to raise the foot end 12 of the articulated seat deck 30, the movement of the articulated seat deck 30 urges the foot deck toward the head end 14 of the hospital bed 10. The gatch member 1076 controls movement of the foot deck such that the pivot arms 1082 pivot about the tube 1078 causing the foot end 12 of the foot deck to raise, keeping the foot deck generally parallel to the load frame 26. A user may move the tube 1078 from the stop 1070 to the stop 1072 to change the angle between the foot deck and the articulated seat deck 30. This will tend to increase the angle of brake at the patient's knee due to the gatch in effect of the manual gatch mechanism 1050. Thus, when the tube 1078 is positioned in the stops 1070, 1070, raising of the articulated seat deck 30 will cause pivoting of the patient's hips to raise the patient's thighs while maintaining the patient's lower legs in a horizontal orientation, unless the manual gatch mechanism 1050 is moved to increase the angle between the articulated seat deck 30 and the foot deck.

Figure 28:
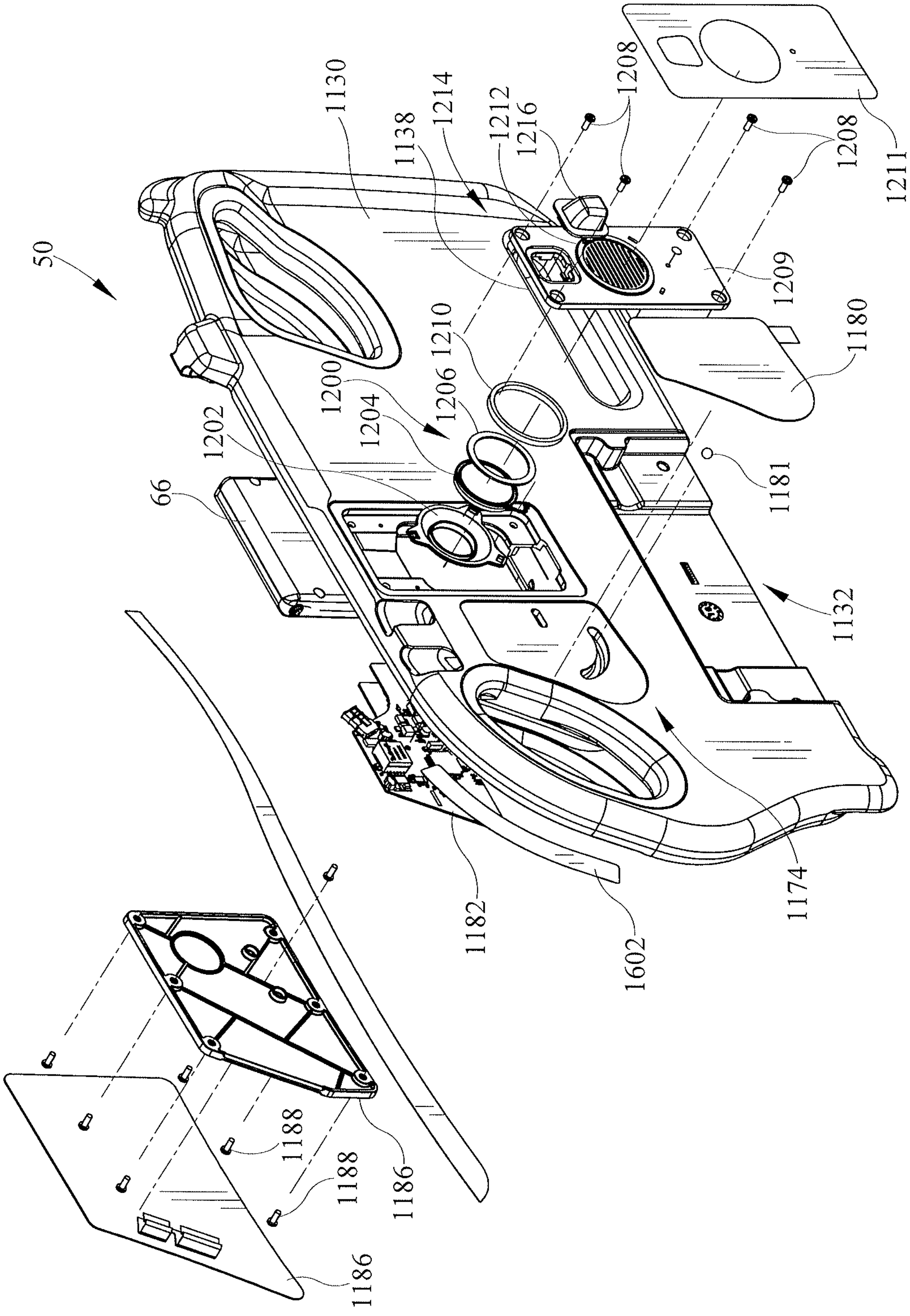
FIG. 28 is an exploded assembly view of an embodiment of a right head side rail suitable for use with the patient support apparatus of FIG. 1.

As shown in FIG. 28, the right side head rail 50 is shown in an exploded assembly view and includes an injection molded body 1130. The injection molded body 1130 is formed to include several features which will be described in further detail, but each of which is a part of the monolithic body 1130. The left head side rail 48 including a body 1136 is shown in FIG. 29. The bodies 1130, 1136 have similar structures, but are mirror images. The interior of the right head side rail 50 is shown in FIGS. 26 and 28, while the exterior of left head side rail 48 is shown in FIGS. 26 and 29. In describing the structures, the interior features will be described with reference to right head side rail 50 and the exterior features will be described with reference to left head side rail 48.

The interior of bodies 1130, 1136 are formed to include a cavity 1132 which is configured to receive a linkage 1134 as will be described in further detail below. In addition, an elongated depression 1128 is positioned at the head end 14 of the bodies 1130, 1136 near a lower edge. The elongated depression 1128 increases the stiffness of the bodies 1130 and 1136. A head end edge 1126 has a lower curved portion 1140 and terminates in a protrusion 1142 that has a curved edge 1144 and a generally vertical surface 1146 which faces the foot end 12 of the hospital bed 10. The protrusion 1142 functions to retain lines and cords that may be engaged with the patient or patient care devices on the hospital bed 10 by preventing the lines and cords from slipping over the head end of the side rail and falling onto the floor or potentially becoming entangled with mechanisms of the hospital bed 10. An upper edge 1148 is generally continuous with the exception of a pendant mount 1150 which is formed on the upper edge 1148 and configured to retain a pendant for access by a caregiver as will be described in further detail below. In addition, there is an opening 1152 formed in the bodies 1130 and 1136 which provides a space for a person to grip an upper rail defined by the opening 1152. The opening 1152 is sized such that an occupant of the hospital bed 10 may insert their hand through the opening 1152, grasp the grip 1154, and pull themselves up in hospital bed 10 if they have migrated toward the foot end 12 of the hospital bed 10. As best seen in FIG. 8, the upper portion of the bodies 1130 and 1136 diverges inwardly near the head end 14 of the bodies 1130, 1136. This inward divergence reduces the angle at which a user has to rotate their hand to grip the grip 1154 when they attempt to pull themselves up.

The upper edge 1148 transitions into a curved portion 1156 through an inflection point 1158 and then defines a space 1160 in which a portion of the bodies of the foot side rails 58, 60 may extend to control the gap between the head side rails 48, 50 and foot side rails 58, 60. At the lower edge of the foot end 12 of the bodies 1130, 1136 a tab 1162 is formed to extend downwardly below the surface of a patient support surface such as a mattress, for example. The tab 1162 reduces the opportunity for a patient to get their hand under the bodies 1130, 1136 when the side rails 48, 50 are in a raised position. Another opening 1164 is formed through the bodies 1130, 1136 along the curved portion 1156 two define a grip 1166 which may also be grasped by a patient to reposition themselves. Along the upper edge 1148 and on the inboard side of the bodies 1130, 1136, a pendant mount 1168 provides for the mounting of a pendant for access by a patient as will be described in further detail below. A curved channel 1170 is formed in a depression 1172 on the inboard side of the bodies 1130, 1136. The curved channel 1170 is configured to receive a ball (not shown) which roles in the channel 1170 as the head deck 28 is moved between raised and lowered positions. As will be described in further detail below, a label 1180 is placed in the depression 1172 to trap the ball in the channel 1170, the label providing an indication of the angle of inclination of the head deck 28.

Fixed electronic controls accessible to a patient are positioned in a depression 1174 formed in the inboard side of the bodies 1130, 1136 and which communicates through the body 1130, 1136 through an opening 1176 to a depression 1178 formed in the outboard side of the bodies 1130, 1136.

As shown in FIG. 29, a circuit board 1182 is positioned in the depression 1178 and secured by a fastener 1184 of a cover 1186 overlies the circuit board 1182 and is secured in place by six fasteners 1188 which are screwed into the body 1130, or 1136. A control panel 1190 includes a number of membrane switches which may be activated by a caregiver to control functions of the hospital bed 10. The functions controlled by the control panel 1190 will be discussed in further detail below. The control panel 1190 includes two flex circuits 1192, 1194 which connects to corresponding connectors 1196, 1198. The flex circuits 1192, 1194 are secured in place by the cover 1186 and the control panel 1190 is secured to the cover 1186 by an adhesive. The control panel 1190 is then covered by a label (not shown in FIG. 29) which will be discussed in further detail below, but which is positioned in the depression 1178 to seal the depression 1178.

A speaker assembly 1200 is positioned in the depression 1174 and the inboard side of the bodies 1130, 1136. The speaker assembly 1200 includes a speaker back 1202, a speaker 1204, and a foam ring seal 1206. A speaker cover 1209 is positioned in the depression 1174 and secured by four fasteners 1209. A second foam ring seal 1210 is positioned to prevent ingress of fluid from the speaker opening 1212 of the speaker cover 1209. The speaker cover 1209 is formed to include a receiver 1214 into which a USB charging receptacle 1216 is positioned. The USB charging receptacle 1216 provides appropriate electrical power and an outlet for a patient to plug a USB cable into to charge a device, such as a smart phone, for example. An overlay 1211 is positioned on the cover 1209 to provide a smooth surface and overlay the screws 1208.

As shown in FIG. 26, each head side rail 48, 50 includes a cable guide 1230 positioned in the cavity 1132 and configured to manage a cable which connects the electronics of the side rails 48, 50 to the control system 400 as will be described in further detail below. As shown in foot side rails 58 and 60, both of the side rails 58 and 60 have a similar construction, but are mirror images of each other. Each has a respective body 1232 and 1234. In the following discussion, the features of the bodies 1232, 1234 utilizing a single reference number for each feature with the understanding that the features are actually mirror images. The features that are present on the inboard side of the bodies 1232, 1234 will be discussed with reference to body 1234 and the features that are on the outboard side of the bodies 1232, 1234 will be discussed with reference to body 1232. Each of the bodies 1232, 1234 have a cavity 1132 configured as the cavities 1132, 1132 of bodies 1130, 1136 of the head rails 48, 50 and configured to receive a linkage 1134.

The bodies 1232, 1234 have a generally linear lower edge 1236 with an expanded curved portion 1238 near the head end 14 of the bodies 1232, 1234. The head end of the bodies 1232, 1234 have a generally arcuate edge 1240 which is complementary to the space 1160 in the respective head rails 48 and 50. The bodies 1232, 1234 transition to a generally horizontal rail 1242 which is formed to define a pocket 1244 which is configured to receive a label 1246 which provides an indicia to a user of the proper positioning of a patient's hip on the patient support apparatus 10. The bodies 1232, 1234 transition to ramp surface 1248 which is configured to include a pendant mounting structure 1250 which will be described in further detail below. An upper edge 1252 of the bodies 1232, 1234 extends from the ramp surface 1248 to a foot end of the bodies 1232, 1234. The upper edge 1252 transitions to a curved portion 1254 which then transitions to a generally vertical edge 1256 that extends downwardly generally to the lower elongate edge 1236. At the transition between the generally vertical edge 1256 and the lower elongate edge 1236 is a protrusion 1258 which extends slightly below the lower edge 1236 to reduce the opportunity for a patient to slip a hand or other body part under the lower edge 1236.

The bodies 1232, 1234 include an opening 1260 which extends from an inboard surface 1262 through the bodies 1232, 1234 to the outboard surface 1264. The opening 1260 provides the opportunity for an individual to extend their hand through the opening 1260 when gripping the rail 1242, to reposition themselves, for example. A second opening 1265 is formed in the bodies 1232, 1234 such that the upper edge 1252 defines a rail 1266 which is graspable by a user. A notch 1268 is formed along the inboard side of the rail 1266 and configured to receive a handle of a urinal or other waste receptacle as will be described in further detail below. The bodies are also formed to include a first indention 1270 on the inboard side 1262 near the foot end 12 of the bodies 1232, 1234. A similar indention 1272 is formed on the inboard side 1262 near the head end 14 of the bodies 1232, 1234. The indentions 1270 and 1272 increase the stiffness of the bodies 1232, 1234. Still yet another opening 1274 is formed in the bodies 1232, 1234 near the foot end 12 of the bodies 1232, 1234. The opening 1274 is sized to receive hangers of various standard accessories which might be hung from the side rails 58 and 60. For example, the opening 1274 is sized to receive the handle of a Pleur-evac or other similar chest a drainage device as will be discussed in further detail below. An additional pair of protrusions 1276 and 1278 are formed on the inboard side of the rail 1266 and configured to reduce the potential for devices, such as a waste receptacle, from sliding along the rail if the load frame 26 is positioned in a tilt position.

An additional indentation 1280 is formed on the inboard side 1262 with the indentation 1280 being spanned by a strap 1282 such that the strap 1282 and indentation 1280 cooperate to define a storage space which is sized to receive a smart phone or tablet computer for easy access by a patient. The strap 1282 is secured to the body by a pair of fasteners 1284, 1284. A pair of labels 1286, 1286 are each positioned over the heads of the fasteners 1284. The outboard surface 1264 defines a wedged shaped indentation 1290 which is formed to include an arcuate channel 1292 into which a ball 1294 is positioned. The ball 1294 is retained in the channel 1292 by an overlay 1296 which provides graduated indicia. As the load frame 26 is tilted, the ball 1294 moves in the channel 1292 such that the location of the ball 1294 in the channel 1292 is indicative of the amount of tilt of the load frame 26. The user is capable of determining the angle of tilt by comparing the position of the ball to the indicia placed on the overlay 1296.

The linkage 1134 includes a plate 1300 which is configured to engage either the head deck 28 or the load frame 26. An upper plate 1304 is configured to be secured to the bodies 1136, 1138, 1232, and 1234. The linkage 1134 maintains the bodies 1136, 1138, 1232, and 1234 is generally in constant orientation as they are moved from the raised position shown in FIG. 1 to a lowered position as shown in FIG. 7. The linkages 1134 engage mounts 1302, 1304 mounted to the load frame 26 or mounts 13, 1308 secured to the frame 610 of the head deck 28. The mounts 1302, 1304, 1306, and 1308 have a similar structure for engaging a plate 1300 of the linkage 1134. Mount 1302 includes two L-shaped apertures 1310 and 1312 which receive a pair of hooks 1314 and 1316, respectively. The hooks 1314, 1316 are secured to the plate 1300 and are configured to be received through a vertical slot 1318 in each of the apertures 1310, 1312. Once the hooks 1314, 1316 pass through the vertical slots 1318, 1318 the linkage 1134 is moved toward the foot end 12 of the mount 1302 as indicated by arrow 1320. In this position, the hooks 1314, 1316 are positioned in a horizontal slot 1322 and support the linkage 1134 on the mount 1302. Once the linkage 1134 is properly placed for screws 1324 are inserted through the plate 1300 and threaded into four weld nuts 1326 secured to a frame 1328 of the mount 1302. The linkages 1134 of each of the remaining siderails 48, 50, 58 are secured in a similar manner.

A frame 1330 of the linkage 1134 is positioned in the cavity 1132 of the body 1234. To secure the frame 1330 to the body 1234, four bolts 1332 are passed through four thru-holes 1334 formed in the body 1234 as best seen in reference to side siderails 48, 58 in FIG. 26. The thru-holes 1334 have a countersink feature so that the heads of the bolts 1332 engage the body 1234. The bolts are secured with four nuts 1336. A cover plate 1338 snaps over the frame 1330 to cover the nuts 1336 and other portions of the linkage 1134. The bodies 1136, 1130, and 1232 of the siderails 48, 50, and 58, respectively, are each secured to their respective linkages 1134 in the same manner. The structure of the linkages 1134 is of a type known in the art and used on the Progressa™ hospital bed available from Hill-Rom, Inc. of Batesville, Indiana.

As shown in FIG. 22, the fixed seat deck 32 is mounted to the load frame 26 to overlie the mounts 1302 and 1304 and secured with two screws 1340, 1342. Similarly, a head deck pan 1344 is secured to the frame 610 of the head deck 28×2 screws 1346 and 1348. The load frame 26 further includes a cross tube 1350 which is positioned adjacent mounts 1302, 1304 and extends laterally across the load frame 26. The cross tube 1350 has a hollow square cross-section which is configured to receive a support member 1352 in each end. Each support member 1352 is secured in each end of the cross tube 1350 by a screw 1354. Referring to the structure on the right side 18 of the FIG. 22, the support member 1352 includes a channel 1356 which is sized to receive a body 1358 of a gap filler 1360. The gap filler 1360 includes two flanges 1362, 1364 that engage two flanges 1366, 1368 respectively that extend from the foot end 12 of the frame 610. A pin 1370 secures the flanges 1362, 1364 to the flanges 1366, 1368 such that the flanges 1362, 1364 are pivotable relative to the flanges 1366, 1368 as the head deck 28 moves relative to the load frame 26. The flanges 1362, 1364 are pivotably coupled to the body 1358 by a pin 1372 which permits the flanges 1362, 1364 to pivot relative to the body 1358. As the head deck 28 pivots and translates relative to the load frame 26 the flanges 1362, 1364 pivot on the body 1358 and relative to the flanges 1366, 1368. In addition, the movement of the head deck 28 away from the load frame 26 causes the body 1358 of the gap filler 1360 to slide in the channel 1356 of the support member 1352. The body 1358 of the gap filler 1360 acts as a barrier to prevent linens or other materials from being gathered in the gap between the head deck 28 and the fixed seat deck 32. A second gap filler 1360 is secured to two flanges 1372, 1374 on the left side 16 of FIG. 22 in a similar manner as the right side 18.

Figure 25:
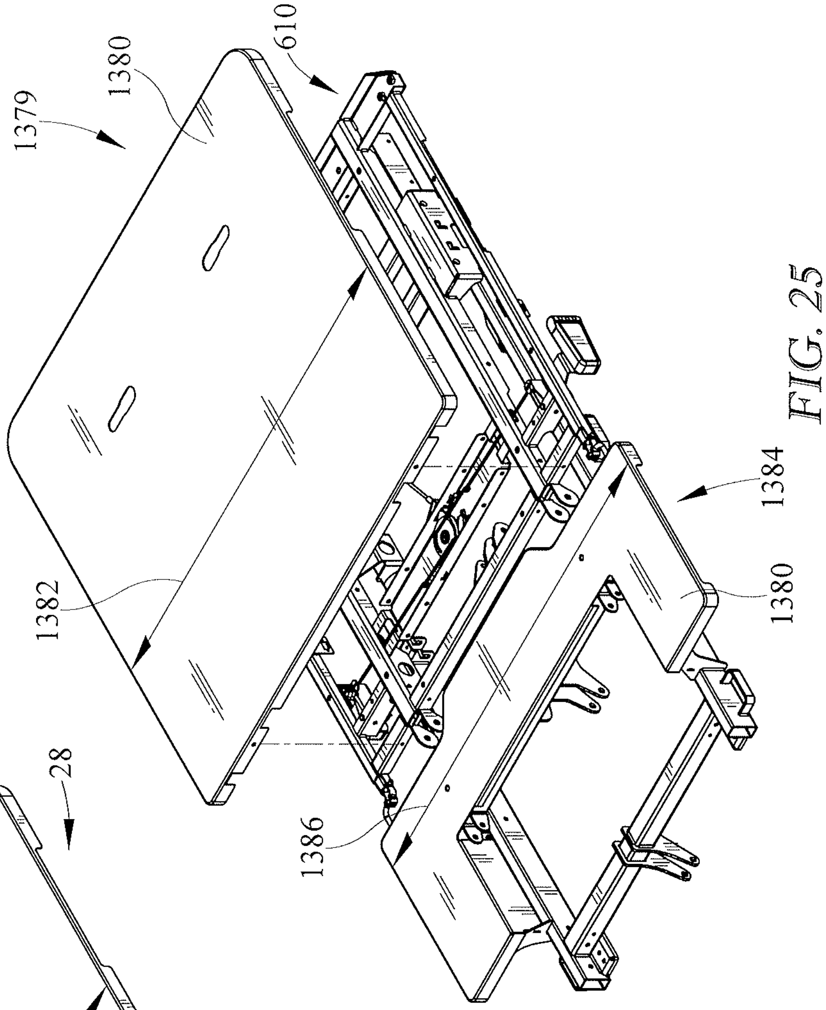
FIG. 25 is an exploded assembly view similar to FIG. 24, the structure shown in FIG. 25 having a wider lateral width to accommodate larger patients.
Figure 24:
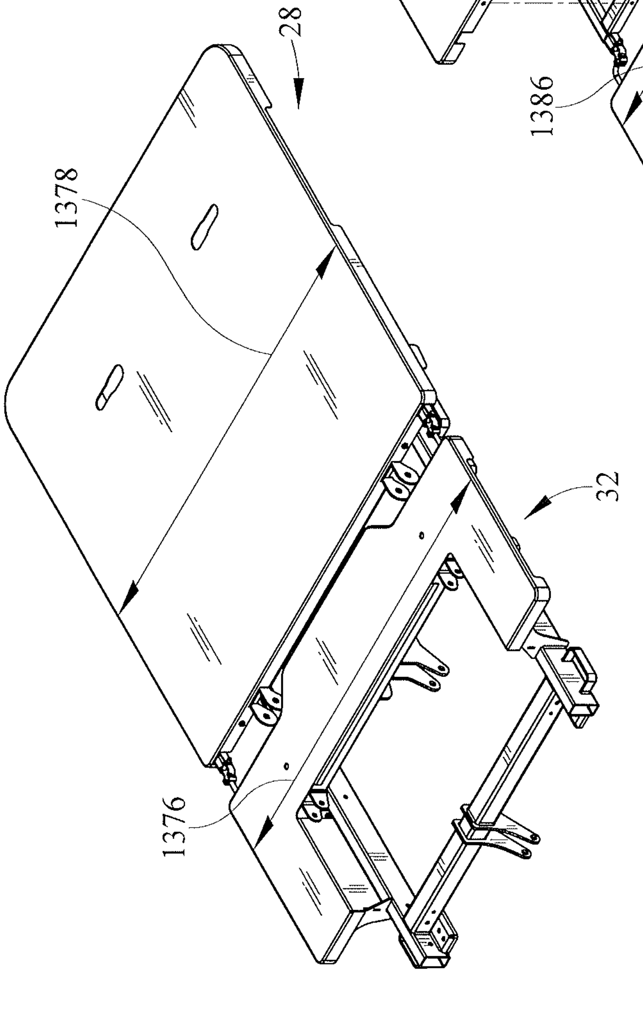
FIG. 24 is a perspective view of a portion of the patient support apparatus of FIG. 1.

As shown in FIG. 22, the fixed seat deck 32 has a width 1376 that corresponds to a width 1378 of the pan 1344 of the head deck 28. However, in some embodiments the head deck 28 and fixed seat deck 32 may be omitted and replaced with a wider version as shown in FIG. 25. A wider head deck 1379 includes a wider pan 1380 that is positionable on the deck frame 610. The pan 1380 has a width 1382 that is greater than the width 1378 of the pan 1344 shown in FIG. 24. Similarly, the fixed seat deck 32 is replaced by a fixed seat deck 1384 that has a width 1386 that corresponds to the width 1382 of the pan 1380 and is greater than the width 1376 of the fixed seat deck 32. While the head deck frame 1388 of FIG. 25 is wider than the head deck frame 610, the load frame 26 is the same width in both embodiments. To accommodate the wider width, the support member 1352 in each end of the cross tube 1350 can be adjusted outwardly to accommodate the wider width with the screw 1354 being screwed into a different hole formed in the support member 1352. In such a case, the gap filler 1360 is replaced by a similar gap filler having an offset to lie in the offset channel. In addition, the rods 1514 and 1544 have a longer length.

Figure 27:
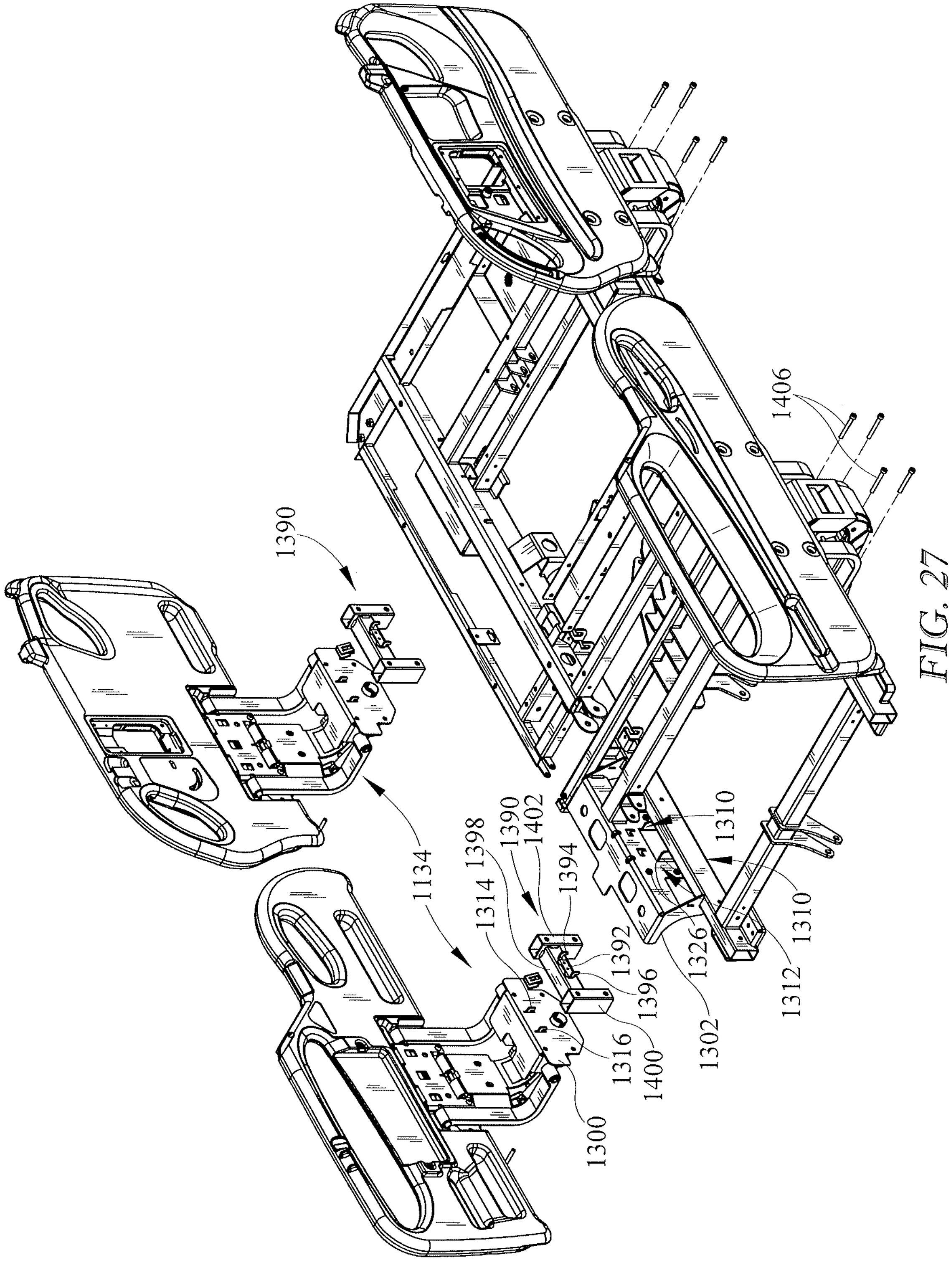
FIG. 27 is an exploded assembly view similar to FIG. 26, FIG. 27 including spacers to space of the siderails of the patient support apparatus further away from frame members to accommodate the wider width of the structure of FIG. 25.

Referring to FIG. 27, the wider width head deck 1379 and fixed seat deck 1384 requires the extension of the side rail linkages 1134 to accommodate the wider width. As shown in FIG. 27, each side rail 48, 50, 58, 60 is engaged with an adapter 1390 which includes a bracket 1392 having hooks 1394, 1396 that engage the apertures 1310, 1312 of the various mounts 1302, 1304, 1306, 1308. The hooks 1314 and 1316 of the linkages 1134 are positioned in slots formed in a crossmember 1398 of the adapter 1390. The adapter 1390 also includes two legs 1400 and 1402 which are coupled to the crossmember 1398. The legs 1400, 1402 have thru-holes 1404 which permit fasteners 1406 to be inserted through the plate 1300 and hooks 1314 of the adapter 1390 to secure the linkages 1134 by threading the fasteners 1406 into the weld nuts 1326 of the mounts 1302, 1304, 1306, and 1308.

The variation in width is also accommodated in the foot deck 34 in that both the first portion 36 and second portion 38 may be constructed having a wider width than the embodiments shown in FIGS. 13-17 without otherwise varying the operation. Referring again now to FIG. 11, the base frame 20 includes the structure 1410 positioned at the head end 14 of the base frame 20 and supported on the curved arms 460, 462 that are secured to the channel 146. In the narrow configuration, a pair of bumpers assemblies 1412, 1414 may each be secured to a shelf 1416 of the structure 1410 by four screws 1418. The bumpers assemblies 1412, 1414 include a pair of U-brackets 1418 having an upper aperture 1420 and a flange 1422 and a lower flange 1424 with an antirotation feature 1426 formed therein. An axle 884 is positioned through a roller 880 with a channel 886 engaging and the antirotation feature 1426 and the lower flange 1424. In the wider version, a U-bracket 1428 replaces the U-bracket 1418, the bracket 1428 having upper and lower flanges 1430, 1432 that are longer than the flanges 1422, 1424 of the U-bracket 1418. This positions the roller 880 further away from the shelf 1416 to accommodate the wider width.

Figure 48:
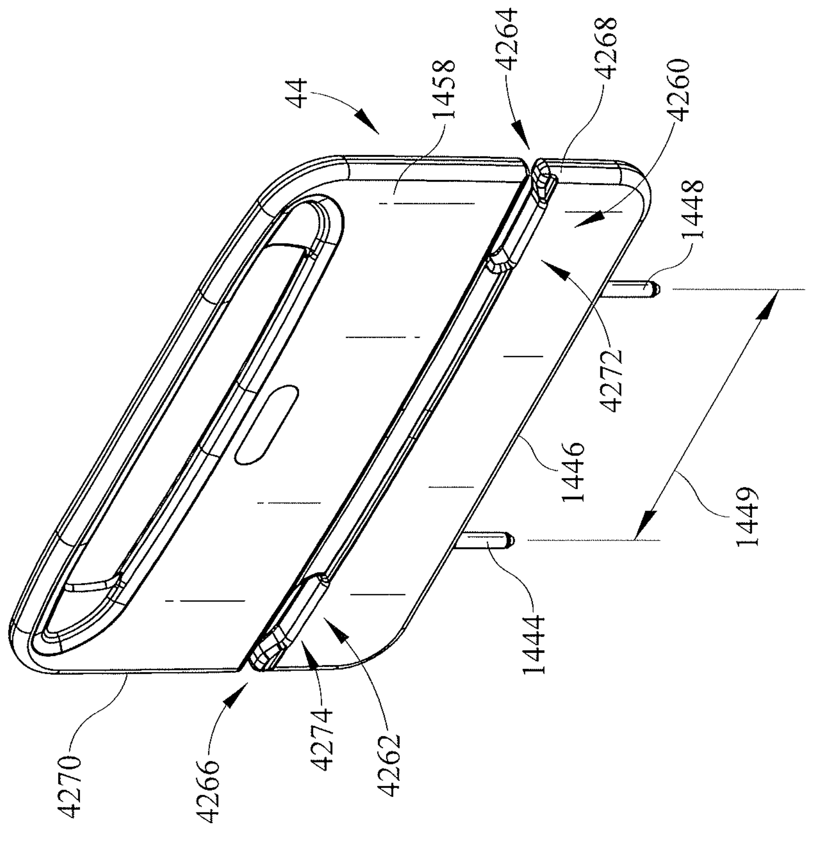
FIG. 48 is a perspective view of a head panel of the patient support apparatus of FIG. 1.

The base frame 20 further includes two vertical tubes 1440, 1440 positioned adjacent one another in the structure 1410 extending downwardly through the shelf 1416. The tubes 1440, 1440 have a circular cross-section. A second pair of tubes 1442 is spaced laterally away from the tubes 1440, 1440 and each extends downwardly from the shelf 1416. The tubes 1442, 1442 have a square cross-section. The tubes 1440 are hollow and sized to receive a round peg 1444 which extends from the lower surface 1446 of the head panel 44 as shown in FIG. 48. Similarly, the tubes 1442, 1442 are hollow and each is sized to receive a round peg 1448 which extends from the lower surface 1446 of the head panel 44 and spaced laterally from the round peg 1444. To prevent the head panel 44 from being installed incorrectly, a guard 1450 is positioned over the tubes 1442, the guard 1450 having an aperture 1452 that aligns with the inboard tube 1442. A similar guard 1454 includes an aperture 1456 which may be positioned over the tubes 1440, 1440 such that only the inboard tube 1440 is accessible through the aperture 1456. The guards 1450, 1454 snap fit onto the tubes 1442, 1440, respectively.

Figure 49:
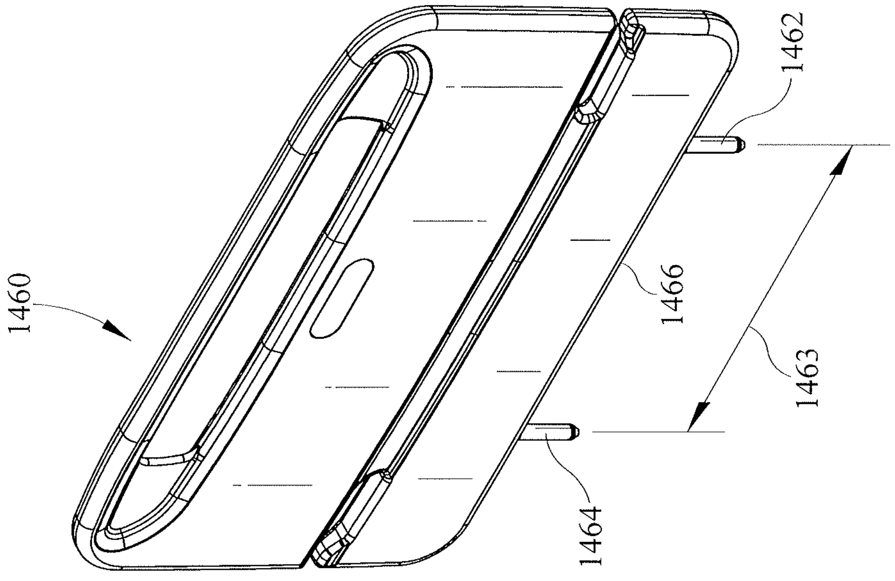
FIG. 49 is a perspective view of another embodiment of a head panel, the embodiment of FIG. 49 having a wider width.

A panel 1458 of the head panel 44 corresponds to the narrow width of the various deck sections of the hospital bed 10. A wider version of a head panel 1460 has two round pegs 1462, 1464 which each depend from a lower surface 1466; however a distance 1463 between the pegs 1462, 1464 is greater than a distance 1449 between the pegs 1444, 1448 of head panel 44. The head panel 44 is formed to include two notches 4260, 4262 which each have a narrow gap 4264, 4266, respectively. The narrow gaps 4264, 4266 are positioned along a vertical side 4268, 4270. The notches 4260, 4266 expand into a larger space 4272, 4274. The shape of the notches 4260, 4262 allow lines are chords to be draped through the notch with the narrow gaps 4264, 4266 resisting any movement of the lines are chords out of the notch. In this way the head panel 44 provides for line management. As an example, a cord 100 is shown in the notch 4260 in FIG. 5. The wider head panel 1460 has similar features as shown in FIG. 49.

Figure 50:
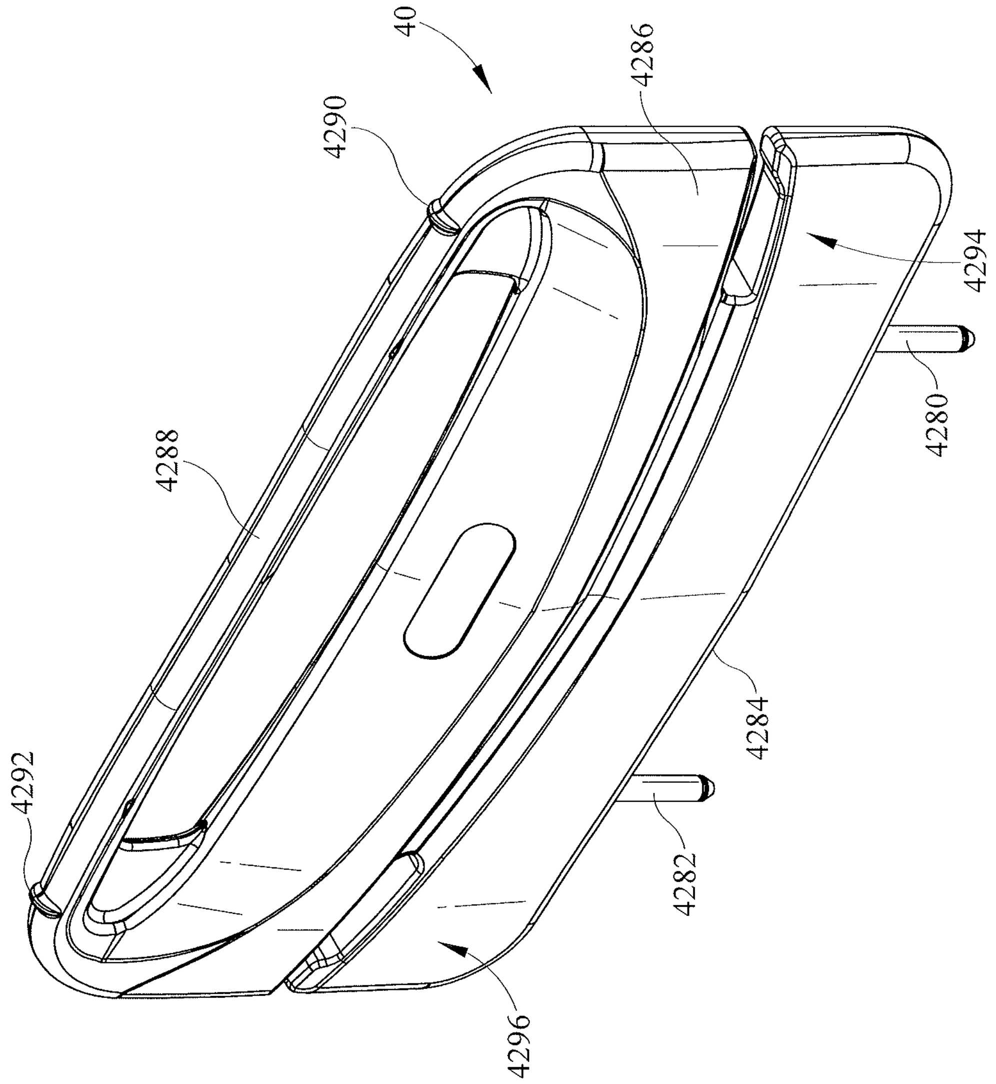
FIG. 50 is a perspective view of a foot panel of the patient support apparatus of Fig. One.

The foot panel 40 shown in FIG. 50 includes two posts 4280 and 4282 that extend from a lower surface 4284 of the body 4286 of the foot panel 40. The body 4286 is formed to include an upper rail 4288 spans the width of the foot panel 40 with a continuous surface. However, two protrusions 4290 and 4292 extend upwardly from the upper rail 4288. The protrusions are positioned and sized to prevent lines and cords from slipping over the edge of the body 4286 when laid over the rail 4288. The footboard 40 includes two notches 4294 and 4296 that have a similar structure in function as the notches 4260, 4262 of the head panel 44.

As shown in FIG. 37, in use, the patient support apparatus 10 includes a support surface 1700 which is illustratively embodied as a mattress. The mattress 1700 of the embodiment of FIG. 37 includes a core 1702 that is enclosed by a lower cover 1704 and an upper cover 1706. The lower cover 1704 is connected to the upper cover 1706 by a zipper as is known in the art. The core includes an upper body support 1708 which is bounded by a pair of bolsters 1710 and 1712 along the longitudinal edges of the upper body support 1708. A perforated leg support 1714 is secured to the bolsters 1710, 1712 as well as the upper body support 1708. The upper body support 1708 is sized and positioned to support a patient's torso while the perforated leg support 1714 supports the patient's legs on the foot deck 34. A fire barrier 1716 is positioned over an upper surface 1718 of the core 1702 when the mattress 1700 is assembled with portions of the fire barrier 1716 being wrapped around under the bottom 1720 of the core 1702, the fire barrier 1716 have a construction which limits the propagation of a fire in the core 1702 if the mattress 1700 is accidentally ignited.

The lower cover 1704 includes a pair of magnet pockets 1722 and 1724 sewn into the lower cover 1704 and sized to receive a pair of magnets 1726 and 1728. When the magnets 1726, 1728 are positioned in the pocket 1722, 1724, the magnets 1726, 1728 magnetically secure the foot end 12 of the mattress 1700 to the foot deck 34. As will be described in further detail below, the mattress 1700 is secured to the head deck 28 at the head end 14 of the mattress 1700. If the foot deck 34 is extended or retracted as described above, the magnets 1726, 1728 maintain engagement of the foot end 12 of the mattress 1700 with the foot deck 34 throughout the range of motion. The perforations of the foot support 1714 permit the foot support 1714 to extend and retract with the foot deck 34.

Figure 38:
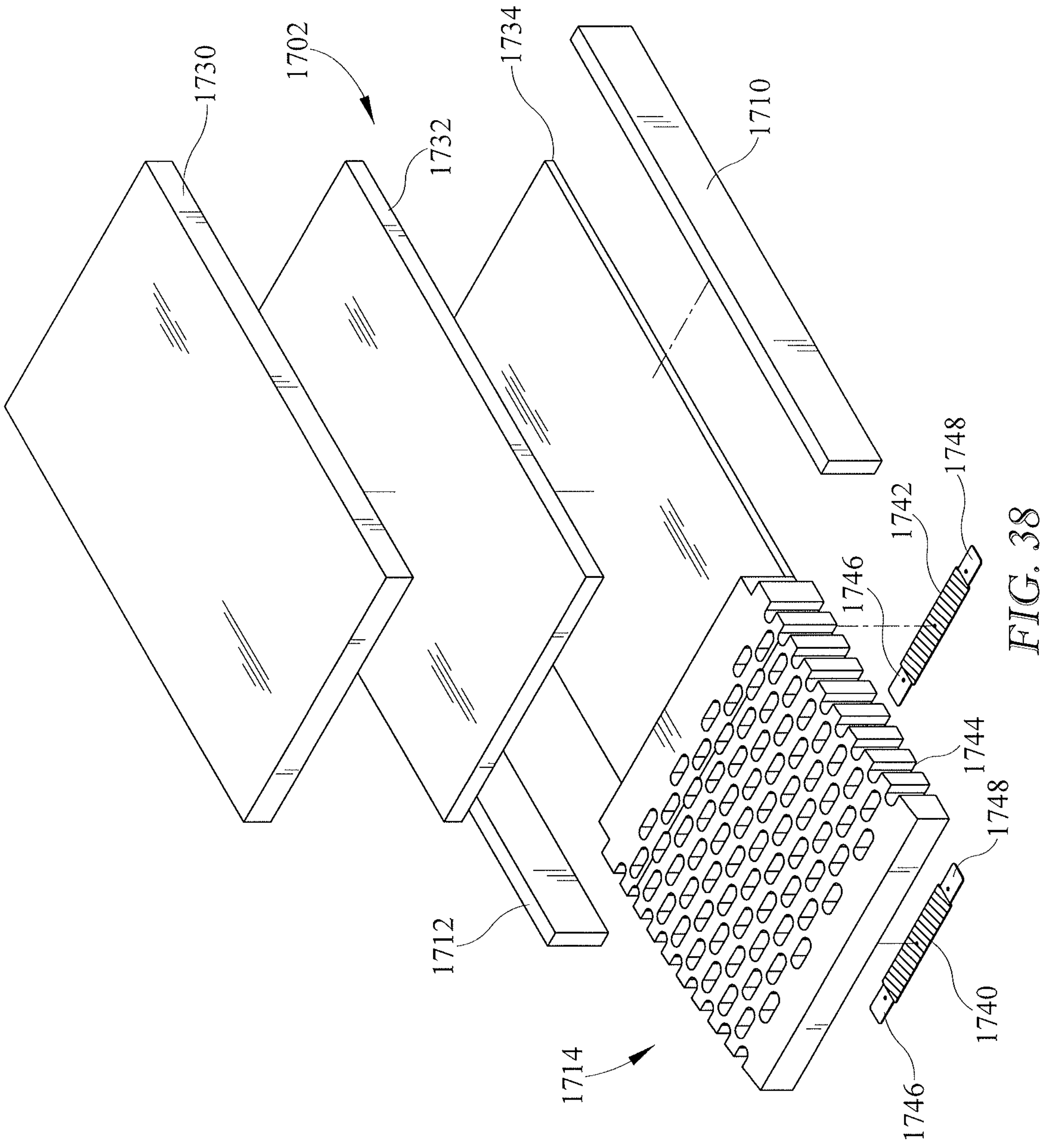
FIG. 38 is exploded assembly view of a core of the patient support surface of FIG. 37.

As shown in FIG. 38, an exploded view of the core 1702 showing that the body support 1708 includes three layers. An upper layer 1730 is approximately 3 inches thick and is constructed of a foam material having an indention load deflection ("ILD") of about 20. An intermediate layer 1732 is approximately 2 inches thick and is constructed of a foam material having an ILD of about 28. A lower layer 1734 is approximately 1 inch thick and is constructed of a foam material having an ILD of approximately 45. It should be understood that structure of the body support 1708 may be different in other embodiments, including a variation in the number of layers and variations in the ILD of each of the layers.

Figure 95:
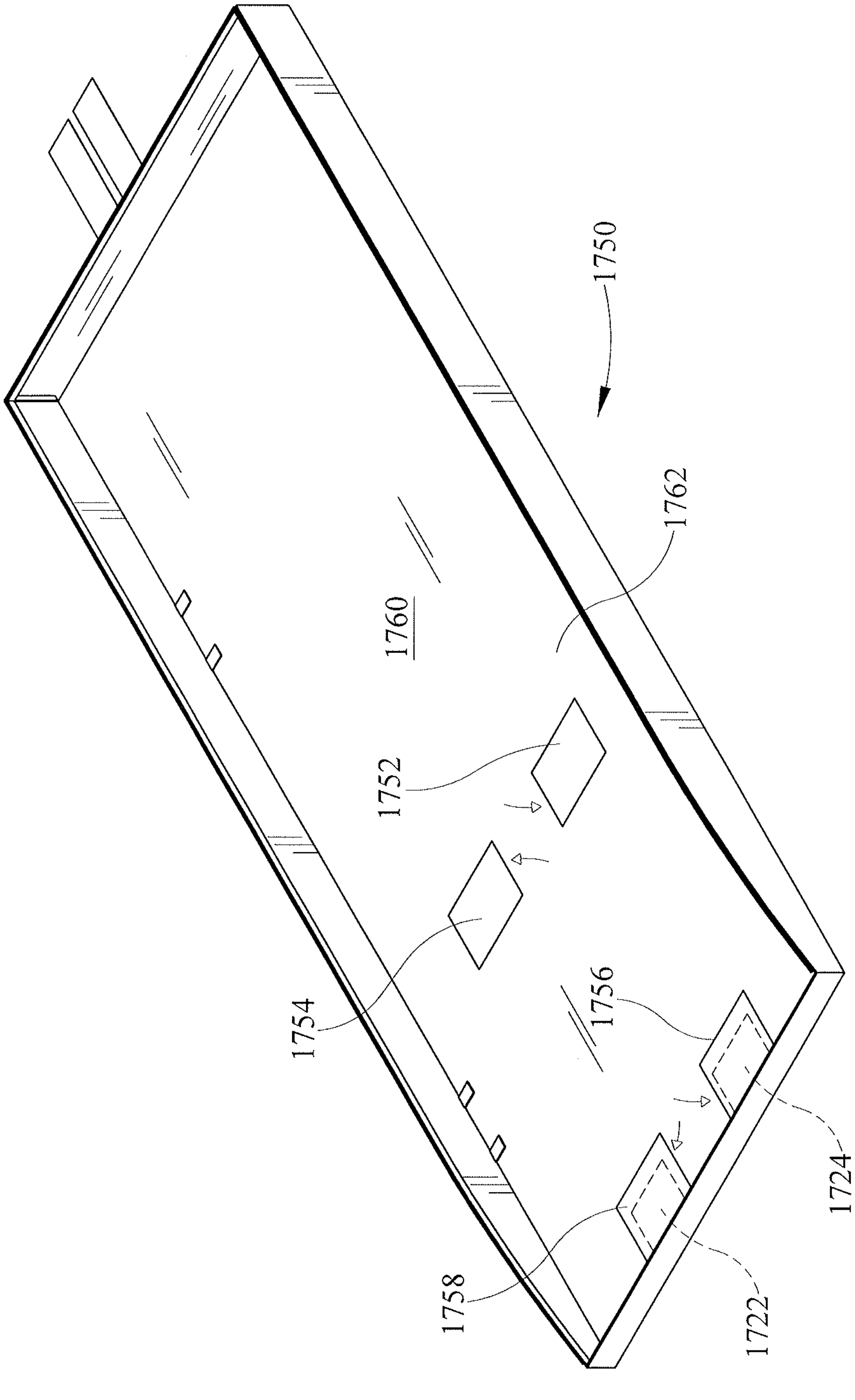
FIG. 95 is a perspective view of an alternative embodiment of a bottom cover for the mattress of FIG. 38.

In the embodiment of FIG. 37, the lower cover 1704 includes the magnet pockets 1722, 1724. In some embodiments, the body support 1704 includes two plates 1740, 1742 which are secured to a lower surface 1744 of the foot support 1714. Each plate 1740, 1742 includes a first tab 1746 and a second tab 1748. As shown in FIG. 95, an alternative lower cover 1750 includes four pockets 1752, 1754, 1756, 1758 which are secured to an upper surface 1760 of a lower panel 1762 of the cover 1750. The first and second tabs 1746, 1748 are configured to be inserted into the pockets 1752, 1754, 1756, 1758 when the body support 1704 is positioned in the lower cover 1750. When the tabs 1746, 1748 of each plate 1740, 1742 are positioned in the respective pockets 1752, 1754, 1756, 1758, the expansion and contraction of the foot support 1714 controls the gathering of the materials of the lower cover 1750, and the foot support 1714 does not move relative to the lower cover 1750 due to the connection between the plates 1740, 1742 and pockets 1752, 1754, 1756, and 1758. This approach to securing the foot support 1714 to its corresponding lower cover 1750 could be used in any embodiment of mattress that includes a perforated foot support as disclosed herein.

Figure 96:
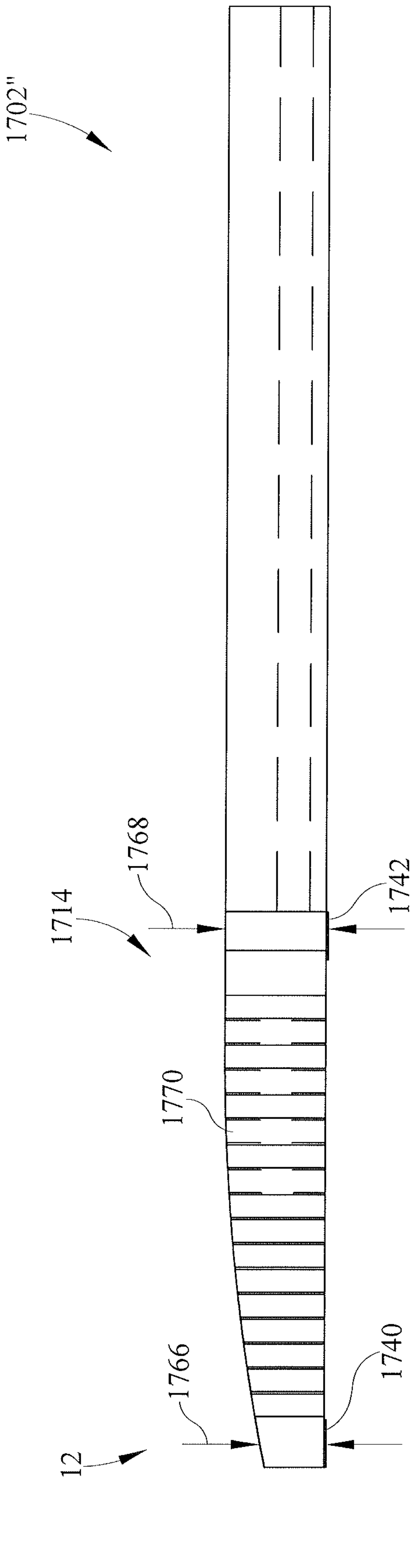
FIG. 96 is a side view of a another embodiment of a core for the mattress of FIG. 38.

As shown in FIG. 96, the foot support 1714 has a lower height 1766 at the foot end 12 of the foot support 1714 than the height 1768 at the head end 14 of the foot support 1714. The lower height 1766 provides relief for a patient's heel to be positioned lower than the patient's calves when the patient is supported on the mattress 1700 in a supine position. An upper surface 1770 of the foot support 1714 has an arcuate shape that defines a gradually declining height as the surface 1770 progresses from the head end 14 toward the foot end 12 of the foot support 1714.

Figure 39:
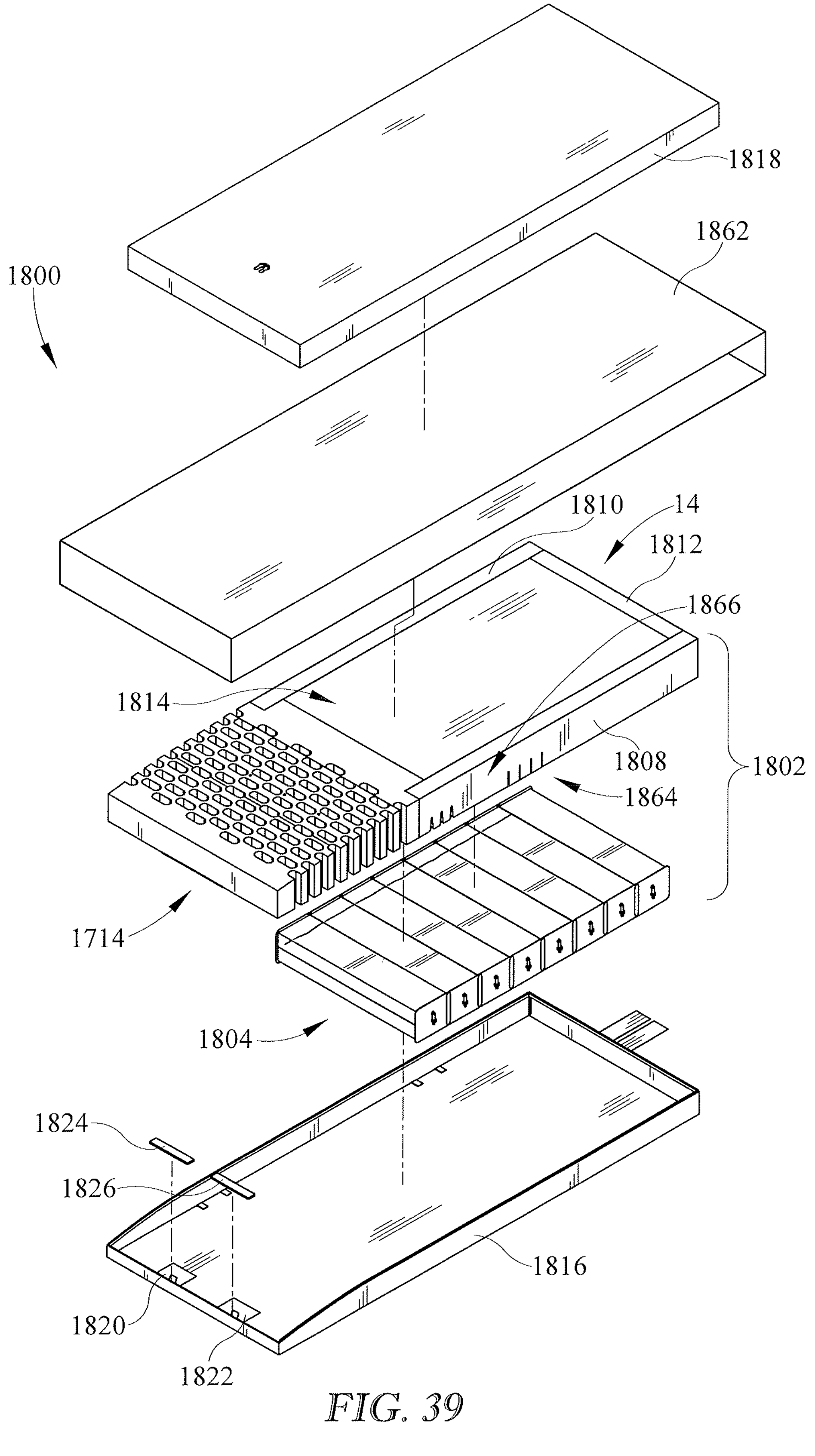
FIG. 39 is exploded assembly view of another embodiment of the patient support surface including self-adjusting technology.

In another embodiment, the mattress 1700 may be omitted and replaced with a different mattress structure, such as the mattress 1800 shown in FIG. 39. The mattress 1800 includes a core 1802 which comprises a bladder assembly 1804 which engages a foam frame 1806. The foam frame 1806 includes a perforated foot support 1714 which is coupled to a pair of longitudinal bolsters 1808 and 1810. The longitudinal bolsters 1808, 1810 are interconnected by a header 1812 which extends laterally between the bolsters 1808, 1810 at the head end 14 of the mattress 1800. The longitudinal bolsters 1808 and 1810 are secured to the perforated foot support 1714 such that the foot support 1714, bolsters 1808 and 1810, and header 1812 cooperate to define a space 1814 into which the bladder assembly 1804 is positioned to form the core 1802. The mattress 1800 includes a lower cover 1816 and an upper cover 1818 which are secured together with a zipper as is known in the art. The lower cover 1816 includes a pair of magnet pockets 1820 and 1822 which receive a pair of magnets 1824 and 1826. The magnets 1824, 1826 are positioned in the pockets 1820, 1822 and function similar to the magnets 1726 and 1728 discussed above.

Figure 52:
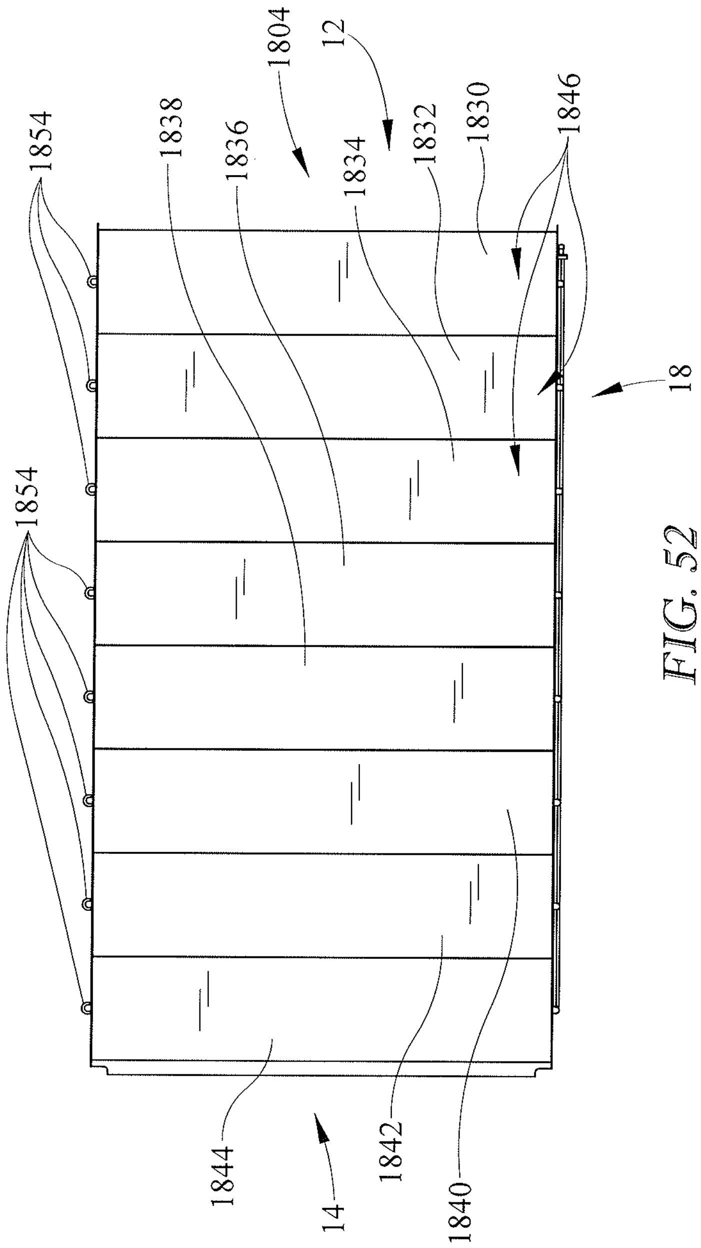
FIG. 52 is a top plan view of a body support of the patient support surface of FIG. 39.
Figure 53:
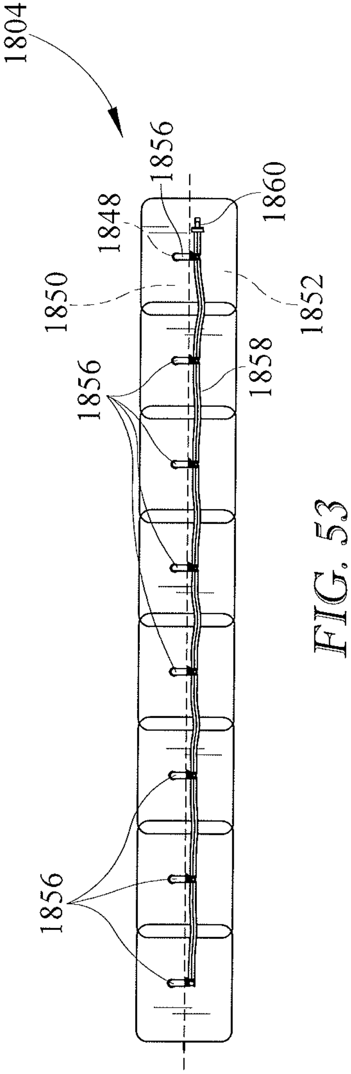
FIG. 53 is a side plan view of the body support of FIG. 52.

As shown in FIGS. 52 and 53, the bladder assembly 1804 includes eight bladders 1830, 1832, 1834, 1836, 1838, 1840, 1842, and 1844. The bladders are arranged with bladder 1830 positioned at the foot end 12 of the bladder assembly 1804 and bladder 1844 positioned at the head end 14. Each bladder 1830, 1832, 1834, 1836, 1838, 1840, 1842, and 1844 comprises an outer enclosure 1846 of urethane coated nylon which provides an air impermeable enclosure. Inside of each enclosure 1846 is a two layered foam structure 1848 which includes an upper layer 1850 and a lower layer 1852. The layers 1850 and 1852 are glued together. The foam structure 1848 is deformable under load, but resiliently expands to fill the interior space of the enclosure 1846.

At the left side 16 of each enclosure 1846 is a pressure relief or check valve 1854. Each of the check valves 1854 are configured to open when the pressure applied to the valve exceeds the relief pressure of the valve. In the arrangement of the bladder assembly 1804, the valves 1854 are arranged such that when the pressure inside any one of the enclosures 1846 is lower than the pressure of atmosphere, the corresponding valve 1854 opens to permit air to flow from atmosphere into the enclosure 1846.

On the right side 18 of the bladder assembly 1804, each enclosure 1846 includes a respective outlet 1856. Each of the outlets 1856 are connected to a manifold tube 1858 so that the enclosures 1846 are all in fluid communication with one another through the outlets 1856 and manifold tube 1858. The manifold tube 1858 terminates with a pressure check valve 1860. The pressure check valve 1860 is configured such that when the pressure in the manifold tube exceeds a relief pressure of the check valve 1860, the check valve 1860 opens to permit the venting of the pressure to atmosphere. It should be understood that the valves 1854, being check valves, do not permit a flow of air from the enclosures 1846 through the valves 1854 to atmosphere. The only flow path for air from the enclosures to atmosphere is through the manifold tube 1858 and pressure check valve 1860. Similarly, the only path for that flow into any of the enclosures 1846 is through a respective valve 1854.

Thus, the mattress 1800 is self-adjusting to maintain the pressure within each of the bladders 1830, 1832, 1834, 1836, 1838, 1840, 1842, and 1844 to a pressure below the relief pressure of the check valve 1860. The operation of the inlet valves 1854 any particular bladder 1830, 1832, 1834, 1836, 1838, 1840, 1842, and 1844 which is unloaded, provides for the rapid filling of the respective bladder 1830, 1832, 1834, 1836, 1838, 1840, 1842, and 1844 with air from atmosphere. This approach helps to regulate the pressure within the various bladders 1830, 1832, 1834, 1836, 1838, 1840, 1842, and 1844 relatively quickly to control the support pressure experienced by a patient.

In the event that the patient exceeds the weight which can be supported by the bladder assembly 1804 pneumatically, venting of the pressure in the manifold tube 1858 and pressure check valve 1860 permits the patient to be supported on the foam structures 1848 of each bladder 1830, 1832, 1834, 1836, 1838, 1840, 1842, and 1844. In this way, the mattress 1800 provides the benefits of a pneumatic mattress with safety for larger patients from bottoming out against the surface of the decks of the hospital bed 10. It should be understood that the foam structures 1848 also serve the purpose of expanding the enclosures 1846 to create the vacuum which draws air through the valves 1854 when a particular bladder 1830, 1832, 1834, 1836, 1838, 1840, 1842, and 1844 is unloaded.

In the illustrative embodiment, foam structures 1848 have similar constructions. However, in some embodiments the layers 1850, 1852 of the foam structures 1848 may have different properties in different bladders 1830, 1832, 1834, 1836, 1838, 1840, 1842, and 1844. In addition, the foam structures 1848 may be a single layer, or may include more than the two layers 1850, 1852.

The mattress 1800 further includes a fire barrier assembly 1862 which is wrapped around the entire core 1802 to fully enclose the core 1802 in the fire barrier assembly 1862. In addition, each of the longitudinal bolsters 1808, 1810 are formed to include a series of relief slits 1864 positioned at the location in the longitudinal bolsters 1808, 1810 which are positioned at the intersection of the head deck 28 and the articulated seat deck 30. The relief slits 1864 provide for expansion of the longitudinal bolsters 1808, 1810 when the head deck 28 is raised. With the relief slits 1864, little material is removed, but the foam is permitted to expand at the location of the slits 1864. In contrast, a series of cutouts 1866 are positioned at the interface between the articulated seat deck 30 and the foot deck 34. The cutouts 1866 are generally triangular with more material removed at a lower surface 1868 of the longitudinal bolsters 1808, 1810, the cutouts 1866 becoming narrower to a termination spaced apart from the lower surface 1868. The cutouts 1866 provide for both expansion and collapsing of the length of the longitudinal bolsters 1808, 1810 at the interface between the articulated seat deck 30 and the foot deck 34. The removed material at the surface 1868 permits the cutouts 1866 to collapse when the foot deck 34 is moved downwardly relative to the articulated seat deck 30 such that the material of the longitudinal bolsters 1808, 1810 does not bulge.

Figure 40:
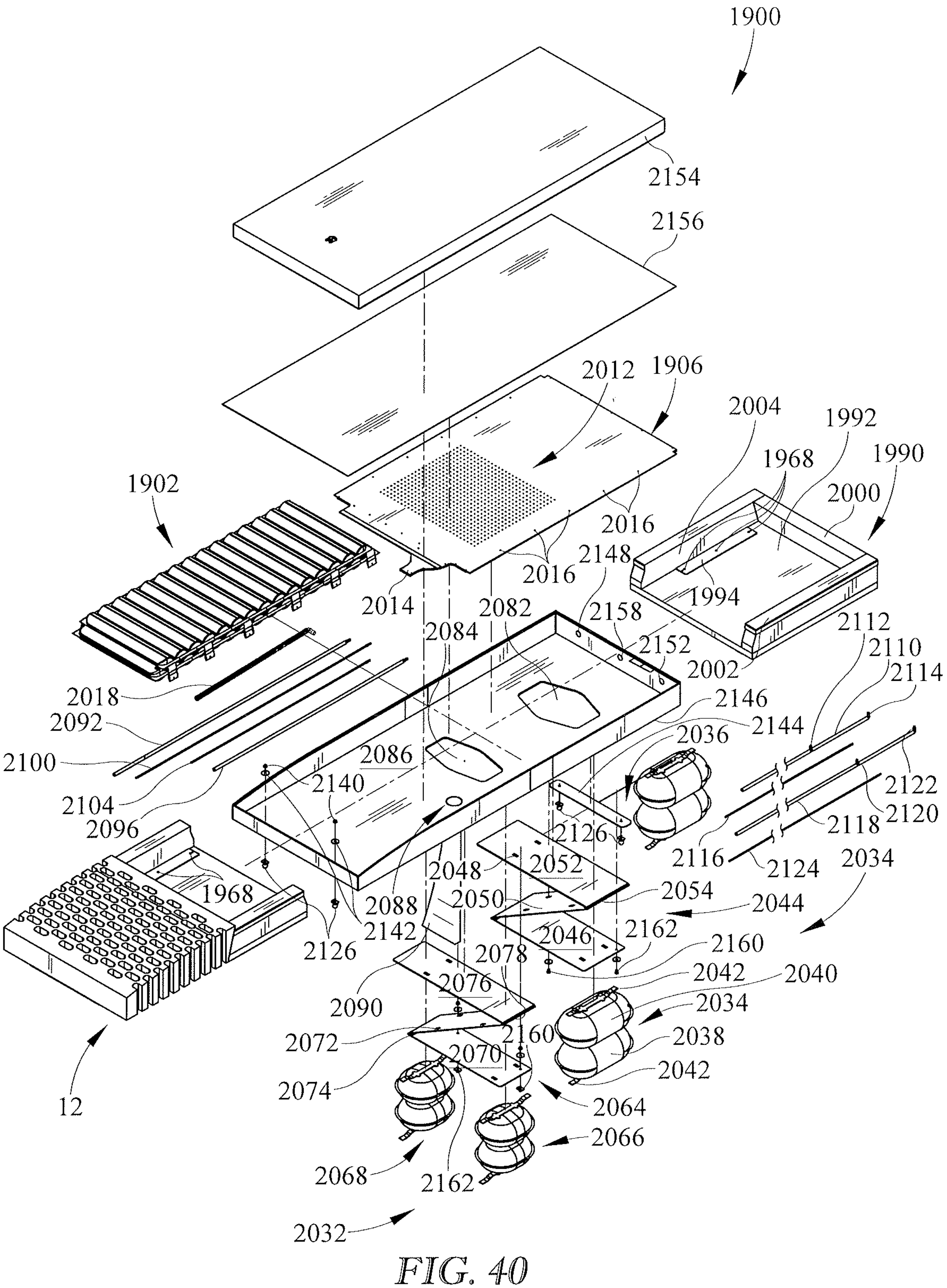
FIG. 40 is exploded assembly view of still another patient support surface assembly including pneumatically operated components configured to be operated by the airbox of FIG. 30.

In still another embodiment shown in FIG. 40, a mattress 1900 may be used in place of mattress 1700. The mattress 1900 includes a body support 1902 and a foot support 1904. The body support 1902 supports a microclimate management structure 1906. In addition, the mattress 1900 includes a mattress turning structure 1908 which is configured to cause rotation of the mattress assembly about a longitudinal axis 1910.

Figures 86, 87, 88, 89, 90, 91, 92:
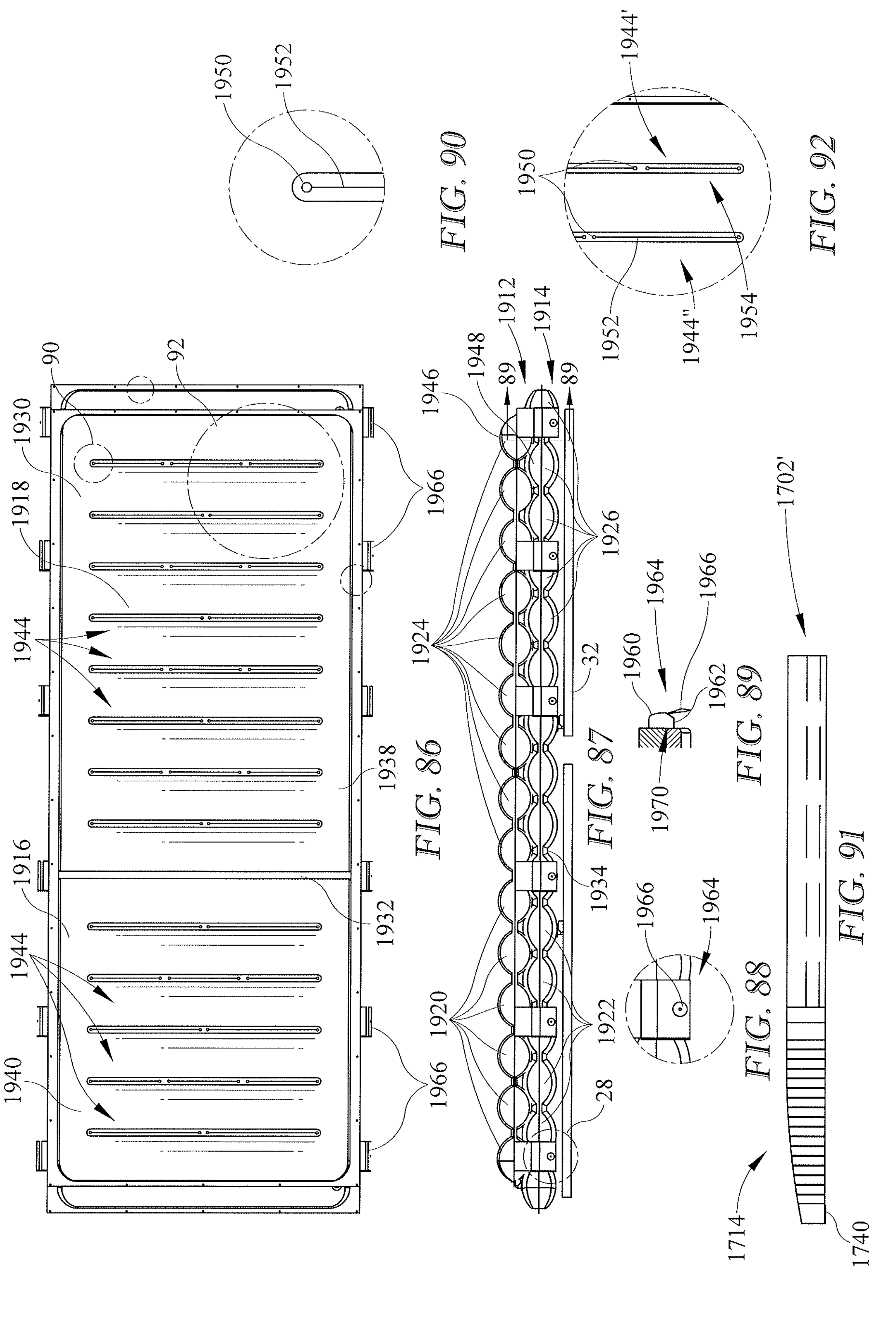
FIG. 86 is a top view of a body support of the mattress of FIG. 40.
FIG. 87 is a cross-sectional view of the body support of FIG. 86.
FIG. 88 is an enlarged view of a portion of the view of FIG. 87.
FIG. 89 is a cross-sectional view taken along lines 89-89 of FIG. 87.
FIG. 90 is in a large view of a portion of the body support of FIG. 86.
FIG. 91 is a side view of a an alternative embodiment of a core for the mattress of FIG. 83.
FIG. 92 is an enlarged view of a portion of the view of FIG. 86
Figure 94:
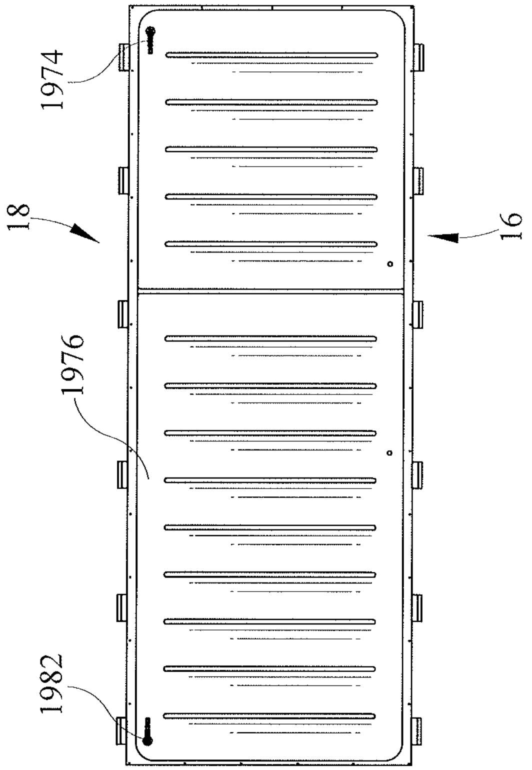
FIG. 94 is a top view of a bottom layer of the body support of FIG. 86.
Figure 93:
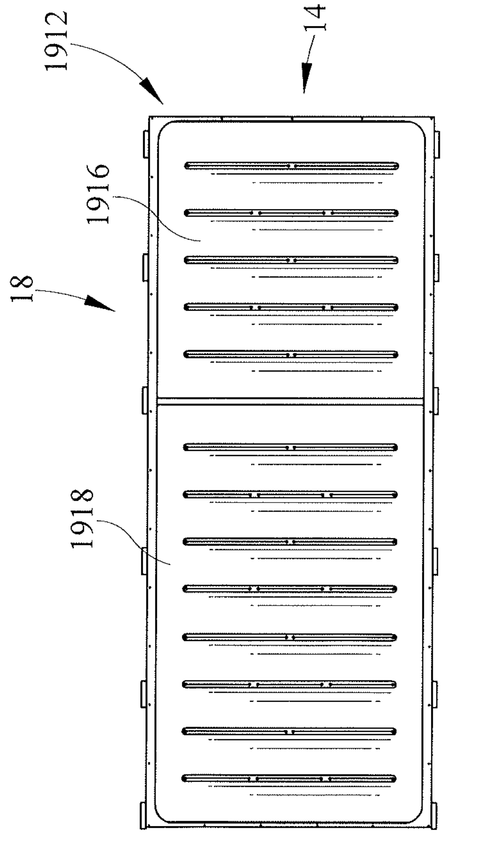
FIG. 93 is a top view of a top layer of the body support of FIG. 86.

As shown in FIG. 87, the body support 1902 comprises a two layer structure that includes a number of air chambers arranged into an upper layer 1912 and a lower layer 1914 with each layer 1912, 1914 being divided into a head zone 1916 and a seat zone 1918. In the upper layer 1912, the body support 1902 includes six chambers 1920. In the lower layer 1914, the head section 1916 includes seven chambers 1922. In the upper layer 1912, the seat zone 1918 includes nine chambers 1924. The lower layer 1914, the seat zone also includes nine chambers 1926. It should be noted that the seat zone 1918 and the head zone 1916 do not correspond with the respective articulated seat deck 30 and head deck 28. Rather, as shown diagrammatically in FIG. 87, the head deck 28 underlies the chambers 1922 in the lower layer 1914 of head zone 1920. However, two of the chambers 1926 of the lower layer 1914 of the seat zone are supported on the head deck 28 with the remaining nine chambers 1926 being supported on the articulated seat deck 30 and fixed seat deck 32.

When the head deck 28 is moved upwardly, a portion of a patient's lower back and the patient's hips are supported on two of the chambers 1924 of the upper layer 1912 of seat zone 1918. It has been found that the potential for excessive interface pressure upon a patient's skin is controlled best when the lower back and hips are at the same pressure, such as the pressure of seat zone 1918, as opposed to having the pressure in the head section 1916 extend to the patient's hip line. It should be understood that the reference to the head zone 1916 does not limit the function of the head zone 1916, as the head zone 1916 supports both a patient's head the patient's shoulders and upper back.

It should be understood that the upper chambers 1924 and lower chambers 1926 of the seat zone 1918 are all in fluid communication. Similarly, the upper chambers 1920 and lower chambers 1922 of the seat zone 1916 are all in fluid communication. The body support 1902 is formed by RF welding a urethane coated nylon material to form the various seams and chambers, while also securing the upper layer 1912 to the lower layer 1914. The lower layer 1914 includes a perimeter weld 1928. The upper layer 1912 also includes a perimeter weld 1930, as well as a lateral weld 1932 that separates the head zone 1916 from the seat zone 1918. A similar weld 1934 is formed in the lower layer 1914 to separate the head zone 1916 from the seat zone 1918. The chambers of the seat zone 1918 are in fluid communication through channels 1936 and 1938 on the lateral sides of the zone 1918. The head zone 1916 includes similar channels 1940 and 1942. The chambers 1924 are formed by a number of welds 1944 which traverse the width of the zone 1918 between the channels 1936 in 1938. The welds 1944 cause a top material 1946 of the layer 1912 to be secured to a lower material 1948 of the upper layer 1912, while allowing the spaces between the welds to be expanded to form the chambers 1924.

The head zone 1916 also includes a number of welds 1944 which span the lateral space between the channels 1940 and 1942, causing the formation of the chambers 1920. It should be understood that the lower chambers 1926 of zone 1918 and lower chambers 1922 of zone 1916, are formed in a similar fashion with welds spanning between chambers positioned on the lateral sides of the respective zones 1916, 1918 to allow the chambers to communicate with one another.

In the upper layer 1912, the areas where the welds 1944 are applied are processed after welding to create relief between adjacent chambers 1920 or 1924, to allow the chambers 1920 or 1924 to move relative to one another. For example, every weld 1944 is cut in either two or three places to create small connected segments 1950 between adjacent cuts in the respective weld 1934. Referring to FIG. 87, a first weld 1944 is has three cuts 1954 such that two segments 1950 remain. In adjacent weld 1944, there are only two 1952 cuts leaving a segment 1950 centered in the weld 1944. Each cut 1952, 1954 is terminated each end with a relief 1956 that is circular to reduce the potential for a stress riser and resultant tearing through the weld. By alternating the pattern of cuts between cuts 1952 and 1954, adjacent chambers 1920 or 1924 have some potential for flexure relative to one another, but are maintained in a generally aligned orientation. It should be understood that in other embodiments, the number of cuts along the welds may be varied to vary the performance of the bladder assembly 1902.

Both the upper layer 1912 and the lower layer 1914 include a number of flaps 1960, 1962, respectively, that are welded together to form a mounting structure 1964 which is used to secure the bladder assembly 1902 to other structures of the mattress 1900. Each structure 1964 includes a snap 1966 which is welded to the flanges 1960, 1962, the snap 1966 being configured to engage a mating structure 1968 seen in FIG. 40. In addition, the structure 1964 forms a loop 1970 through which pneumatic lines are routed along the length of the bladder assembly 1902.

The pneumatic connection between the upper layer 1912 and lower layer 1914 is accomplished by connecting the port 1974 on the top side 1976 of bottom layer 1914 with a corresponding port 1978 on the bottom side 1980 of the top layer 1912 to form the head zone 1916 with the two layers 1912 and 1914. The seat zone 1918 swarmed by connecting the port 1982 in the bottom side 1976 of the lower layer 1914 to the port 1984 the bottom surface 1980 of the layer 1912.

The body support 1902 is secured to a foam structure 1990 with the snaps 1966 that corresponded to three protrusions 1968 being secured to a plate 1994 that is secured to a lower foam layer 1992. A corresponding plate 1994 is positioned out of view in FIG. 40 on the left side 16 of the foam structure 1990 and connects to additional snaps 1966. The foot support 1904 includes a pair of plates 1996 which are secured to a foam base 1998 of the foot support 1904. Three protrusions 1968 are secured to the plate 1996 and engage three additional snaps 1966 on the body support 1902. Another plate 1996 is positioned out of view in FIG. 40, but also secures the body support 1902 through the interaction of snaps 1966 with protrusions 1968. The structure 1990 includes a header 2000 and a pair of side beams 2002 and 2004, with the header 2000 and side beams 2002, 2004 being secured to the foam layer 1992.

The foot support 1904 includes a perforated section 2006 which is secured to the foam base 1998 and a pair of side beams 2008 and 2010. The foam layers 1992 and 1998 provide some protection from a patient bottoming out against the surfaces of the various decks of the hospital bed 10 if the patient support 1902 were to experience a catastrophic failure and deflate. In addition, the foam layers 1992 and 1998 provide structural support for other portions of the mattress 1900.

The microclimate management structure 1906 is configured to overlie the body support 1902 with an exhaust region 2012 being positioned in the general vicinity of a patient's buttocks and thighs. As will be described in further detail below, the flow of air pushed into the microclimate management structure 1906 through an inlet 2014 is exhausted through the exhaust region 2012 to cause airflow within the mattress underneath of the patient's buttocks and thighs to help move moisture away from the patient's skin and provide some cooling of the patient's skin. The microclimate management structure 1906 includes a plurality of thruholes 2016 on each lateral side which cooperate to engage the protrusions 1968 so that the snaps 1966 capture portions of the microclimate management structure 1906 to secure the microclimate management structure 1906 relative to the foam structure 1990 and the foot support 1904. The inlet 2014 traverses between the body support 1902 and the perforated section 2006 of the foot support 1904 and past of the foam base 1998 to be engaged by an inlet tube 2018 that is connected to a manifold as will be discussed in further detail below. A high volume of air is transferred through the inlet tube 2018 and flows into the microclimate management structure 1906 and out of the exhaust region 2012.

The mattress turning structure 1908 includes a head end turn structure 2030 and a foot end turn structure 2032. The turn structure 2030 includes a left turn bladder assembly 2034 and a right turn bladder assembly 2036. The turn bladder assemblies 2034, 2036 include a lower chamber 2038 an upper chamber 2040, the two chambers 2038, 2040 having an opening there between so that the bladder assembly 2034 functions as a single unit. The chambers 2038, 2040 are shaped to control the gathering and expansion of the material of the bladder assembly 2034 during inflation and deflation. The bladder assembly 2034 includes an upper retainer 2042 and a lower retainer 2042 that cooperate to retain the bladder assembly 2034 relative to a Z-plate assembly 2044. The lower retainer 2042 has one end positioned in a slot 2060 and the opposite end positioned in a slot 2062 in the lower plate 2046. The upper retainer 2042 is secured to the intermediate plate 2048 in a similar manner.

The z-plate assembly 2044 includes a lower plate 2046 that is connected to an intermediate plate 2048 through a hinge 2050. An upper plate 2052 is connected to the intermediate plate 2048 by a hinge 2054. The bladder assembly 2036 is secured to the upper plate 2052 and the intermediate plate 2048. When a turn assist function of the mattress 1900 is not engaged, the chambers 2038, 2040 of the bladder assemblies 2034, 2036 collapse so that the Z-plate assembly 2044 collapses into a flat orientation and permits the mattress 1900 to be supported on the hospital bed 10 for normal use.

The foot end turn structure 2032 is constructed similar to the head end turn structure 2030, with the difference being the size of the members of the plates of a Z-plate assembly 2064 and a corresponding difference in the size of the bladder assemblies 2066 and 2068. The bladder assembly 2066 is part of a left turn zone along with the bladder assembly 2034 and the bladder assembly 2068 is part of a right turn zone along with the bladder assembly 2036. The Z-plate assembly 2064 includes a lower plate 2070 connected to an intermediate plate 2072 by a hinge 2074. The intermediate plate 2072 is connected to an upper plate 2076 by a hinge 2078. Each of the bladder assemblies 2066, 2068 has a lower retainer 2042 and an upper retainer 2042 which retain the bladder assemblies 2066, 2068 to the plates 2070, 2072, 2076 of the plate assembly 2064.

Figure 41:
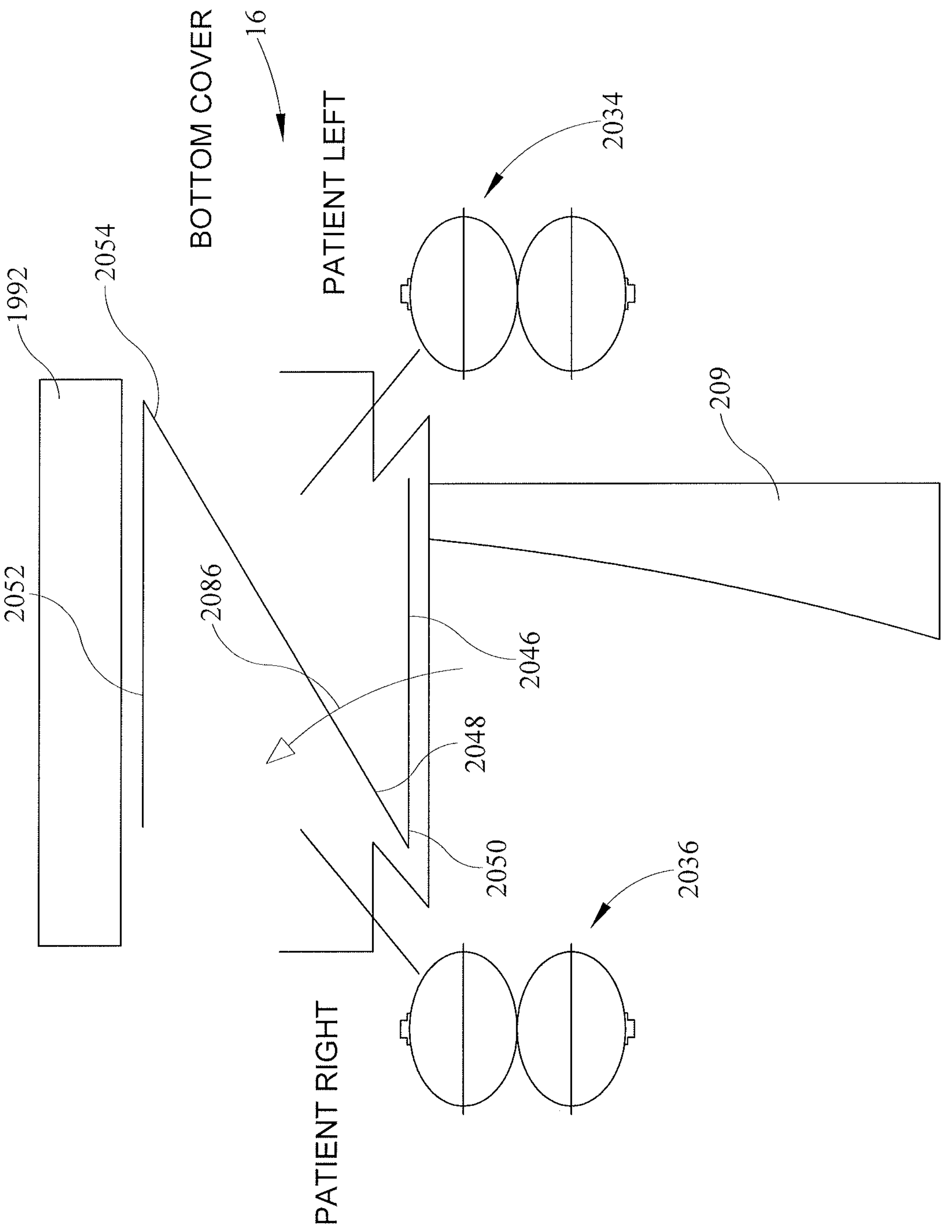
FIG. 41 is a diagrammatic representation of a portion of a turning structure of the patient support surface of FIG. 40.

The mattress 1900 includes a lower cover 2080 with a first pocket 2082 and a second pocket 2084. Referring to the diagrammatic representation in FIG. 41, the lower plate 2046 of the z-plate assembly 2044 is positioned in the pocket with the hinge 2050 below a lower sheet 2086 of the cover 2080. The left turn bladder 2034 is positioned between the lower plate 2046 and the intermediate plate 2048 and the right turn bladder assembly 2036 is positioned between the intermediate plate 2048 and the upper plate 2052. The foam plate 1992 is positioned over the Z-plate assembly 2044. In operation, to cause a patient to be turned to their right, the left turn bladder 2034 is inflated while the right turn bladder 2036 is remained uninflated. This causes the intermediate plate 2048 to pivot about the hinge 2050 as indicated by arrow 2085 causing the left side 16 of the mattress 1900 to be lifted to cause the patient to be rotated to facilitate the changing of the patient's linens or access to the patient's back. In use, a turn assist function is engaged to move the patient to a rolled position, and then the respective turn assist bladder is deflated while the caregiver holds the patient in the rotated position. It should be understood that when a turn to the patient's left is desired, the bladder assembly 2036 is inflated to cause the upper plate 2052 to pivot about the hinge 2054.

In the foregoing discussion, the operation of the turn assembly 2030 has been described. It should be understood that the operation of the turn assembly 2032 is similar and is coordinated with the operation of the turn assembly 2030, with of the bladder assemblies 2034 and 2066 being a left turn bladders zone and the bladder assemblies 2036 and 2068 being a right turn zone. While in the illustrative embodiment the turn assemblies 2030 and 2032 cooperate, in some embodiments each of the bladder assemblies 2036, 2038, 2066, 2068 may be independently operable to cause rotation of a portion of the patient's body on the body support 1902. In such a case, each of the bladder assemblies 2036, 2038, 2066, 2068 would have to be operated as an independent zone.

As will be discussed in further detail below, a mattress turning structure 3425 includes assemblies 3426, 3448, and 3452 and each is independently operable to cause a portion of a mattress to be rotated to one side. Rotation of the mattress provides assistance to a caregiver in changing the linens on the mattress when a patient is supported on the mattress. In addition, a caregiver may turn a patient to improve access to various portions of the patient's body. In use, the turn assembly 3426 may be activated to move the patient to a new position and deactivated while the patient is held in position to cause the mattress to move away from the patient. In some cases, the turn assembly 3426 may be used to provide continuous lateral rotation therapy (CLRT) to a patient. By rotating the patient from side to side, the patient is less prone to experience pulmonary complications associated with long-term hospital bed 10 ridden status. While the mattress 1900 includes a pneumatic system, an alternative arrangement of a turning structure is disclosed in FIGS. 131-136 that may be used with a mattress that does not have an active pneumatic system, such as mattress 1700 or mattress 1800, for example. A block diagram of a hospital bed 10 3410 shown in FIG. 132 shows that the hospital bed 10 3410 includes a control system 3424 and three turn assemblies 3426.

In the illustrative embodiment, the control system 3424 includes a controller 3430, a user interface 3432, a pump 3434, a sensor assembly 3428, and a flow control assembly 3436. The controller 3430 includes a processor 3438 and a memory device 3440. The processor 3438 receives inputs from the user interface 3432 and the sensor assembly 3428, utilizes instructions stored in the memory device 3440 to operate turn assemblies 3426, 3448, and 3452.

Referring now to FIG. 131, the hospital bed 10 is shown with the mattress removed to expose the three separate turn assemblies 3426, 3448, and 3452 positioned on deck sections of the hospital bed 10. A first turn assembly 3426 is positioned on a head deck section 3446, the second turn assembly 3448 is positioned on a seat deck section 3450, and the third turn assembly 3452 is supported on a thigh deck section 3454. In the illustrative embodiment there is no turn assembly on the foot deck section 3455, but in other embodiments further turn assemblies may be included. Each of the turn assemblies 3426, 3448, and 3452 are independently operable under the control of the controller 3430. The functionality of each of the turn assemblies 3426, 3448, and 3452 are similar. The following discussion regarding the structure and operation of turn assembly 3426 is equally applicable to the turn assemblies 3448 and 3452, with the principle difference being the size of the components of the turn assemblies 3448 and 3452 modified to fit the respective deck sections 3450 and 3454. The turn assemblies 3426, 3448, and 3452 are releasably secured to the deck sections 3446, 3450, and 3454 and the turn assemblies 3426, 3448, and 3452 may be added independently of the nature of the mattress, allowing the turn function to be added or retrofitted to existing hospital bed 10*s*. In some cases, the control system 3424 may be independent of the control structure of the hospital bed 10 3410 to operate the turn assemblies 3426, 3448, and 3452.

The turn assembly 3426 includes a hinged support plate assembly 3464 (shown in FIG. 136) which has two hinges 3456 and 3458 that define respective pivot axes 3460 and 3462. The hinges 3456 and 3458 are positioned on opposite sides of the hinged support plate assembly 3464 so that the pivot axes 3460 and 3462 lie parallel to the longitudinal length of the hospital bed 10 3410 on opposite sides. The turn assembly 3426 does not require the patient to be centered on the mattress to achieve maximum rotation angles as is the case with mattresses that have integral turn bladders. The entire mattress is turned providing a uniform rotation angle across the mattress.

A pair of inflatable bladders 3466 and 3468 is positioned between an upper plate 3470 and an intermediate plate 3472 of the hinged support plate assembly 3464 and a second pair of bladders 3474 and 3476 is positioned between the intermediate plate 3472 and a lower plate 3478 as shown in FIGS. 133-135. It should be understood that the plates 3470, 3472, and 3478 are rigid structures constructed of a resin composite and sufficiently stiff to transfer the load between the interface between the bladders and the plates over the entire plate structure.

Referring again now to FIG. 131, each bladder 3466, 3468, 3474, or 3476 is secured to an adjacent plate 3470, 3472, or 3478 by a respective strap 3480 that is secured to the bladder and extends through an opening at one end of the respective plate 3470, 3472, or 3478 and lies on the side of the respective plate 3470, 3472, or 3478 opposite the bladder for a length and is then extends through another opening to reengage the bladder. The interaction of the strap 3480, the bladder, and the respective plate secures the bladder relative to the plate. For example, referring now to the bladder 3466 shown in FIG. 131, the strap 3480, which is secured to the bladder 3466, extends through a first opening 3482. The strap 3480 traverses the surface 3484 of the upper plate 3470 and then extend back through the plate 3470 through an opening 3486 where it is secured to the bladder 3480. The engagement of the strap 3480 with the plate 3470 maintains the position of the bladder 3480 relative to the plate 3470.

The hinges 3456 and 3458 are formed by brackets secured to the plates that are engaged by a rod. For example, as shown in FIG. 136, hinge 3458 is formed by a bracket 3488 which is secured to intermediate plate 3472 and a bracket 3490 which is secured to lower plate 3478. The brackets 3488 and 3490 engage so that several in each bracket 3488 and 3490 align along the pivot axis 3462 so that a rod 3492 can be slid along the pivot axis 3462 to secure the bracket 3488 and 3490. The brackets 3488 and 3490 are movable relative to one another by pivoting on the rod 3492 relative to one another to change an angle between the intermediate plate 3472 and the lower plate 3478.

While the upper plate is always in contact with a lower surface 3494 of the mattress (see FIG. 133), depending on which of the bladders 3466, 3468, 3474, or 3476 is inflated, the mattress is rotated about either axis 3460 or 3462. The bladders 3466, 3468, 3474, or 3476 are each constructed of a urethane coated nylon weave that is ultrasonically welded to form a closed volume that is in communication with the flow control assembly 3436. Referring to FIG. 132, the flow control assembly 3436 includes solenoid actuated valves that open and close to either cause pressurized air from the pump 3434 to be directed to the respective bladder 3466, 3468, 3474, or 3476 or to cause the respective bladder 3466, 3468, 3474, or 3476 to be vented to atmosphere. Each bladder 3466, 3468, 3474, and 3476 also has an opening that is fluid communication with a line that communicates the fluid pressure in the bladder 3466, 3468, 3474, or 3476 back to a piezoelectric pressure sensor (not shown) that measures the pressure in the respective bladder 3466, 3468, 3474, or 3476. This pressure is used by the controller 3430 to determine an amount of inflation of the bladder 3466, 3468, 3474, or 3476. The pressure in the respective bladder 3466, 3468, 3474, or 3476 is indicative of the angle of pivoting of the respective plates 3472 and 78 about the respective axes 3460 and 3462.

Referring now the diagrammatic representation of FIG. 133, viewing the turn assembly 3426 from the head end 3496 of the hospital bed 10 3410, the upper plate 3470 overlies the upper bladder 3466 and lower bladder 3468. As shown in FIG. 131, the upper bladder is secured to the upper plate 3470 by the strap 3480. The lower bladder 3468 is secured to the intermediate plate 3472 in similar manner. The hinge 3456 is positioned lie along the patient's left side 3498 of the mattress and just below the lower surface 3484 of the mattress. Inflation of the bladders 3466 and 3468 causes the upper plate 3470 to pivot about the hinge 3456 so that the upper plate 3470 and mattress pivot about the axis 3460 to the patient's left. Thus, while the bladders 3466 and 3468 are positioned on the patient's right side of the hospital bed 10 3410, they are effectively left turn bladders as they cause the mattress and the patient to be turned to the left.

Similarly, the upper right turn bladder 3474 and the lower right turn bladder 3476 are positioned on the patient's left and positioned between the intermediate plate 3472 and the lower plate 3478. Inflation of the bladders 3474 and 3476 will cause the intermediate plate 3472, upper plate 3470, hinge 3456 and mattress to rotate to the patient's right as the intermediate plate 3472 pivots about the axis 3462.

In operation, a user will utilize the user interface 3432 to engage the turn assembly 3426 by choosing an option from a touchscreen menu or activating a hard-key on the user interface 3432 to cause the turn assembly 3426 to turn. In the illustrative embodiment, the input is a momentary input that requires the user to hold the input to cause the turn assembly 3426 to operate. For example, if a caregiver were to desire to turn a patient to the patient's left, the caregiver would push and hold a left turn input until the turn assembly 3426 effects the desired position of the caregiver. A second input is activated to lower the turn assembly 3426. Similar inputs are present for the right turn function as well. In other embodiments, the user/caregiver is able to input a desired amount of turn to be achieved and the controller 3430 operates the air system 3442 to automatically achieve the desired turn. In still other embodiments, the user/caregiver may be able to initiate a CLRT therapy routine to automatically and continuously operate the turn assembly 3426 to rotate the patient continuously.

Once the controller 3430 has received an input indicative of a desired turn, the controller 3430 determines which of the bladders 3466, 3468, 3474, and/or 3476 should be inflated. The controller 3430 operates the pump 3434 which is a blower that outputs relatively high pressure. The illustrative embodiment is part number AMP45-DC-ID available from Moog Components Group, 1213 North Main Street, Blacksburg, Virginia and develops an output pressure of up to 103.0 cm-H2O. Other embodiments may utilize a compressor or other source of pressurized air. The flow from the pump 3434 is transmitted through a conduit 3498 to the flow control assembly 3436. The flow control assembly 3436 is a manifold with a number of solenoid controlled valves (not shown) that control the flow from the pump 3434 through one of four conduits 3500, 3502, 3504, and 3506 to the four bladders 3466, 3468, 3474, and 3476 respectively. The valves of the flow control assembly 3436 are operated by the controller 3430. In addition, the valves may be operated to permit the air in the bladders 3466, 3468, 3474, or 3476 to be vented to atmosphere to deflate the bladders 3466, 3468, 3474, or 3476. In other embodiments, the flow control assembly 3436 may be operable to reverse the flow through the pump 3434 such that the air in the bladders 3466, 3468, 3474, or 3476 is vacuumed from the bladders 3466, 3468, 3474, or 3476 to quickly lower the turn assembly 3426.

The pressure in each of the bladders 3466, 3468, 3474, and 3476 is independently monitored by a respective dedicated piezoelectric pressure sensor in the sensor assembly 3428. The pressure is measured distally to reduce the potential for pressure spikes. There are four conduits 3508, 3510, 3512, and 3514 which are each respectively associated with the bladders 3466, 3468, 3474, and 3476. The conduits 3508, 3510, 3512, and 3514 are in fluid communication with the respective bladders 3466, 3468, 3474, and 3476 so that the pressure in the bladders 3466, 3468, 3474, and 3476 is transferred through the conduits 3508, 3510, 3512, and 3514 to the respective sensors. By measuring the pressure in each of the bladders 3466, 3468, 3474, and 3476, the amount of rotation of the turn assembly 3426 can be determined. In other embodiments, additional sensors may be utilized to measure rotation. For example, a potentiometer could be connected between hinge components to determine the amount of rotation. In still other embodiments, an accelerometer could be mounted on upper plate 3470 to measure the amount of rotation.

As shown in FIG. 134, when fully inflated, bladders 3466 and 3468 affect 30° of rotation. It should be understood that individual inflation of each of the bladders 3466, 3468, 3474, and 3476 may allow various orientations of rotation to be achieved. In addition, inflation of all of the bladders 3466, 3468, 3474, and 3476 could cause the mattress to be raised if so desired. The bladders 3466, 3468, 3474, and 3476 are individually inflatable so that the rate of rotation can be controlled and to control the interface between the bladders 3466 and 3468 or 3474 and 3476. For example, in FIG. 135 it can be seen that bladder 3474 is inflated to a greater degree than bladder 3476 to reduce the engaged surface between the bladders. It should be noted that the bladder pairs 3466, 3468 and 3474, 3476 are not interconnected and are therefore moveable relative to each other during operation of the turn assembly 3426. This reduces the chances for damage to the bladders 3466, 3468, 3474, and 3476 that might occur if the turn assembly 3426 was loaded in an unexpected manner.

A further benefit of the stacked bladder approach disclosed herein is that the bladders 3466, 3468, 3474, and 3476, being smaller than prior art arrangements for turning bladders, are able to facilitate larger turn angles more quickly and with less air than prior art arrangements. In testing, rotation angles of up to 50° have been achieved with average rotation rates of 1° per second. It should be noted that the bladders 3466 and 3468 are spaced apart from the hinge 3458 by a distance 3514 such that a triangular space 3516 is formed between the bladders 3466 and 3468, the intermediate plate 3472 and the upper plate 3470. Similarly, bladders 3474 and 3476 are spaced apart from hinge 3456 by a distance 3518 such that a triangular space 3520 is formed between the bladders 3474 and 3476 and the intermediate plate 3472 and lower plate 3478.

The bottom cover 2028 is further formed to include an opening 2088 formed in the sheet 2086. The opening 2088 communicates with fabric tube 2090 through which various tubes and lines are routed from the mattress 1900 to an air control box 2200 (see FIG. 30). For example the inlet tube 2018 that feeds the microclimate management structure 1906 is routed through the opening 2088 and the fabric tube 2090. A head zone supply tube 2092 is fed through the opening 2088 and the fabric tube 2090 with an end of the head zone supply tube 2092 being coupled to a port 2094 on the bottom of the layer 1914 of the body support 1902. A seat support tube 2096 attaches to a port 2098 on the bottom of the lower layer 1914 and is fed through the opening 2088 and fabric tube 2090. A sense tube 2100 is coupled to a port 2102 on the bottom side 1980 of the upper layer 1912. The sense tube 2100 provides a pathway for a pressure transducer to sense the pressure in the head zone 1916. The foot sense tube 2104 is coupled to a port 2106 which is also on the bottom 1980 of the upper layer 1912. Similarly, a right turn bladders supply tube 2110 includes connectors 2112 and 2114 which connect to the bladder assemblies 2068 and 2036, respectively. A right turn bladder sense tube 2116 couples to the bladder assembly 2036 provide a source for pressure transducer to sense the pressure in the turn bladder assemblies 2036 and 2068. A left turn bladders supply tube 2118 includes a connector 2120 in the connector 2122 which connect to the bladder assemblies 2066 and 2034, respectively. A left turn sense tube 2124 connects to the bladder assembly 2034 to provide a source for sensing the pressure in the bladder assemblies 2066 and 2034. Each of the tubes 2110, 2116, 2118, and 2124 also are fed through the opening 2088 and through the fabric tube 2090.

The mattress 1900 is secured to the head deck 28 and foot deck 34 of the hospital bed 10 by the interaction of four locking knobs 2126 with slots 2128, 2130 formed in the foot deck 34 and slots 2132 and 2134 formed in the head deck 28. Each of the slots is key-hole shaped with a round opening 2136 and a slot 2138. The locking knobs 2126 are each positioned through the round opening 2136 and slid into the slot 2138 to secure the respective knob 2126 to the respective deck 28, 34. The knobs 2126 at the foot end 12 are secured by fasteners 2140 and washers 2142 which are positioned on the sheet 2086 of the bottom cover 2080. At the head end 14, a plate 2144 is positioned on a bottom surface 2146 of the bottom cover 2080 and the locking knobs 2126 are secured to the plate 2144.

Figure 79:
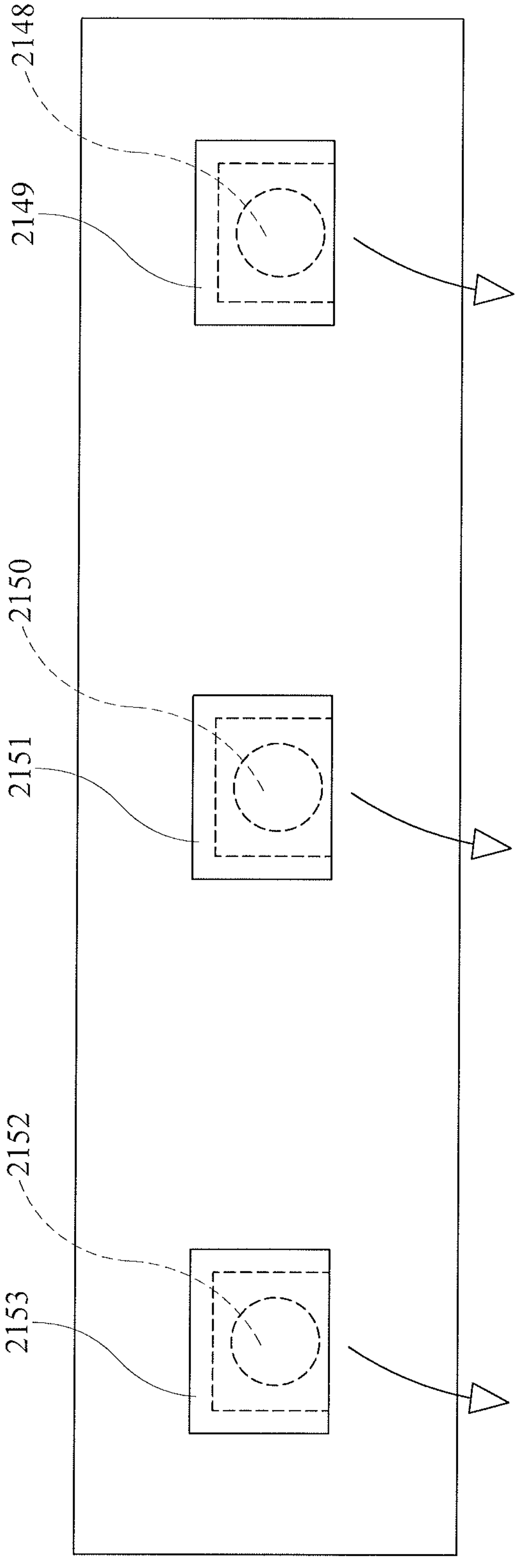
FIG. 79 is a diagrammatic view of the head end of the lower cover of the mattress of FIG. 40.

The bottom cover 2080 includes three openings 2148, 2150, 2152 which permit its air that is exhausted through the exhaust region 2012 of the microclimate management structure 1906 to escape through the head end 14 of the mattress 1900. The openings 2148, 2150, and 2152 are each covered on the exterior by a respective flap 2149, 2151, 2153 (seen in FIG. 79) which is RF welded over the opening on the sides and top such that only the open bottom provides a path for the flow of air out of the lower cover 2080. The mattress 1900 also includes an upper cover 2154 which is zippered to the lower cover 2080 enclosing the various components of the mattress 1900 therein. A fire barrier 2156 encloses all of the components other than the lower cover 2080 and the upper cover 2154 when the mattress 1900 is assembled.

In addition, mattress 1900 includes a pair of posts 2160, 2162 that extend through a bottom surface 2146 of the cover 2080 and engage the lower plate 2070 of the Z-plate assembly 2064. The posts 2160, 2162 are cylindrical and extend downwardly from the surface 2146 to engage the fixed seat deck 32 at the points 2164 and 2166 indicated on FIG. 8. The posts 2160, 2162 are free to float between the fixed seat deck 32 and head deck 28 as the head deck 28, articulated seat deck 30, and foot deck 34 each move relative to the load frame 26. During extension of the foot deck 34, the posts 2160, 2162 engaged the fixed seat deck 32 to resist movement of the mattress 1900 toward the foot end 12 of the hospital bed 10.

Figure 31:
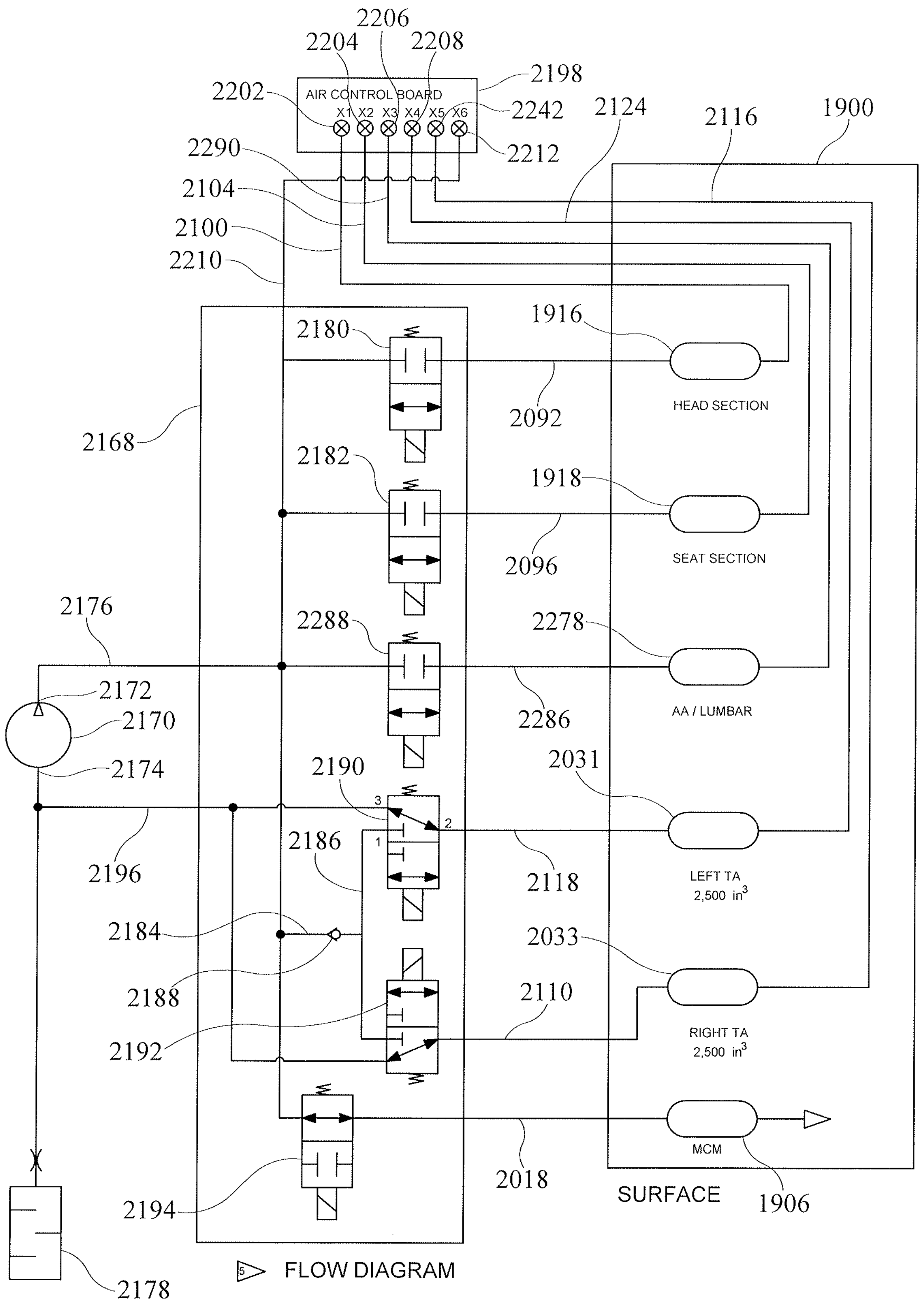
FIG. 31 is a schematic diagram of the pneumatics of the airbox assembly of FIG. 30.

As shown in FIG. 31, a diagrammatic representation of the pneumatic portion of the airbox 2200 includes a manifold 2168 in a fluid communication with a blower 2170, the blower having a positive pressure outlet 2172 and a negative pressure inlet 2174. In addition, the airbox 2200 includes a filter 2178 through which air is drawn to the negative pressure inlet 2174. The positive pressure outlet 2172 feeds a conduit 2176. The conduit 2176 feeds a first valve 2180 that controls flow to and from the head zone 1916 of the body support 1902 through the supply tube 2092. A second valve 2182 controls the flow to and from the seat zone 1918 through the supply tube 2096. Both of the valves 2180 and 2182 are movable between an opened and a closed position to connect the respective zones 1916 and 1918 to the conduit 2176 as necessary. The conduit 2176 also feeds a tap 2184 that is connected to a conduit 2186 through a check valve 2188. When the pressure in the conduit 2176 is of sufficient pressure to overcome the check valve 2188, the check valve 2188 will open and allow flow to the conduit 2186 which feeds two valves 2190, associated with the left turn zone 2031, and 2192, associated with right turn zone 2033. In addition, conduit 2176 is connected to a valve 2194 which is associated with the microclimate management structure 1906. Another conduit 2196 is connected to a second port on each of the turn valves 2190, 2192 and is connected to the inlet 2174 of the blower 2170. As will be described in further detail, each of the zones 1916, 1918, 2031, 2033 may be exhausted through the valve 2194, with the turn zones 2031, 2033 being subjected to a rapid evacuation through the use of the negative pressure inlet 2174 of the blower 2170 to draw air from the zones 2031, 2033 through the respective valves 2190, 2192.

The zones 1916, 1918 may be vented through the valve 2194 and microclimate management structure 1906 if the blower 2170 is idle such that the pressure in the conduit 2176 is lower than the pressure in the zones 1916 and 1918. Opening of the valve 2194 permits air from the zones 1916 and 1919 to flow through the conduit 2176 through the valve 2194 and inlet tube 2018 to escape through the microclimate management structure 1906.

Venting of the turn zones 2031, 2033 utilizes the three-way valve structure of valves 2190, 2192 to connect the respective feed tubes 2116 or 2110 to the conduit 2196 so that the inlet side of the blower 2170 pulls air through the conduits 2116, 2110 into the conduit 2196 and, thereby, the inlet 2174 of the blower 2170. In certain conditions, the valves 2190 or 2192 may be positioned to allow air to be drawn from the respective zone 2031 or 2033 into the inlet 2174 of the blower 2170 and fed to one of the other zones 1916 or 1918. However, if no flow is needed to either the zones 1916 or 1918, the flow from the turn zones 2031 or 2033 is simply exhausted through the valve 2194 to the microclimate management structure 1906. Under certain conditions, the pressure in the turn zones 2031, 2033 may exceed the pressure in another zone, such as the other turn zone 2031 or 2033, or the head zone 1916 or seat zone 1918. This may be a result of the weight of a patient and the leverage provided by the Z-plate assemblies 2044 and 2064 to urge their out of the bladder assemblies 2036, 2034, 2066, or 2068. To protect against damage to the body support 1902, both the head zone 1916 and seat zone 1918 include a respective check valve 2095 and 2099 positioned on a bottom surface 2097 of the lower layer 1914. The check valves 2095, 2099 open at a relief pressure that is higher than the maximum operating pressure of the body support 1902, but lower than the pressure which components of the body support 1902 would fail due to excessive pressure. While the turn zones operate at pressures higher than the typical operating pressures of the body support 1902, the presence of the check valves 2095, 2099 mitigate the potential for a damaging overpressure condition to occur if the turn zones are vented through the microclimate management system 1906 and the flow is constricted sufficiently to cause an overpressure condition in the body support 1902.

An air control board 2198 positioned in the air control box 2200 (seen in FIG. 30) includes logic that is operable to take pressure readings from the manifold 2168 or any one of the zones 1916, 1918, 2031, or 2033 to determine which of the valves 2180, 2182, 2190, 2192, or 2194 to open or adjust to achieve the flow necessary to meet the operational requirements of the mattress 1900. As described above, the head zone 1916 is connected to a sense tube 2100 which connects to a pressure sensor 2202, the pressure sensor 2202 providing a signal to the logic of the air control board 2198 indicative of the pressure in the head zone 1916. Similarly, the sense line 2096 is connected to a pressure transducer 2204 which provides a signal to the logic indicative of the pressure in the seat zone 1918. The sense tube 2116 provides a signal to a pressure transducer 2206 indicative of the pressure in the right turn zone 2033 and the sense tube 2124 is connected to a pressure transducer 2208 for determining the pressure in the left turn zone 2031. The conduit 2176 is coupled to a sense line 2210 that is also connected to a pressure transducer 2212, the pressure transducer 2212 providing the logic a signal indicative of the pressure in the conduit 2176.

Figure 30:
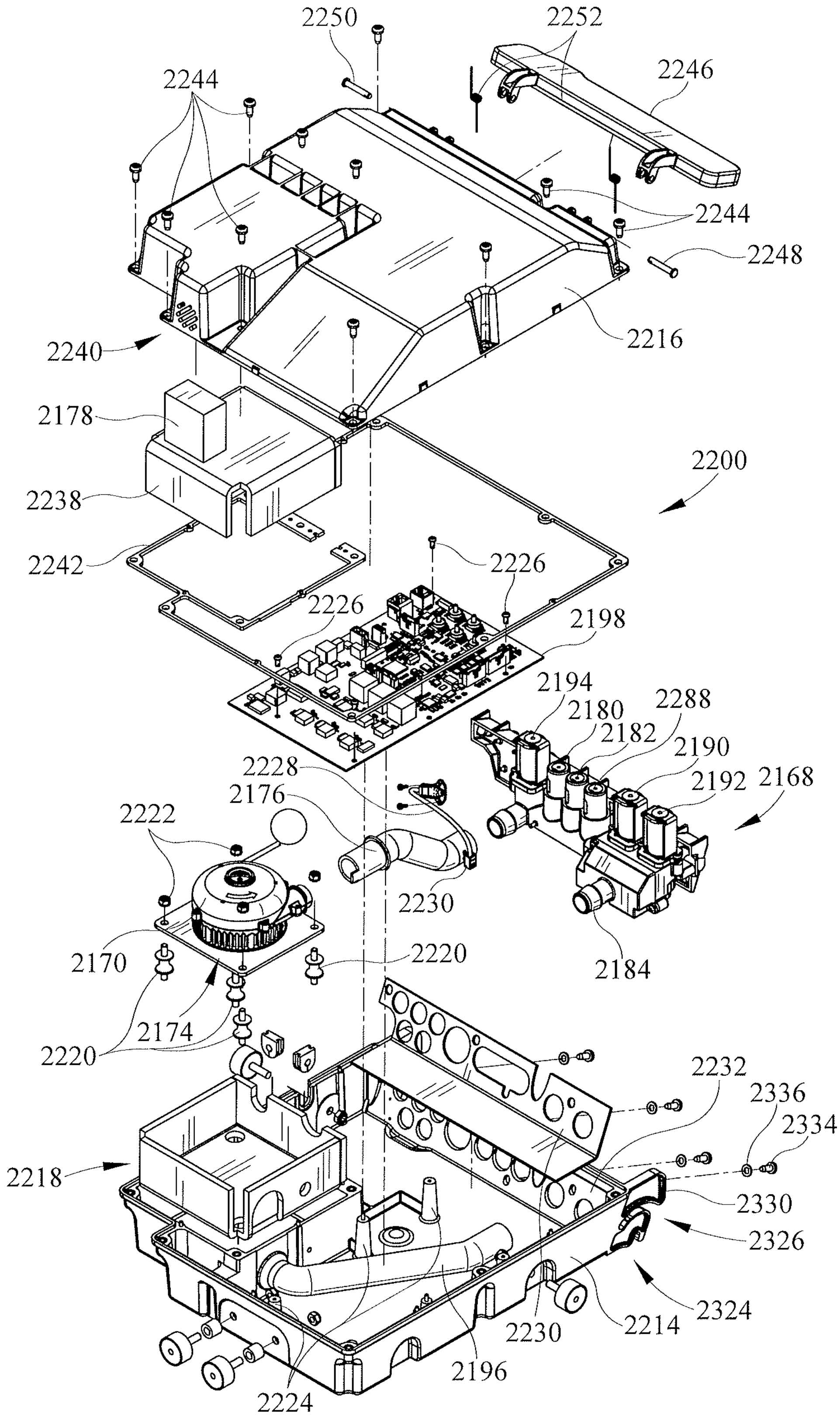
FIG. 30 is an exploded assembly view of an airbox assembly having a pneumatic control system for operating a pneumatic mattress.

As shown in FIG. 30, the airbox 2200 includes an upper enclosure 2214 which supports the blower 2170, manifold 2168, and air board 2198. A cover 2216 is secured to the upper enclosure 2214 to encase the components of the airbox 2200. The blower 2170 includes the inlet 2174 and the outlet 2172 which feeds the conduit 2176. The blower 2170 is supported in a frame 2218 on a number of isolation mounts 2200 which are secured to the blower by nuts 2222. The control board 2198 is mounted on a number of standoffs 2224 and secured by screws 2226. A cable assembly 2228 includes a Hall-effect sensor 2230 which is positioned to detect the connection of a connector for the tubes of the mattress 1900 as will be discussed in further detail below. A gasket 2231 is positioned between an outlet panel 2232 and the manifold 2168 to form a seal between various ports of the manifold 2168 and the panel 2232. The manifold 2168 is secured to the panel by a number of screws 2234 and washers 2236. The filter 2178 is mounted on a frame cover 2238 which overlies the frame 2218 supporting the blower 2170. While shown with the cover 2216 at the top of FIG. 30, when installed the upper enclosure 2214 is positioned just below the panel 772 of first portion 36 of foot deck 34 and the cover 2216 is vertically below the upper enclosure 2214.

When the valves 2190 and 2192 are closed, air is drawn through the filter 2178 into the space defined by the frame 2218 and frame cover 2238 and fed to the blower 2170. The cover 2216 is formed to include a vent 2240 through which ambient air is drawn into the filter 2178. Gasket 2242 is positioned between the cover 2216 and the upper enclosure 2214 provides an airtight seal for the interior space of the airbox 2200. The cover 2216 is secured to the base by a number of screws 2244. The port cover 2246 is pivotably coupled to the cover 2216 by pins 2248 and 2250. A pair of springs 2252 bias the cover 2246 to a closed position which overlies the ports on the manifold 2186 that extend through the panel 2232 to prevent ingress of any debris when the airbox 2200 is not in use. The spring-loaded cover 2246 may be opened to engage with the connector secured to the end of the fabric tube 2090 which engages the ports of the manifold 2168 to secure the tubes from the mattress 1900 to the manifold 2168.

Figure 42:
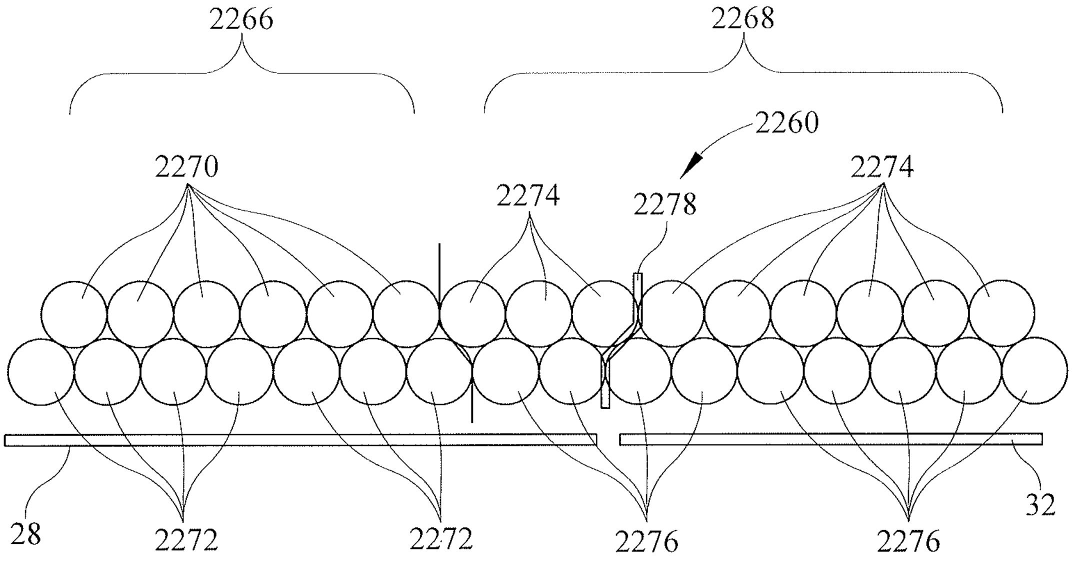
FIG. 42 is diagrammatic representation of a portion of an alternate structure of a body support of the patient support surface of FIG. 40.
Figure 43:
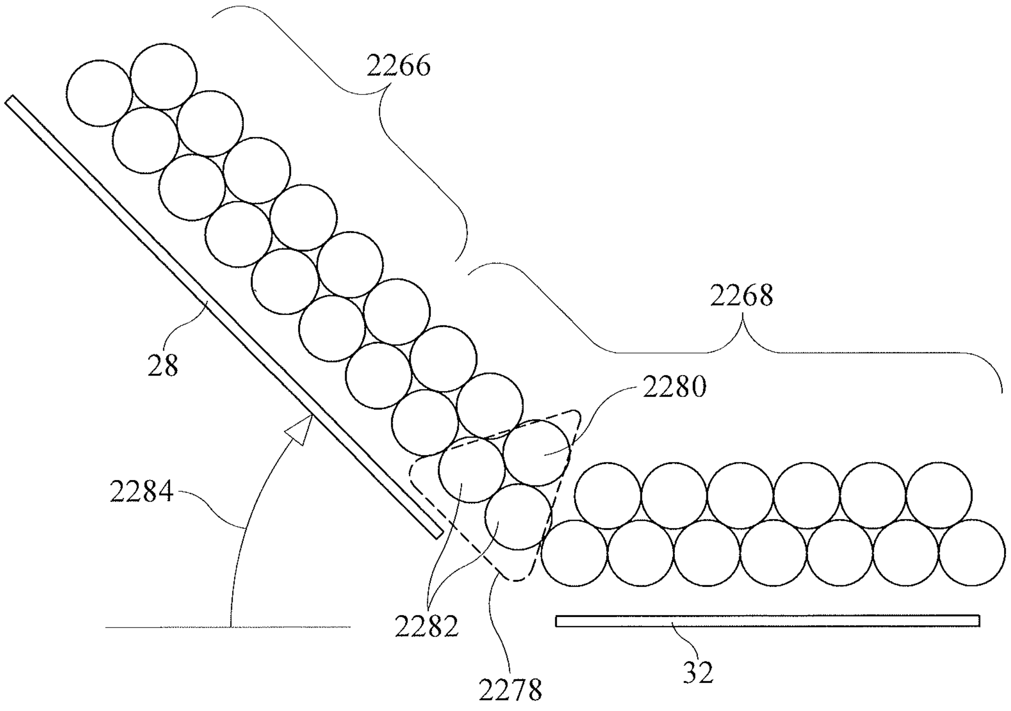
FIG. 43 is a diagrammatic representation of the structure of FIG. 42 with a head section of the underlying patient support apparatus in a raised position and the body support having additional structures inflated to accommodate the inclination of the head section.

In some embodiments, the body support 1902 is omitted and an alternative embodiment 2260 shown in FIGS. 42-43 is used. The body support 2260 includes an upper layer 2262 and a lower layer 2264. The layers 2262, 2264 are divided into a head zone 2266 and a thigh zone 2268. The upper layer 2262 of the head zone includes a number of chambers 2270 while the lower layer 2264 of the head's end 2266 has a number of chambers 2272. The upper layer 2262 of the thigh zone 2268 comprises a number of chambers 2274 while the lower layer 2264 of the thigh zone includes a number of chambers 2276. The body support 2260 includes an additional lumbar zone 2278 which is positioned in the thigh zone 2268 and includes a single chamber 2280 in the upper layer 2262 and two chambers 2282, 2282 positioned in the lower layer 2264. The lumbar zone 2278 is inflated as the head deck 28 is articulated upwardly as indicated by the arrow 2284 to allow the body support 2260 to expand due to the articulation of the head deck 28. The chambers 2280 and 2282 are inflated in proportion to the angle of the head deck 28 to fill a space that is created when the head deck 28 moves away from the fixed seat deck 32. Referring again now to FIGS. 30-31, the zone 2278 is fed by a tube 2286 from a valve 2288 which is connected to the conduit 2176. A sense line 2290 connects the zone 2278 to a pressure transducer 2292 on the air can control board 2198. The valve 2288 functions similarly to the valves 2180 and 2182 and under the control of the air control board 2198 is operated to inflate the zone 2278 as necessary.

Figure 44:
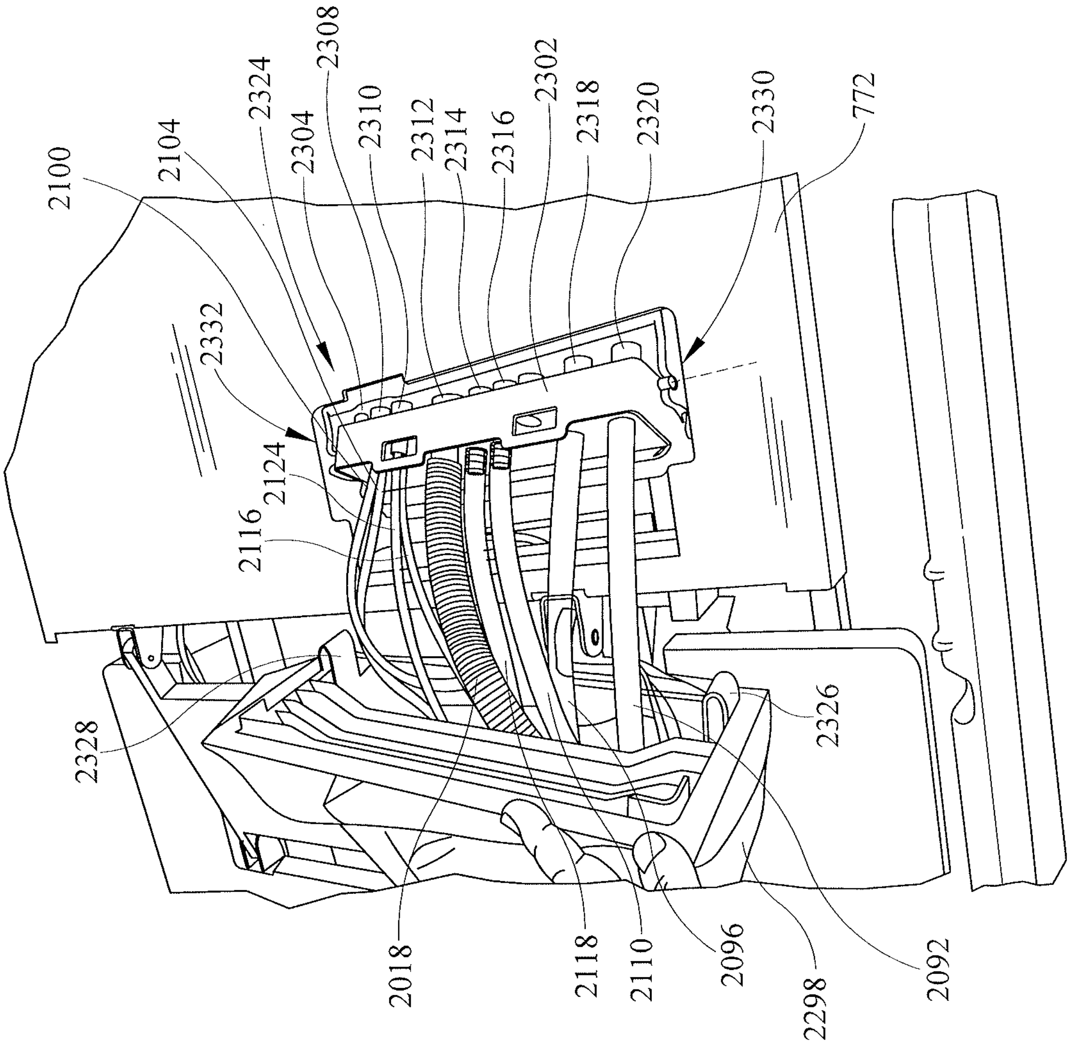
FIG. 44 is a perspective view of a connector assembly of the patient support surface of FIG. 40 being connected to the airbox of FIG. 30.

As shown in FIG. 44, the airbox 2200 is secured to the first portion 36 of the foot deck 34 such that the panel 2232 is positioned just below the surface 772 which has an opening 2294 which provides access to the airbox 2200 from above the panel 772.

Figure 45A:
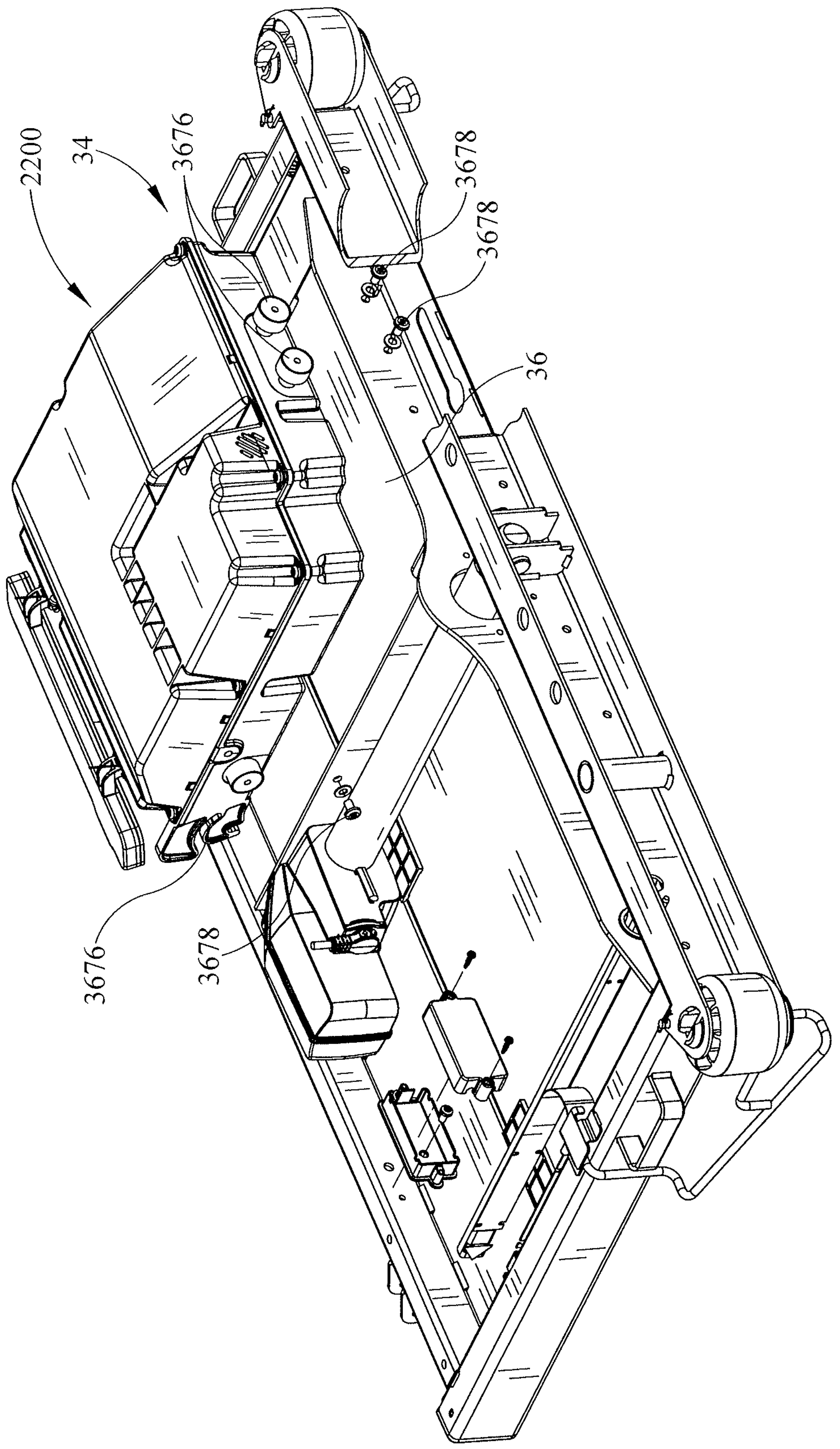
FIGS. 45A-45C are exploded assembly views showing the assembly of the airbox of FIG. 30 to the lower side of a foot deck of a patient support apparatus.
Figure 45B:
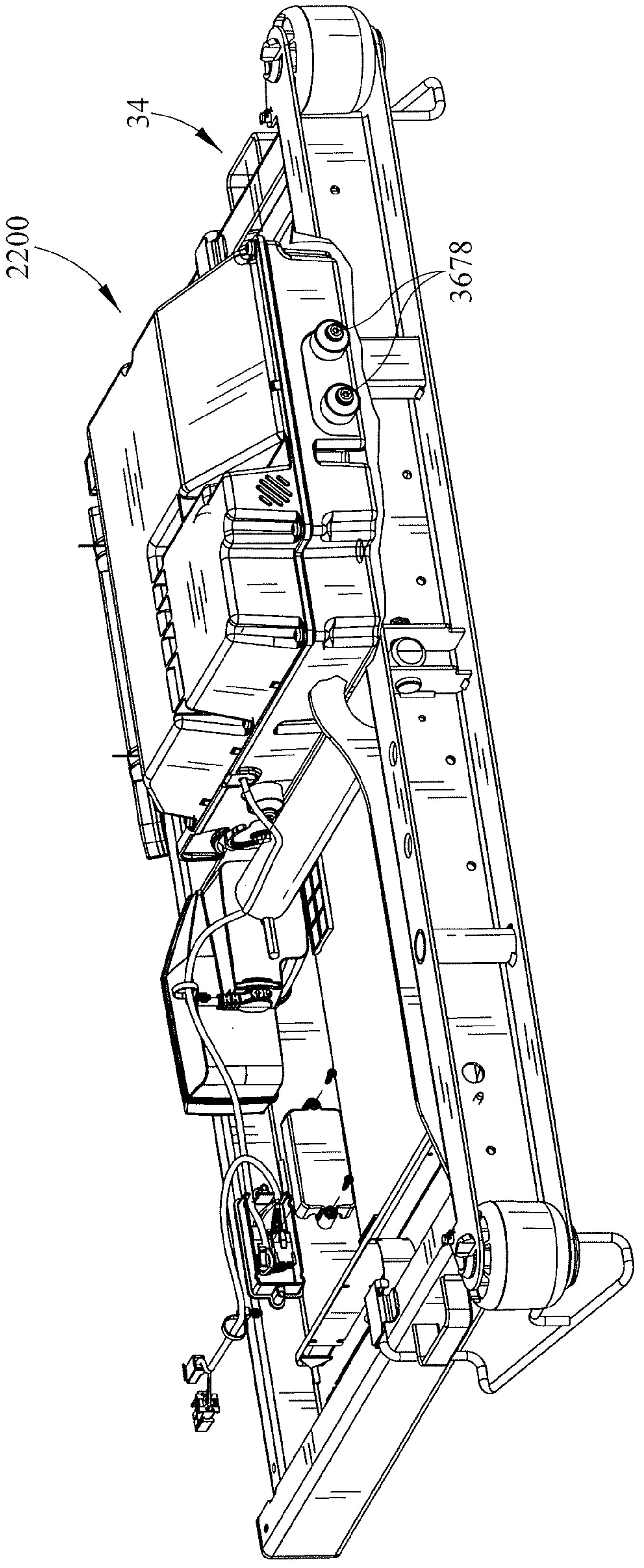
Figure 45C:
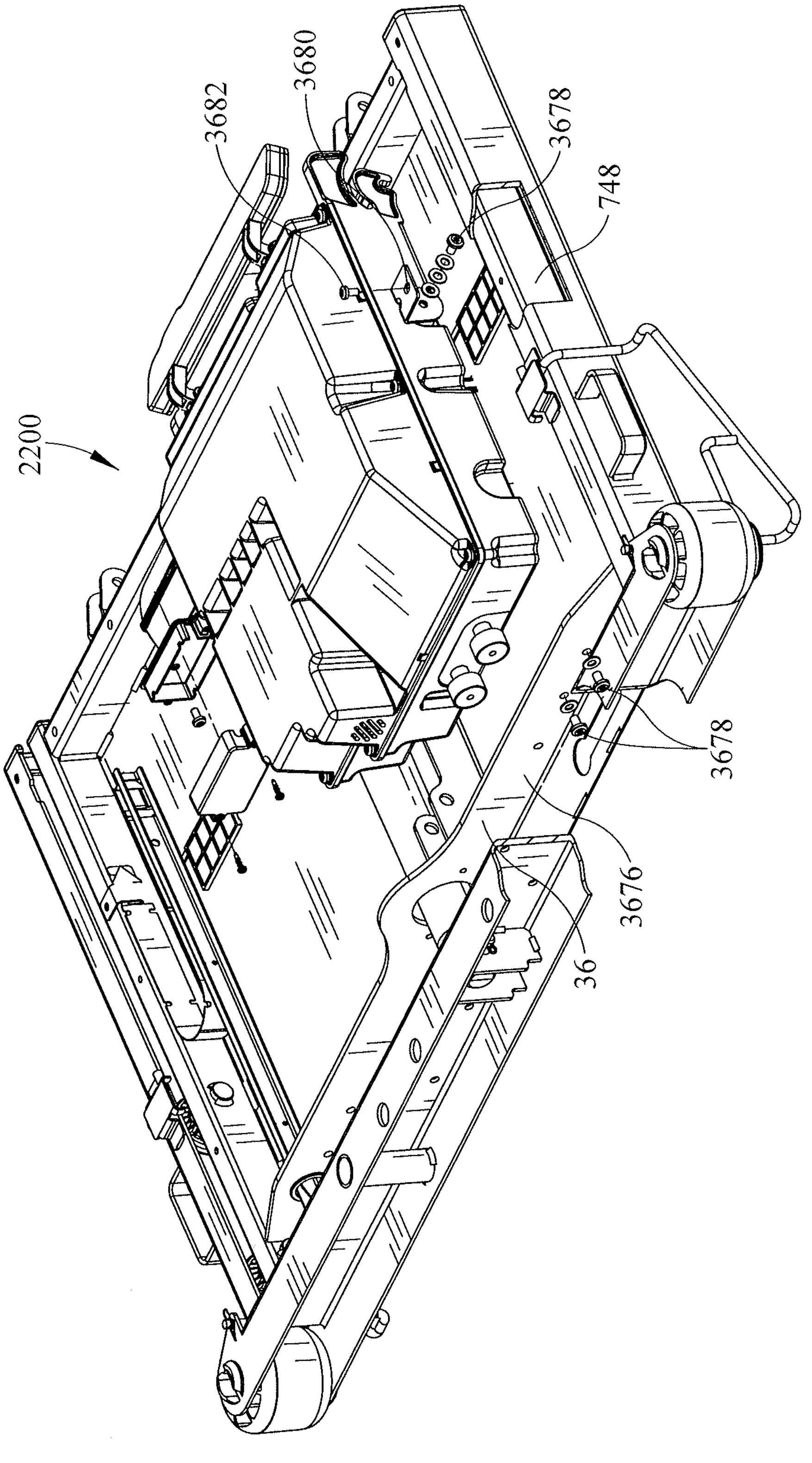

The air control box 2200 is mounted to the first portion 36 of the foot deck 34 so that the ports of the manifold 2168 are accessible through the hole 2324 in the pan 772 as shown in FIG. 44. FIGS. 45A-45C shows that the airbox 2200 is suspended from the first portion 36 by isolators 3676 which are secured by fasteners 3678. Referring to FIG. 45C and isolator 3676 is not visible in the right side of the figure, but the fasteners 3678 secure an L-bracket 3682 the isolator and the L-bracket is secured to the rail 748 of the first portion 36 by a fastener 3682. The structure of the mounting of the airbox 2200 to the first portion 36 utilizes a fully mechanically isolated arrangement such that any vibration induced in the components in the airbox 2200 is not transferred to the foot deck 34.

When the airbox 2200 is not present, a cover 2296 (seen in FIG. 16) is positioned in the opening 2294 and retained by a snap fit to provide a generally continuous surface across the panel 772. In the embodiment of FIG. 44, a cover 2298 is positionable over the opening 2294 to provide support to the foot support 1714. The cover 2298 has a number of lateral ribs 2300 which span a width of the cover 2298 and provide strength to support the foot support 1714. The cover 2298 has an aperture formed there through which permits a connector 2302 to pass through the cover 2298 and engages the ports of the manifold 2168 that extend through the panel 2232. The fabric tube 2090 is secured to the cover 2298 with the various tubes extending through the fabric tube 2090 and secured to barbs connectors on the connector 2302. In the illustrative embodiment of FIG. 44, the lumbar zone 2278 is not present so the associated tubes 2290 and 2286 are not present. However, the sense lines 2096, 2100, 2116, and 2124 are secured to the connector 2232 and engage respective ports 2304, 2306 (not shown), 2308, and 2310 that extend from the panel 2232. The tube 2018 connects to the connector 2302 such that engages the port 2312 of the manifold 2168. The head zone supply tube 2092 and foot zone supply tube 2096 are also secured to the connector 2302 and communicate to ports 2314 and 2316, respectively, of the manifold 2168. A left turn zone supply tube 2116 and right turn zone supply tube 2110 are also both connected to connector 2302 and connected to ports 2318 and 2320, respectively.

To connect the connector 2302 to the airbox 2200, the pivotable cover 2246 is pivoted downwardly on the pins 2248, 2250. The connector 2302 has a pin 2322 that extends from both of the sides of the connector and defines a rotational axis 2324. Each of the pins 2322 are positioned in a slot 2324 formed in a tab 2326 that extends from the upper enclosure 2214. When the pins 2322 are positioned in the slot 2324, the connector 2302 is pivoted about the axis 2324 such that another set of pins (not shown) engage a slot 2328 formed between the tab 2326 and another tab 2330, the pins being guided in the slot 2328 to guide connectors (not shown) into engagement with the ports 2304, 2308, 2310, 2312, 2314, 2316, 2318, 2320 of the manifold 2168. Once engaged, the friction between the connectors and the respective ports retains the connector 2302 in place with movement restricted by engagement of the pins with the slot 2328. Once the connector 23 is secured to the ports of the manifold 2168, the cover 2298 is positioned such that two biased tabs 2326 and 2328 are positioned in respective gaps 2330 and 2332 between the tabs 2324 and the panel 772 as defined by the opening 2294. The tabs 2326 and 2328 frictionally retain the cover in place with an interference fit in the gaps 2330 and 2332.

The microclimate management system 1906 includes a spacer material positioned between two cover layers. A suitable spacer material is a part number SFE 20 N 200 from Pressless. A suitable upper material is a part number CFX-45 from Carr NA. A suitable lower material is Recovery 5 HF from Ventex, Inc.

Figure 119:
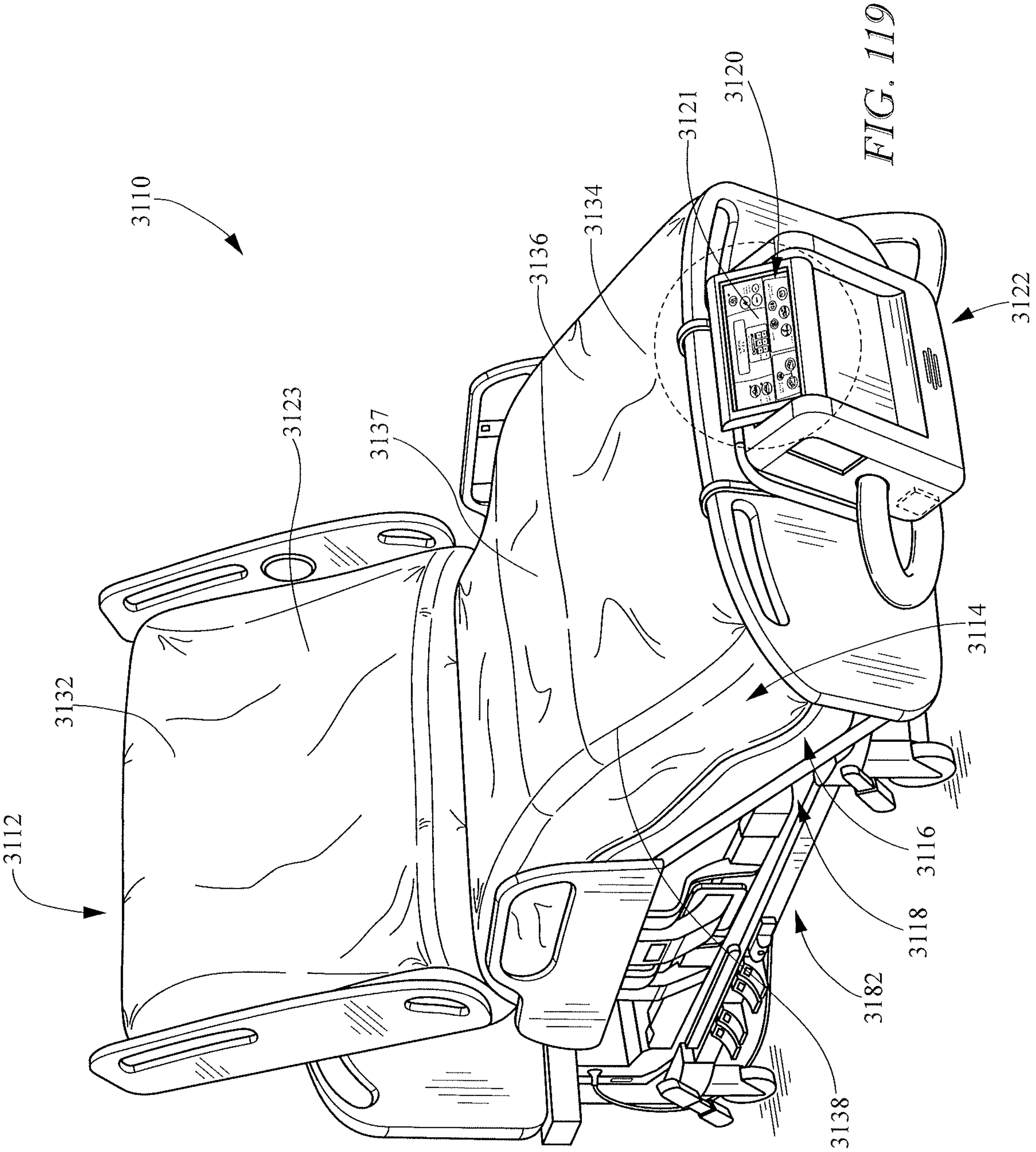

In other embodiments, a patient support surface may have other embodiments of a microclimate management system. For example, an illustrative patient support apparatus 3110 embodied as a hospital bed 10 is shown in FIG. 119. The patient support apparatus 3110 includes a frame 3118, a patient support structure 3112 supported on the frame 3118, and an air box 3122. The patient support structure 3112 is adapted to support a patient lying on the patient support apparatus 3110 and includes a head section 3132, a seat section 3137, and a foot section 3134. As will be discussed in further detail below, the patient support structure 3112 further includes a microclimate structure 3114 and a cushion layer 3116 which supports the microclimate structure 3114 as shown in FIG. 126. The cushion layer 3116 may include a plurality of inflatable support bladders 3148. The microclimate structure 3114 is positioned on the cushion layer 3116 on an occupant side and adjacent a support surface 3123 and is configured to conduct air adjacent the support surface 3123 of the patient support structure 3112. The air conducted by the microclimate structure 3114 is pressurized and pushed through the microclimate structure 3114 by the air box 3122. By conducting air along an interface of the support surface 3123 and the patient, the microclimate structure 3114 transfers heat and moisture from the patient and cools and dries the patient's skin in order to reduce the risk of hospital bed 10 sore formation by the patient.

Referring again to FIG. 119, the air box 3122 further includes a user interface 3160 that is configured to receive user inputs. The user interface 3160 includes a display screen 3121 and a plurality of buttons 3120 for inputting patient information and for controlling operation of the air box 3122 and the support surface 3123. Particularly, the user interface 3160 allows a user to adjust the flow of air provided by the air box 3122 to the microclimate structure 3114 and, in some embodiments, to adjust the temperature of air provided by the air box 3122 to the microclimate structure 3114. Specifically, in some embodiments, the user interface 3160 may include a patient information input panel, an alarm panel, a lateral rotation therapy panel, an inflation mode panel, a normal inflation control panel, and a microclimate control panel.

The microclimate structure 3114 is configured to receive pressurized air from the air box 3122 and to conduct air through the microclimate structure 3114 to cool and dry the interface between a patient and the patient support apparatus 3110 to promote skin health by removing patient heat and moisture along the interface when the patient is supported on the patient support apparatus 3110. The microclimate structure 3114 generally spans laterally from a left side 36 to a right side 3138 and extends longitudinally from an upper end of the head section 3132 to a lower end 3180 of the seat section 3137, excluding the foot section 3134 of the patient support structure 3112 as shown in FIG. 125. However, in some embodiments, the microclimate structure 3114 may include the foot section 3134 and extend from the upper end of the head section 3132 to the bottom end of the foot section 3134 of the patient support structure 3112 as shown in FIG. 124.

Figure 120:
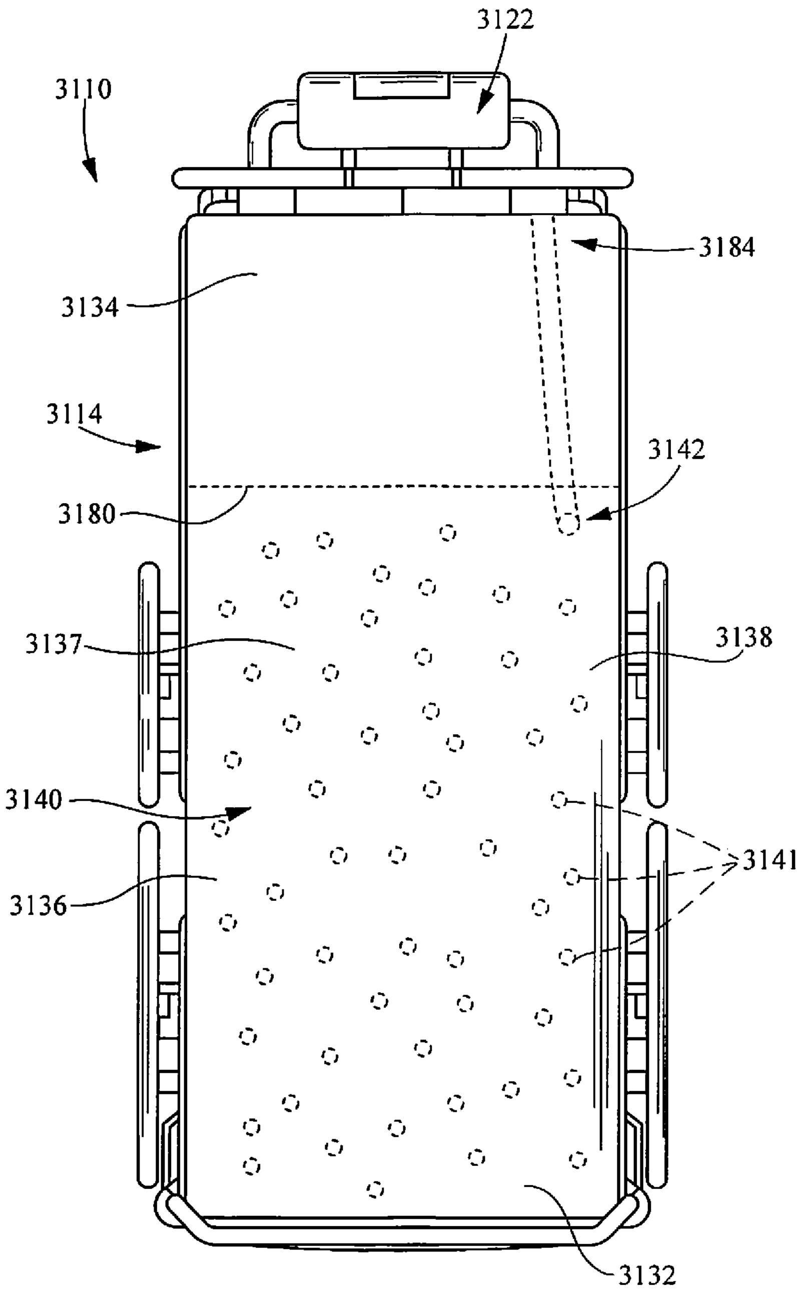

Referring to FIG. 120, in one embodiment, the microclimate structure 3114 further includes a therapeutic region 3140 which is specifically configured to target specific areas of the patient's body where local climate control is most needed. This corresponds to the areas where the pressure of patient's weight against the support surface 3123 is the greatest when the patient is lying supine and centered on the microclimate structure 3114. The therapeutic region 3140 may be made from a highly breathable material or a perforated material, as will described in more detail below.

Figure 121:
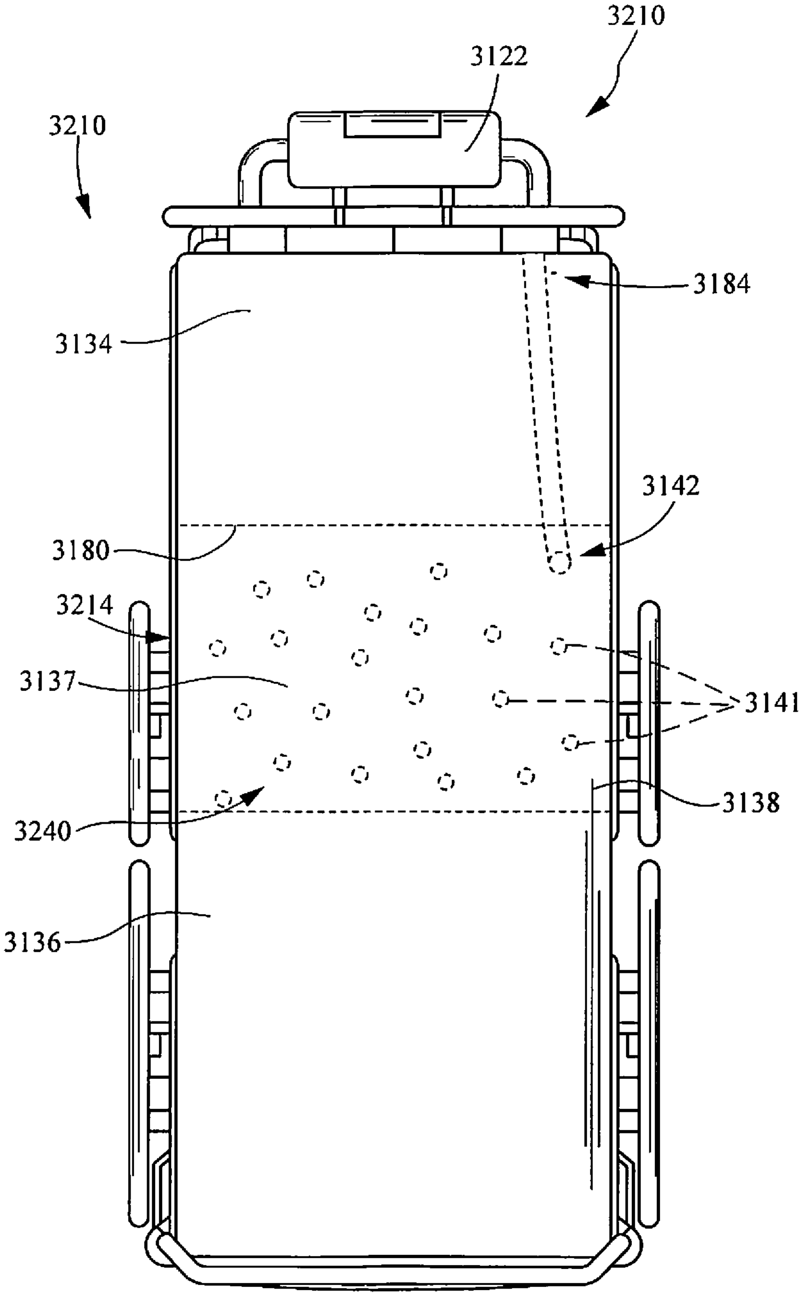

As shown in FIGS. 120-122, embodiments of microclimate structure 3114, 3214, and 3314 may have respective therapeutic regions 3140, 3240, and 3340 having different shapes. Because the patient's sweat glands are distributed non-uniformly throughout the patient's body, perspiration tends to accumulate on the skin of the patient's torso and pelvic region. Therefore, the shape of the therapeutic region 3340 is designed to provide a local climate control to those areas that are generally prone to moisture accumulation, whereas therapeutic regions 3140 and 3240 are more broadly distributed.

The therapeutic region 3140 is in the head section 3132 and seat section 3137 of the patient support structure 3112 as shown in FIG. 120. The large therapeutic region 3140 ensures to underlie the patient's torso and pelvic region. Alternatively, in some embodiments, the therapeutic region 3140 is smaller and more narrowly tailored to the patient's specific region. By reducing the area of the therapeutic region 3140 through which the air box 3122 is required to push air, the microclimate structure 3114 allows for reduction of the pressure and flow needed from an air source included in the air box 3122. For example, as shown in FIG. 121, a patient support apparatus 3210 includes a microclimate structure 3214 having the therapeutic region 3240 that extends from the patient's waist line to the inferior end of the patient's pelvic region and spans laterally across the microclimate structure 3214 from its right side its left side. The therapeutic region 3240 is designed to underlie the patient's pelvic region, particularly under the sacrum.

In another embodiment, the therapeutic region 3340 is further arranged to underlie both the patient's pelvic region and the torso region. As shown in FIGS. 122 and 123, a patient support apparatus 3310 includes a microclimate structure 3314 with a therapeutic region 3340 that generally extends from a superior end of the patient's torso region to an inferior end of the patient's pelvic region to deliver effective climate control to the patient's pelvic region, particularly under the sacrum, and the torso region, particularly under the scapulae, of a patient when the patient is lying supine and centered on the microclimate structure 3314. The shape and size of the therapeutic region 3340 is designed to cover approximately 95% of the patients' different body sizes so that the patients' torso and pelvic regions would lay on top of the therapeutic region 3340 in order to reduce the risk of hospital bed 10 sore formation.

In each embodiment of microclimate structures 3114, 3214, and 3314, a fluid flow path having an inlet port 3142 spans laterally across the respective microclimate structures 3114, 3214, and 3314 from its right side to its left side and extends longitudinally through the microclimate structures 3114, 3214, and 3314 to the head section 3132 of the patient support structures 3112, 3212, and 3312. The inlet port 3142 is directly coupled to the air box 3122 via a distribution sleeve 3194 and is located at the lower end 3180 of the seat section 3137 of the patient support structures 3112, 3212, and 3312. Thus, air from the air box 3122 is introduced into the microclimate structures 3114, 3214, and 3314 at the origination point or inlet port 3142 near the pelvic region of the patient lying on the microclimate structures 3114, 3214, and 3314. By directing the location of air introduction from the air box 3122 closer to the therapeutic regions 3140, 3240, or 3340, the respective microclimate structures 3114, 3214, or 3314 will provide an effective amount of cooling and drying to a patient's skin at the specific targeted areas, and achieve the effective result with minimal air. Having the inlet port 3142 near the therapeutic regions 3140, 3240, or 3340 prevents air from diffusing out of the microclimate structures 3214, 3314, and 3414 while the air flows from the inlet port 3142 to the therapeutic regions 3140, 3240, or 3340, thus requires less volume of air. However, in some embodiments, the inlet port 3142 may be positioned at the foot end of the microclimate structure 3114. Further, the microclimate structure 3114 has an outlet 3144 at the head section 3132 of the patient support structure 3112 to exhaust the air and/or liquid as shown in FIGS. 124 and 125. The outlet 3144 is optional and may be implemented in any of the embodiments disclosed herein. Other inlet port and outlet designs may be used in other embodiments. When the outlet 3144 is omitted, the air that traverses the respective microclimate structures 3114, 3214, and 3314 is pushed out through the perforations 3141 in the therapeutic regions 3140, 3240, or 334040 and escapes through an outer ticking layer 3124 of the patient support structures 3112, 3212, or 3312.

The outer ticking layer 3124 encompasses the microclimate structures 3214, 3314, 3414 as shown in FIGS. 126-127. The outer ticking layer 3124 includes an upper ticking layer 3150 and a lower ticking layer 3152. The upper ticking layer 3150 covers the microclimate structure 3114 and the lower ticking layer 3152 encases the cushion layer 3116 as shown in FIGS. 126-127. The upper ticking layer 3150 comprises a breathable material that is vapor permeable but liquid impermeable. This allows the patient heat and moisture to flow away from the patient's skin in form of vapor and pass through the upper ticking layer 3150 into the area which encloses the microclimate structure 3114. The vapor then condenses between the upper ticking layer 3150 and a first or upper layer 3126 of the microclimate structure 3114. At least a portion of the upper layer 3126 comprises of a vapor and liquid permeable material which defines the therapeutic region 3140. In the illustrative embodiment, the therapeutic region 3140 of the upper layer 3126 includes a number of perforations 3141 that allows the condensed moisture and liquid from the therapeutic region 3140 to flow through the upper layer 3126 into a middle layer 3128 of the microclimate structure 3114. The upper layer 3126 comprises a vapor permeable but liquid impermeable material to allow vapor to flow through the upper layer 3126. In some embodiments, the perforations 3141 are omitted. In such embodiments, the therapeutic regions 3140, 3240, 3340 have the upper layer 3126 removed in the region and a highly breathable, vapor and liquid permeable material is positioned in the region 3140, 3240, or 3340 and bonded, welded, glued, or otherwise secured to the upper layer 3126. In other embodiments, the entire upper layer 3126 comprises a vapor and liquid permeable non-coated fabric, and the area of the upper layer 3126 except the therapeutic regions 3140, 3240, 3340 is coated with a liquid impermeable material which holds air within the coated layers. In the illustrated embodiments, the microclimate structure 3114 and the cushion layer 3116 are separated by a middle ticking layer 3154, which is a top layer of the lower ticking layer 3152. However, in some embodiments, a unitary outer ticking layer 3124 may encase the entire patient support structure 3112, including the microclimate structure 3114 and the cushion layer 3116.

The material of the middle layer 3128 is a three-dimensional material. The three-dimensional material is arranged to extend from the upper end of the head section 3132 to the lower end of the foot section 3134 of the patient support structure 3112 as shown in FIGS. 124 and 126. The three-dimensional material is air and liquid permeable. The inlet port 3142 is coupled to the lower end 3180 of the seat section 3137 of the three-dimensional material to allow air from the air box 3122 to flow between the upper layer 3126 and a lower layer 3130 of the microclimate structure 3114 and from the lower end 3180 of the seat section 3137 to the head section 3132 of the patient support structure 3112. Therefore, once the moisture and liquid reach the middle layer 3128 from the upper layer 3126, the moisture and liquid are carried away and evaporated by air flowing through the middle layer 3128. The cooled-vapor can then be either directed toward the outlet 3144 or back toward the support surface 3123 to cool and dry the patient's skin around the interface of the patient's skin with the support surface 3123.

In some embodiments, as shown in FIGS. 125 and 127, a patient support structure 3412 includes a microclimate structure 3414 arranged with the middle layer 3128 having more than one section of the three-dimensional material. The middle layer 3128 includes a divider 3162 that pneumatically separate a first section 3164 of the three-dimensional material from a second section 3166 of the three-dimensional material. The first section 3164 of the three-dimensional material is arranged to extend from the upper end of the head section 3132 to the lower end 3180 of the seat section 3137 of the patient support structure 3412. The inlet port 3142 is coupled to the lower end 3180 of the seat section 3137 of the first section 3164 of the three-dimensional material. Therefore, the therapeutic region 3140 is positioned on top of the first section 3164 of the three-dimensional material because only the first section 3164 of the three-dimensional material receives air from the air box 3122. The first section 3164 of the three-dimensional material is spaced apart from the foot section 3134 of the microclimate structure 3214 to reduce the area through which the air box 3122 is required to push air.

The second section 3166 of the three-dimensional material is arranged to extend from the lower end 3180 of the seat section 3137 to the bottom end of the foot section 3134 of the patient support structure 3412. The second section 3166 of the three-dimensional material lacks the inlet port 3142. Therefore, the second section 3166 of the three-dimensional material does not receive air from the air box 3122, instead the second section 3166 of the three-dimensional material passively flow air along the foot end of the microclimate structure 3414. In other embodiments, the first section 3164 of the three-dimensional material may be positioned at different locations relative to the patient and/or may be broken into different sections to create multiple therapeutic regions of a microclimate structure. Although in some embodiments, materials other than the three-dimensional material, such as foam padding, can be used for the second section of the middle layer 3128.

Figure 9:
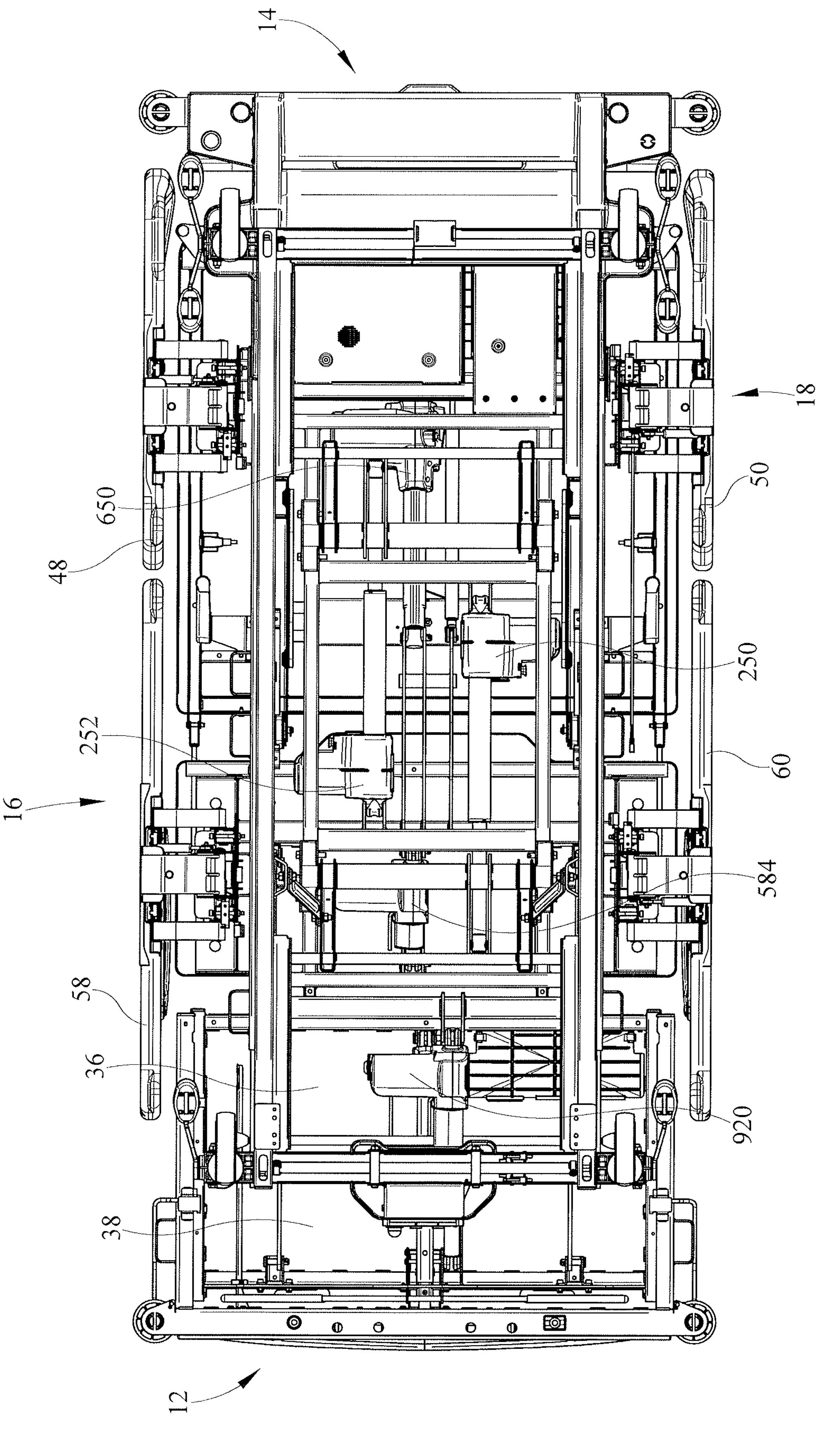
FIG. 9 is a bottom plan view of the patient support apparatus of FIG. 1.

Lastly, the lower layer 3130 of the microclimate structure 3114, 3214 comprises a liquid impermeable material to prevent liquid from leaking through the lower layer 3130 into the cushion layer 3116. Illustratively, the cushion layer 3116 includes the inflatable support bladders 3148 to support the microclimate structure 3114 or 3414 as shown in FIGS. 8 and 9, respectively. The microclimate structures 3314 or 3414 may also be similarly supported. Accordingly, the air box 3122 is coupled to the microclimate structures 3114, 3214, or 3314 and the inflatable support bladders 3148 to provide pressurized air to the support surface 3123 and the cushion layer 3116. In other embodiments, the cushion layer 3116 may omit some or all of the inflatable support bladders 3148 and utilize foam cushioning structures instead of the inflatable support bladders 3148.

Referring to FIG. 128, the illustrative microclimate structure 3114 is configured to receive air from the air box 3122 mounted on the frame 3118, but in other embodiments, an air box 3222 may be integrated into the frame 3118 of the patient support apparatus 3110 as shown in FIG. 129. When the air box 3222 is integrated into the frame 3118, the functions of the user interface 3160 may be placed on the footboard 3202 of the patient support apparatus 3110 or on a siderail. The air from the air box 3122 is introduced into the microclimate structure 3114 at the inlet port 3142 near the therapeutic region 3140 and flows through the middle layer 3128 of the microclimate structure 3114 toward the head end of the microclimate structure 3114 as suggested by arrows 3156 in FIG. 128. The air flows to exhaust through the outlet 3144 positioned at the head end 3132 of the microclimate structure 3114.

Turning to FIG. 130, the patient support apparatus 3110 is shown diagrammatically to include the frame 3118, the patient support structure 3112, and the air box 3122. The air box 3122 illustratively includes the user interface 3160, a controller 3168, a blower 3176, and a heater 3174. The controller 3168 is coupled for communication with the user interface 3160, the blower 3176, and the heater 3174. The controller 3168 is also coupled for communication with a valve box 3178. The blower 3175 provides pressurized air for the inflatable support bladders 3148 and for the microclimate structure 3114. The heater 3174 is arranged in line with the blower 3176 and is configured to warm air from the blower 3176 before the air is delivered to the microclimate structure 3114. In some embodiments, a cooler (not shown) or other air conditioning device(s) may also be included between the blower 3176 and the microclimate structure 3114 to prepare the air for use in therapeutic flow adjacent to a patient's skin. In some embodiments, the patient support structure 3112 may include temperature sensors which are coupled to the controller 3168 to permit the controller 3168 to operate the heater 3174 to achieve a specific temperature at the patient support surface 3123. Sensors may also be placed elsewhere in the air flow to provide feedback to the controller 3168. In other embodiments, the air box 3122 may take ambient air, pressurize it, and deliver it to the microclimate structure 3114.

The frame 3118 illustratively includes a base 3182 and a deck 3181. The base 3182 is configured to support the deck 3181, the patient support structure 3112, and the air box 3122 above a floor 3190. The deck 3181 underlies the microclimate structure 3114 and is reconfigurable to adjust the position of the patient support structure 3112 when a patient is on the patient support apparatus 3110 so that the patient can be supported while lying flat, sitting up in hospital bed 10, or in a number of other positions.

The patient support structure 3112 includes (from bottom to top) the lower ticking layer 3152, a foam shell 3188, optional turn bladders 3186, the valve box 3178, an air manifold 3184, inflatable support bladders **3148*a*, 3148*b*, 3148*c*, the optional middle ticking layer 3154, the microclimate structure 3114, and the upper ticking layer 3150 as shown in FIG. 130. The upper ticking layer 3124 covers the microclimate structure 3114 and the lower ticking layer 3152 encases the cushion layer 3116. The middle ticking layer 3154 is a top layer of the lower ticking layer 3152 and is positioned between the microclimate structure 3114 and the cushion layer 3116. The foam shell 3158 cooperates with the inflatable support bladders 3148 to provide a cushion on which the patient is supported while positioned on the patient support apparatus 3110. The turn bladders 3186 are optional and are coupled to the air box 3122 through the valve box 3178. The turn bladders 3186 may be inflated to rotate a patient about a longitudinal axis 3192 of the support surface 3123. In addition to the turn bladders 3159, the valve box 3178 is pneumatically coupled to the microclimate structure 3114 via the air manifold 3184 and to the inflatable support bladders 3148 to distribute air from the air box 3122 around the support surface 3123. The air manifold 3184 receives air from the air box 3122 via the valve box 3178 and delivers the air to the microclimate structure 3114 at the inlet port 3142**.

The inflatable support bladders 3148 illustratively include head section bladders **3148*a*, seat section bladders 3148*b*, and foot section bladders 3148*c*. Each section of bladders 3148*a*, 3148*b*, and 3148*c* is inflatable to different pressures depending on pressure level selected on the user interface 3160 for patient comfort. Each section of bladders 3148*a*, 3148*b*, and 3148*c* may also be inflated or deflated to provide patient therapies or to reduce the risk of hospital bed 10 sores. In other embodiments, the bladders 3148*a*, 3148*b*, 3148*c* may be omitted and foam padding may replace one or more of the inflatable bladders 3148*a*, 3148*b*, and 3148*c***.

The microclimate structure 3114 illustratively includes a upper layer 3126 configured to underlie a patient on the patient support apparatus 3110, a lower layer 3130 spaced apart from the upper layer 3126, a middle layer 3128 arranged between the upper layer 3126 and the lower layer 3130, and the distribution sleeve 3194 as shown diagrammatically in FIG. 130. The upper layer 3126 is made from a vapor- and liquid-permeable fabric, whereas the lower layer 3130 is made from a liquid-impermeable fabric. The middle layer is configured to provide an air gap between the upper layer 3126 and the lower layer 3130. The lower layer 3130 is formed to include an inlet port 3142 arranged near the therapeutic region 3140.

Another embodiment of a patient support apparatus 2810 is shown in FIG. 102. For structures that are common to the prior embodiments, the same reference numerals will be used. In the illustrative embodiment, those controls accessible to a patient are found on a pendant 2838 which is shown to be positioned on the right siderail 2830 in the embodiment shown in FIG. 1. The pendant 2838 is also optionally supportable from a user interface 2840 which is supported from a support arm 2842 identified as pendant 2838' is shown in phantom to be supported from the lower edge of the user interface 2840 in FIG. 102. Another pendant 2838" is shown in phantom to be supported from the upper edge of the right head siderail 50 in FIG. 102. The structures for supporting the pendant 2838 provide ergonomic access to the controls on the pendant 2838 to a patient supported in a supine position on the patient support surface 2822 will be discussed in further detail below.

Figure 103:
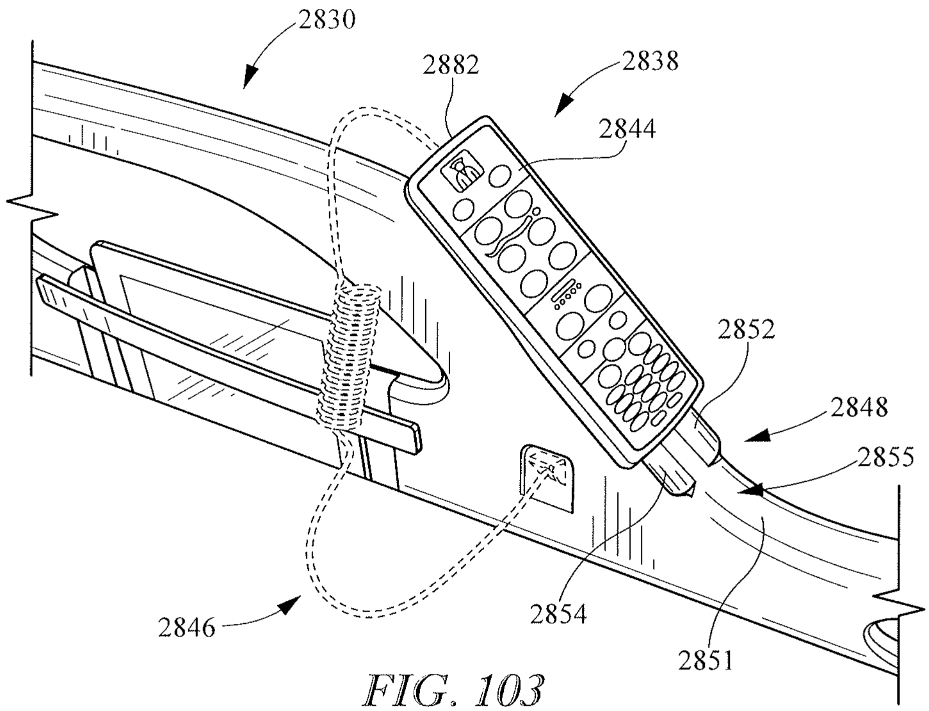
FIG. 103 is a detail view of a right siderail of the patient support apparatus of FIG. 1 illustrating that the pendant is held in place relative to the right siderail so that an input surface of the pendant is ergonomically positioned for a person supported on the patient support apparatus.
Figure 104:
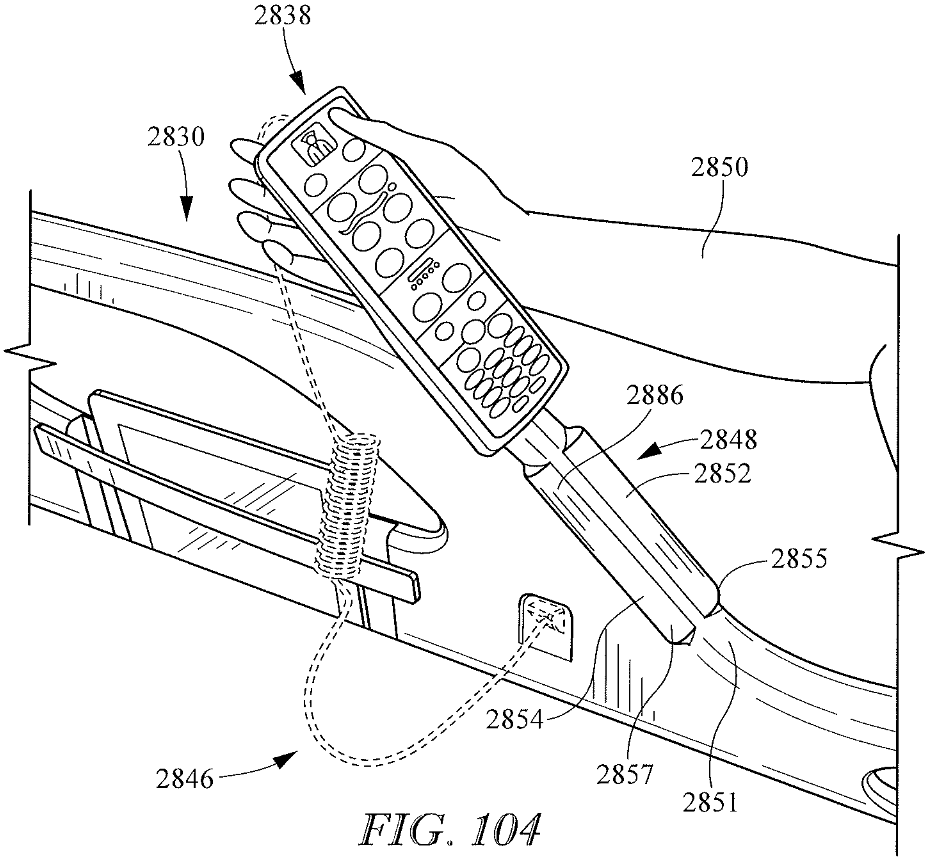
FIG. 104 is a detail view of the right siderail similar to FIG. 103 showing that the pendant slides upwards along a mount to be detached from the right siderail of the patient support apparatus.

The pendant 2838 includes an interface surface 2844 as shown in FIG. 103. The pendant 2838 is electrically connected to the control structure of the patient support apparatus 2810 through a cable 2846. In other embodiments, the pendant 2838 may communicate with the control system of the patient support apparatus 2810 through a wireless connection, such as an infrared connection or a radiofrequency connection. The pendant 2838 is supported on the right siderail 2830 by a mount 2848 formed in the upper surface 2851 of the right siderail 2830. It should be noted that the pendant 2838 includes various functionality as is known in the art, including functionality that allows a patient to change the adjustment of the deck sections of the patient support apparatus 2810, adjust environmental conditions such as lighting, adjust entertainment options such as a television channel or volume, or allows the patient to place a nurse call. As shown in FIG. 104 the pendant 2838 may be removed from the mount 2848 by a patient 2850. When so removed, the pendant 2838 may be held in the patient's hand so that the functionality available on the pendant may be accessed by the patient 2850 using a single hand or holding the pendant 2838 in one hand and activating functions with another hand.

When the pendant is secured to the mount 2848, the interface surface 2844 of the pendant 2838 is oriented at an ergonomic angle presenting the interface surface 2844 in a position that faces the patient's head when the patient 2850 is supported on the patient support apparatus 2810 in a supine position. This can be contrasted with other applications in the prior art where the interface surface 2844 of the user interface, such as the pendant 2838, is presented at an angle which limits that access to the patient 2850 because the interface surface 2844 is not oriented perpendicular to the patient's line of sight. The mount 2848 includes two protrusions 2852 and 2854 positioned on the upper surface 2851 of the right siderail 2830. It should be noted that the mount 2848 is formed to provide a relatively continuous surface profile that cooperates with the upper surface 2851 of the right siderail 2830 when the pendant 2838 is not positioned on the mount 2848.

Figure 105:
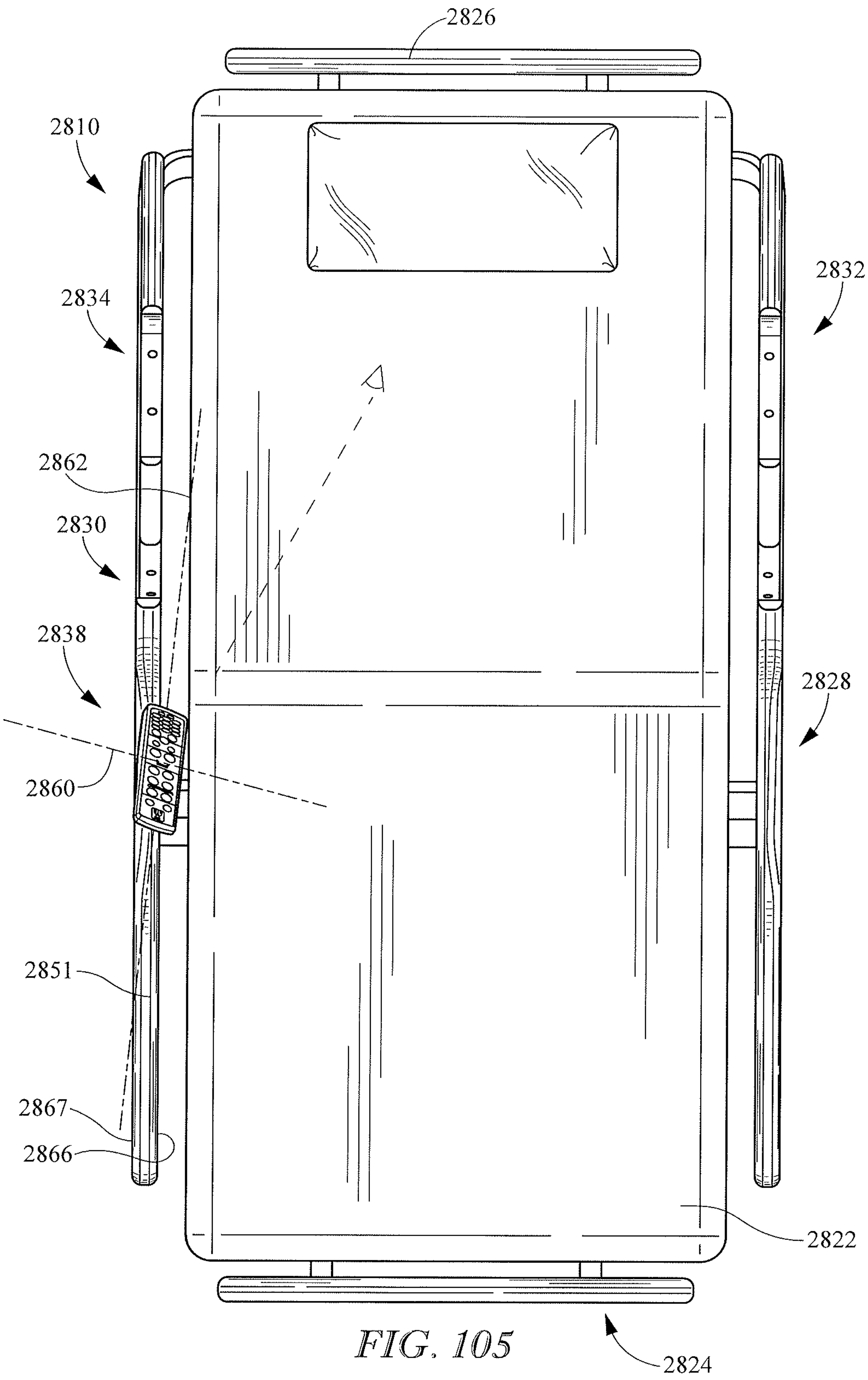
FIG. 105 is a top view of the patients support apparatus showing that the input surface of the pendant is coupled to the right siderail to be generally perpendicular to a line of sight of a patient supported on the patient support apparatus.
Figure 106:
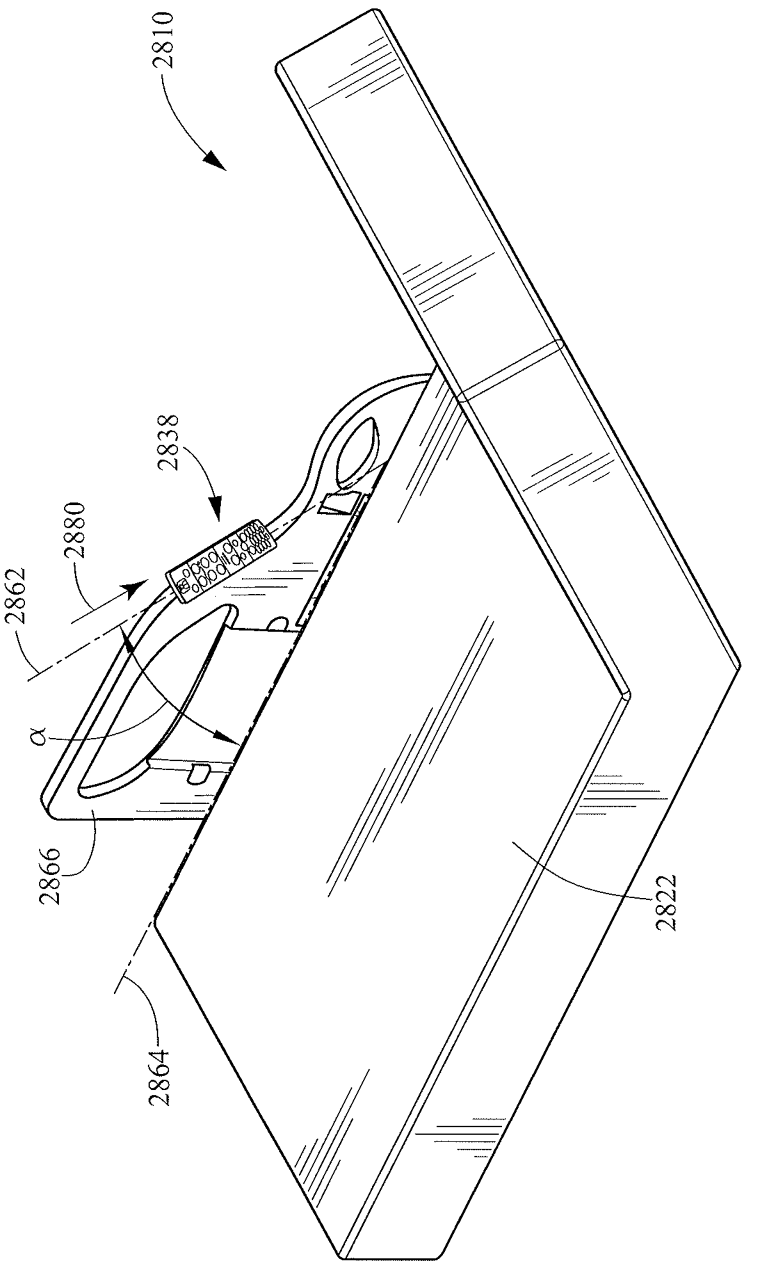
FIG. 106 is a perspective view from the head end on the patient's left of the right siderail of the patient support apparatus showing that the mount assembly holds the input surface of the pendant at a fixed incline angle relative to horizontal and that the pendant is slidable along the mount assembly.
Figure 107:
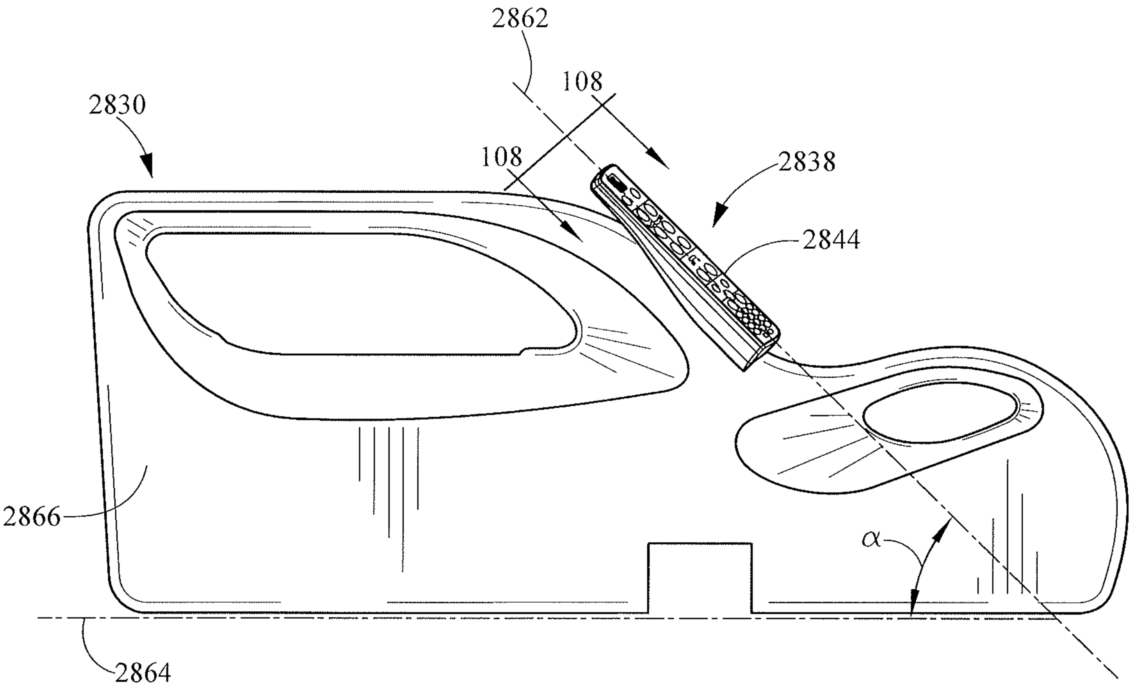
FIG. 107 is a side view of the interior surface of the right siderail including the pendant similar to FIG. 106.

Referring now to FIG. 105, the interface surface 2844 of the pendant 2838, when positioned on the upper surface 2851 of the right siderail 2830 is oriented such that the interface surface 2844 is generally perpendicular to the line of sight 2858 of a patient supported on the patient support apparatus in a supine position. The interface surface 2844 can be defined by the plane formed when a first axis 2860 and a second axis 2862, perpendicular to the first axis 2860 intersect. The axis 2862 corresponds to the longitudinal length of the pendant 2838. The axis 2862 forms an angle α relative to horizontal as illustrated by axis 2864 as shown in FIG. 107. In the illustrative embodiment, α is about 45 degrees. In other embodiments, a may vary between 30-60 degrees. It should be noted that the patient's line of sight 2858 changes as the head deck section 2820 moves relative to horizontal axis 2864. The angle α presents the interface surface 2844 to the patient line of sight 2858 when the head deck section 2820 is in a fully raised position.

Figure 108:
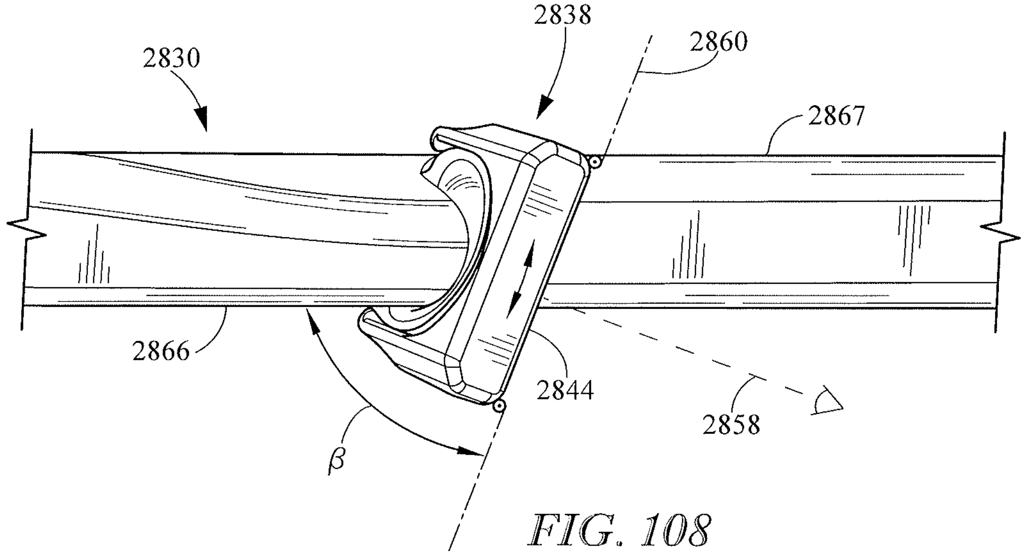
FIG. 108 is a top view of the right siderail including the pendant similar to FIG. 107.
Figure 109:
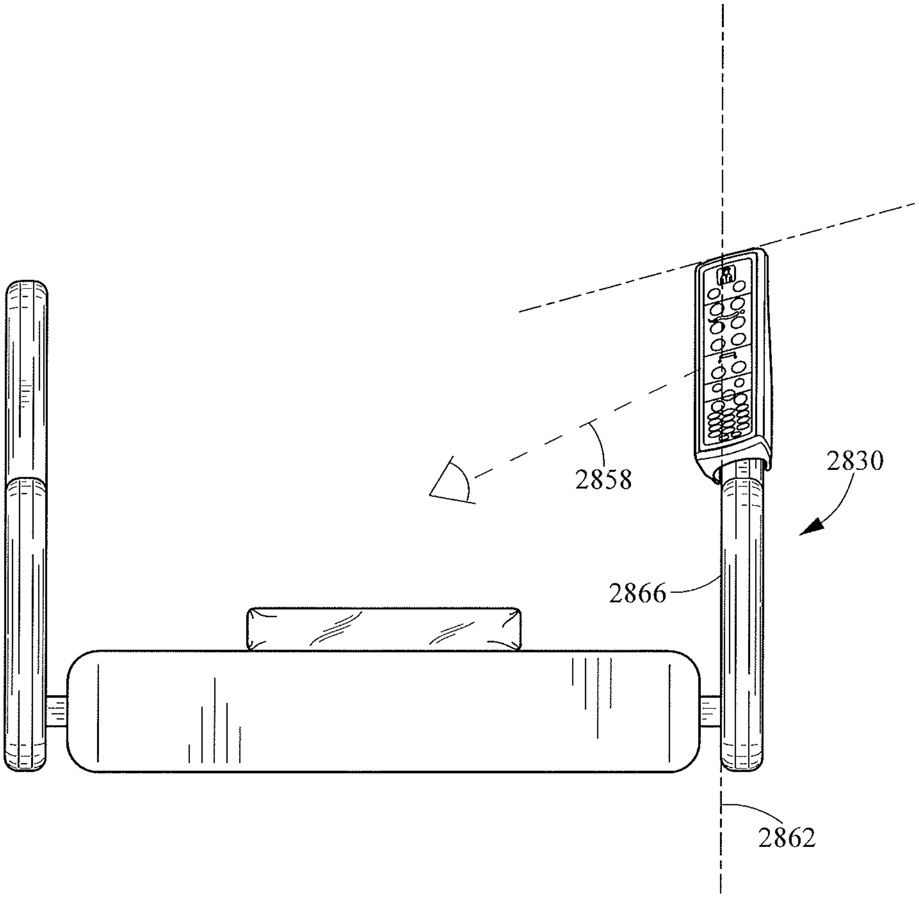
FIG. 109 is a view from the head end of the hospital bed 10 of FIG. 102, showing the embodiment of pendant at a compound angle.
Figure 110:
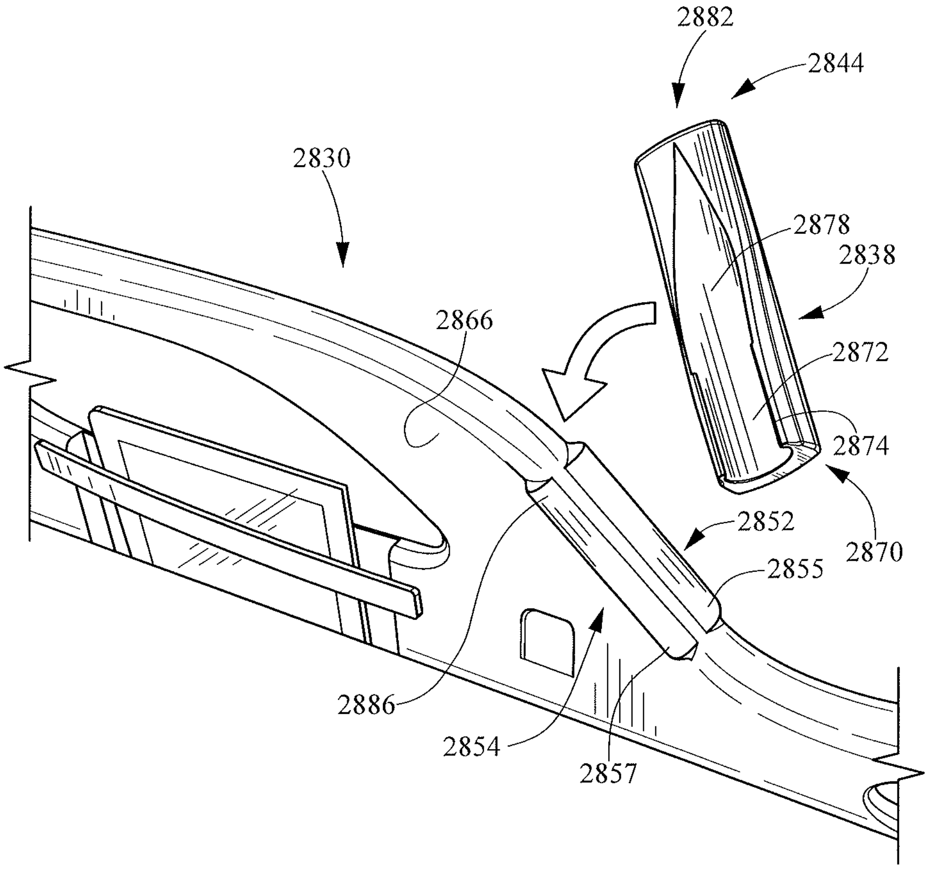
FIG. 110 is a detail view of the mount assembly showing that a mount is coupled to the siderail, and a mount receiver is coupled to the pendant to allow the pendant to move relative to the siderail along the mount.

In the embodiment of FIG. 108, the interface surface 2844 of the pendant 2838 is also oriented toward the patient through the orientation of the axis 2860 which is positioned at an angle β relative to an interior surface 2866 of the right siderail 2830. In the illustrative embodiment, β is about 70 degrees. In other embodiments, β may vary between 45 and 90 degrees. Right siderail 2830 includes an exterior surface 2867. This orientation of the interface surface 2844 of pendant 2838 causes the line of sight 2858 of the patient to be generally perpendicular to the axis 2860 which lies in the plane that coincides with the interface surface 2844.

Figure 111:
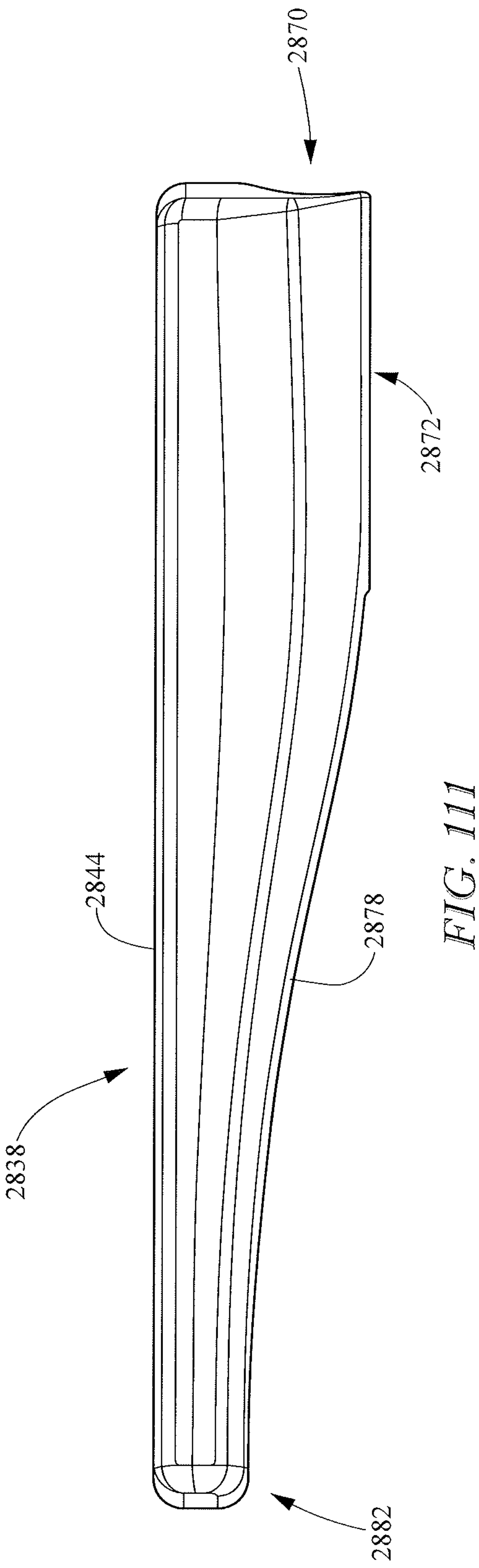

Referring now to FIG. 111, the mount 2848 formed on the right siderail 2830 and defined by the protrusions 2852 and 2854, each engage the pendant 2838 and are received into a space 2868 formed in the back of the pendant 2838 when the pendant 2838 is engaged with the mount 2848. A lower end 2870 of the pendant 2838 has a channel 2872 formed therein, the channel being defined by a first flange 2874 and a second flange 2876. The channel 2872 includes a surface 2878 which is tapered such that as the pendant 2838 is placed on the mount 2848 and slid in the direction of arrow 2880, the protrusions 2852 and 2854 are received in the space 2868 and engage the surface 2878. In this way, the pendant 2838 includes a grip that is at least defined by surface 2878 and flanges 2874 and 2876, the grip used to secure the pendant 2838 to the mount 2848. Because the surface 2878 is tapered, the movement of the pendant along the direction of arrow 2880 causes the engagement of the protrusions 2852 and 2854 with both the surface 2878 and the flanges 2874 and 2876 to frictionally secure the pendant 2838 to the mount 2848. When the pendant is engaged with the mount 2848, the upper ends 2884 and 2886 of each protrusion 2852 and 2854, respectively, are positioned in the channel 2872 so that the flanges 2874 and 2876 underlie the protrusions 2854 and 2852 respectively. This causes the pendant 2838 to be positioned as shown in FIG. 2 on the right siderail 2830 with the lower ends 2855 and 2857, of the protrusions 2852 and 2854 respectively, extending below the lower end of the pendant 2838.

Figure 113:
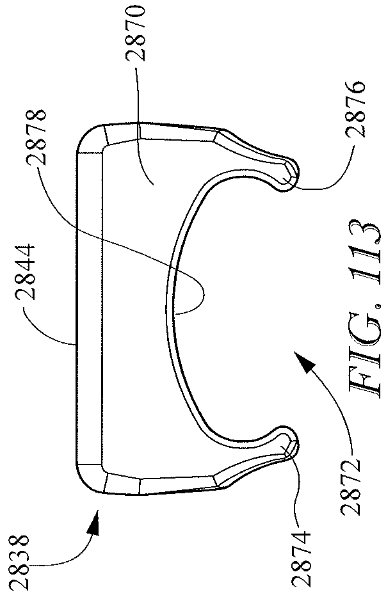
Figure 112:
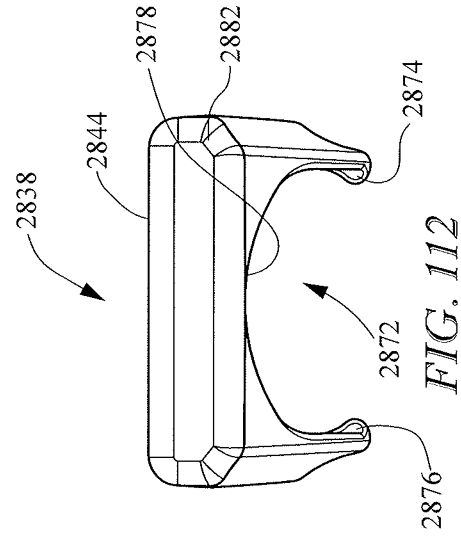
Figure 114:
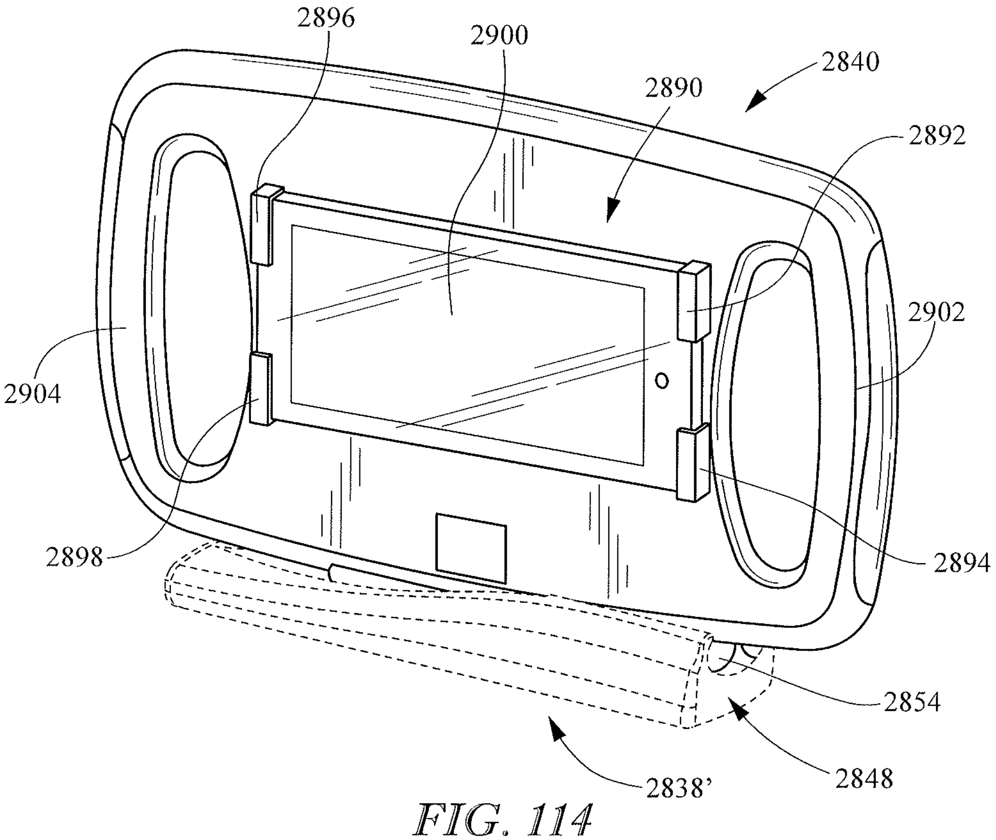
Figure 115:
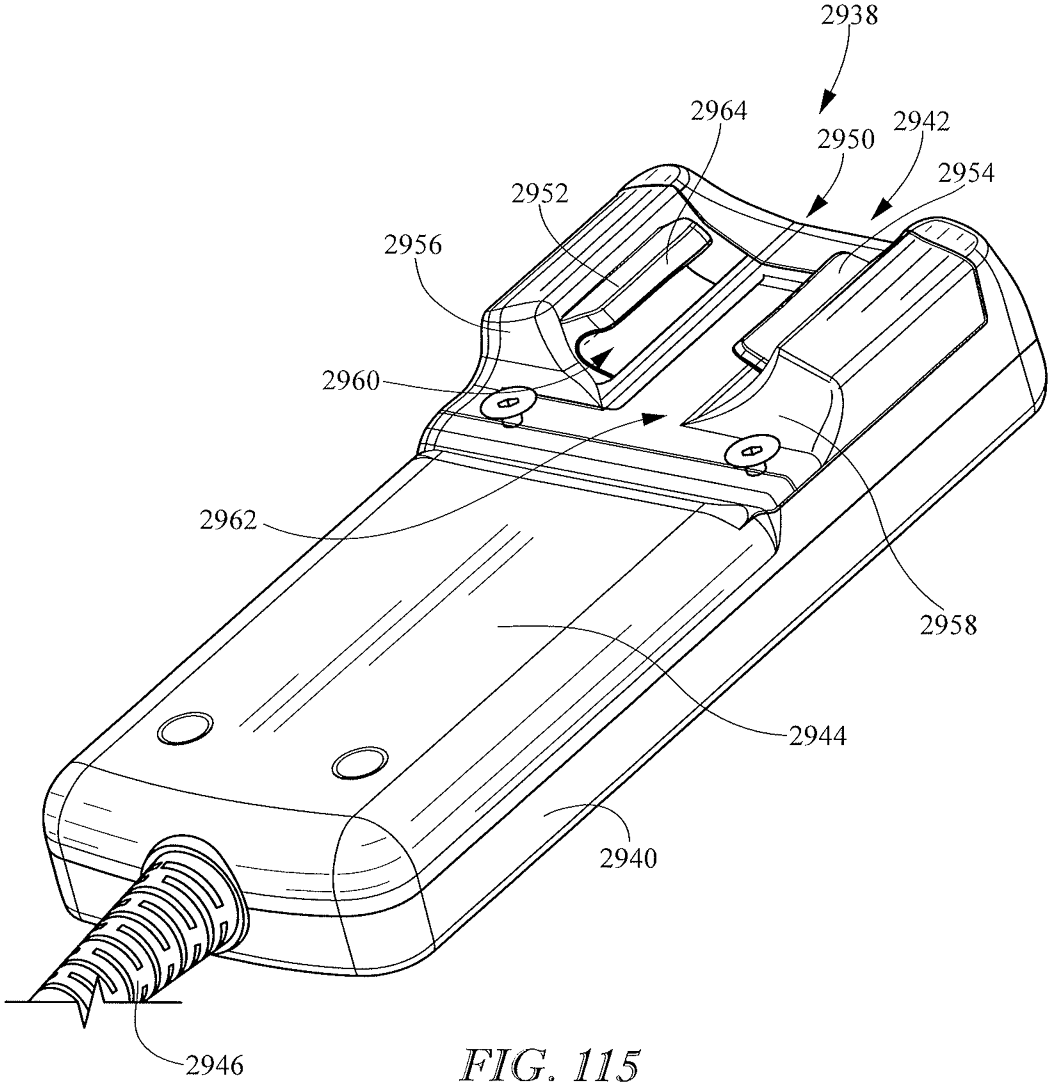

Additional details of the pendant are shown in FIGS. 111-113 illustrating that the surface 2878 is tapered which is what causes the pendant to be frictionally engaged with the mount 2848. It should be understood that the mount 2848 may be positioned on various surfaces of the patient support apparatus 2810 to allow the pendant 2838 to be frictionally secured in various locations on the patient support apparatus 2810. For example, the user interface 2840 is shown in FIG. 114 with a personal digital assistant 2890 secured to the user interface 2840 by a number of flexible mounts 2892, 2894, 2896, and 2898. The personal digital assistant 2890 may be a personal smart phone or notebook type device with a touchscreen 2900. The user interface 2840 allows the personal digital assistant 2890 to be positioned for easy access by a patient supported on the patient support apparatus 2810. The user interface 2840 includes handles 2902 and 2904 which allow a patient to reposition the user interface 2840 for easy access. The user interface 2840 includes a mount 2848 positioned on a lower edge 2906 of the user interface 2840. The pendant 2838 may optionally be engaged with the mount 2848 positioned on the user interface 2840 as shown in FIG. 114. This allows the pendant 2838 to be positioned within easy reach of a patient supported on the patient support apparatus 2810. In other embodiments, such as that suggested by the pendant 2838" shown in FIG. 102, an upper edge of a head siderail, such as right head siderail 2834 may be formed to include a mount 2848 to permit the pendant 2838 to be positioned on the right head siderail 2834.

In another embodiment shown in FIGS. 115-118, a pendant 2938 includes a main body or housing 2940 and a spring-biased grip 2942 positioned on a backside 2944 of the pendant 2938. The pendant 2938 includes a cord 2946 which is attached to an electrical connection to allow the pendant 2938 communicate with a control system of a patient support apparatus, such as patient support apparatus 2810. An upper end 2948 of the pendant 2938 defines a channel 2950. Opposing arms 2952 and 2954 are positioned in respective housings 2956 and 2958 of the pendant 2938. The arms 2952 and 2954 are spring-biased and urged toward each other. Each arm 2952, 2954 has a respective channel 2960 and 2962 which is configured to engage a mount positioned on various structures of a patient support apparatus as will be discussed in further detail below. The spring action of the arms 2952, 2954 causes the arms 2952, 2954 to come together so that the channels 2960 and 2962 engage a rigid structure on the patient support apparatus, the arms 2952, 2954 acting to grip or clamp the pendant 2938 to the mount of the patient support apparatus. Each arm 2952 and 2954 has a respective leading-edge 2964 and 2966 which acts as a cam when the leading edges engage a corresponding mount so that, as pressure is applied, the arms 2952 and 2954 are urged apart to step over the mount and allow the arms 2952 and 2954 to clamp onto the mount as will be discussed in further detail below.

Figure 116:
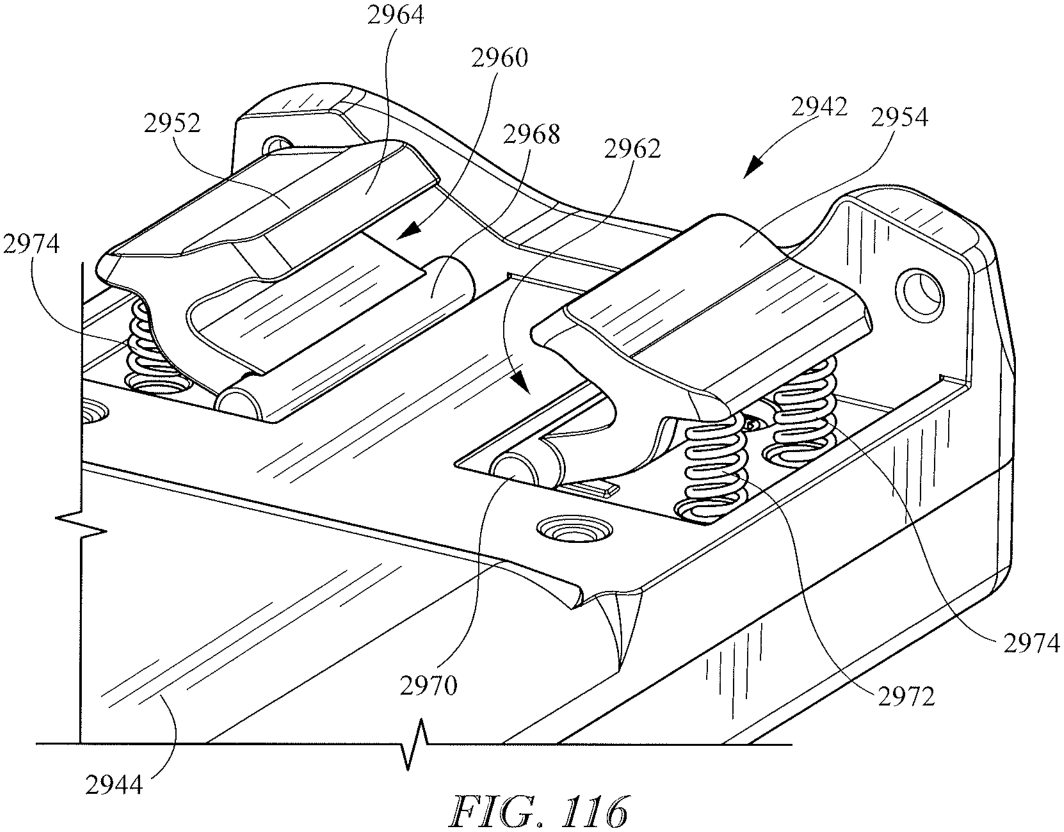

The pendant 2938 is shown in FIG. 116 with the respective housings 2956 and 2958 removed. The arm 2952 is secured to the body 2940 by a hinge 2968 about which the arm 2952 pivots. The arm 2954 pivots about a hinge 2970. The arms 2952 and 2954 are biased to a closed position by a pair of springs 2972 and 2974. Each arm 2952 and 2954 has an upper surface 2976 and 2978, respectively which engage the respective housings 2956 and 2958 to prevent the arms 2952, 2954 from closing completely and allowing the springs 2972 and 2974 to disengage from the body 2940. Thus, there is a freedom of movement of the arms 2952 and 2954 into the housings 2956 and 2958 to allow the clamp formed by the arms 2952 and 2954 to be opened when engaged with a mount. However, the arms 2952 and 2954 are restrained from closing any further than that shown in FIG. 115 which is sufficient to allow the arms 2952 and 2954 to grip or clamp to a complementary mount.

Figure 117:
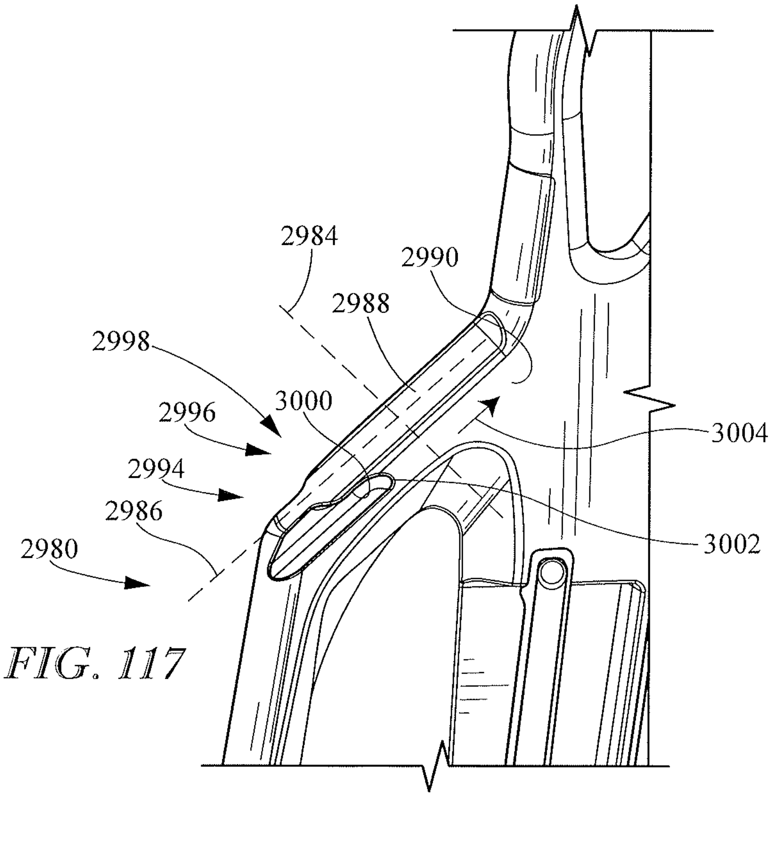

One example of a complementary mount 2982 is shown in FIG. 117 on another embodiment of a siderail 60. The mount 2982 includes a surface 2988 formed on a portion of the siderail 60, the surface 2988 being defined by a pair of perpendicular intersecting axes 2984 and 2986. The axis 2984 is oriented to an inner surface 2990 of the siderail 2980 at an angle β as discussed above with regard to the embodiment of right siderail 2830. Similarly, the axis 2986 is oriented relative to horizontal at an angle off as discussed above with regard to the right siderail 2830. This allows the pendant 2938 to be oriented with a front surface 2992 oriented generally perpendicular to the patient's line of sight 2858 as described above. While only a portion of the mount 2982 is shown, it is symmetrical on opposite sides of the axis 2986. The mount includes a cavity 2994 formed in the siderail formed on opposite sides of the axis 2986 such that the surface 188 is narrow along a portion 2996 and expands to a wider width at a portion 2998. An undercut 3000 inside of the cavity 2994 expands to an increased thickness at a terminal end 3002 of the cavity 2994. In use, a user positions the pendant 2938 with the grips over the portion 2996 and slides the pendant 2938 in the direction of arrow 3004 such that the arms 2952, 2954 engage the portion 2998 and the undercut 3000 with the undercut 3000 causing expansion of the arms 2952, 2954 as it is engaged with the channels 2960 and 2962 of the arms 2952 and 2954 respectively. This causes the bias of the springs 2972 and 2974 associated with each arm 2952, 2954 to urge the grip 2942 into contact with the portion 2998 to secure the pendant 2938 to the siderail 2980 through the clamping force of the arms 2952 and 2954. The user may easily remove the pendant 2938 by sliding the pendant in the direction opposite the direction of arrow 3004 which causes the pendant 2938 to be released from the siderail 2980.

Figure 118:
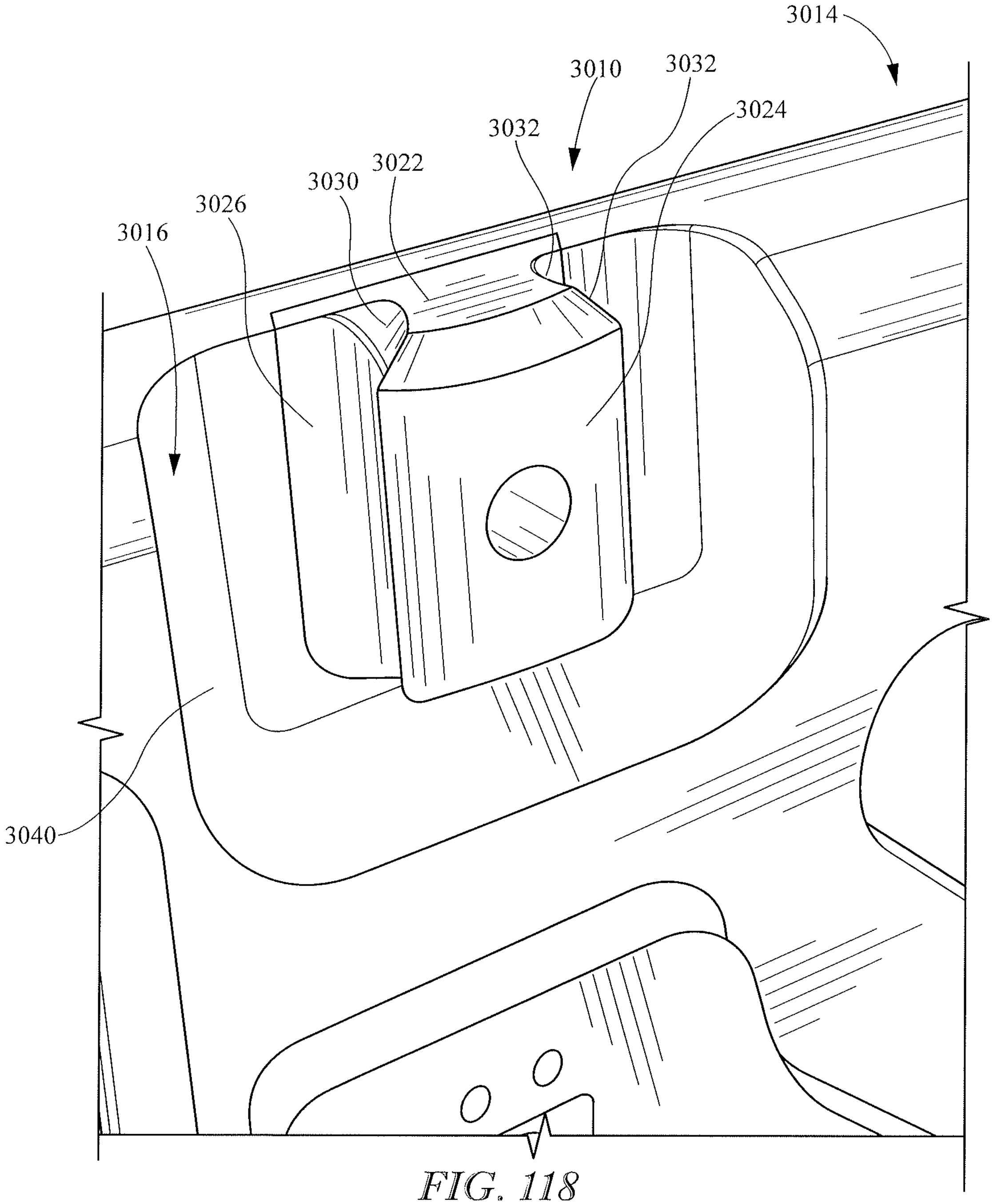

Another embodiment of a mount 3010 is positioned on an inner surface 3012 of a head siderail 50 as shown in FIG. 118. The head siderail 50 is formed to include a cavity 3016 with the mount 3010 being positioned in the cavity 3016. The mount has a base 3018 secured to a wall 3020 in the cavity 3016. The mount 3010 further includes an upper surface 3022 and the front wall 3024. In addition, opposing side walls 3026 and 3028 are positioned on opposite sides of the mount 3010 and are configured to be engaged with the arms 2952 and 2954 of the pendant 2938. A leading surface 3030 provides a transition between the upper surface 3022 in the wall 3026. Similarly a leading surface 3032 provides a transition between the upper surface 3022 and the side wall 3028. A third leading surface 3034 provides a transition between the upper surface 3022 and the front wall 3024. Each of the leading services are configured to engage with the arms 2952 and 2954 to urge the arms 2952 and 2954 apart as the pendant is positioned on the mount by sliding the pendant down in the direction of arrow 3036.

When the pendant 2938 is mounted to the siderail 3014 and engages with the mount 3010, the arm 2828 engages the side wall 3026 and the arm 2954 engages the sidewall 3028. In this position, the arms 2952 and 2954 act to clamp the pendant 2938 to the mount 3010 of the siderail 3014. It should be noted that the housings 2956 and 2958 engage with surfaces 3040 and 3042 of the cavity 3016 respectively so that the combination of the spring action of the grip 2942 holds the pendant 2938 firmly in place while permitting the pendant 2938 to be easily removed. It should be understood that a mount similar to the mount 2982 or the mount 3010 may be positioned in various positions on a patient support apparatus, such as this patient support apparatus 290. For example, the mount 2848 disclosed on the user interface 2840 may be omitted and replaced with a mount 2982 or a mount 3010 to allow the pendant 2938 to be mounted to the user interface 2840. It should also be noted that the mount 2848 may be positioned as shown in FIG. 1 with reference to mount 2848'.

Referring to FIG. 10, bag support 860 includes an upper rail 3540 that is not parallel to the rail 758 of the second portion 38. A first end 3542 is spaced apart from the rail 758 than a second end 3544. The ends 3542 and 3544 form loops with respective legs 864 and 3548 of the bag support 860. A second, smaller rail 3546 is positioned below the upper rail 990 and is generally parallel to the rail 758. Rail 3546 forms a loop 3550 with the leg 864 and a leg 3548 forms a loop 3552 with the leg 866. The structure provides multiple hanging points for a drainage bag to be hung from the bag support 860. The loops 3542 and 3550 are positioned at the foot end 12 of the foot deck 34 while the loops 3544 and 3552 are positioned closer to the head end 14. When the foot deck 34 is in a flat and horizontal position, the loop 3550 is generally horizontally aligned with the loop 3544. Thus, under normal conditions, the drainage bag or main level if hung from loops 3550 and 3544. As the orientation of the foot deck 34 takes a steeper inclination, the drainage bag may be progressively moved until it is hung from loop 3542 and loop 3552 which will maintain the drainage bag in a generally vertical orientation when the foot deck 34 is in its most steep inclination.

Figure 58:
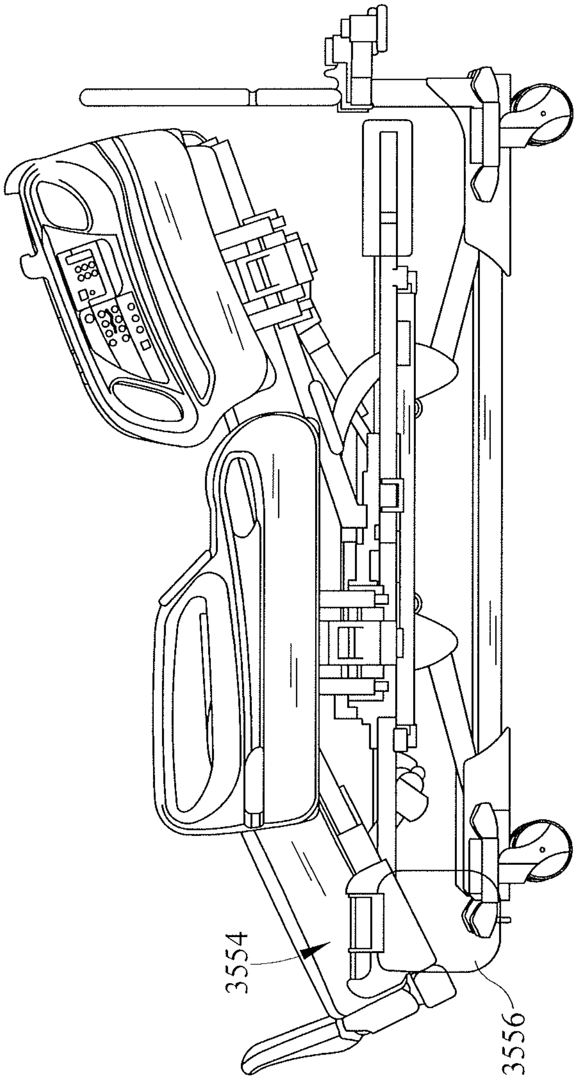
FIG. 58 is a side view of the patient support apparatus in a generally chair position, the patient support apparatus including a support structure for drainage bag.
Figure 59:
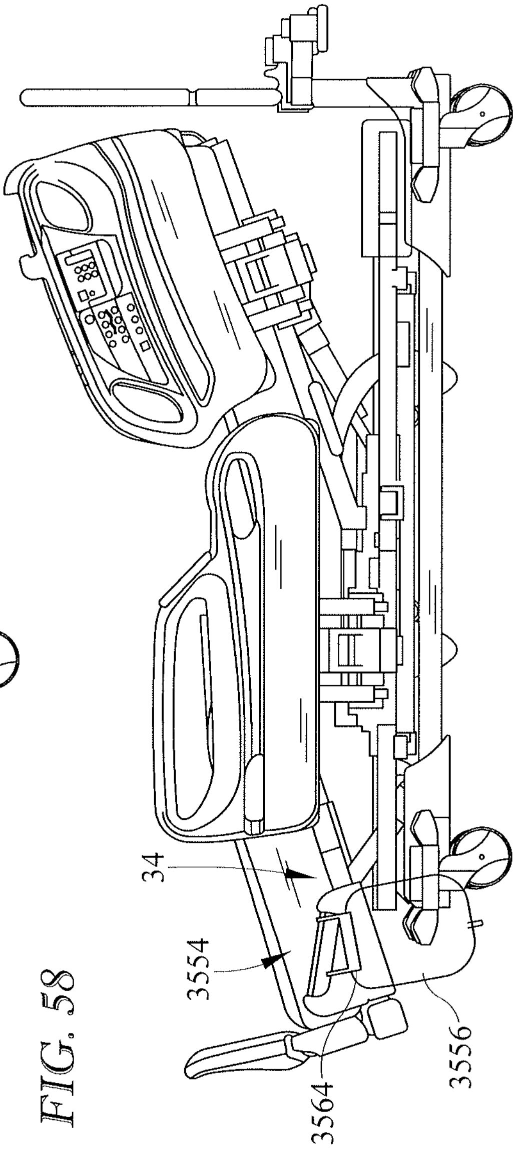
FIG. 59 is a side view similar to FIG. 58, the drainage bag of FIG. 59 in an improper orientation.

Another embodiment of a drainage bag support 3554 is shown in FIGS. 58-60. The drainage bag 3556 is hung from the back support 3554. As shown in FIG. 60, the bag support 3554 has an upper rail 3558 a lower rail 3560 and a loop 3562. Referring back to FIG. 59, when the bag support is hung with one hook on the lower rail 3560 and another hook on the upper rail 3558, it will be normally maintained in an appropriate orientation. Depending on the width of the hook structure 3564, one of the hooks may be positioned in the loop 3562. As illustrated by the progression of the inclination of the foot deck 34 in FIG. 59, the bag 3556 is not held in an appropriate orientation. However, moving both hooks of the hook structure 3564 to the upper rail 3558, the drainage bag can be maintained in an appropriate position.

The auxiliary wheel assembly 212 shown in FIG. 32 may be used as an alternative embodiment to the use of steer casters as described with reference to FIG. 11. The auxiliary wheel assembly 212 includes a frame 3564 which is mountable to the longitudinal rails 140 and 142 of the base frame 20. The auxiliary wheel assembly 212 includes a wheel 3566 which is maintained in constant contact with the floor, but is permitted to swivel about an axis 3568 when the hospital bed 10 is not in a steer mode. In general, the pedal structure described in FIG. 11 is used with the embodiment of FIG. 32, but break shaft assembly 155 is omitted and replaced with a break shaft assembly 3570 which includes a clevis 3572 which is coupled to a shaft 3574 so that the clevis 3572 rotates with the shaft 3574. The clevis 3572 engages a loop 3576 of a cable assembly 3578. Movement of the clevis 3572 due to rotation of the shaft 3574 when a steer pedal is activated, causes wire that forms the loop 3576 to move thereby cause a grip 3580 shown in FIG. 54 to close such that the auxiliary wheel 3566 is oriented along the longitudinal axis of the hospital bed 10. The auxiliary wheel assembly 212 will lock the orientation of the wheel 3566 in either the trailing orientation shown in FIG. 54 or in a leading orientation wherein a fork 3582 is oriented in the opposite direction from that shown in FIG. 54.

Figure 54:
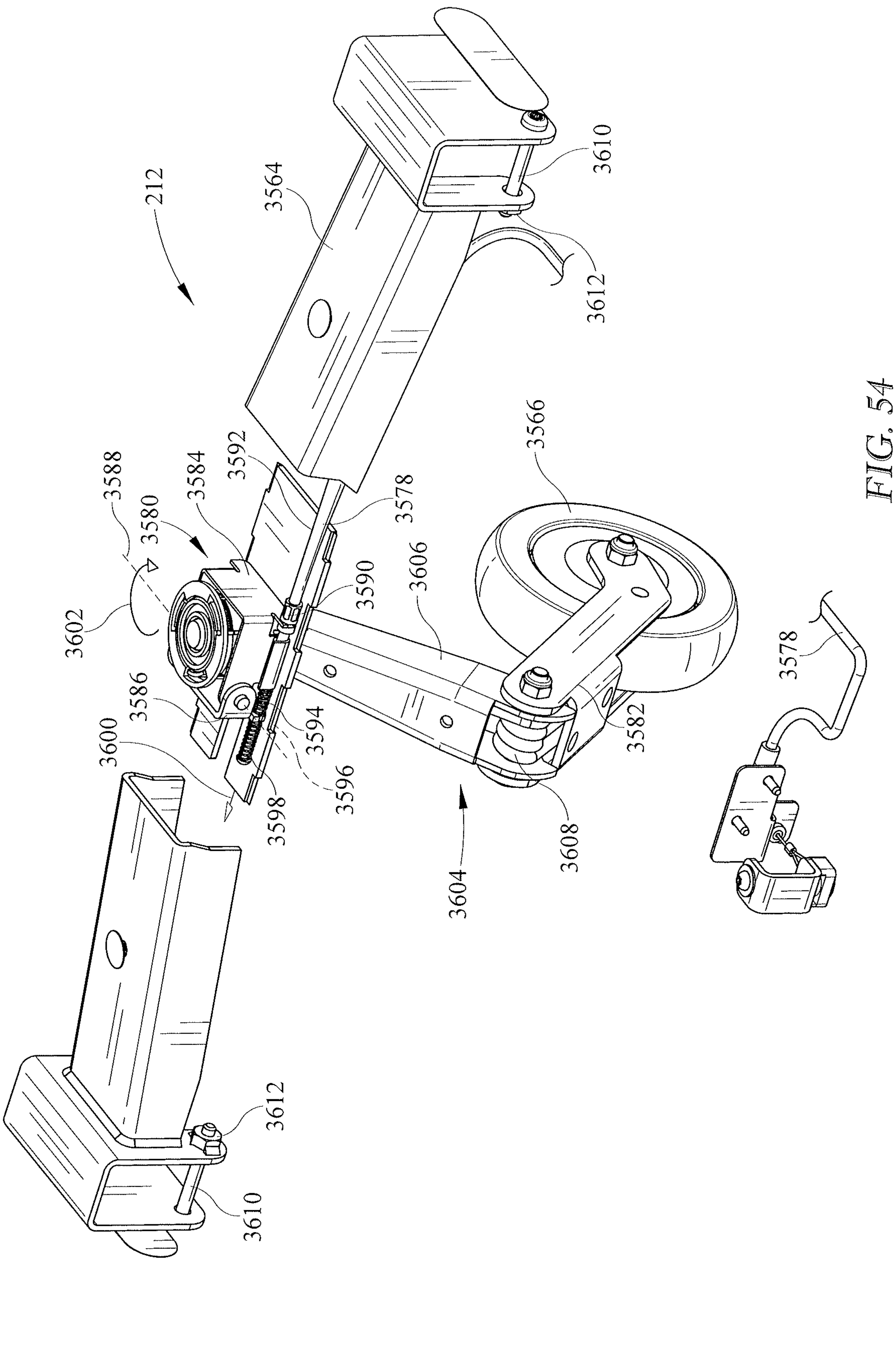
FIG. 54 is a perspective assembly view of the auxiliary wheel of FIG. 32.

The grip 3580 is shown in a closed position in FIG. 54, which results in the orientation of the wheel 3566 to be maintained. The grip includes a stationary body 3584 and a clamp 3586 which will rotate about an axis 3588. The cable assembly 3578 is fixed to the stationary body 3584 at a connection 3590 a sheath 3592 of the cable assembly 3578 remain stationary while the wire moves within the sheath 3578. The wire is fixed to a shaft which is within two springs 3594 and 3596. The shaft is free to move within the springs 3594, 3596 but has an end 3598 positioned on the distal end of the spring 3596. Movement of the wire that causes the and 3598 to move in the direction of an arrow 3600 releases the compression of the Springs 3594 and 3596 and allows the clamp 3586 to rotate about the axis 3588 in the direction of an arrow 3602. In that condition, the wheel support assembly 3604 is free to rotate about the vertical axis 3568. An upper arm 3606 is secured to a plate (not shown) that includes two opposing flat edges which can be captured between the stationary body 3584 and the clamp 3586 when the shaft is positioned as shown in FIG. 54. While the plate has two parallel straight edges, the remainder of the plate is rounded so that it axes a cam surface between the clamp 3586 and the body 3580. It has been found that even when the wheel 3566 is not oriented in a position to track along the longitudinal axis of the hospital bed 10, movement of the hospital bed 10 along its longitudinal axis tends to cause the wheel two track along the longitudinal axis applying force to the assembly 3604 which urges the assembly 3604 to rotate about the axis 3568 until the clamp 3586 and stationary body 3584 engages the parallel edges of the plate, locking the wheel 3566 and an appropriate orientation to assist with steering the hospital bed 10

The wheel 3566 is maintained in contact with the floor through the urging of a torsional spring 3608 which urges the fork 3582 away from the upper arm 3606 urging the wheel 3566 against the floor. However, the torsional spring 3608 provides a shock absorbing effect if the wheel 3566 encounters an obstruction while moving along the floor, permitting the wheel support assembly 3604 two collapse closing the gap between the upper arm 3606 and the fork 3582 as the hospital bed 10 traverses the obstruction. The auxiliary wheel assembly 212 provides an advantage of eliminating a linkage to deploy a steer wheel as his previously known in the art, thereby simplifying the operation and reducing cost. The frame 3564 is secured to the base frame 20 by four bolts 3610 and four nuts 3612 that clamp the frame 3564 to the rails 140, 142 of the base frame 20. The auxiliary wheel assembly 212 includes a shroud 3614 that is secured to the fame by two screws 3616, 3616.

Figure 33A:
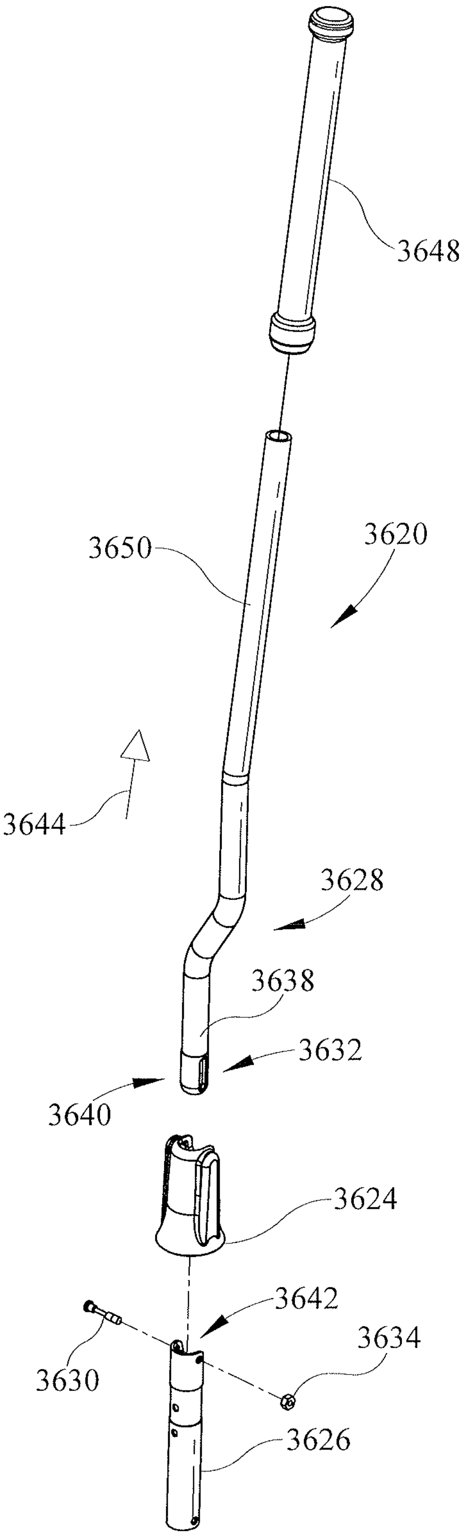
FIG. 33A is an exploded assembly view of elongated push handle assembly for use with the patient support apparatus of FIG. 1.
Figure 33B:
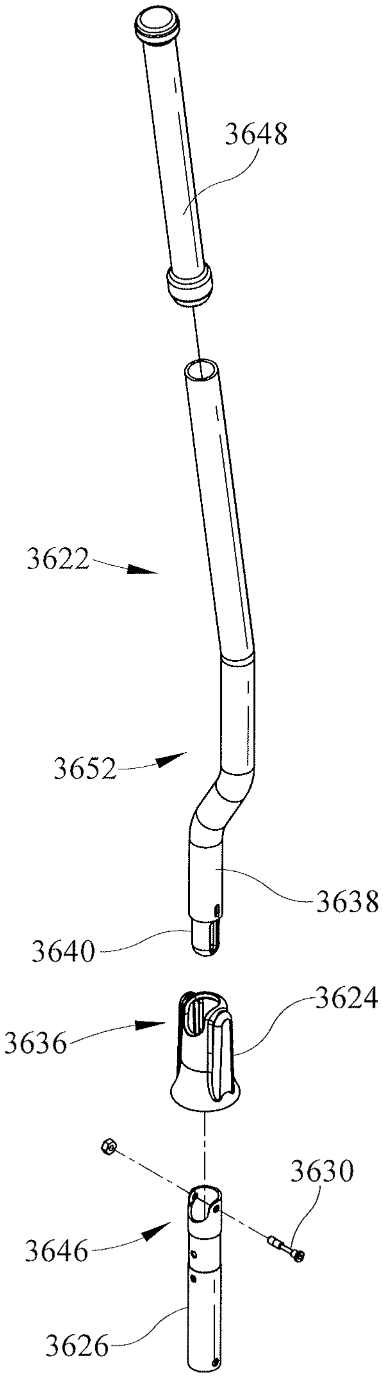
FIG. 33B is an exploded assembly view of another elongated push handle assembly for use with the patient support apparatus of FIG. 1.
Figure 34:
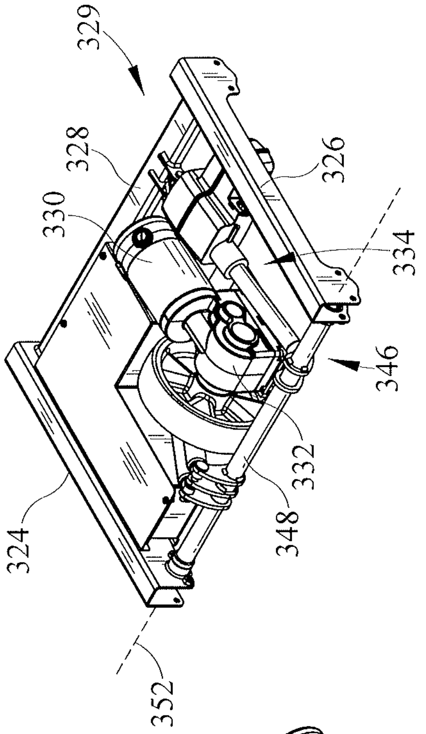
FIG. 34 is a perspective view of a portion of the powered auxiliary wheel of FIG. 12.
Figure 35:
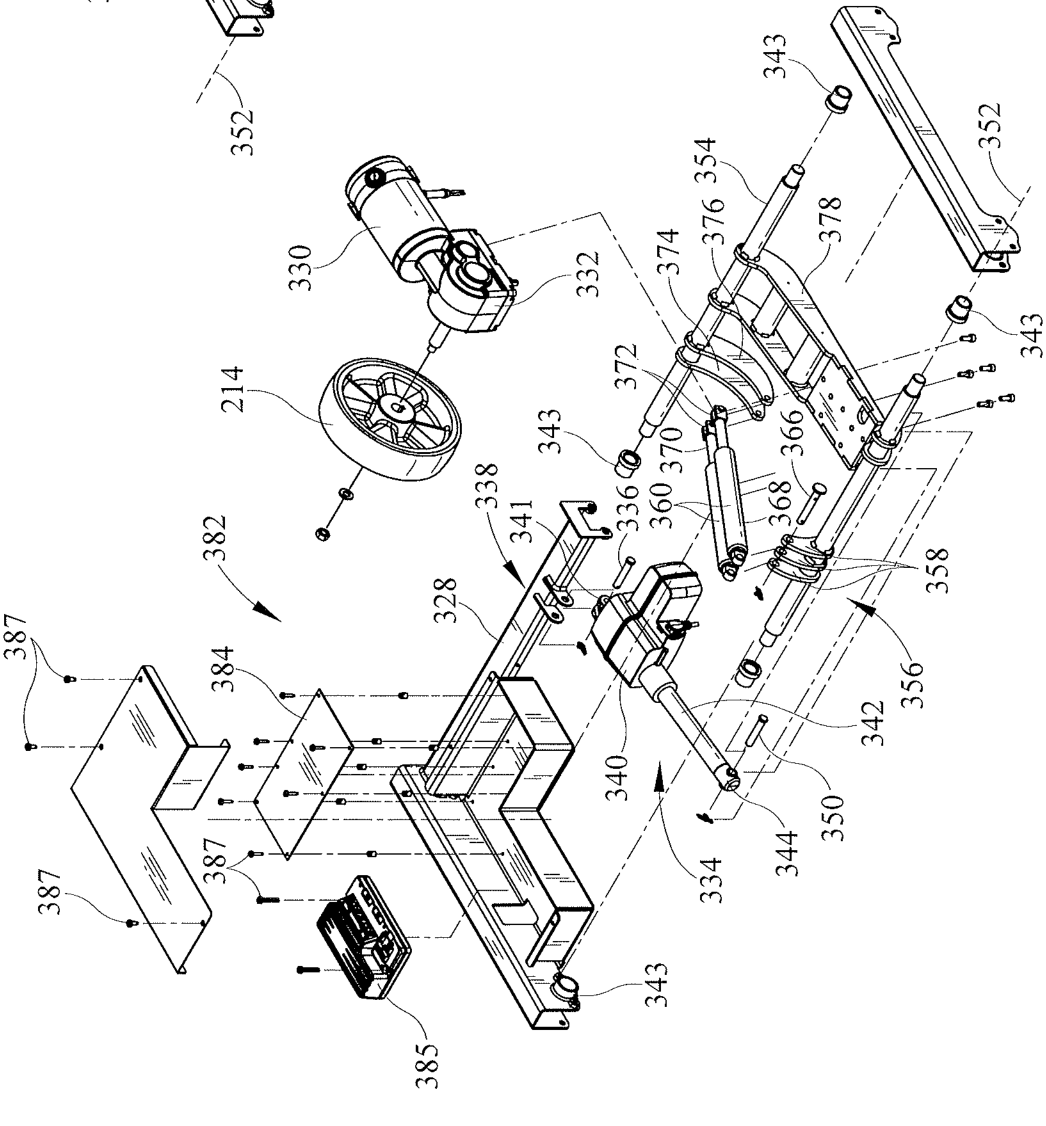
FIG. 35 is an exploded assembly view of the structure of FIG. 34.
Figure 47A:
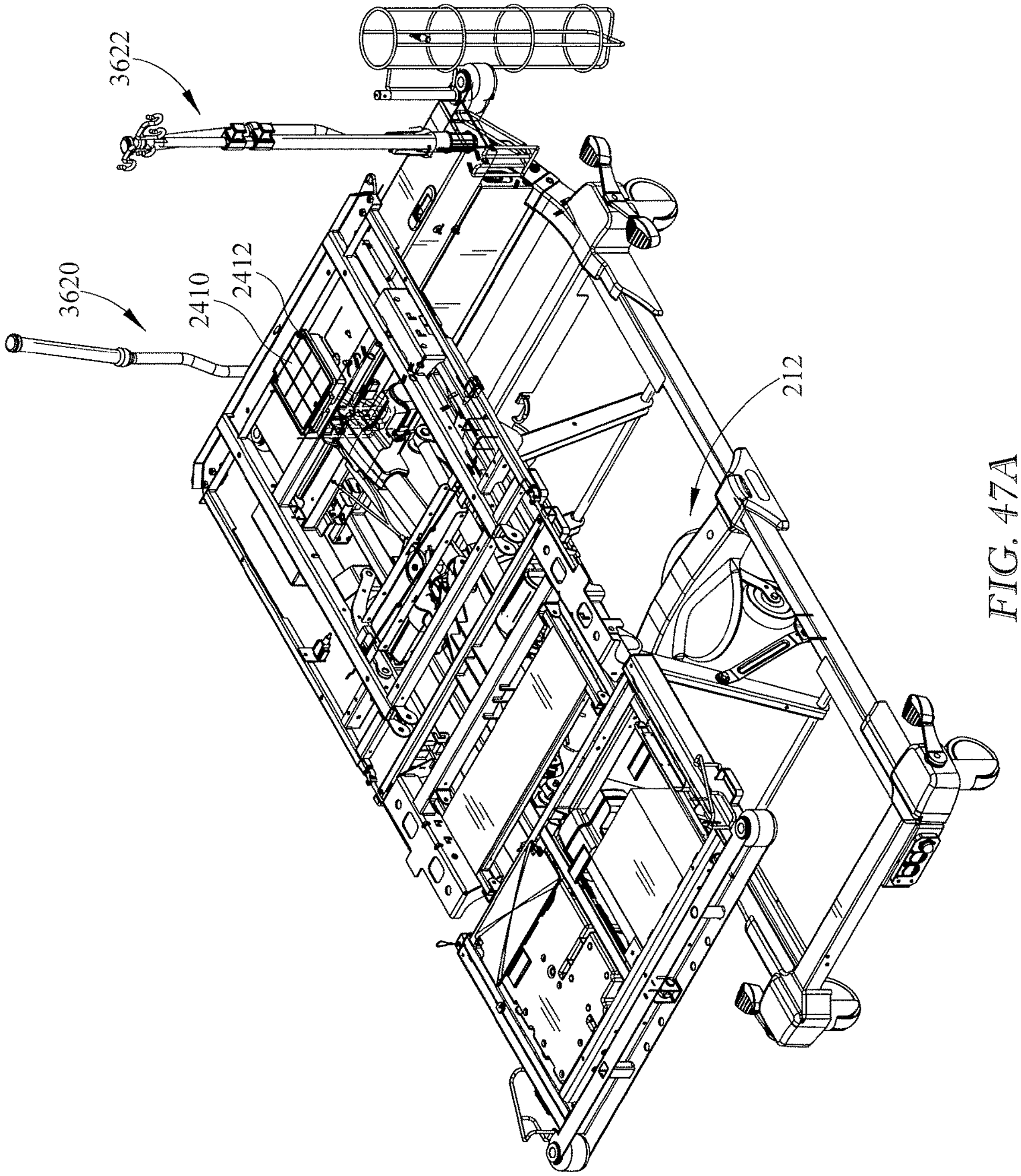
FIG. 47A is a perspective view of an embodiment of a patient support apparatus with including electrical enclosures to enclose portions of the electrical system of the patient support apparatus.

In some embodiments, the hospital bed 10 may include a pair of extended push handles 3620 and 3622 as shown in FIG. 47A. The extended push handles 3620, 3622 mount similarly to the push handles 394, 396 used for the powered drive wheel assembly 92. Referring to FIG. 33A the extended push handle 3620 includes a base shroud 3624 which overlies a stem 3626 which engages the mount tubes 402 on the base frame 20. An upper curved arm 3628 is received internally in the stem 3626 and a pin 3630 passes through a slot 3632 of the upper curved arm 3628 to secure the upper curved arm to the stem 3626. The pen 3630 is secured with a nut 3634. As seen in FIG. 33B the base 3624 includes a relief 3636 which accommodates a shaft 3638 of the upper arm 3628 when the push handle 3620 is folded over to a storage position. In use, the push handle 3620 is inserted such that the tip 3640 is seated in the inner diameter 3642 of the stem 3626. To stow the push handle 3620 the user pulls the push handle upwardly in the direction of arrow 3644 such that it clears the relief 3636 of the base and a relief 3646 of the stem 3626. The push handle is then capable of being laid down to a stowed position. A grip 3648 is positioned on an upper tube 3650. The push handle 3622 is structured similarly to the push handle 3620 with the principal difference being the direction of the bends in an upper arm 3652 of the push handle 3622 to accommodate clearance when the handles 3620, 3622 are stowed. The grips 3648 are elongated to allow for a larger variation in height of a user providing an improved ergonomic structure for persons who utilize the transport handles on the hospital bed 10.

Figure 36:
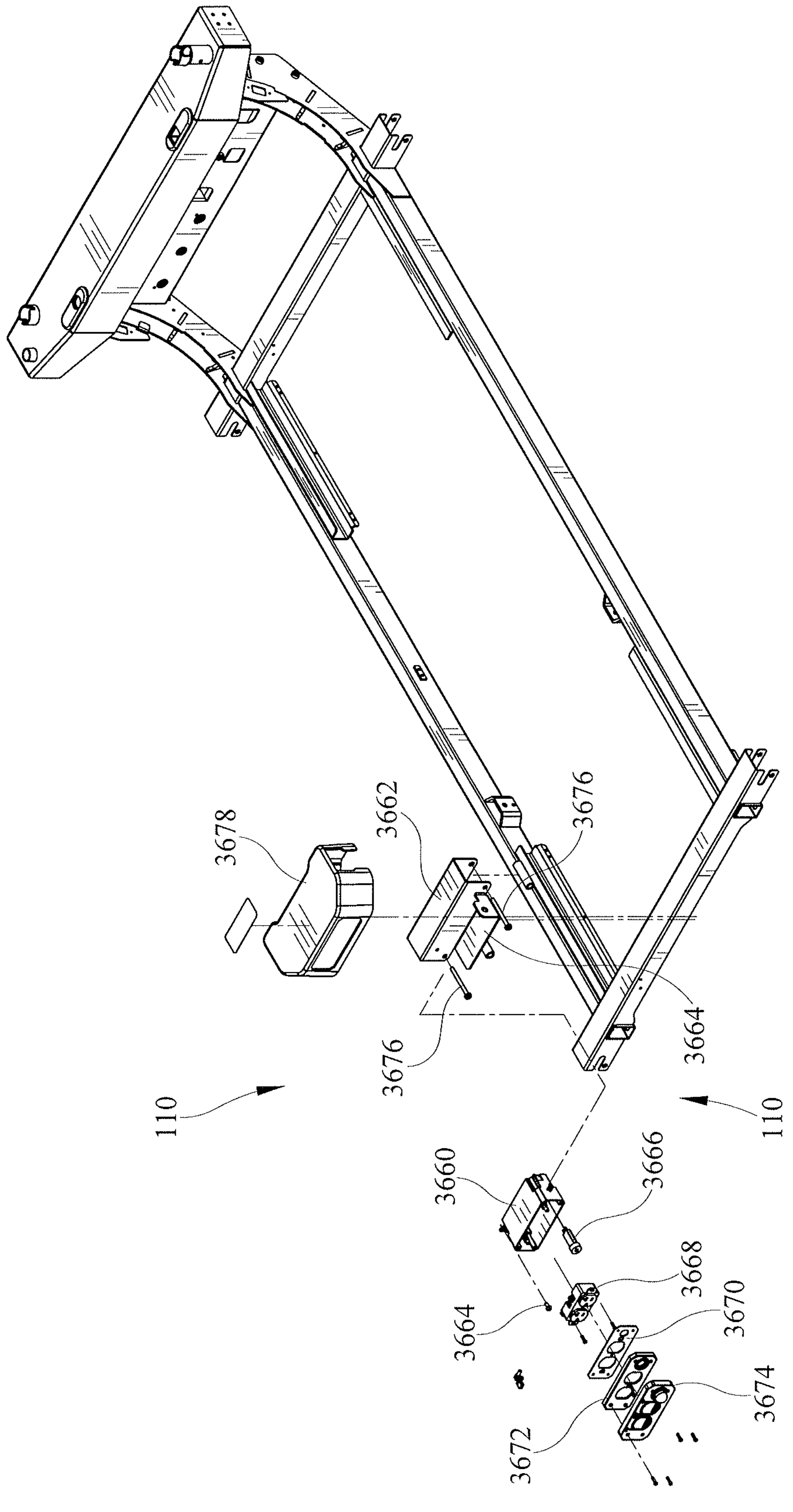
FIG. 36 is exploded assembly view of an auxiliary outlet assembly mounted on a base frame of the patient support apparatus of FIG. 1

In some embodiments, the hospital bed 10 includes the auxiliary outlet 110 positioned at the foot end 12 of the hospital bed 10 as shown in FIG. 1. The assembly of the auxiliary outlet 110 is shown in FIG. 36. While the cabling that provides power to the auxiliary outlet is omitted, should be understood that the auxiliary outlet 110 is powered independently of the electrical system of the hospital bed 10. The auxiliary outlet 110 includes a back body 3660 which is secured to a channel 3662 by screws 3664 a shelf 3664 is secured to the channel 3662 provides additional support for the back body 3660 in the event someone steps on the auxiliary outlet 110. A circuit breaker 3666 is positioned in the back body 3660 connected electrically as shown in FIG. 51. A duplex outlet 3668 is also positioned in the back body 3660. A gasket 3670 is positioned over the outlet 3668 and circuit breaker 3666, the gasket 3670 being covered by a standard cover 3672 which is then covered by a protective cover 3674 which protects against fluid ingress into the duplex outlet 3668. The channel 3662 is secured to the channel 144 of the base frame 20 by a pair of bolts 3676 and a shroud 3678 is positioned over the entire structure. The arrangement of the protective cover 3674 and the use of the shelf 3664 provides for a durable auxiliary outlet for the hospital bed 10. In addition, the addition of the circuit breaker 3666 which is accessible through the protective cover 3674 provides for improved safety and ease of use for users when equipment accidentally overloads the auxiliary outlet 110.

Figure 66:
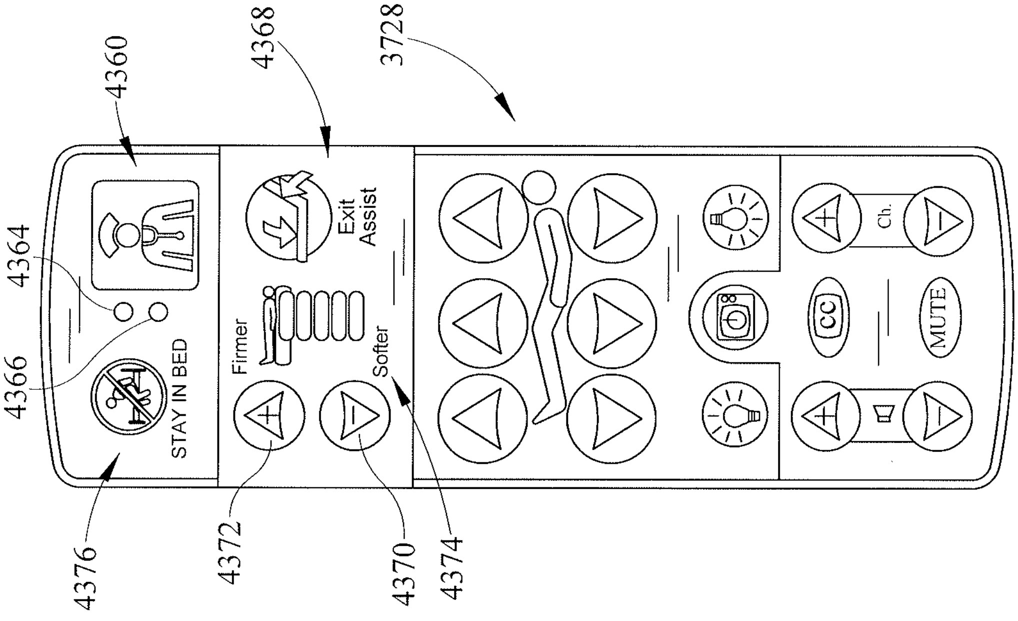
FIG. 66 is a diagrammatic representation of a panel for a patient pendant that functions with the patient support apparatus of FIG. 1.

A pendant 3700 shown in FIG. 46A includes a spring biased grip assembly 3702 shown in FIG. 46B. The spring biased grip 3702 functions similarly to the spring biased grip 2942, however the pendant 3700 utilizes a spring biased grip assembly 3704 which is removably detachable from a housing 3706 without disassembling the pendant 3700. The spring biased grip assembly 3704 is secured to a backside 3708 of the housing 3706 by a fastener 3710 which is screwed into a structure 3712, shown in FIG. 46C which prevents the fastener 3710 from entering into a cavity 3714 formed between the housing 3706 and a cover 3716 of the pendant 3700. This arrangement allows the spring biased clamp to be replaced if it is damaged without breaking the seal on the pendant 3700. This arrangement allows damaged pendants 3700 to have the grip assembly 3704 replaced without having to replace the entire pendant including the high-value circuit board 2724. The cover 3716 is formed to include a string the relief 3718 which engages a collar 3720 on a cable 3722 of the pendant 3700. The cover is secured to the body 3706 by three fasteners 3724 which are screwed into bosses 3726 formed in the housing 3706. Once assembled a membrane panel 3728 has a first flex circuit connector 3730 which is fed through an aperture 3732 two attached to a connector 3734 on the circuit board 2724. A second flex circuit connector 3736 is positioned through an aperture 3738 and connected to a connector 3740. The membrane panel 3728 is adhered to a surface 3742 of the cover 3716 to seal the apertures 3732 and 3738. An example of the functionality available in them membrane panel 3728 is shown in FIG. 66.

Figure 61:
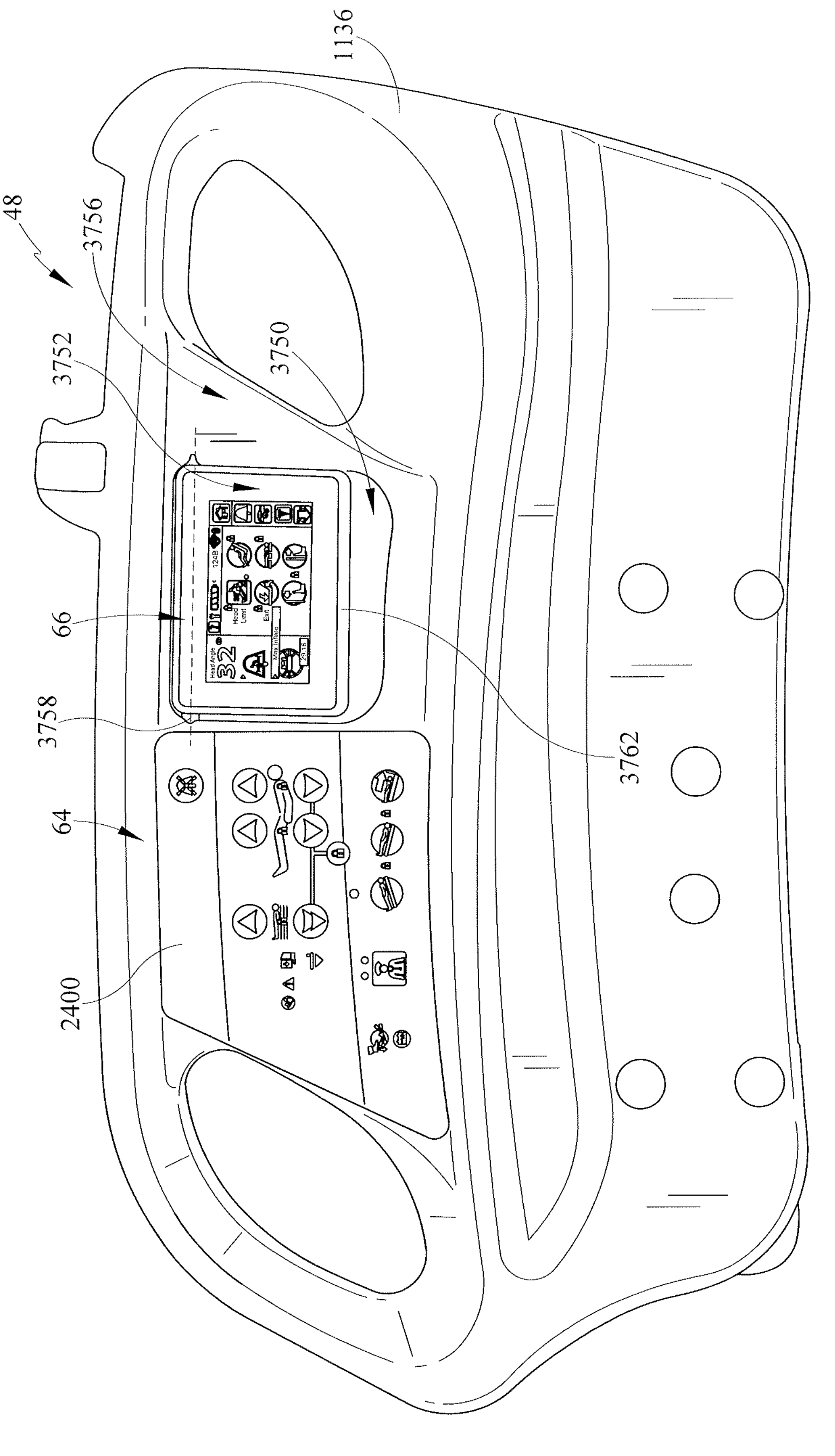
FIG. 61 is a plan view of a side rail of the patient support apparatus of FIG. 1.

Referring to FIG. 61, in one embodiment the hard panel 64 includes a membrane switch assembly 2400 that provides access to a number of standard functions of the hospital bed 10 for a caregiver. The graphical user interface 66 is shown to have a number of iconic symbols which provide information to the caregiver and operate as soft keys for the caregiver to activate functions of the hospital bed 10. A high-level menu structure 2402 for the graphical user interface 66 is shown in FIG. 67. Under normal operating conditions, the graphical user interface 66 will display a home screen 2404 that is subject to a five-minute timeout which results in the home screen 2404 being replaced by a sleep screen 2406. The menu driven controls include a set of surface controls 2408 which allow a user to interact with the controls for the mattress 1900. And alerts structure 2410 allows the user to interface with patient position monitoring functionality 2412 or chair exiting functionality 2414. A scale structure 2416 allows a caregiver to access the operation of the scale system to utilize a zeroing function 2418 including the ability to zero the hospital bed 10 for a new patient under a structure 2420 or zero the hospital bed 10 for the same patient under menu structure 2422. In addition, the scale structure 2416 allows a user to access a weighing menu structure 2424. A Bluetooth® menu structure 2426 allows a user to managing the pairing of devices with the Bluetooth® functionality of the hospital bed 10. A charting menu structure 2428 provides a menu structure for a caregiver to chart information available from the control system 402 external networks connected to the hospital bed 10. The menu structure 2402 includes a menu structure 2430 which allows a caregiver to adjust various preferences relative to the graphical user interface 66 and hospital bed 10. Menu structure 2432 is available for a caregiver to understand the operation of the graphical user interface 66 and hospital bed 10. And a menu structure 2434 allows a user to adjust operations of a sequential compression device when such a device is attached to the hospital bed 10.

Figure 68:
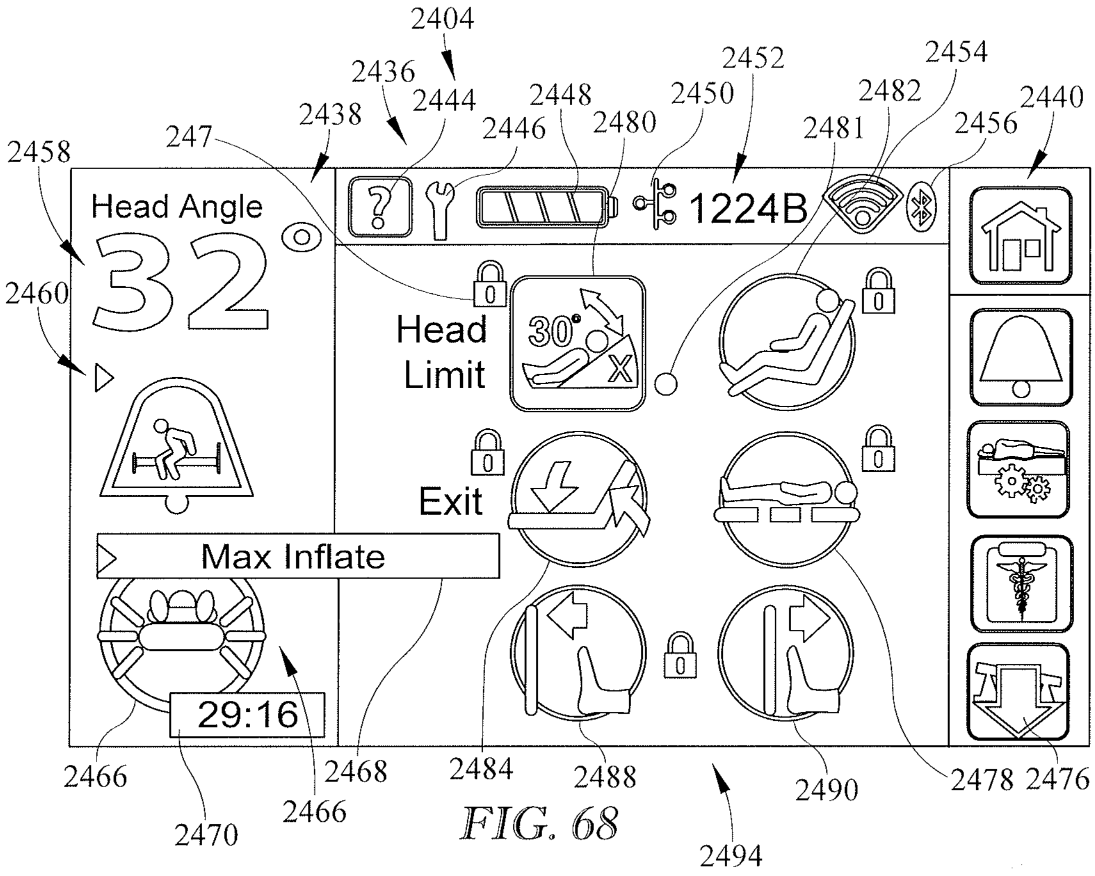
FIG. 68 is a screenshot of a home screen of the menu structure of FIG. 67.
Figure 69:
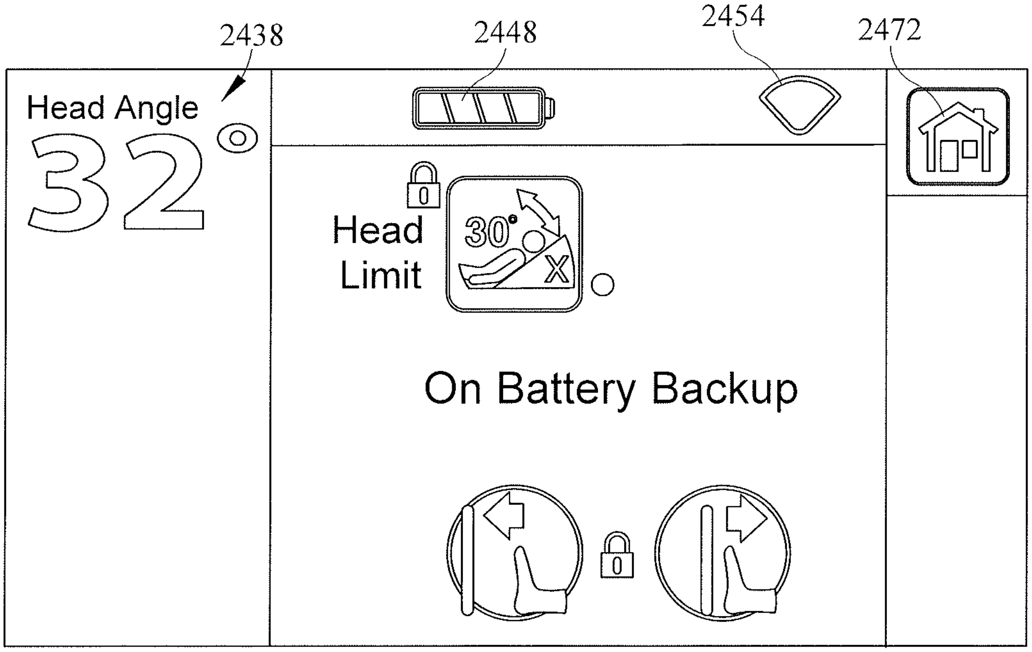
FIG. 69 is a screenshot of a of a home screen displayed on a graphical user interface when the patient support apparatus is on battery power.

The home screen 2404 is shown in detail in FIG. 68 and includes an information section 2436, a status section 2438, a menu section 2440, and an interaction section 2442. The information section 2436 includes a help screen icon 2444 which activates the help screen when touched by user. In addition a maintenance indicator 2446 provides an indication that the hospital bed 10 requires maintenance. A battery status indicator 2448 displays a graphical representation of the charging status of a battery for the hospital bed 10. A network indicator 2450 is illuminated when the hospital bed 10 is connected to an external network, such as a nurse call network; including the NaviCare® nurse call system available from Hill-Rom, for example. When the hospital bed 10 is connected to a network that includes location information, the room number or other location identifying information is displayed on the information section 2436 as indicated by reference numeral 2452. An icon 2454, when present, provides an indication that the hospital bed 10 is connected to a Wi-Fi® system. Similarly, an icon 2456, when present, provides an indication of the hospital bed 10 is connected to another device via a Bluetooth® connection.

A status section 2438 includes an indicator 2458 which provides a display of the current head angle of the hospital bed 10. A location 2460 of the status section 2438 provides an indication that that the hospital bed 10 is monitoring for an alert condition, such as an alert condition assisted with a patient position monitoring system. For example, the icon 2462 shown in FIG. 68 provides an indication that the patient position monitoring system is set to alert if the patient exits the hospital bed 10. A third portion 2464 of the status section 2438 provides the indication of the status of a subsystem, such as an operating condition of the mattress 1900. An icon 2466 provides an iconic representation of the status of the mattress 1900 being in a maximum inflate mode. The icon 2466 may have components that flash, blank, illuminated in sequence, or otherwise provide an animated indication that a status is active. In addition, a text box 2468 is displayed to indicate the condition in a text form. In the case of the maximum inflate mode, a second text box 2470 displays a timer indicating the amount of time that the system will permit the mattress 1900 to be maintained in the current state. In some embodiments, the text box 2468 is omitted and only an icon, such as the icon 2466 is displayed. The text box 2470 may not be present if there is no limit on the time for the mattress 1900 to be in the current condition. While the status section 2438 in the illustrative embodiment of FIG. 68 displays information regarding alerts at the location 2460 and a status of the mattress 1900 at the location 2464, in other embodiments the status of other subsystems may be displayed within the status section of the home screen 2404.

Figure 71:
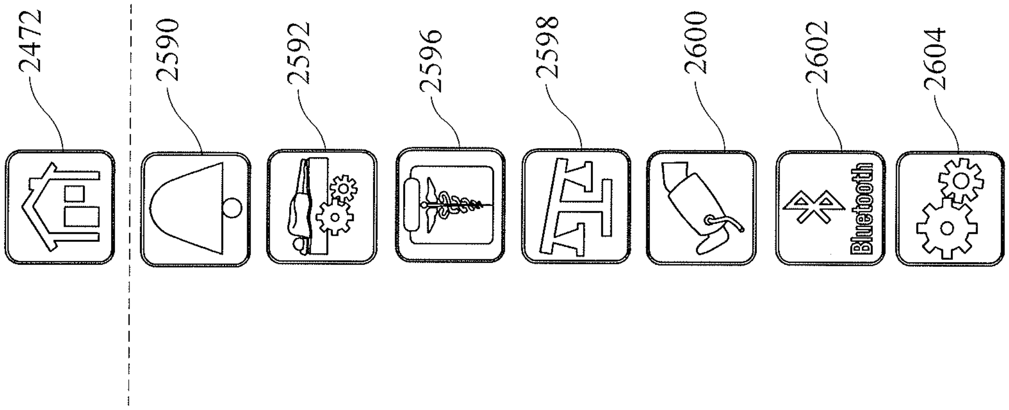
FIG. 71 is an illustration of the various functions available within the menu structure of FIG. 67.
Figure 73:
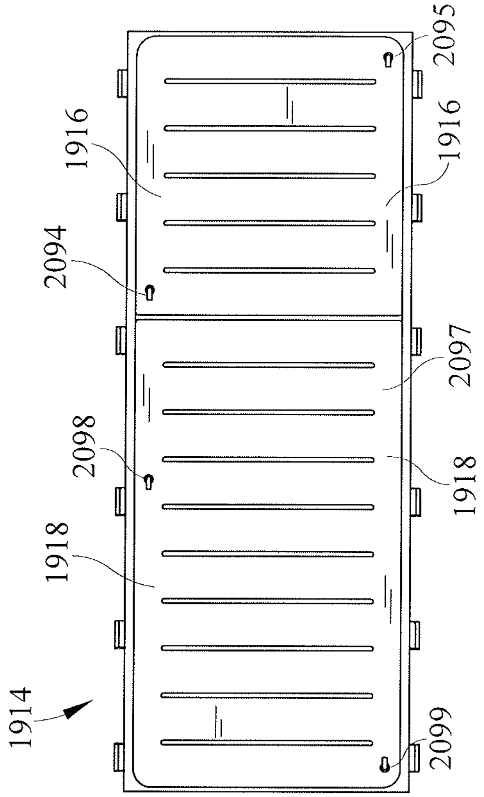
FIG. 73 is a plan view of the top of a bottom layer of the body support of the mattress of FIG. 40.
Figure 72:
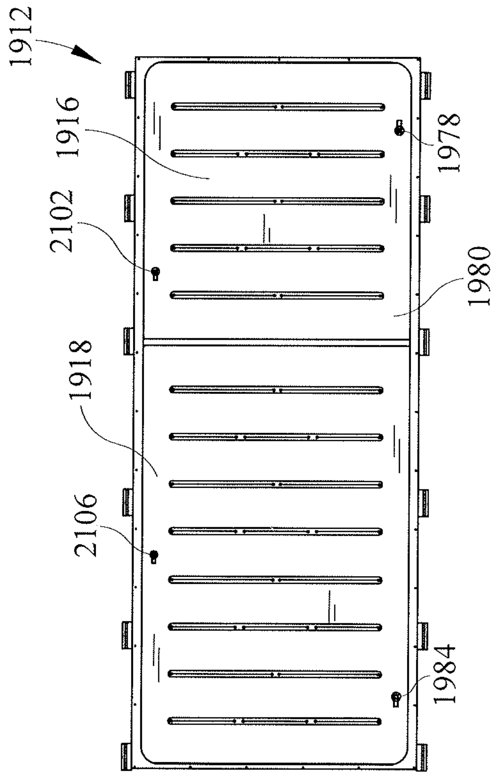
FIG. 72 is a plan view of the bottom of an upper layer of a body support of the mattress of FIG. 40.

The menu section 2440 of the home screen 2404 includes a home screen icon 2472 which is generally always present on the display of the graphical user interface 66. When the home screen icon 2472 is activated by a caregiver, the home screen 2404 is displayed. A section 2474 of the menu section 2440 includes a number of icons which may be scrolled through by activating an arrow icon 2476 positioned at the bottom of the section 2474. The icons of the section 2474 are shown in FIG. 71 in the order that they appear in the section 2474. An alerts icon 2590, when activated, causes the alerts menu structure 2410 to become active in the interaction section 2442. A surface icon 2592, when activated, causes the menu structure 2408 to become active in the interaction section 2442. Activation of a charting icon 2596 causes the charting menu structure 2428 to become active in the interaction section 2442. Activation of the scale icon 2598 causes the scale menu structure 2416 to become active in the interaction section 2442. The SCD icon 2600 is associated with the SCD menu structure 2434. The Bluetooth® icon 2602 causes the Bluetooth® menu structure 2426 to be displayed in the interaction section 2442. Activation of preferences icon 2604 causes the preferences menu structure 2430 to become active in the interaction section 2442.

The interaction section 2442 displays up to six functions which may be activated by a caregiver from the home screen 2404. An icon 2480 is associated with a head angle limit alert and when activated will cause a warning to be displayed if the angle of the head deck 28 relative to the relative to the load frame 26 is lowered below 30°. This function may be activated if the patient has a risk factor that requires the patient's upper body to be maintained in an upright position. When the head limit is activated an indicator 2481 adjacent the icon 2480 is illuminated. In some cases, modification of the head limit may be restricted. The operation of the hospital bed 10 may be adjusted so that activation and deactivation of the head limit by icon 2480 is locked out so that an inadvertent activation of the icon 2480 does not toggle the alert monitoring to an off position. When a function, such as the head limit the function, is locked out, a lockout indicator 2478 is displayed adjacent the icon for the particular function.

An icon 2482 may be activated by a caregiver to cause automatic movement of the head deck 28, articulated seat deck 30, and foot deck 34 to a chair position, such as the position shown in FIG. 10. Activation of the icon 2482 may also cause the lift system to operate such that the foot end 12 of the load frame is lowered relative to the head end 14. Activation of the icon 2484 will cause the head deck 28 to be raised with the remainder of the hospital bed 10 placed in a flat condition to ease the exiting of the hospital bed 10 by a patient. In some embodiments, activation of the icon 2484 may also affect the operation of the mattress 1900 when it is present. For example, activation of the icon 2484 may cause the body support 1902 to be inflated to a pressure higher than normal to cause the body support 1902 to be stiffer and improve the support of the patient's buttocks as they are exiting the hospital bed 10. Activation of the icon 2486 will cause the head deck 28, articulated seat deck 30, and foot deck 34 to be placed in a flat condition while also causing the lift system 22 to be moved to cause the load frame 26 to be in a horizontal position. The interaction section 2442 also displays a foot retraction control section 2494 which includes an icon 2488 which may be activated to cause the foot deck 34 to be extended and an icon 2490 which may be activated to cause the foot deck 34 to be retracted. Some of the icons displayed in the interaction section 2442 of the home screen 2404 may not be present if the associated functionality is omitted from the hospital bed 10. For example, some embodiments of hospital bed 10 do not include a powered foot deck 34, and therefore the foot retraction control section 2494 would not be present in those embodiments.

When the hospital bed 10 is disconnected from a mains power source, the hospital bed 10 may be operated by the batteries 2746, 2748. When the hospital bed 10 is on battery power, the interaction section 2442 displays the text "On Battery Backup" in the center of the interaction section 2442. The head limit icon 2480 and associated indicator 2481 are also displayed as that function remains active. In addition, the foot control retraction section 2294 remains displayed because that function is also available under battery backup. The home screen icon 2472 remains visible such that a caregiver is allowed to activate the home screen 2404. However, the home screen 2404 will revert to the battery backup screen 2492 after a period of time of no interactions with the home screen 2404, such as a time period of 30 seconds, for example. The other functions that appear on the home screen 2404 are not displayed when the hospital bed 10 is on battery backup as those functions are not available under battery power. Any motion of any portion of the hospital bed 10 has to be engaged individually by the keys on the hard panel 64.

In some embodiments, if any of the icons 2480, 2482, 2484, 2486, 2488, or 2496 are activated, animated arrows or other indicators may appear within the icon to indicate that the function is being activated.

Referring now to FIG. 61, the side rail 48 is shown with the graphical user interface 66 positioned in a cavity 3750. The graphical user interface has a surface 3752 on the front of the cover 3754, which is generally flush with the surface 3756 of the body 1136 of the side rail when the graphical user interface 66 is stowed. The graphical user interface 66 is pivotable about an axis 3758 if it is gripped by a user at the bottom 3762 and lifted upwardly about a pivoting structure that will be described in further detail below. The axis 3758 is defined by an opening 3760 shown in FIG. 137, the opening 3760 being formed in a wall in the cavity 3750. A second opening, not visible, is aligned with opening 3760 on the opposite side of cavity 3750.

The graphical user interface 66 may be positioned in a cavity of side rail 50 that is a mirror image to the cavity 3750. Because of the mirror image aspect, the graphical user interface 66 interfaces with the circuit board 1182 on its left head rail 48, but the circuit board 1182 is to the right of the graphical user interface 66 on the right head rail 50. The switching of hands presents a problem with regard to biasing the graphical user interface 66 to the stowed position of FIG. 61. This is addressed by the use of a two-directional torsional spring 3770 shown in FIG. 84. The graphical user interface includes a housing 3740 and the cover 3754 which support the electrical components of the graphical user interface 66. The circuit board 67 is secured to the housing 3740 by a number of screws 3768. The housing cover 3754 supports a display 65 in a frame 3764 formed by the cover 3754. The display 65 is covered by a bezel 3766.

The housing 3740 and cover 3764 relative to the body of the respective side rails on an axle 3762 and a bushing 3786. The bushing 3786 is received in a cutout 3792 formed in the cover 3754. Another cutout, not visible, is formed on the opposite side of the cover 3754. The bearing protects a wire harness 3788 which connects to the circuit board 67 by reducing the contact the cable has with moving parts. The axle 3762 is received in the opening 3760 and supports rotation of the remainder of the graphical user interface about the axis 3758. The torsion spring 3770 includes an arm 3776 that's received in a cavity 3778 formed in the housing 3740. The spring 3770 has a group of right-hand wrapped coils 3772 and a group of left hand wrapped coils 3774 interconnected by an arm 3776. The right-hand coil group has a tab 3780 formed on the end thereof. Similarly the left-hand coil 3774 has a tab 3072 formed on the end of it. The tabs 3782 3780 and engage the axle 3762 or bushing 3786 in an anti-rotation feature 3784. A compression spring 3794 provides bias towards the axle into the opening 3760 and maintain engagement with the body 1136 through the action of the compression spring 3794.

Figure 84:
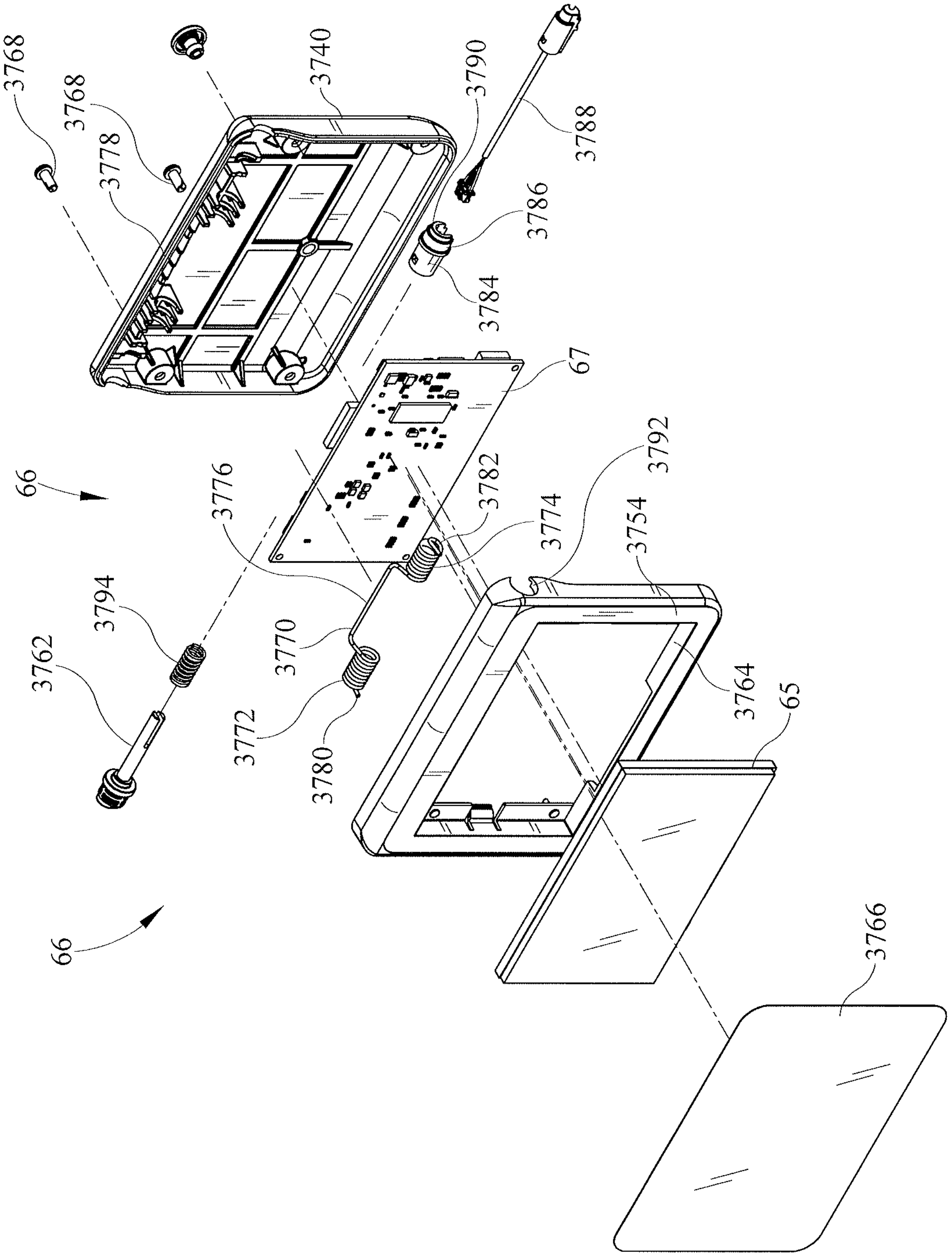
FIG. 84 is an exploded assembly view of a graphical user interface for use on a right head side rail of the patient support apparatus of FIG. 1.
Figure 85:
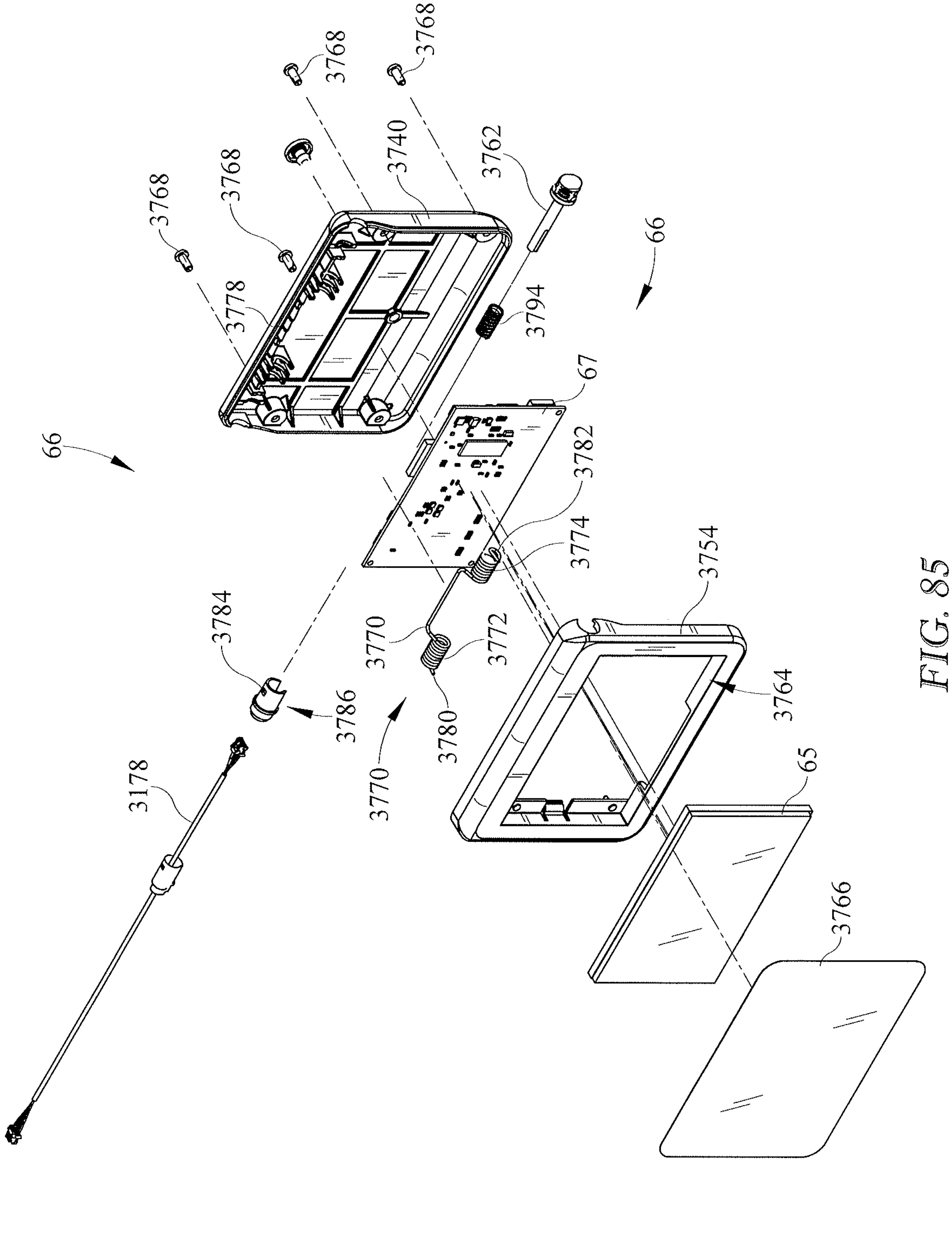
FIG. 85 is an exploded assembly view of the graphical user interface for use on a left head side rail of the patient support apparatus of FIG. 1.

When the graphical user interface 66 is pivoted about the axis 3758, the right hand coils 3772 of the spring 3770 biases against the lifting of the graphical user interface 66 in the embodiment of FIG. 84. However, because of the mirror image aspect of side rail 50 relative to side rail 48, the axle 3762 must be positioned on the right side of the housing 3742 appropriately engage in opening similar to the opening 3760. Because the spring 3770 has both right-hand coils 3772 and left-hand coils 3774, the spring 3770 can be used for either a left-hand or right-hand version of the graphical user interface 66 without the need for having different parts for the assemblies, thereby reducing the cost and complexity of assembly of the graphical user interface 66, regardless of which side of the hospital bed 10 it is on.

Referring to FIG. 102, the overhead arm 2842 may support a device 2890 which permits the patient to undertake medication within the patient care environment through a graphical user interface 2900 that includes additional functionality. For example, as shown in FIG. 353, the functionality may include the ability for the patient to order food and drink 3780, keep track of personal items 3782, order hospital items 3784, make adjustments to the hospital bed 10 or room environment 3786, request assistance with personal care 3788, engage in communication external to the patient room 3790, indicate a need to egress from the patient support apparatus 2810 at icon 3792, report a problem 3794, contact other caregiver representatives 3796, or update their perceived pain 3798, among other items. Further details of the communications capabilities of the device 2900 may be found in U.S. patent application Ser. No. 14/177,851, filed Feb. 11, 2014 and titled "Workflow Canvas for Clinical Applications," which is hereby incorporated in its entirety by reference herein. In some embodiments, the graphical user interface three 900 may be in direct contact with the control system 400 of the hospital bed 10 through either a wired, or wireless connection.

Figure 74:
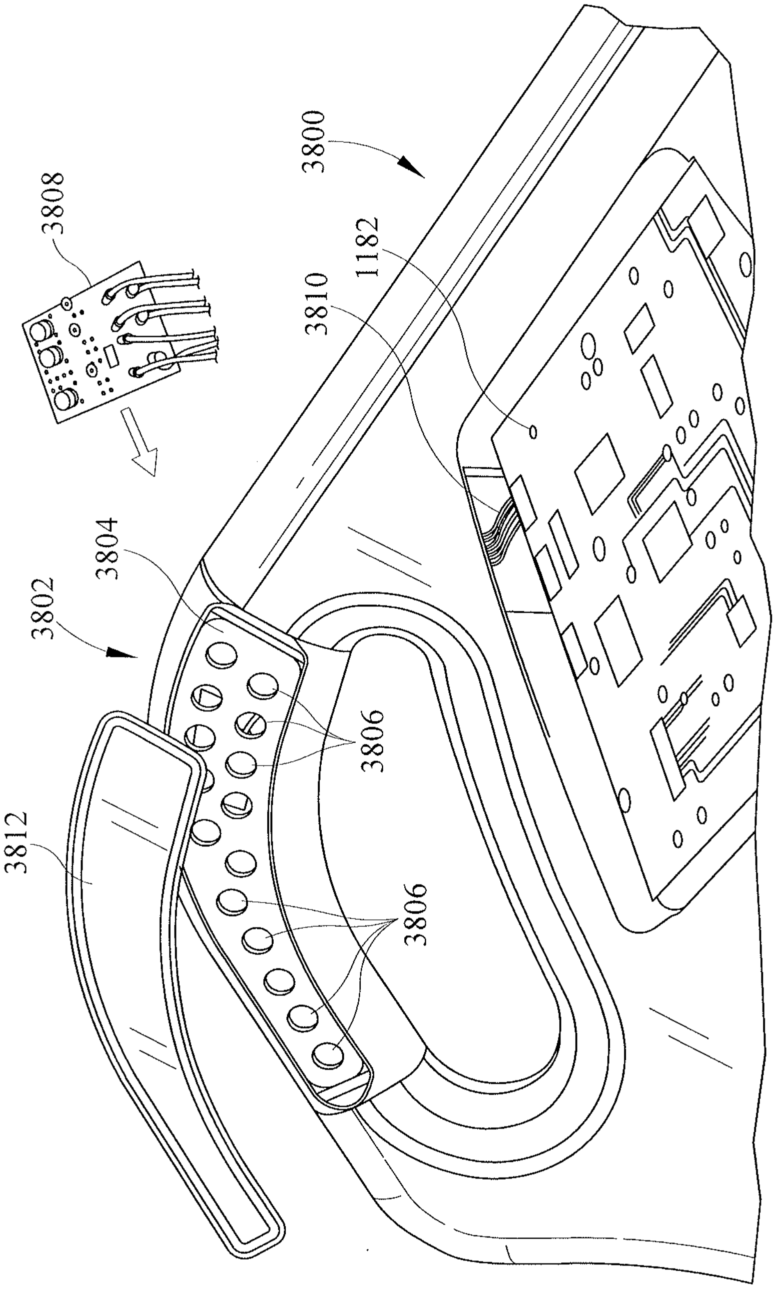
FIG. 74 is an exploded assembly view of a side rail including a grip may be illuminated in response to conditions on the patient support apparatus.
Figure 75B:
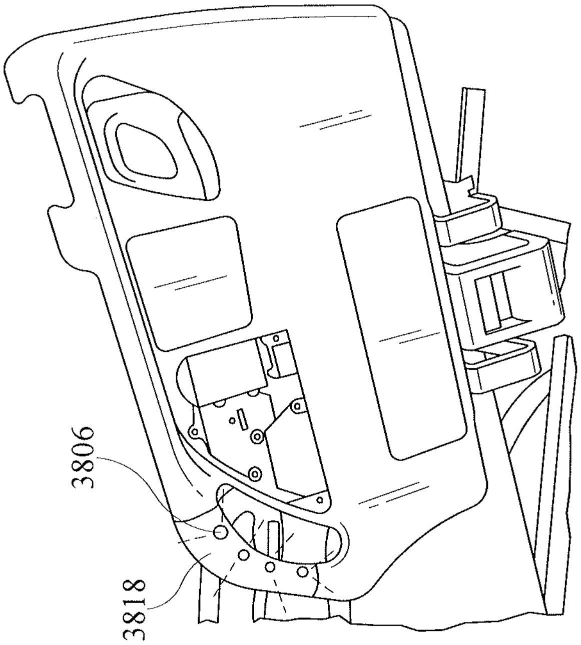
FIG. 75B is a view similar to FIG. 75A, with the grip illuminated.
Figure 75A:
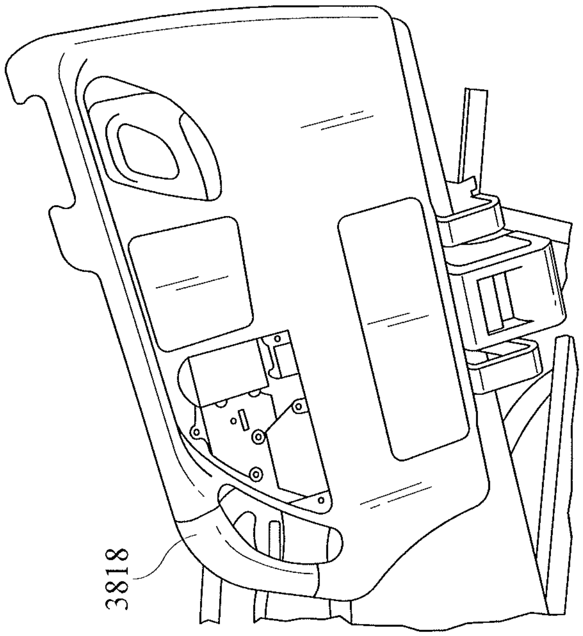
FIG. 75A is a view of a side rail including a grip that may be illuminated, the grip and not illuminated.
Figure 76B:
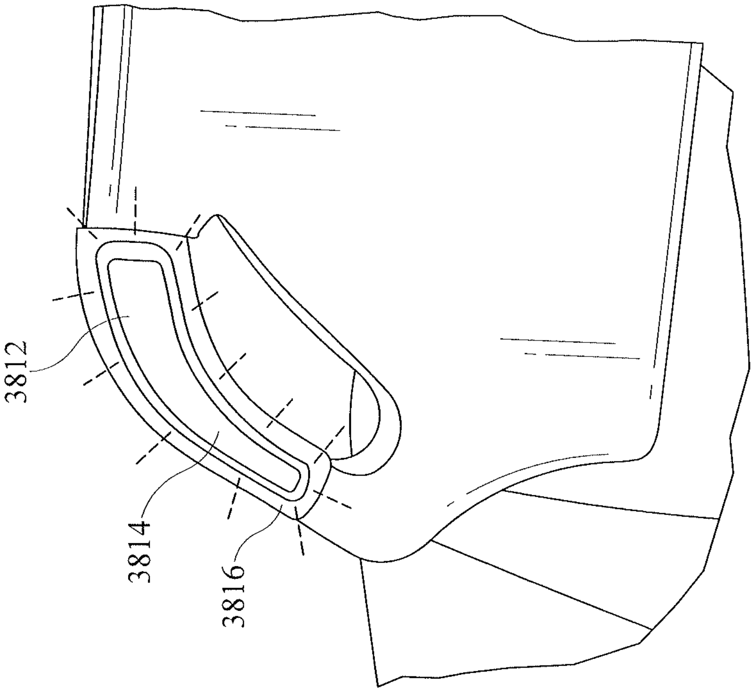
FIG. 76B is a view similar to FIG. 76A, FIG. 76B illustrating the grip being illuminated.
Figure 76A:
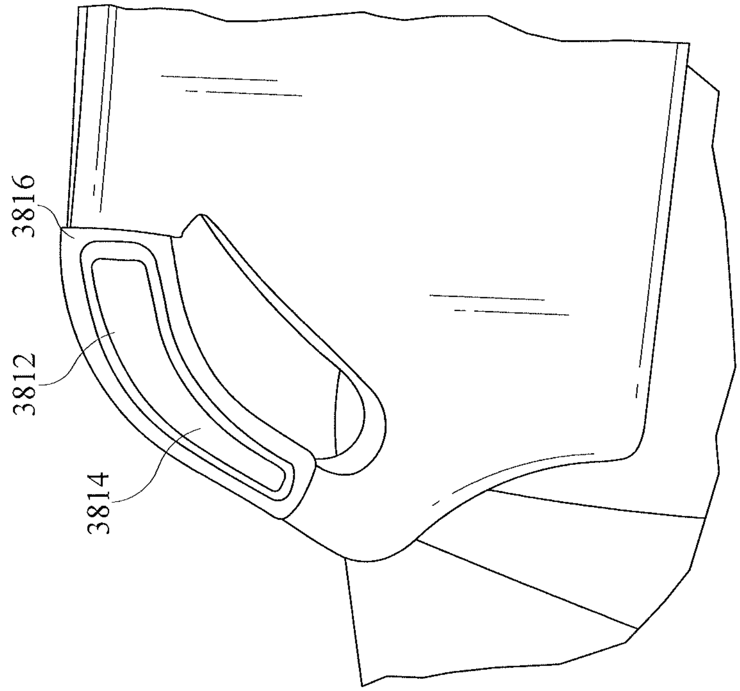
FIG. 76A is a partial view of a grip of a side rail that in includes an illuminated indicator.

Referring now to FIG. 74, another embodiment of a side rail 3800 is configured to have an illuminated grip 3802 includes a depression 3804 formed on the outer side of the grip 3802. A number of holes 3806 are formed in the grip at the depression a circuit board assembly 3808 which includes a number of different color LEDs that operate under the same logic as discussed above with regard to the notification system 796. The circuit board assembly 3808 is connected to the circuit board 1182 by a wire harness 3810. The translucent overlay 3812 is positioned into the depression 3804 to thereby fill the depression 3805 and provide a smooth surface at the grip 3802 as shown in FIG. 76A. In the embodiment of FIG. 76A-76B, the overlay 3812 has an opaque region 3814 with a translucent area 3816 about the opaque section 3814. As suggested by FIG. 76B the light emitted by the diodes on the circuit board 3808 emit from the translucent area providing a subdued effect. In another embodiment shown in FIG. 75A an overlay 3818 is a solid translucent material which permits the holes 3806 two appear much more clearly when the LEDs illuminate. In some environments a brighter illumination such as that suggested by the overlay 3818 may be appropriate. In other instances, the overlay 3812 may be more appropriate to provide the subdued lighting effect.

Figure 62:
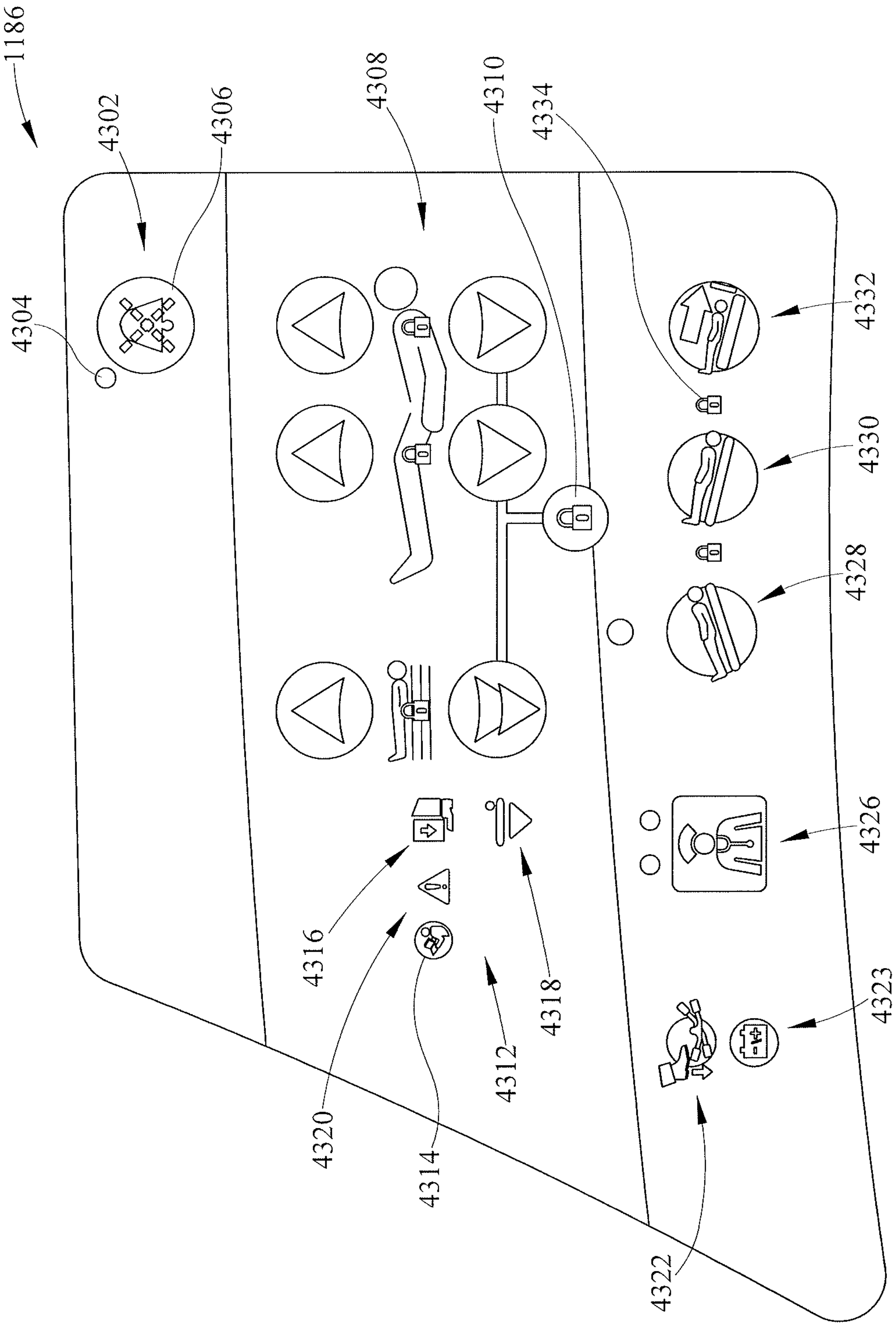
FIG. 62 is a diagrammatic representation of a fixed panel for a side rail.
Figure 63:
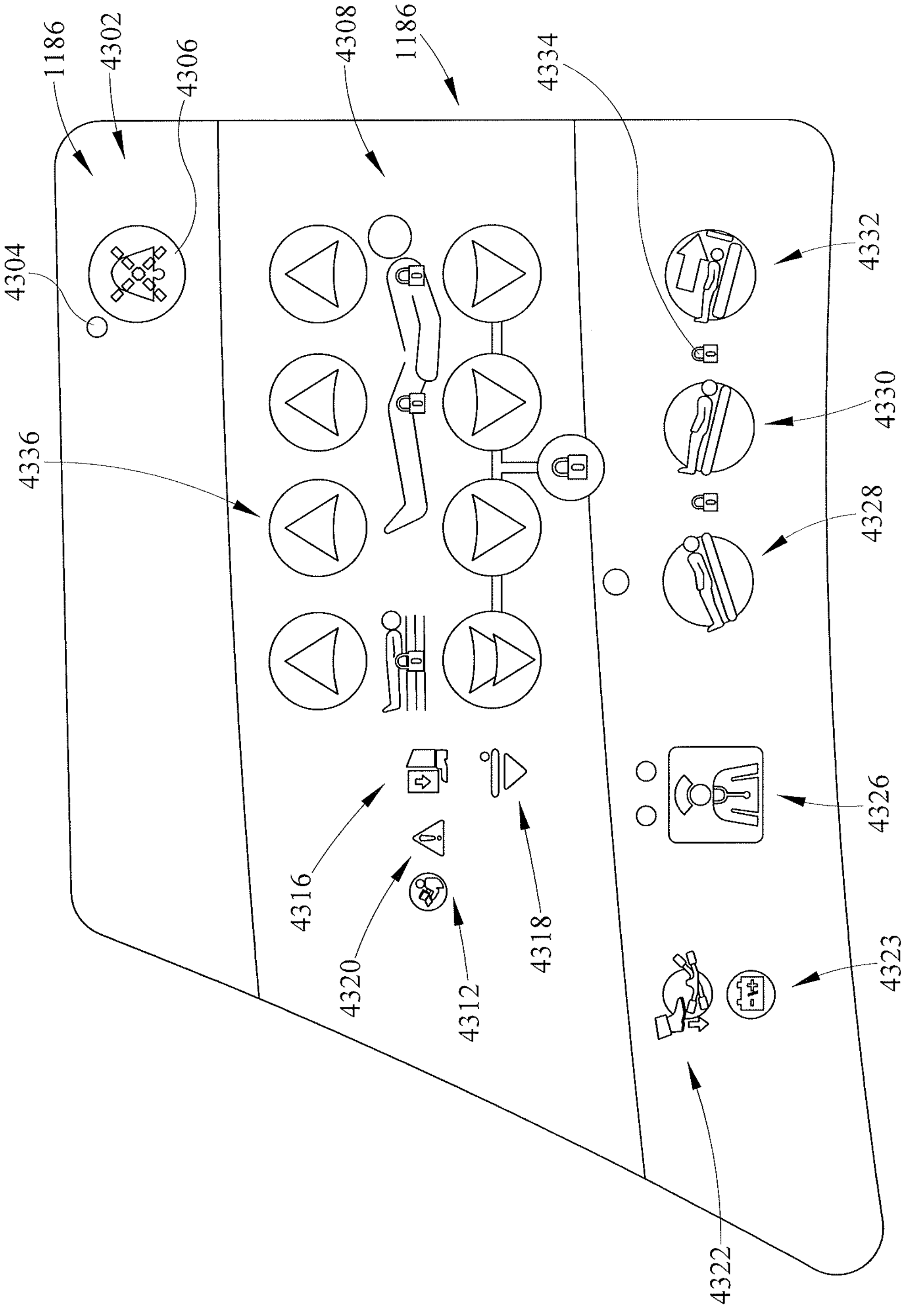
FIG. 63 is a diagrammatic representation of another embodiment of a fixed panel for a side rail.

One detailed embodiment of a caregiver membrane panel 1186 that can be positioned on the left head side rail at position 64 is shown in FIG. 62. The hard panel includes an indicator 4302 which provides an indicator light 4304 to indicate if the patient position monitoring alert system set, and a hard switch 4306 that allows the caregiver to pause or silence the alert. The hospital bed 10 articulation section 4308 is relatively typical and includes a lockout switch 4310 which permits a caregiver to lock functions of the hospital bed 10 such that a patient or visitor cannot operate the powered portions of the hospital bed 10. An indicator section 4312 includes a reading light indicator 4314 warning indicator 4316 to inform the caregiver that the upper frame 24 and load frame 26 are being lowered. A hospital bed 10 down indicator 4318 to provide an indication to the caregiver as to whether the hospital bed 10 is in a low position. An indicator 4320 informs a caregiver if there are any alarm conditions. Indicator 4322 provides an indication as to whether the hospital bed 10 is in a steer mode. Indicator 4323 provides an indication as to whether not the hospital bed 10 is on battery power. A nurse call interface 4326 provides a standard nurse call interface allowing the nurse to respond to alarms and silence the nurse call. Buttons 4328, 4330, and 4332 all provide a one touch activation of reverse tilt, tilt, and a boost position which is used to help reposition a patient in the hospital bed 10. A lockout indicator 4334 is positioned adjacent every function that can be locked out and provides an indication that the function is locked out when the indicator 4334 is illuminated. Another panel 1186 is shown in FIG. 63 and includes all of the functionality of the embodiment of FIG. 62, further includes leg articulation functionality 4336.

Figure 64:
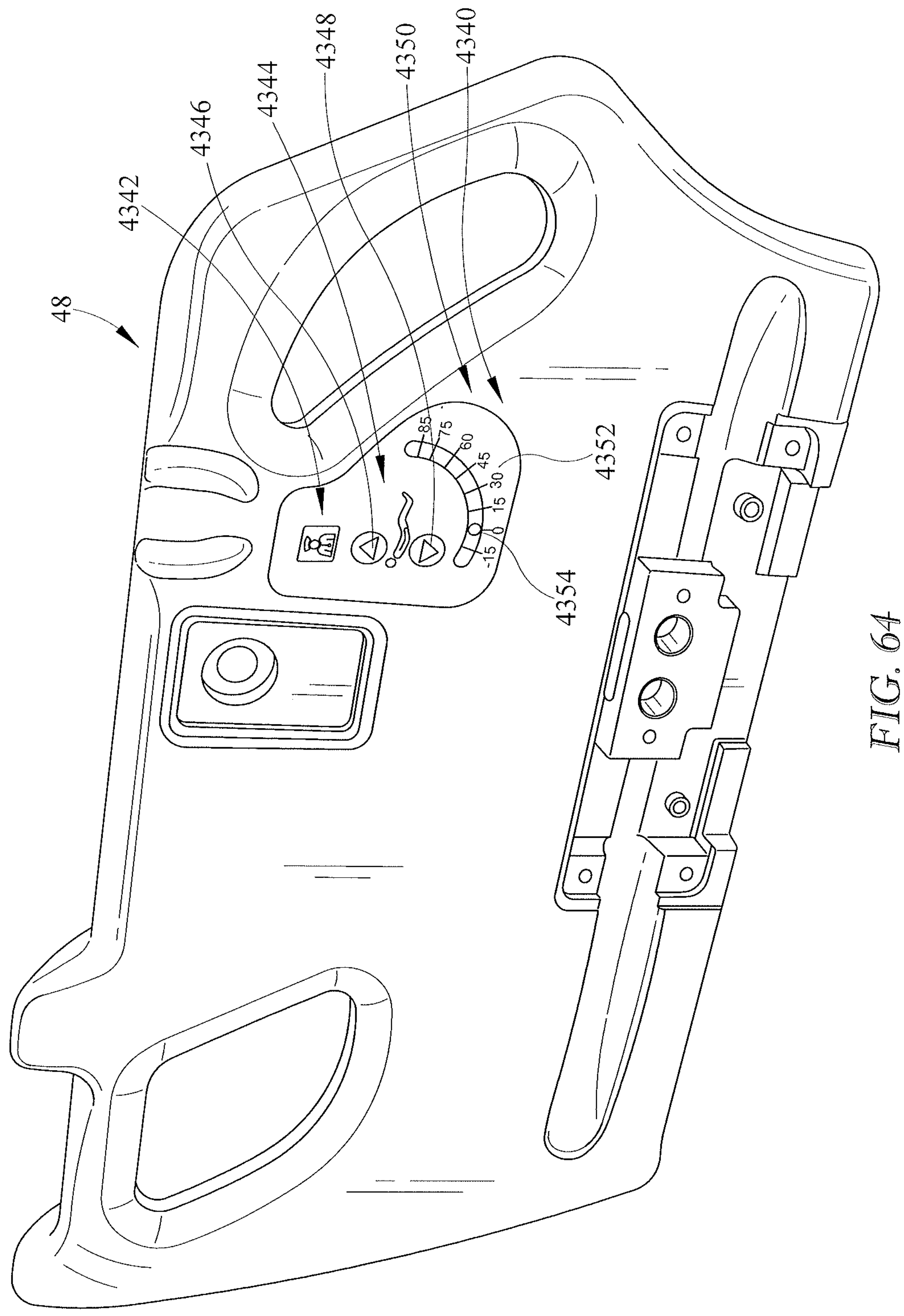
FIG. 64 is a plan view of a side rail of the patient support apparatus of FIG. 1 showing a patient interface.

A side rail 48 is shown in FIG. 64 specifically for the purpose of showing the patient interface 4340 which includes a nurse call button 4342 that can be activated to call for a nurse. The patient interface 4340 also includes a head movement section 4344 which allows the patient to either raise the head with the button 4346 or lower the hospital bed 10 with the button 4348 the interface is unique in that it also includes a patient side head elevation indicator 4350 which includes creations of head angle in degrees at 4352 and a ball 4354 that roles in the channel as the head section raises and lowers to provide a patient a direct indication of the elevation of their head section. This permits the patient to take part in their care by having their head raised sufficiently to prevent or reduce the chance for hospital acquired pneumonia, but also provides the patient the opportunity to return the head deck 28 to their preferred elevation if the head deck 28 gets moved.

Figure 65:
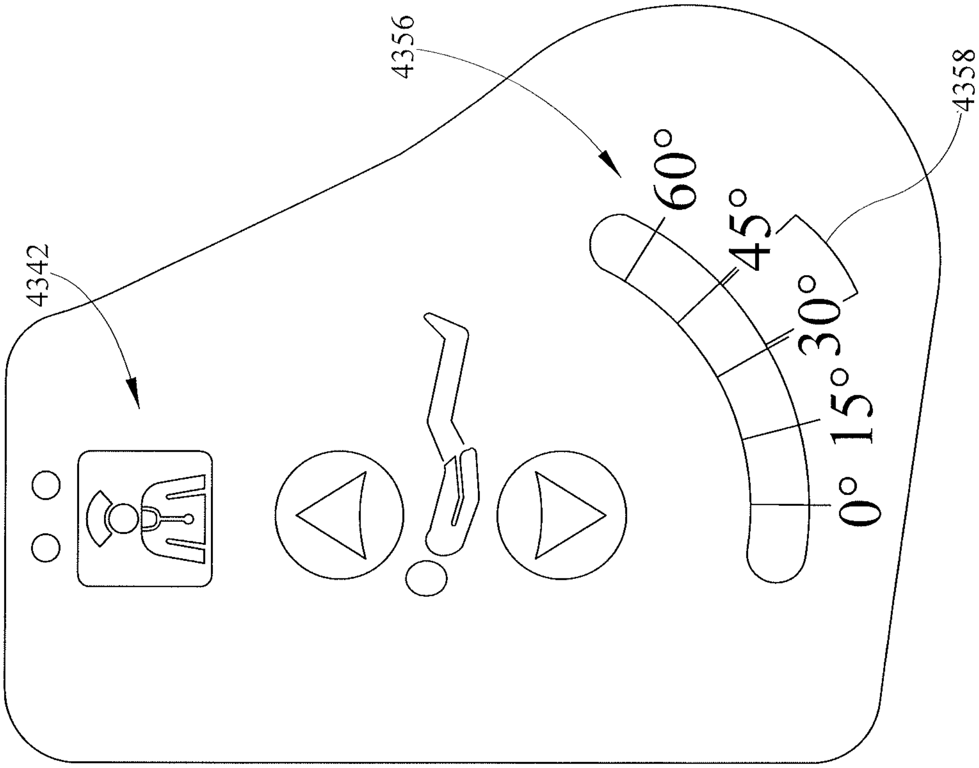
FIG. 65 is a diagrammatic representation of a fixed panel for a patient interface for the inside surface of a side rail.

Referring now to the embodiment of FIG. 65 the indicator 4356 includes a band 4358 which provides an indication to the patient of the preferred position of their head elevation when they are in the hospital bed 10. In some embodiments the area within the band 4350 might be a different color, such as green, for example, to provide the patient an incentive to position the head in that location.

Referring now to FIG. 66, an exemplary embodiment of a panel 3728 for a patient pendant 3700 is shown. In the illustrative embodiment, the firmness setting on the patient pendant 3700 has five bars that are indicative of the adjustable pressure levels of mattress 1900. The bars are illuminated sequentially, from bottom to top for example, to provide a general indication to the patient as to the current pressure level in the mattress. The more bars that are illuminated, the firmer the mattress is and vice versa. The firmness of the mattress 1900 can be changed by the patient by activating the lower pressure button 4370 or the increase pressure button 4372. Changes in the pressure in the mattress will be indicated by changes in the elimination of the bars of the indicator 4374. The panel 3728 also includes an indicator 4376 which, when the alert system is activated, provides an indication to the patient that they should stay in hospital bed 10.

The patient pendant 3700 also includes a NURSE CALL button 4360 and LED indicators 4364, 4366 on the patient pendant panel 3728. The patient can request assistance by pressing NURSE CALL button 4362. When NURSE CALL button 4360 is pressed, nurse call communication to a nurse call system 114 is activated and the LED indicator 4364 turns on, for example, in red to indicate that the NURSE CALL feature is active. If the patient no longer requires assistance, the patient can inactivate the alert by pressing NURSE CALL button 4360 again. To indicate that the nurse call alert is inactive, the LED indicator 4366 turns on, for example, in green and the LED indicator 4364 turns off.

In some embodiments, the NURSE CALL button 4360 may be a deadfront switch that is discernible only if the patient support apparatus 10 is communicatively coupled to a nurse call system. If patient support apparatus 10 is not communicatively coupled to the nurse call system, then button 4360 cannot be seen on patient pendant 3700. Thus, when the patient pendant 3700 is coupled to the patient support apparatus 10, such patient support apparatus 10 may or may not be coupled to a nurse call system. If the control system 400 determines that the patient support apparatus 10 is not coupled to a nurse call system, the NURSE CALL button 4360 on the patient pendant device 4360 is not discernible to the patient. This avoids the patient from misinterpreting the NURSE CALL button 4360 when the patient requires assistance and prevents the patient from pressing the NURSE CALL button 4360 when the patient support apparatus 10 is not connected to the nurse call system. If the patient support apparatus 10 is not connected to the nurse call system, the patient may be required to access other available nurse call communications to alert the nurse or caregiver.

In the illustrative embodiment, the patient support apparatus 10 further includes a SELF-EGRESS feature. As shown in FIG. 66, the patient pendant 3728 further includes EXIT ASSIST button 4368 on the patient pendant panel 3728, which is configured to facilitate the patient in exiting the patient support apparatus 10. When the patient presses the EXIT ASSIST button 4368 on the patient pendant 3700, the EXIT ASSIST mode of patient support apparatus 10 is activated. In response to the activation of the EXIT ASSIST mode, the control system of the patient support apparatus 10 automatically activates a nurse call to system to notify a nurse or caregiver and turns on the LED indicator 4364 to indicate the nurse call status. The control system 400 causes the body support 1902 of the mattress 1900, when present, to inflate to provide a firm surface for the patient to exit from.

In general, the articulated thigh deck 30, foot deck 34 and load frame 2008 are all placed in a flat and horizontal position, with the head section 28 being raised to assist the patient with their exiting.

In some embodiments, the predetermined patient egress configuration is programmable and may vary depending on the patient. Such programming is accomplished by a caregiver using the graphical user interface 66, for example. In some embodiments, in response to EXIT ASSIST button 4368 being pressed, the control system 400 may further vertically lower the upper frame 28 downwardly toward base frame 20 to facilitate the patient to exit the patient support apparatus 10. The patient or a caregiver may release the EXIT ASSIST button 4368 anytime to stop movement of patient support apparatus 10 into the patient egress configuration.

In some embodiments, the EXIT ASSIST mode may also track the patient egress activities. In such embodiment, the date and time at which the patient pressed the EXIT ASSIST button 4368 may be automatically stored in a patient's EMR accordingly, the patient egress data is charted into the patient's EMR automatically or via commands entered on patient support apparatus 10 without the need for subsequent confirmatory actions by a caregiver at remote computers. In some embodiments, subsequent confirmatory actions may be required at EMR system computer prior to entry of data into the patient's EMR. However, systems in which information is charted or stored in the patient's EMR via caregiver actions at patient support apparatus 10 may not require subsequent actions at remote computer by the same or a different caregiver.

Figure 80:
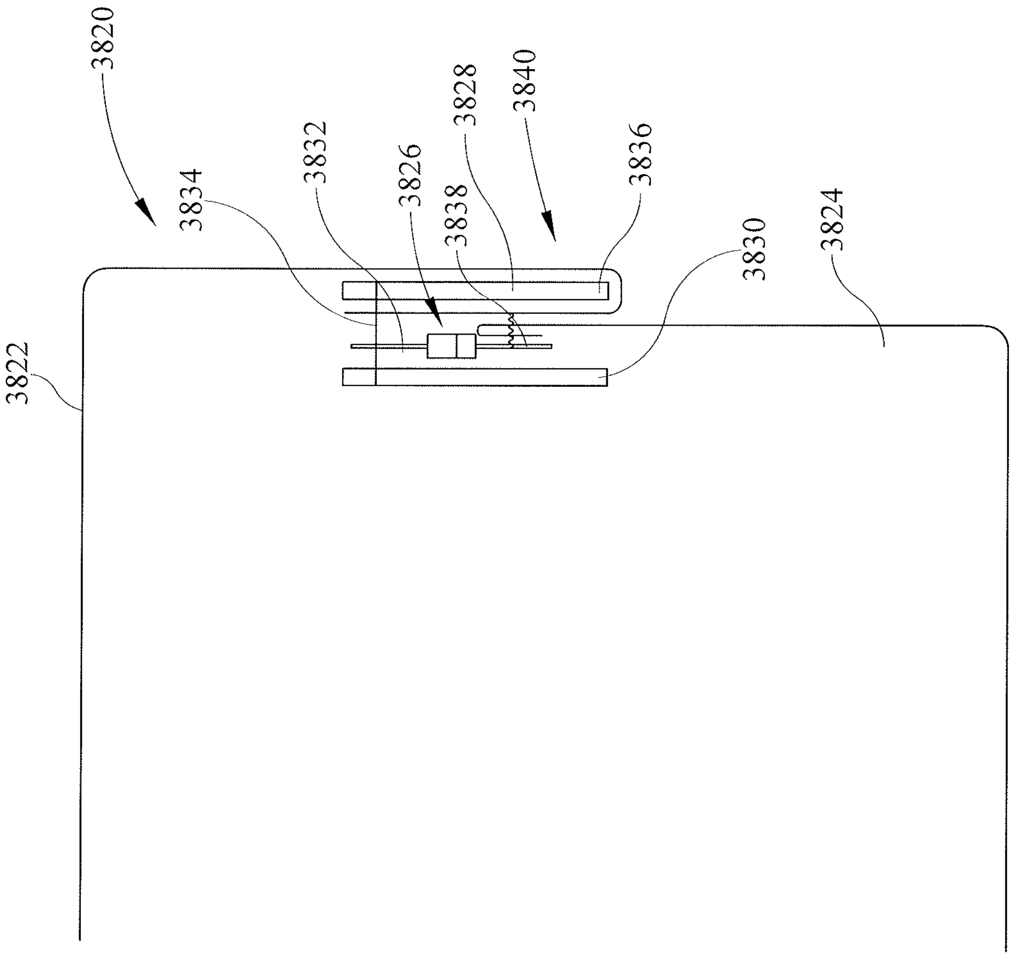
FIG. 80 is a cross-sectional view of the assembly of a top cover of the mattress to the bottom cover of the mattress utilizing stiffening strips.
Figure 82:
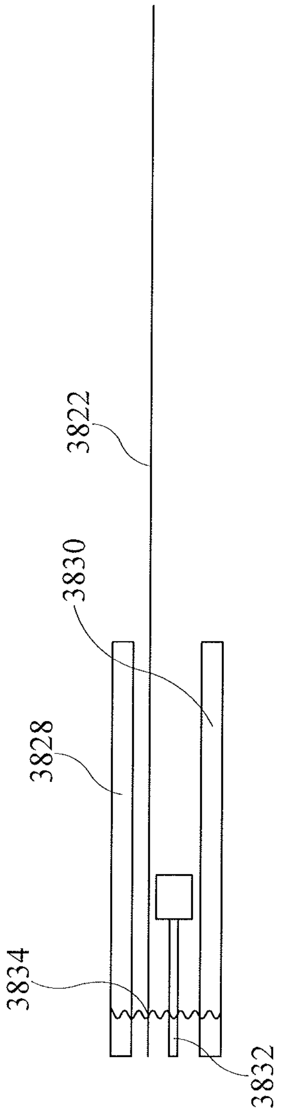
FIG. 82 is a cross-sectional view of the top cover of FIG. 80 being secured to a zipper.
Figure 81:
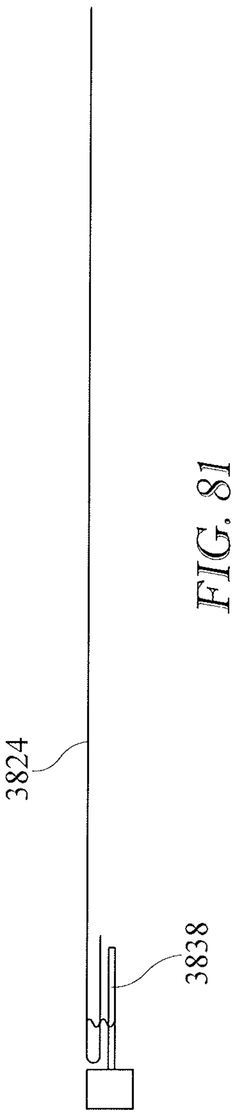
FIG. 81 is a cross-sectional view of the lower cover of FIG. 80 being secured to a zipper.
Figure 83:
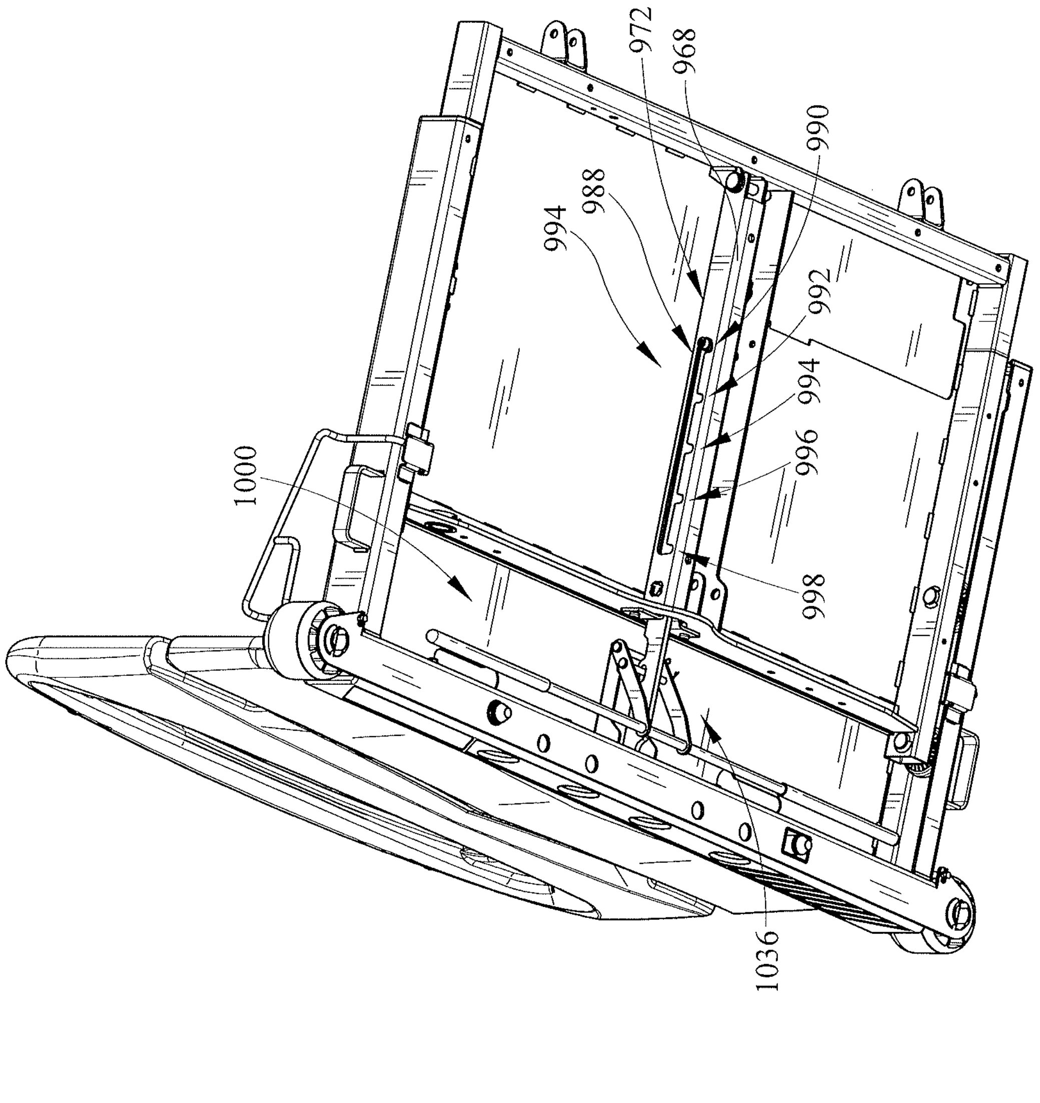
FIG. 83 is a bottom perspective view of a foot section of the patient support apparatus.

As shown in FIG. 80, another embodiment of a mattress enclosure 3820 includes a top cover 3822 and a bottom cover 3824. The top cover 3822 is secured to the bottom cover 3824 through a zipper 3826. The seam between the top cover 3822 in the bottom cover 3824 is protected by use of an outer strip 3828 and an inner strip 3830. Referring now to FIG. 82, the top cover 3822 is coupled to the outer strip 3828, a web of first-half 3832 of the zipper 3826, and the inner strip 3830 by stitching 3834 then the material of the cover 3822 is wrapped around an end 3836 of the strip 3828. As shown in FIG. 81, the lower cover 3824 is under wrapped and then stitched to a web 3838 of the zipper 3826. The inner strip 3830 provides backing to the zipper 3826 reducing the opportunity for materials inside of the covers 3822, 3824 to get tangled in the zipper 3826. In addition the first strip 3830 supports the zipper 3826 if the flap 3840 formed by the second strip in the top cover 3822 is pulled upwardly. The stitching 3834 will act on the inner strip causing it to engage the web 3838 of the lower half of the zipper 3826 thereby encouraging the zipper to stay closed. The strips 3828, 3830 illustratively comprise a material having a Shore A durometer from about 40 to about 85. The strips 3828, 3830 may comprise urethane, polyurethane, low density polyethylene (LDPE), ultra high molecular weight polyethylene (UHMW), thermoplastic elastomers (TPE), or combinations thereof.

In an embodiment of a patient support apparatus 3910, a foot deck section 3934 has been adapted to include two ports 3936 and 3938 that connect to hoses 3940 and 3942 that connect to a left leg sequential compression wrap 3944, and a right leg sequential compression wrap 3946. As will be described in further detail below, the disclose control system 400 provides an interface for operating an integrated sequential compression device (SCD).

Figure 77:
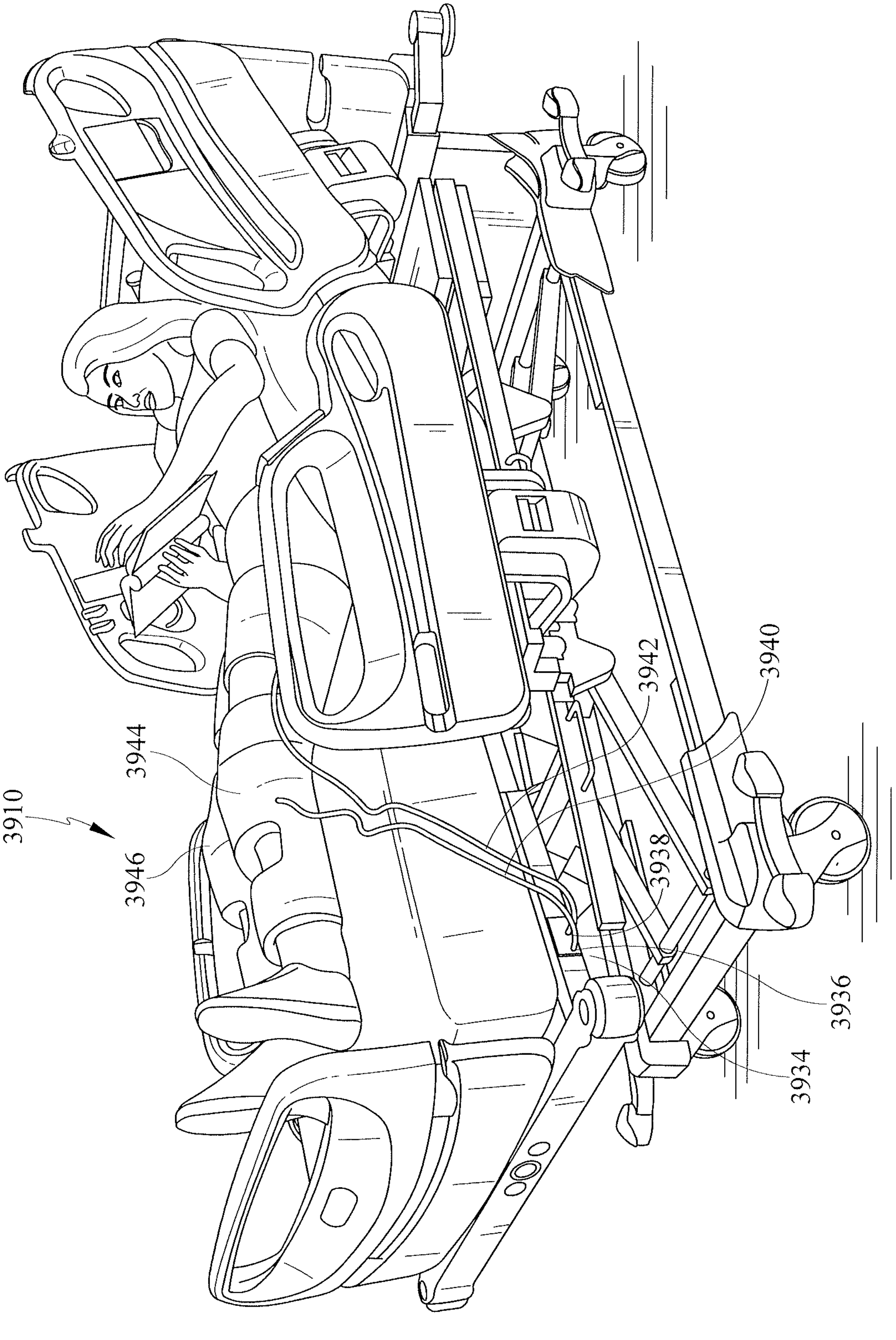
FIG. 77 is a perspective view of a patient support apparatus that includes ports mounted in a foot section to provide a source of pressurized air for a sequential compression device.

In another embodiment, a foot panel 3850 that houses a sequential compression device (SCD) 3852 is shown in FIG. 139. The foot panel 3850 is adapted to have recesses 3854 and 3856 which provide access to respective pneumatic connectors 3858 and 3860. The pneumatic connectors 3858, 3860 function like supports 39 36 and 3938 of FIG. 77 with the notches 3862 and 3864 formed in the foot panel 3850 being ideally located for routing the associated hoses director lead to the patient's leg on the opposite side of the foot panel 3852. Referring to the view of FIG. 140, the notch 3862 and the notch 3864 are positioned to provide direct access to a patient's lower extremities as would be required with the use of a sequential compression device as suggested in FIG. 77. The foot panel 3850 of FIG. 140 supports a transport shelf 3866 which is used to assist with the storing of equipment and supplies while a patient is being transported. The foot panel 3850 has a large cover 3868 which encloses the componentry of the SCD 3852. A control board 2734 for the sequential compression device is positioned in a cavity 3870. Similarly a pump 3872 is positioned in another cavity 3874 adjacent cavity 3870.

The pump 3872 is connected to a source line 3874 by a hose 3876 the source line feeds a right valve 3878 and a left valve 3880. The valves 3878, 3880 each respectively feed a tube 3882 or 3884 which feed the respective ports 3858 and 3860. The pressure in each tube 3882, 3884 is monitored by a respective sense line 3886 or 3888 each of which is income indication with the circuit board 2734. Referring now to FIG. 141, the tube 3884 connects to a barb 3890 of the port 3860. The tube 3882 communicates to the port 3858 in a similar fashion. FIG. 143 provides an enlarged view of depression 3856 and the port 3860.

The hospital bed 10 has extensive control system 400 and various components of the control system 400 have been discussed as they relate to the various mechanical structures. However a complete wiring diagram of the hospital bed 10 is provided at FIG. 51A-51P. For a better understanding of electrical capabilities of hospital bed 10, discussion of the various significant electrical components will be provided herein. The left head side rail 48 supports a side rail circuit board 1182 which communicates with the Main control board 2700 via a network connection. The network structure of the hospital bed 10 will be discussed in further detail below, but it is contemplated that some modules of the control system 400 will communicate via a controller area network (CAN). A suitable network structure is found in U.S. Pat. No. 7,506,390, titled "PATIENT SUPPORT APPARATUS HAVING CONTROLLER AREA NETWORK" which is incorporated in its entirety by reference herein and with specific reference to the disclosed network structure, including protocols and hardware. A microcontroller that includes several communications interfaces has been found to be suitable for this type of application. For example, microcontrollers from ST Microelectronics including part numbers STM32F427, STM32F429, and STM 32F437. A suitable transceiver is a part number MCP2551 transceiver from Microchip. The CANOpen data layer protocol is suitable and as well as a network speed of 1 Mbps. The illustrative embodiment provides multiple network connections and protocols that may be used between various components.

The left head side rail includes the graphical user interface board 67 along with the display 65. An antenna 2706 is electrically connected to the graphical user interface board 67, the antenna 2706 providing a capability for near field communications from the left head side rail 48. The side rail circuit board 1182 includes a near field communication antenna 2712 and an ambient light sensor 2714. The side rail 48 also includes the speaker 1102 discussed above and an RFID module 2716 may be used to identify people or equipment who approach or come in close proximity with the side rail 48. The siderails also include various versions of hard panel's such as the two shown in FIGS. 62-63, or the panel 1180 shown in FIG. 65. While the hard panels are not shown in the wiring diagram, it should be understood that some permutation of those hard panel's will be found on most embodiments of the hospital bed 10. Also not shown on the wiring diagram is the light strip 1604 which is optionally connected to the side rail circuit board 1182 and some embodiments.

Figure 47B:
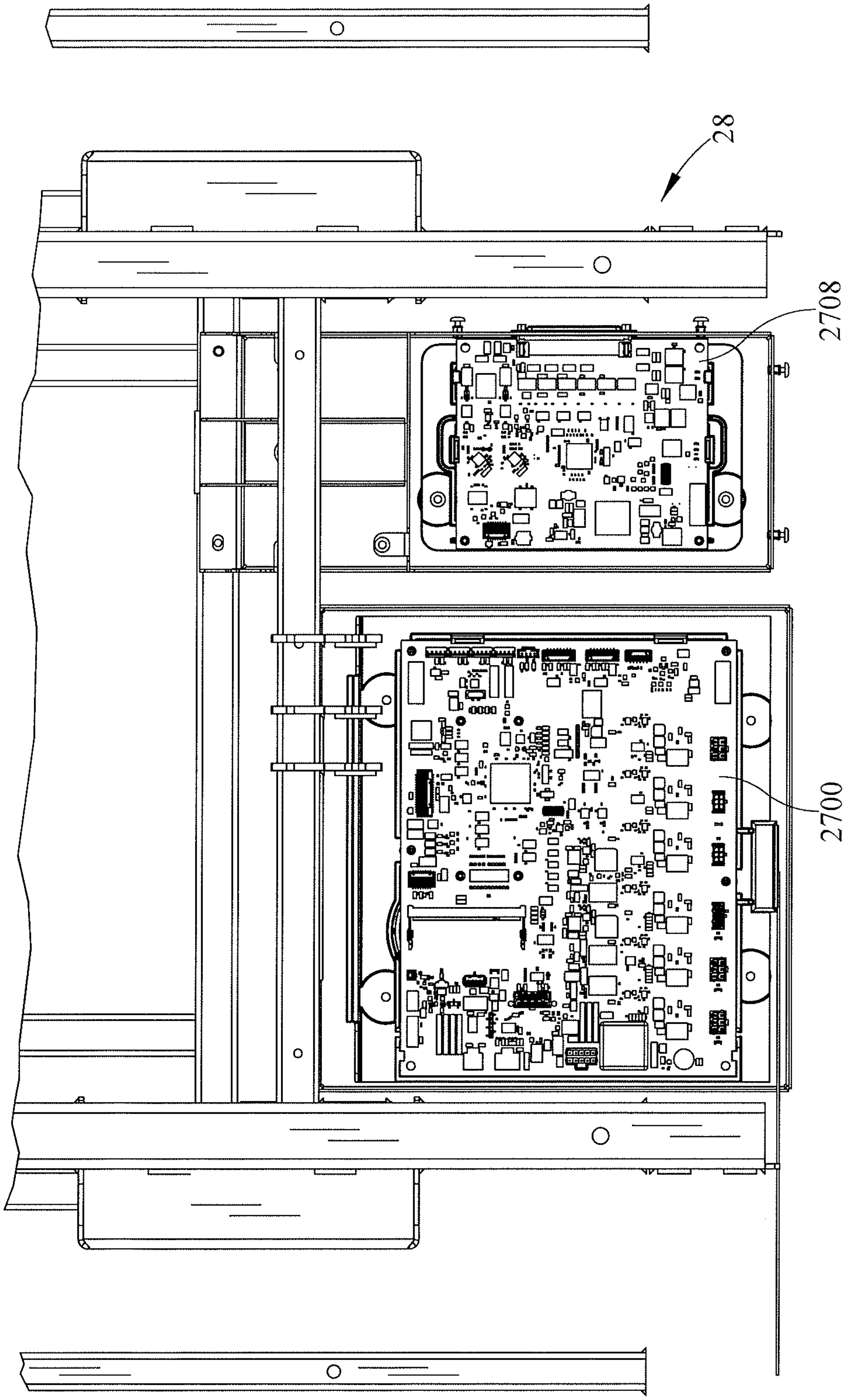
FIG. 47B is a top plan view of a portion of the head deck of the patient support apparatus of FIG. 1 with covers removed to show the mounting of electrical circuit boards.
Figure 47C:
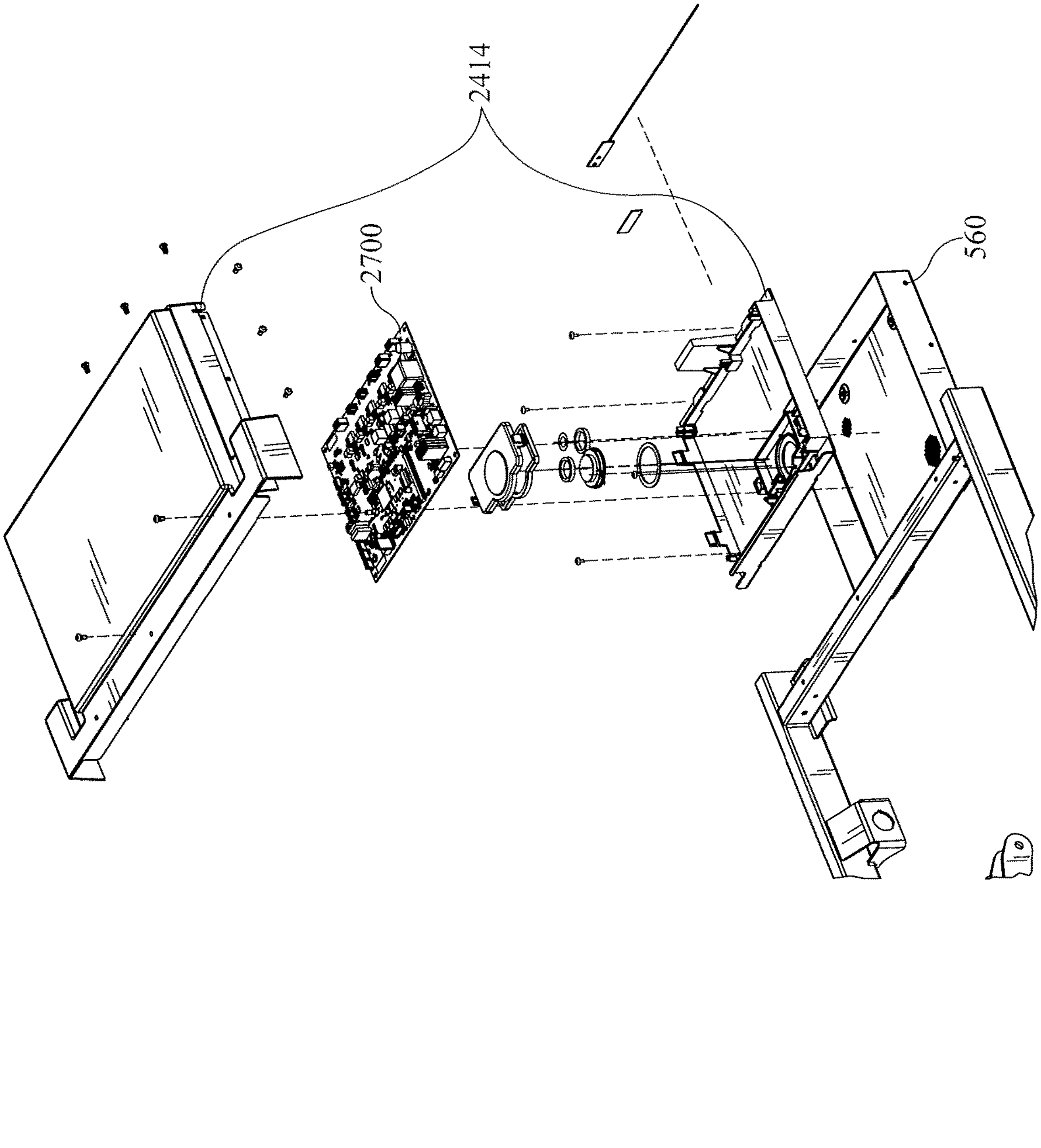
FIG. 47C is an exploded assembly view of the mounting of one of the circuit board assemblies FIG. 47B.
Figure 47D:
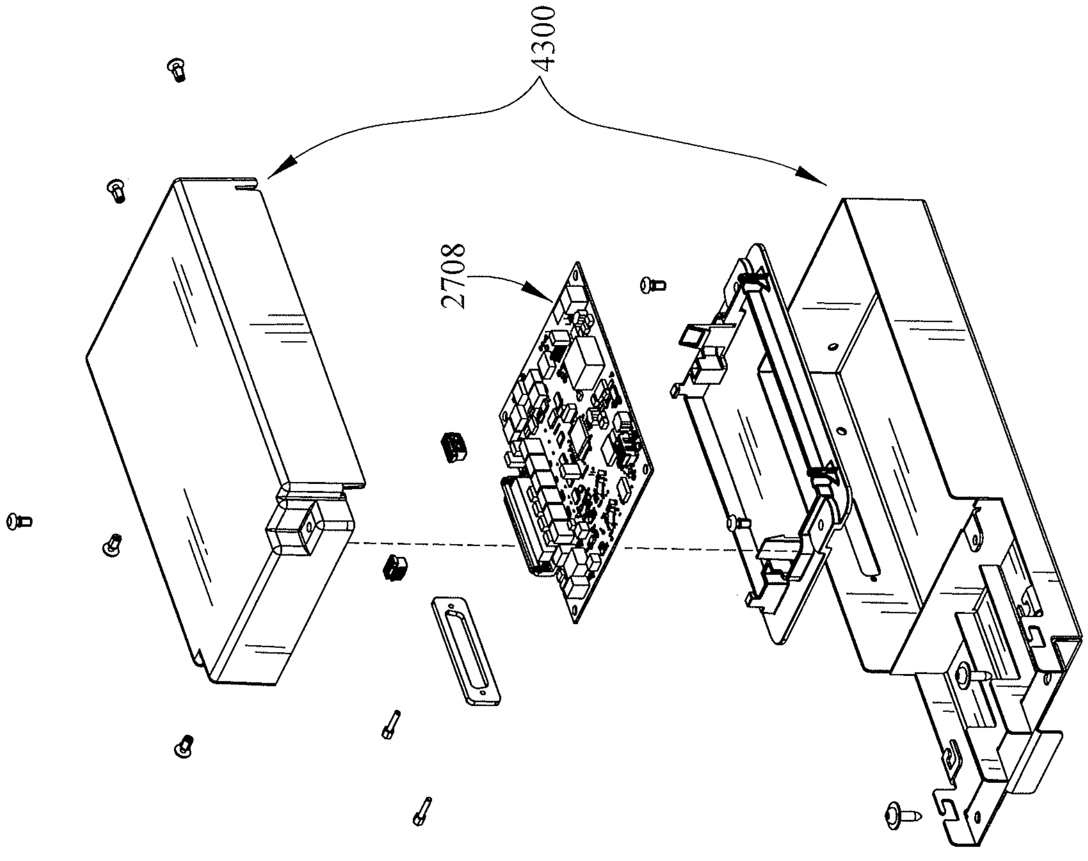
FIG. 47D is an exploded assembly view of one of the circuit board assemblies of FIG. 47B being positioned in an enclosure.

The control system 400 also includes a communications board 2708 which connects to external communications through a nurse call cable 2710. The communications board 2708 is supported on the load frame 28 as shown in FIG. 47B. The communications board 2708 is housed in an enclosure 4300 as suggested in FIG. 47D, the enclosure 4300 being secured to the load frame 28. The control system 400 also includes the patient pendant board 2724 which is directly connected to the Main control board 2700. In addition a USB diagnostic port 2718 is coupled to the Main control board 2700. The port 2718 is available to permit service technicians to connect directly to the Main control board through the USB port 2718.

Figure 51A:
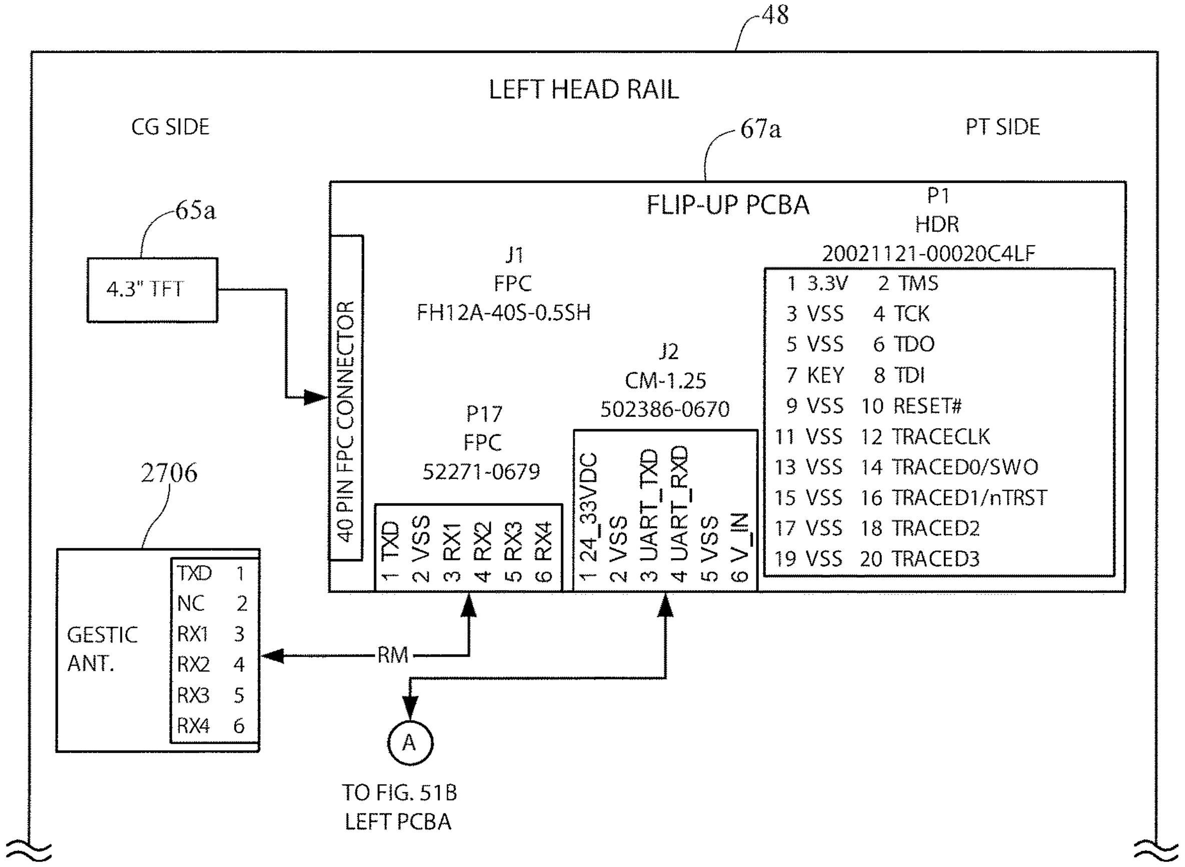
FIGS. 51A-P are a schematic of a wiring diagram of the electrical system of the patient support apparatus of FIG. 1.
Figure 51B:
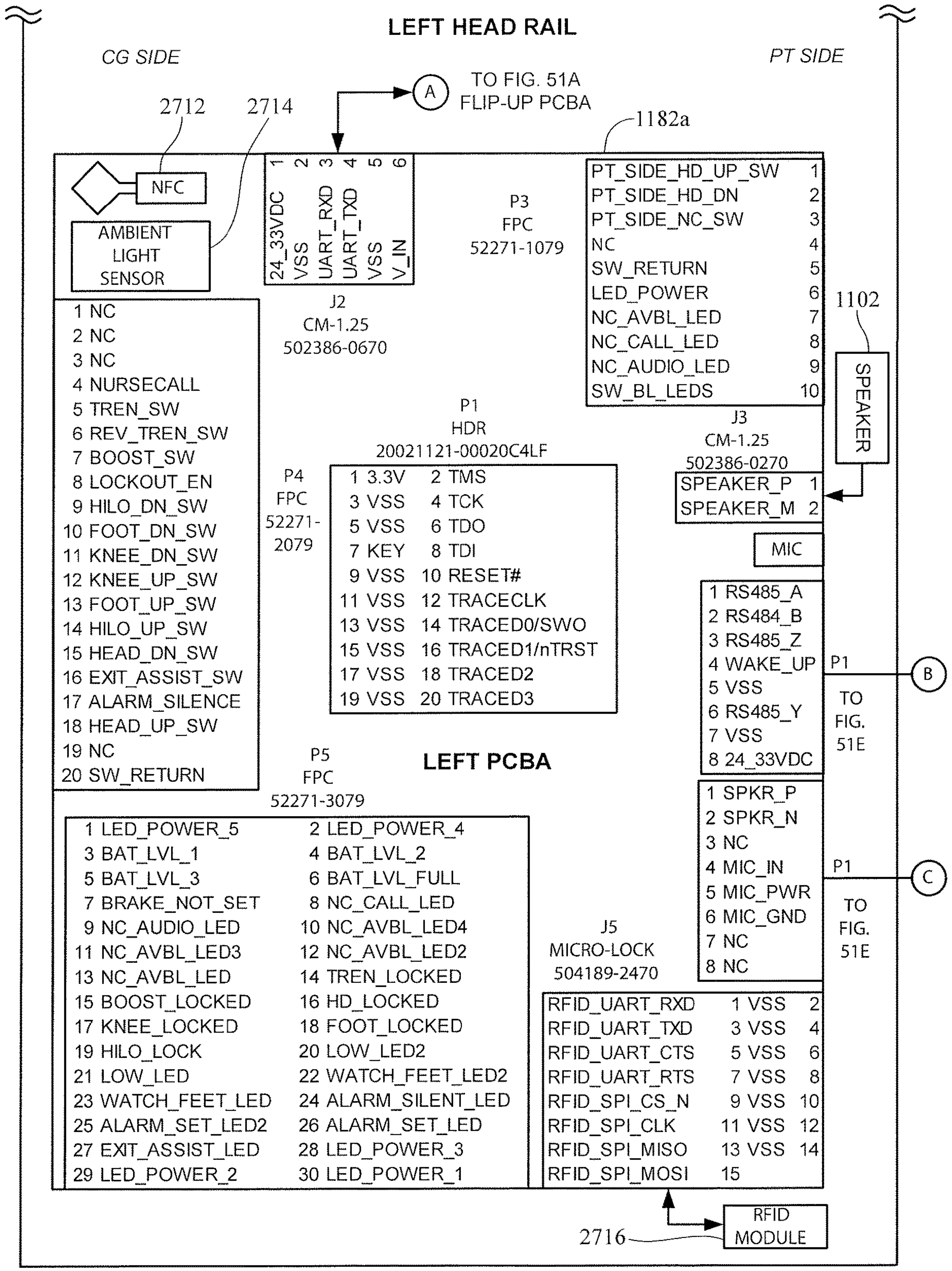
Figure 51C:
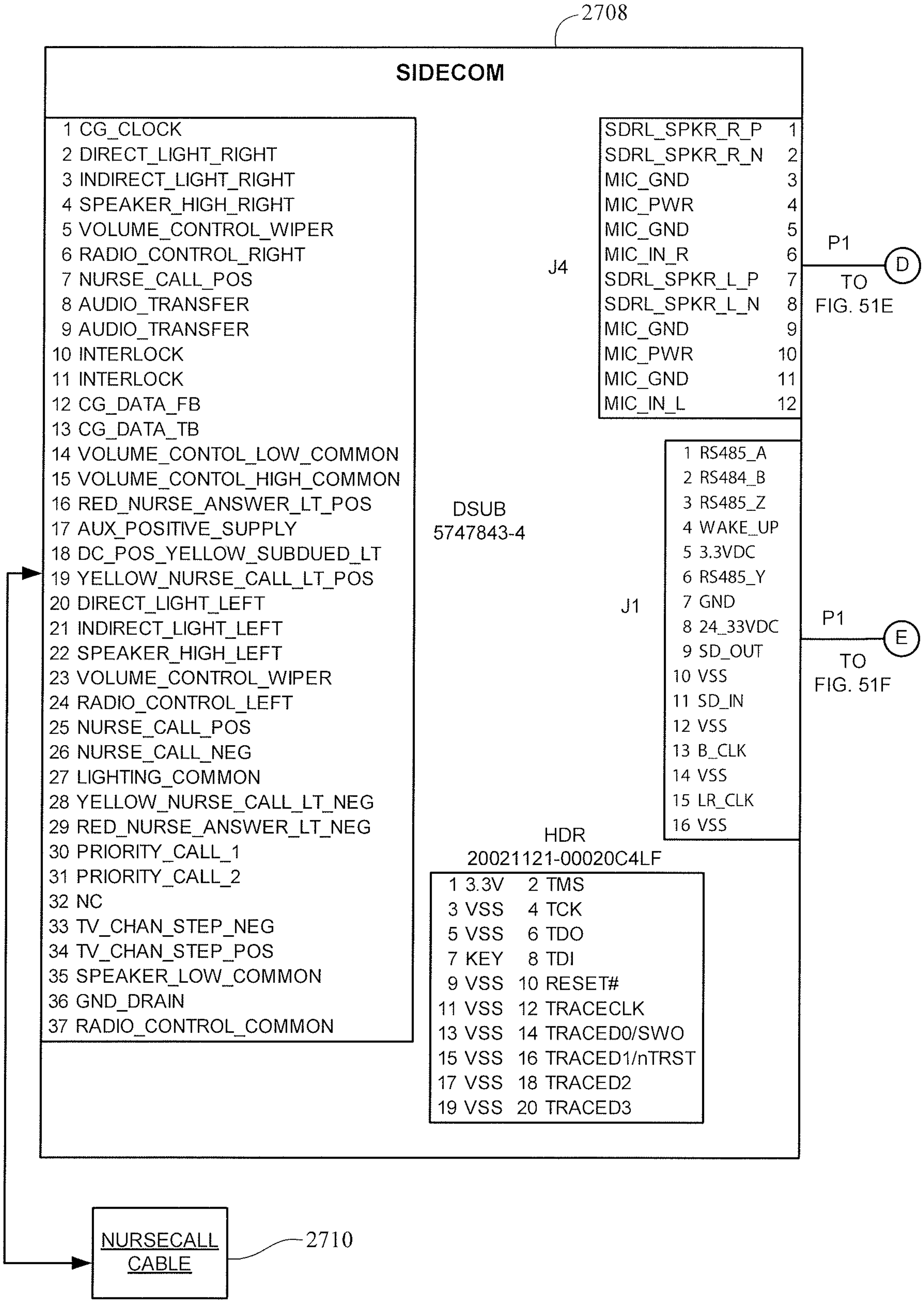
Figure 51D:
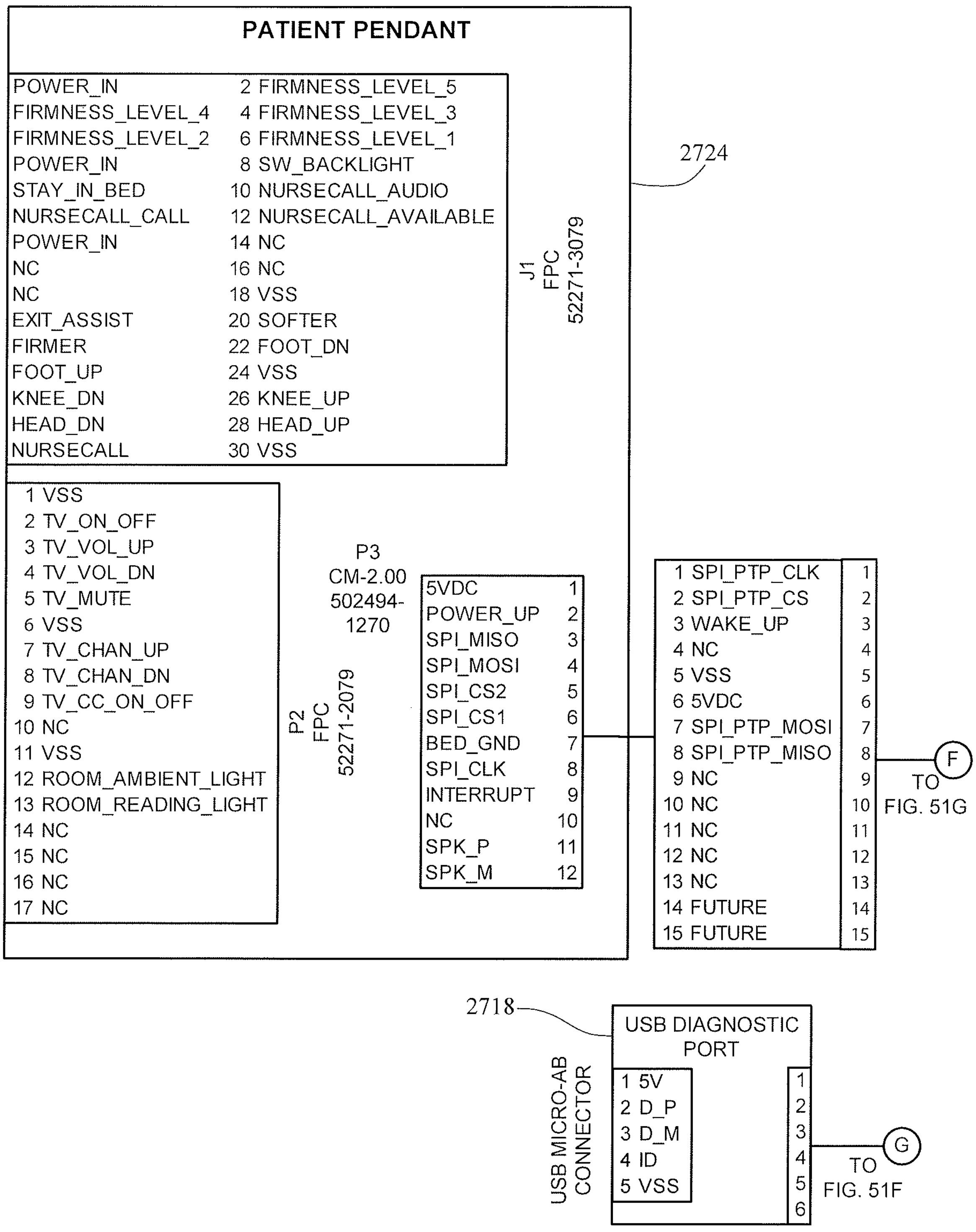
Figure 51E:
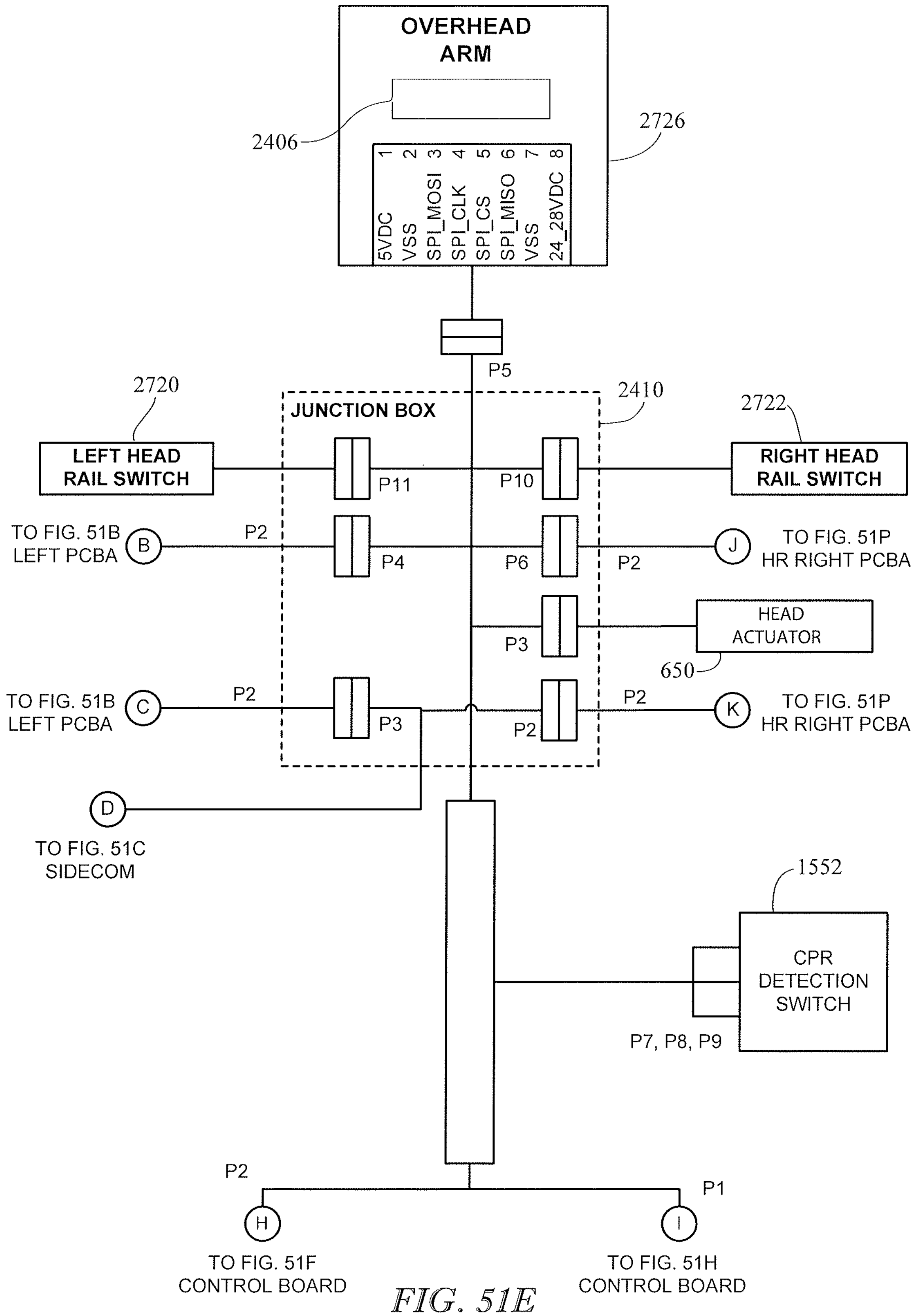
Figure 51F:
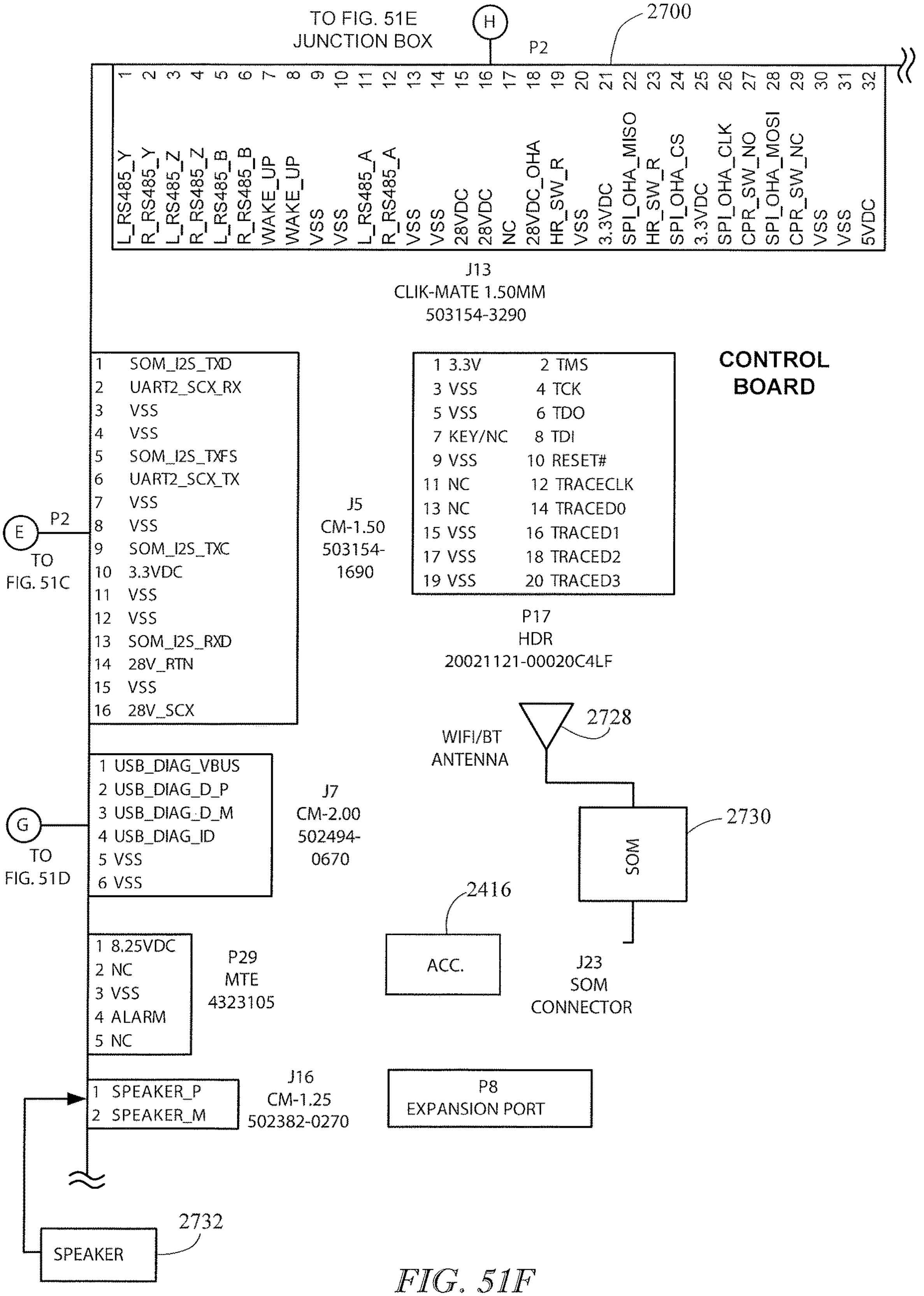
Figure 51G:
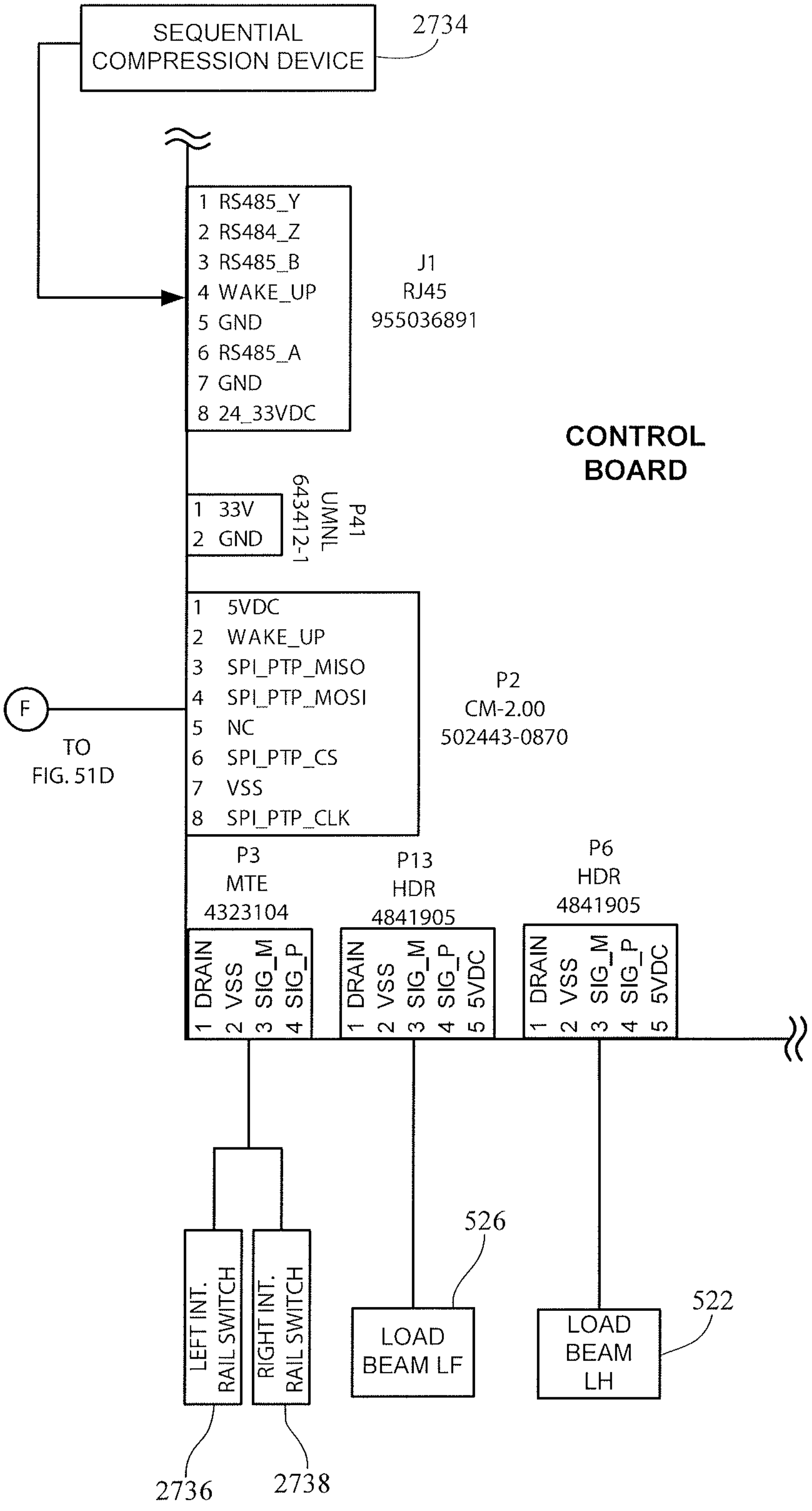
Figure 51H:
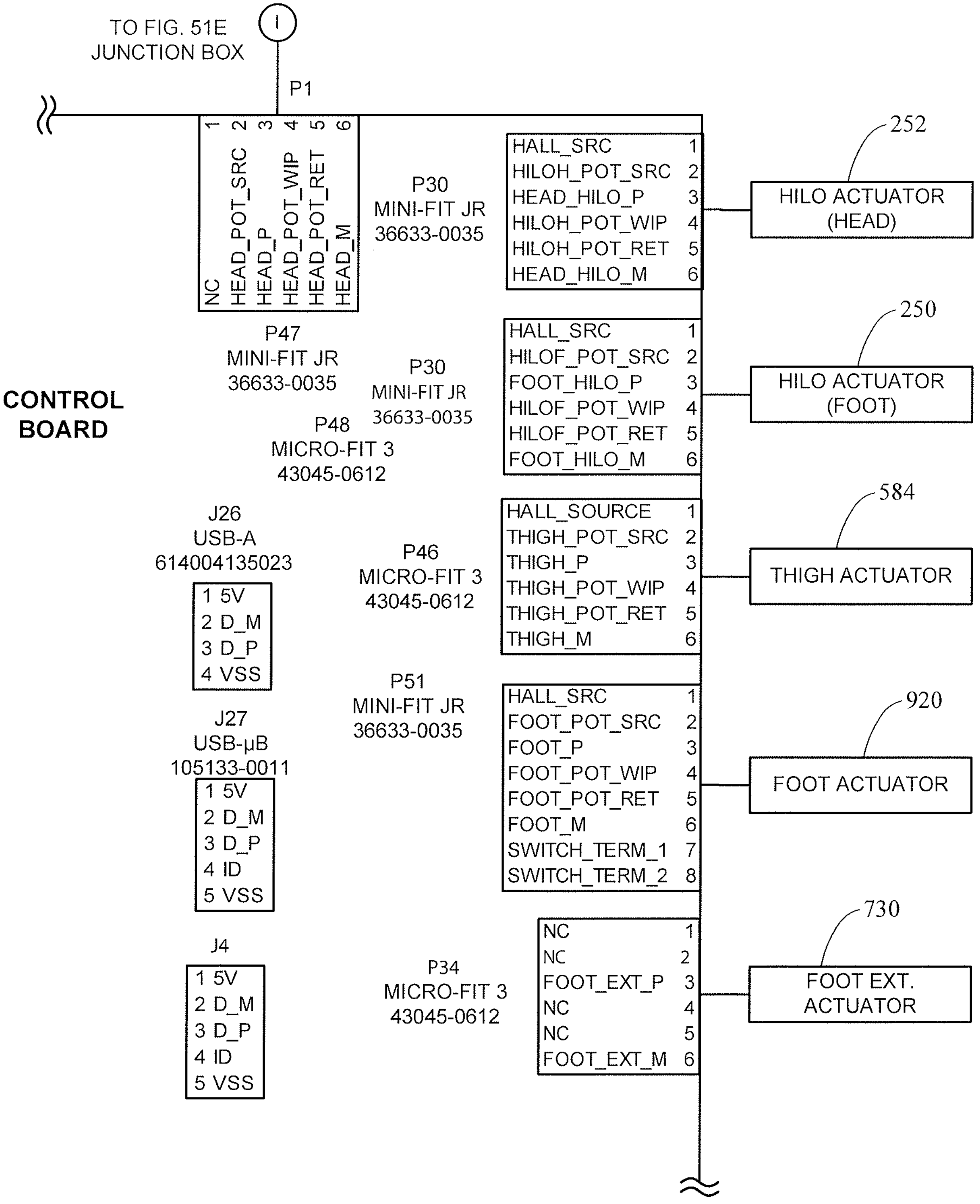
Figure 51I:
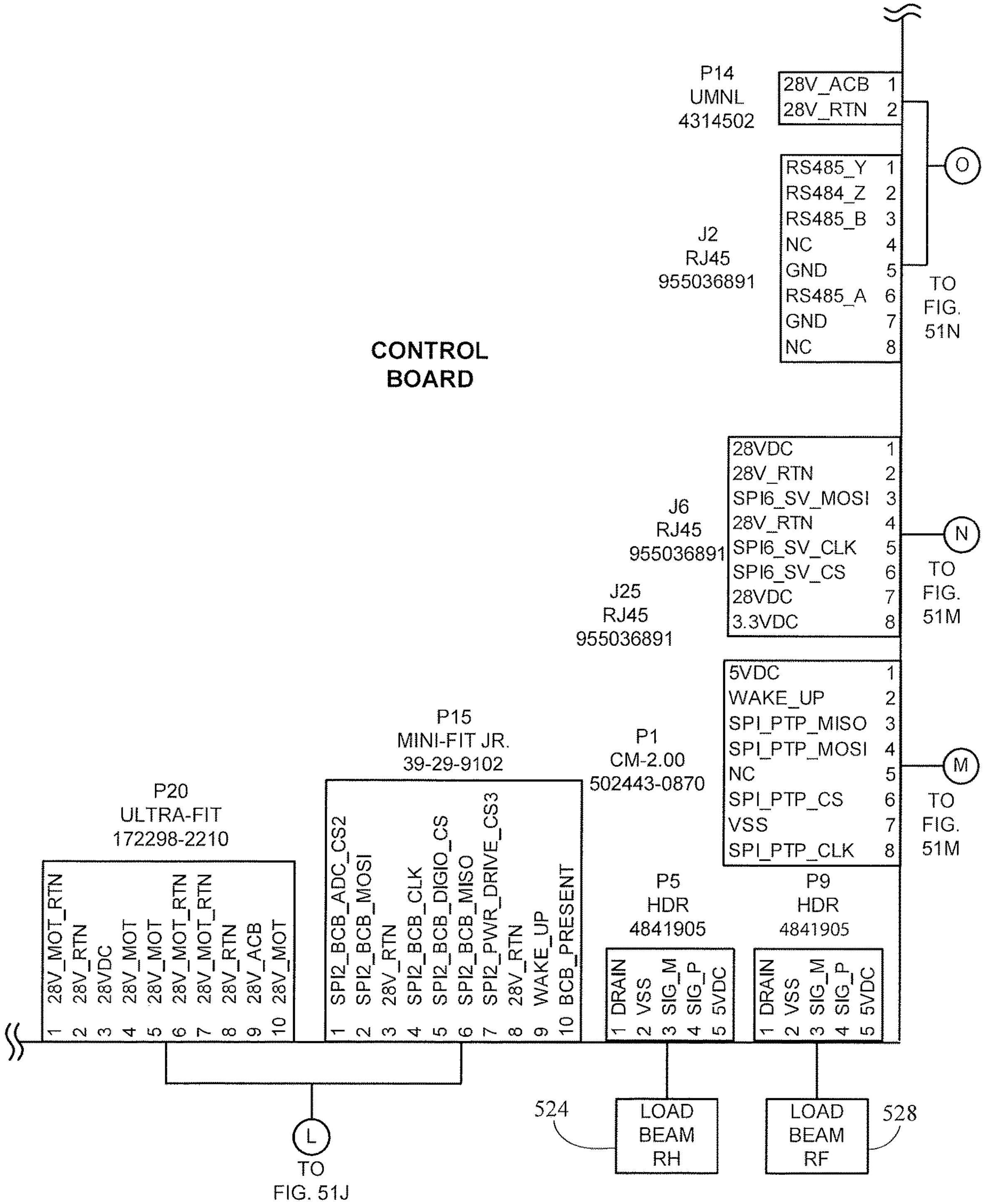
Figure 51J:
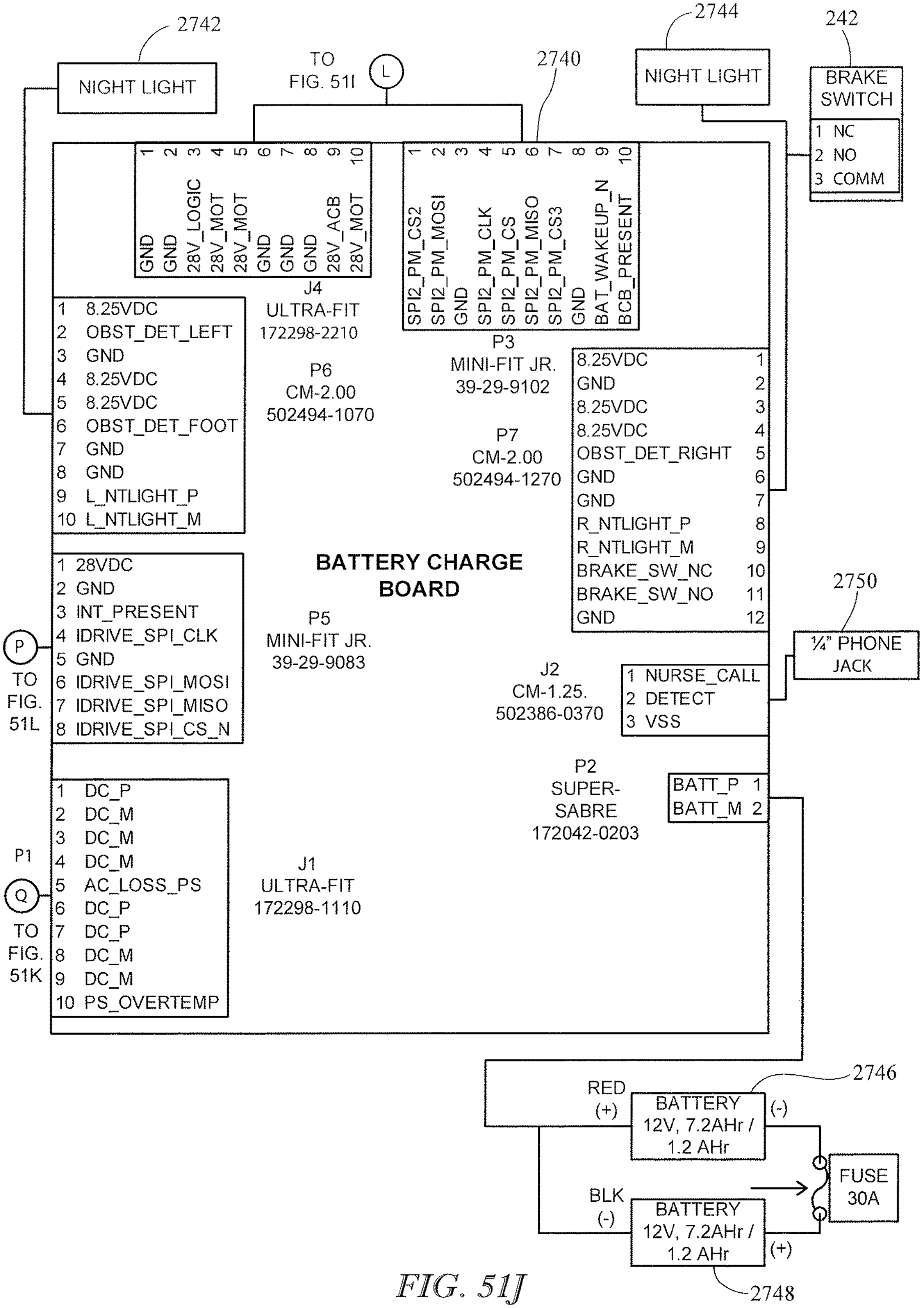
Figure 51K:
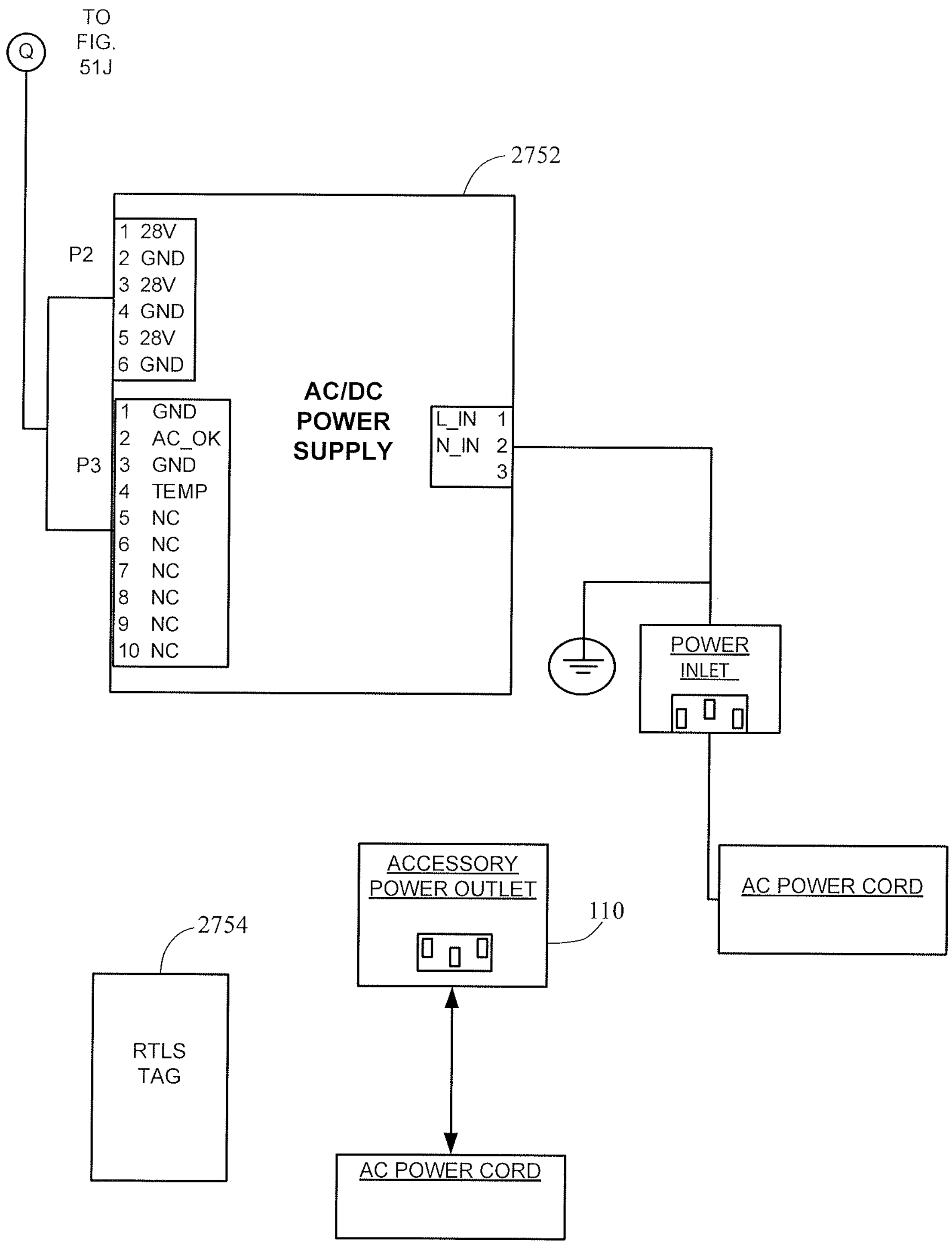
Figure 51L:
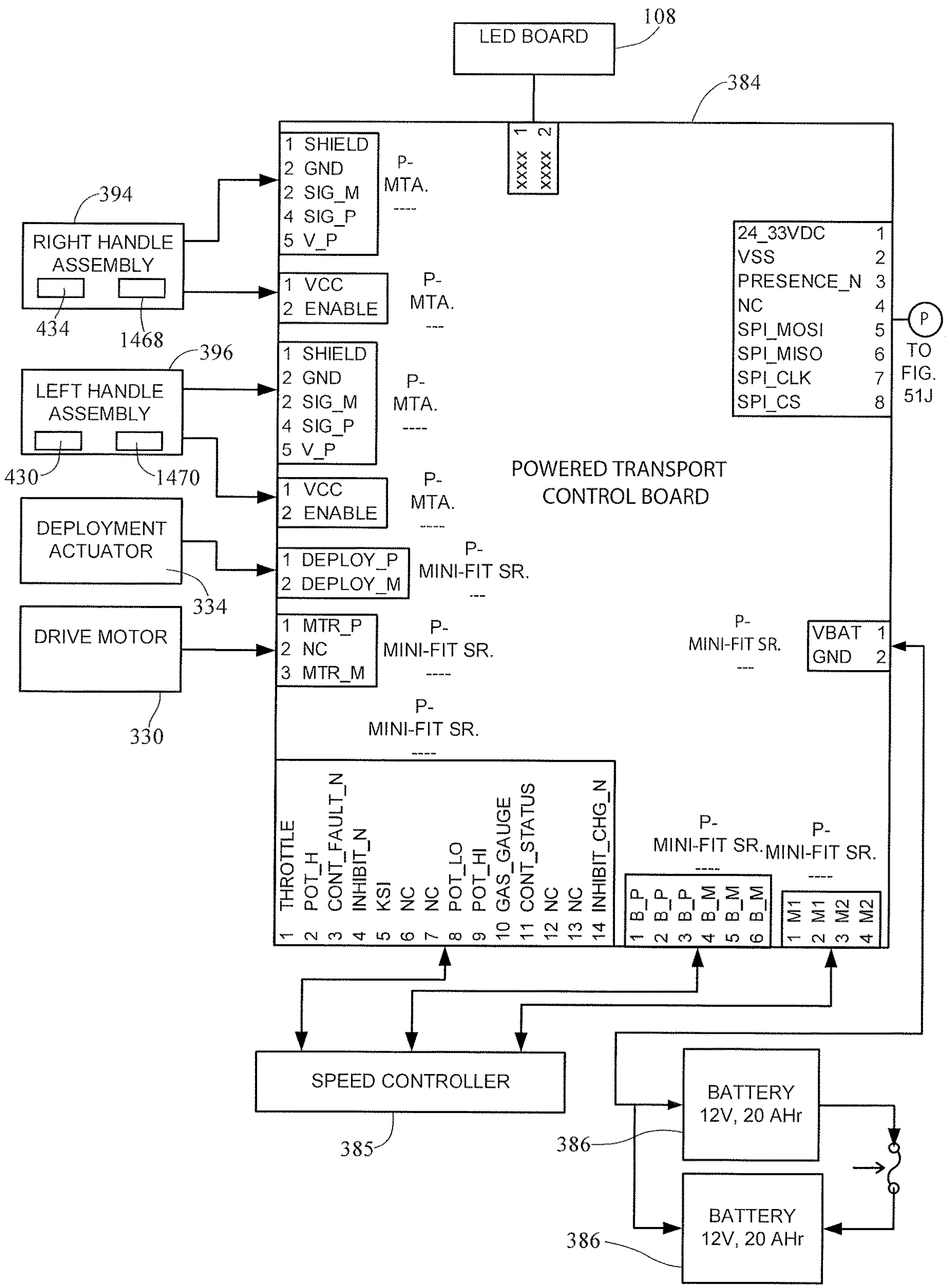
Figure 51M:
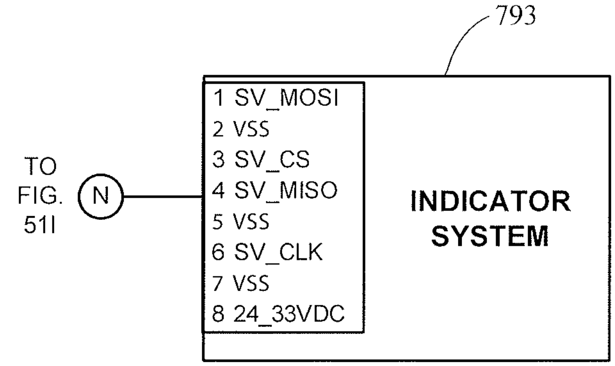
Figure 51M:
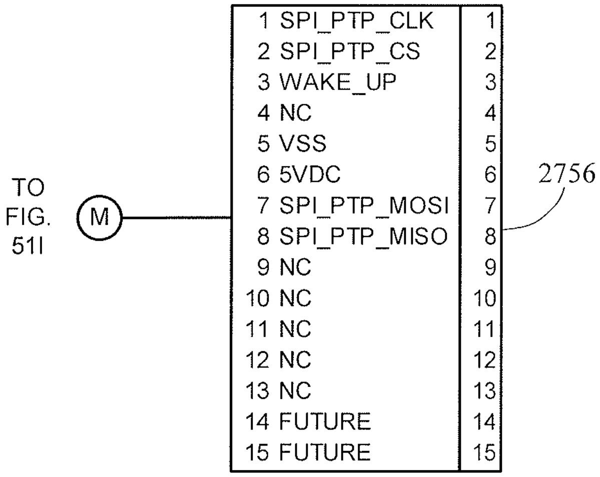
Figure 51N:
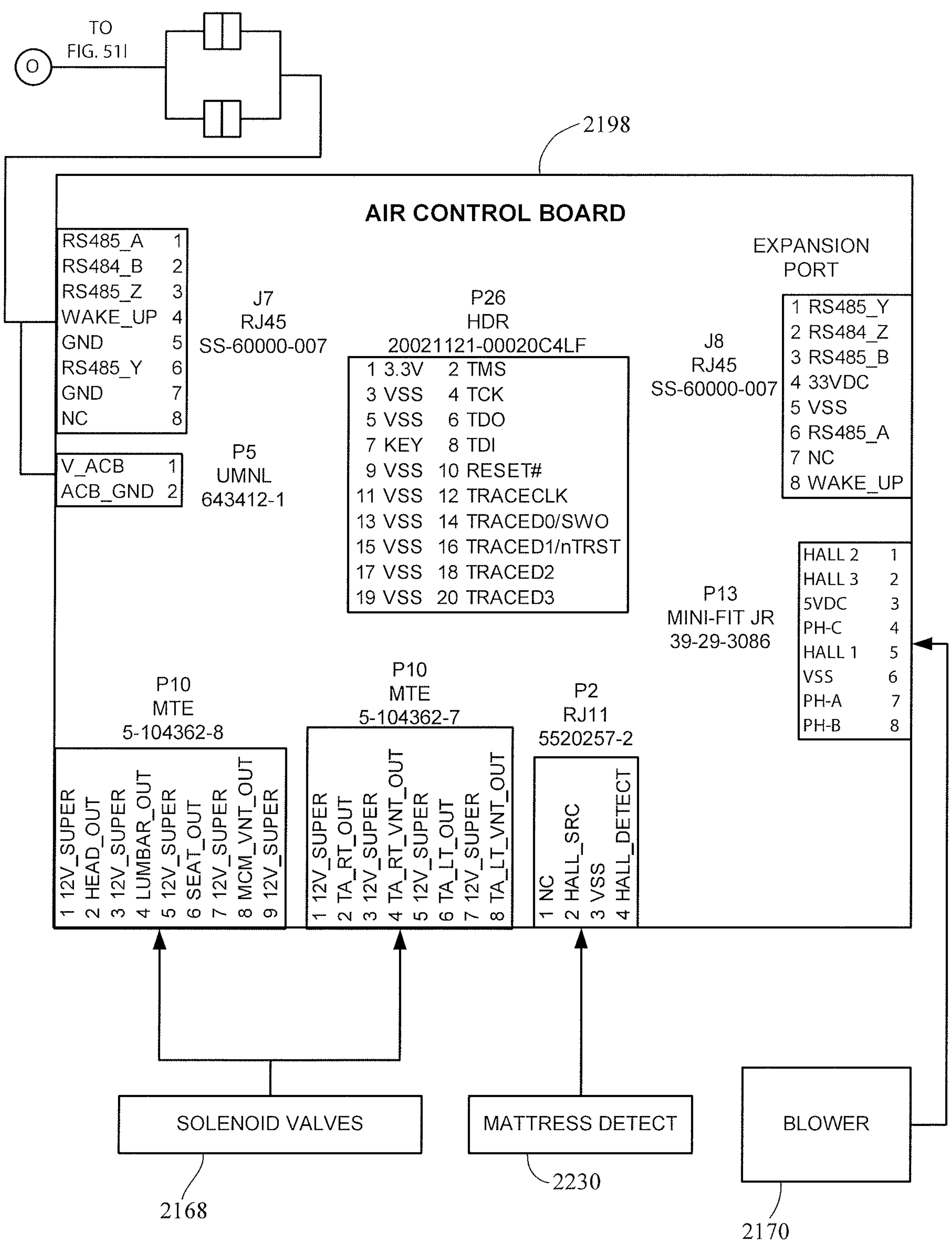
Figure 51O:
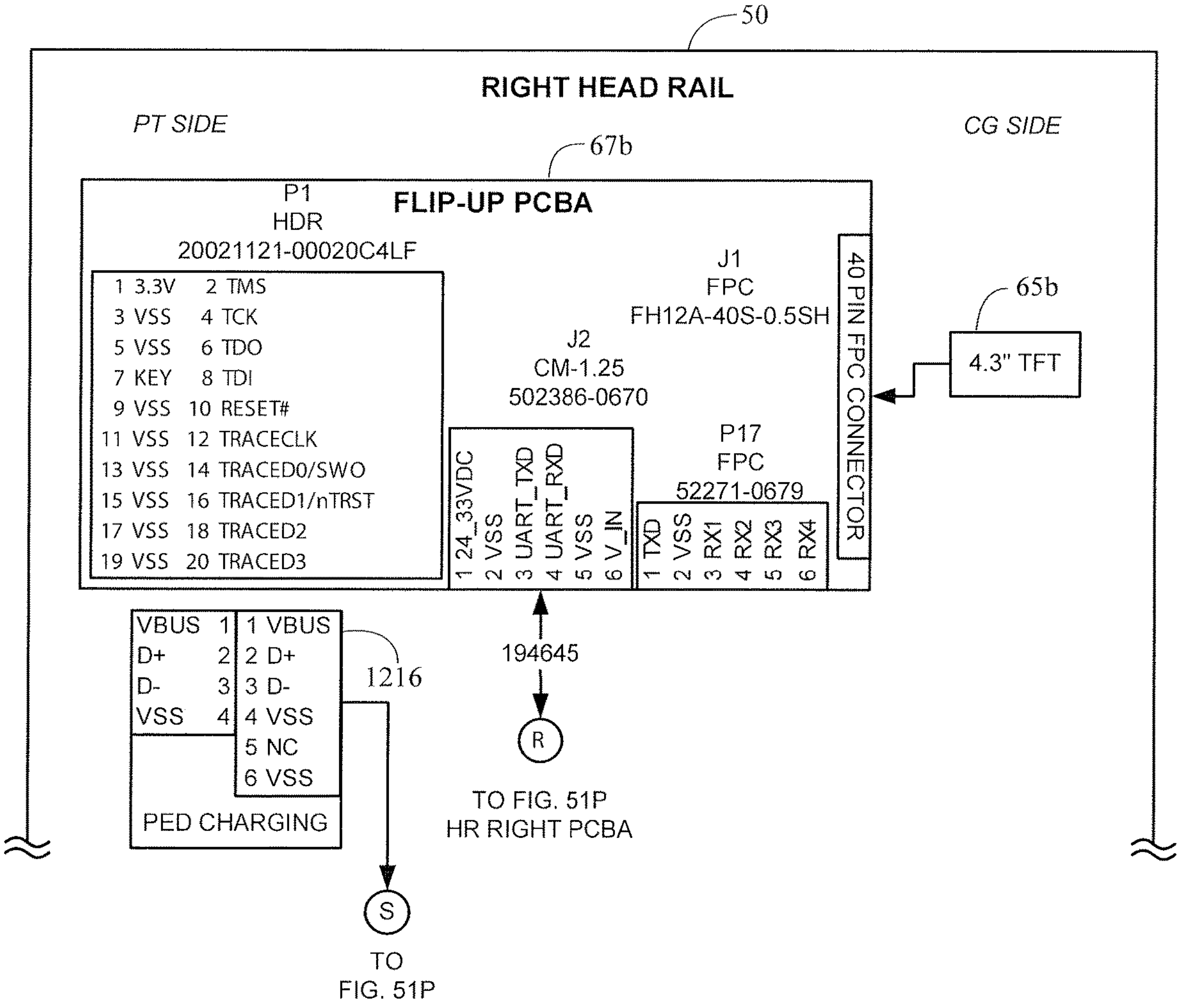
Figure 51P:
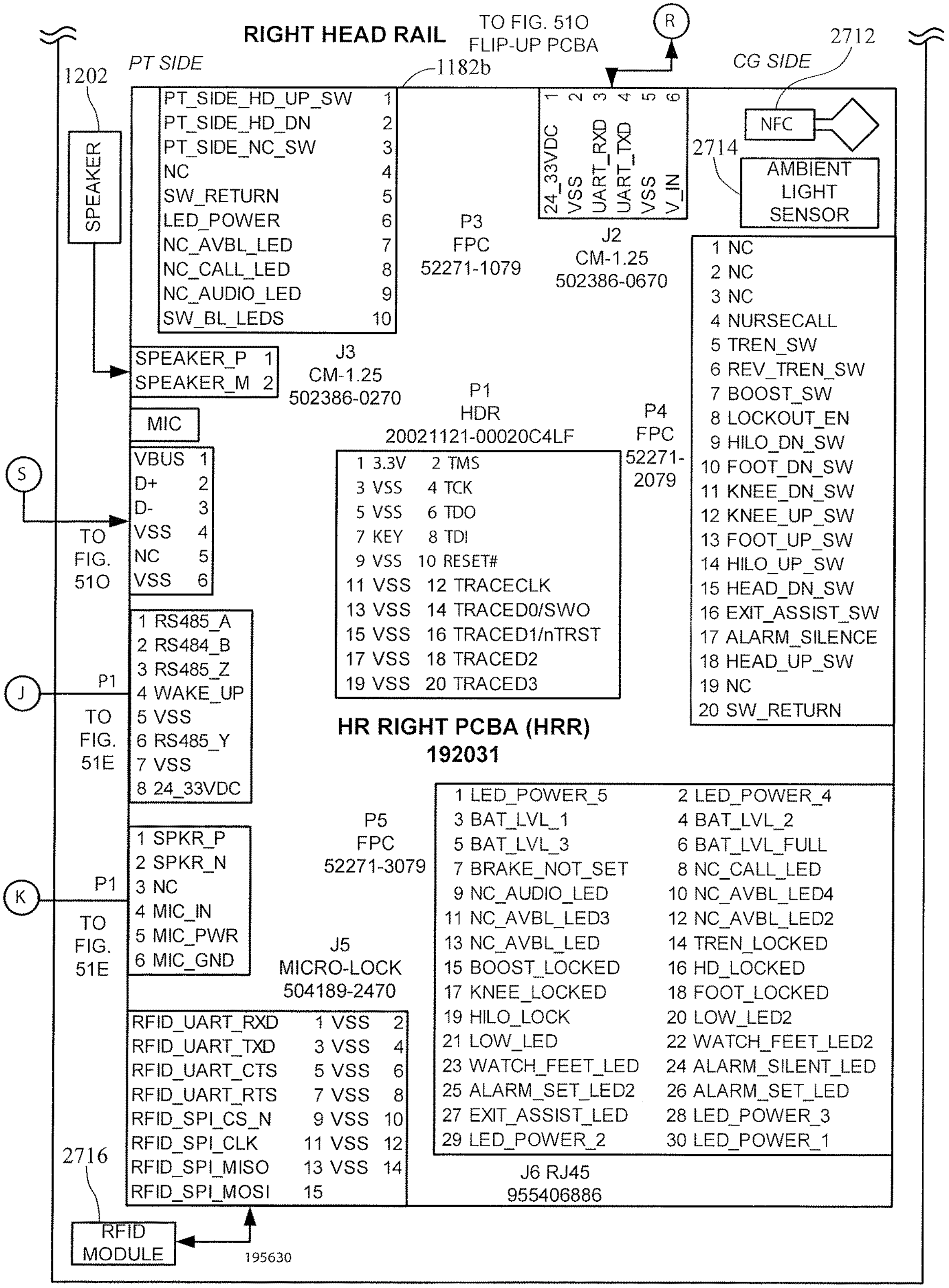

The overhead arm 2726 includes an internal circuit board 2406 which has functionality similar to the functionality of the pendant board 2724, the overhead arm board 2406 communicating with the Main control board 2700 via a SPI interface. In addition there is a left head rail switch 2720 and a right head rails switch 2722 which monitor the position of the siderails 48, 50 respectively and provide that information to the control system 400 to use as will be discussed in further detail below. The head actuator 650 is coupled to the Main control board through a junction box 2410, the junction box shown in FIG. 47A. Structurally, the junction box has a housing 2412 which is secured to the head deck 28 moves with the head deck as it moves from between raised and lowered positions. The Main control board is positioned adjacent the communications board 2708 in the pan 560. The Main control board includes an enclosure 2414 which protects the Main control board 2700. Also shown in FIG. 51E is the CPR detect switch 1552 is connected to the Main control board 2700.

The Main control board 2700 performs a significant amount of the logic for the hospital bed 10 and further includes a system on a module (SOM) 2730 the system or module controlling communications from the Main control board 2702 external devices and systems. A Wi-Fi® Bluetooth® antenna 2728 is coupled to the SOM 2730. The Main control board 2700 is also coupled to a speaker 2732 that provides alarms and verbal alerts. In some embodiments the Main control board supports an accelerometer 2416 that is used to determine the angle of inclination of the load frame 26 of the hospital bed 10.

The sequential compression device system 2734 is connected to the Main control board 2700. Switches to determine the position of the left and right foot rails 2736, 2738 respectively are also coupled to the Main control board 2700. The load beams 522, 524, 526, 528 are all connected to the Main control board 2700 as well. An embodiment of the hospital bed 10 can have up to seven linear actuators including an head actuator 650, and auxiliary wheel actuator 334, a Hi-Lo actuator 252 which powers the head lift linkage 29, a Hi-Lo actuator 250 which powers the foot end linkage 27, a thigh actuator 584 for moving the articulated thigh deck 30, a foot actuation actuator 920 pivoting the foot deck 34 relative to the load frame 28, and a foot extension and retraction actuator 730. Each of the actuators includes internal electrical limits as well as internal position sensing capabilities utilizing either a potentiometer or a Hall-effect sensor.

The control system 1700 also includes a battery charge board 2740 which is positioned in the head end of the base frame as shown in FIG. 12. The battery charge board is coupled to a pair of nightlights 2742, 2744 and the sensor 242 that determines the orientation of the brake/steer petals. The battery charge board 2740 also in includes a phone jack 2750 is available for certain nurse call systems. The batteries 2746, 2748 are coupled to the battery charge board with the battery charge board 2740 managing the charging of the batteries 2746, 2748. While not shown in any of the drawings, and AC/DC power supply 2752 receives inlet power from a power cord. The control system also utilizes a real-time locating tag 2754 which is not electrically coupled to any of the components of the control system 400, but is available to provide identification of the hospital bed 10 based on information stored on the RTLs 2754. The control board 384 for the powered drive wheel assembly 92 indicates with the LED board 108, the right handle assembly 394, the left handle assembly 396, the deployment actuator 334, and the drive motor 330. The board 384 also communicates with the speed controller 385 which provides the drive signals for the drive motor 330. The batteries 386, 386 are also coupled to and charged by the board 384. The circuitry 793 for the indicator system 792 is also coupled to the Main control board.

The air control board 2198 is an electrical communication with the Main control board 2700 but also controls the manifold 2168, the mattress detect switch 2230, and the blower 2170. The mattress detect switch 2230 is operable to determine if a premium mattress, such as mattress 1900, is coupled to the pneumatic system so that the air control board 2198 will have information pertaining to which functions should be available for the mattress that's attached. The right side rail 50 includes much of the same structure as the left side rail 48 but also includes the personal electronic device charging port board 1216.

In general, the control system 400 could be arranged in many different configurations, but the contemplated embodiments would employ a mix of network communications protocols depending on the functionality required. The communication circuitry may be configured to use any one or more communication technology (e.g., wired or wireless communications) and associated protocols (e.g., Ethernet, Bluetooth®, Wi-Fi®, WiMAX, etc.) to effect such communication.

An algorithm 4000 for operating the scale system of the hospital bed 10 is disclosed in FIGS. 377A-377C. The process begins at step 4002 progresses to displaying the way position indicator in the last tier timestamp on a user interface at step 4004. When a user selects the way function at step 4006, the algorithm advances to a decision step 4008 and determines whether the hospital bed 10 is in the optimal weighing position. If it is not, the algorithm progresses to prompt the caregiver at step 4010 to make a determination as to whether or not to continue with the weighing process. Based on input from the user at decision step 4012, the algorithm either progresses to a decision step 4014, or returns to the scale menu at step 4016. If the caregiver chooses to continue to step 4014, the control system 400 determines whether or not the patient location is acceptable and stable if it is, algorithm regresses to generate a prompt at step 4018. However if the patient's location is not acceptable or stable the algorithm advances to a prompt step 4020 informing the caregiver that the patient position and/or the scale is unstable and requiring the caregiver to confirm whether to continue or not. If the caregiver chooses to continue at decision step 4022 then the algorithm advances to the prompt 4018. The caregiver chooses not to continue then the system returns to the scale menu step 4016.

At step 4018, the caregiver is prompted to confirm that protocols are being met and provides an indicator that the weight is being taken. The system then advances to step 4020 and provides additional prompts indicating that the hospital bed 10 should not be touched by the caregiver and should otherwise remain in a stable condition. Once the process step 4020 is complete, the algorithm advances to process step 4022 where the weight is taken and analyzed. The algorithm then advances to the decision step 4024 to compare the current weight with the maximum weight permitted on the hospital bed 10. If the weight measured does exceed the maximum weight than the algorithm advances to a step 4026 providing instructions to the caregiver to make a correction to the condition. The caregiver is then prompted as to whether not to continue at a decision step 4028. If the caregiver decides not to continue, or the condition times out, then the system returns to the basic scale menu at step 4030.

If the caregiver continues at step 4028, then the system advances to a process step 4032. If the measured weight was less than the maximum allowable weight a decision step 4024, then the algorithm advances to process step 4032. The process step 4032, the caregiver is provided a display of the weight along with a difference in the current weight from the previous, with additional information about whether that change is above or below threshold. The caregiver is then prompted to determine whether to accept the weight and log it. Process step 4032 has a countdown timer that is displayed to the caregiver. The algorithm progresses to a decision step 4034 where the caregiver is prompted to accept and log the weight data. If caregiver chooses not to accept and log the weight data, the algorithm advances from a step 4036 to a process step at 4038 where the caregiver receives a prompt inquiring as to whether or not to discard the weight. If the weight is discarded, the caregiver is provided another prompt at step 4040 inquiring as to whether they will take another weight measurement. Depending on the response from the caregiver at decision step 4042, the algorithm will either return to the scale menu at 4044 or return to the main menu at 4046. Returning again to decision step 4034, if the caregiver chooses to accept and log the weight, the caregiver is prompted to save the weight and time to the hospital bed 10 at process step 4048. The caregiver is then prompted to upload the weight and time to the network at 4050 a decision step at 4052 determines whether or not the upload was successful. If it was not, then the caregiver will be prompted at step 4054 that the upload failed in the system will return to the main menu. If the upload was successful, then a prompt at process step 4056 informs the caregiver that the save and upload was successful. The algorithm then returns to the main menu.

An algorithm 4060 begins when a user selects the scale menu structure from the graphical user interface 66 and a menu structure advances to the scale screen at step 4062. At the scale screen the way position indicator and the last tare timestamp. While the information is being displayed at 4064, a user may select the tare option at step 4066 which advances the algorithm to step 4068. At step 4068 the tare position indicator, current weight, and last tare timestamp are all displayed. If the user selects the tare function at step 4070, then the algorithm advances to process step 4072 in which the protocol instructions for taring the hospital bed 10 are displayed. The algorithm then advances to a decision step 4074 were caregiver chooses whether to continue. If the caregiver does not give a response in a reasonable time, such as two minutes, for example, or if the caregiver chooses not to continue, the algorithm returns to the scale screen at step 4064. If the caregiver chooses to continue, algorithm advances to decision step 4076 to determine if the hospital bed 10 is in the optimal taring position. If the hospital bed 10 is not in the optimal taring position, then the hour them advances to process step 4078 where the caregiver is prompted that the hospital bed 10 is in the incorrect hospital bed 10 position and provides correction instructions. The algorithm then returns back to process step 4068.

If the hospital bed 10 is in the optimal taring position, the algorithm advances to decision step 4080 where it compares the weight being detected to a minimum weight. If the detected weight is less than the minimum weight than the algorithm advances to process step 4086 which provides an indication to the caregiver that the weight was too high and that the tare was incomplete. From process step 4086, the algorithm returns to process step 4068. If the weight was not greater than the minimum weight than the algorithm progresses to step 4082 where the caregiver is prompted regarding process instructions and a progress indicator is displayed. The algorithm then advances to step 4084 where the weight is acquired and analyzed. Algorithm then advances to process step 4088 where the zero is saved along with the time that the tare occurred and stored in memory on the hospital bed 10. The process then advances to step 4090 where the zeros displayed along with the change from the previous zero. If the change in tare weight is larger than a threshold, the system will prompt the caregiver to consider performing the taring operation again. Process then advances the step 4100 and returns to the main menu.

Given the extensive information available to the control system 400, having the control board 384 for the powered drive wheel assembly 92 in communication with other nodes on the network of the hospital bed 10 presents the opportunity for significantly improved performance. A series of algorithms are provided in FIGS. 379-384 which provide an overview of the operation of the powered drive wheel assembly 92 utilizing the information available from the hospital bed 10. An algorithm 4110, shown on FIG. 379, is a state diagram that is operated by the control logic of the control board 384 to determine the appropriate mode of operation of the powered drive wheel assembly 92. In a first state 4112, the drive is not deployed, meaning that the drive wheel 214 has not been deployed to contact the floor by the actuator 334. The algorithm proceeds to a decision step 4114 where it evaluates if the AC power is present. If the AC power is present, the algorithm 4110 advances to a process step 4116 two charge the batteries 386, 386. The algorithm also advances to step 4118 to evaluate the opportunity to upgrade software, and if upgraded software is available, to perform the update. The process then returns to state 4112. If AC power is determined not to be present at decision step 4114, the algorithm advances to decision step 4122 determine if the break is on. If the break is on, the drive will not deploy so the algorithm returns to state 4112, drive not deployed. If the break is not on at decision step 4120, then the algorithm proceeds to state 4122 confirming that it is acceptable to deploy the drive if a driver request is made.

An algorithm 4124, shown in FIG. 380, monitors for system usage and errors beginning at a step 4126 and advancing to decision step 4128 to determine if the hospital bed 10s powered drive is running. If it is not, the algorithm loops back to the start 4126. If the powered drive is running, then at step 4130, the control system 400 collects data regarding the hours of operation of the powered drive. The algorithm then progresses to process step 4132 where the control system 400 collects performance data including the drive current, patient weight from the load cells, battery charging statistics, battery charge level, and performance data regarding a number of wheel rotations, slips, or collisions. The algorithm then proceeds to process step 4134 where the algorithm calculates the estimated number of transparent hours left on the battery charge, and the average drive current. This information is then collected by the control board 384 at process step 4136 and transferred to the Main control board 2700 where would be accessible by service personnel.

Another algorithm 4140 is shown on FIGS. 381A-381C and relates to the operation of the powered drive wheel assembly 92 based on data available from other systems on the hospital bed 10. At the first step 4142, the control board 384 for the powered drive wheel assembly 92 reads the load beam data available from the four load beams 522, 524, 526 and 528. Utilizing the load beam data or another signal from other systems of the hospital bed 10, the control board 384 determines if there is a patient in the hospital bed 10 at decision step 4144. If the patient is present the algorithm advances to process step 4146 to set the downforce, current limit and speed to variable value based on the patient's weight. The algorithm then advances to process step 4148 to calculate the center of gravity and patient position. This information is then used at a decision step 4150 where the patient position is analyzed to determine if the hospital bed 10 is in the optimal height for transport. If it is not, then the algorithm advances to step 4152 and prompts an alert to a caregiver to adjust the patient position and hospital bed 10 height, returning back to process step 4148.

If the decision at 4150 is that the hospital bed 10 is at the appropriate height, the algorithm advances to a decision step 4154 to evaluate whether all side rails are up based on signals from the side rail position switches 2720, 2722, 2736, and 2730. If the control board 384 determines that the side rails are not all up, the algorithm advances to a process step 4156 which prompts an alert to the caregiver and prevents the drive from being drive wheel 214 from being deployed. If all of the side rails are up, the algorithm advances to a process step 4158 to deploy the drive wheel 214. Once a driver request is received from a user, the logic begins to read the data from the accelerometer 4156 located on the main control board 2700. The data from the accelerometer is used to determine if the hospital bed 10 is level at a decision step 4158. If the hospital bed 10 is level than the algorithm advances to process step 4160 and maintains standard power limit on the drive motion. If the hospital bed 10 is not level then the algorithm advances to a decision step 4162 to determine if the hospital bed 10 is traveling up an incline or down an incline. If the accelerometer data indicates that the hospital bed 10 is traveling up a ramp then the algorithm advances to process step 4164 and response to the incline to increase power and to limit or remove the breaking of the powered wheel 214. If the control board 384 determines that the hospital bed 10 is traveling down an incline, then process step 4166 is invoked and there is additional power applied to limit and the powered drive wheel assembly may begin to apply active breaking. In either case, the algorithm then advances to a process step 4168 two determine if the drive wheel rotations. The algorithm then advances to decision step 4172 determine whether or not the drive wheel motion is consistent with data available from the accelerometer. If it is the algorithm advances to process step 4172 and operation is maintained normally. If the drive wheel motion is inconsistent with the motion detected from the accelerometer, then the algorithm proceeds to process step 4174 where the conditions are diagnosed an alert is provided to a user. In either case the algorithm advances to process step 4176 and continues to monitor operations. If the evaluation at process step 4144 indicated that the hospital bed 10 did not have a patient and it the algorithm would advance to process step 4178 to set operating conditions for an empty hospital bed 10.

An algorithm 4180 shown in FIG. 382 describes the logic applied by the control board 384 in responding to a request to deploy the powered wheel 214. The process starts at step 4182 which is initiated when a deployed request is received. The other of them then advances to a built-in delay at step 4184 which reduces the opportunity for the control board 384 to respond to a transient or inadvertent request. Once the delay has expired the algorithm advances to step 4186 where begins to ramp the deployment of the wheel by applying pulse width modulation to step up the power to the actuator 334. Once the PWM stepping is complete, the algorithm advances to process 4187 which monitors for the activation of a switch in the actuator 334 to confirm that the actuator 334 is fully deployed. The algorithm that advances the 4188 and applies a break through the H-bridge circuitry used to operate the motor of the actuator 334. Once the H-bridge break steps are complete, the advances to process 4190 confirming the actuator is deployed and then advances to the idle process 4192. If a condition changes during the deployment, for example stop request is transferred to the control board 384, the algorithm advances to the process 4194 which stops deployment and then advances to process 4188 which applies the H-bridge break. In some instances, there may be a request during deployment to retract the powered wheel 214. In such a case, the auger them advances to process 4196 which begins the change direction functions. In the advances to the process 4188.

In algorithm 4200, shown at FIG. 383, the system maintains the idle state 4202 until a retract request is received, then they ever them advances to process 4204 which applies a delay. Once the delay is expired process 4206 is invoked to apply pulse width modulation to the retracting actuator 334. Once the PWM stepping is complete, algorithm advances to process 4208 and continues to retract until the appropriate limit switches met in the actuator 334. Once the limit switch is met the algorithm advances to process 4210, and then once the inputs and outputs are stable, the algorithm advances to an idle state 4212. However, if a stop request is read received while the actuator 334 is retracting, the hour them advances to the process 4216 to stop the retraction and advances to process step 4210. In some cases a deployed request may be provided in the algorithm will advance to process 4214 which changes the direction of the motion of the actuator 334. The algorithm then advances again to process 4210.

Yet another algorithm 4220 addresses the control of the power to the control board 384 for operation of the powered drive wheel assembly 92. Referring to FIG. 384, when the powered drive wheel assembly is in a power off state 4222, a power up request will advance the algorithm to a power up delay process it 4224. Once a 102nd delay has expired, the request is considered valid and the algorithm advances to the process 4226 where a controller power up request is advanced. Algorithm advances to process 4228 and waits for 100 ms delay to expire before powering up the controller. The process 4230 waits for the delay to expire and the algorithm advances to a state where the drive control board is powered 4232. Upon receipt of the power down request, the algorithm advances to a process 4234 which waits for a delay and once the delay timer has expired the powered wheel assembly returns to the power off state at 4236.

Figure 70:
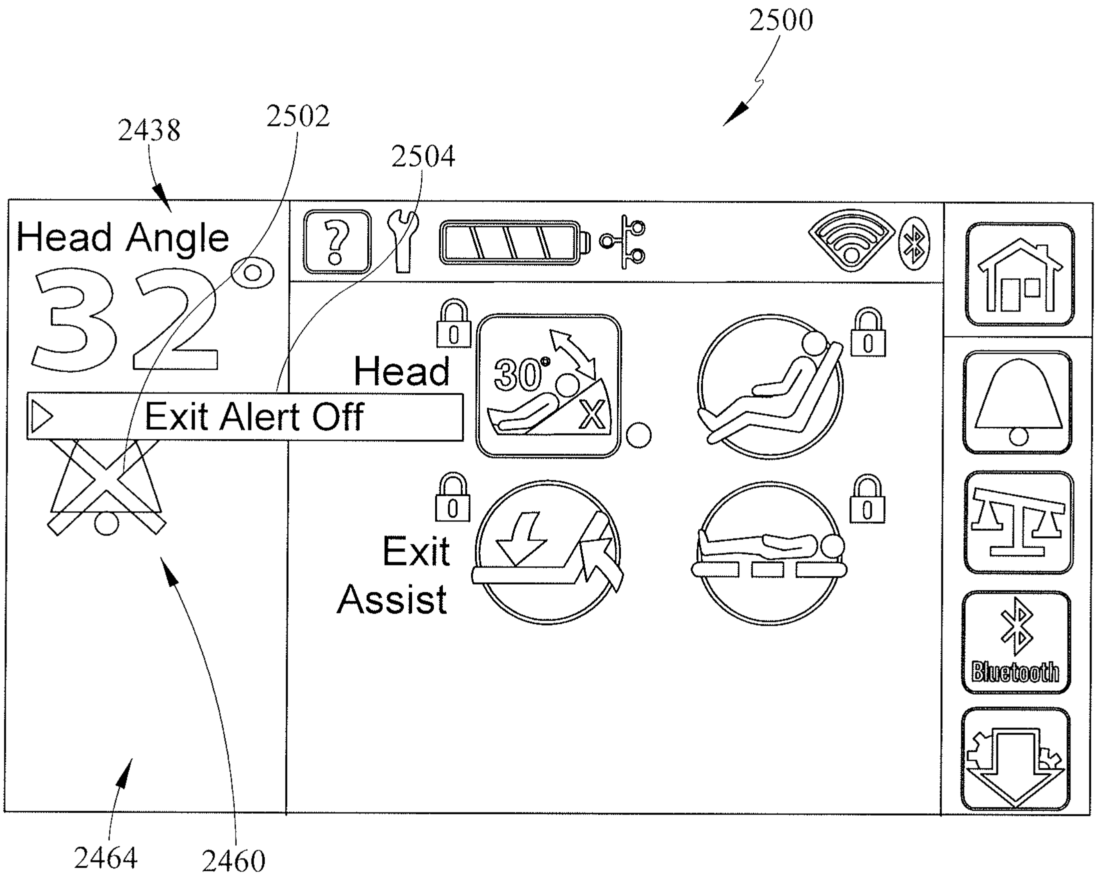
FIG. 70 is a screenshot of a another embodiment of a home screen.
Figure 145:
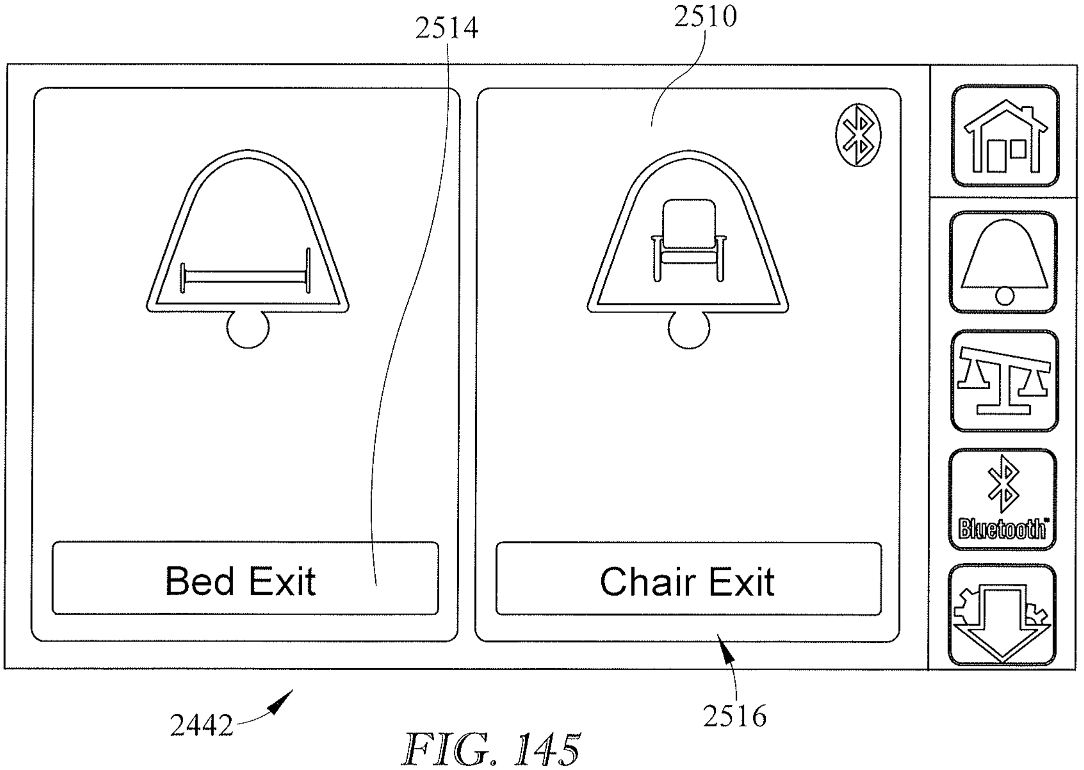
Figure 146:
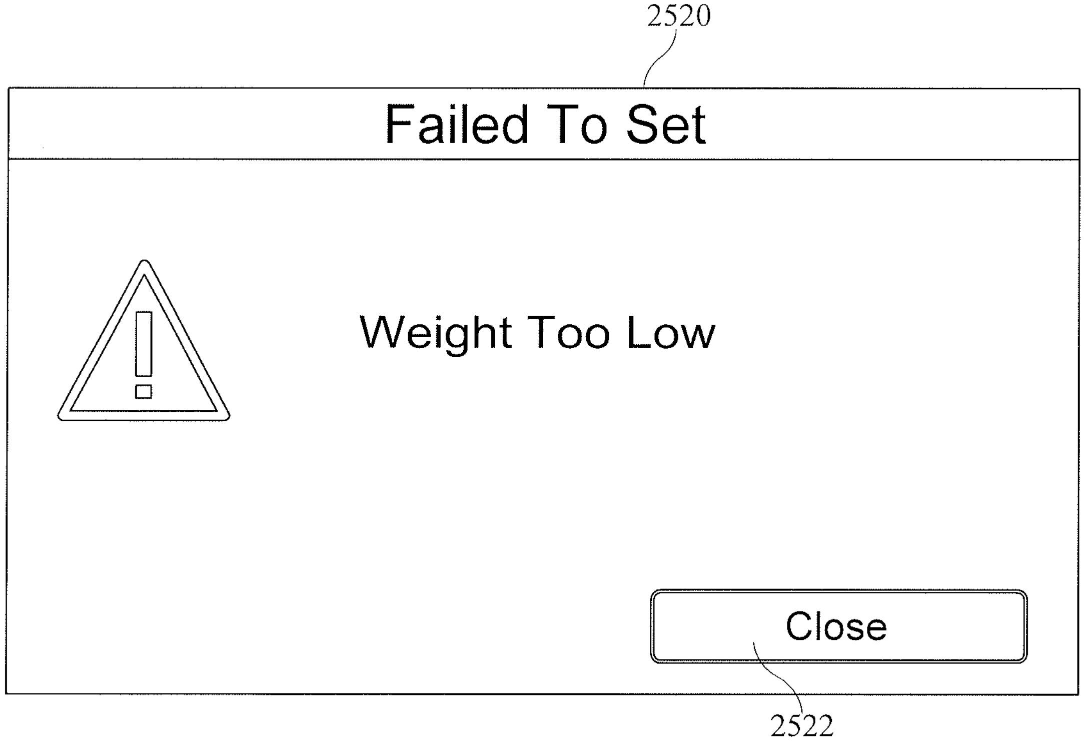
Figure 147:
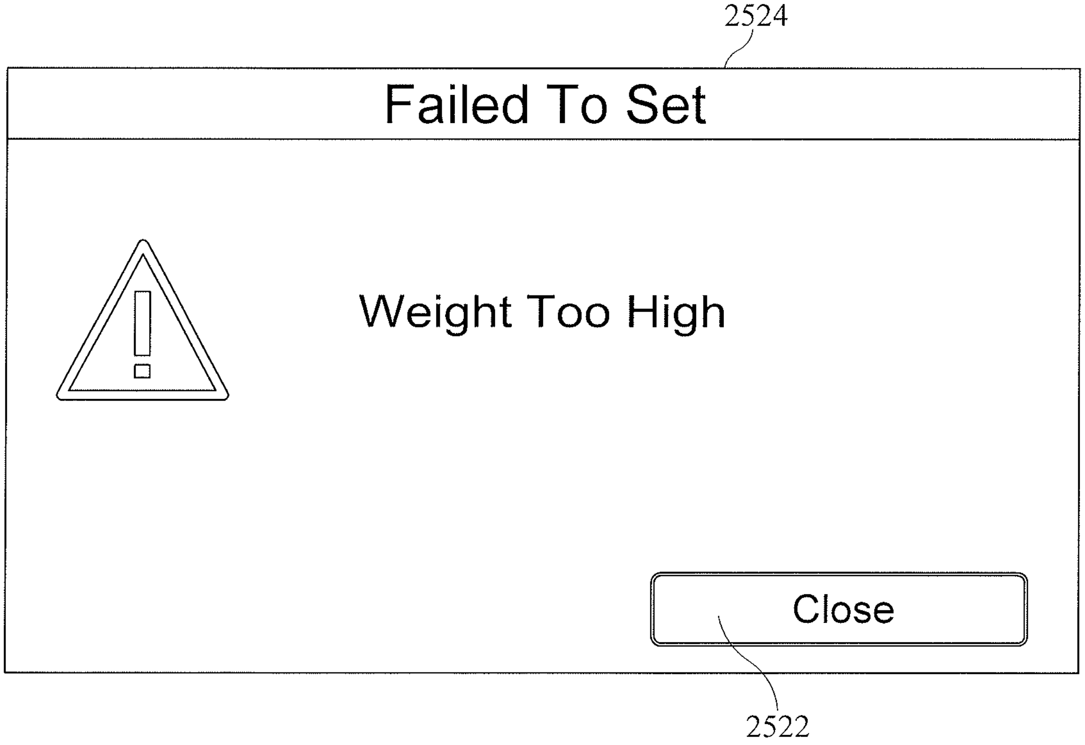
Figure 148:
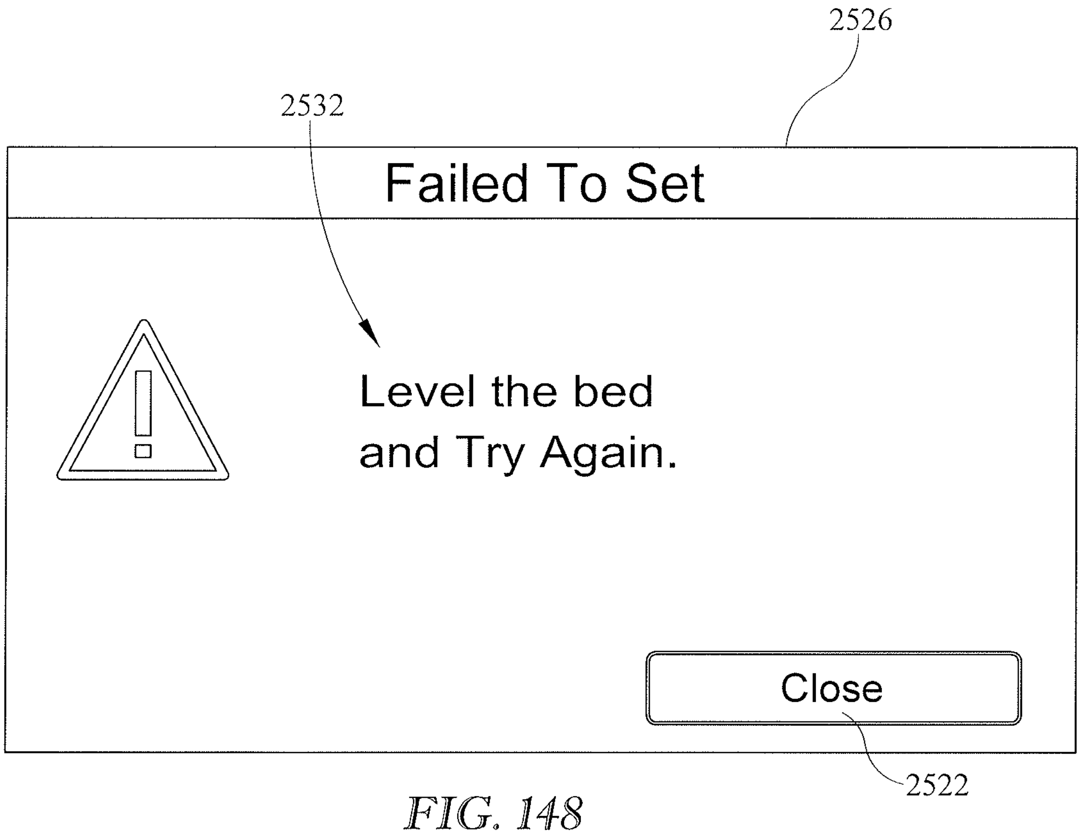
Figure 149:
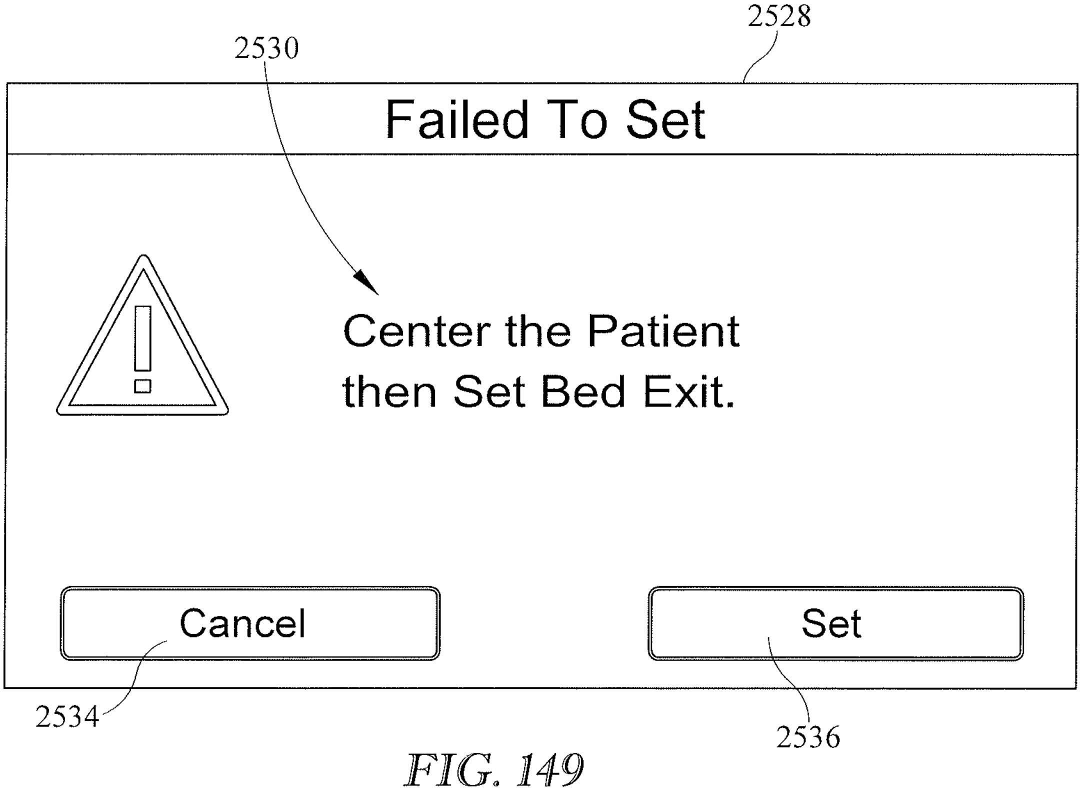

In another embodiment of a screen 2500 shown in FIG. 70, the portion 2464 of status section 2438 does not provide any indication when the mattress 1900 is absent as there is no functionality available. Similarly the foot control retraction section 2294 is blank when the actuator 730 is absent as there is no powered extension and retraction of foot deck 34. In the embodiment of screen 2500, the section 2460 displays an icon 2502 which provides an indication that patient position monitoring system is inactive with a text box 2504 providing text explaining the status of the alerts for the patient position monitoring system. The text box 2504 and text box 2468 of FIG. 68 are temporarily displayed but disappear after a period of time, such as five seconds, for example. In the display shown by a screen 2510 of FIG. 144, the alerts icon 2590 is shown to be activated which invokes the alerts menu structure 2410. FIGS. 144-180 show the various screens of the alert menu structure 2410 with a screen 2512 being displayed upon activation of the alert icon 2590. The screen 2512 includes an expanded interaction section 2442 which expands to overlie the information section 2436 and the status section 2438. Screen 2512 displays two options including a virtual button 2514 that is associated with a hospital bed 10 exit alert menu structure and a virtual button 2516 associated with a chair exit menu structure as shown in FIG. 145.

Figure 150:
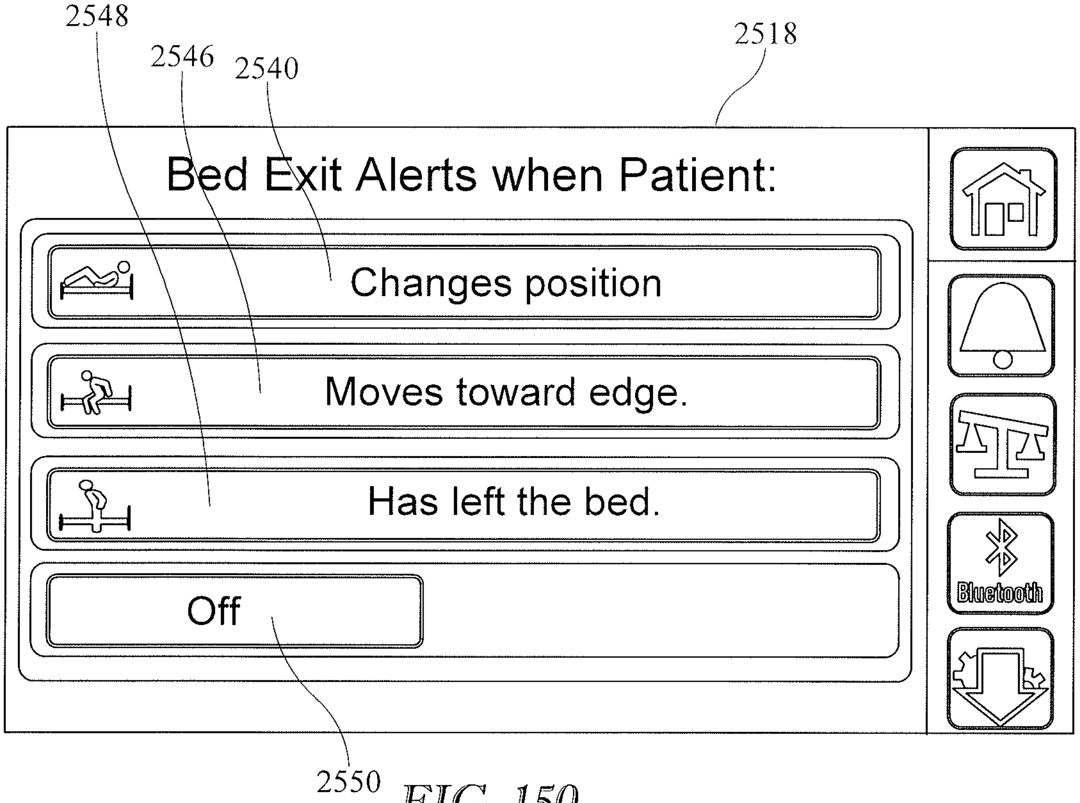

When the virtual button 2514 is activated, the menu structure advances to a screen 2518 shown in FIG. 150. However, if the weight supported on the hospital bed 10 is too low, a screen 2520 is displayed with the text indication that the alert system failed to set because the weight was too low. The caregiver has to activate a virtual button 2522 to return to the home screen 2404. If the virtual button 2522 is not activated, the screen 2520 will timeout and return to the home screen 2404 after a period of time, such as two minutes, for example. The hospital bed 10 exit alert will not set if the weight on the hospital bed 10 is too high and a screen 2524 will be displayed with text indicating that the system failed to set because the weight was too high while displaying the virtual button 2522 which allows the caregiver to return to the home screen 2404. The screen 2524 will also timeout, in a manner similar to the screen 2520.

In some cases, if the hospital bed 10 is not in an appropriate position or the patient is not appropriately positioned on the hospital bed 10, the hospital bed 10 exit alert will not set. The control system 400 provides an indication to a caregiver through the graphical user interface 66 with a screen 2526 providing text indicating that the hospital bed 10 exit alarm failed to set with a text prompt 2532 prompt suggesting that the caregiver attempt to level the hospital bed 10 and try to set the system again. The screen 2526 times out after a period of time or can be closed out by activating the virtual button 2522 displayed on screen 2526 to return to the home screen 2404. If the control system 400 determines that the patient is not appropriately positioned on the hospital bed 10, a screen 2528 is displayed providing a notification that the hospital bed 10 exit alarm failed to set. Screen 2528 provides a text prompt 2530 instructing the caregiver to center the patient and then set the hospital bed 10 exit. The caregiver is given the option of activating a virtual button 2534 causes the system to return to the home screen 2404, or adjusting the patient in activating a virtual button 2536 to make another attempt to set the hospital bed 10 exit alert.

Figure 152:
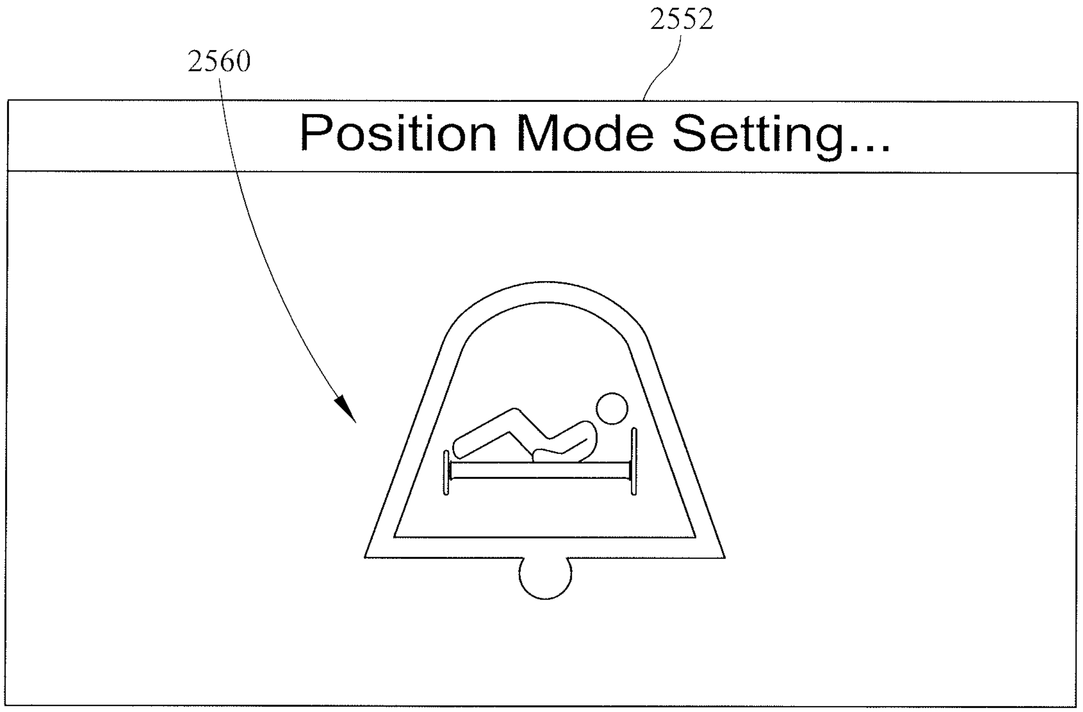
Figure 153:
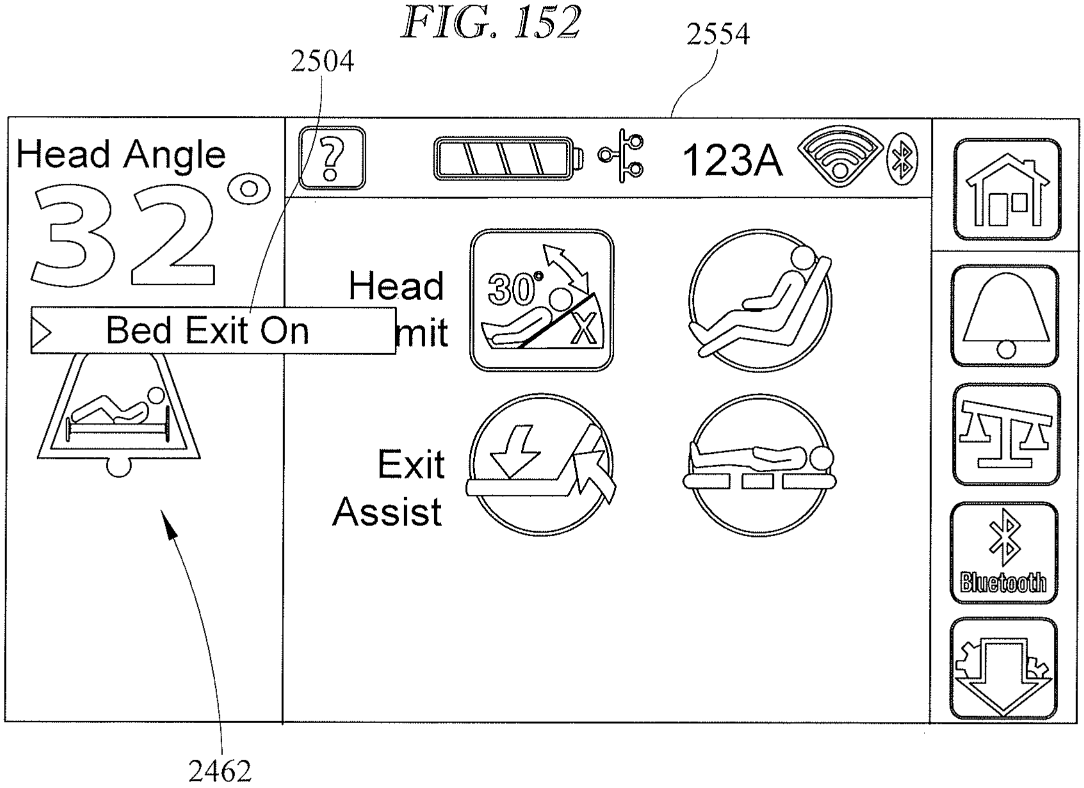

If no errors are detected, the screen 2518 is displayed and the caregivers given the option of choosing between three virtual buttons 2540, 2546, 2548 to set the hospital bed 10 exit alert in one of three modes, or a virtual button 2550 which turns off the hospital bed 10 exit alert system and returns the display to the home screen 2404. If the caregiver chooses the virtual button 2540, the hospital bed 10 exit alert is set to be sensitive to changes in the position of the patient and provide an alert if the patient does change position. The setting is the most sensitive of the three settings available in the hospital bed 10 exit alert menu structure 2412. Once the virtual button 2540 is selected screen 2552, which is shown in FIG. 152, is displayed to provide a text notification that the position mode is being set with a large version of a position mode icon 2560 being displayed while the hospital bed 10 exit alert system is set. Once the position mode is set, a screen 2554, shown in FIG. 153, is displayed with the icon 2560 being displayed in the status section 2438 and the text box 2504 temporarily providing a text prompt indicating that hospital bed 10 exit alerting has been set.

Figure 154:
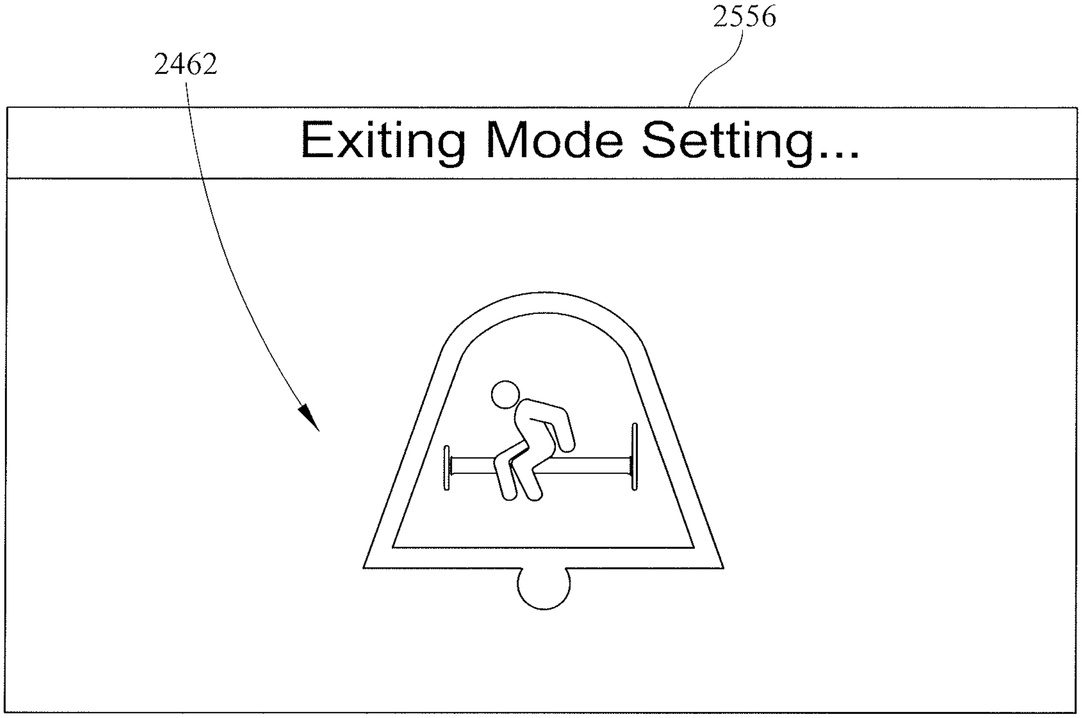
Figure 155:
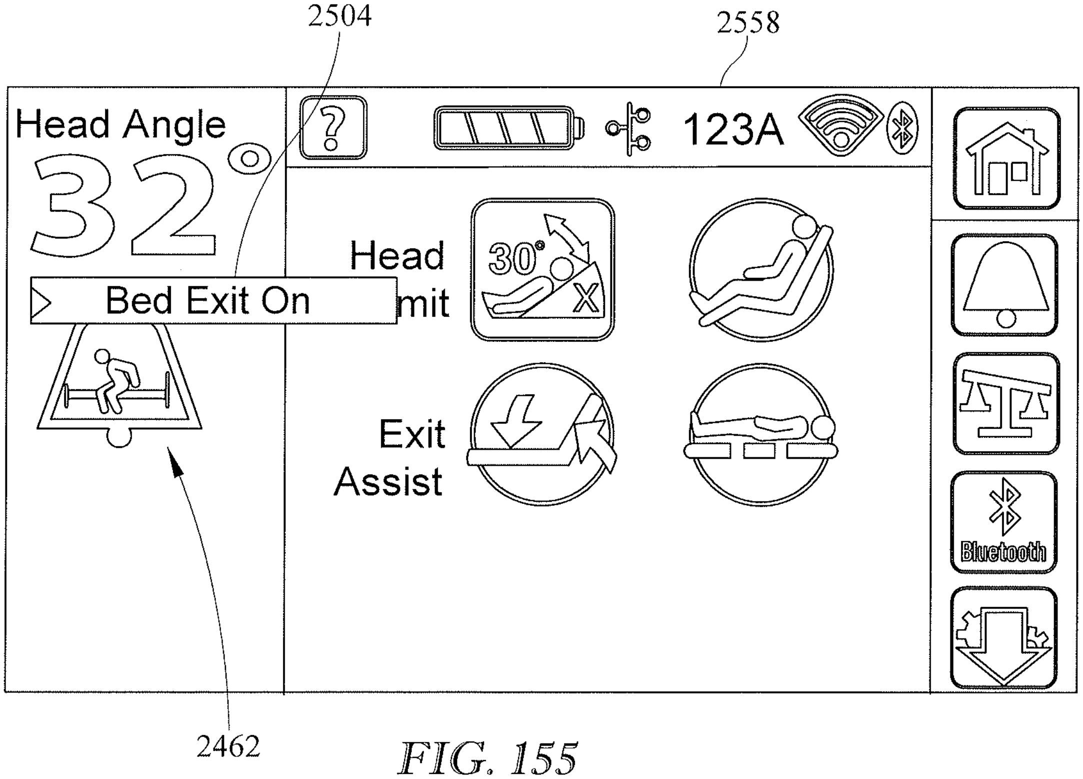

If the virtual button 2546 is activated, then a screen 2556, shown in FIG. 154, is displayed. The virtual button 2546 activates the exiting mode of the hospital bed 10 exit alerts. In this mode, the control system 400 monitors to determine if the patient moves towards the edge of the hospital bed 10, indicating the patient intends to exit the hospital bed 10. If such a movement is determined to be occurring, the control system 400 will provide an indication that the alert condition exists. While the exiting mode is being set, a large version of the icon 2462 is displayed on the screen 2556 with a text prompt in forming a user that the exiting mode is being set. Once the exiting mode is successfully set, the screen 2558 shown in FIG. 155 is displayed. On screen 2558, the text box 2504 provides the temporary indication that the hospital bed 10 exit alert system is active and the icon 2462 is displayed in the status section 2438 to provide an indication of the type of alert that is set.

Figure 151:
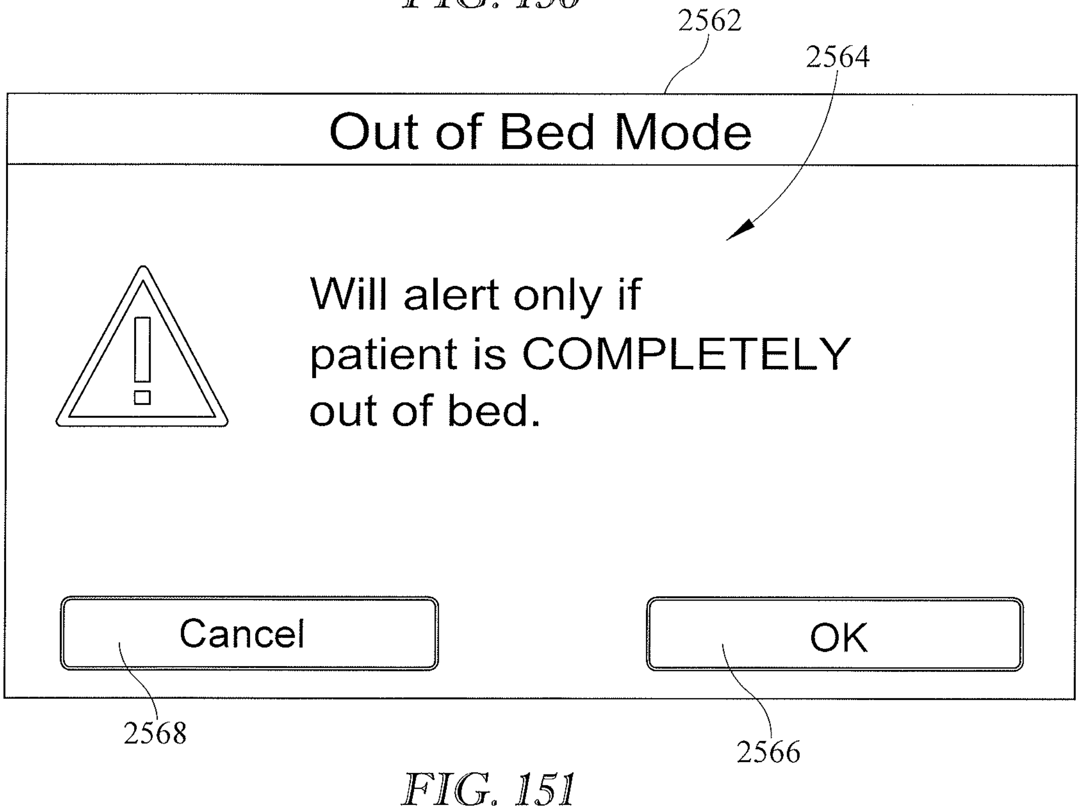
Figure 156:
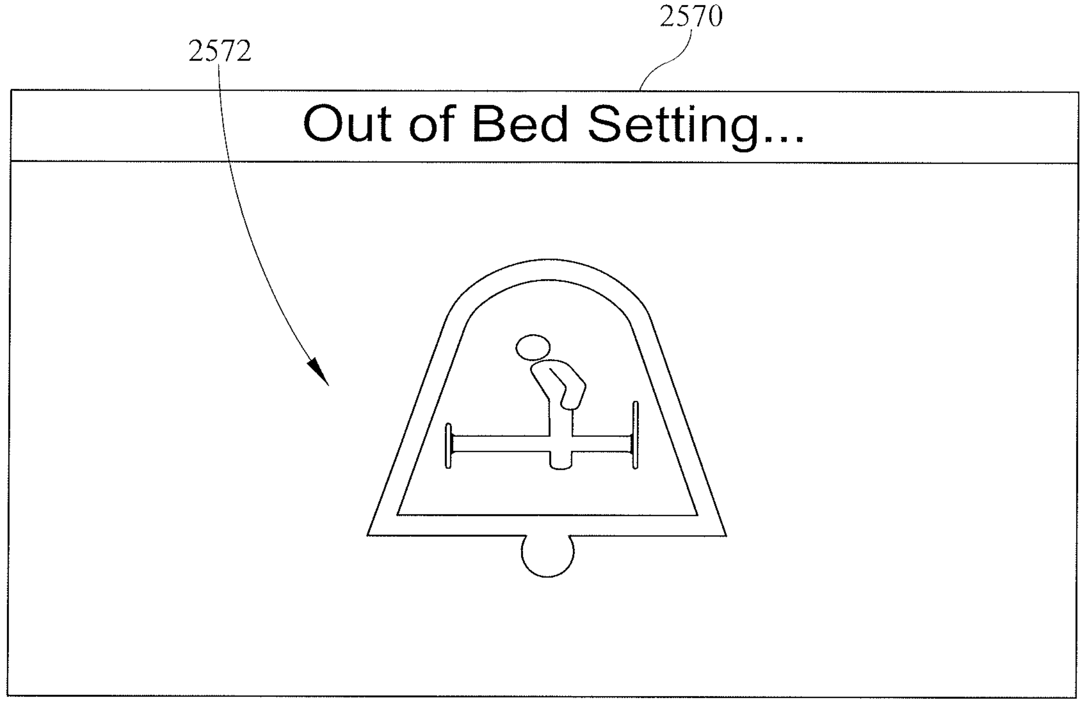

If the virtual button 2548 on screen 2518 is selected, then a screen 2562, shown in FIG. 151, providing a text message 2564 informing the user that the mode associated with virtual button 2548, the out of hospital bed mode, will only provide an alert if the patient is completely out of the hospital bed 10. The user must confirm that this is acceptable by activating a virtual button 2566 to allow the out of hospital bed alert to be set, or must select a virtual button 2568 canceling the out of hospital bed mode and returning to screen 2518. If the virtual button 2566 is activated, then a screen 2570, shown in FIG. 156, is displayed with a large version of an out of hospital bed 10 icon 2572 being displayed along with a text prompt in forming a user that the out of hospital bed alert setting is being set. Once the out of hospital bed alert setting is set, a screen 2574, shown in FIG. 157, is displayed with the out of hospital bed 10 icon 2572 being displayed in the status section 2438 and the text box 2502 being temporarily displayed.

If the virtual button 2516 associated with the setting of the chair exit alert menu structure 2414 is activated, a screen 2576, shown in FIG. 158, is displayed providing a user the opportunity to activate a virtual button 2578 or a virtual button 2580. The virtual button 2580 will cause the alert menu structure 2410 to be terminated and the home screen 2404 to be displayed. If the virtual button 2578 is activated, and a patient is properly positioned in a chair 2582, shown in FIG. 60.

Figure 159:
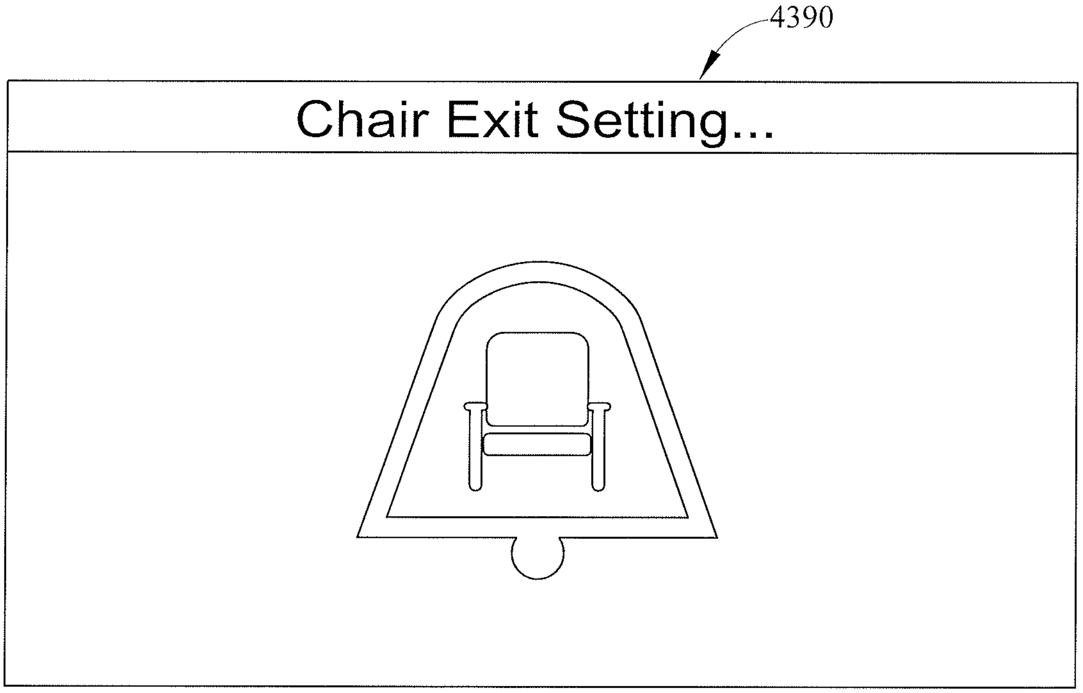
Figure 160:
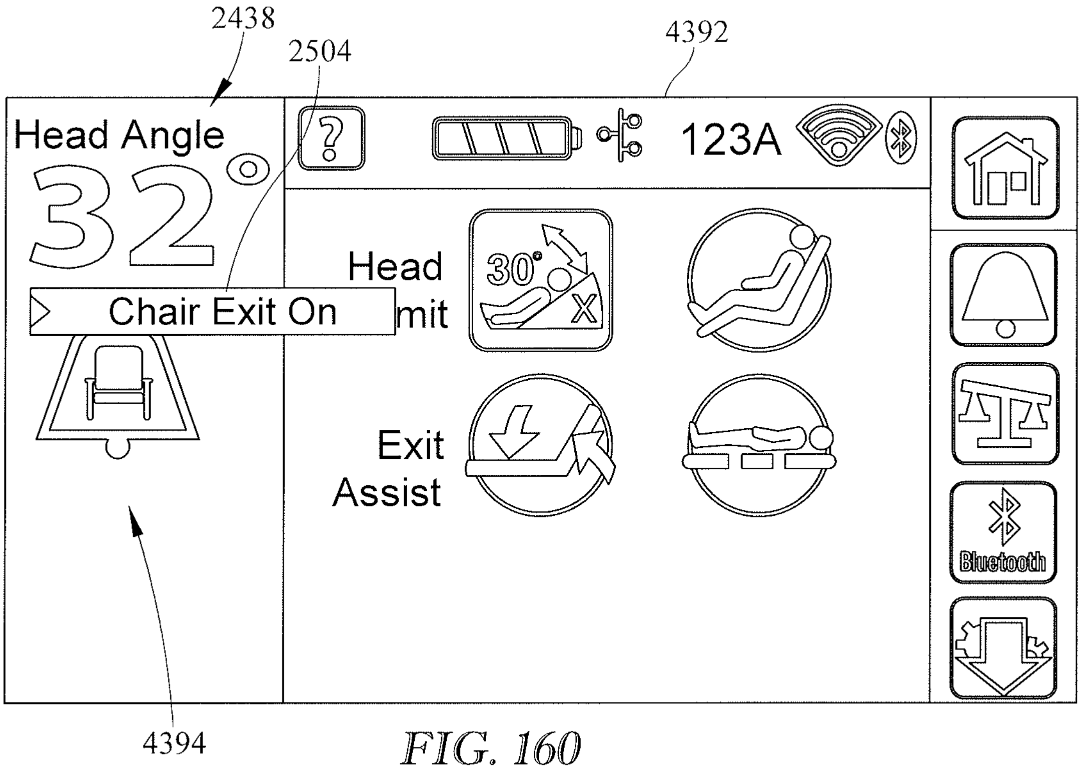
Figure 161:
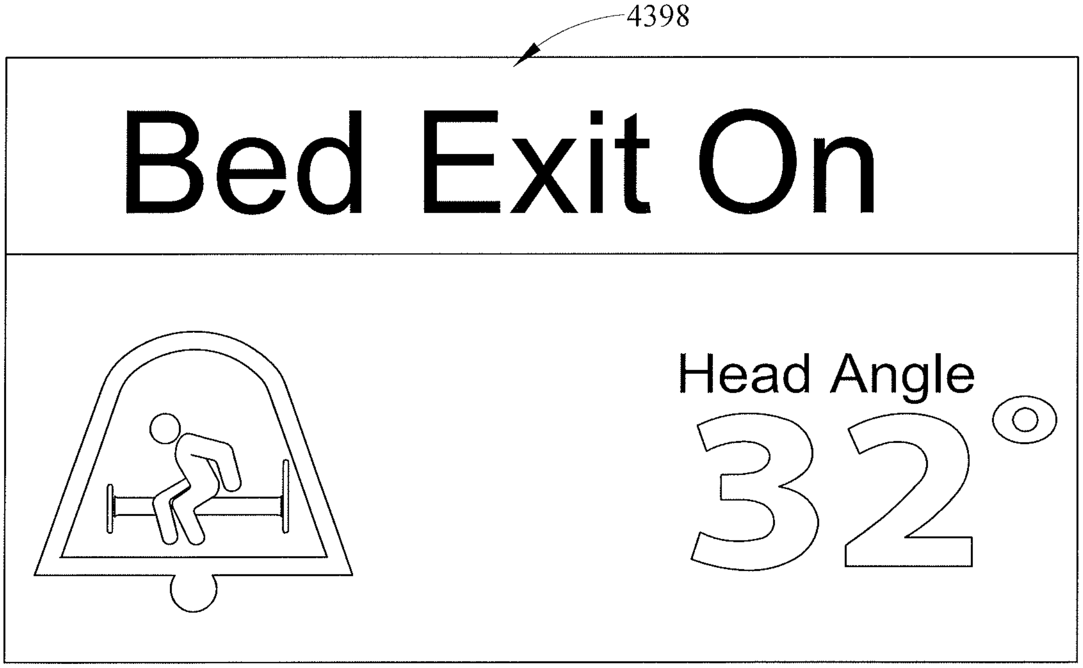
Figure 162:
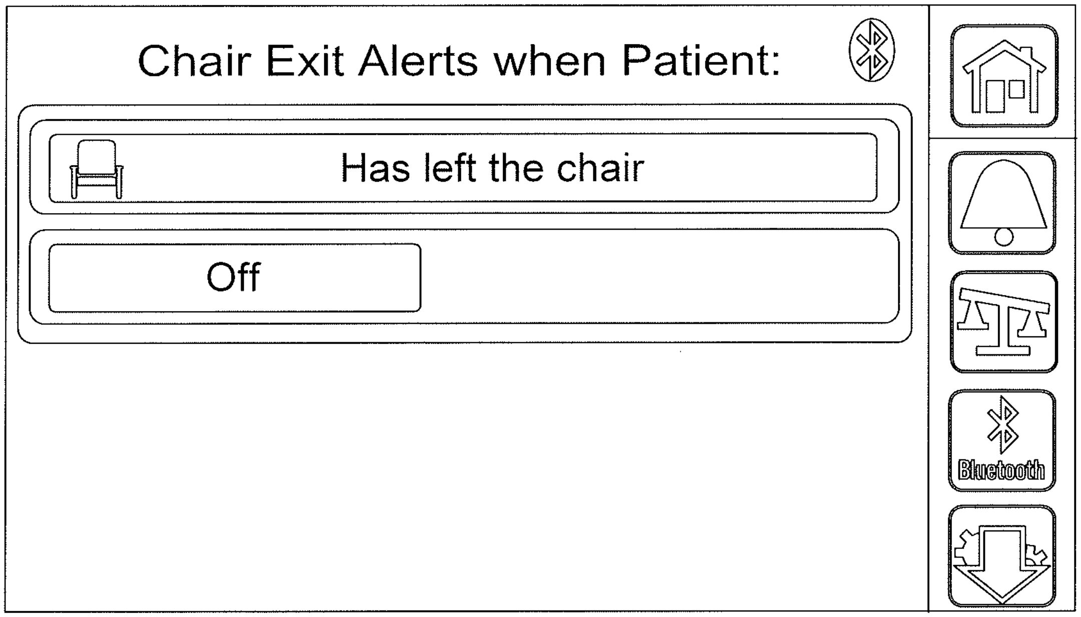
Figure 163:
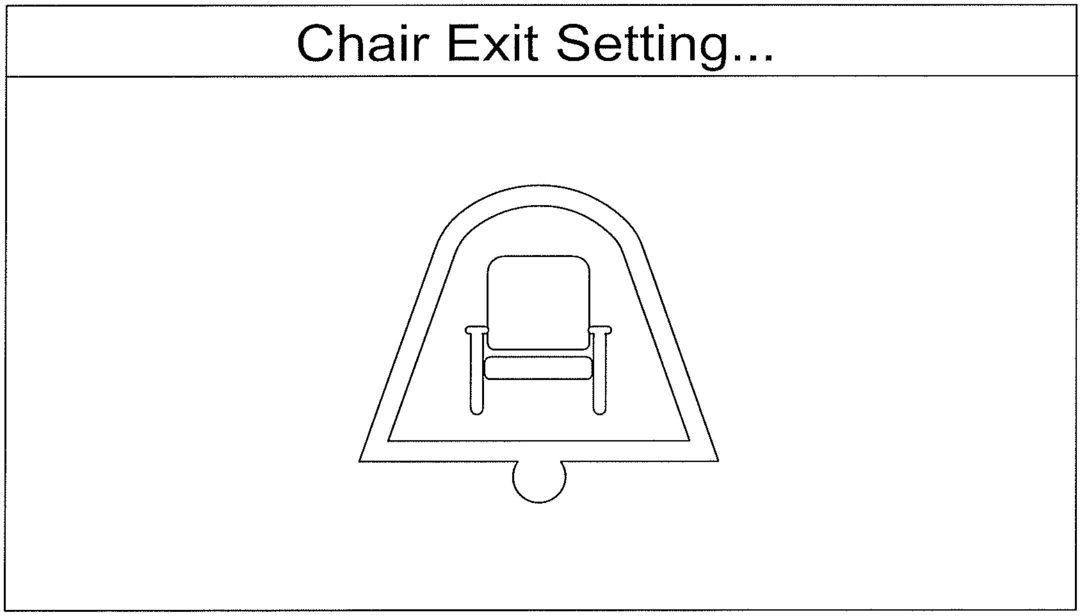

If the virtual button 2516 associated with the setting of the chair exit alert menu structure 2414 is activated, a screen 2576, shown in FIG. 158, is displayed providing a user the opportunity to activate a virtual button 2578 or a virtual button 2580. The virtual button 2580 will cause the alert menu structure 2410 to be terminated and the home screen 2404 to be displayed. If the virtual button 2578 is activated, and a patient is properly positioned in a chair 2582 shown in FIG. 60 then screen 4390 shown in FIG. 159 is displayed while the chair exit sets. If the chair exit alert effectively sets, then the menu advances to screen 4392 shown in FIG. 160 which is a home screen providing the status of the chair exit in the text box 2504 and displaying a chair exit alert active icon 4394 in the status section 2438. Once the home screen times out with the chair exit alert set, the menu advances to a screen 4396 shown in FIG. 165. Similarly, if the home screen shown in FIG. 155 times out, then the screen 4398 shown in FIG. 161 is displayed while the bed exit is active, including displaying the appropriate icon based on what the setting is for the alert.

Figure 164:
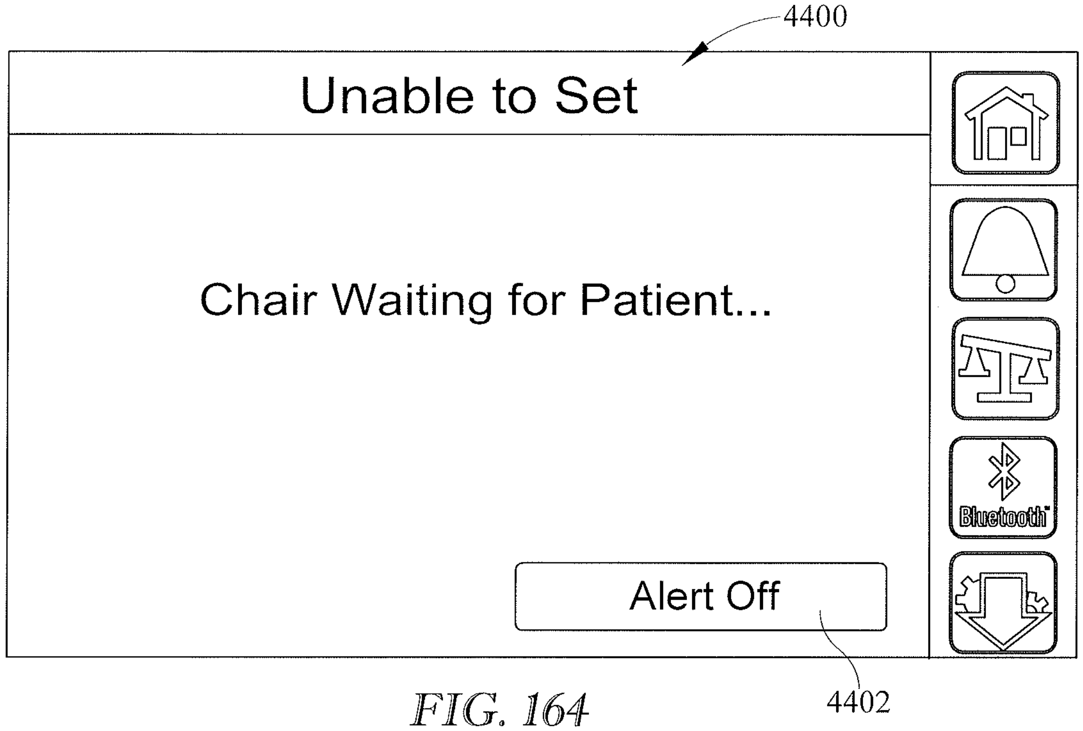
Figure 165:
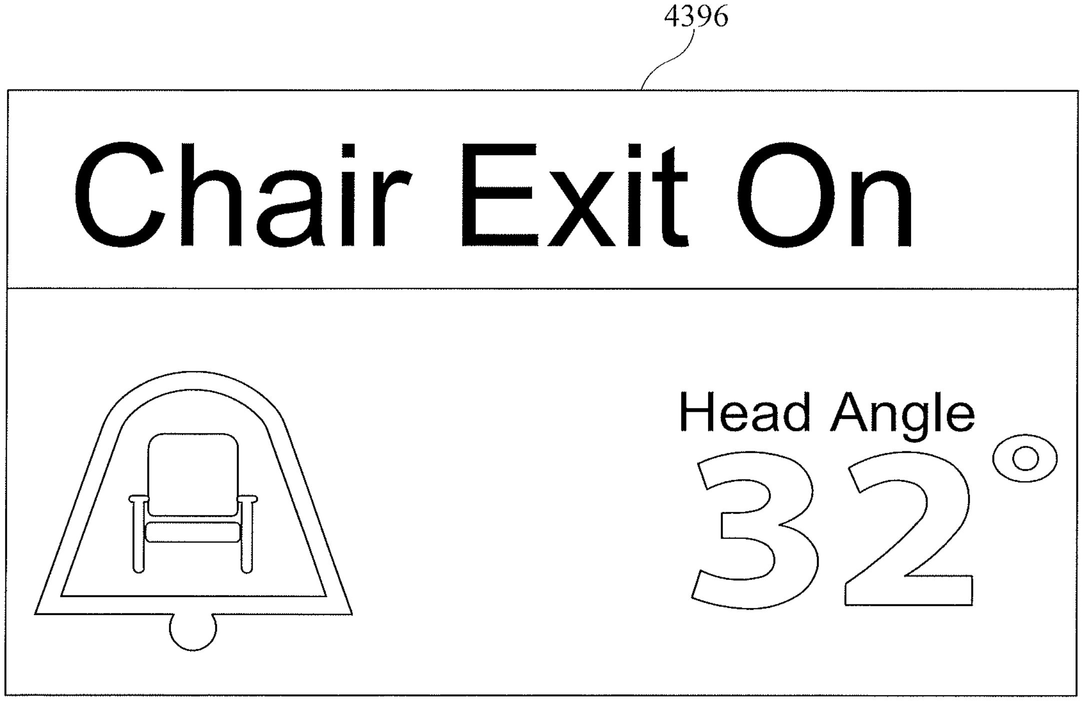
Figure 166:
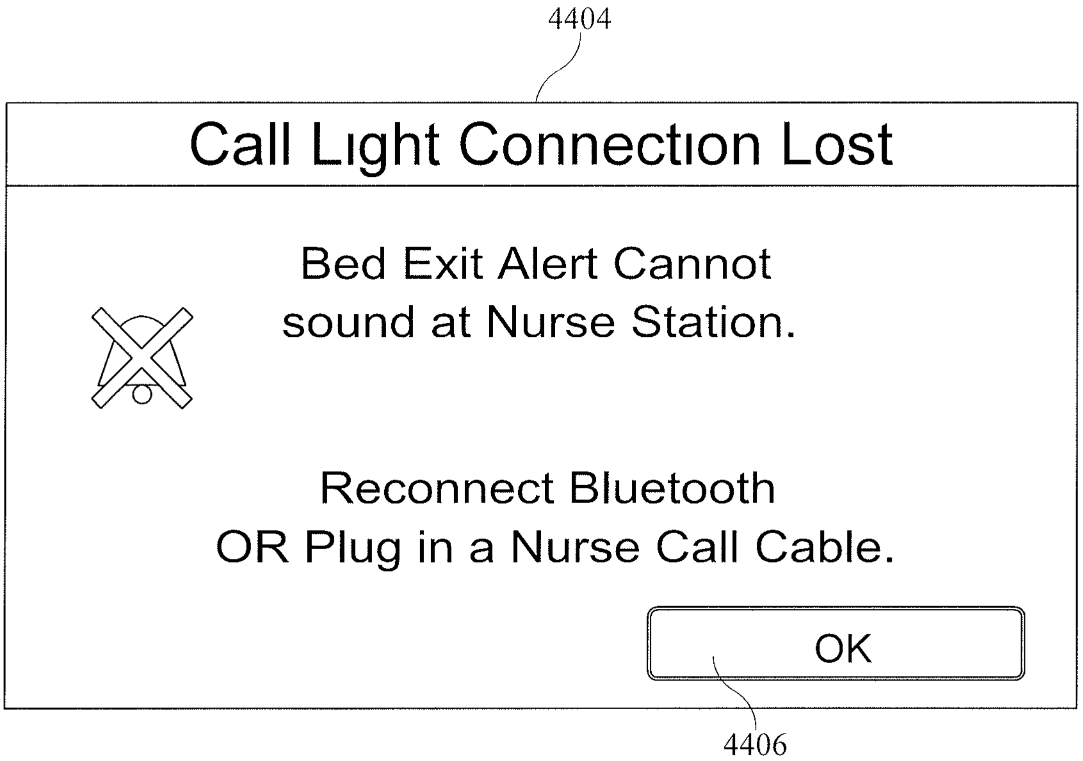

If the chair alert is set but there is no patient in the chair, the screen 4400 shown in FIG. 164 will be displayed. Screen 4400 gives a caregiver the opportunity to turn the alerts off by activating a virtual button 4402. The control system 400 is also operable to let the caregiver know if the communication between the hospital bed 10 and another device or system is lost. For example, a screen 4404, shown in FIG. 166 is displayed if the nurse call cable or a Bluetooth® connection is lost. A virtual button 4406 allows the caregiver to acknowledge the message and return to the home screen. The message does not timeout, but is displayed continuously until addressed. However, if the wired connection is lost, the control system 400 will automatically connect via the wireless connection, Bluetooth®, for example.

Figure 167:
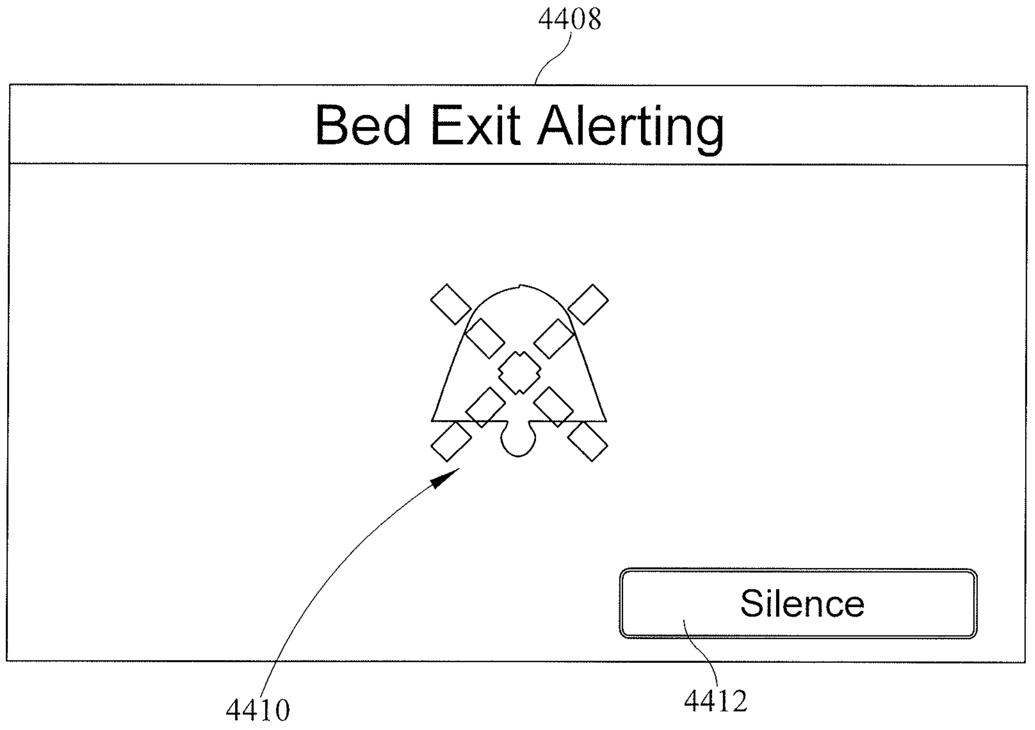
Figure 168:
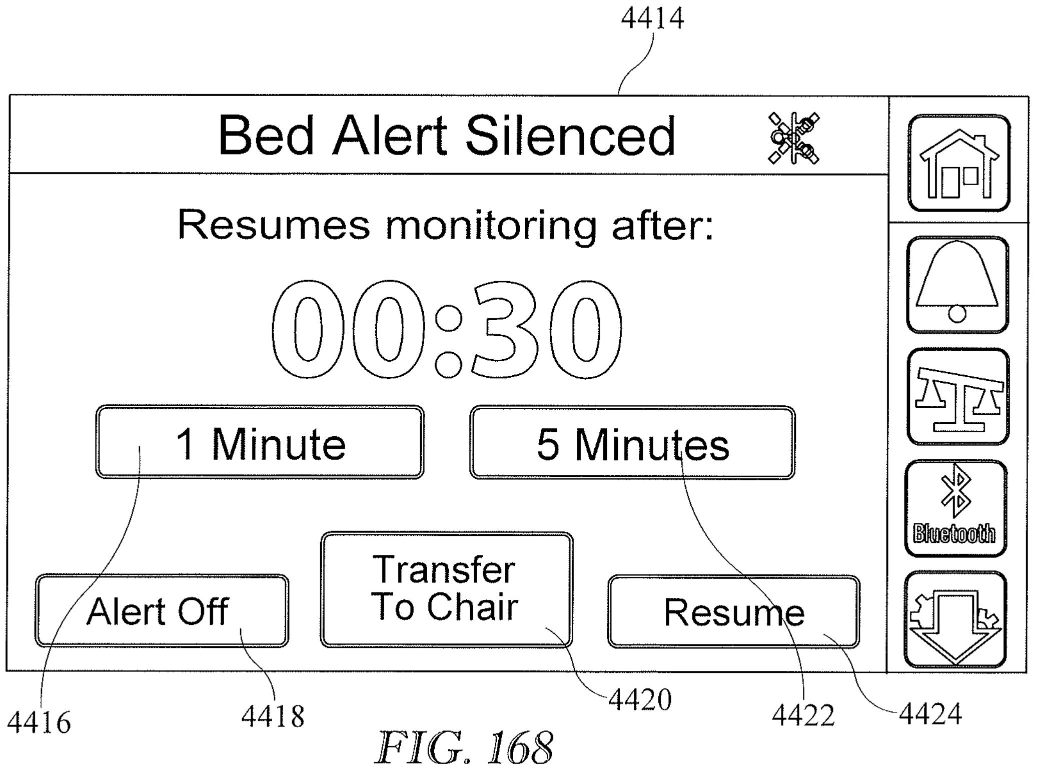

If a bed exit alert is triggered the screen 408, shown in FIG. 167, will appear with an icon 4410 indicating that the alarm condition has been met. A virtual button 4412 allows the caregiver to silence the alarm. If the alarm is silenced in the patient is still on the bed, the menu structure advances to screen 4414 shown in FIG. 168. The monitoring system will return to monitoring within 30 seconds with a countdown timer showing the time to the restart of the alert. The caregiver can select from multiple virtual buttons with a virtual button 4416 extending the silenced alert for one minute. A virtual button 4418 may be activated to turn the alert off. A virtual button 4420 may be activated to commence with transferring the patient to a chair. A virtual button 4422 allows the silencing of the alert to be extended for five minutes. In a virtual button 4424 causes the alert to be resumed. It should be noted that the virtual button 4420 does not appear if the chair exit system is not available by Bluetooth®.

Figure 169:
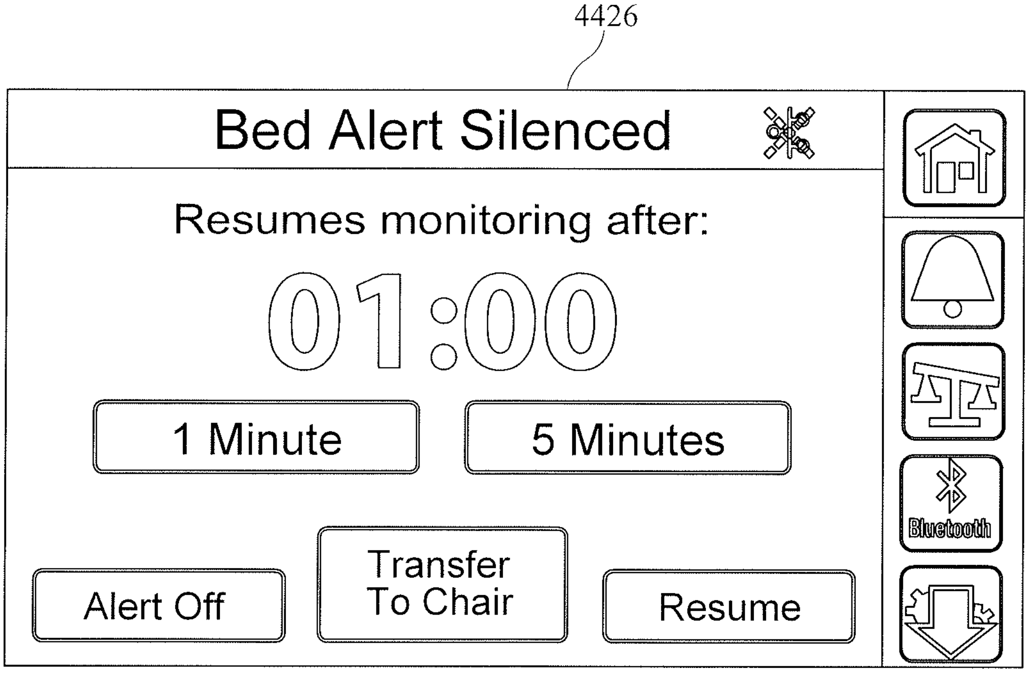
Figure 170:
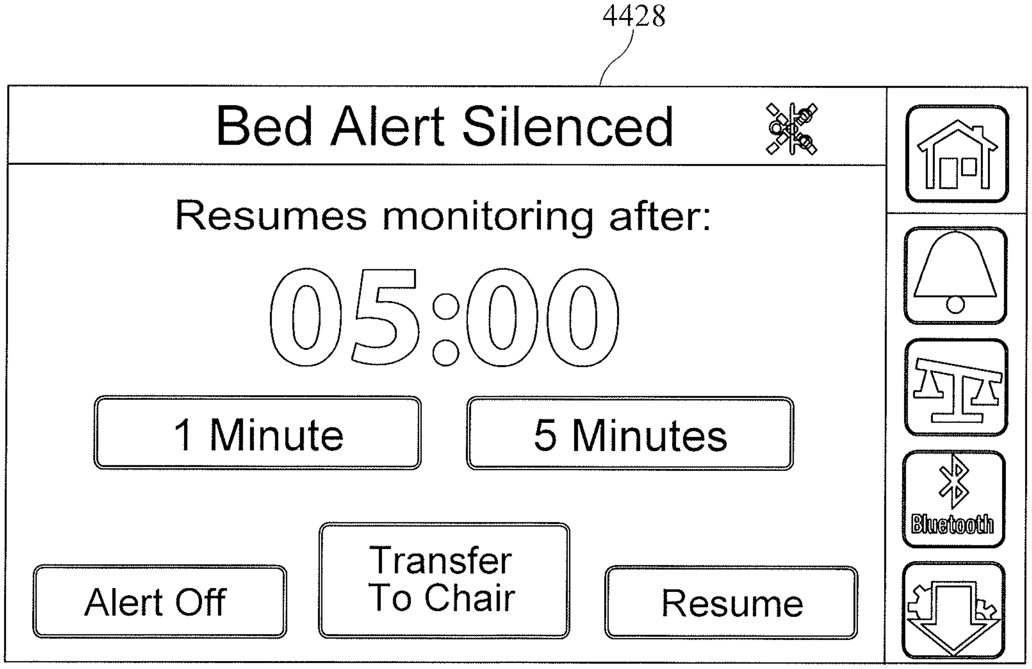
Figure 171:
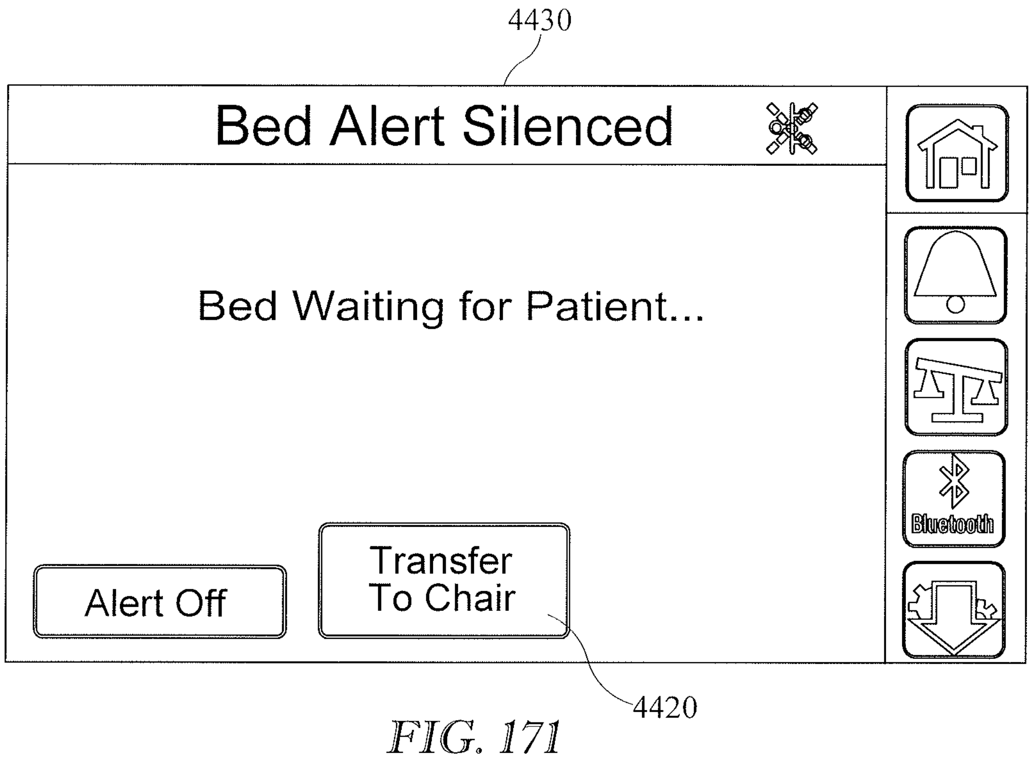
Figure 172:
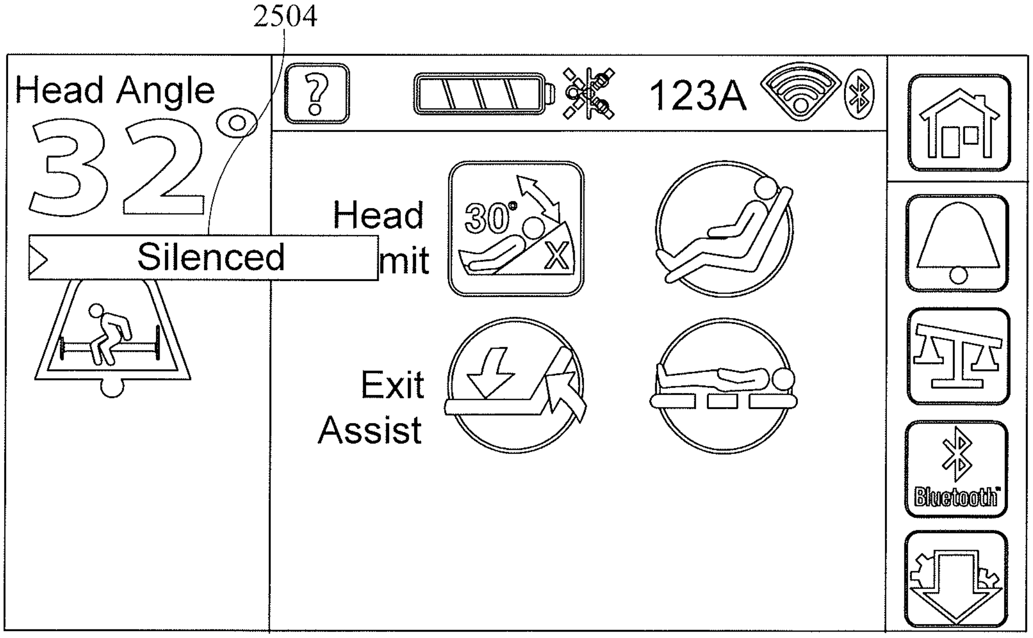
Figure 173:
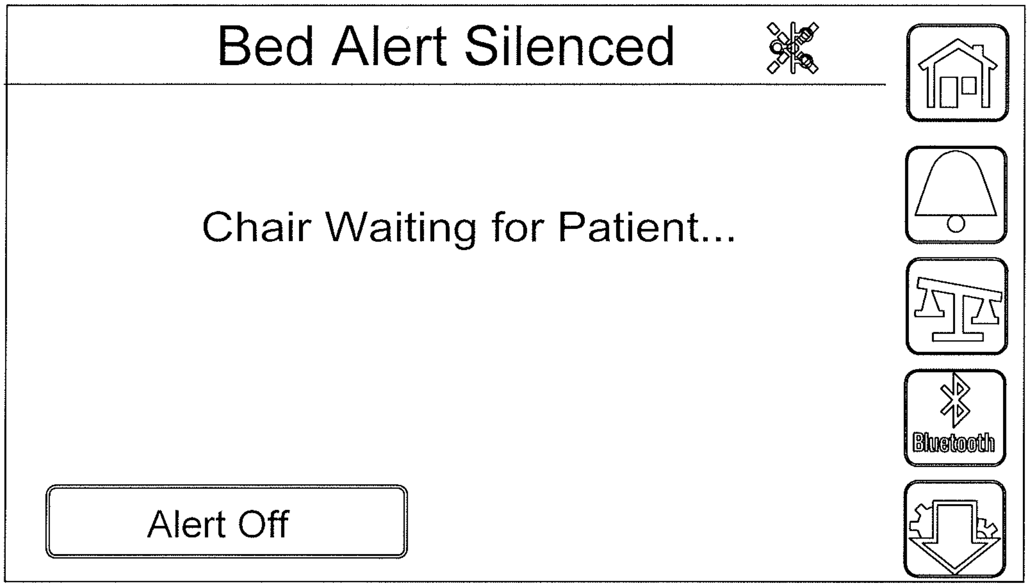
Figure 174:
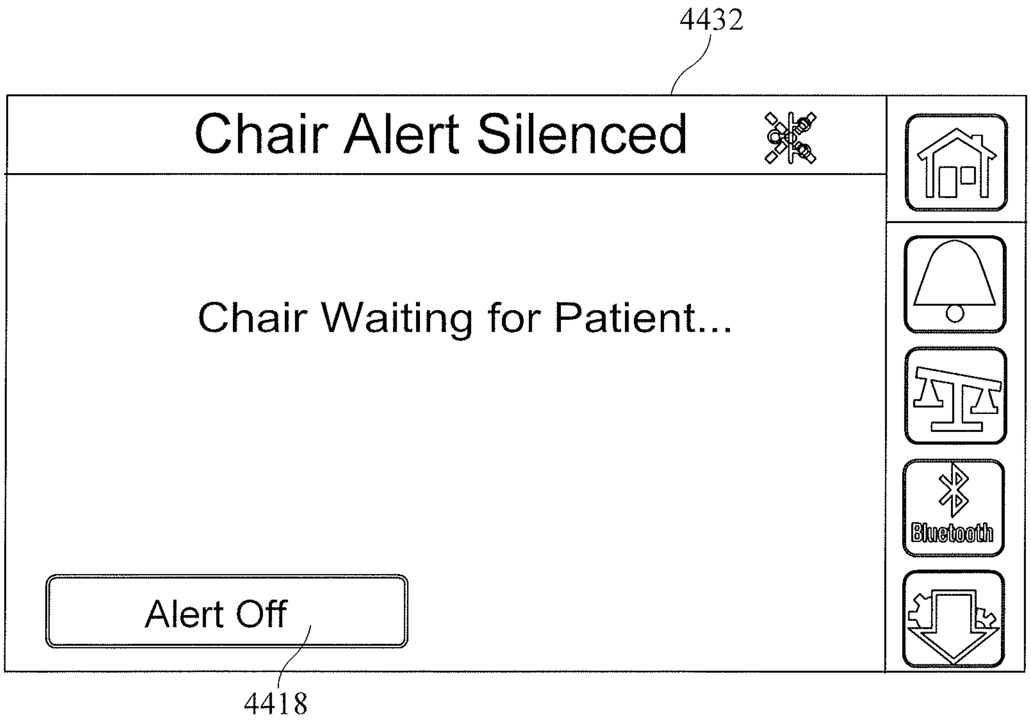

If virtual button 4416 is selected then the screen 4426 shown in FIG. 169 is displayed with the one minute countdown timer being active. If the five-minute virtual button 4422 is selected then screen 4428, shown in FIG. 170, is displayed. It should be noted that all of the virtual buttons 4416, 4418, 4420, 4422, 4424 are available in either screen 4426 or 4428. If the virtual button 4412 is selected at screen 4408, the menu structure advances directly to screen 4430 which prompts a caregiver that the bed is waiting for the patient to reenter the bed. Presumably the caregiver is aware of the patient's exit from the bed in his addressing the issue without turning the alerts off. The virtual button 4420 is available at screen 4430. If virtual button 4420 is selected at any time during a bed exit alert, the menu structure will advance to screen 4432 displayed in FIG. 174. Screen 4432 provides the prompt that the chair is waiting for the patient to be positioned in the chair. The alert off virtual button 4418 is available in screen 4432. If a caregiver attempts to navigate away from either screen 4434 or 4432 then the home screen shown in FIG. 172 will be displayed showing that the alarm is silenced in the text box 2504.

If the patient enters the chair while screen 4432 is displayed, and the menu structure will return to screen 2576 shown in FIG. 158.

Figure 175:
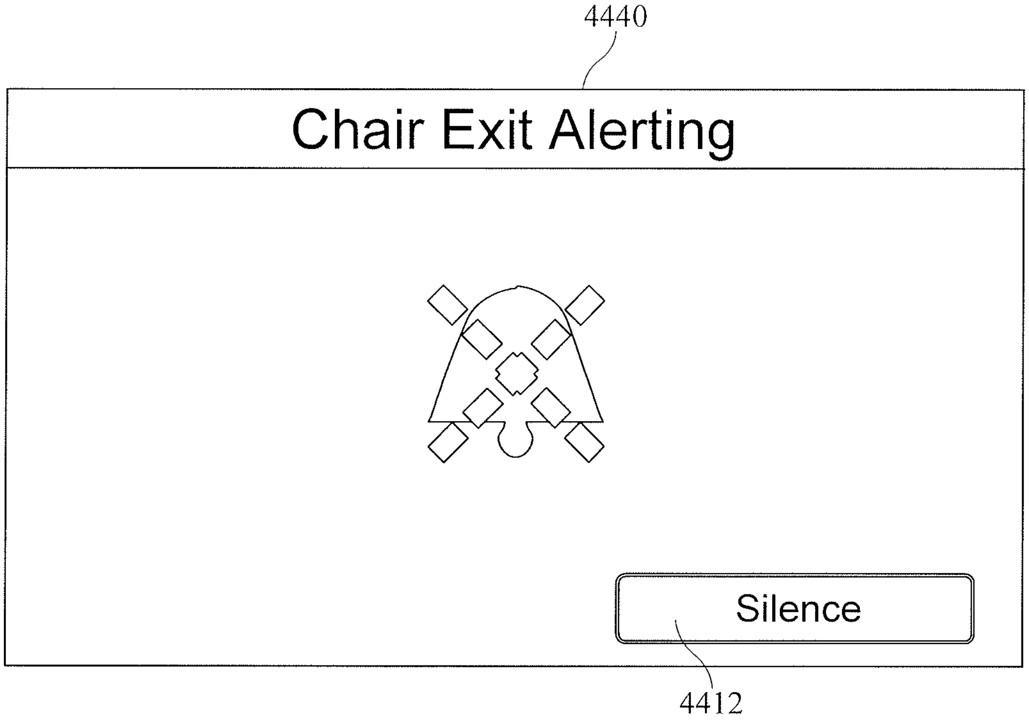
Figure 176:
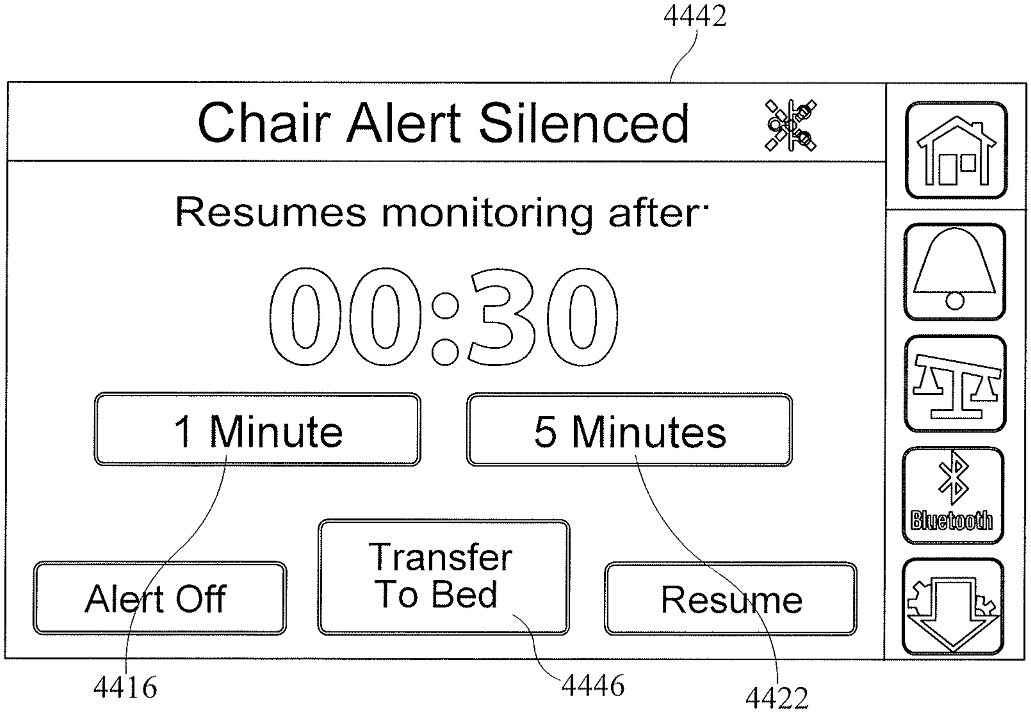
Figure 177:
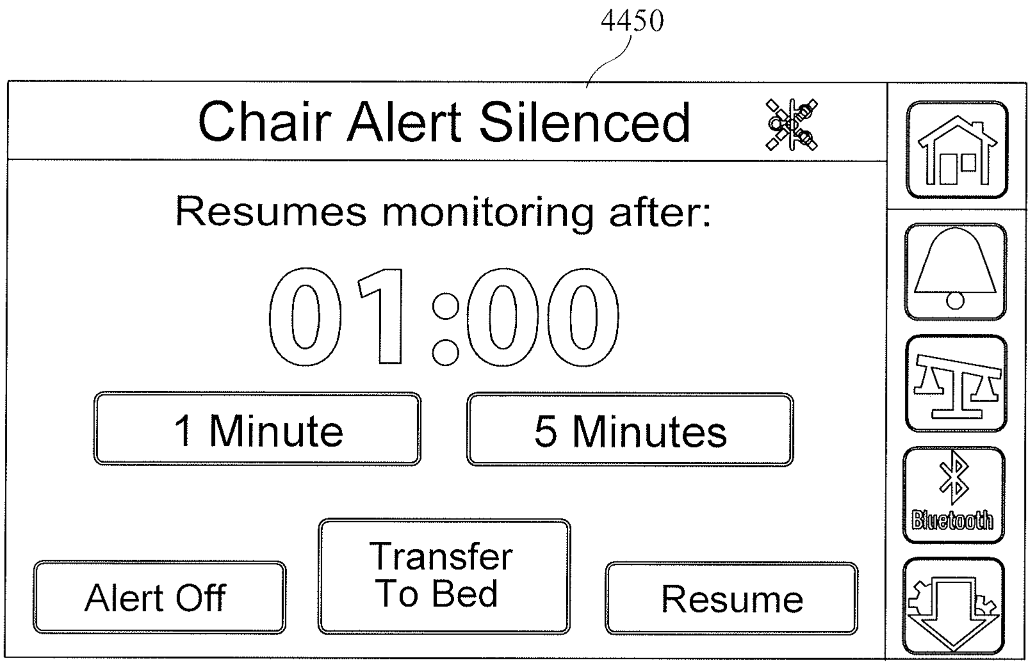
Figure 178:
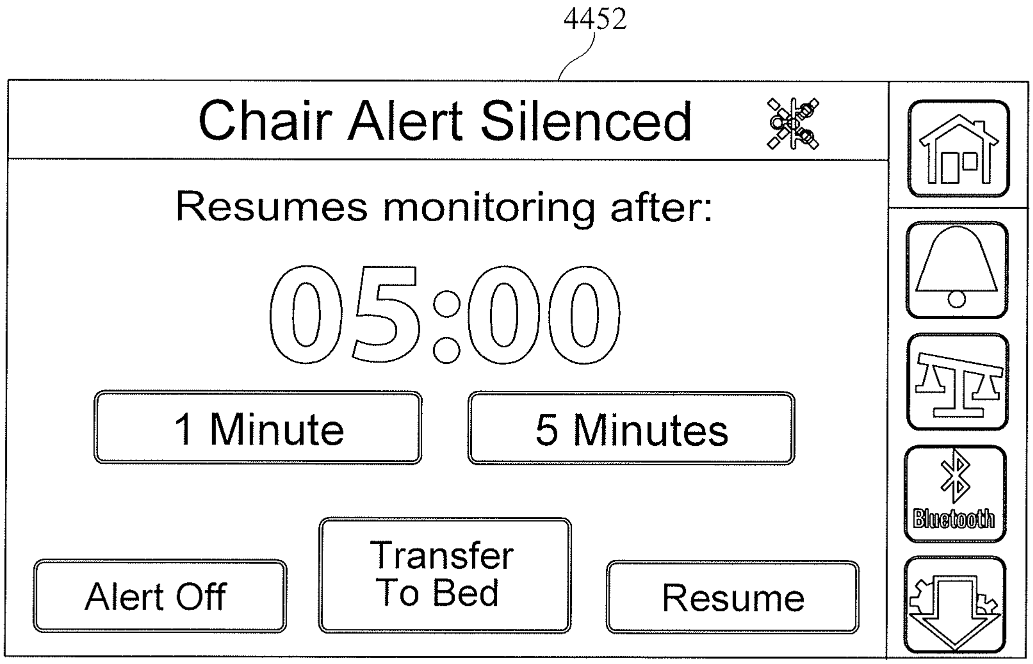
Figure 179:
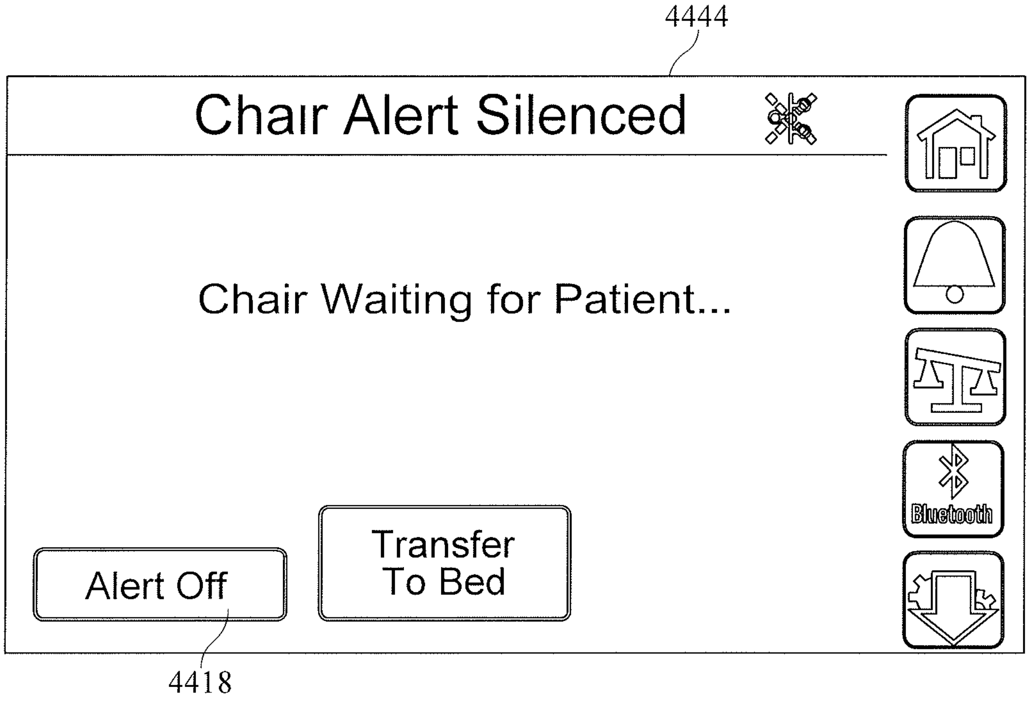
Figure 180:
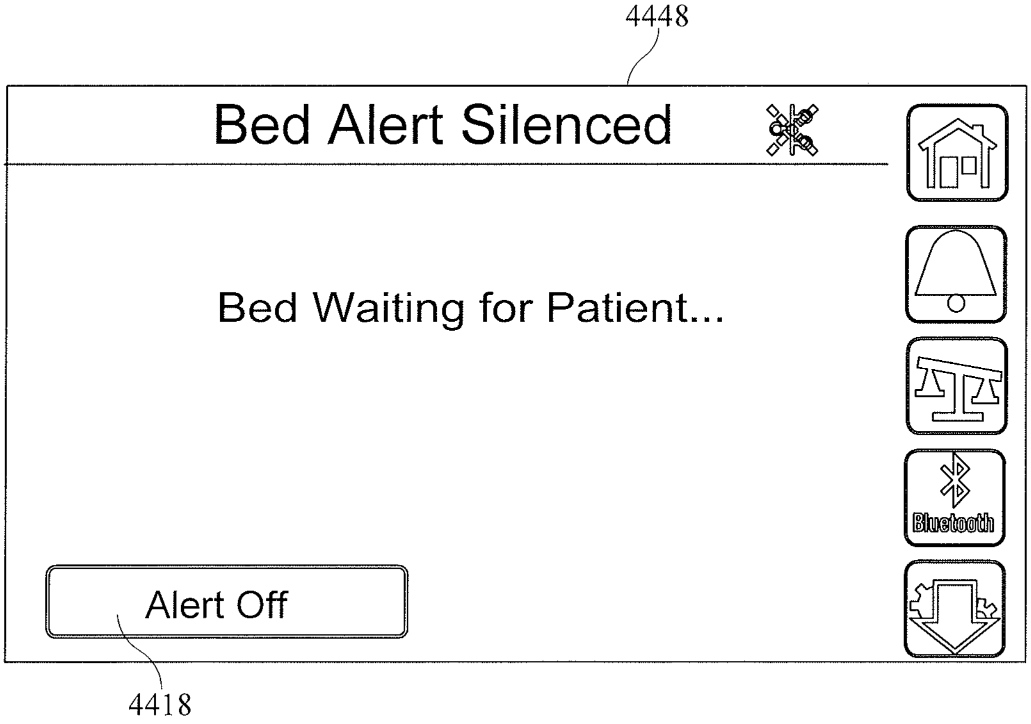
Figure 181:
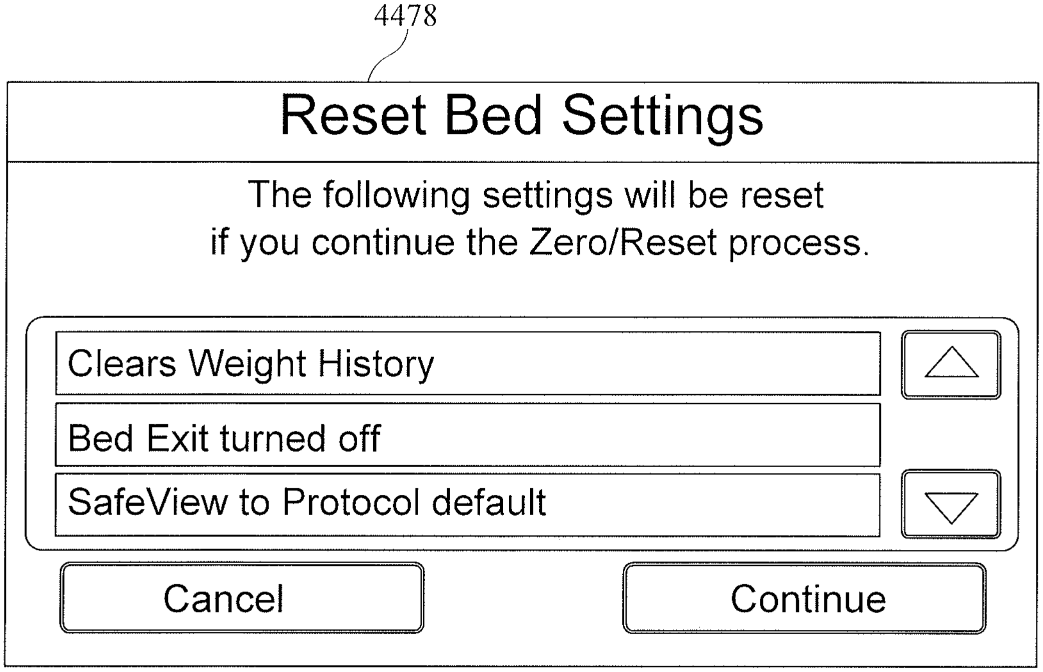
Figure 182:
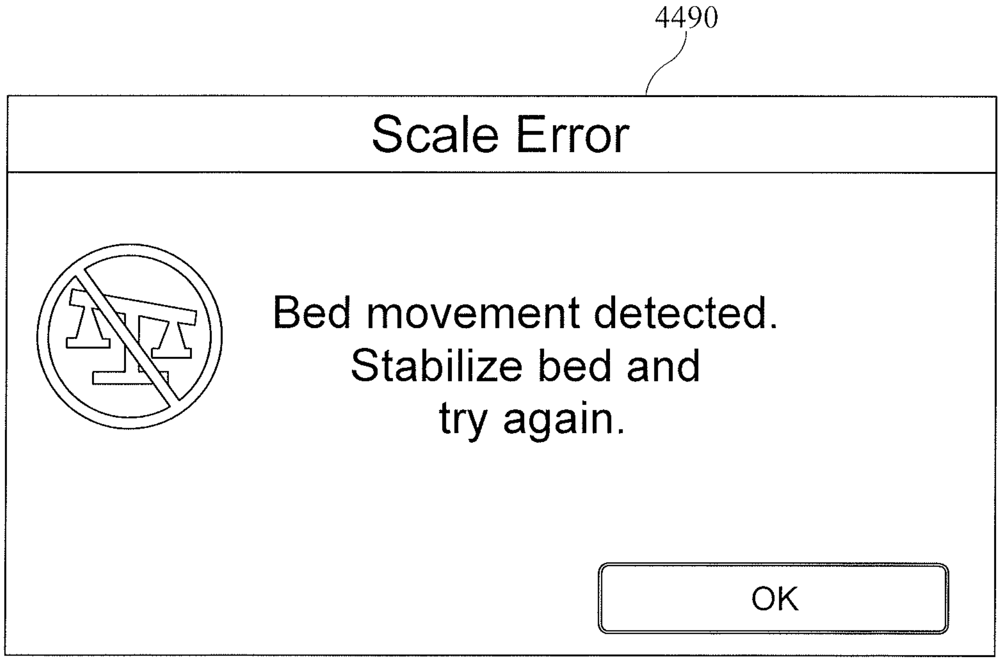
Figure 183:
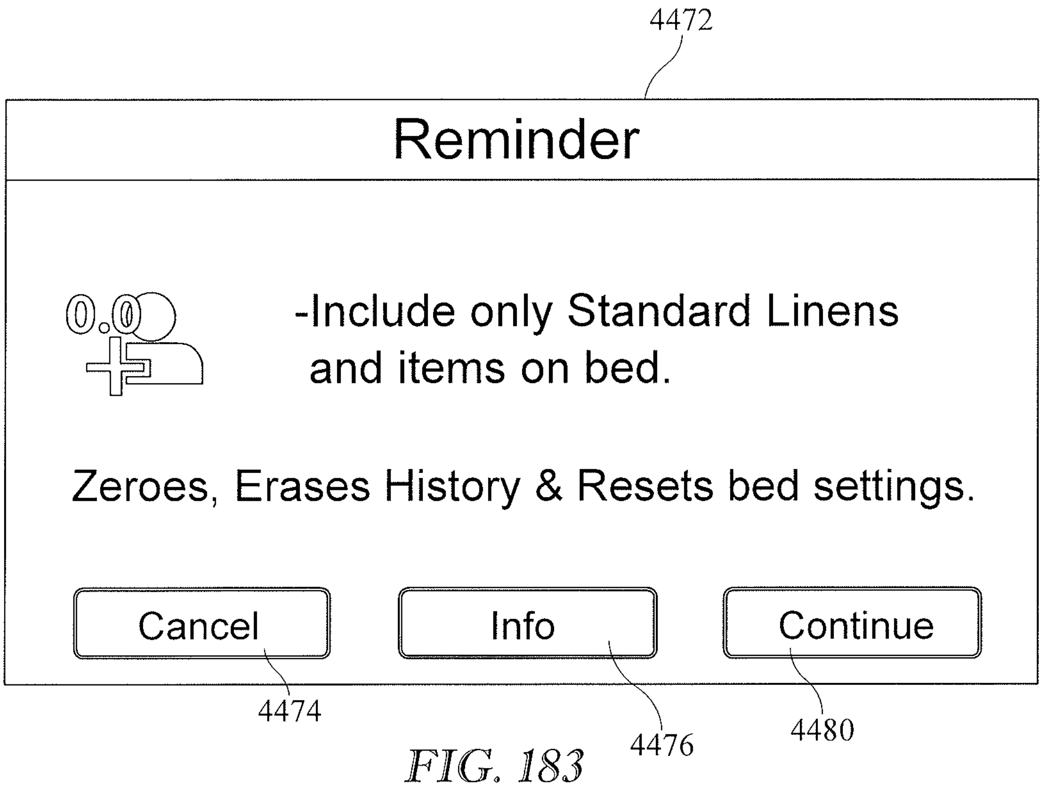
Figure 184:
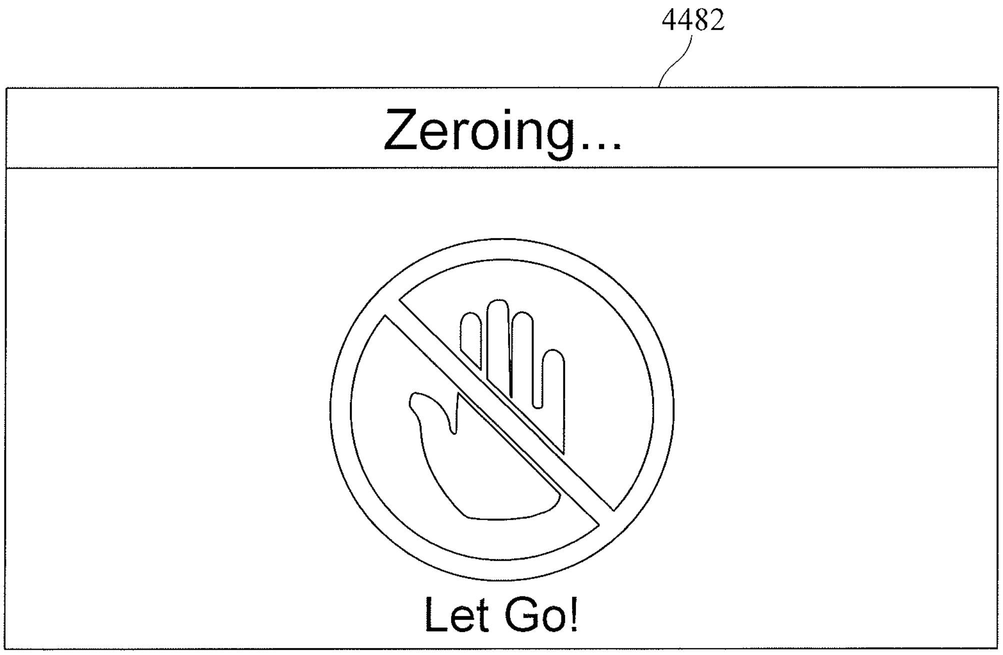

When chair exit alerting is active and a patient exits the chair, the screen 4440 shown in FIG. 175 will be displayed. The virtual buttons 4412 is available and if activated while the patient is in the chair the chair monitor resumes monitoring after 30 seconds as indicated by screen 4442 shown in FIG. 176 if the patient is not in the chair the menu structure advances to screen 4444 shown in FIG. 179 and the chair monitor waits for the patient to return to the chair. The caregiver can select either virtual button 4422 444 16 at screen 4442 to extend the alert silence. A virtual button 4446 also appears which, when activated allows the patient to be transferred to the bed which will result in the screen 4448 shown in FIG. 180 being displayed. The alert off virtual button 4418 is also available and in any case where the virtual button 4418 is activated, the system will return to the home screen. For clarification should be understood that screens 4450 or 4452 are only displayed when virtual button 4416 or virtual button 4422 are activated, respectively. If the patient returns to the bed while screen 4448 is active then the menu structure returns to the bed monitoring shown in FIG. 155.

Figure 185:
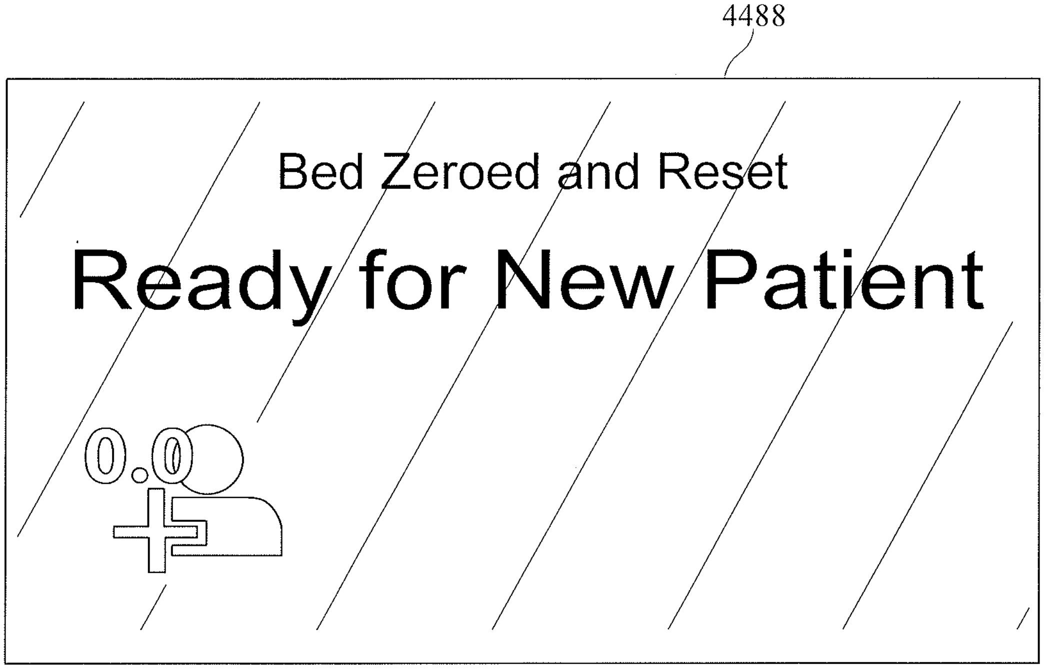
Figure 186:
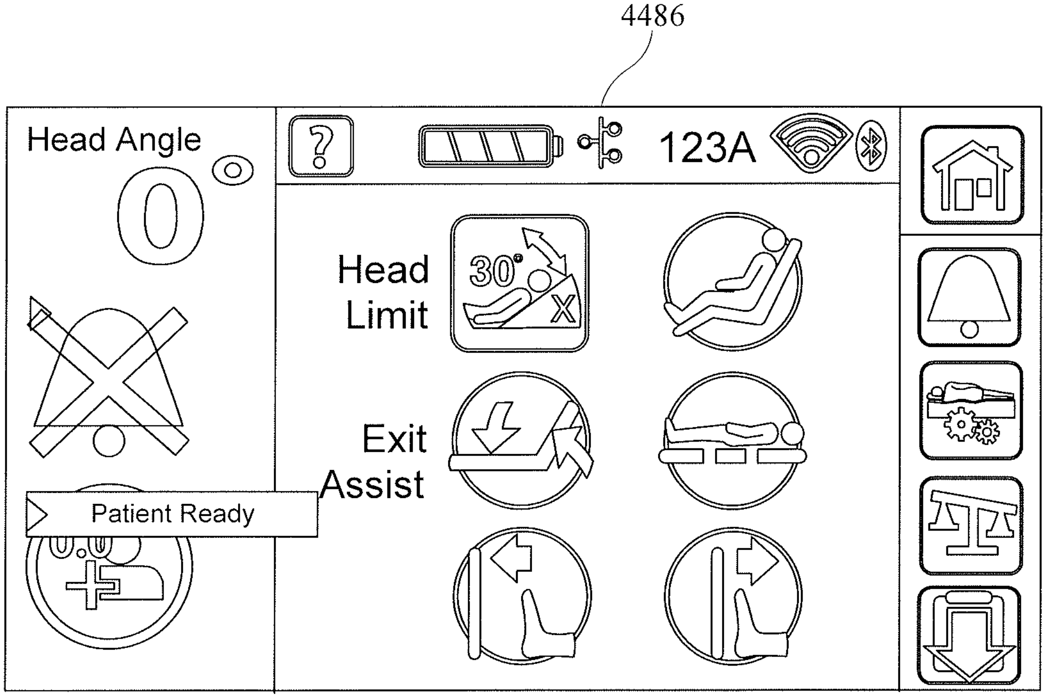
Figure 187:
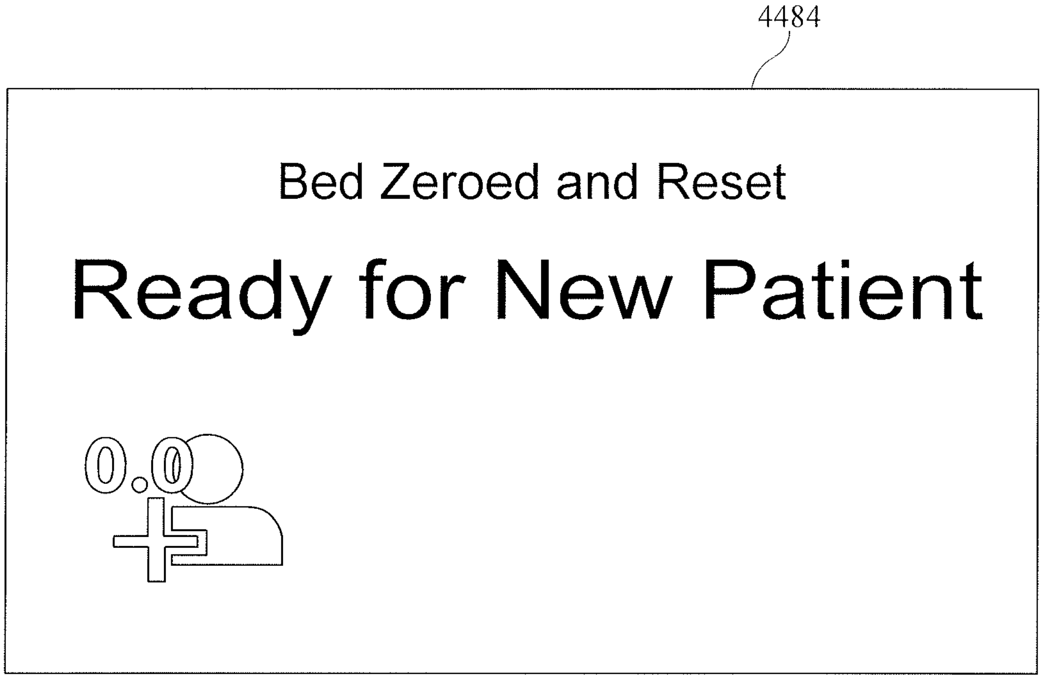
Figure 188:
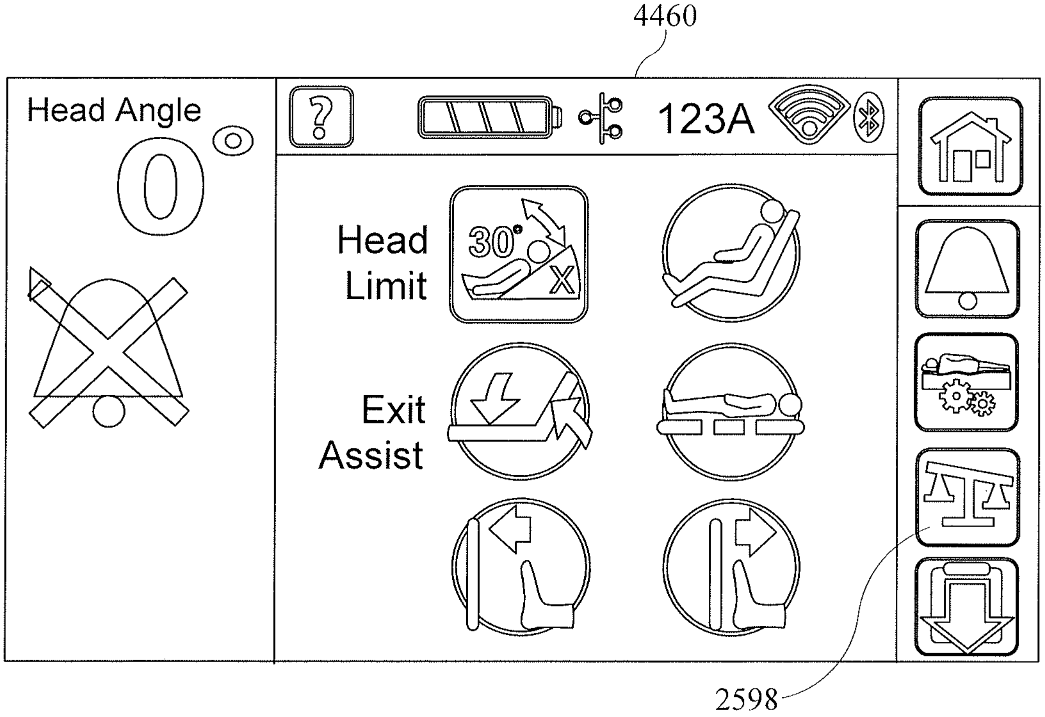
Figure 189:
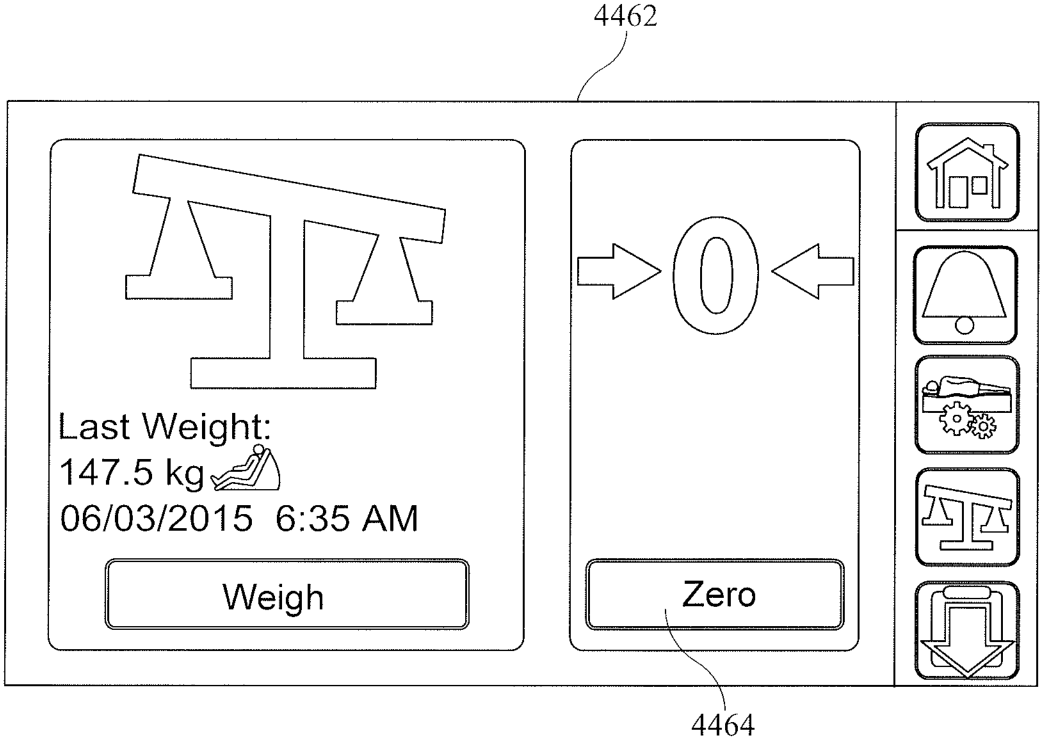
Figure 190:
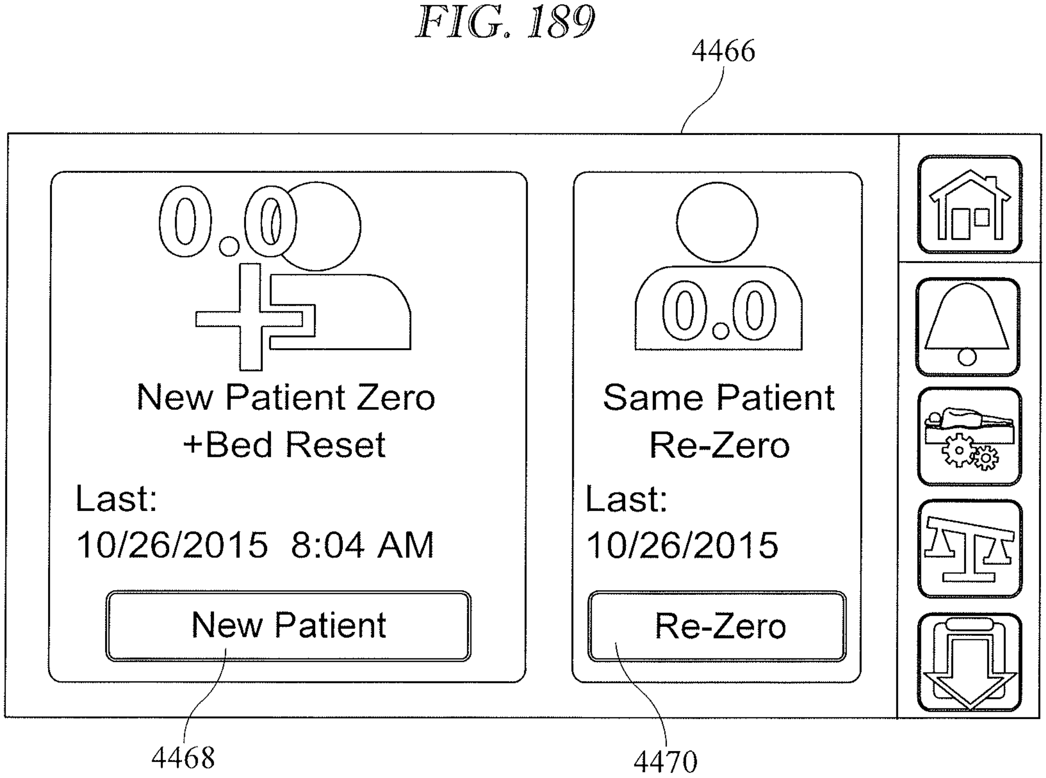

Now referencing the scale zero menu flow 2418, the menu structure begins with the screen 4460 shown in FIG. 188. Upon selection of the scale icon 2598 the menu structure advances to screen 4462 shown in FIG. 189. Selecting the zero virtual button 4464 the screen advances to a screen 4466 allows the user to choose between a new patient virtual button 4468 and a re-zero virtual button 4470. Selecting the new patient virtual button 4468 advances to the reminder screen 4472 shown in FIG. 183 the user can choose between canceling by pressing a virtual button 4474 which causes the menu structure to return to the screen 4466, selecting the virtual button 4476 which causes the menu structure to advance to the screen 4478 shown in FIG. 181, or the user can choose to continue by selecting the to continue, choosing the continue button 4480 advances to screen 4482 which causes the bed to go into a zero mode with the prompt shown in FIG. 184. If the bed successfully zeros, then the menu structure advances to screen 4484 shown in FIG. 187. If the screen 4484 is touched then the menu structure advances to screen 4486 shown in FIG. 186, which is a home screen with an indication that the bed is patient ready. If the screen 4486 times out then the menu structure advances to screen 4488 which the "ready for new patient" messages displayed with a dimmed screen as shown in FIG. 185. The bedside sidle until the patient is placed on the bed. In some instances during the operation of screen 4482, a problem will be detected and the system will advance to screen 4490 shown in FIG. 182. The caregiver will have to respond to the error and restart the process.

Figure 191:
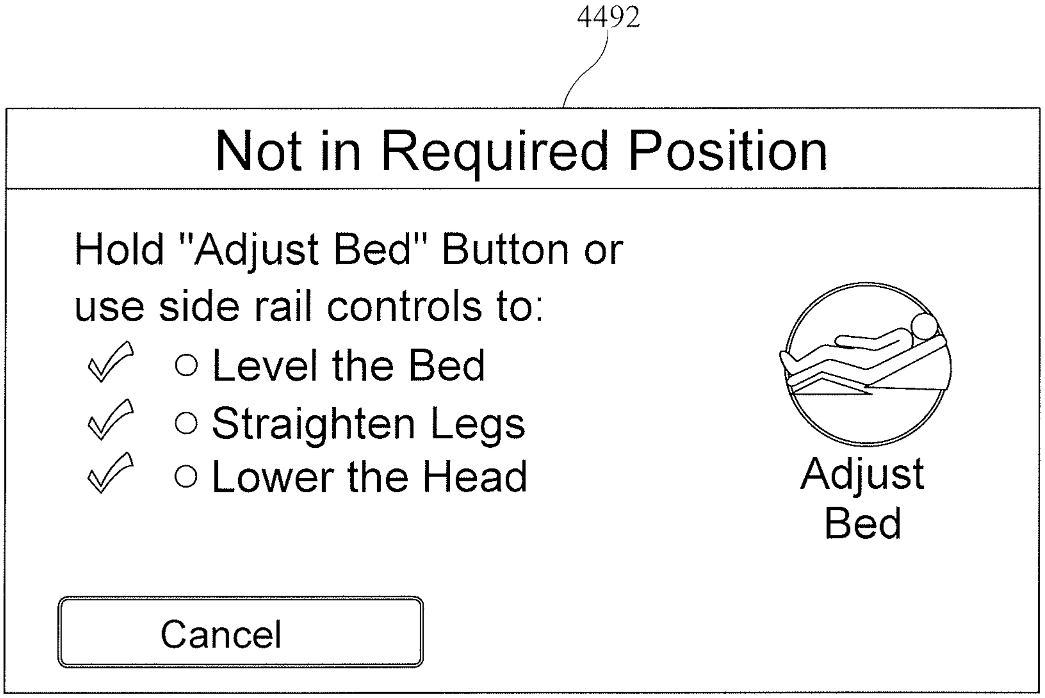
Figure 192:
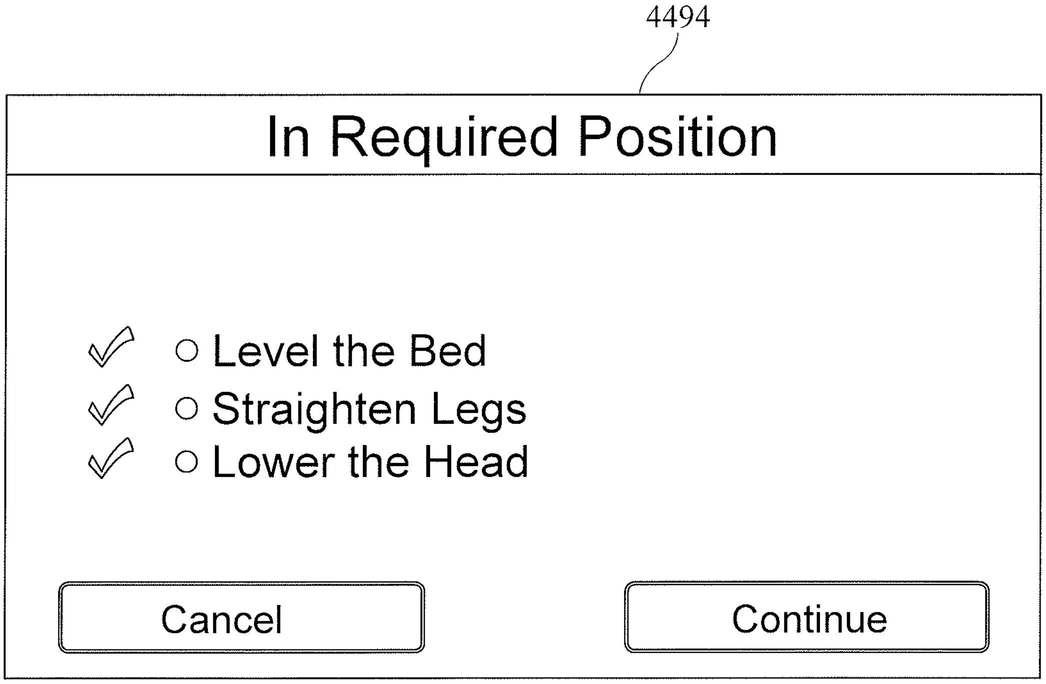
Figure 193:
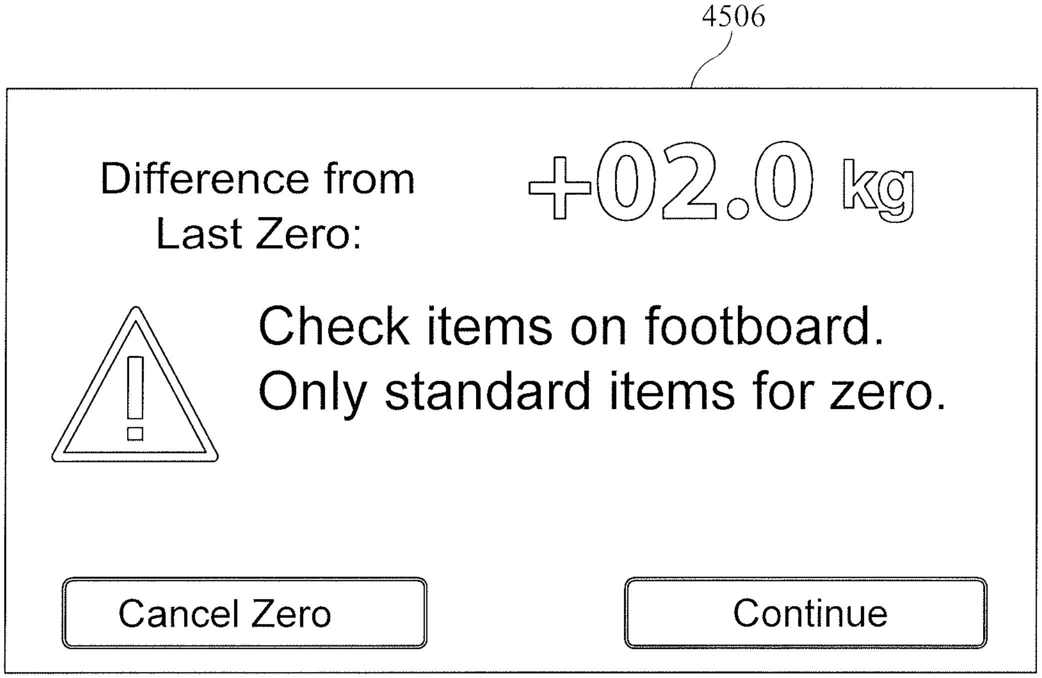
Figure 194:
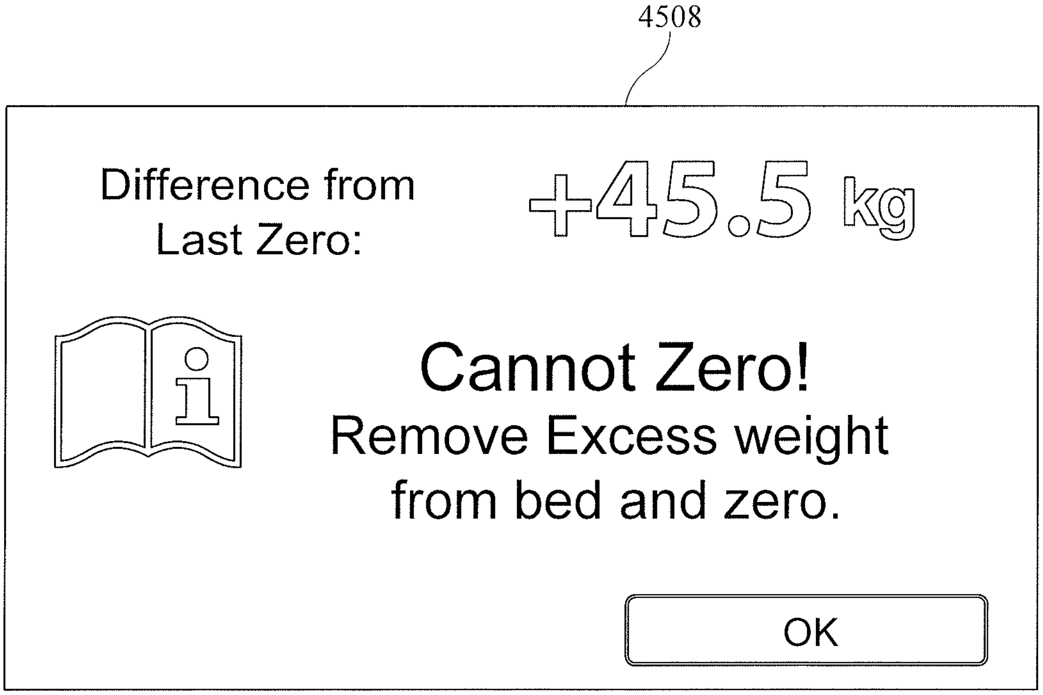
Figure 195:
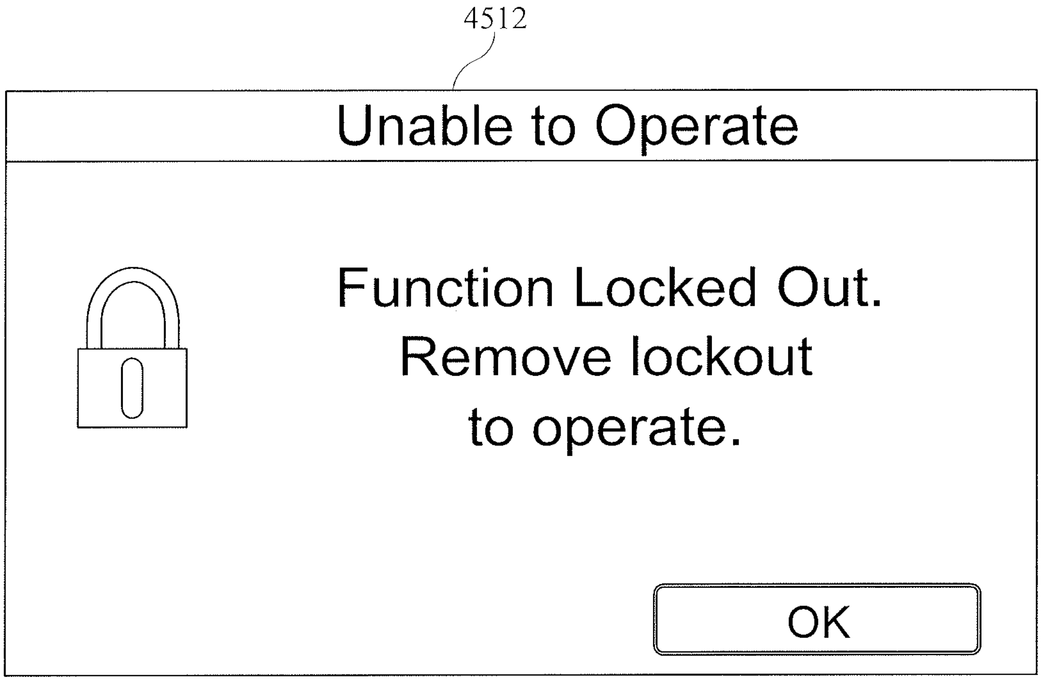

If the bed is out of position at screen 4472, the menu structure advances to screen 4492 shown in FIG. 191. The user is given the opportunity to adjust the position of the bed and if an appropriate position is achieved then the menu structure will return to screen 4482 and resume the process.

If the bed is in the correct position when the error occurs, then the menu structure advances to screen 4494 where the caregiver is prompted to make adjustments to the bed.

Figure 196:
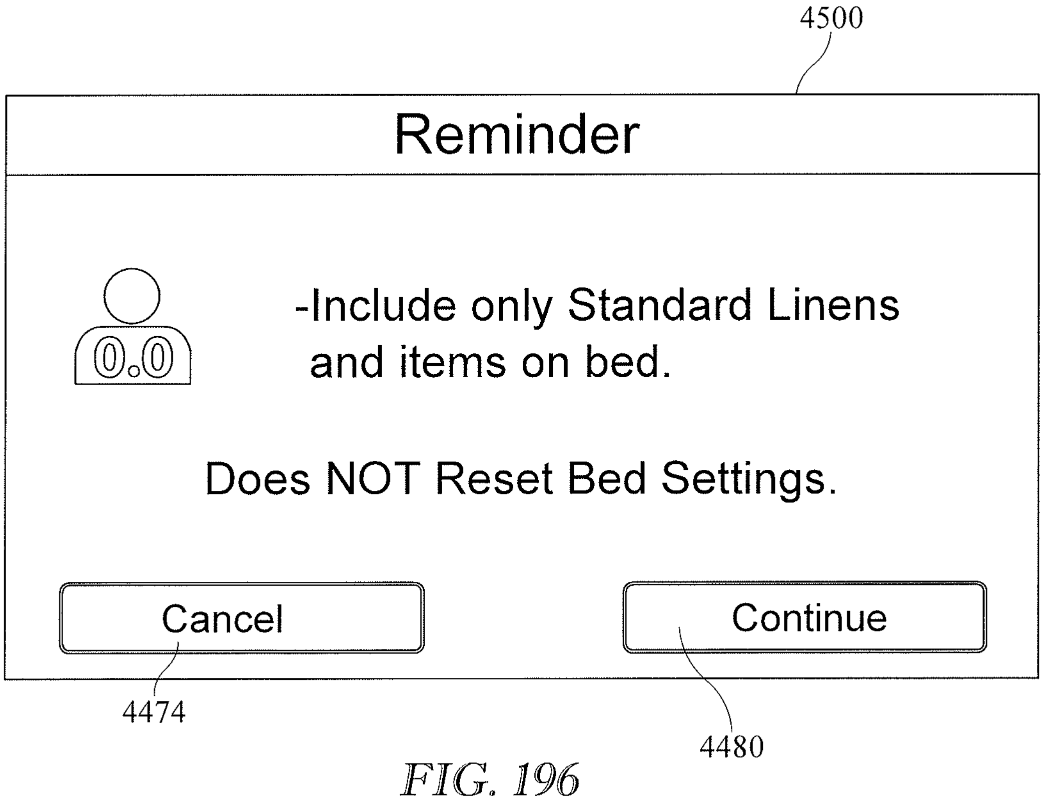
Figure 197:
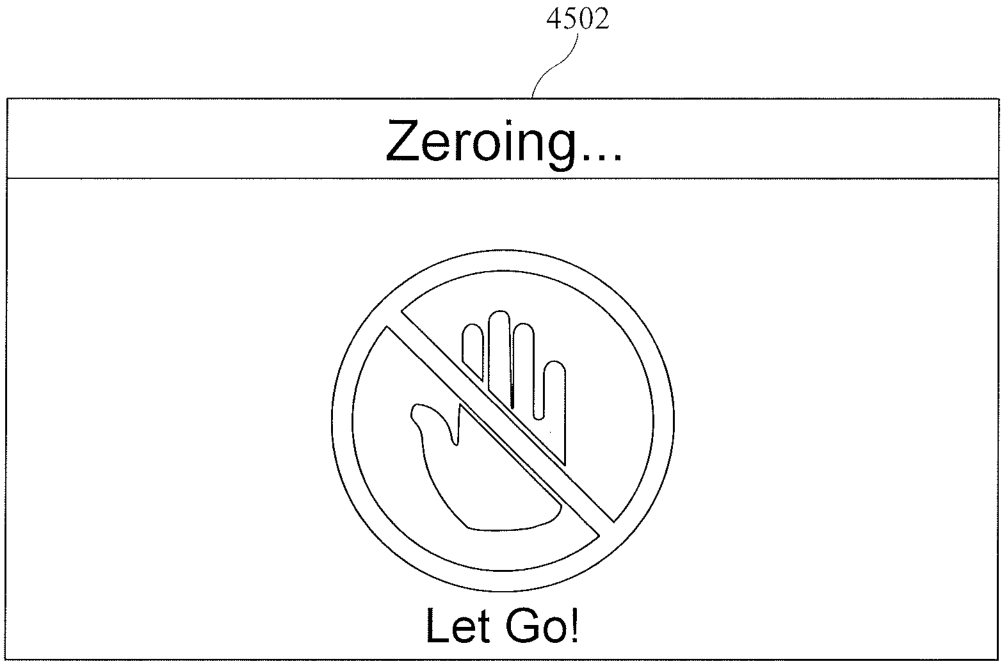
Figure 198:
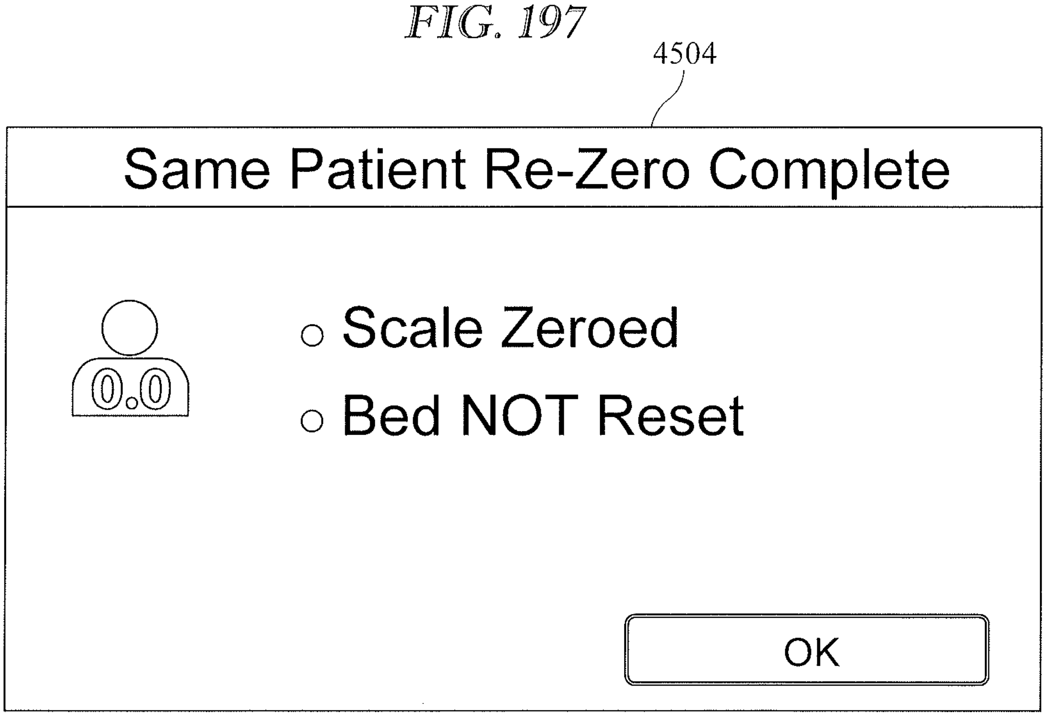
Figure 199:
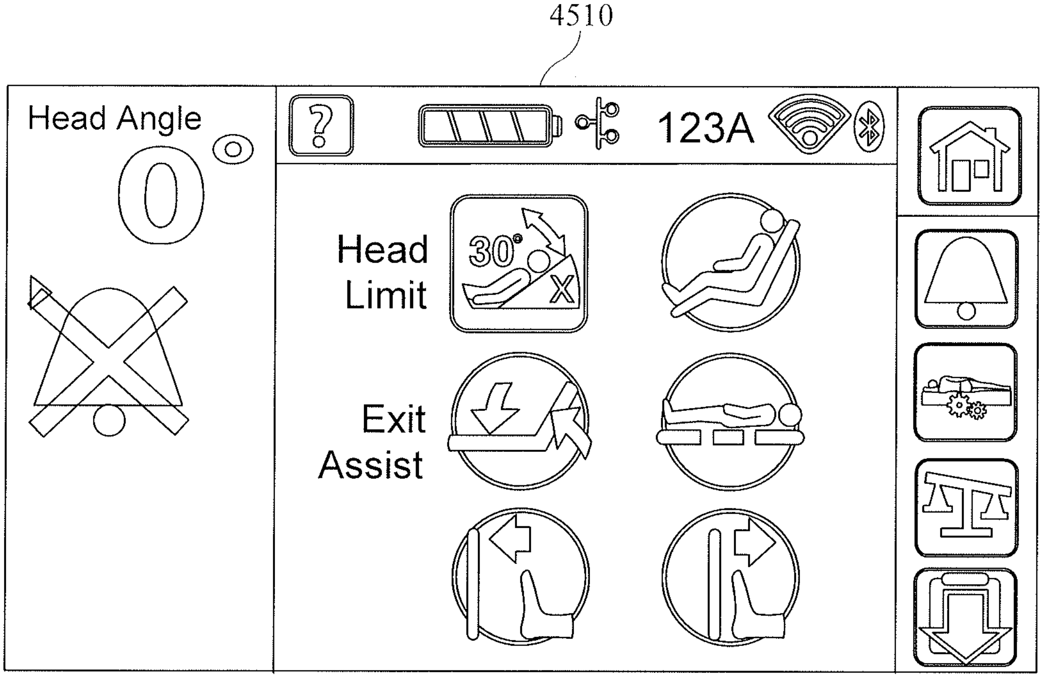

If the caregiver selects the re-zero virtual button 4470 in screen 4466 and the menu structure advances to a reminder screen 4500 shown in FIG. 196. The caregiver can activate virtual button 4482 continue or virtual button 4474 to return to screen 4466. If the caregiver chooses to continue the system advances to screen 4502 shown in FIG. 197 and the successful zeroing will result in a screen 4504. If the difference is within an acceptable change then a screen 4506 is displayed to prompt a caregiver. If the weight is too great then the screen 4508 is displayed in the process is restarted 10 is complete, the menu structure advances to menu 4510 shown in FIG. 199 which is a home screen with a zero scale. It should be noted that the scale operation can be locked out and a screen 4512 shown in FIG. 195 will appear to prompt a caregiver to resolve the issue.

Figure 208:
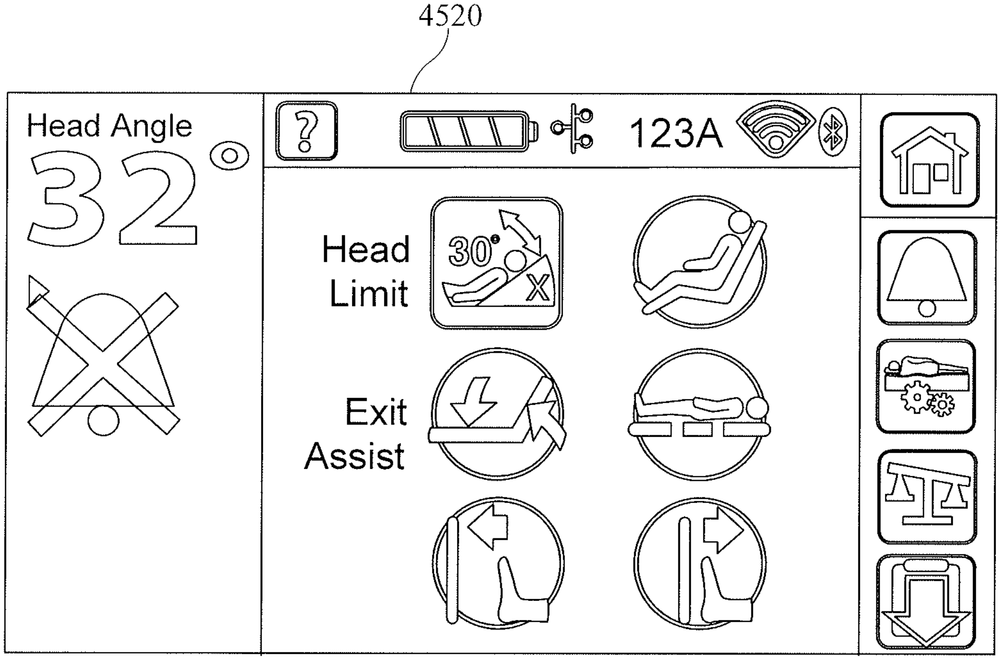
Figure 210:
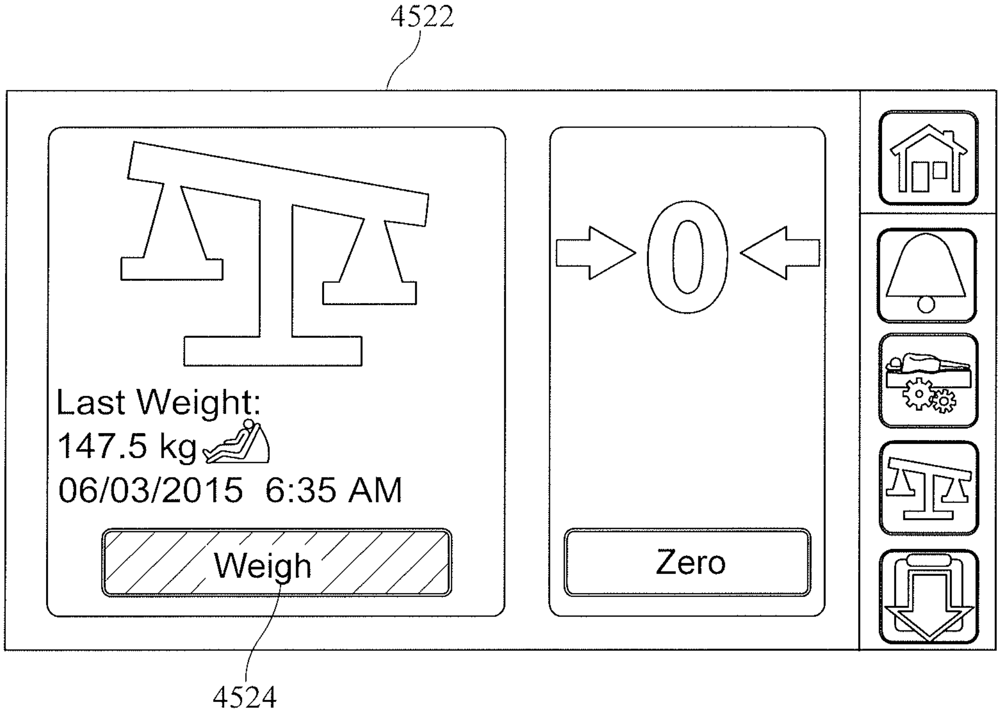
Figure 211:
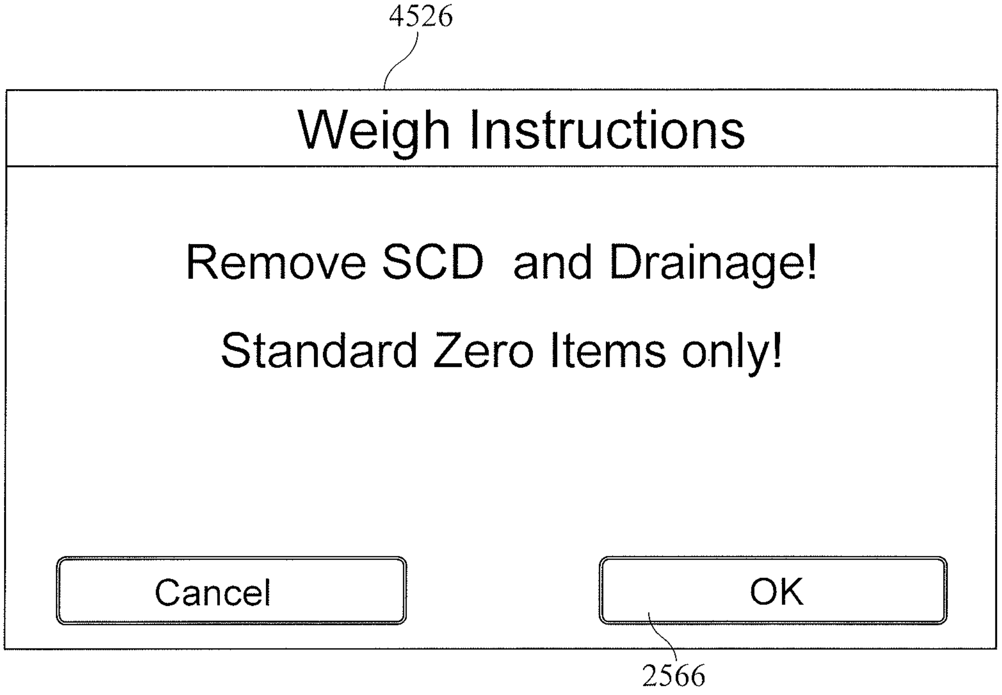
Figure 212:
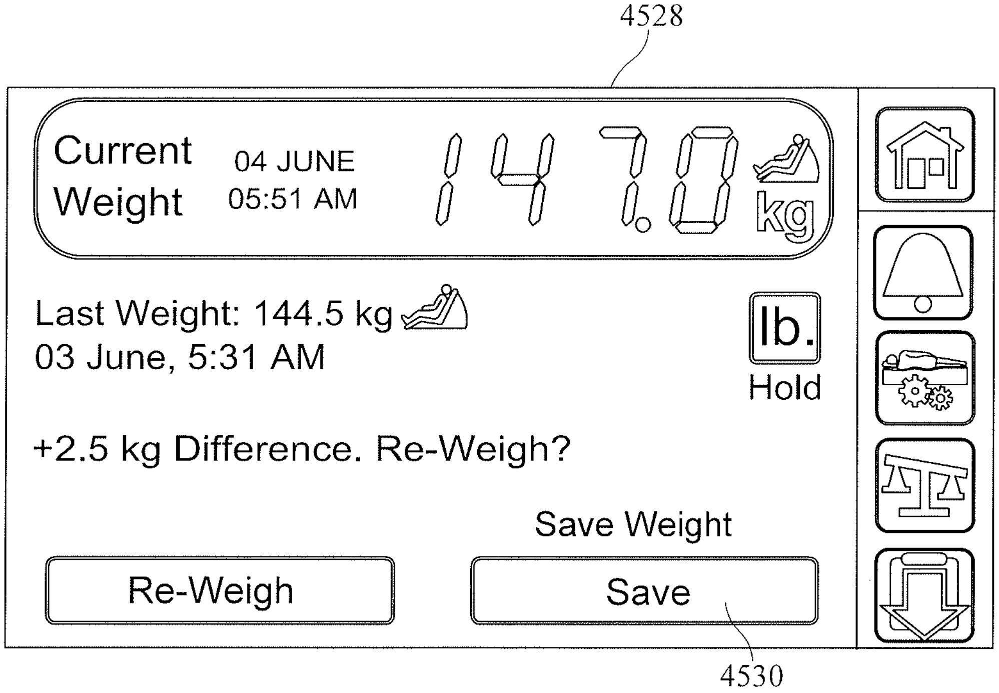
Figure 213:
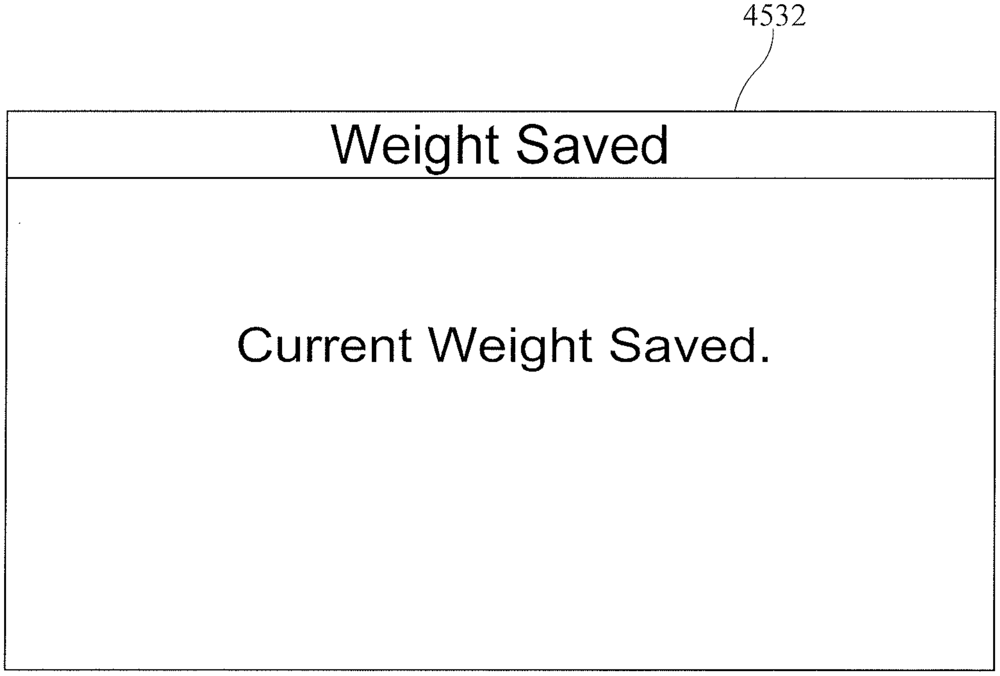
Figure 214:
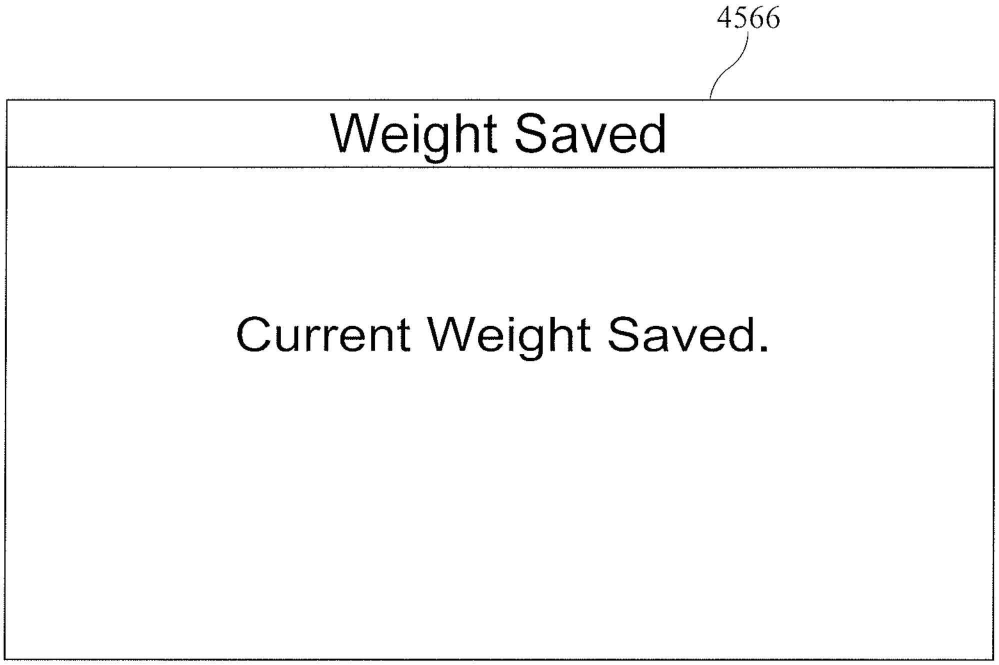
Figure 215:
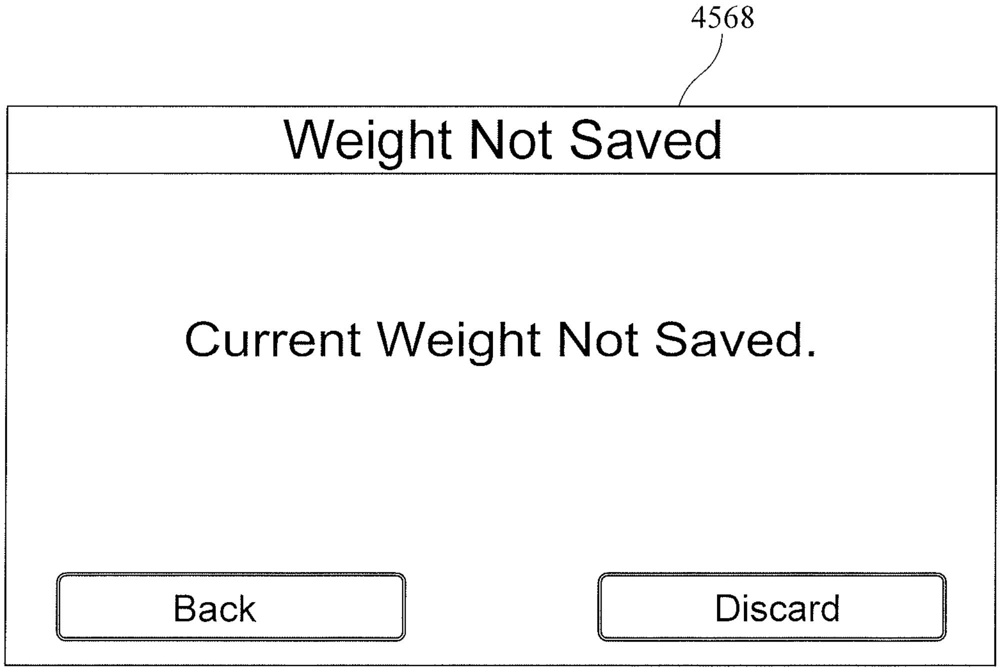
Figure 216:
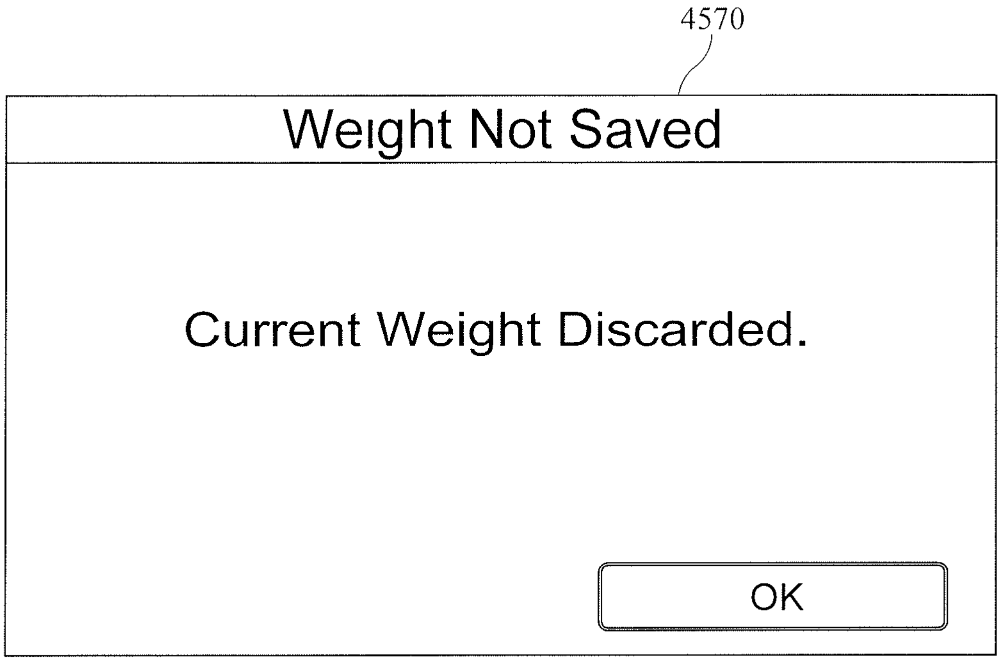
Figure 217:
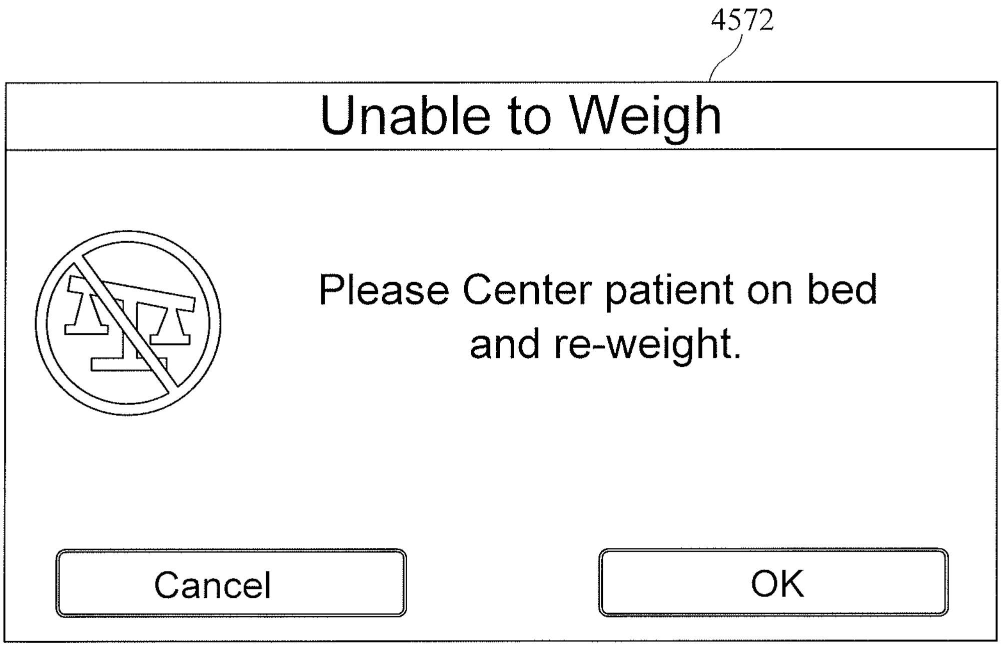

Now referencing the scale weigh menu structure 2424 shown in FIG. 67, the process begins with the screen 4520 shown in FIG. 208 selection of the scale icon 2598 causes the menu structure to advance to screen 4522 shown in FIG. 210. Selection of the weigh virtual button 4524 advances the menu structure to screen 4526 shown in FIG. 211. Selection of the virtual button to 2566 causes the weight to be taken in the screen 4528 to be displayed as shown in FIG. 212. If a user chooses to select the save virtual button 4530 then the weight is saved as shown in screen 4532 in FIG. 213. The menu structure then advances to screen 4534 shown in FIG. 225 where user is prompted as to whether or not they want to chart the weight. Choosing yes which is associated with the virtual button 4536 will advance to screen 4538 in FIG. 226, if the patient is identified. If the patient is identified then there is a confirmation step where the virtual button 4536 needs to be selected again. Which causes the menu flow to advance to screen 4540 where the caregiver logs in and then the menu structure advances to screen 4542 to prompt the caregiver to decide whether to chart additional information or not. This is the path that occurs if there are no errors and no issues with information.

Figure 200:
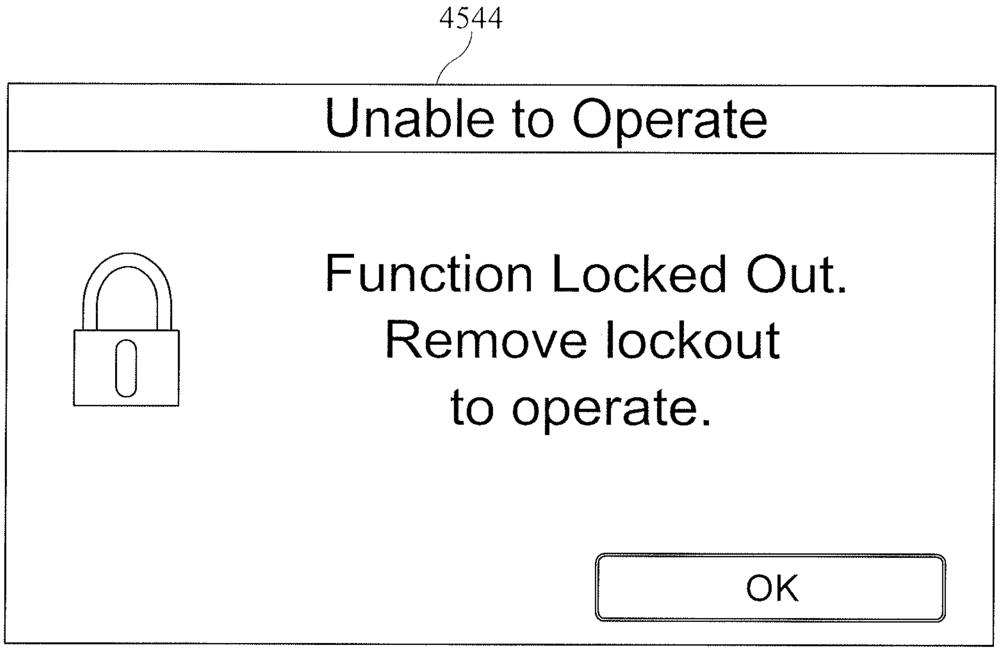
Figure 201:
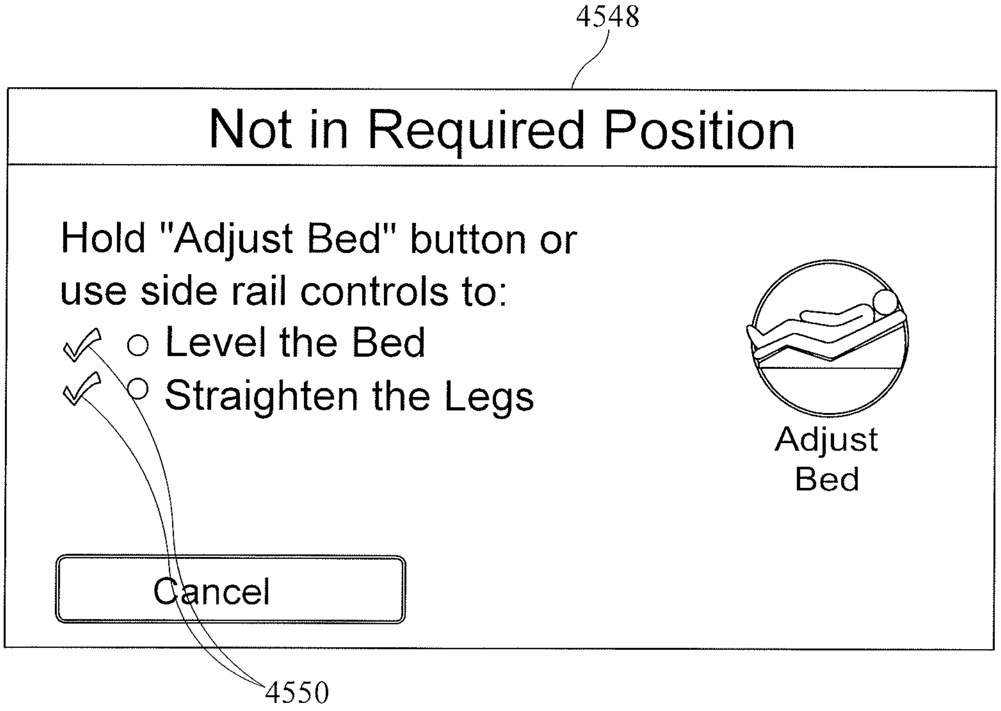
Figure 202:
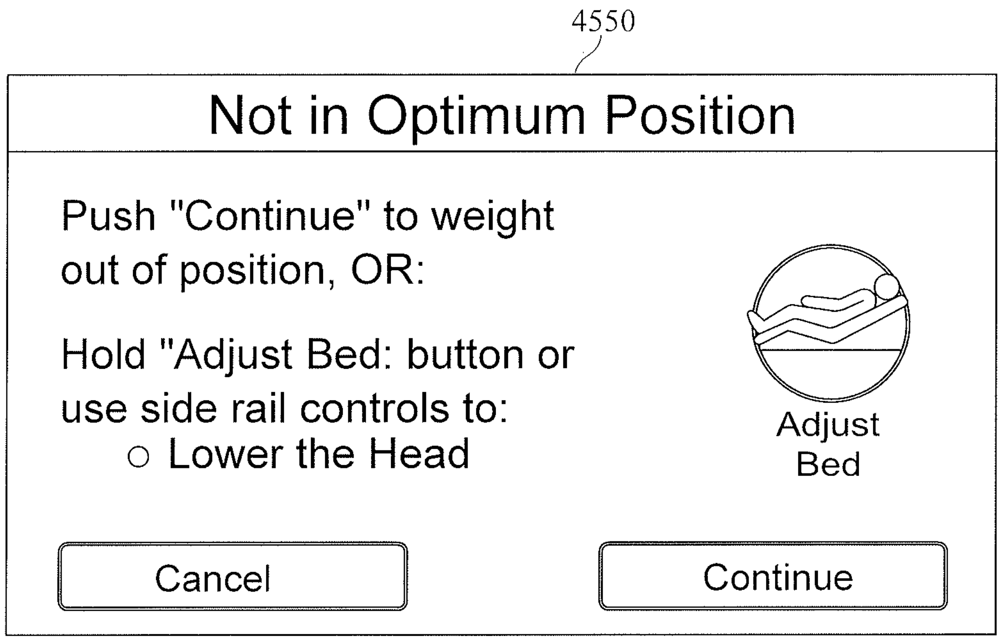
Figure 203:
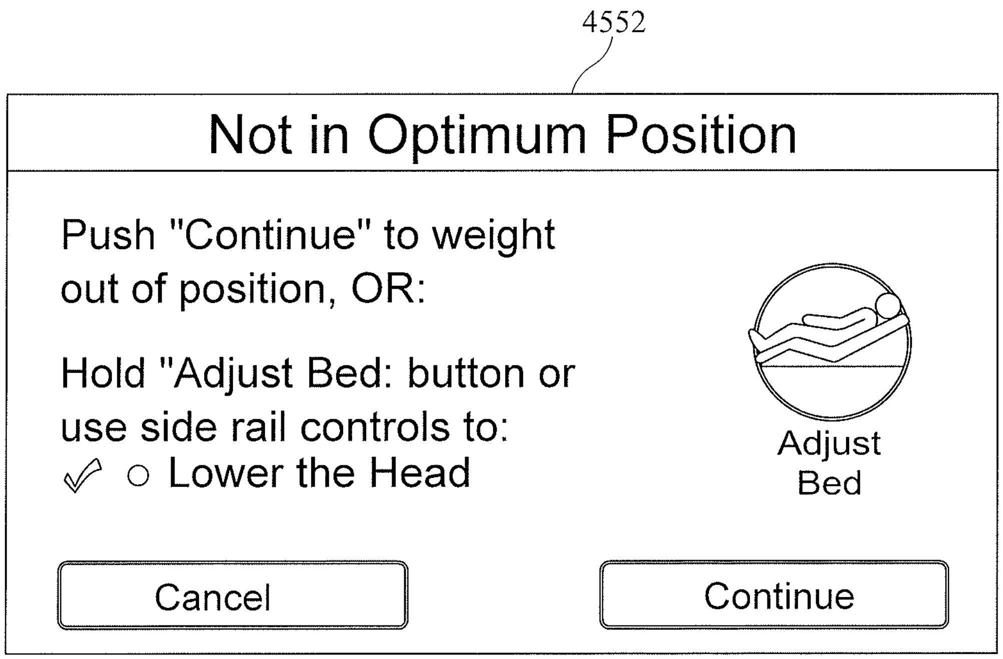

For example at screen 4544 in FIG. 200 the user could be prompt to remove a lockout on the scale operation. In screen 4546 shown in FIG. 205, the scale will not operate if the patient is not in the required position or if elements of the bed are out of an acceptable range. As noted in FIG. 201, the prompts may identify actions to be taken by the caregiver. However if the caregiver moves the bed to an acceptable position, an indication of that change will be shown on the screen as shown in screen 4548 of FIG. 201. Screen 4548 has the addition of the check marks to indicate that the appropriate change has been made the same process occurs with a transition from screen 4550 in FIG. 2012 screen 4552 in FIG. 203.

Figure 204:
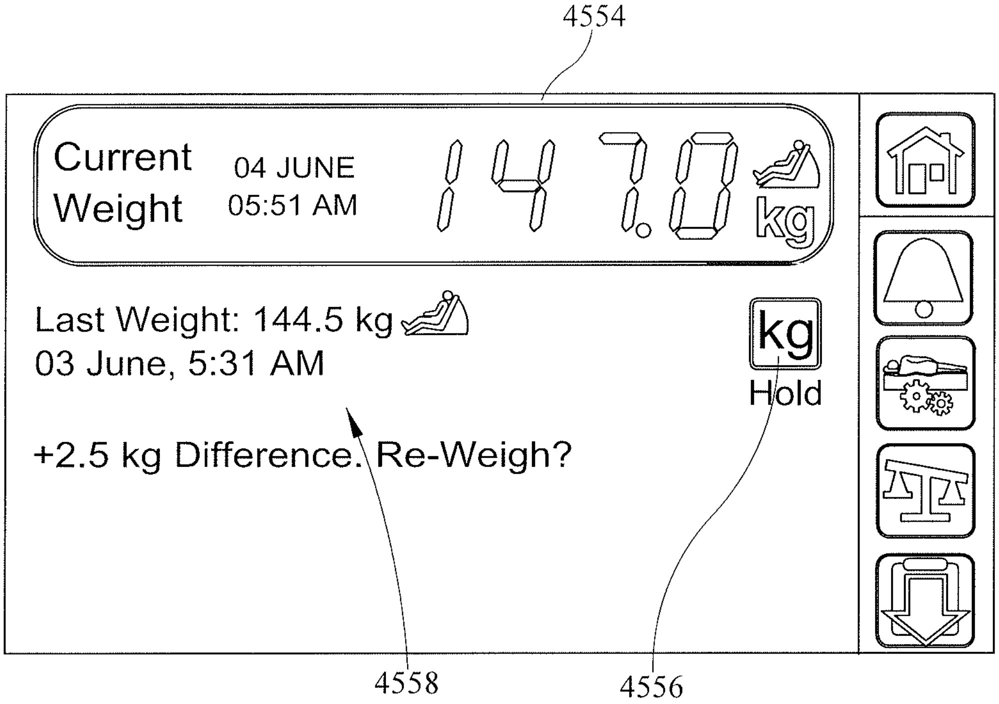
Figure 205:
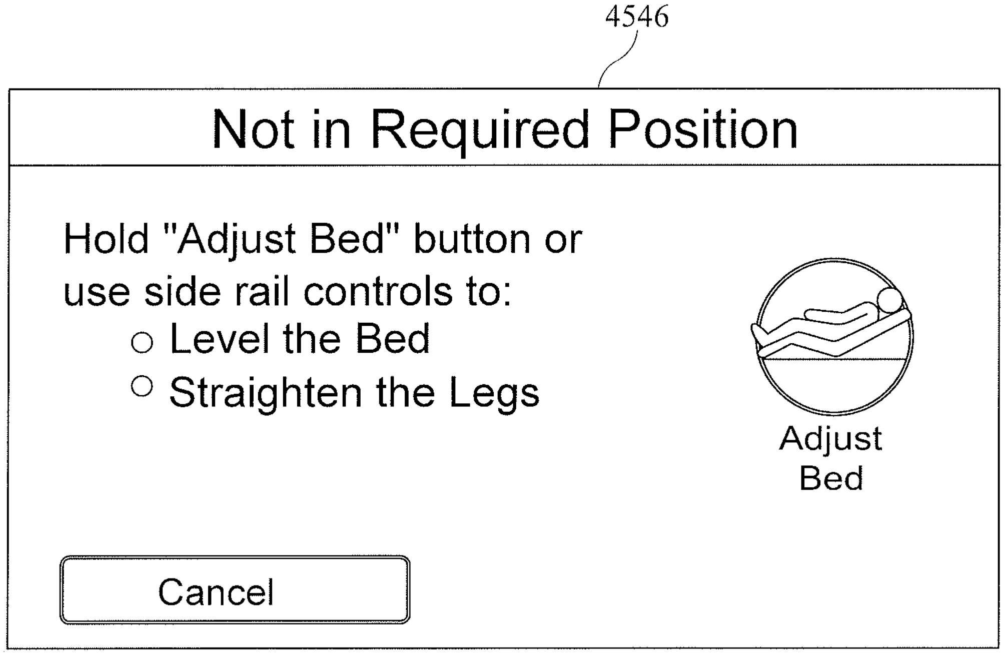
Figure 206:
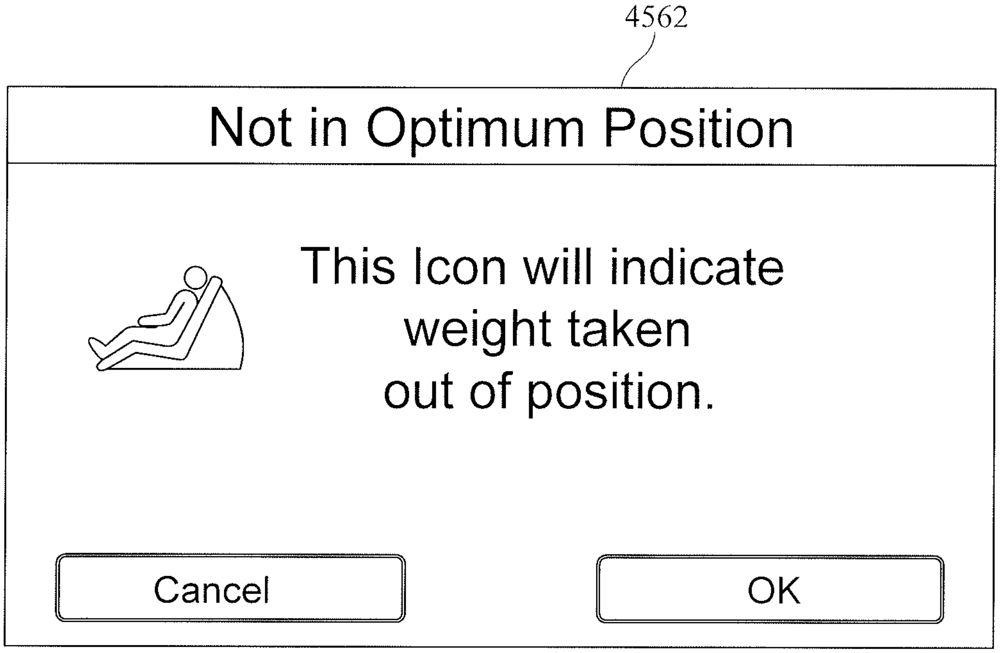
Figure 207:
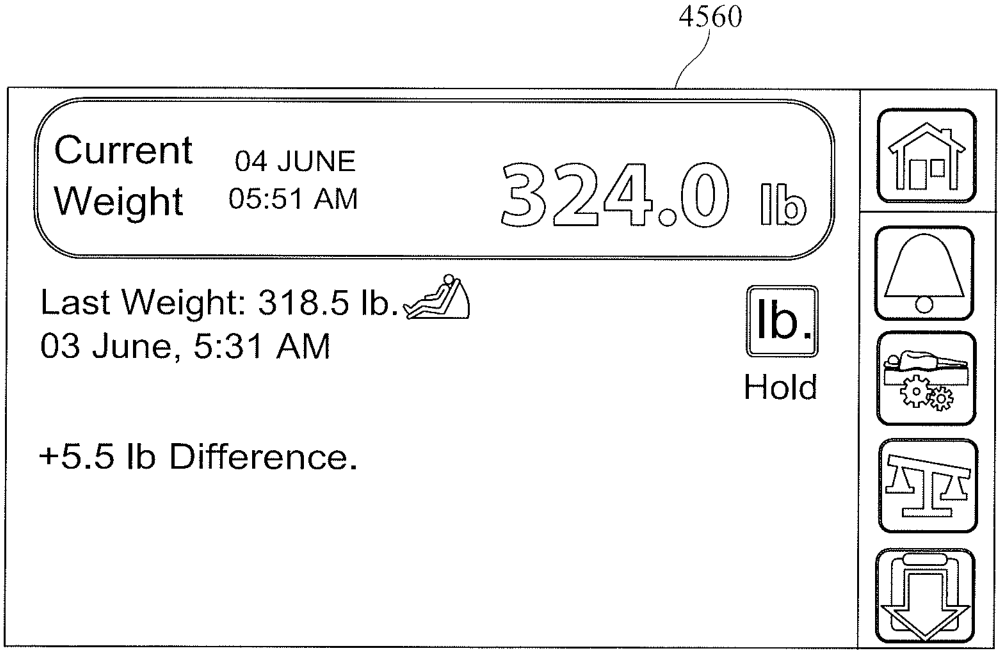
Figure 209:
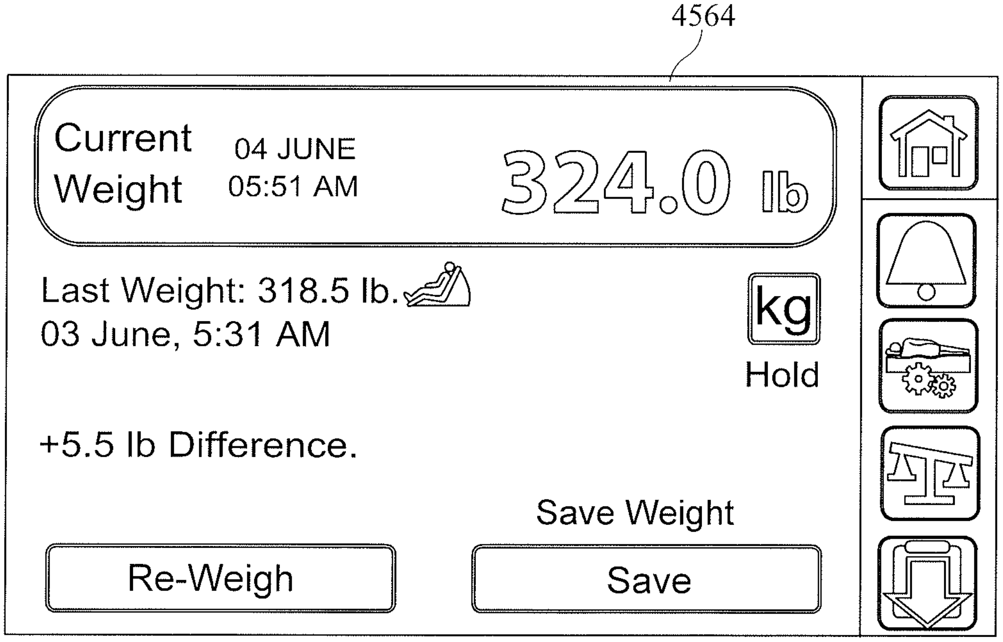
Figure 218:
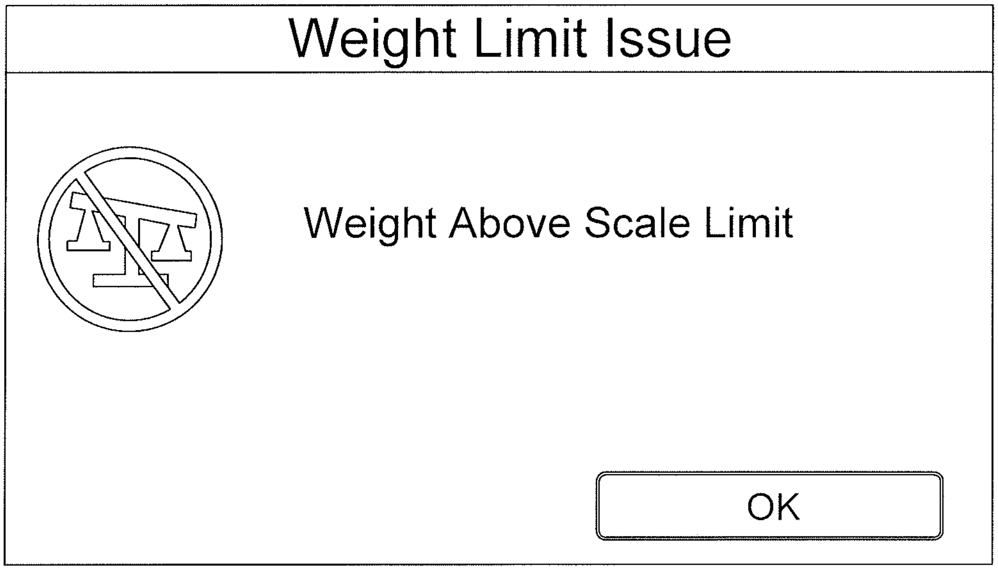
Figure 219:
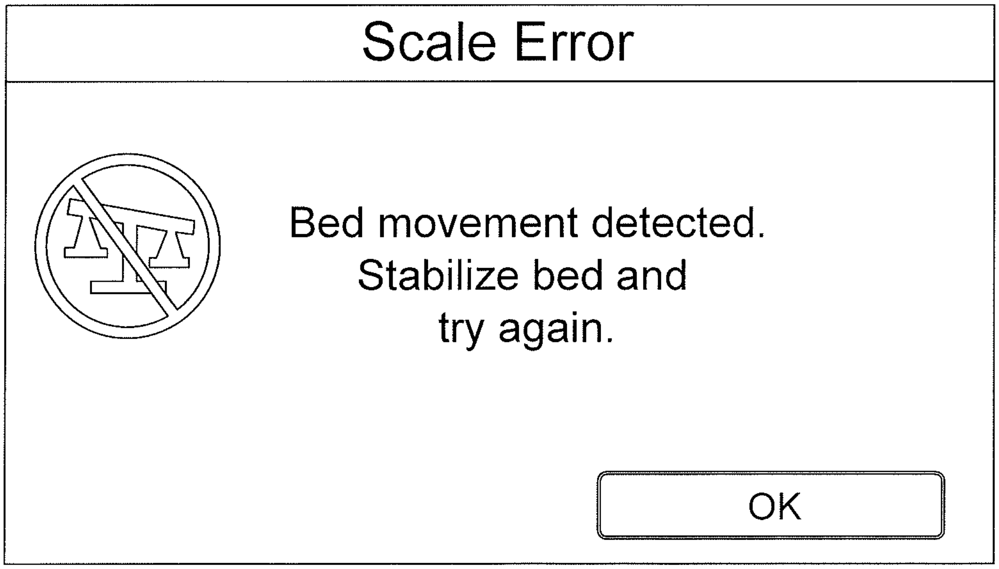
Figure 220:
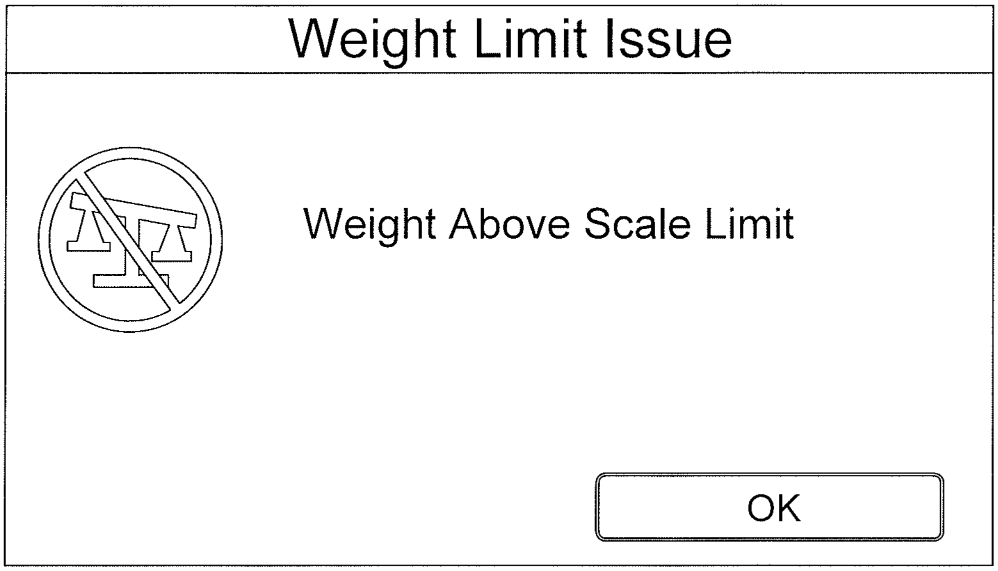

Now referring to a screen 4554 shown in FIG. 204, holding the kilogram icon 4556 causes the last weight taken to be displayed at 4558 which allows it to be compared to the current weight. The same capability is present in a screen 4560 shown in FIG. 207 with the units in pounds. Referring to screen 4562 in FIG. 206, the system will allow a weight to be taken when the bed is not in the proper position. However an individual must acknowledge that is not in the optimum position and therefore the weight would not be accurate. Screen 4564 shown in FIG. 209 illustrates what happens if the weight is taken in the wrong unit such as the weight that was taken and accepted at screen 4528 can be converted to pounds and saved as indicated by screen 4564 when the weight is saved a prompt such as that shown in screen 4566 in FIG. 214. If the weight is not saved the caregivers given the option of discarding the weight or going back at screen 4568, shown in FIG. 215. If it is chosen to discard the weight, a prompt confirms it in a screen 4570 shown in FIG. 216. If an error arises, a prompt screen will identify the problem for the caregiver such as in screen 4572 shown in FIG. 217 which prompts the caregiver to center the patient an attempt to re-way. FIGS. 218-219 show additional error messages.

Figure 221:
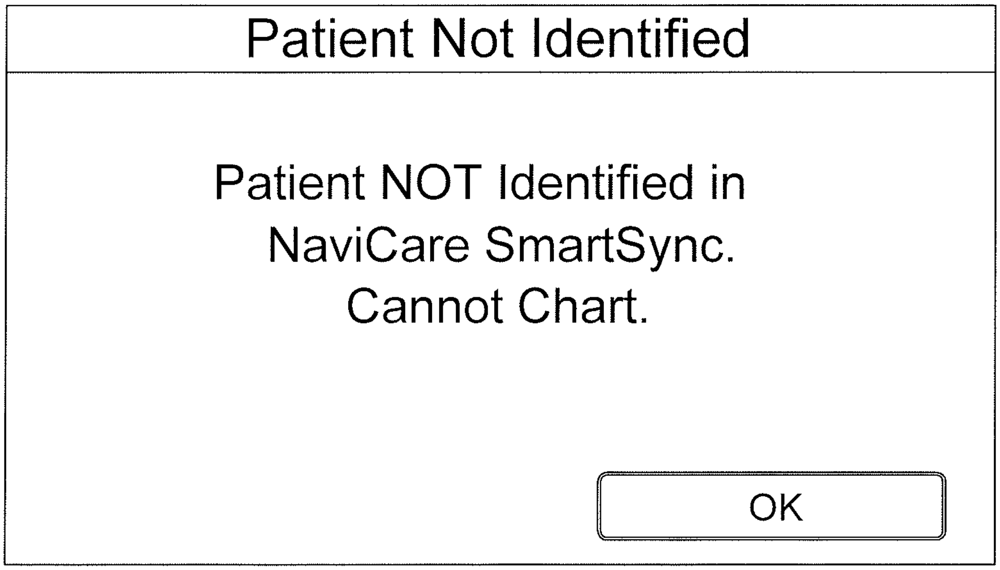
Figure 222:
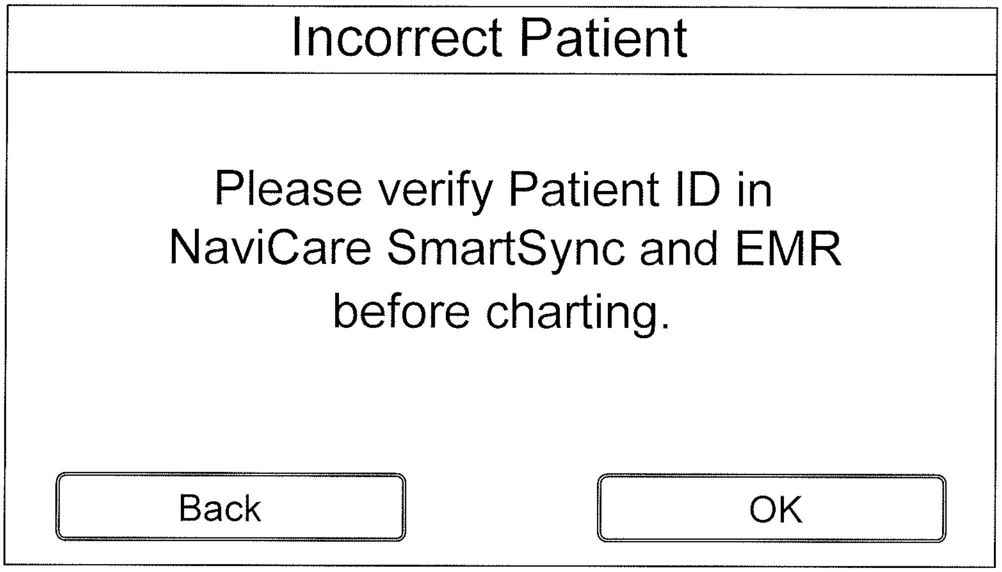
Figure 223:
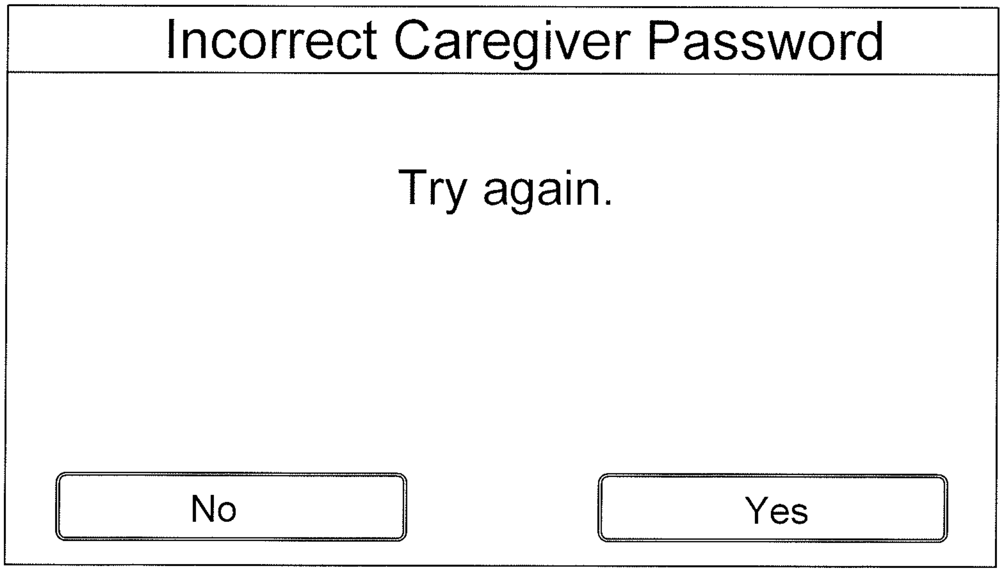
Figure 224:
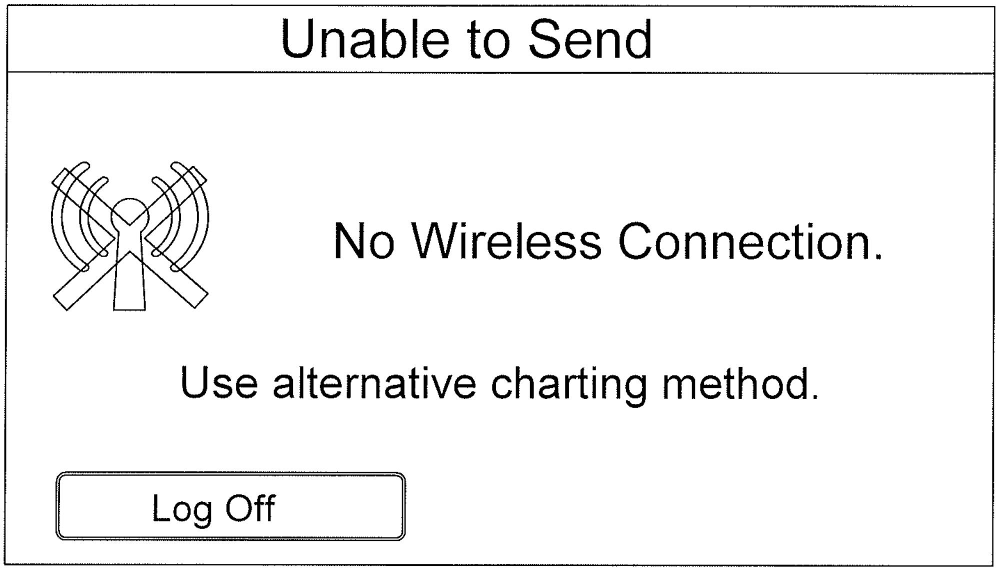
Figure 225:
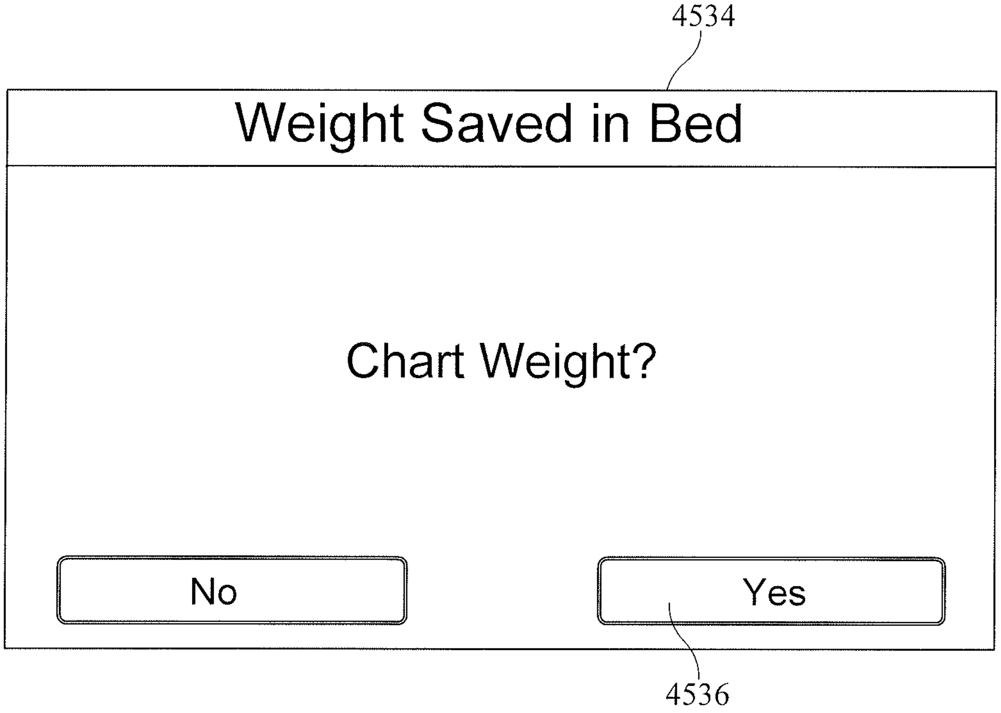
Figure 226:
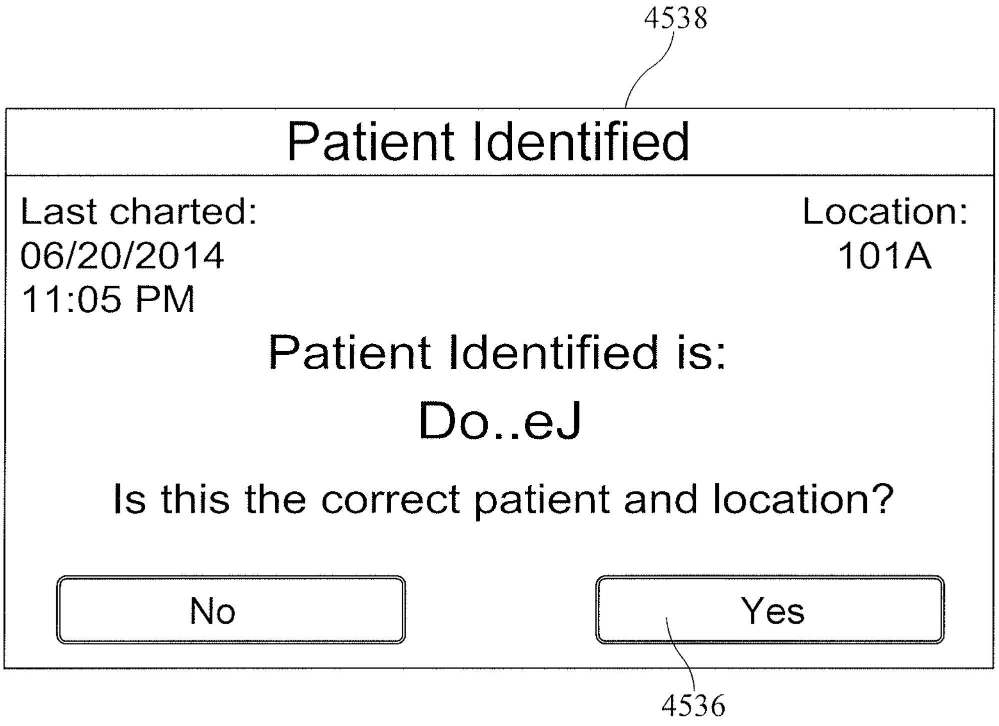
Figure 227:
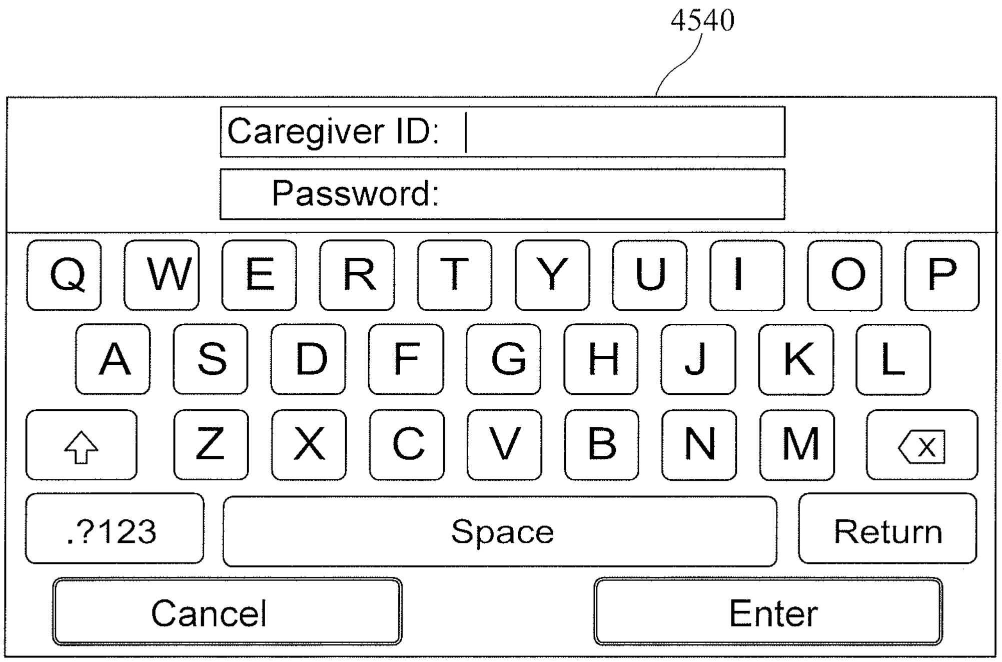
Figure 228:
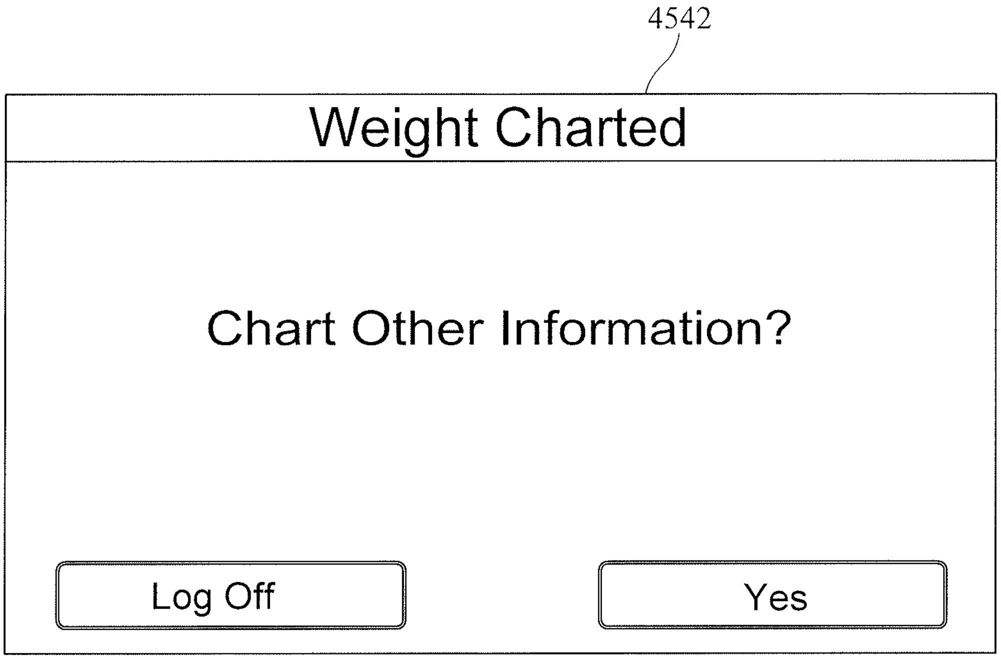

In FIG. 221, a prompt is displayed if the patient is not identified when the caregiver is attempting to chart. Resolution of the charting issue is accomplished through the prompts in FIG. 222. If the caregiver attempts to give the incorrect password in screen 4540 in FIG. 227 the prompt in FIG. 223 appears. The system will also inform the caregiver if automated charting is unavailable as indicated in FIG. 224.

Figure 248:
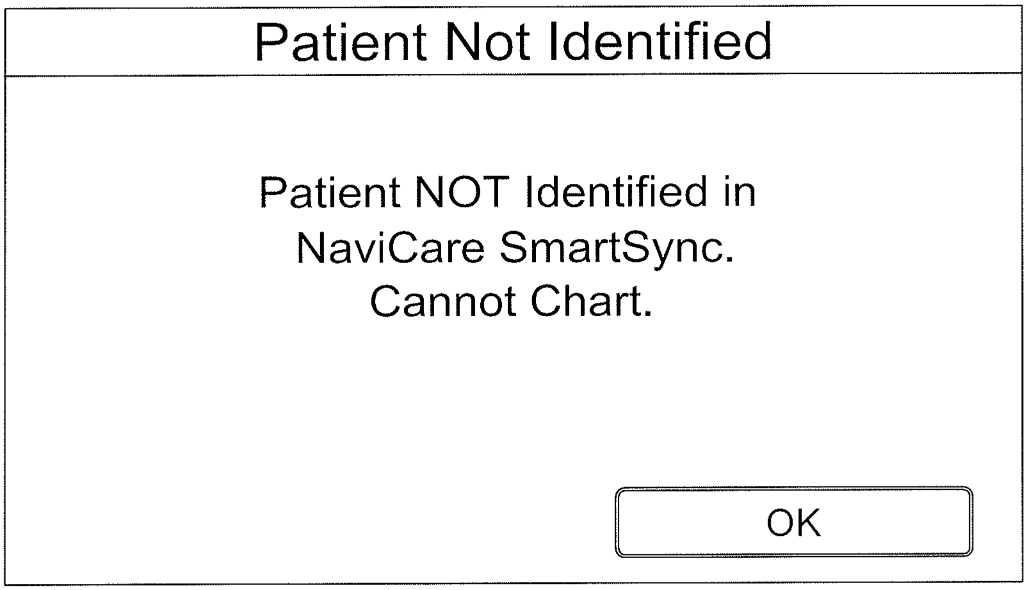
Figure 249:
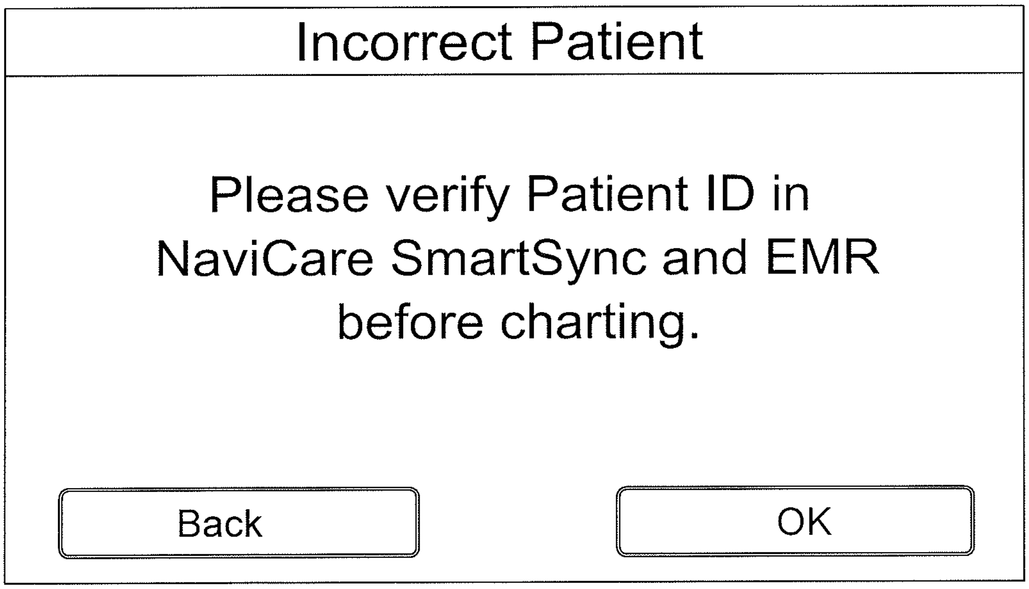
Figure 250:
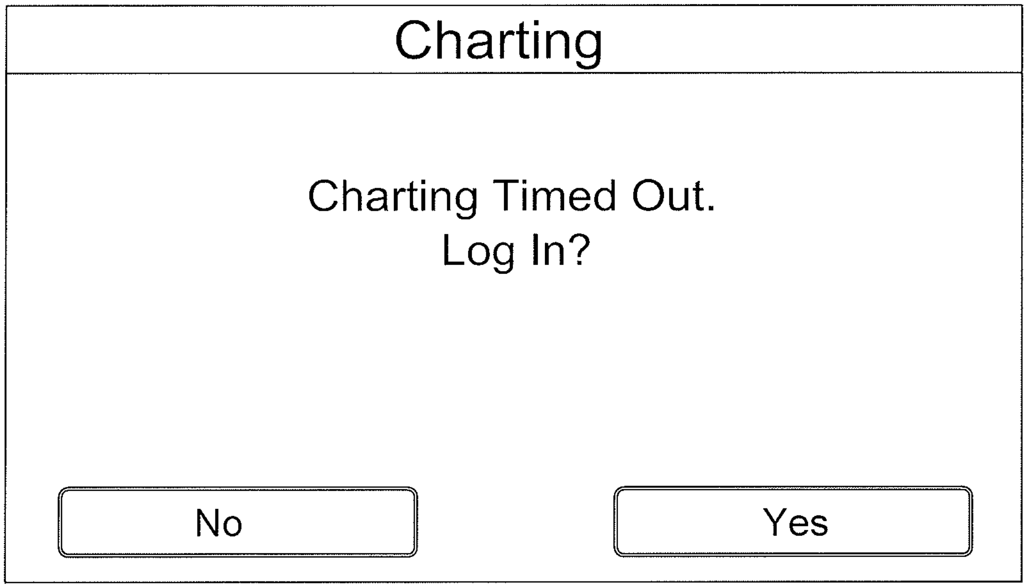
Figure 251:
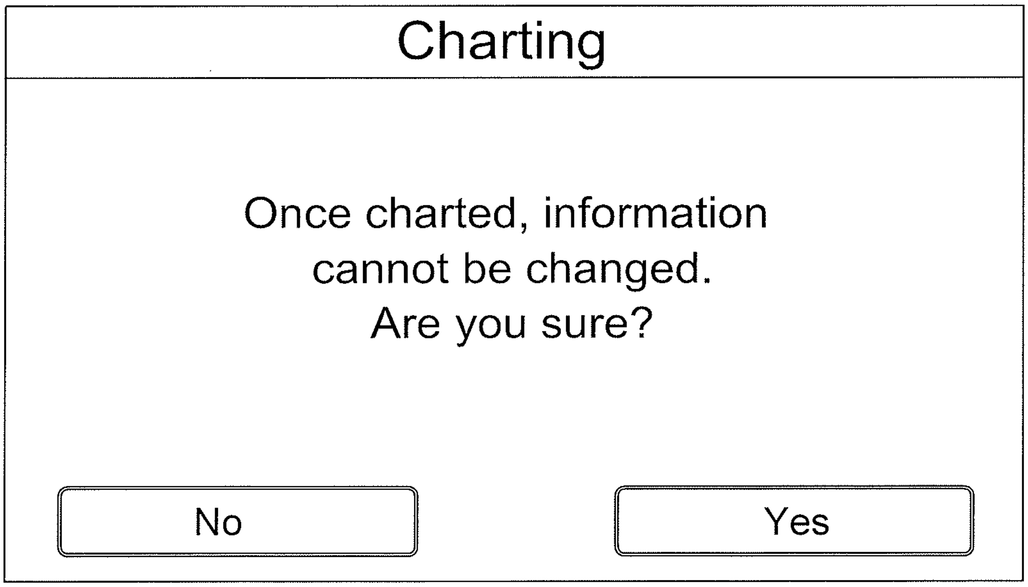
Figure 252:
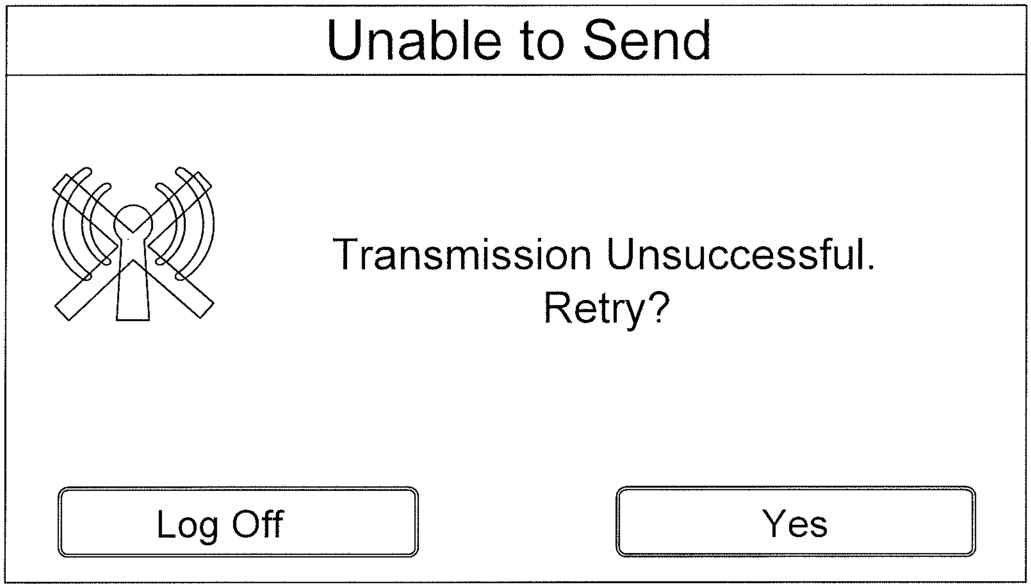
Figure 253:
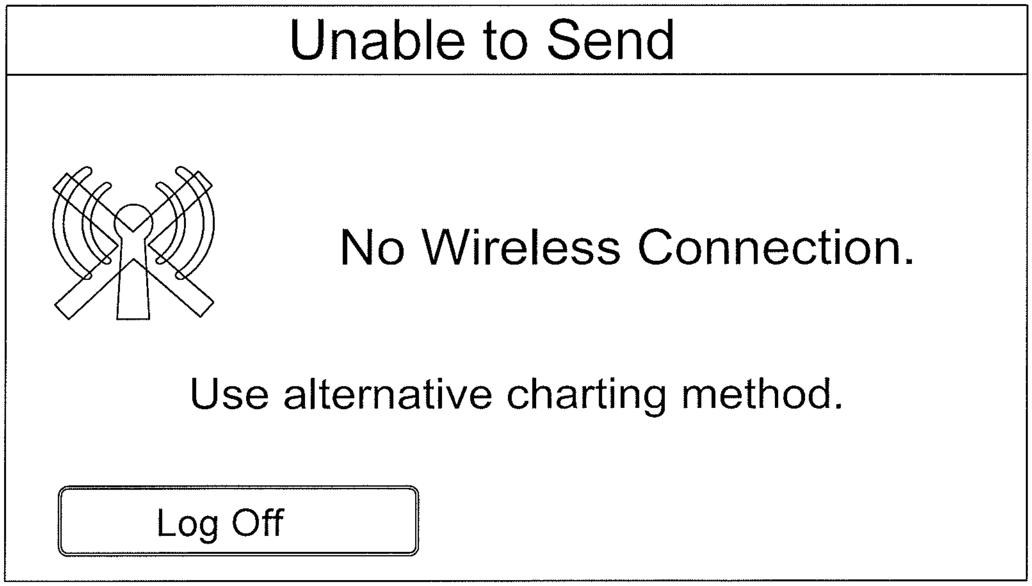
Figure 254:
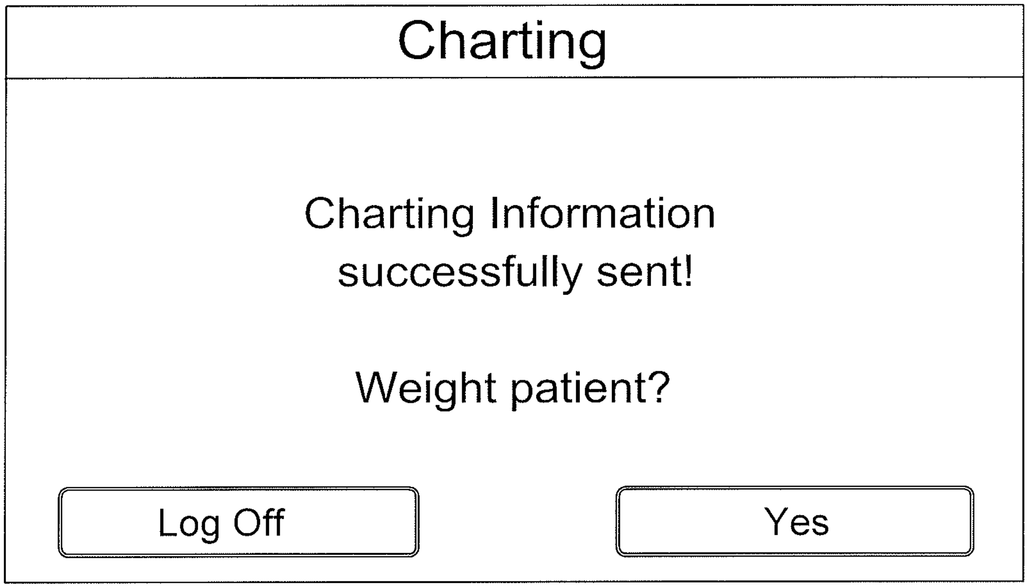
Figure 255:
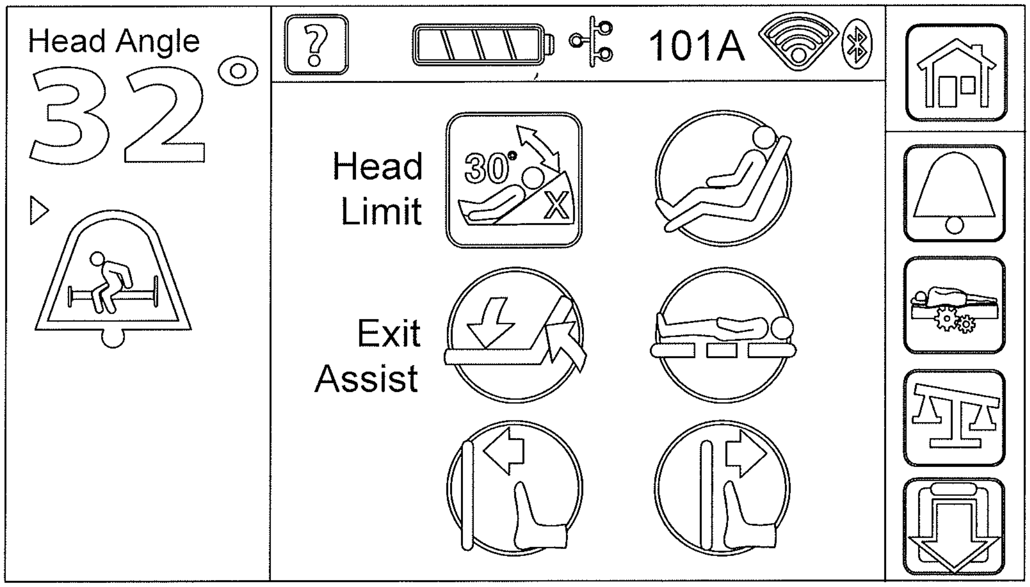
Figure 256:
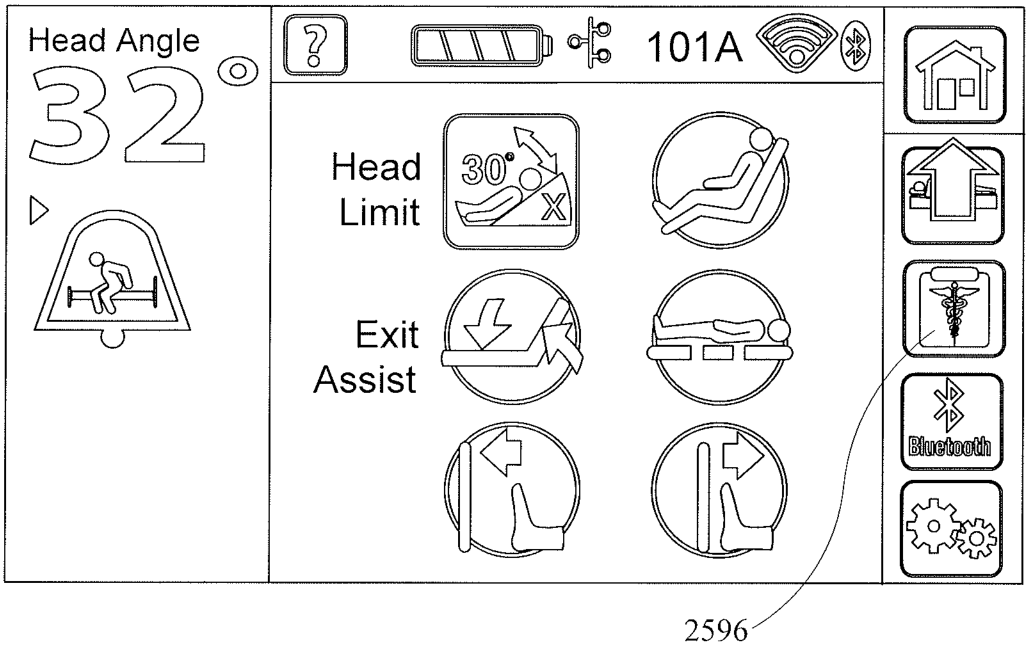
Figure 257:
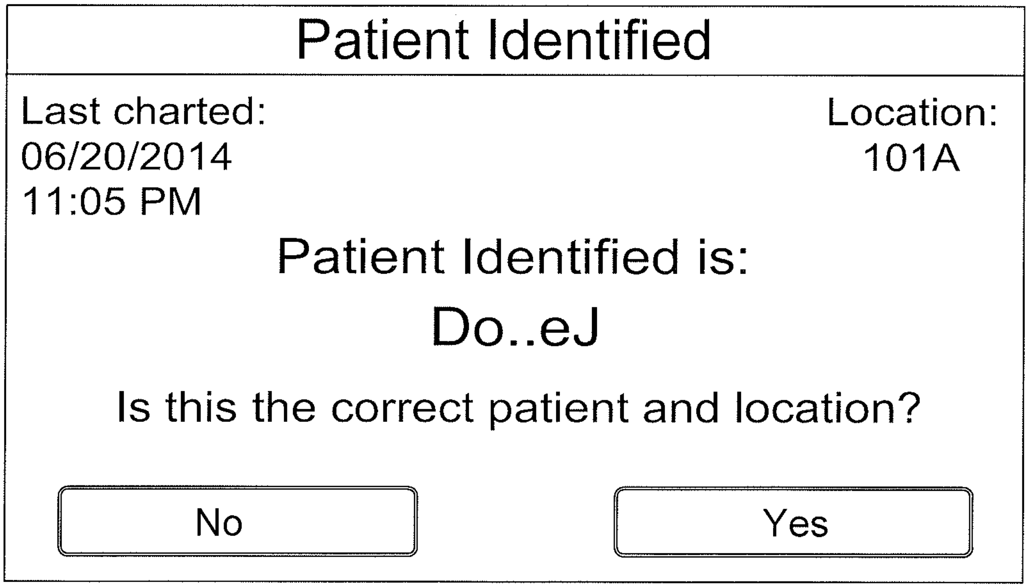
Figure 258:
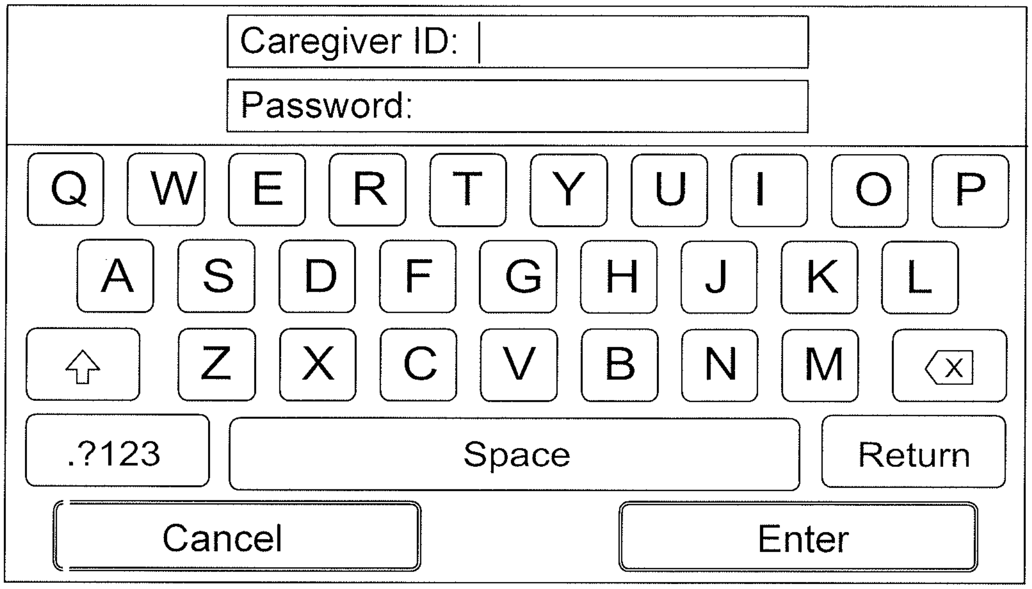
Figure 259:
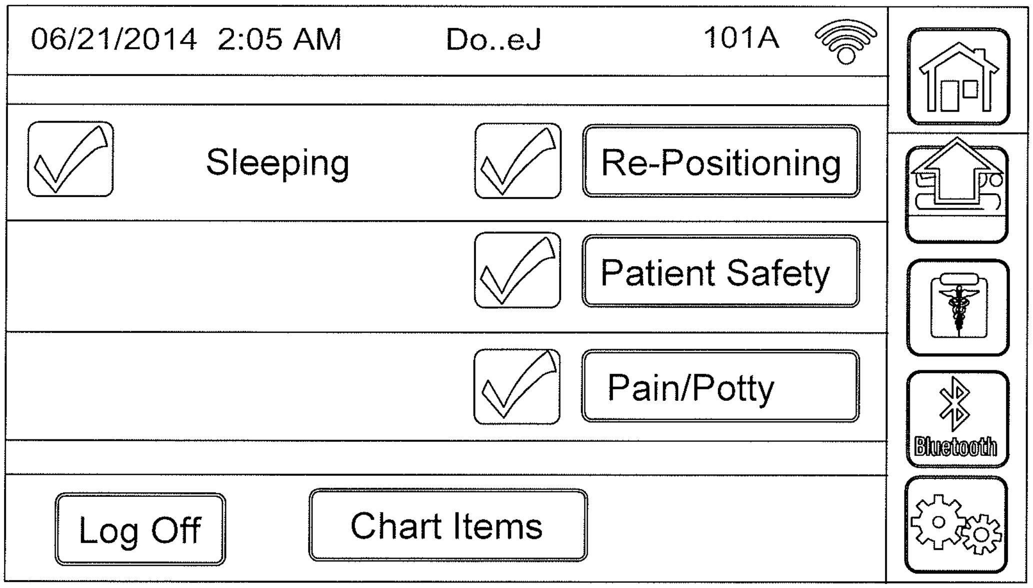
Figure 260:
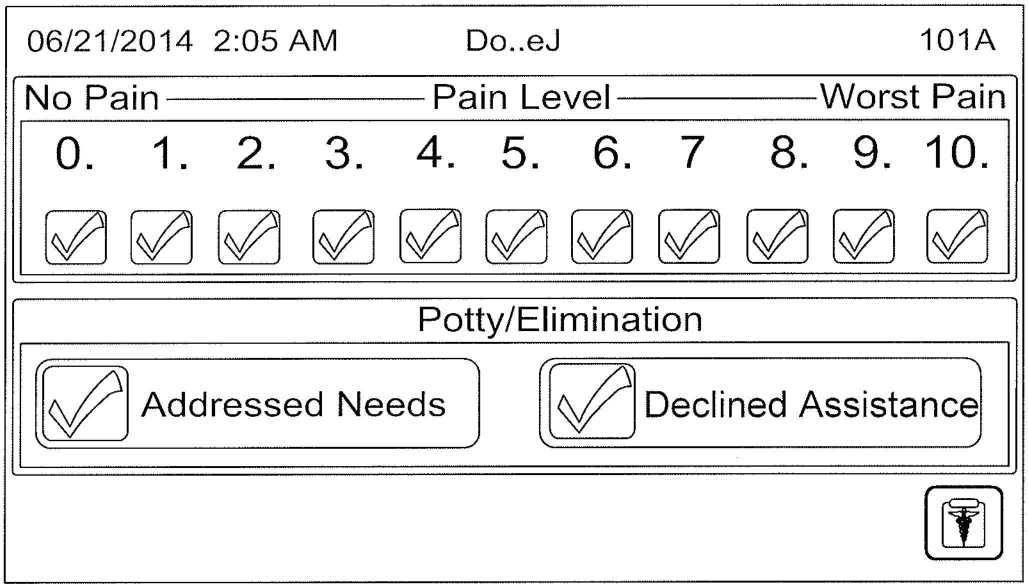
Figure 261:
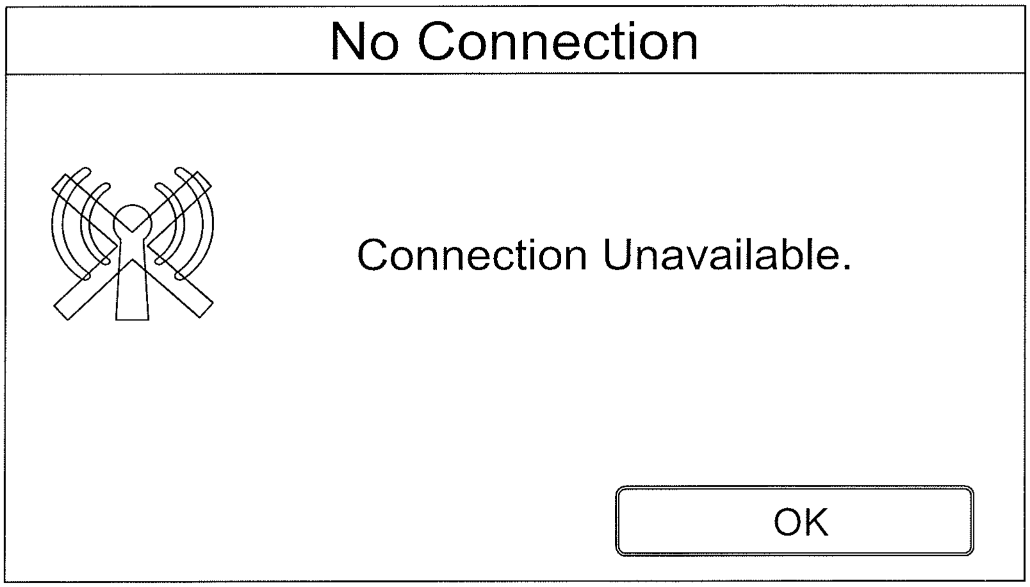
Figure 262:
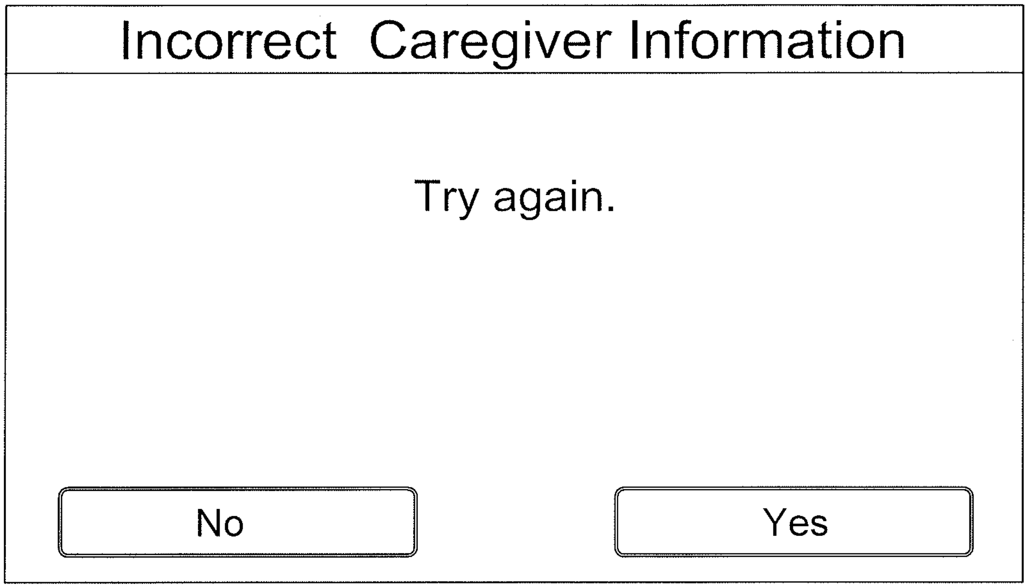
Figure 263:
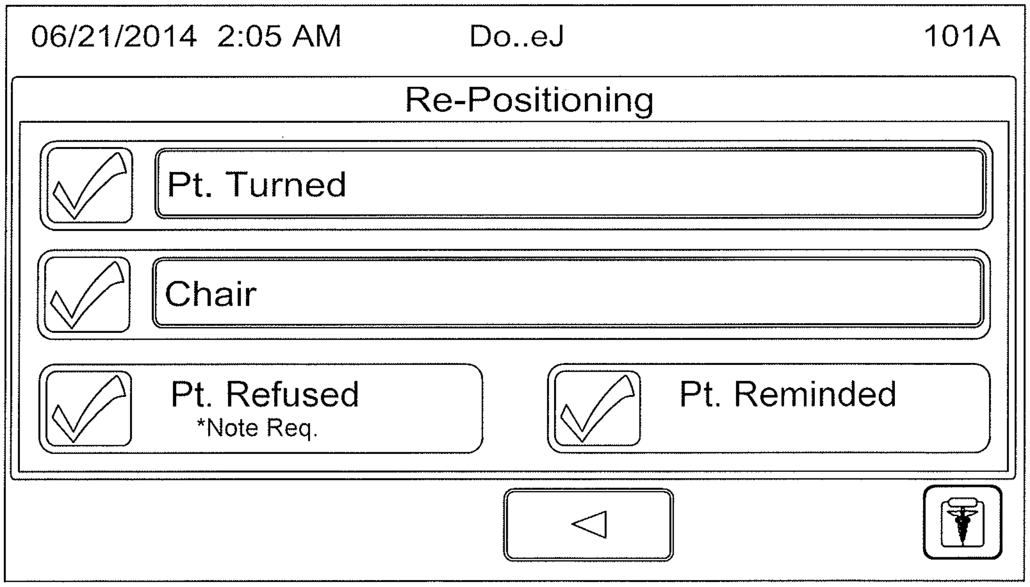
Figure 264:
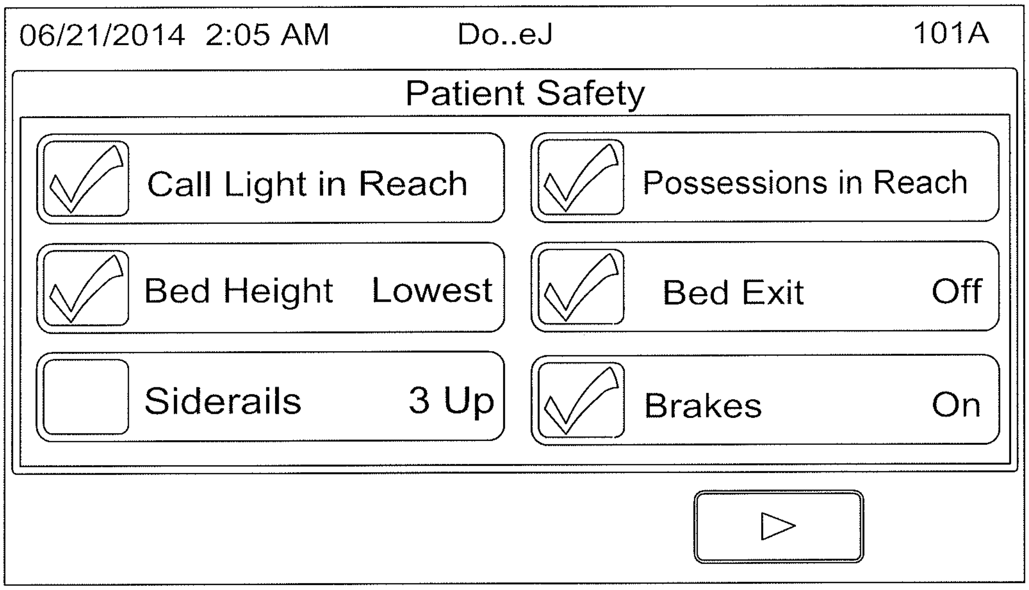
Figure 265:
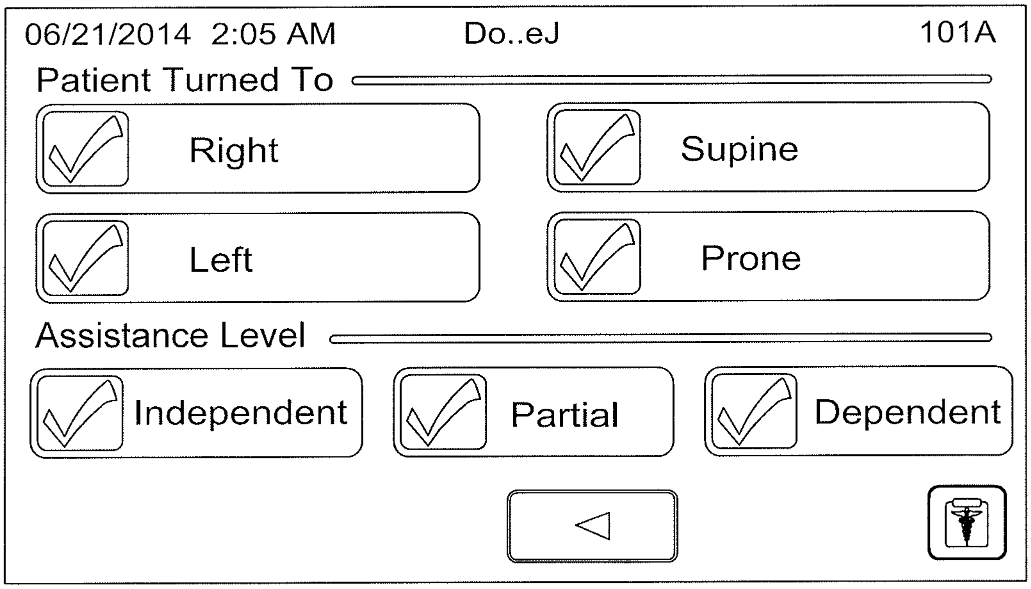
Figure 266:
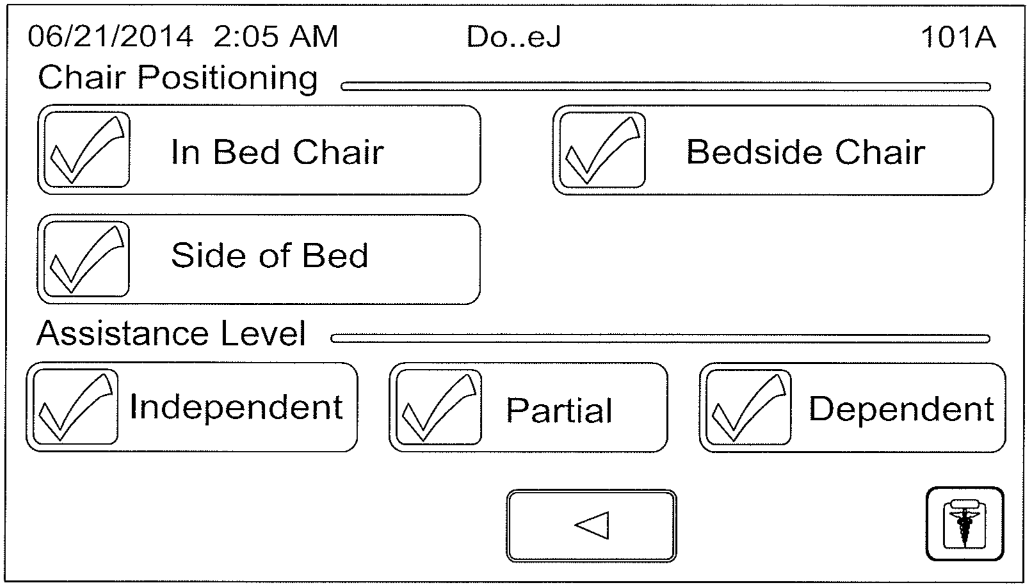
Figure 267:
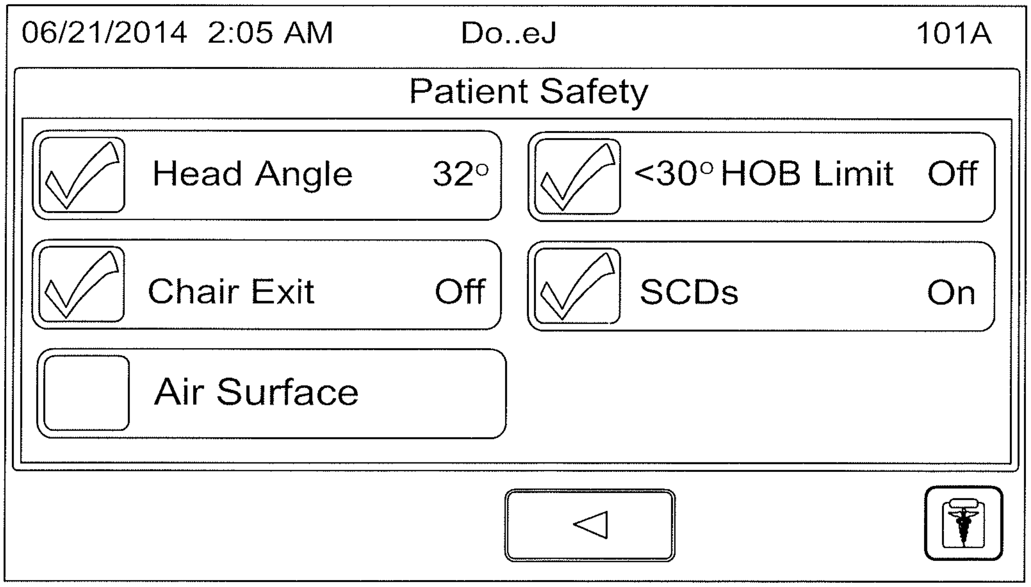
Figure 268:
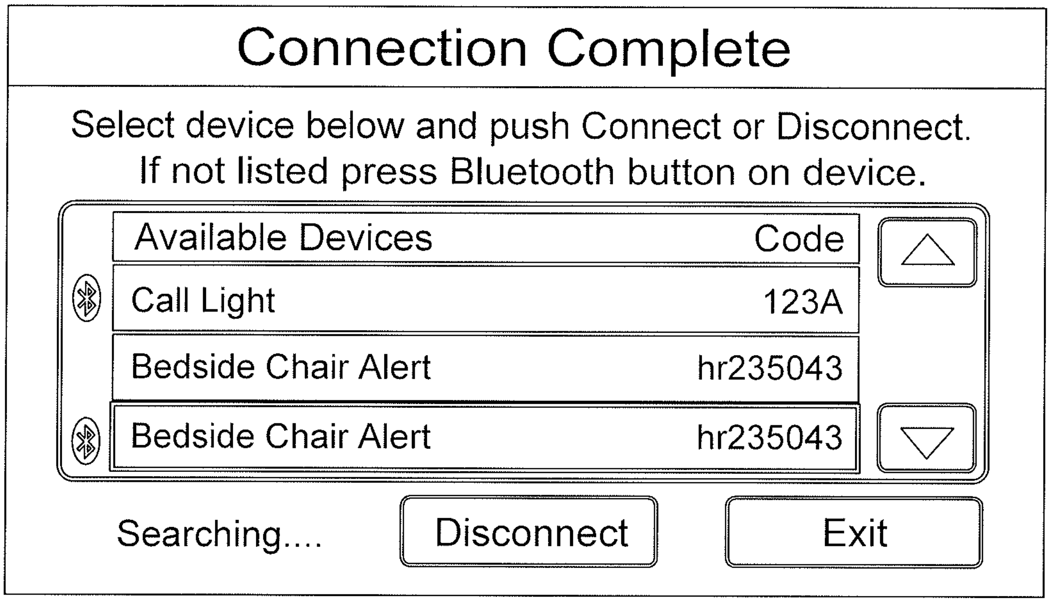
Figure 269:
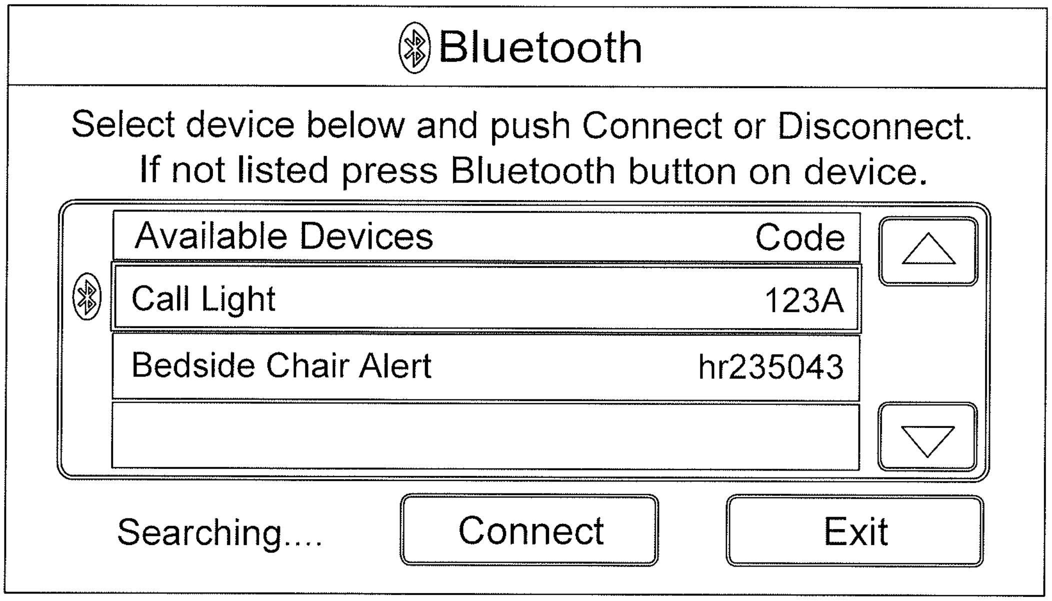
Figure 270:
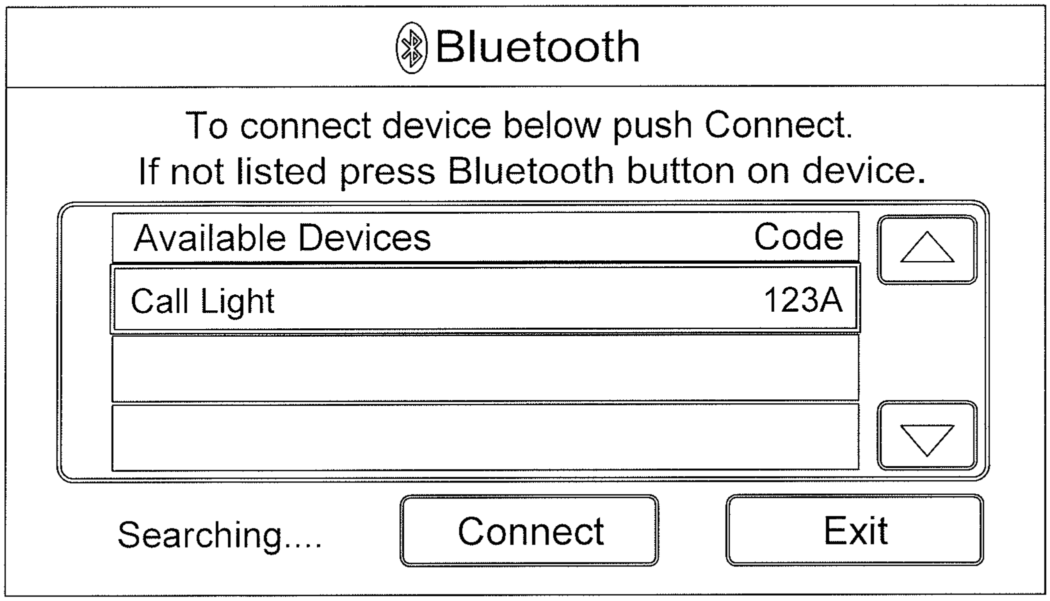
Figure 271:
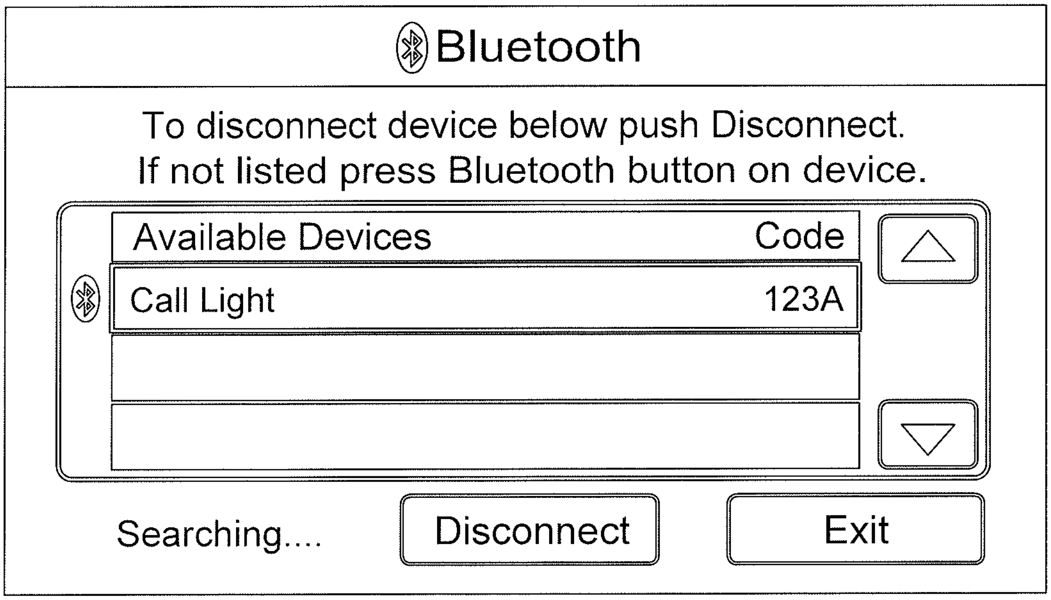
Figure 272:
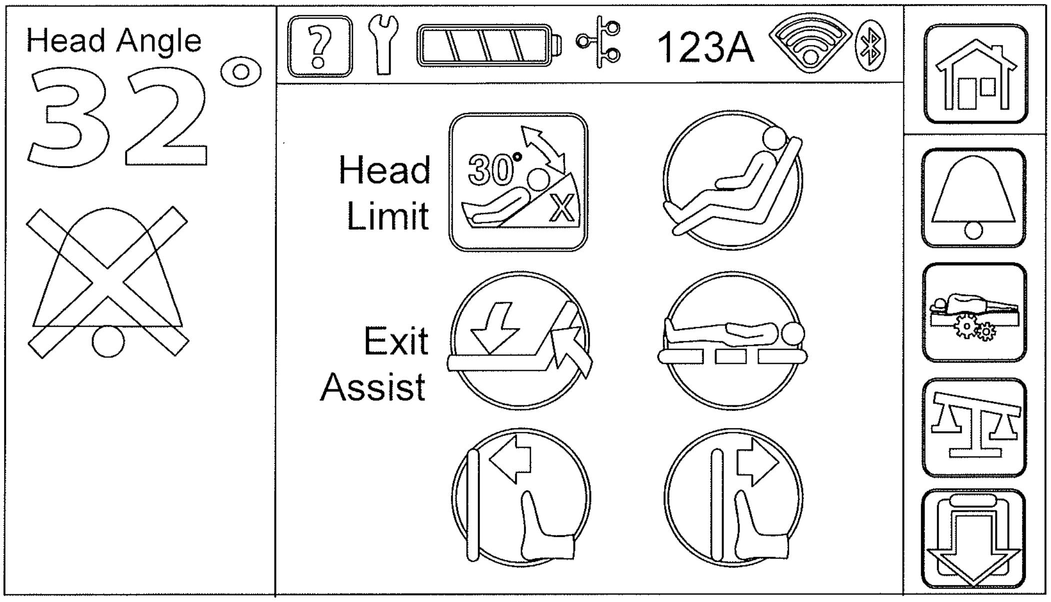

With reference to the charting menu structure 2428 an illustrative set of screen flows are shown in FIGS. 249-267. The navigation begins at FIG. 255 where the lower arrow is selected to advance the menu section 2442 expose the charting icon 2596 is shown in FIG. 256. Selection of the charting icon 2596 advances to FIG. 257. However prior to FIG. 257, an error may occur as shown in FIG. 248. If no error occurs, from FIG. 257 the structure can be advanced to either FIG. 258, or FIG. 249. Choosing yes on FIG. 257 advances to FIG. 258 where the caregiver can logon. In the illustrative embodiment, two minutes of inactivity will cause the caregiver to be logged off. In such a case the screen FIG. 250 will appear. Once logged in the menu advances to FIG. 259 the selection of choices on the screen disclosed on FIG. 259 prompting advances to other screens. Selecting repositioning advances to FIG. 263 selecting patient safety advances to FIG. 264. FIG. 264 advances to FIG. 267. Choosing pain/potty in FIG. 259 advances to FIG. 260. If the caregiver chooses to chart items in FIG. 259 then the menu structure advances to FIG. 251. And from FIG. 251 menu advances to FIG. 254. However if the system is unable to send the data, then the menu will advance to FIG. 252 and from FIG. 252 to FIG. 253. FIG. 249 appears if the no selection is made at FIG. 257. If the caregiver is unsuccessful logging in at FIG. 258, FIG. 262 appears. From FIG. 263, either FIG. 265 or FIG. 266 is invoked. If there is a challenge with the connection at FIG. 256, FIG. 261 appears.

Figure 236:
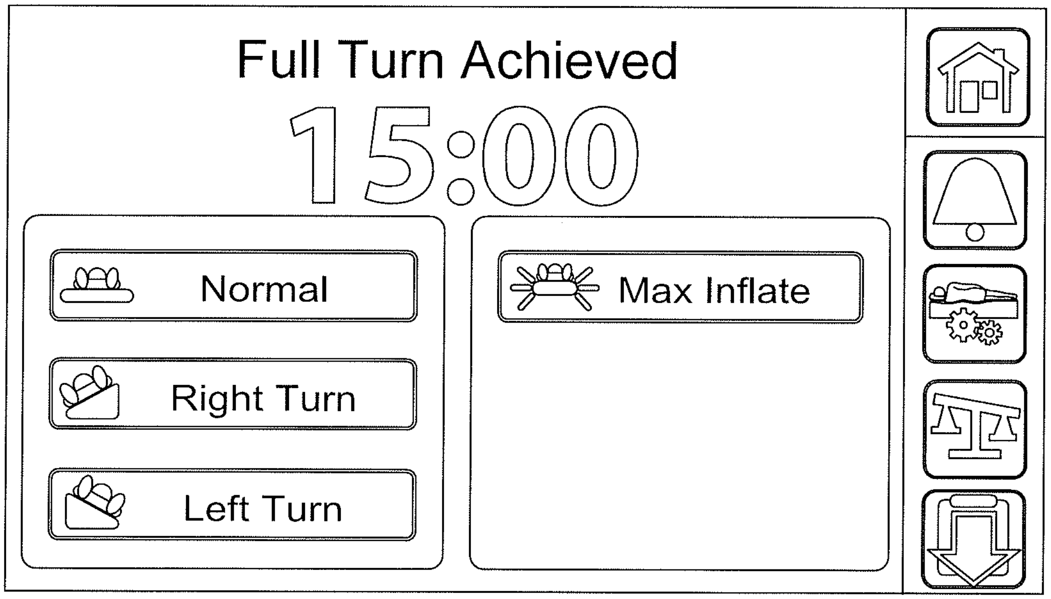
Figure 237:
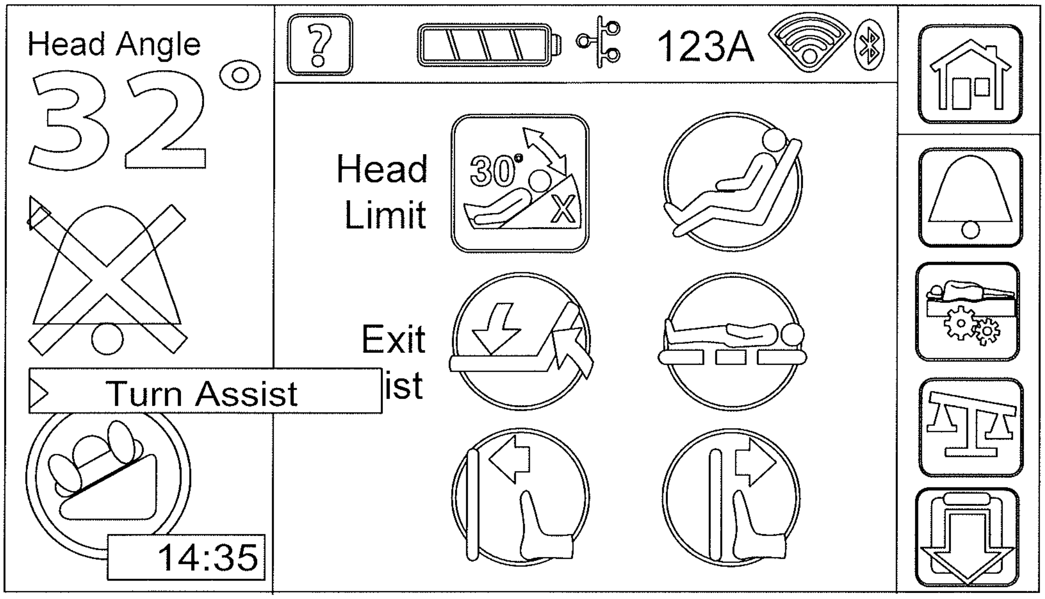
Figure 238:
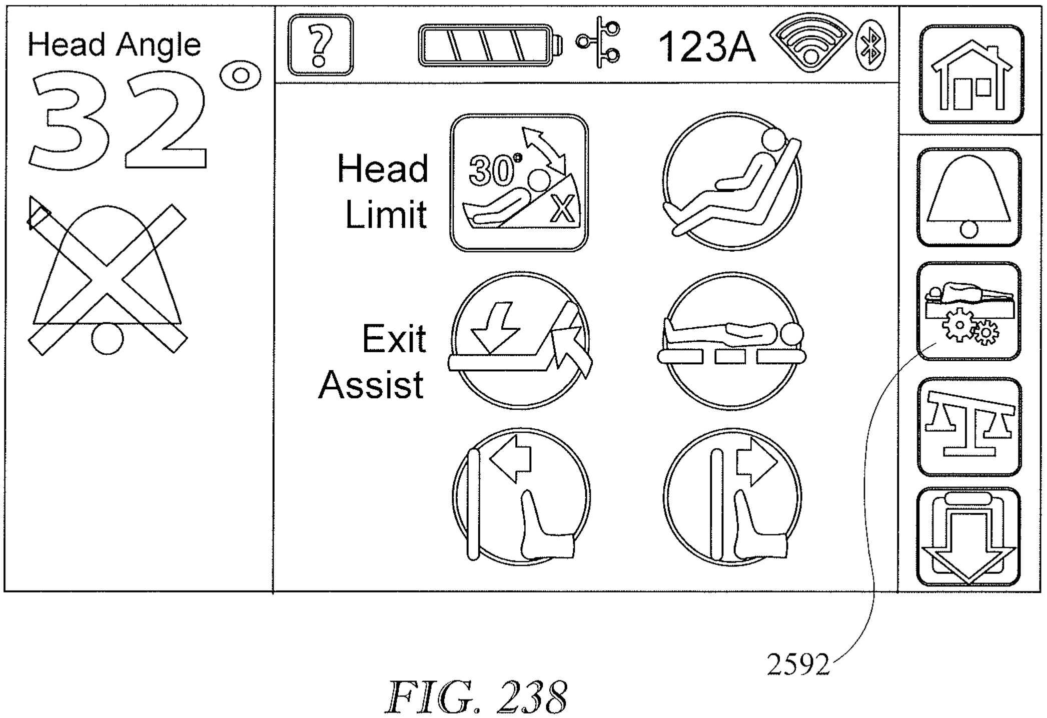

Reference to the surface menu structure of FIG. 67, FIGS. 229-247 include the basic screen flows beginning with the screen at FIG. 238. Upon selection of the surface icon 2592, the menu structure advances to FIG. 239. Selection of the left turn function advances the menu structure two FIG. 240 where the comfort function is not displayed because the comfort function is not available during turn assist or Max inflate functions. The menu structure than advances to FIG. 234 where a text prompt is provided. The structure than advances to FIG. 235 where the turn function is activated in the menu structure advances to FIG. 236. FIG. 236 displays a screen that provides a status of the turn function as it is ongoing, including a countdown timer. It should be noted that the normal, right turn, and Max inflate functions are all still available while the left turn is occurring. The menu structure then advances to FIG. 237 which is a depiction of the home screen showing the ongoing turn activity as a home screen can be displayed while a function is active.

Figure 229:
Figure 230:
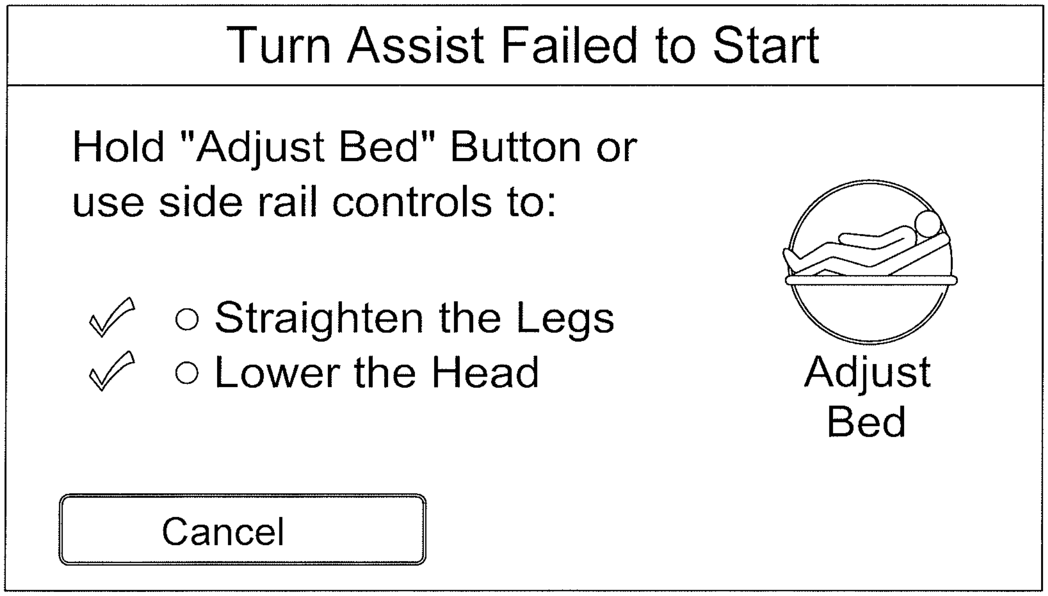
Figure 231:
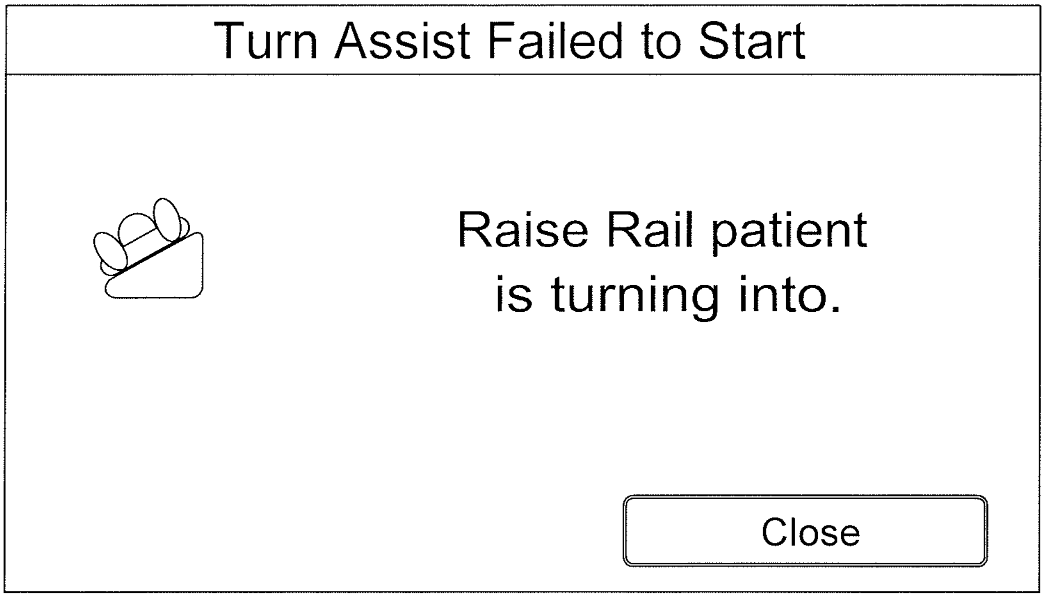
Figure 232:
Figure 233:
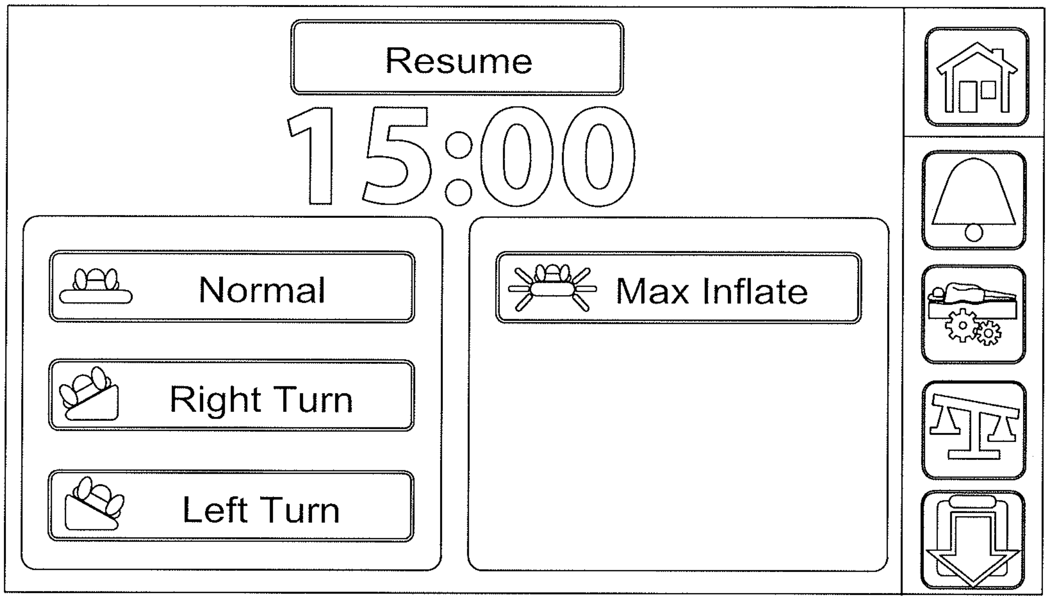
Figure 234:
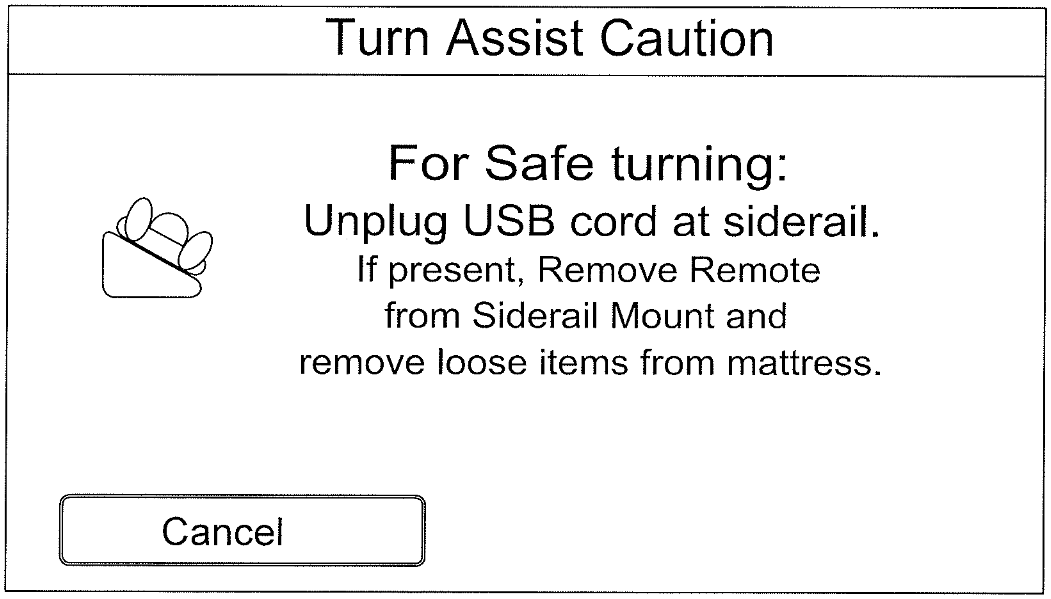
Figure 235:
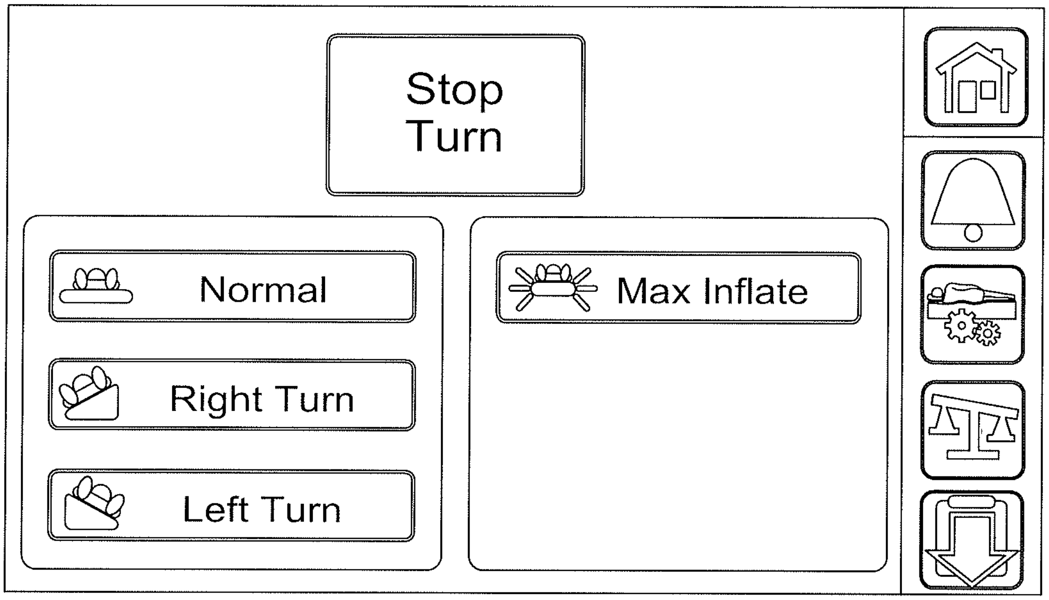

In some cases, turn assist will fail to start. In such a case the menu structure advances to FIG. 230 which provides a prompt. An alternative prompt is shown at FIG. 231. If a user selects right turn at FIG. 240, the menu structure advances to FIG. 232 to provide the caution prompt and then advances to FIG. 233 where the surface menu is displayed with the countdown timer. In some cases, such as if a side rail is down, turn assist will be disabled as shown in FIG. 229.

Figure 239:
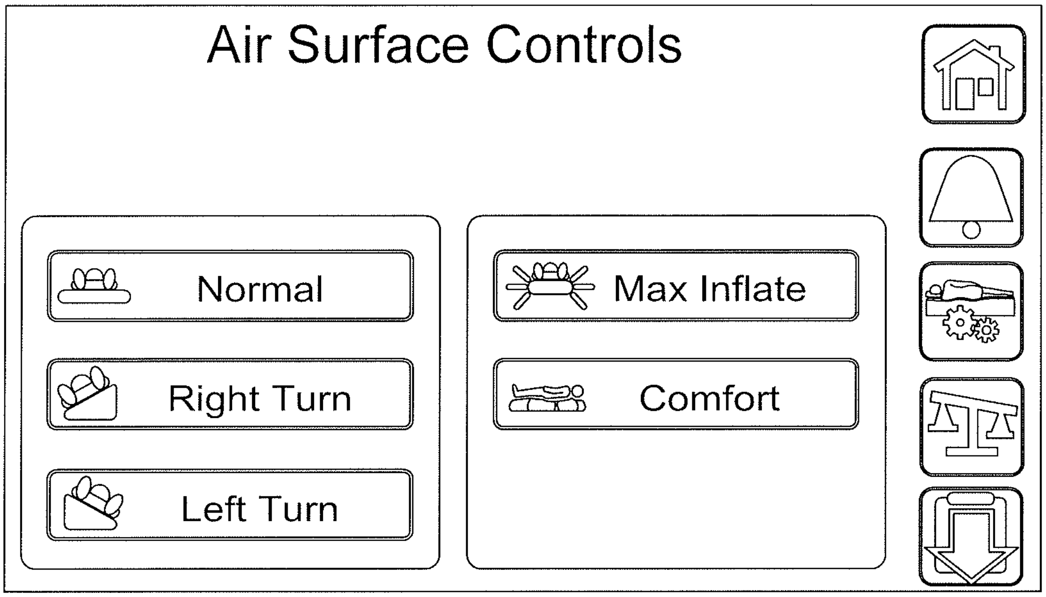
Figure 241:
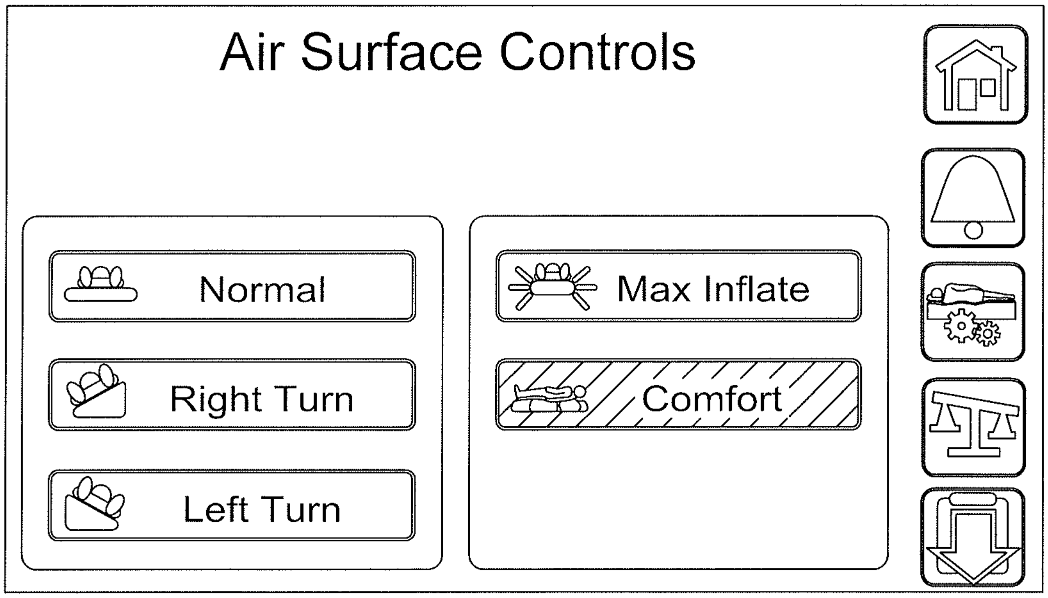
Figure 242:
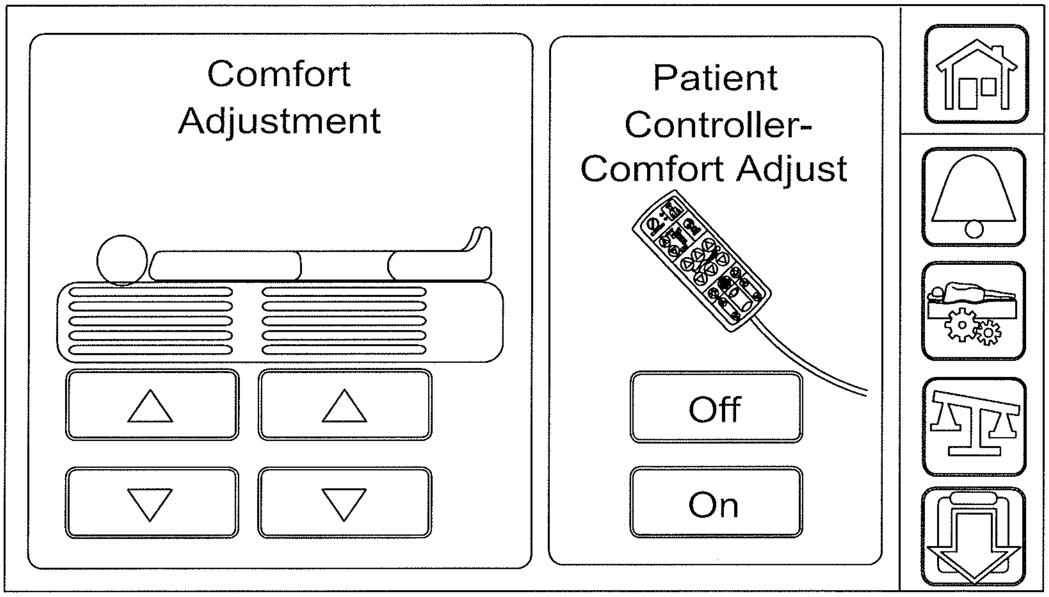
Figure 243:
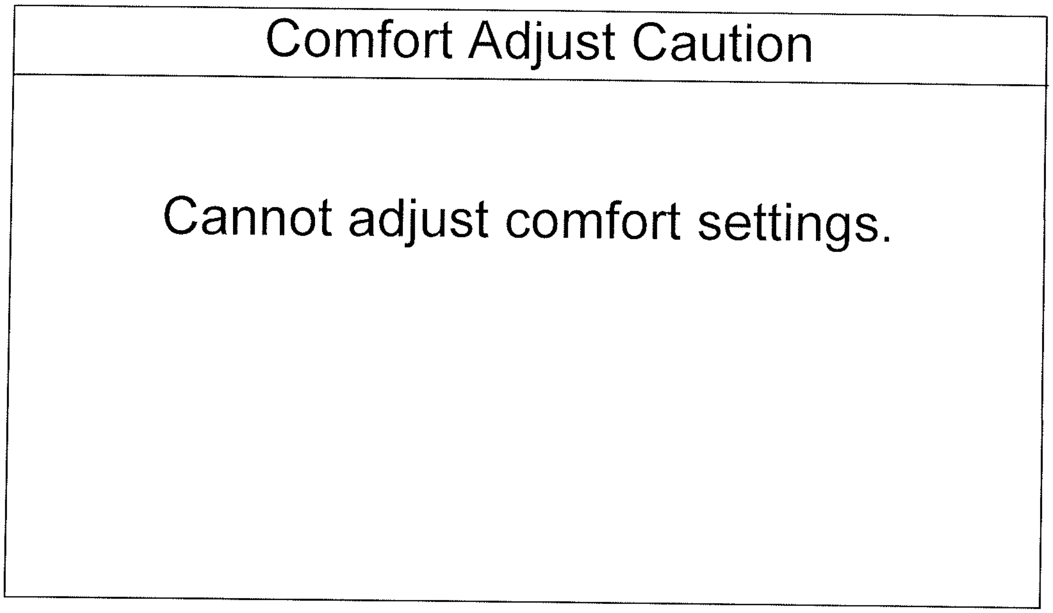

Choosing an alternative path, if the comfort function is selected at FIG. 239, the menu structure advances to FIG. 241 which shows the comfort function highlighted. Once the comfort function is selected, the menu structure advances to FIG. 242 where a user can make adjustments to the comfort by zone or enable a patient to make adjustments to comfort from the patient pendant. In some cases, comfort adjust may not be available. As will be described below, the bed can be configured such that comfort adjust is not an available option.

Figure 240:
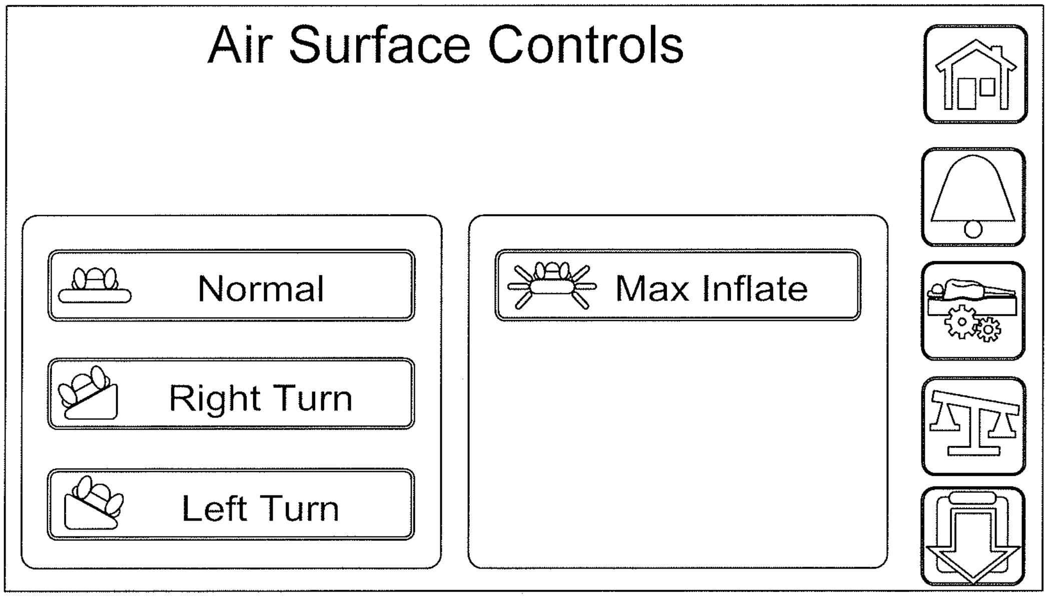
Figure 244:
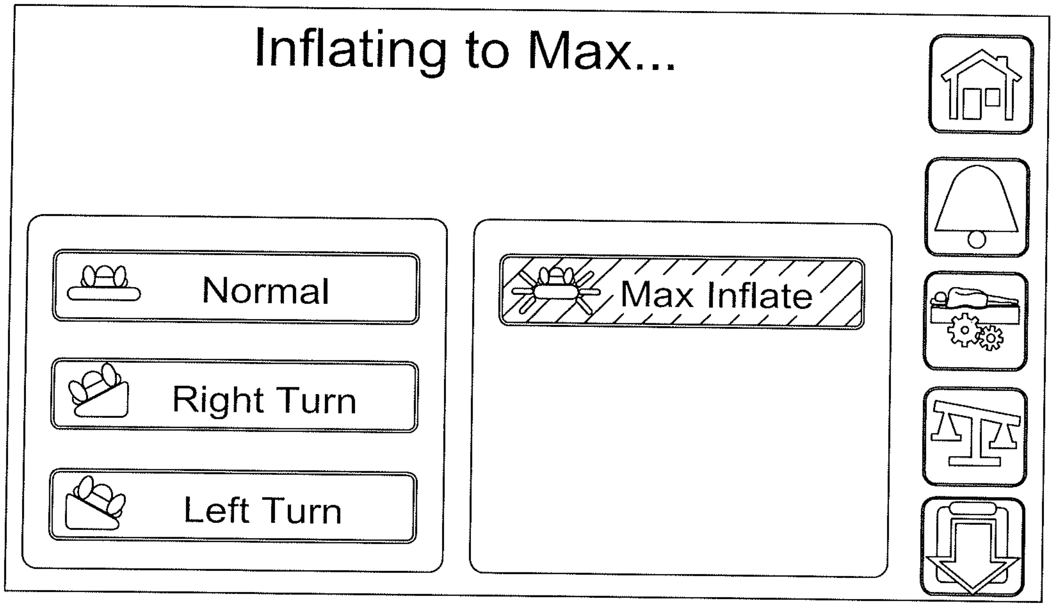
Figure 245:
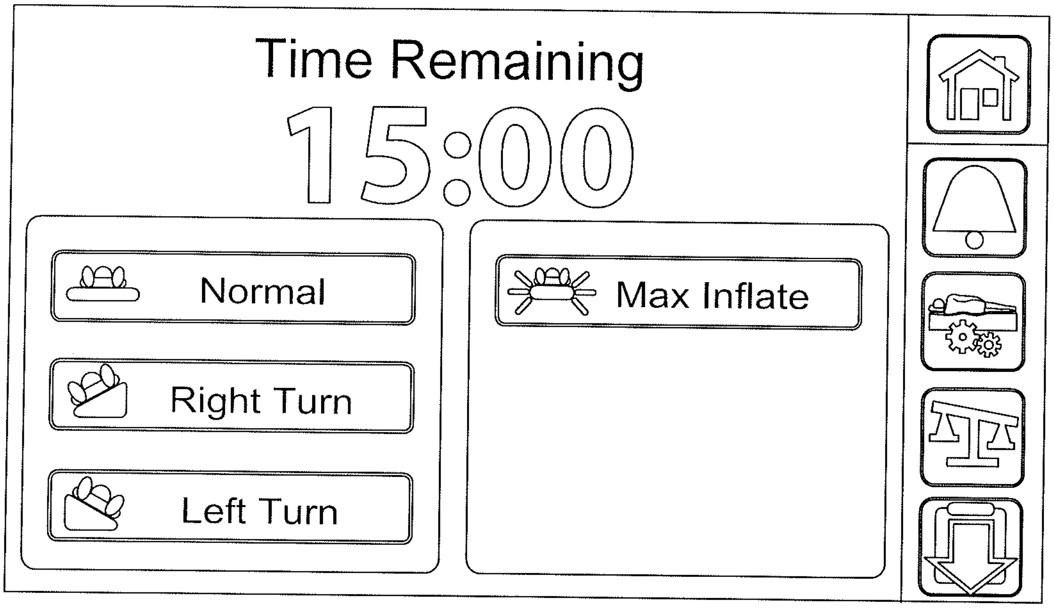
Figure 246:
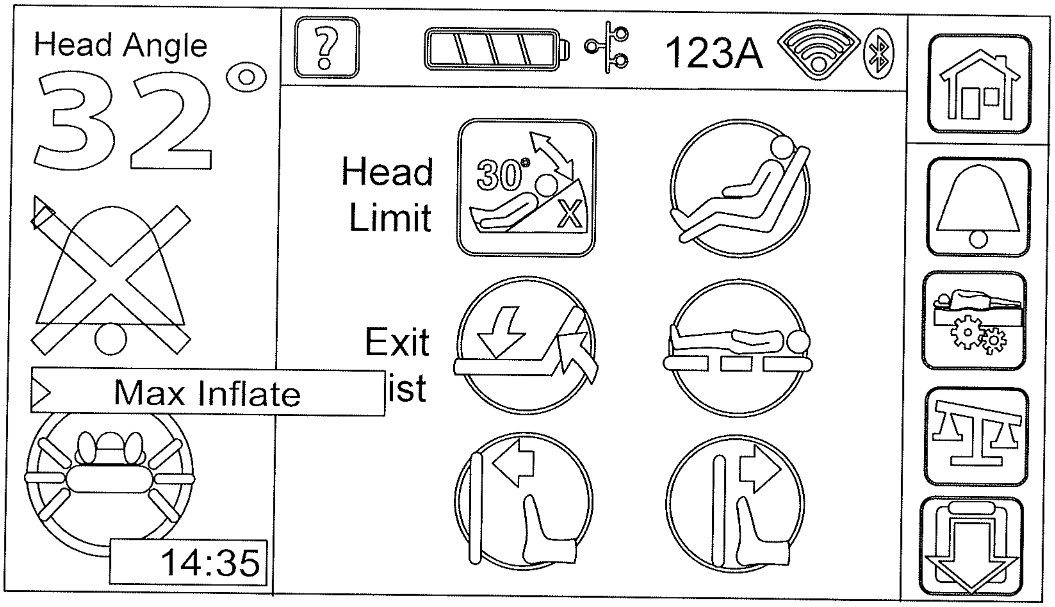
Figure 247:
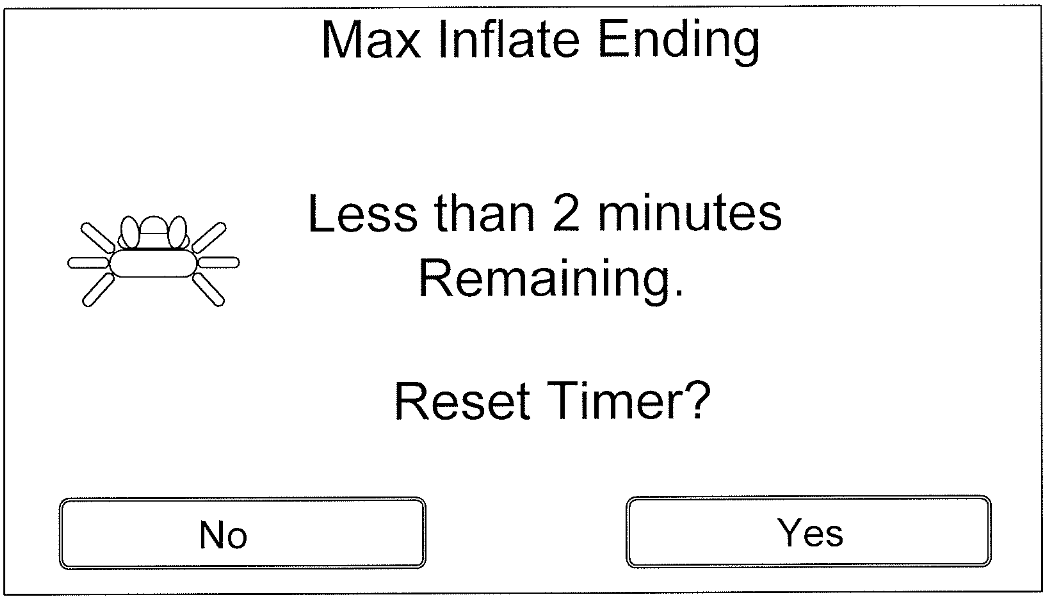

FIG. 244 begins a sequence of screens associated with the Max inflate function which can be chosen from the air surface control screen shown in FIG. 240. When the Max inflate function is chosen at FIG. 244 as indicated by the highlighting, the menu structure advances to FIG. 245 which shows the time remaining in Max inflate. The menu structure then advances from FIG. 245 to FIG. 246 which is a home screen displaying the status of the air surface. As the Max inflate function times out, a prompt pops up at FIG. 247 to inform a caregiver and inquire as to whether a timer should be reset.

Figure 273:
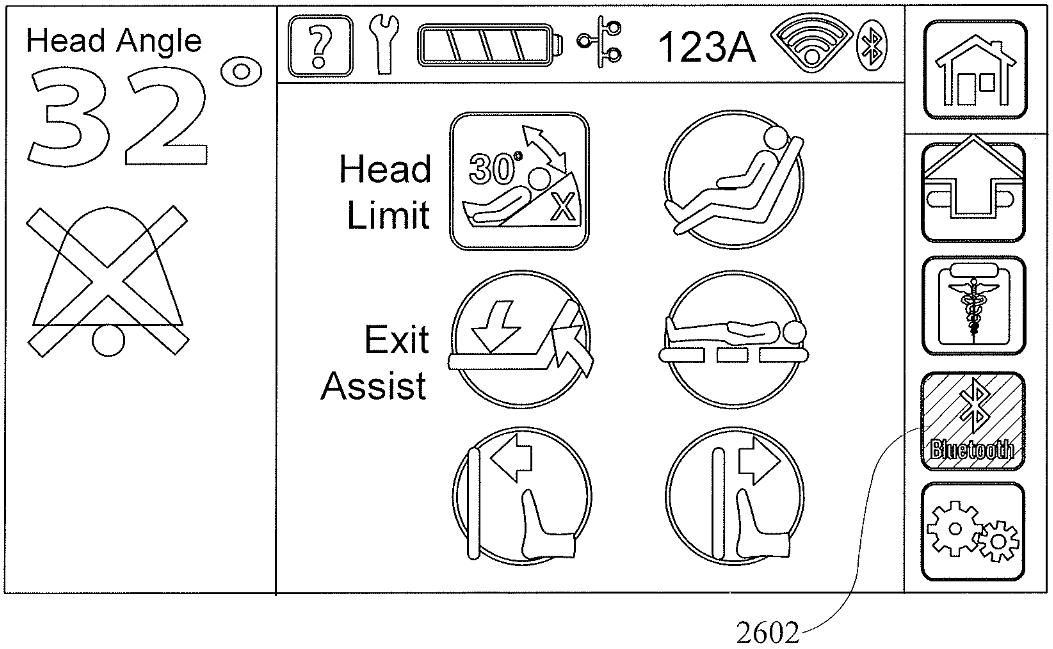
Figure 274:
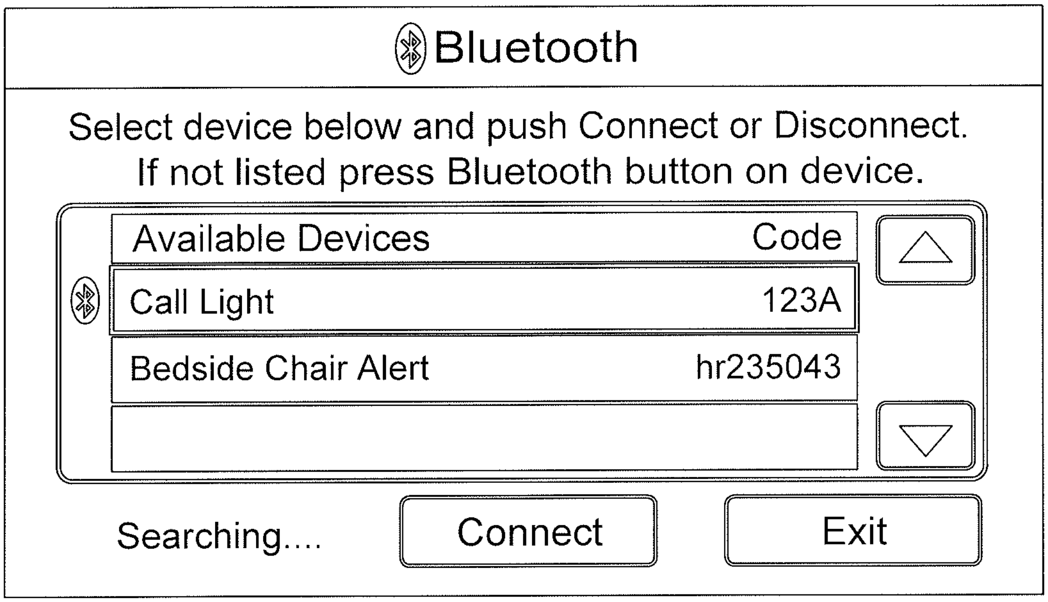

Now referencing the Bluetooth® menu structure 2426, FIGS. 268-285 is directed to the Bluetooth® menu structure. The Bluetooth® menu structure starts with FIG. 272, but FIG. 272 does not show the Bluetooth® icon 2602 in the main menu section 2440. Thus a user has to navigate using the navigation arrow in the lower right corner of the screen of FIG. 272 to expose the Bluetooth® icon as shown in FIG. 273. Selection of the Bluetooth® icon 2602 advances to FIG. 274 which provides a listing of available devices showing the call light connected. The user can select one of the devices by a touching the screen in the menu structure will advance to FIG. 275 to connect the device. In some cases, FIG. 268 will appear if another device is searching for Bluetooth® connection. At FIG. 269 the graphical user interface 66 provides prompts to a user for connecting a device.

Figure 275:
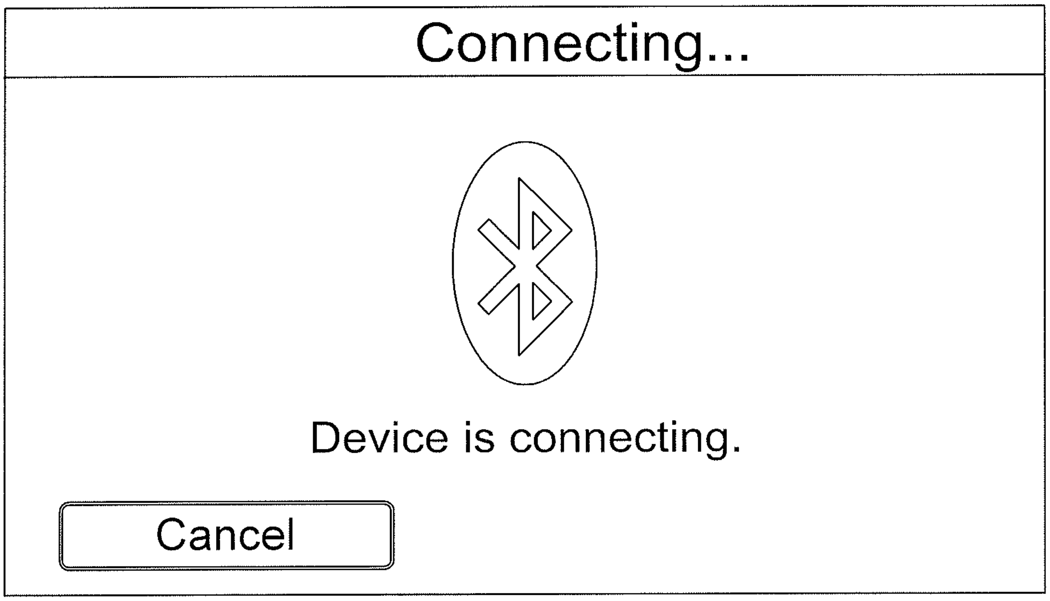
Figure 276:
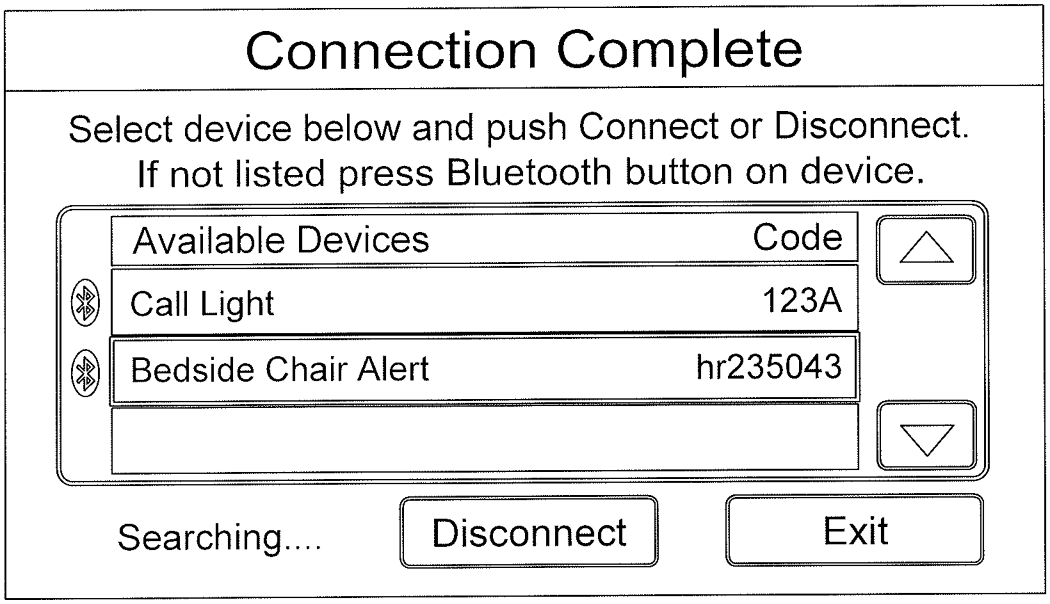
Figure 277:
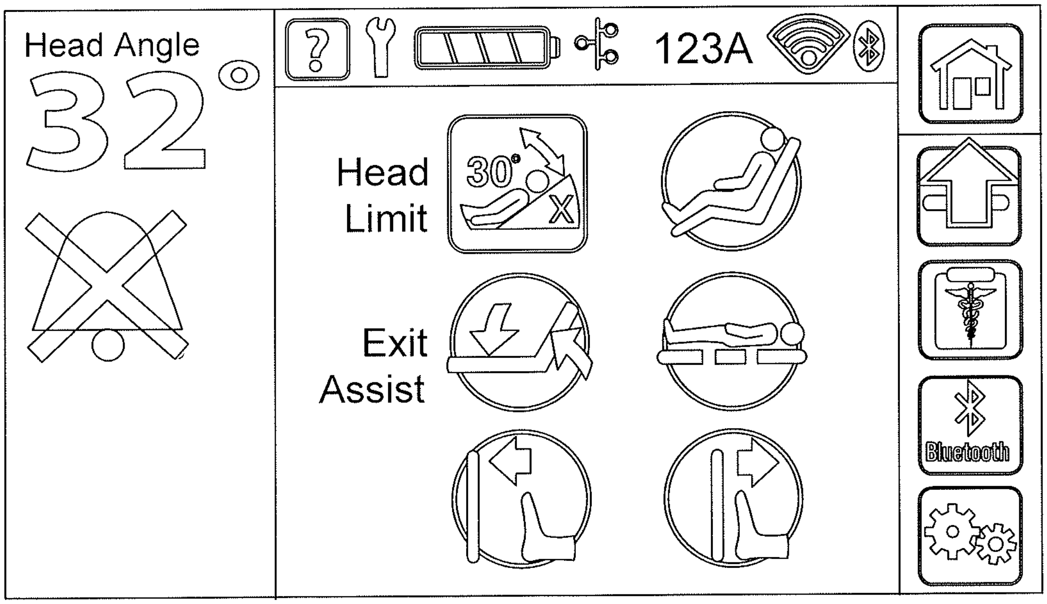
Figure 278:
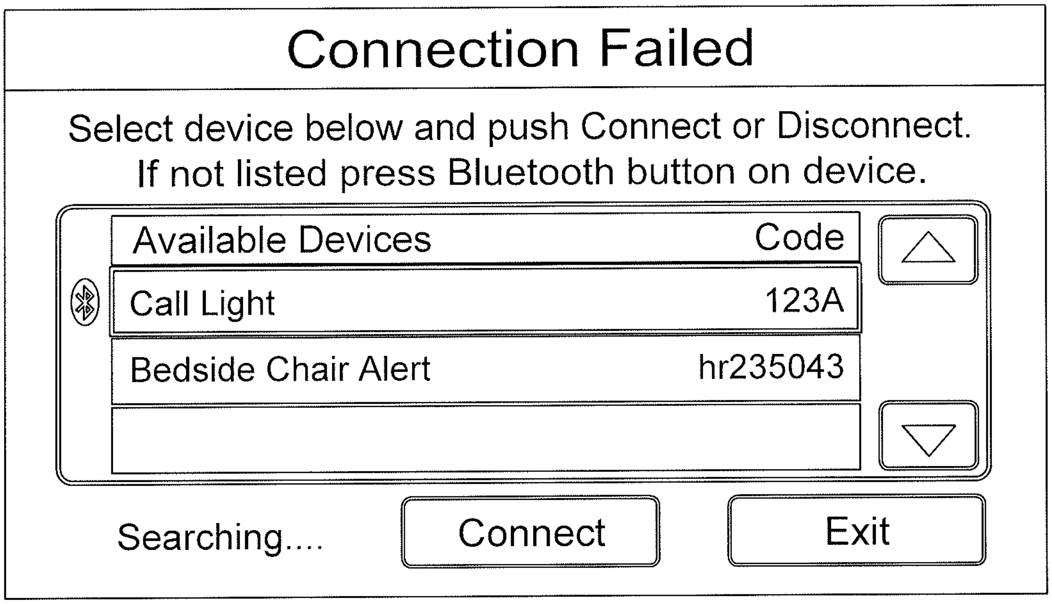
Figure 279:
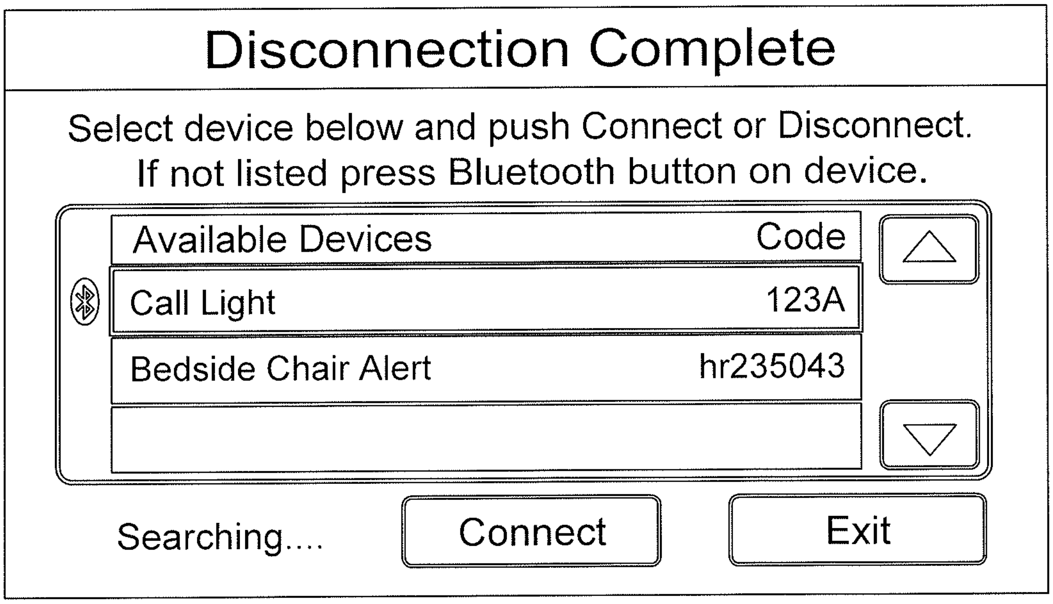
Figure 280:
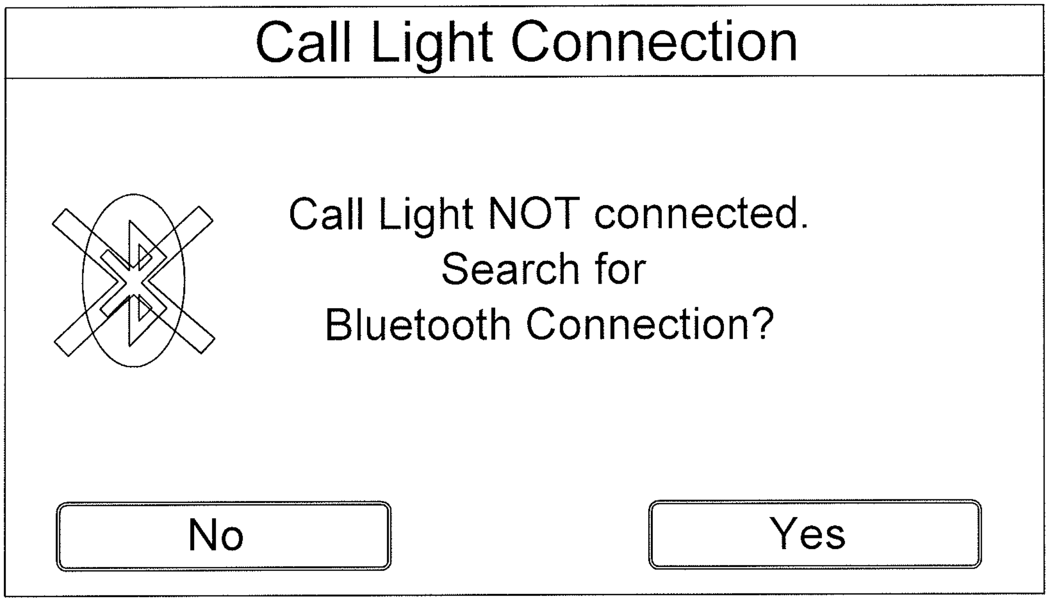
Figure 281:
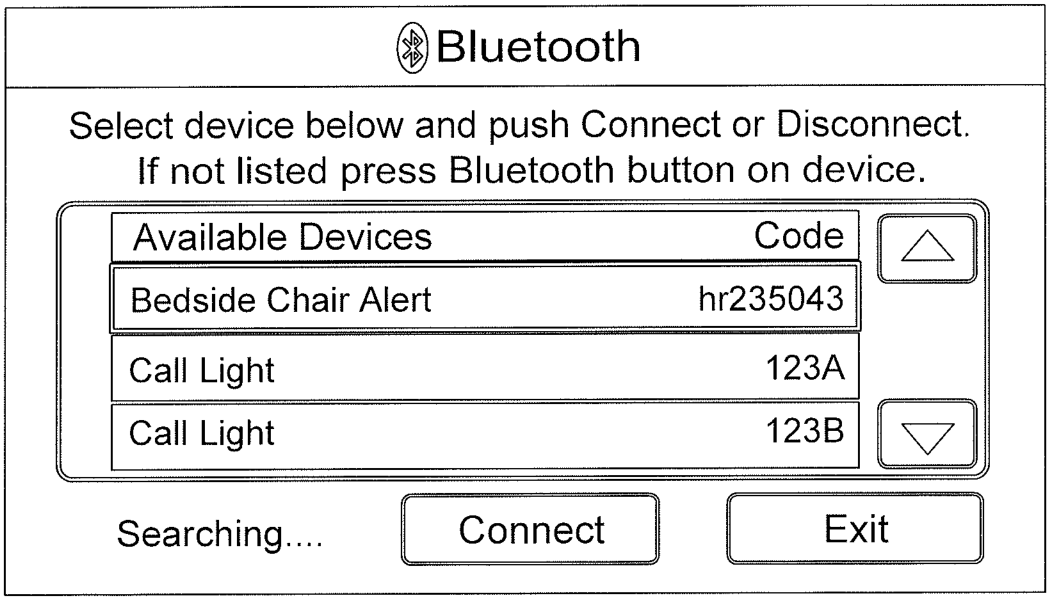
Figure 282:
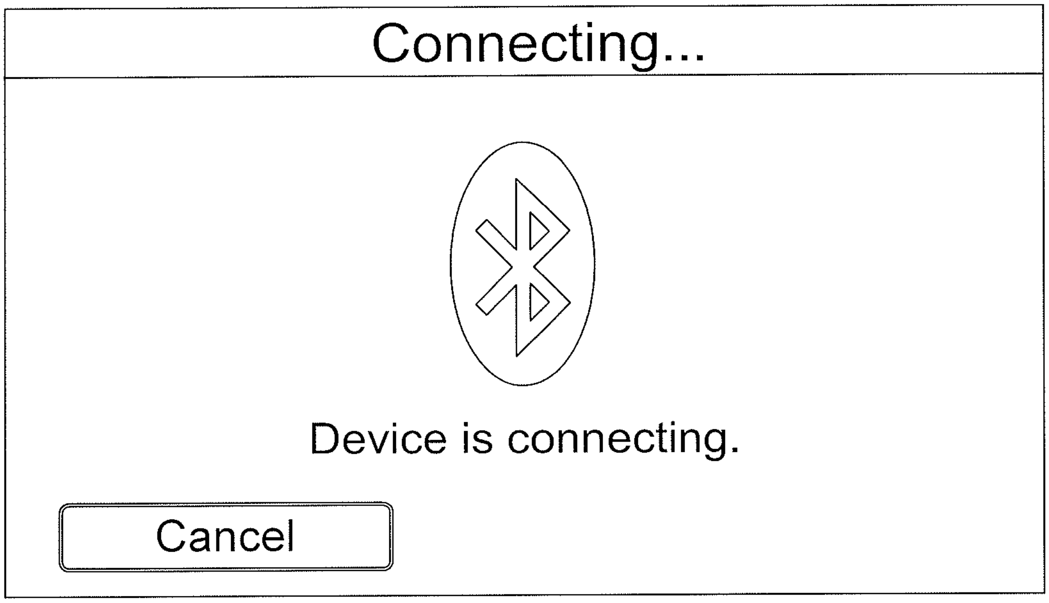
Figure 283:
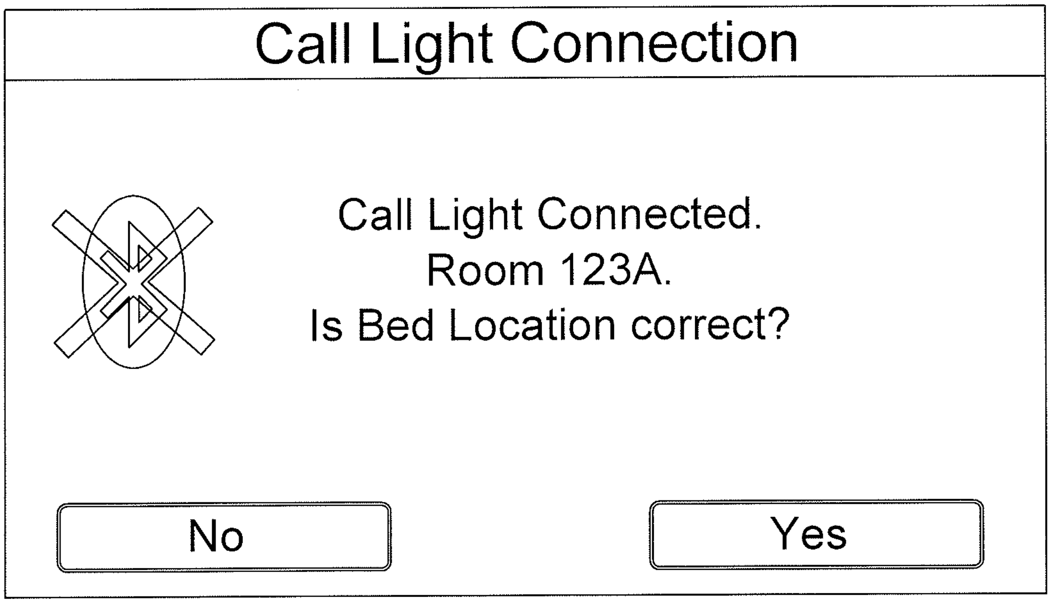
Figure 284:
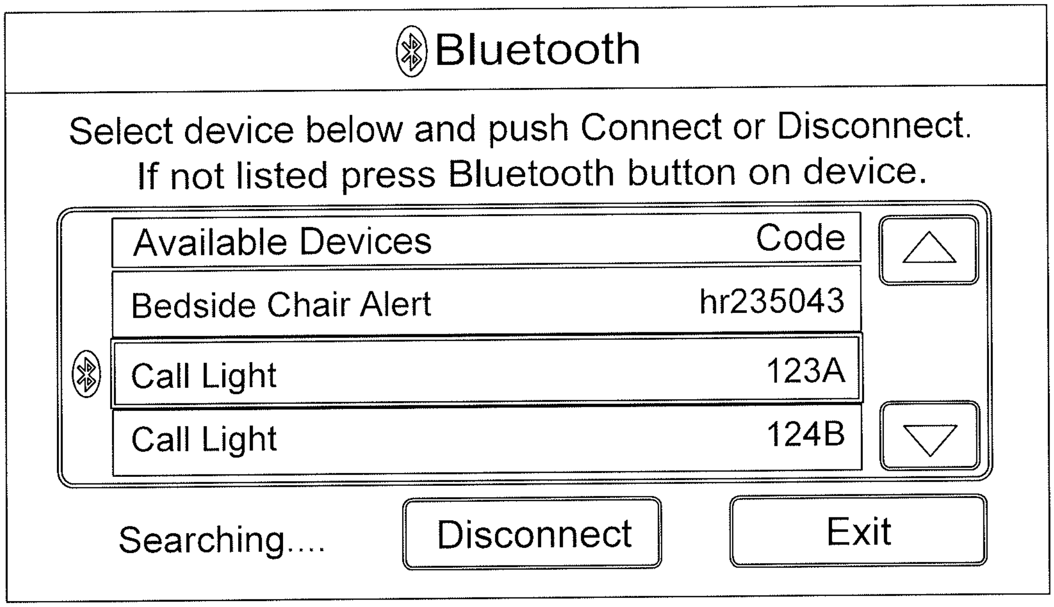
Figure 285:
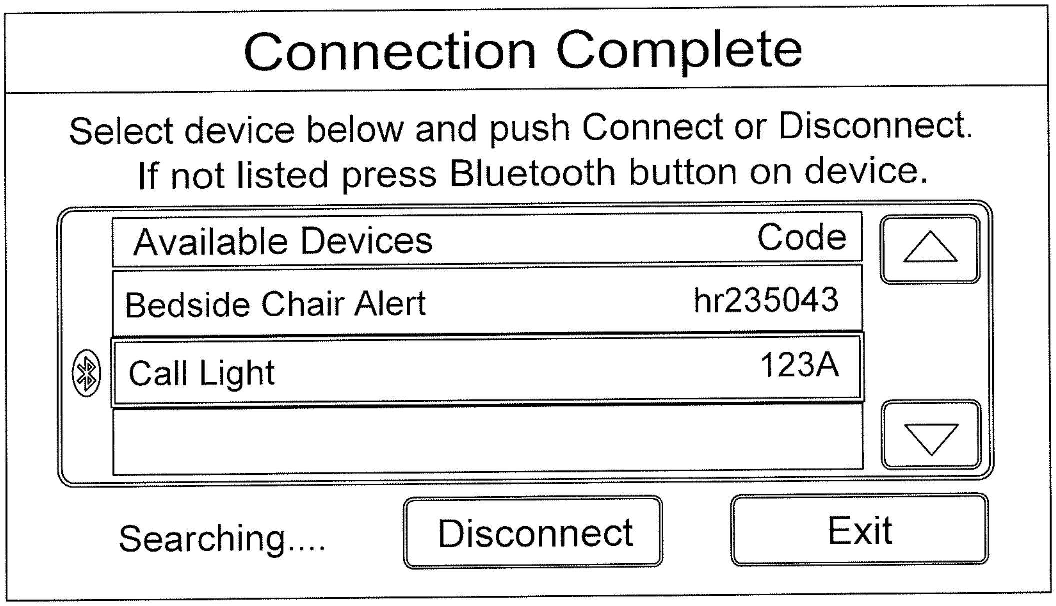

If the connection completes at FIG. 275 the menu structure advances to FIG. 276 which shows other available devices which may be connected or disconnected. Once the Bluetooth® menu structure times out, the home screen shown at FIG. 277 is displayed and displays the Bluetooth® icon if a Bluetooth® connection has been made. If the connection fails at FIG. 275, FIG. 278 provides prompting for resolving the issue. FIG. 279 assists with disconnecting a device. FIG. 280 is a prompt that appears after a bed has been transported to assist with connecting the bed to a Bluetooth® call light. The menu structure then progresses to FIG. 281 to assist with the connection. FIG. 282 indicates the connection is being made and FIG. 285 confirms the completion of the connection. On the other hand, if the bed returns to a room and makes an immediate Bluetooth® connection, a prompt such as that prompt at FIG. 283 appears giving the opportunity to disconnect the device and correctly connected at FIG. 284.

FIGS. 286-352 are all screens that appear in the preferences menu structure 2430. Various settings are available to the caregivers and two technical support teams through throughout the preferences menu structure.

FIGS. 354-376 are screenshots of screens assisted with the operation of a sequential compression device controlled from the graphical user interface.

As discussed above, the hospital bed 10 has ongoing communications amongst components of the hospital bed 10, and accessories in the patient room, and with external information systems including electronic medical records. One of the challenges of such a broad array of communications links is the ability to maintain security and data integrity. A solution for the need for secure device to device communications is the use of a public key infrastructure (PKI) approach.

PKI is based on top of public key cryptography. Public key cryptography is different from symmetric cryptography by its use of two linked keys, one to encrypt and one to decrypt. In symmetric cryptography, an encryption algorithm E takes as input a plain text message M and a key K and produces a cypher text C. The decryption algorithm takes as input the cypher text C and the key K and produces the plain text message M:

$$E(M,K)=C$$

$$D(C,K)=M$$

Once a message is encrypted, barring some fault in the algorithm implementation or drastic advance in cryptanalysis, only somebody with a copy of the key can decrypt it. But also everybody with the key can decrypt it. Or decrypt it, modify it and re-encrypt it. If a group wishes to encrypt messages among members, either all share the same key, or need keys for each independent pairwise conversation. The first approach is quite insecure, and the second get unmanageable quite fast (number of keys is $n*(n-1)/2$).

The public key cryptography uses a public key Pk and a private key pk. The encryption/decryption algorithm work similarly:

$$E(M,Pk)=C$$

$$D(C,pk)=M$$

The advantages of the public key cryptography include publishing a public key while keeping it private key secret. This allows the sending of one-way messages to the owner of a key pair. This has an advantage of keeping the pool of keys scales linearly to the number of parties in a conversation. In addition, a plain text message can be encrypted using a private key. It also allows the certificate approach for executing documents or acting electronically in a legally binding manner.

Referring to FIG. 385, an arrangement is disclosed where each node maintains an independent public/private key pair. In this way the grandparent certificate authority certificate authority 4240 is able to maintain a chain of certificates linking each key to the public key of a parent 4242 or 4244 to a respective child 4246, 4248 or 4250, respectively. This permits a down-tree network of trust to be created with the grandparent 4240 maintaining the authority of the child 4242, 4244 public keys, as well as the grandchild 4246, 4248 and 4250.

This allows two of the parent or grandparent nodes to mutually authenticate. Once a secure channel is established (using a standard key exchange protocol) the two parties can exchange their public keys and together with the certificate chain reaching up to the common parent. At that point, each party can verify the signatures through all of the generations and ensure that they are part of the same "organization".

Note that the same scheme can be employed to delegate authority from the grandchildren 4246, 4248, 4250 to the parent certificate authorities 4242, 4244 and devices. For instance, the certificate authority can certify the following statement: "[Delegated (certificate authority1) Public Key 4242] can sign device public keys for class 1 and delegate operation Z". Then the Delegated certificate authority1 4242 can sign the public key of Device 1.1 and add the "delegate operation Z" to it. Now if 4242 connects to 4246 it will send its public key along with "Delegated certificate authority1" public key to 4246. Node 4246 will respond with its own public key and the "Delegated certificate authority2" public key. Each device uses its own copy of the Root certificate authority public key to verify the signature on the delegated certificate authority, and the now certified delegated certificate authority to verify the public key of the device. After this verification, "Device 1.1" signs a statement that it intends to request "operation Z" and sends it to "Device 2.1". Since "Device 2.1" now has a certified public key from "Device 1.1" it can use it to verify the signature on the request. Since it has the augmented delegation statement from the parent of "Device 1.1", it can now configure itself to allow such requests to perform "operation Z" received subsequently.

Of course, if adequate memory is available, the sets of parent certificate authorities and signatures can be cached after the first exchange, and later expunged after some amount of time passed since the last time they were needed.

In an environment in which the hospital bed 10 operates, such as that shown diagrammatically in FIG. 386A-386B, each manufacturer may function as a certificate authority for communications relevant to that manufacturer, and generate its key pair. The manufacturer will then submit the public key to the root certificate authority via manual key transport. The root certificate authority, in this case, a hospital bed 10 device, will sign the certificate authority public key, then will also create and digitally sign a manifest granting the manufacturing certificate authority the authority to sign device keys and to further delegate those keys the specific operations. This will be beneficial in that devices may delegate powers. For example, lift devices 4252 could be delegated the authority to request specific model hospital bed 10*s* to articulate; diagnostic devices would be delegated the authority to tap into a hospital bed 10 state and to fully articulate any hospital bed 10; servers may be delegated the authority to request hospital bed 10 status, set and clear alarms, retrieve patient weight; hospital bed 10*s* would be delegated the authority to push alarms and PPM status to servers.

A server certificate authority can be configured by for various manufacturers and used to sign keys and manifests for feature installations, such as enabling a function on a device only as necessary.

Another special set of certificate authority is used for diagnostic devices. They are tablet computers issued by the services organization to the field technicians. These devices are intended to be used for on-site configuration, identifying faults and verifying functionality during scheduled maintenance, as such they are quite powerful. Being small and multi-functional, there is a possibility that they get misplaced or misappropriated. To prevent such a device which is no longer under the physical control of the owner, authorized technician from manipulating or interfering with a hospital bed 10 (or lift), given the fact that the technicians use the tablet to connect to a custom service application to receive the work orders or to refresh the manuals and schematics stored on the tablet to request a short-lived (~1 week) signature and delegation from the diagnostic device certificate authority. The technician will send his or her credentials (user name and password) to the diagnostic device certificate authority, together with the device public key. The diagnostic device certificate authority will contact the directory service and validate the credentials, and if they are valid then return a digital signature and a delegation manifest valid for the next period (the 1 week mentioned earlier, or could be one month).

Yet another class of certificate authorities is used to sign public keys for any 3rd party extension devices that plug-in or communicate with a particular device. The manufacturing certificate authority will interact with the device (hospital bed 10 or lift) at the final stages of manufacturing, around the time that the current production image is downloaded into the flash. The certificate authority will generate the key pair (since the CPU power in the device itself is sometimes limited); sign the public key; create and sign the delegation manifest, associate the public key with the serial number of the finished device and save into a log.

This would be facilitated by writing in to the devices flash memory that the device key pair, the manifest and its signature, all the public keys and signature on the chain of trust from the manufacturing certificate authority to the root certificate authority destroy its copy of the device private key.

The diagnostic devices are off the shelf tablets, so the manufacturing step does not apply to them. As described earlier, the diagnostic tablets will get their certificates through the periodic check-in process. Such an arrangement would allow for improved security and easing of inter-device communications.

Although certain illustrative embodiments have been described in detail above, variations and modifications exist within the scope and spirit of this disclosure as described and as defined in the following claims.

The invention claimed is:

1. A patient support apparatus comprising a frame configured to support a patient, a mattress supported by the frame and having a plurality of inflatable zones, circuitry carried by the frame, and a graphical user interface (GUI) carried by the frame and coupled to the circuitry, the circuitry being configured to command the GUI to display at least one Wi-Fi control screen to receive caregiver inputs for managing Wi-Fi connectivity of the circuitry to a network of a healthcare facility and at least one Bluetooth control screen to receive caregiver inputs for managing Bluetooth connectivity to a device spaced from the patient support apparatus further comprising a Universal Serial Bus (USB) charging connector coupled to the circuitry and wherein the circuitry is further configured to command the GUI to display at least one USB charging control screen to receive caregiver inputs for turning the USB charging connector on and off, and the mattress further comprising at least one turn bladder that is inflatable to turn a patient toward the patient's left side or right side and wherein the circuitry is configured to command the GUI to display a warning screen instructing a caregiver to disconnect a charging device from the USB charging connector if the caregiver attempts to control inflation of the at least one turn bladder to turn the patient.

2. The patient support apparatus of claim 1, wherein the GUI includes a touch screen that is configured to receive inputs from the caregiver, and wherein the GUI displays a first icon that is illuminated to indicate that the circuitry is successfully communicating via Wi-Fi with the network and a second icon that is illuminated to indicate that the circuitry is successfully paired with the device via Bluetooth.

3. The patient support apparatus of claim 1, wherein the GUI includes a locking mode which requires the caregiver to enter a personal identification number (PIN) to access a display screen on the GUI.

4. The patient support apparatus of claim 1, further comprising a siderail and wherein a patient input comprises a hand-held pendant that is removably coupleable to the siderail, the siderail including a mount for a pendant and the pendant including a receiver to releasably attach the pendant to the siderail in an orientation that positions inputs on the pendant in a line of sight of the patient positioned on the patient support apparatus in a supine position.

5. The patient support apparatus of claim 1, wherein the frame has multiple support sections including a head section, a seat section, a thigh section, and a foot section, and a self-egress button that, when activated by the patient, results in the patient support apparatus being adjusted to a patient egress configuration to facilitate the patient to exit the patient support apparatus, the patient egress configuration comprising the head section being raised, the thigh and foot sections being lowered so as to be generally coplanar with the seat section, and at least a portion of the mattress being further inflated to increase firmness.

6. The patient support apparatus of claim 1, wherein the patient support apparatus includes a plurality of nodes arranged in a network with multiple levels and a nurse call system includes a node connected to the network of the patient support apparatus, and wherein each node maintains an independent public/private key pair such that a grandparent certificate authority maintains a chain of certificates linking each key to a public key of a parent or to a respective child to create a down-tree network of trust to be established.

7. The patient support apparatus of claim 1, wherein the patient support apparatus further comprises an air box;

wherein the mattress is supported by the frame and includes a head section, a foot section, and a seat section between the head section and the foot section, the mattress including a cushion layer; an outer ticking layer including an upper surface portion positioned to support the patient; a microclimate structure positioned within the outer ticking layer and between the cushion layer and the upper surface portion, the microclimate structure comprising an upper layer, at least a portion of the upper layer being vapor and liquid permeable, a middle layer being air permeable, and a lower layer being liquid impermeable, wherein the air box is operable to move air through the microclimate structure and into the interior of the outer ticking, and wherein the mattress comprises a turning assembly positioned in an outer ticking, the turning assembly including a plate structure having a lower plate, an intermediate plate pivotable relative to the lower plate about a first axis generally parallel to a longitudinal axis of the mattress, the first axis positioned on a first side of the intermediate plate, and an upper plate pivotable relative to the intermediate plate about a second axis generally parallel to the longitudinal axis of the mattress, the second axis positioned on a second side of the intermediate plate opposite from the first axis, the turning assembly further including a first pair of bladders positioned between the lower plate and the intermediate plate and inflatable to cause rotation of the intermediate plate relative to the lower plate, and a second pair of bladders positioned between the intermediate plate and the upper plate and inflatable to cause rotation of the upper plate relative the intermediate plate.

8. The patient support apparatus of claim 1, wherein the patient support apparatus comprises a controller, a sensor operable to provide a signal to the controller indicative of a status of the patient supported on the patient support apparatus, and a power drive wheel coupled to the frame and in communication with the controller, wherein the controller utilizes information from the sensor regarding the status of the patient and modifies the operation of the power drive wheel based on the information from the sensor.

9. The patient support apparatus of claim 1, wherein the patient support apparatus includes a radio frequency based authentication means for identifying the caregiver to allow an appropriate caregiver to control functionality of the patient support apparatus.

10. The patient support apparatus of claim 1, wherein the patient support apparatus further comprises an integrated sequential compression means for providing sequential compression therapy to limbs of the patient supported on the patient support apparatus.

11. The patient support apparatus of claim 1, wherein the patient support apparatus comprises a first GUI touch screen assembly and a second GUI touch screen assembly, each of the first and second GUI touch screen assemblies configured to receive inputs from the caregiver, the first and second GUIs having the same components but positioned on opposite sides of the patient support apparatus, the components being adapted to be assembled in different configurations to adjust for the position of the respective GUI on the patient support apparatus.

12. The patient support apparatus of claim 1, further comprising support arm means for supporting a user interface in a position accessible to the patient supported in a supine position on the patient support apparatus and to allow the patient to reposition the user interface.

13. The patient support apparatus of claim 1, wherein the at least one Bluetooth control screen is configured to list a menu of multiple devices that are spaced from the patient support apparatus and available for Bluetooth pairing with the circuitry.

14. The patient support apparatus of claim 1, wherein after the device spaced from the patient support apparatus is paired with the circuitry via Bluetooth, the at least one Bluetooth control screen includes a disconnect screen to receive caregiver inputs to unpair the device from the circuitry.

15. The patient support apparatus of claim 1, wherein the at least one Bluetooth control screen includes at least one call light connectivity screen to receive caregiver inputs to pair the circuitry via Bluetooth with a call light of a nurse call system.

16. The patient support apparatus of claim 1, wherein the at least one Bluetooth control screen includes at least one location confirmation screen to receive caregiver inputs to confirm a location identification (ID) corresponding to a location of the patient support apparatus in the healthcare facility.

17. The patient support apparatus of claim 1, wherein the at least one Wi-Fi control screen is configured to list a menu of different networks available for Wi-Fi communication with the circuitry.

18. The patient support apparatus of claim 1, wherein the frame includes an upper frame and at least one siderail that is movable between raised and lowered positions relative to the upper frame and wherein the USB charging connector is coupled to a siderail.

19. The patient support apparatus of claim 18, wherein the USB charging connector is located adjacent a first surface of the siderail that faces toward the patient supported on the frame.

20. The patient support apparatus of claim 1, wherein the frame includes an upper frame, a first barrier coupled to the upper frame, and a second barrier coupled to the upper frame, wherein the first and second barriers are configured to inhibit patient egress from the upper frame, wherein the GUI is coupled to the first barrier, and the USB charging connector is coupled to the second barrier.

21. The patient support apparatus of claim 1, further comprising a speaker coupled to the circuitry and wherein the circuitry is further configured to command the GUI to display at least one voice alert control screen to receive caregiver inputs for turning on and off one or more voice alerts that are played through the speaker.

22. The patient support apparatus of claim 21, wherein the one or more voice alerts pertain to one or more of the following: warning the patient to stay in bed, advising the patient that a nurse call has been successfully placed, or warning the patient that a function of the patient support apparatus that the patient has attempted to control is not available.

23. The patient support apparatus of claim 21, wherein the one or more voice alerts pertain to one or more of the following: warning the caregiver that a call light is not connected, warning the caregiver that casters of the patient support apparatus are not braked, or warning the caregiver that an obstacle has been detected between movable portions of the frame.

24. The patient support apparatus of claim 1, wherein the frame includes a plurality of load cells that measure an amount of weight supported by a first portion of the frame relative to a second portion of the frame and wherein the circuitry is further configured to command the GUI to display at least one load cell reading screen that displays individual weight readings for each load cell of the plurality of load cells.

25. The patient support apparatus of claim 1, further comprising a patient pendant coupled to the circuitry and configured for use by the patient to control one or more functions of the patient support apparatus, and wherein the circuitry is further configured to command the GUI to display at least one pendant control screen to receive caregiver inputs to turn on and off the ability of the patient pendant to control at least one function of the one or more functions.

26. The patient support apparatus of claim 25, further comprising the mattress having at least one inflatable bladder, wherein the at least one function of the patient pendant that the caregiver is able to turn on and off is control of the inflation of the at least one inflatable bladder.

27. The patient support apparatus of claim 1, further comprising a plurality of alert lights carried by the frame and coupled to the circuitry, and wherein the circuitry is further configured to command the GUI to display at least one alert light control screen to receive caregiver inputs for turning on and off functionality of at least one alert light of the plurality of alert lights.

28. The patient support apparatus of claim 1, wherein the circuitry is configured to implement an encryption protocol in connection with Wi-Fi communications or Bluetooth communications or both.

29. The patient support apparatus of claim 1, wherein the circuitry is configured to implement an encryption protocol in connection with Wi-Fi communications or Bluetooth communications or both.

* * * * *